(12) United States Patent
Gordon et al.

(10) Patent No.: US 10,691,446 B2
(45) Date of Patent: Jun. 23, 2020

(54) SYSTEM, METHOD, AND COMPUTER PROGRAM PRODUCT FOR COORDINATION AMONG MULTIPLE DEVICES

(71) Applicant: Majen Tech, LLC, Longview, TX (US)

(72) Inventors: George Andrew Gordon, Frisco, TX (US); Joseph A Cerrato, Longview, TX (US); Ronald A Johnston, Longview, TX (US); Kevin J Zilka, Los Gatos, CA (US)

(73) Assignee: MAJEN TECH, LLC, Longview, TX (US)

( * ) Notice: Subject to any disclaimer, the term of this patent is extended or adjusted under 35 U.S.C. 154(b) by 0 days.

(21) Appl. No.: 16/537,488

(22) Filed: Aug. 9, 2019

(65) Prior Publication Data

US 2019/0361694 A1 Nov. 28, 2019

Related U.S. Application Data

(63) Continuation-in-part of application No. 15/925,737, filed on Mar. 19, 2018, which is a continuation-in-part of application No. 13/652,458, filed on Oct. 15, 2012, now abandoned.

(60) Provisional application No. 61/577,657, filed on Dec. 19, 2011.

(51) Int. Cl.
*G06F 3/0482* (2013.01)
*G06F 9/54* (2006.01)
*G06F 8/65* (2018.01)
*H04W 4/80* (2018.01)

(52) U.S. Cl.
CPC .............. *G06F 8/65* (2013.01); *G06F 3/0482* (2013.01); *G06F 9/543* (2013.01); *H04W 4/80* (2018.02)

(58) Field of Classification Search
None
See application file for complete search history.

(56) References Cited

U.S. PATENT DOCUMENTS

| 2006/0224850 | A1* | 10/2006 | Yamamoto | G06F 3/0625 711/170 |
| 2007/0223476 | A1* | 9/2007 | Fry | H04L 29/12254 370/392 |
| 2007/0288627 | A1* | 12/2007 | Abella | H04N 21/64322 709/224 |

(Continued)

*Primary Examiner* — Daxin Wu
(74) *Attorney, Agent, or Firm* — Patrick E. Caldwell, Esq.; The Caldwell Firm, LLC

(57) ABSTRACT

In various embodiments, a method, apparatus, and computer program product are provided involving, at a first device: opening the application on the first device, performing an action utilizing an application, updating a state of the application, for being communicated with the second device; and, at a second device: utilizing the updated state of the application received from the first device, displaying an interface including: a button for opening the application utilizing the second device, and indicia that indicates that the first device has updated at least one aspect of the application, and in response to a detection of the selection of the button, accessing the application utilizing the second device such that the application is accessed so as to reflect the updated state of the application.

28 Claims, 134 Drawing Sheets

(56) References Cited

U.S. PATENT DOCUMENTS

| | | | | |
|---|---|---|---|---|
| 2010/0037260 | A1* | 2/2010 | Fukuda | H04N 5/4403 |
| | | | | 725/39 |
| 2011/0230178 | A1* | 9/2011 | Jones | H04M 1/0235 |
| | | | | 455/422.1 |
| 2011/0302019 | A1* | 12/2011 | Proctor, Jr. | H04W 4/029 |
| | | | | 705/14.27 |
| 2012/0015730 | A1* | 1/2012 | Watkins, Jr. | A63F 13/216 |
| | | | | 463/36 |
| 2012/0096368 | A1* | 4/2012 | McDowell | G06F 9/543 |
| | | | | 715/748 |
| 2012/0129454 | A1* | 5/2012 | Suzuki | H04B 1/74 |
| | | | | 455/41.2 |
| 2012/0151525 | A1* | 6/2012 | Demchenko | H04N 21/482 |
| | | | | 725/39 |
| 2013/0007481 | A1* | 1/2013 | Chakra | G06F 1/3206 |
| | | | | 713/320 |

* cited by examiner

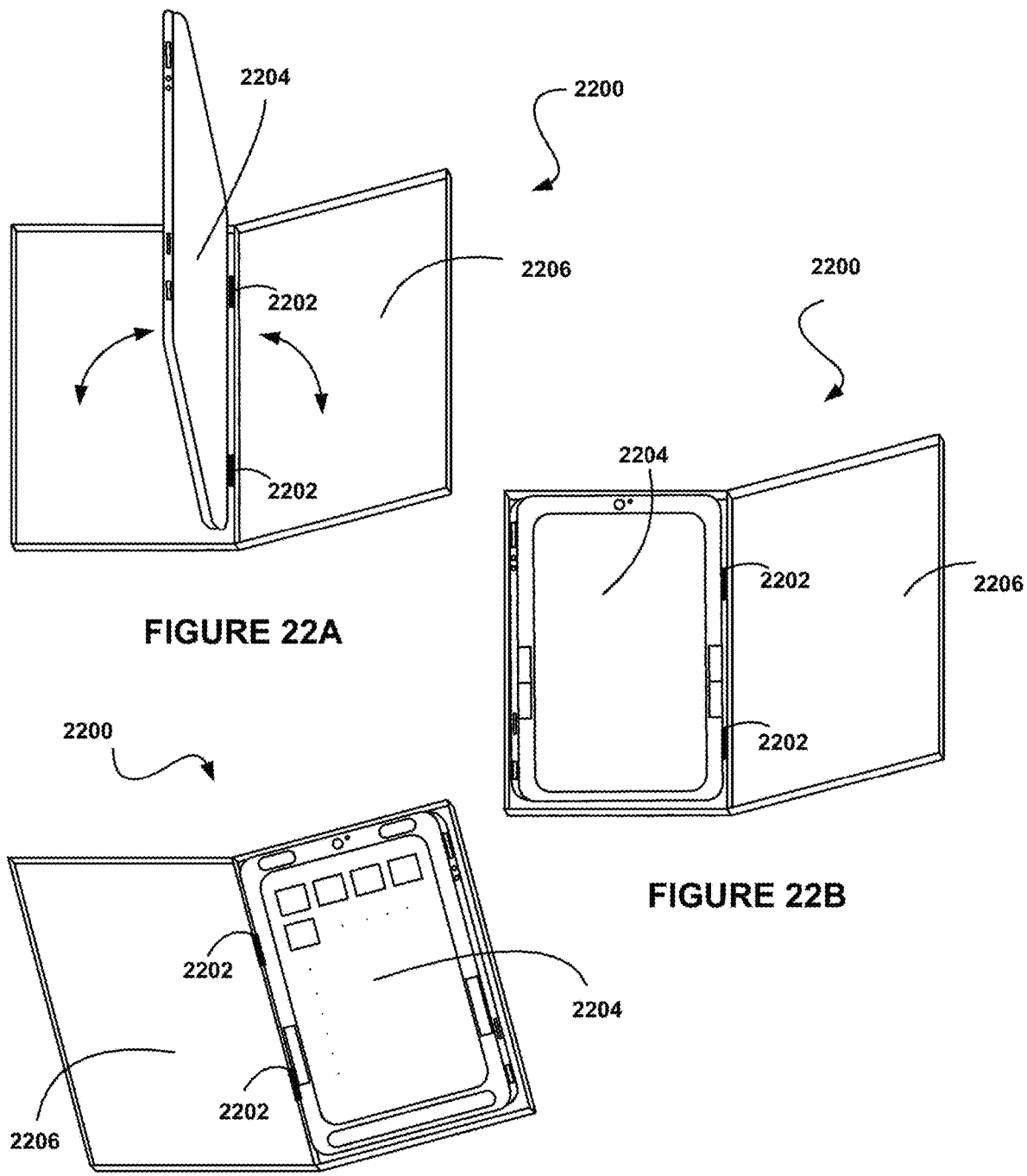

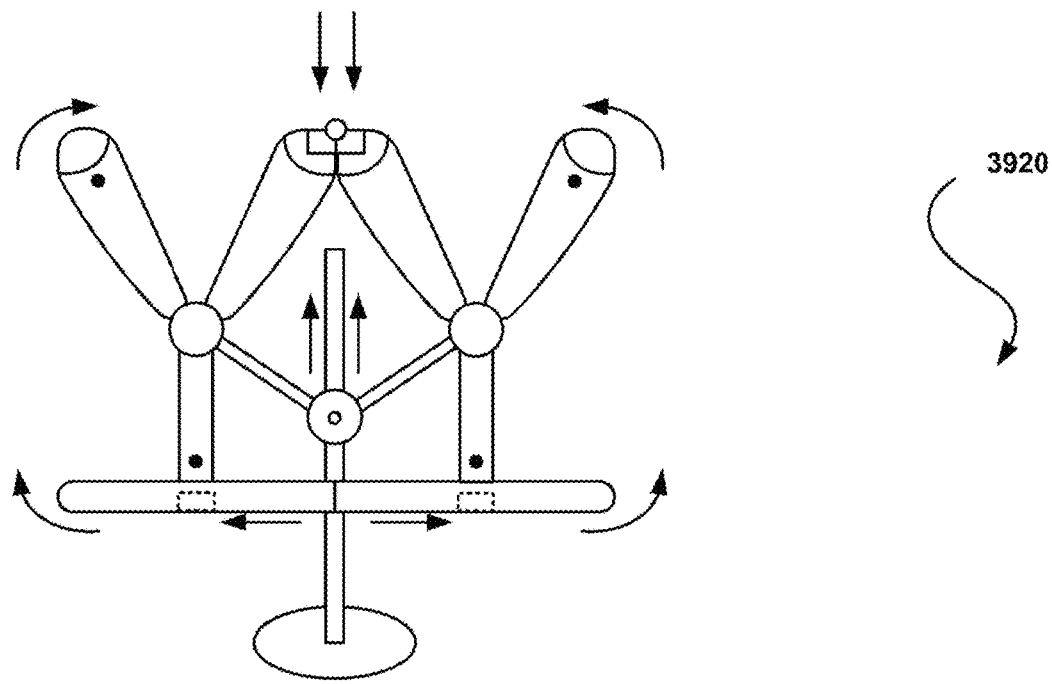
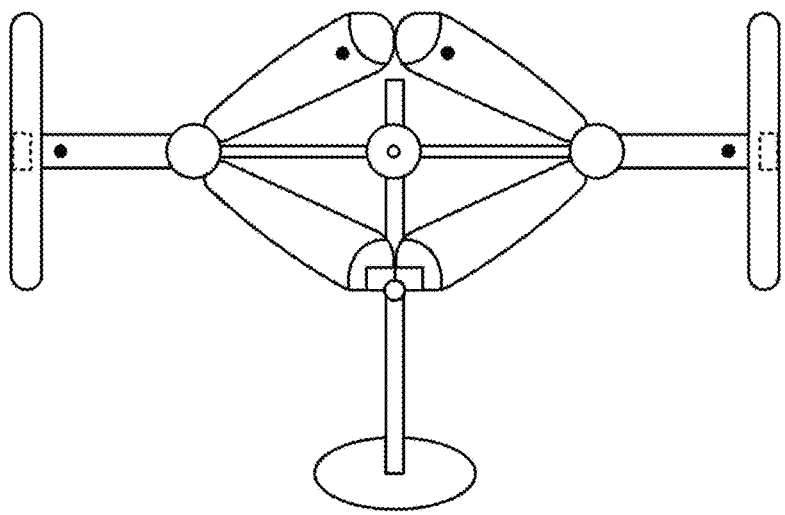
FIGURE 39B

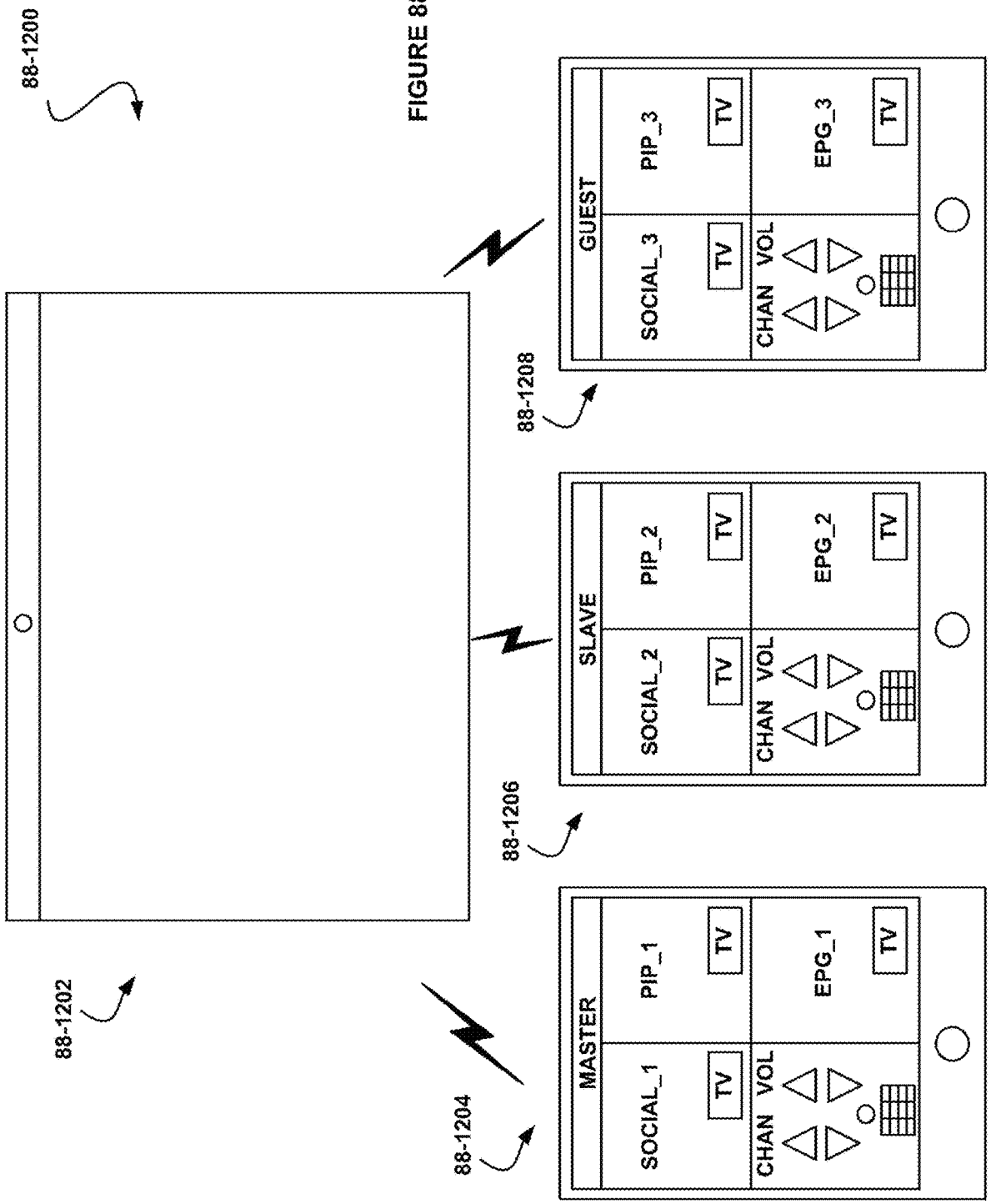

VIEWER_1
- APP_1 (LOG-IN INFORMATION)
- APP_2 (LOG-IN INFORMATION)
- PARENTAL_CONTROL_RULES
- EPG PREFERENCES
- GESTURE / VOICE COMMANDS
- AD PREFERENCES
- MOBILE DEVICE INFORMATION
- FAMILY / FRIEND INFORMATION

VIEWER_2
- APP_1 (LOG-IN INFORMATION)
- APP_2 (LOG-IN INFORMATION)
- PARENTAL_CONTROL_RULES
- EPG PREFERENCES
- GESTURE / VOICE COMMANDS
- AD PREFERENCES
- MOBILE DEVICE INFORMATION
- FAMILY / FRIEND INFORMATION

⋮

VIEWER_3

TELEVISION PROGRAM / MOVIE / CONTENT

SET VIEWER HIERARCHY

| VIEWER 2 | PARENTAL CONTROL SETTINGS ADMIN |
| VIEWER 1 | PARENTAL CONTROL SETTINGS ADMIN |
| VIEWER 4 | PARENTAL CONTROLS APPLY |
| VIEWER 3 | PARENTAL CONTROLS APPLY |

UPDATE/ENTER

FIGURE 89-6D

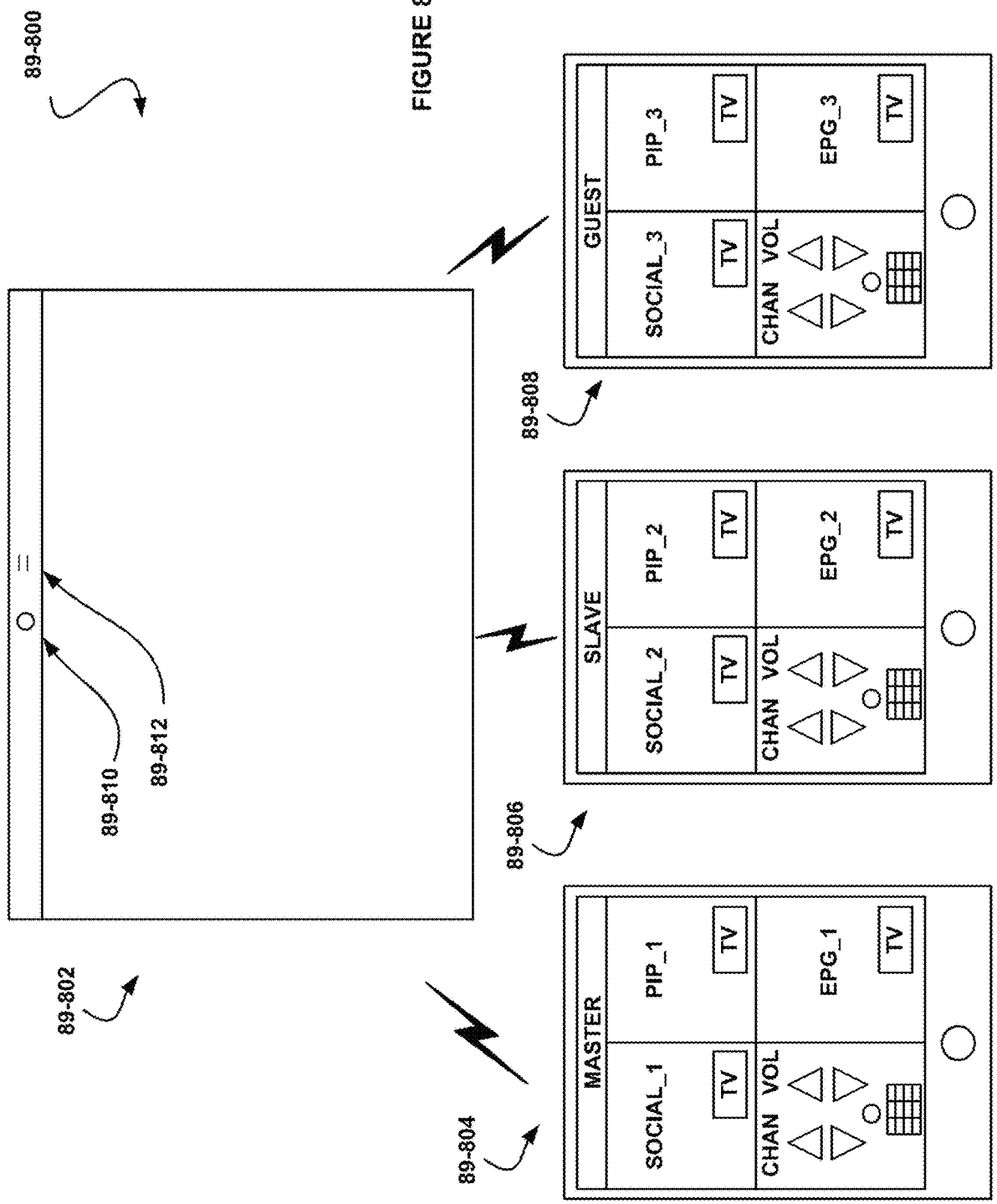

SYSTEM, METHOD, AND COMPUTER PROGRAM PRODUCT FOR COORDINATION AMONG MULTIPLE DEVICES

The present application is continuation-in-part of and claims priority to U.S. application Ser. No. 15/925,737, filed Mar. 19, 2018, which, in turn, is a continuation-in-part of and claims priority to U.S. application Ser. No. 13/652,458, filed Oct. 15, 2012, which, in turn, claims priority to U.S. Provisional Application No. 61/577,657 dated Dec. 19, 2011. U.S. Provisional Application No. 61/577,657 dated Dec. 19, 2011 is incorporated herein by reference for all purposes.

FIELD OF THE INVENTION AND BACKGROUND

The present invention relates to mobile devices, and more particularly to device coordination.

SUMMARY

In one embodiment, a system is provided, comprising: a first device including a first Bluetooth interface, a first Wi-Fi interface, a first input device, a first display, at least one first processor, and a first memory storing first instructions and an application; a second device including a second Bluetooth interface, a second Wi-Fi interface, a second input device, a second display, at least one second processor, and a second memory storing second instructions and the application; said at least one first processor of the first device configured to execute the first instructions for, based on user input, causing the first device to: open the application on the first device, perform an action utilizing the application, update a state of the application, such that the updated state of the application is communicated with the second device; said at least one second processor of the second device configured to execute the second instructions for, based on additional user input, causing the second device to: utilizing the updated state of the application received from the first device, display an interface including: a button for opening the application utilizing the second device, and indicia that indicates that the first device has updated at least one aspect of the application, and in response to a detection of the selection of the button, access the application utilizing the second device such that the application is accessed so as to reflect the updated state of the application.

In another embodiment, a non-transitory computer readable storage medium is provided for storing one or more programs, the one or more programs comprising instructions which, when executed by a first device and a second device, cause: the first device to: open the application on the first device, perform an action utilizing an application, update a state of the application, for being communicated with the second device; and the second device to: utilizing the updated state of the application received from the first device, display an interface including: a button for opening the application utilizing the second device, and indicia that indicates that the first device has updated at least one aspect of the application, and in response to a detection of the selection of the button, access the application utilizing the second device such that the application is accessed so as to reflect the updated state of the application.

In yet another embodiment, a method is provided, comprising: at a first device: opening the application on the first device, performing an action utilizing an application, updating a state of the application, for being communicated with the second device; at a second device: utilizing the updated state of the application received from the first device, displaying an interface including: a button for opening the application utilizing the second device, and indicia that indicates that the first device has updated at least one aspect of the application, and in response to a detection of the selection of the button, accessing the application utilizing the second device such that the application is accessed so as to reflect the updated state of the application.

BRIEF DESCRIPTION OF THE DRAWINGS

FIGS. 22A-C illustrate a cover having a hinge along a seam to which a tablet apparatus may be coupled, in accordance with one embodiment.

FIG. 39B shows a dual display mount apparatus in a landscape orientation, in accordance with one embodiment.

FIG. 88-1 illustrates a network architecture, in accordance with one embodiment.

FIG. 88-2 shows a representative hardware environment that may be associated with the servers and/or clients of FIG. 1, in accordance with one embodiment.

FIG. 88-3 shows a method for sending a control signal to a television utilizing a mobile device, in accordance with one embodiment.

FIG. 88-4 shows a system for sending a control signal to a television utilizing a mobile device, in accordance with another embodiment.

FIG. 88-5 shows a data structure for associating a control level with one or more devices, in accordance with another embodiment.

FIG. 88-6 shows a method for connecting with a television for sending a control signal to the television utilizing a mobile device, in accordance with another embodiment.

FIG. 88-7 shows a method for sending a control signal to the television utilizing a mobile device, in accordance with another embodiment.

FIG. 88-8 shows a method for sending a control signal to the television utilizing a mobile device, in accordance with another embodiment.

FIG. 88-9 shows a method for sending a control signal to the television utilizing a mobile device, in accordance with another embodiment.

FIG. 88-10 shows an exemplary system flow for sending a control signal to the television utilizing a mobile device, in accordance with another embodiment.

FIG. 88-11 shows an exemplary system flow for sending a control signal to the television utilizing a mobile device, in accordance with another embodiment.

FIG. 88-12 shows a system for sending a control signal to a television utilizing a mobile device, in accordance with another embodiment.

FIG. 89-1 shows a method for altering at least one aspect of an experience of a viewer in association with a television, in accordance with one embodiment.

FIG. 89-2 shows a method for registering a viewer of a television, in accordance with another embodiment.

FIG. 89-3 shows a data structure for a registered viewer of a television, in accordance with another embodiment.

Figure 4:
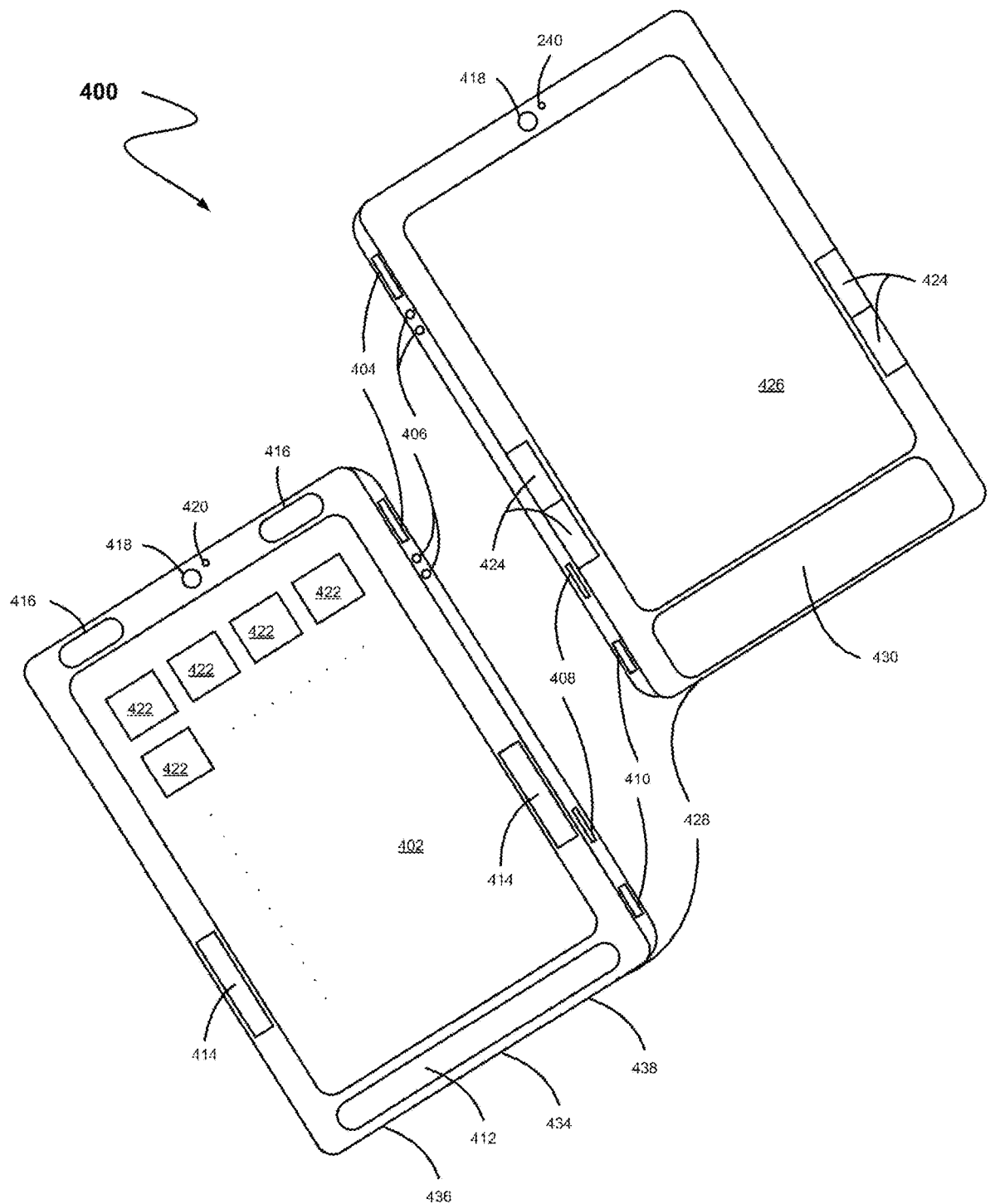
FIG. 4 illustrates a tablet apparatus having a first backlit touchscreen display and a second electronic ink (e-ink) display, in accordance with another possible embodiment.
Figures 1, 89:
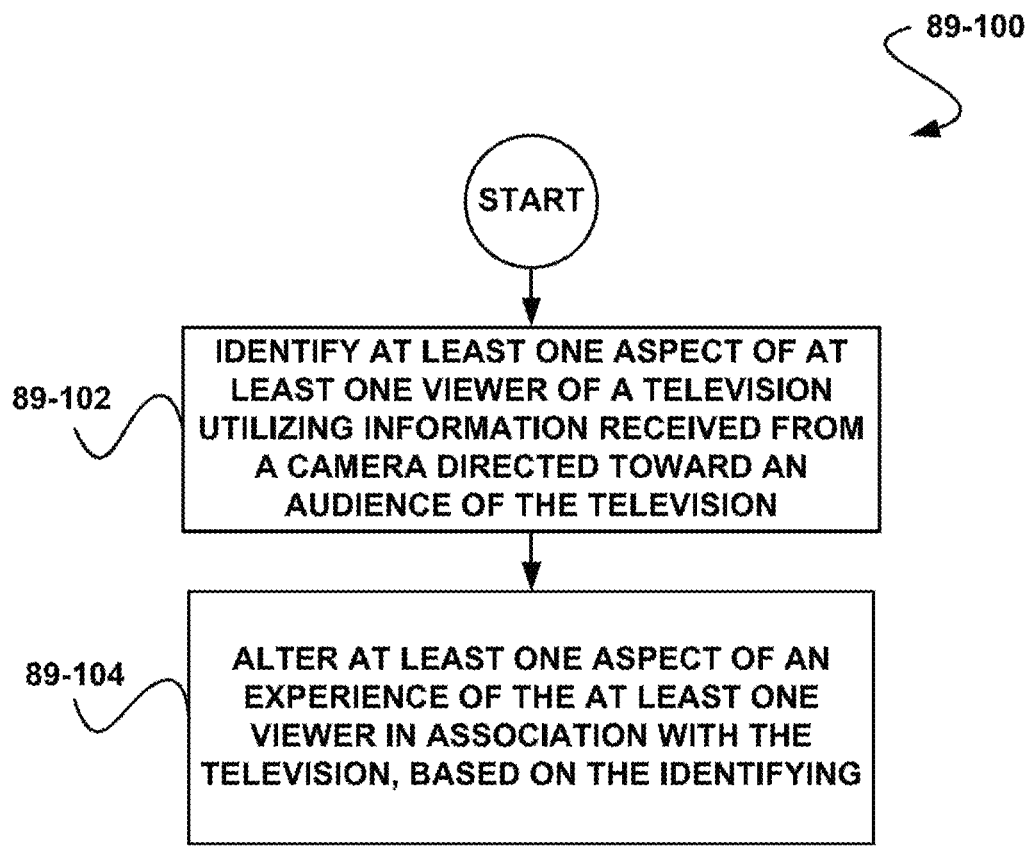
Figures 2, 89:
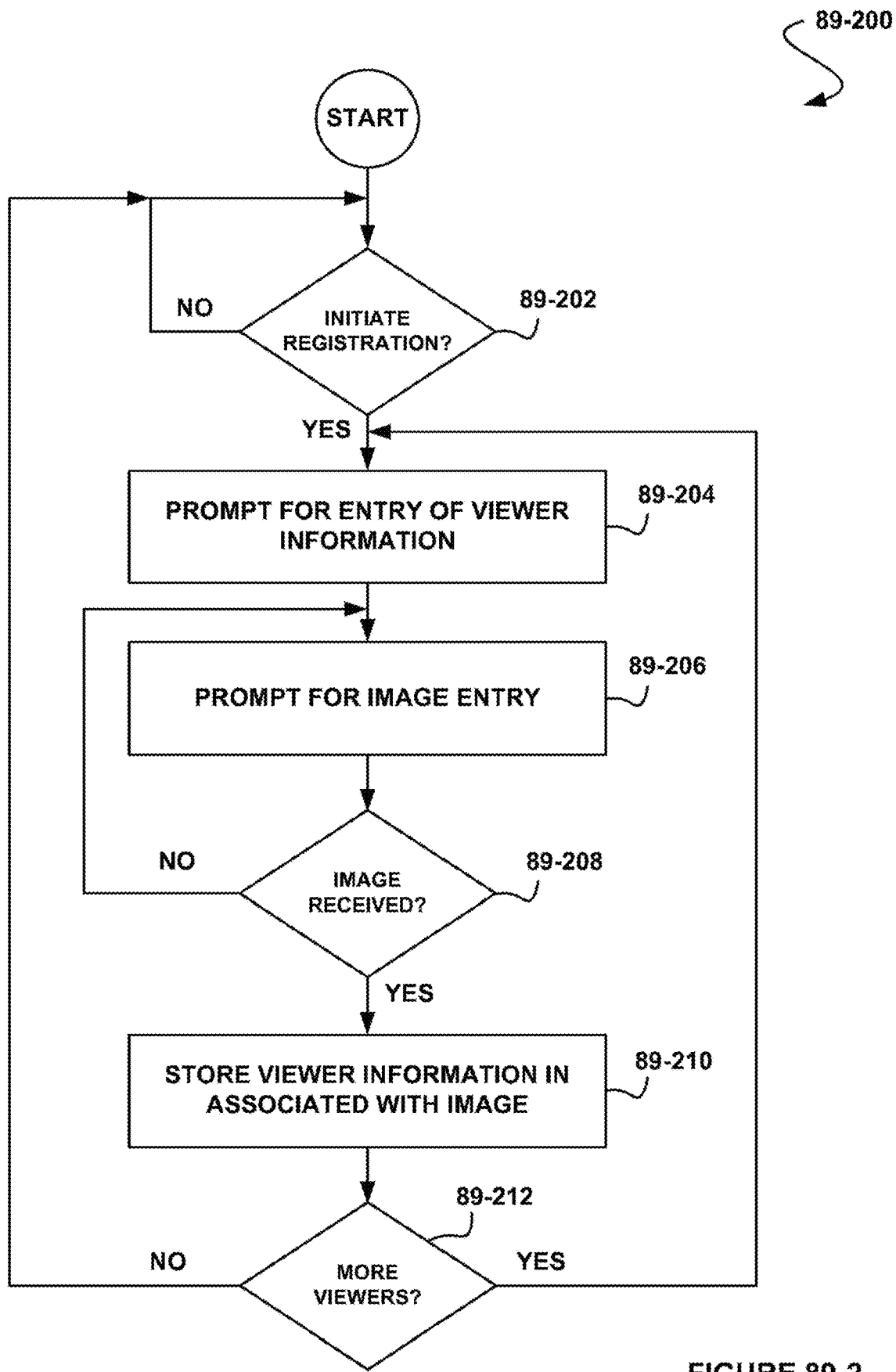
Figures 4, 89:
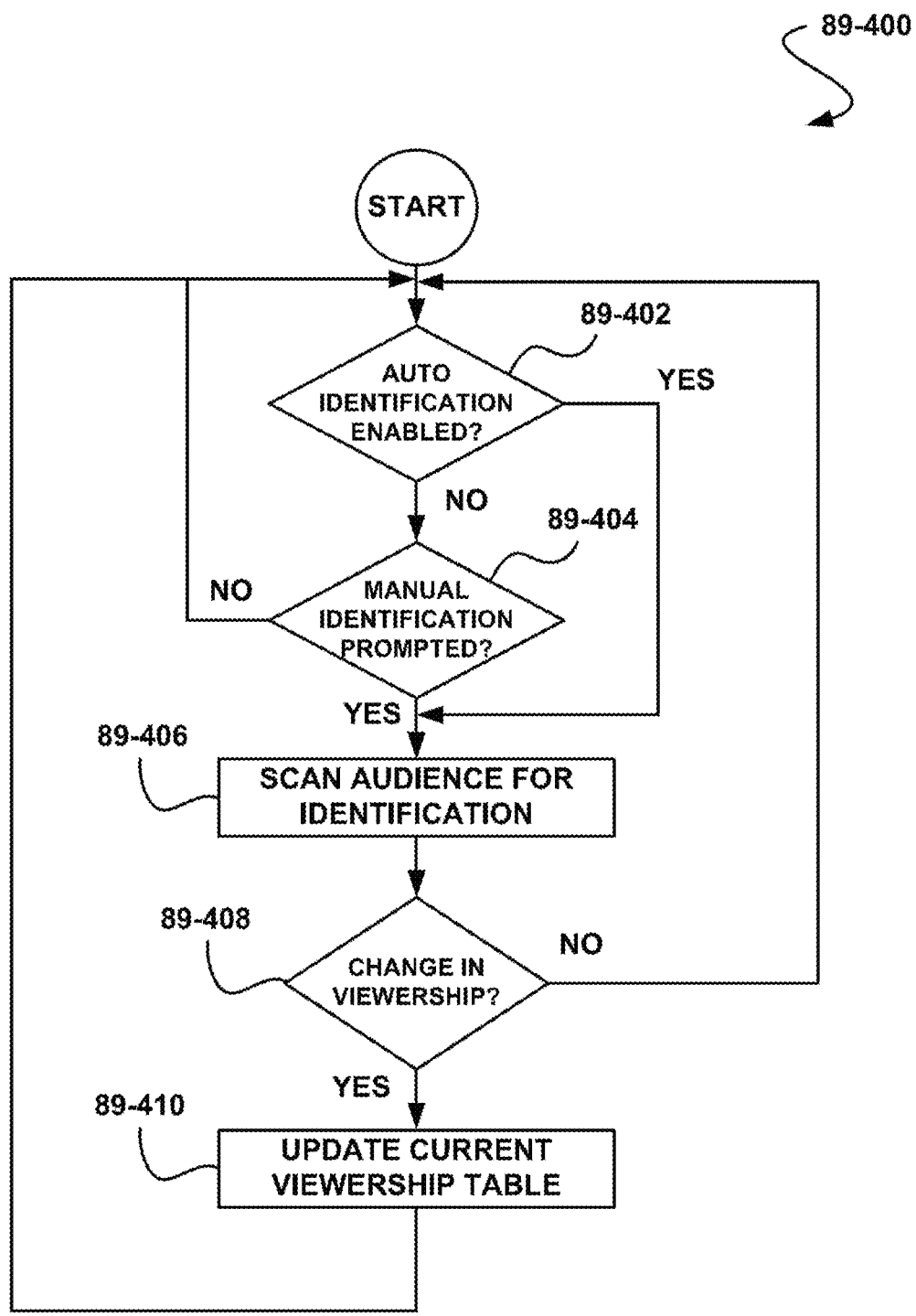
Figures 5, 89:
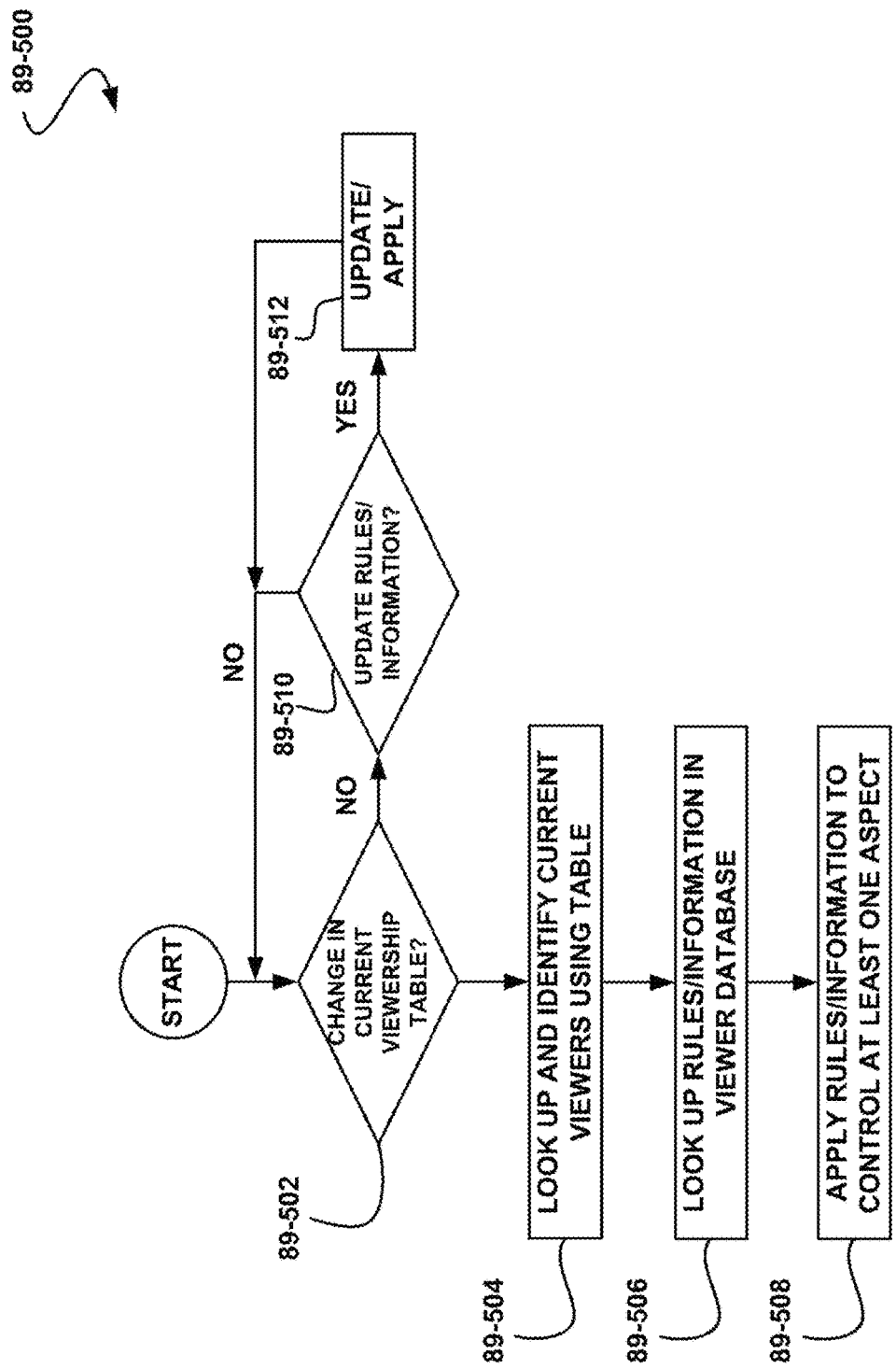

FIG. 89-4 shows a method for identifying a viewer of a television, in accordance with another embodiment.

Figure 5:
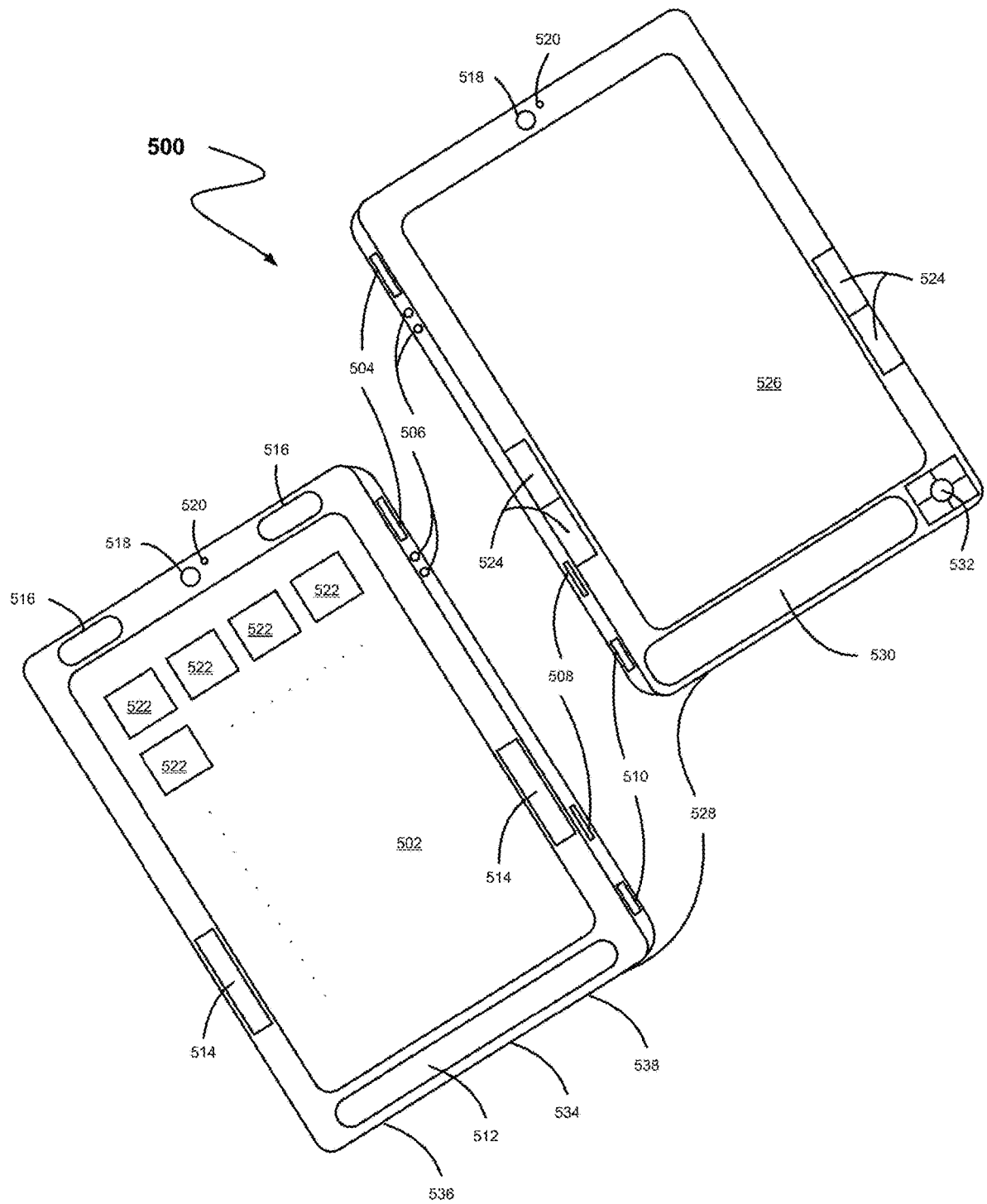
FIG. 5 illustrates a tablet apparatus that is equipped with a navigation tool, in accordance with another possible embodiment.

FIG. 89-5 shows a method for utilizing a current viewership table associated with a television, in accordance with another embodiment.

Figures 6A, 89:
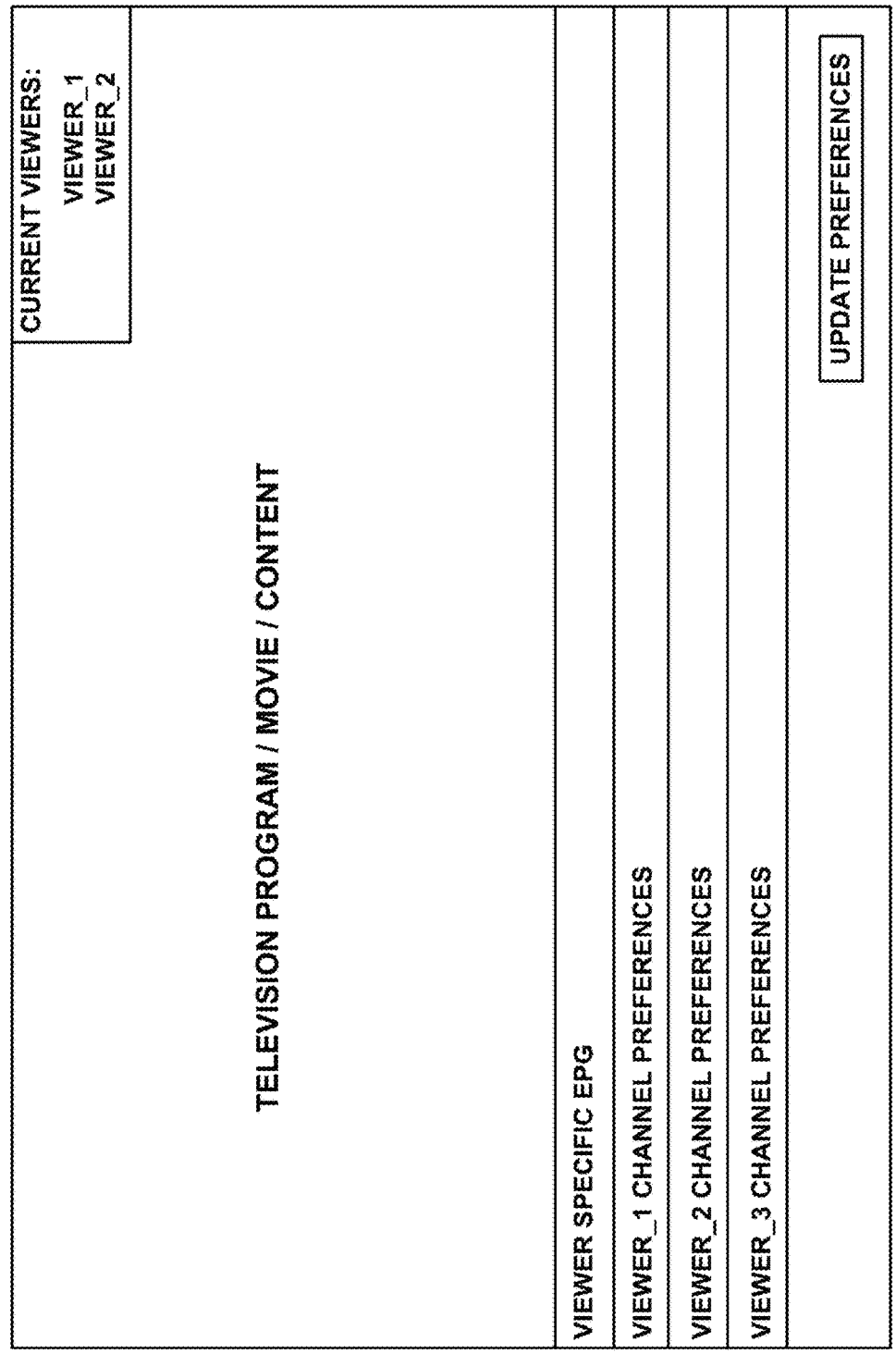

FIG. 89-6A shows a viewer interface, in accordance with another embodiment.

Figures 6B, 89:
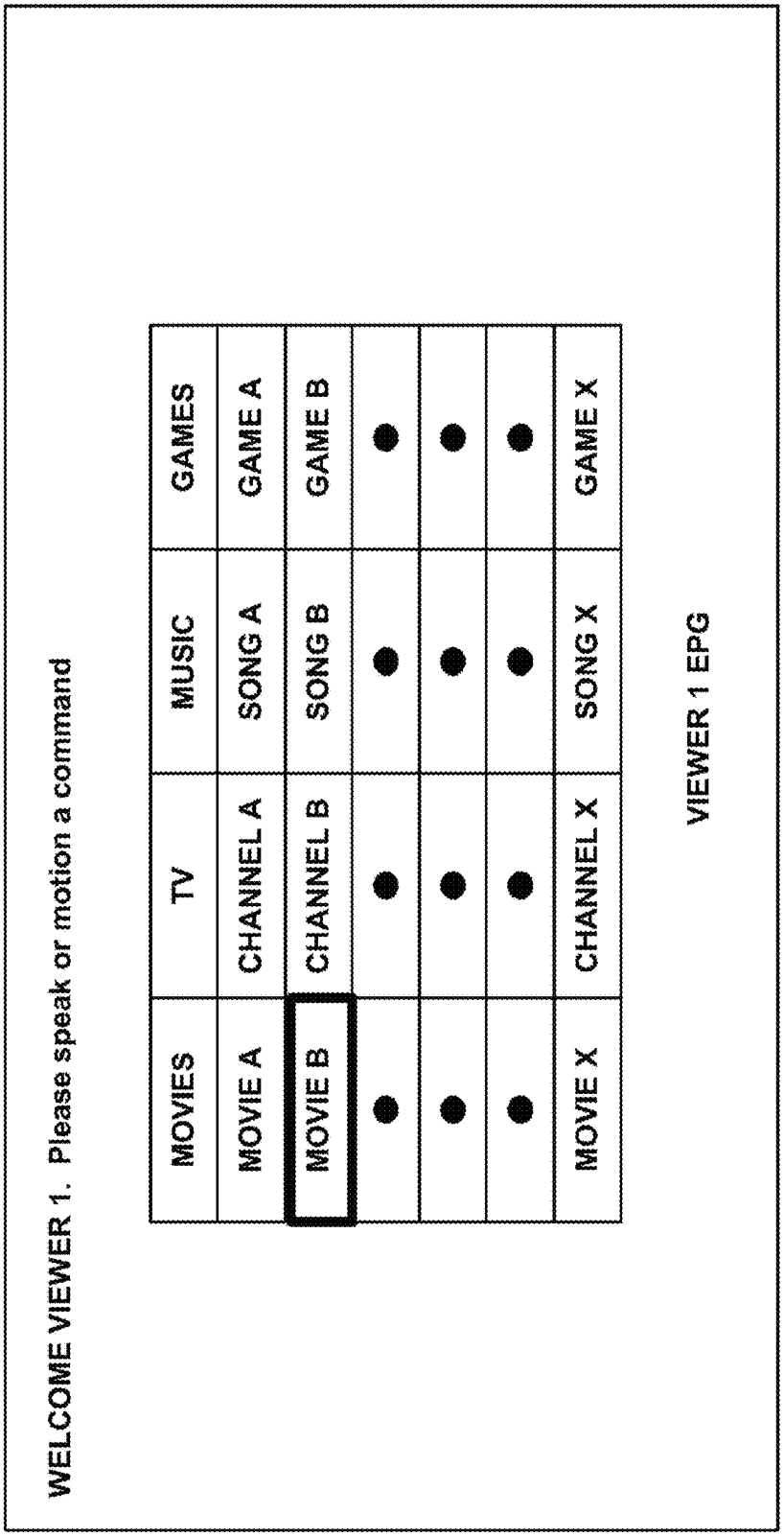

FIG. 89-6B shows a viewer interface, in accordance with another embodiment.

Figures 6C, 89:
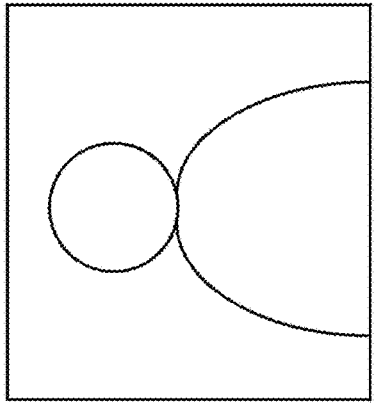
Figures 7, 89:
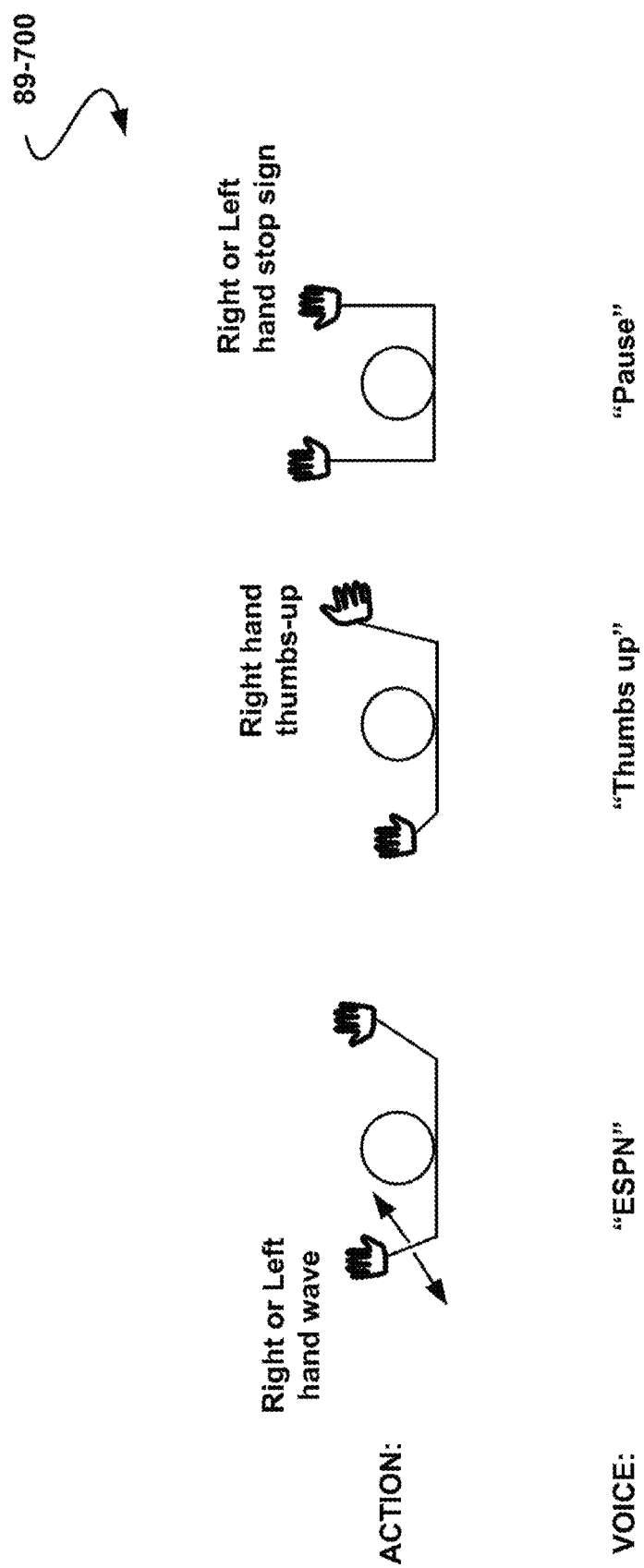
Figures 9, 89:
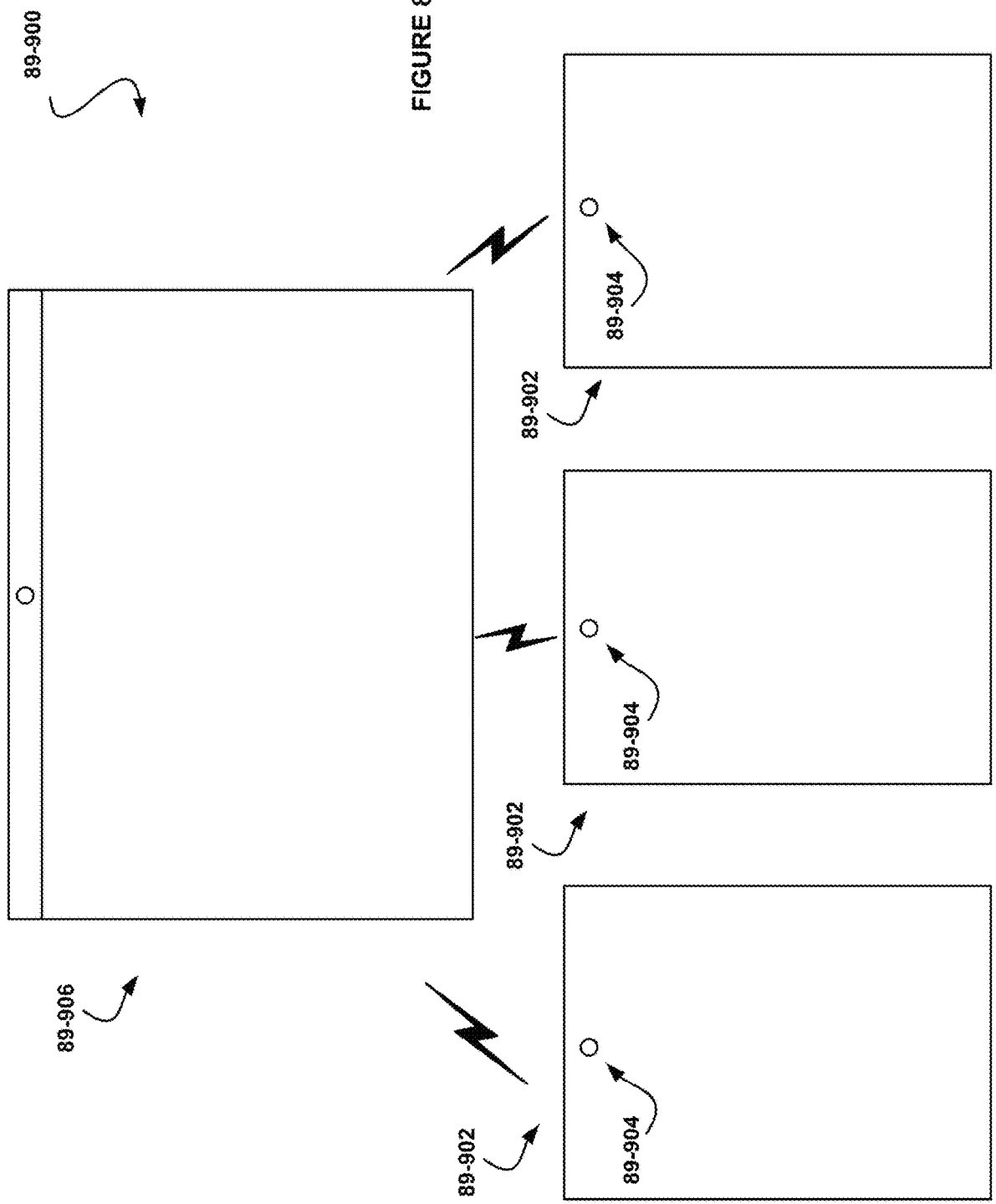
Figures 10, 89:
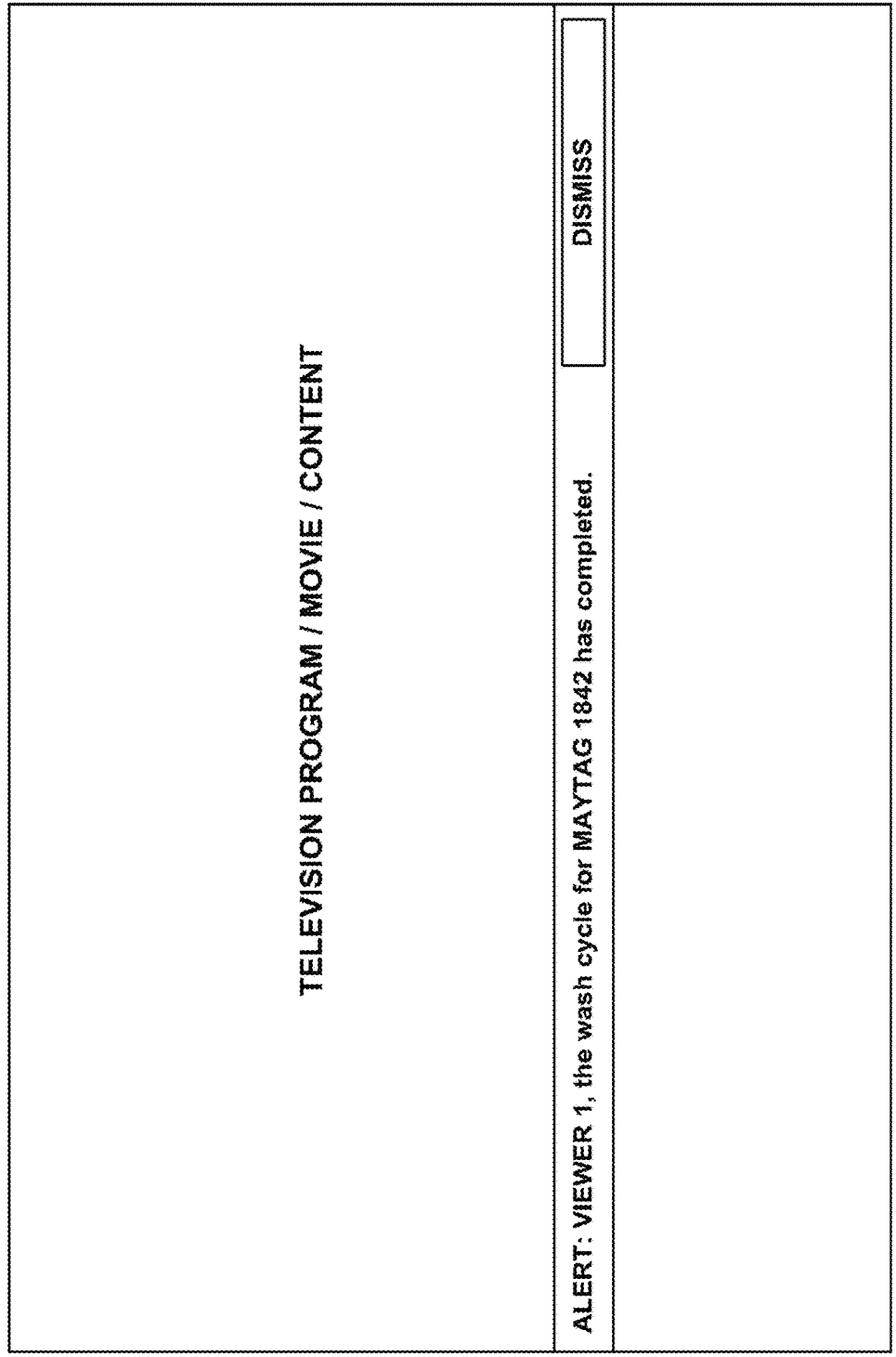

FIG. 89-6C shows a viewer interface, in accordance with another embodiment.

FIG. 89-6D shows a viewer interface, in accordance with another embodiment.

Figure 7:
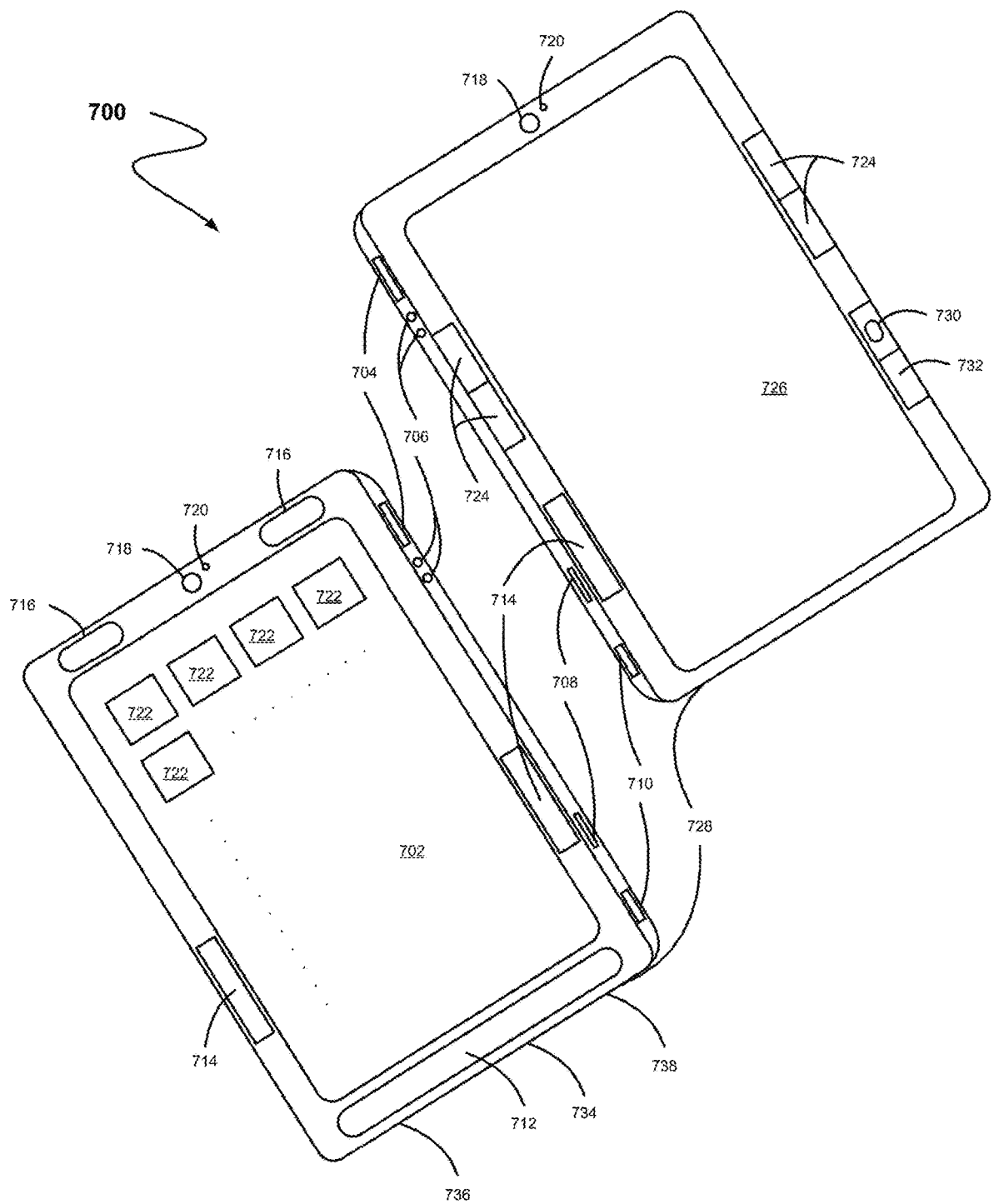
FIG. 7 illustrates a tablet apparatus having a first backlit touchscreen display and a second e-ink display, in accordance with another possible embodiment.

FIG. 89-7 shows exemplary viewer motion and voice commands, in accordance with another embodiment.

Figure 8:
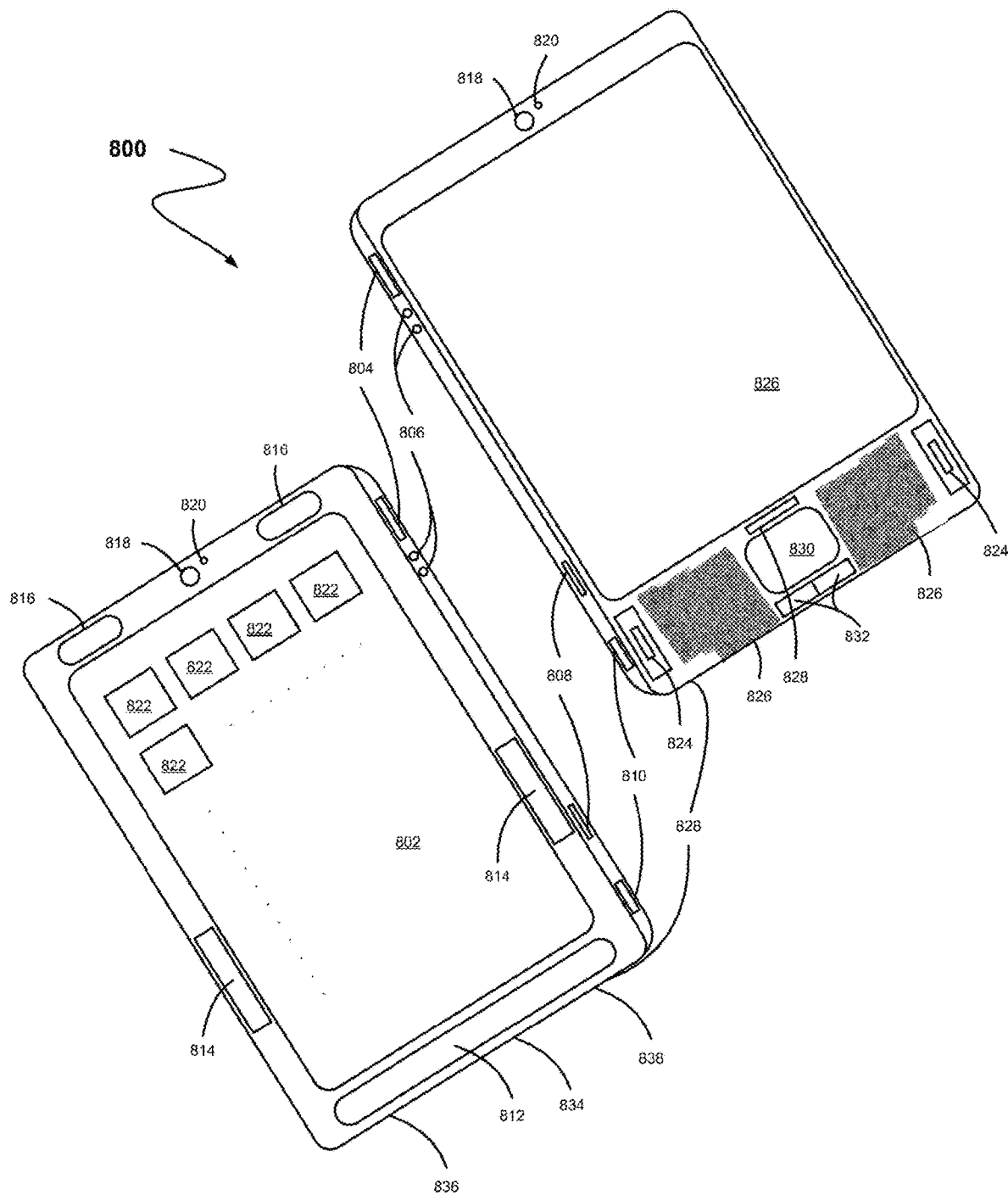
FIG. 8 illustrates a tablet apparatus having a first backlit touchscreen display and a second e-ink display, in accordance with another possible embodiment.

FIG. 89-8 shows a system for controlling a television, in accordance with another embodiment.

Figure 9:
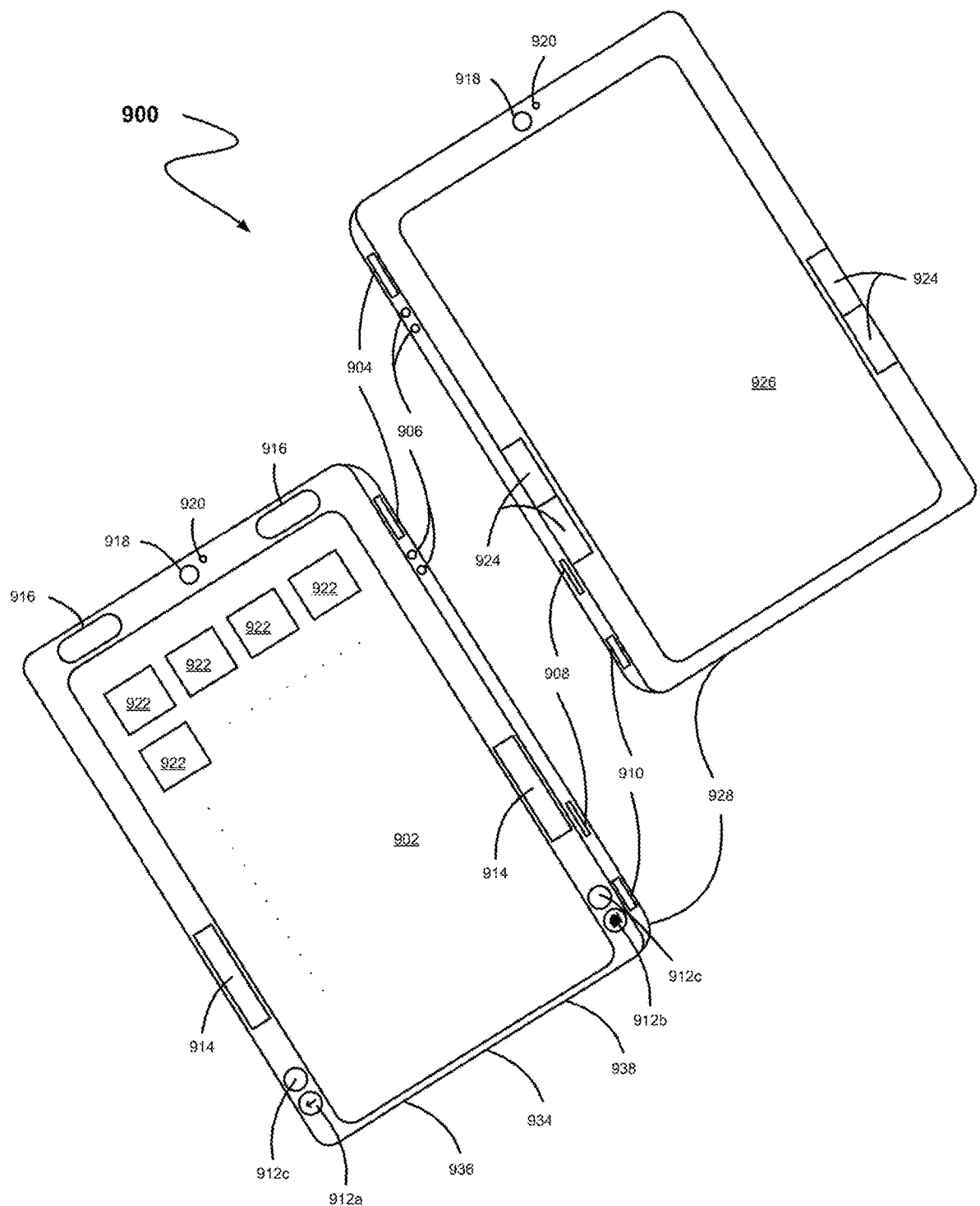
FIG. 9 illustrates a tablet apparatus having a first backlit touchscreen display and a second e-ink display, in accordance with another possible embodiment.

FIG. 89-9 shows a system capable of facial recognition, in accordance with another embodiment.

Figure 10:
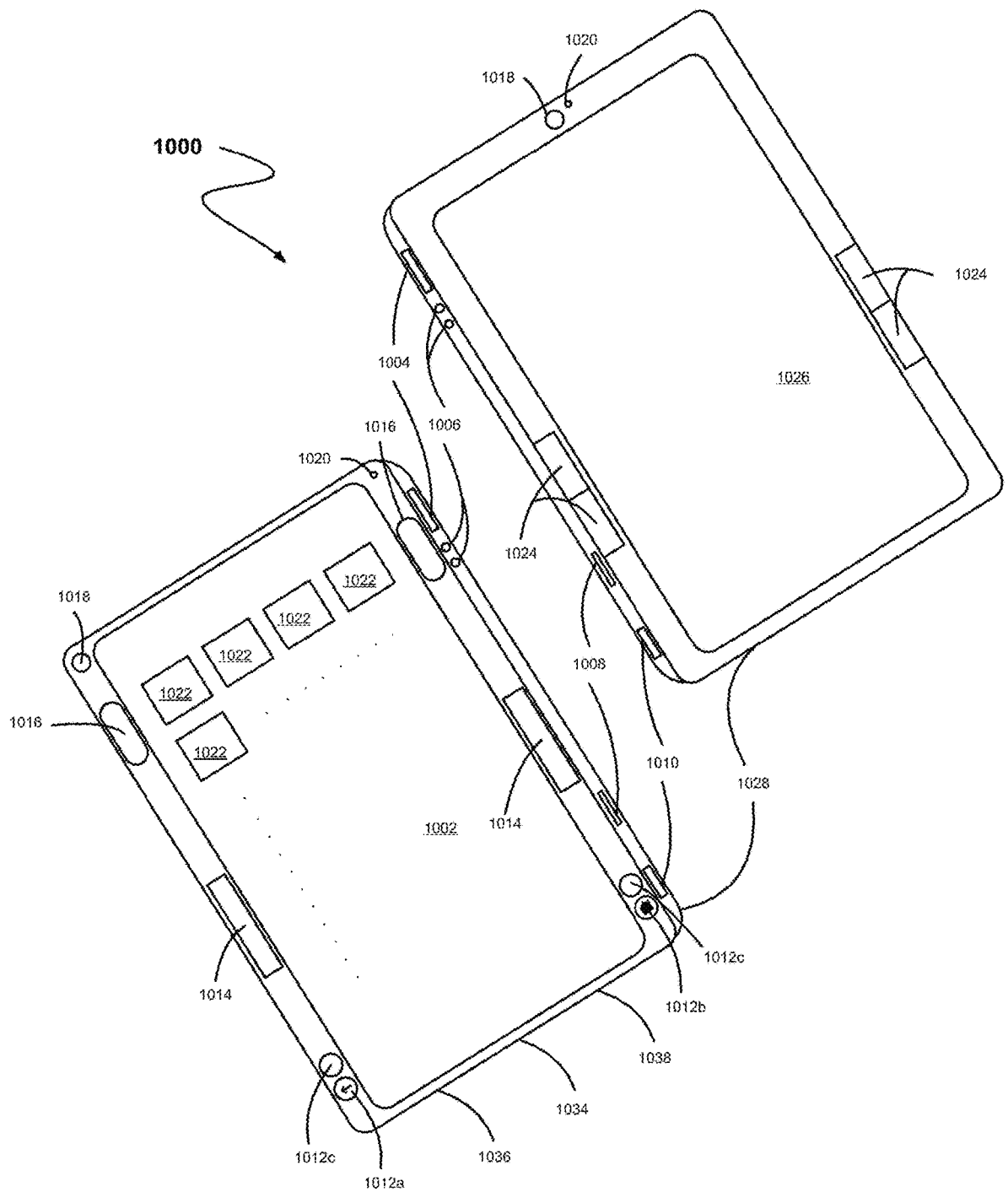
FIG. 10 illustrates a tablet apparatus having a first backlit touchscreen display and a second e-ink display, in accordance with another possible embodiment.

FIG. 89-10 shows a viewer interface, in accordance with another embodiment.

DETAILED DESCRIPTION

Figure 1:
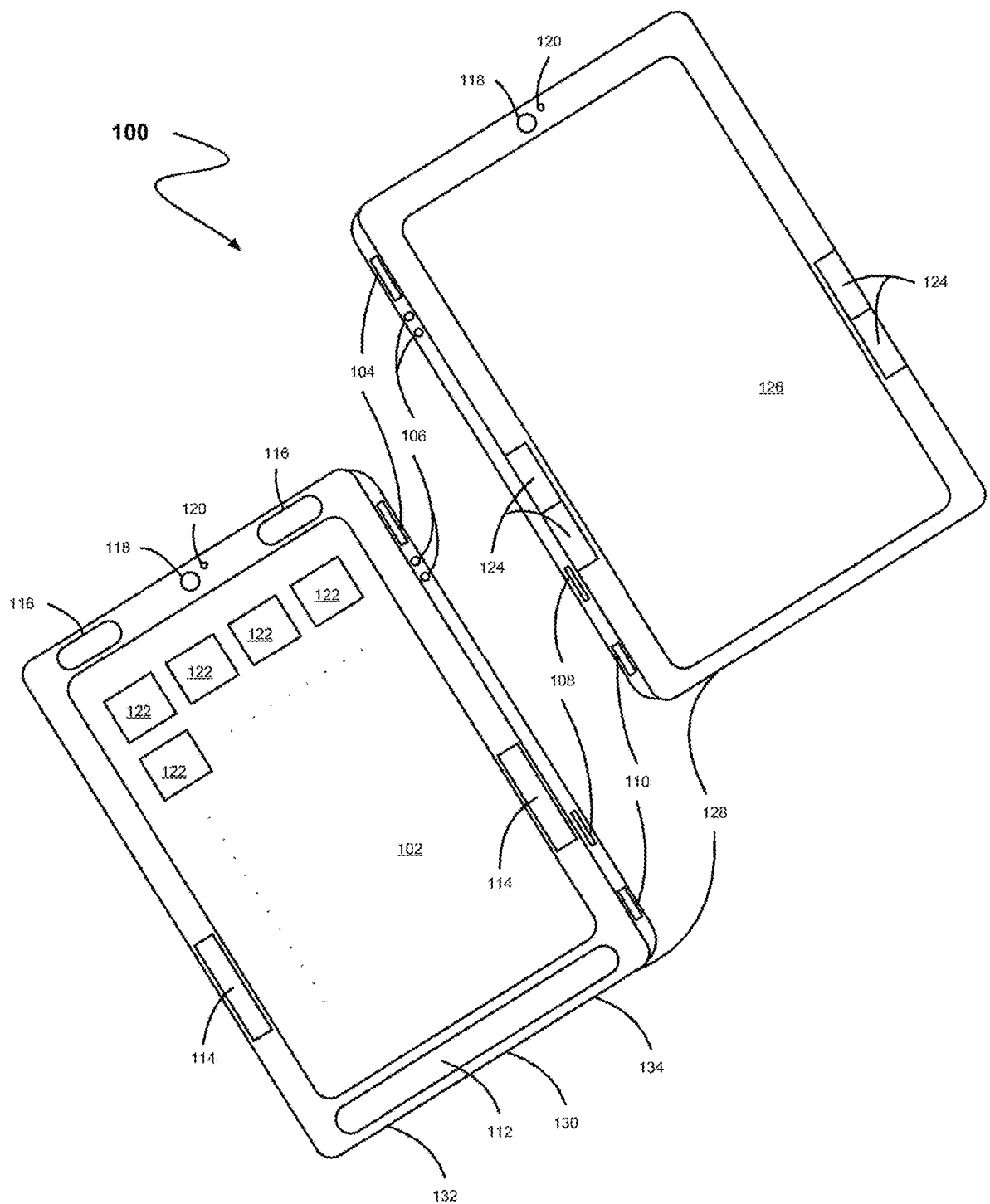
FIG. 1 illustrates a tablet apparatus, in accordance with another possible embodiment.

FIG. 1 illustrates a tablet apparatus 100, in accordance with one embodiment. As an option, the apparatus 100 may be implemented in the context of the architecture and environment of any subsequent Figure(s). Of course, however, the apparatus 100 may be implemented in any desired environment.

As shown, a tablet housing 128 is included. A first backlit touchscreen display 102 positioned on a first face of the tablet housing is included. Additionally, a second electronic ink (e-ink) display 126 is positioned on a second face of the tablet housing.

In the context of the present description, a tablet housing refers to any structure that is capable of supporting and/or enclosing a tablet. For example, in various embodiments, the tablet housing may include, but is not limited to, textured or otherwise tactile features to enhance gripping by a human user. Additionally, the tablet housing may be of one-piece construction, or may be assembled from a plurality of sub-components or sub-portions. Further, in the context of the present description, a tablet refers to a portable computer equipped with a touchscreen. For example, in one embodiment, the tablet may include a personal digital assistant (PDA), a laptop personal computer with a rotatable touchscreen, a tablet computer (e.g. Apple i-pad, Microsoft Slate, etc.), and/or any other portable computer equipped with a touchscreen. In another embodiment, at least one of the first backlit touchscreen display or the second e-ink display may be inset in the tablet housing to prevent damage thereto.

In the context of the present description, a touchscreen display refers to a display which may receive a touch input. For example, the touchscreen display may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen. Additionally, the touchscreen display may use LCD (liquid crystal display) technology, or LPD (light emitting polymer display) technology, although other display technologies may be used in other embodiments.

Further, in the context of the present description, an e-ink display refers to any display which is bi-stable. In the context of the present description, bi-stable refers to being capable of holding text or other rendered images even when very little or no power is supplied to the display. In one embodiment, the e-ink display may include a display that has a resolution 150 dpi or better. In another embodiment, the e-ink display may include any technology which may exhibit high contrast, or contrast substantially equal to that of print on paper. For example, the e-ink display may include displays such as bi-stable LCDs, MEMS, cholesteric, pigmented electrophoretic, E Ink-brand display, etc. Further, in one embodiment, the e-ink display may display visual content in black-and-white or grayscale. In some embodiments, the e-ink display may display visual content in color.

In one embodiment, the apparatus 100 may include a touchscreen display 102, an e-ink display 126, a first button 104 for executing a command, volume adjustment button(s) 106, an external media card slot 108, a second button 110 for executing a command, a headset jack 134, a docking/charging external port 130, a microphone 132, a panel of touch sensitive buttons 112, one or more touch sensitive sensor(s) 114, one or more speaker(s) 116, one or more optical sensor(s) 118, one or more proximity sensor(s) 120, one or more applications 122, and one or more operational tools 124. In one embodiment, the foregoing components may be positioned as depicted in FIG. 1, and, in other embodiments, they may be positioned differently (e.g. in different locations of the face shown, on a different face, removed altogether, etc.).

In the context of the present description, a panel of touch-sensitive buttons refers to a touch sensitive button for activating or deactivating particular functions. For example, in some embodiments, the touch-sensitive button may include a home button, a back button, a menu option button, or any other programmable function. In other embodiments, the panel of touch sensitive buttons may be a touch-sensitive area of the device that, unlike the touchscreen, does not display visual output.

In the context of the present description, a touch sensitive sensor refers to a touch sensor which is programmable to more than one particular function. For example, in one embodiment, the sensor may function as a fingerprint reader, a programmable button (e.g. a button to launch a program, take a photo, etc.), a touchscreen displaying visual output (e.g. game console is displayed when playing a game, music controls are displayed when playing music, etc.), etc. Additionally, the sensor may be programmed to function in response to application commands (e.g. game function commands), tablet system controls (e.g. brightness settings, etc.), login verification process (e.g. authentication user), or in response to any input by the user.

In the context of the present description, an optical sensor refers to a sensor which converts an optical image into an electronic signal. For example, the optical sensor may function as a camera, video camera, motion detector, etc. Additionally, in the context of the present description, a proximity sensor refers to a sensor which detects the presence of an object or motion detection. For example, the proximity sensor may include sensing when a device is placed near a user's ear (e.g., when the user is making a phone call, etc.), is enclosed within a case, when a user is using a device, and/or when the device comes in close proximity to another object.

In the context of the present description, a control operational tool refers to a mechanical tool for activating or deactivating particular functions. For example, in one embodiment, the control buttons may include a power on/off, menu selection capabilities, volume control, brightness/contrast functionality, or page forward/backward functionality, and/or any other functionality that can be programmed to the tool.

More illustrative information will now be set forth regarding various optional architectures and features with which the foregoing techniques discussed in the context of any of the present or subsequent figure(s) may or may not be implemented, per the desires of the user. For instance, various optional examples and/or options associated with the tablet housing 128, the first backlit touchscreen display positioned on a first face of the tablet housing 102, the second e-ink display positioned on a second face of the tablet housing 126, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion other features described.

Figure 2:
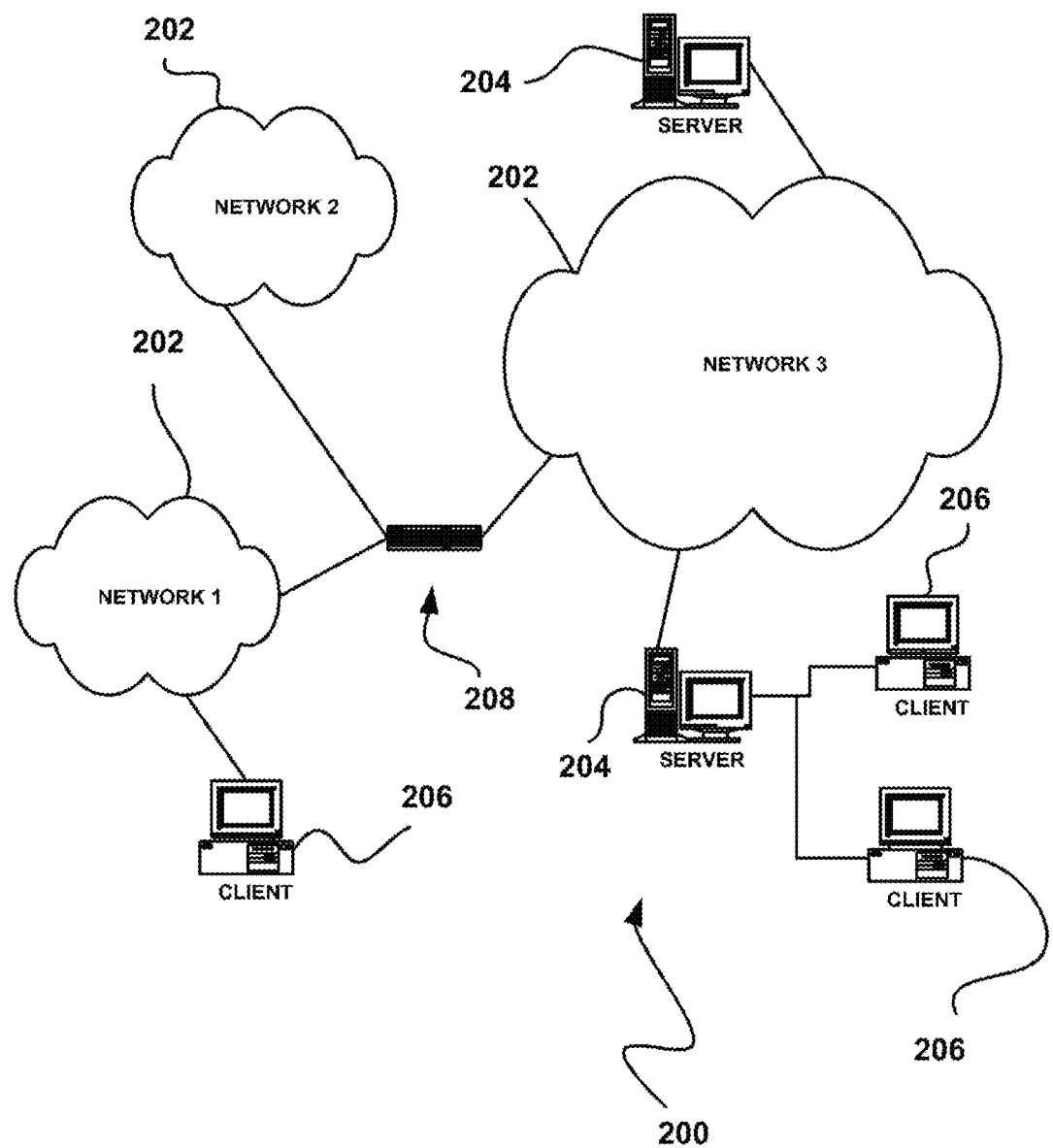
FIG. 2 illustrates a network architecture, in accordance with another possible embodiment.

FIG. 2 illustrates a network architecture 200, in accordance with one embodiment. As shown, a plurality of networks 202 is provided. In the context of the present network architecture 200, the networks 202 may each take any form including, but not limited to a local area network (LAN), a wireless network, a wide area network (WAN) such as the Internet, peer-to-peer network, etc.

Coupled to the networks 202 are servers 204 which are capable of communicating over the networks 202. Also coupled to the networks 202 and the servers 204 is a plurality of clients 206. Such servers 204 and/or clients 206 may each include a desktop computer, tablet computer, e-ink reader, lap-top computer, hand-held computer, mobile phone, personal digital assistant (PDA), peripheral (e.g. printer, etc.), any component of a computer, and/or any other type of logic. In order to facilitate communication among the networks 202, at least one gateway 208 is optionally coupled therebetween.

Figure 3:
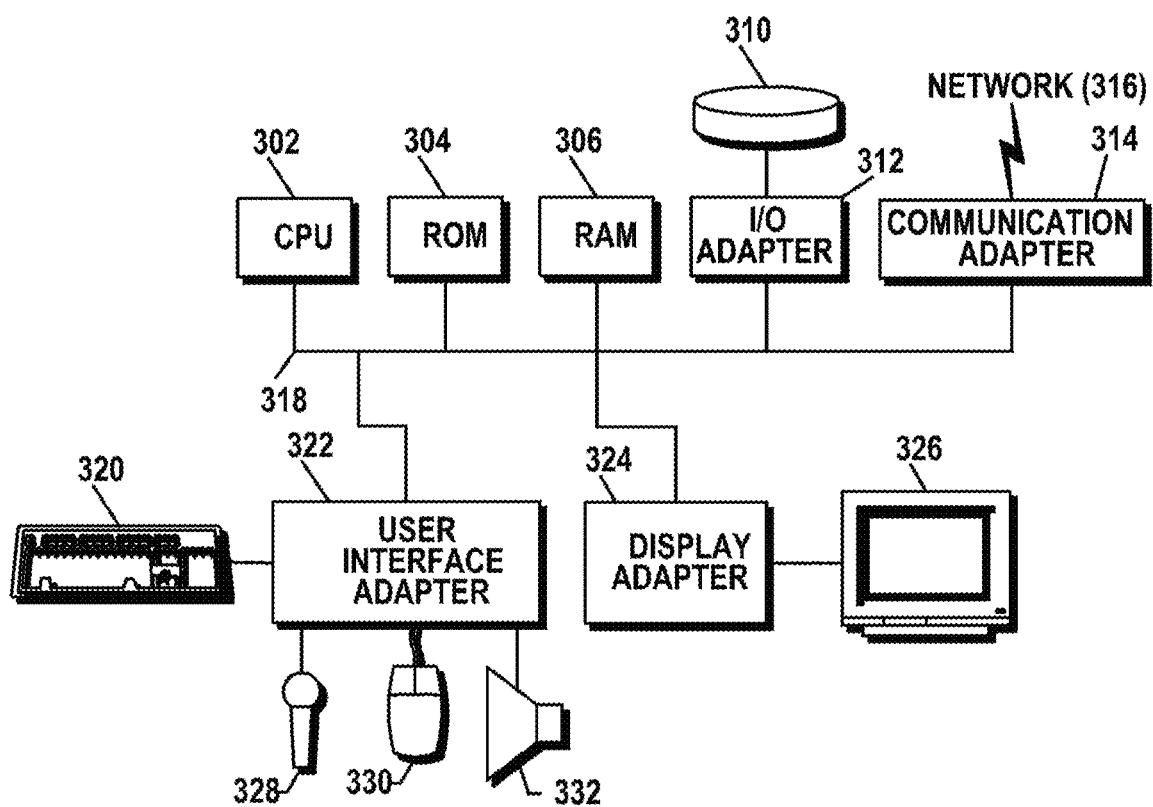
FIG. 3 shows a representative hardware environment that may be associated with the servers and/or clients of FIG. 2, in accordance with one embodiment.

FIG. 3 shows a representative hardware environment that may be associated with the servers 204 and/or clients 206 of FIG. 2, in accordance with one embodiment. Such figure illustrates a typical hardware configuration a workstation in accordance with one embodiment having a central processing unit 302, such as a microprocessor, and a number of other units interconnected via a system bus 318.

The workstation shown in FIG. 3 includes a Random Access Memory (RAM) 306, Read Only Memory (ROM) 304, an I/O adapter 312 for connecting peripheral devices such as disk storage units 310 to the bus 318, a user interface adapter 322 for connecting a keyboard 320, a mouse 330, a speaker 332, a microphone 328, and/or other user interface devices such as a touch screen (not shown) to the bus 318, communication adapter 314 for connecting the workstation to a communication network 316 (e.g., a data processing network) and a display adapter 324 for connecting the bus 318 to a display device 326. Computer programs, or computer control logic algorithms, may be stored in the disk storage units 310.

The workstation may have resident thereon any desired operating system. It will be appreciated that an embodiment may also be implemented on platforms and operating systems other than those mentioned. One embodiment may be written using JAVA, C, Objective C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

FIG. 4 illustrates a tablet apparatus 400, in accordance with one embodiment. As an option, the apparatus 400 may be implemented in the context of the architecture and environment of the previous Figures or any subsequent Figure(s). Of course, however, the apparatus 400 may be implemented in any desired environment. It should also be noted that the aforementioned definitions may apply during the present description.

As shown, a tablet housing 428 is included. A first backlit touchscreen display 402 positioned on a first face of the tablet housing is included. Additionally, a second e-ink display 426 positioned on a second face of the tablet housing is included.

In one embodiment, the apparatus 400 may include, but is not limited to, the touchscreen display 402, the e-ink display 426, a first button 404 for executing a command, volume adjustment button(s) 406, an external media card slot 408, a second button 410 for executing a command, a headset jack 438, a docking/charging external port 434, a microphone 436, a panel of touch sensitive buttons 412, one or more touch sensitive sensor(s) 414, one or more speaker(s) 416, one or more optical sensor(s) 418, one or more proximity sensor(s) 420, one or more applications 422, one or more operational tools 424, and a touchscreen panel 430. In one embodiment, the foregoing components may be positioned as depicted in FIG. 4, and, in other embodiments, they may be positioned differently (e.g. in different locations of the face shown, on a different face, removed altogether, etc.).

In one embodiment, the touchscreen display may have a resolution in excess of 100 dpi. The user may make contact with the touchscreen display using any suitable object or appendage, such as a stylus, a finger, a pen, etc. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In use, the first button 404 may be adapted for executing a command. In one embodiment, the first button 404 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. Furthermore, in one embodiment, depressing the first button 404 while pressing another button may function to execute a command. In various embodiments, such command may include a screen capture command, a command to record a video, a command to take a picture, a command to record audio, a short-cut command, and/or various other commands.

As shown, the apparatus may include a second button for executing a command. In a further embodiment, the second button may be used to take a picture, activate an application, implement a predefined state of settings, and/or execute any preconfigured command.

In another embodiment, the optical sensor 418 may include charge-coupled device (CCD) or complementary metal-oxide semiconductor (CMOS) phototransistors. The optical sensor receives light from the environment, projected through one or more lens, and converts the light to data representing an image. As such, the optical sensor may capture still images or video.

In some embodiments, a second optical sensor may optionally be located on the second face of the tablet housing so that the touchscreen display may be used as a viewfinder for either still and/or video image acquisition. In some embodiments, an optical sensor is located on the first face (e.g. front of the apparatus) so that the user's image may be obtained for videoconferencing while the user views the other video conference participants on the touch screen display. In some embodiments, the position the optical sensor may be changed by the user (e.g., by rotating the lens and the sensor in the device housing) so that a single optical sensor may be used along with the touch screen display for both video conferencing and still and/or video image acquisition.

Additionally, in another embodiment, the proximity sensors 420 may turn off and disable the touchscreen display or the second e-ink display. For example, the proximity sensor may include sensing when a device is placed near a user's ear (e.g., when the user is making a phone call, etc.), is enclosed within a case, when a user is using a device, and/or when the device comes in close proximity to another object. In another embodiment, the proximity sensor may be used to activate and turn on the touchscreen display or the second e-ink display.

In another embodiment, the apparatus may also include one or more accelerometers (not shown). In the context of the present description, an accelerometer refers to an instrument that measures acceleration. In one embodiment, once the accelerometer detects a movement of the apparatus, a moving direction may be determined based on the movement data provided by the accelerometer. In the context of the present description, a moving direction may refer to a moving vector or an acceleration vector. In the context of the present description, a moving vector may refer to any change in position of an object, and an acceleration vector may refer the rate of change of both the magnitude and the direction velocity with time.

The moving direction and/or the movement data may be provided to a software component (e.g., application software) executed within the apparatus. In response to the detection of the movement of the apparatus, the corresponding software component may perform one or more predetermined user configurable actions. For example, predetermined user configurable actions may include advancing a page of a document, rotating the orientation the apparatus, activating or deactivating the second e-ink display, and/or activating or deactivating the first touchscreen display, etc. Such predetermined user configurable actions may be based on the moving direction and/or movement data provided by the accelerometer.

Additionally, in another embodiment, an accelerometer of a portable device may constantly or periodically monitor the movement of the apparatus. For example, in response to the detection, a moving direction may be determined based on the movement data provided by the accelerometer. Additionally, appropriate components of the apparatus, such as, firmware, motion software, and/or applications may be notified. For example, the components may be notified via an interrupt or by pulling one or more registers of the accelerometer. In addition, an orientation the portable device after the movement may also be determined. As a result, information may be displayed on the touchscreen display in a portrait view or a landscape view based on an analysis of data received from the one or more accelerometers.

In various embodiments, applications 422 may include the following modules (or sets of instructions), or a subset or superset thereof: a contacts module (sometimes called an address book or contact list); a telephone module; a video conferencing module; an e-mail client module; an instant messaging (IM) module; a blogging module; a camera module for still and/or video images; an image management module video player module; a music player module; a browser module; a calendar module; widget modules, which may include weather widget, stocks widget, calculator widget, alarm clock widget, dictionary widget, and other widgets obtained by the user, as well as user-created widgets; widget creator module for making user-created widgets; search module; video and music player module, which merges video player module and music player module; notes module; and/or map module; and/or online video module. In another embodiment, examples of other applications include other word processing applications, JAVA-enabled applications, encryption, digital rights management, voice recognition, and voice replication. Of course, any program and/or set of instructions may be an application which is tailored to a user.

In further embodiments, the operational tools 424 may be configured to support many diverse operations. For example, the control operational tool(s) may enable the user to flip through pages, skip chapters, operate the second e-ink display, or scroll through content on the second e-ink display. In another embodiment, the control operational tool(s) may enable the user to activate content on the first backlit touchscreen, display content on the first backlit touchscreen, or otherwise control some aspect on the first backlit touchscreen. The control operational tool(s) may be implemented in many forms. For example, the control operational tool(s) may be in the form of a scroll wheel, a thumb wheel, a thumb stick, a sensor that detects and registers movement of a user's thumb or finger, a button, a touchscreen, or any other user input mechanism.

In one embodiment, the control operational tool(s) may function as a page turner to facilitate the turning of pages of an electronic book. The page turner may be configured to simulate a tactile riffle feel as the user flips pages in a book. In another embodiment, the control operational tool(s) may be configured as a page turning mechanism having a tactile member (e.g., a ridge or indentation) juxtaposed with one or more sensors, and sized to accommodate a user's thumb or finger. The tactile member may provide the tactile feedback to the user to simulate the riffle sensation. Additionally, the sensors may detect speed and direction the user's thumb or finger, thereby enabling the device to detect gestures of flipping forward or backward through one or more pages of the book. In various embodiments, the control operational tool(s) may be located in any location on the apparatus.

In the context of the present description, a touchscreen panel may refer to a panel which receives a touch input. For example, the touchscreen panel may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen. Additionally, the touchscreen panel may use LCD (liquid crystal display) technology, or LPD (light emitting polymer display) technology, although other display technologies may be used in other embodiments. Further, the touchscreen panel may function as an input device (such as a keyboard), an interactive display showing content from the first backlit touchscreen display, a display for browsing the internet, or any other type of display device which may engage a user and which may receive an input from a user.

In some implementations, the control operational tool(s) may be operative as a selection tool. In another embodiment, the touchscreen panel may also be used to select content without interacting with the control operational tool(s). In an alternative embodiment, the apparatus also may accept verbal input for activation or deactivation some functions through the microphone 436. For example, the microphone may be used as a selection tool.

In another embodiment, the audio circuitry (not shown), the one or more speaker(s), and the microphone may provide an audio interface between a user and the apparatus. The audio circuitry may receive audio data from a user interface adapter may convert the audio data to an electrical signal, and may transmit the electrical signal to the one or more speaker(s). The one or more speaker(s) may convert the electrical signal to human-audible sound waves. The audio circuitry also may receive electrical signals converted by the microphone from sound waves. The audio circuitry may convert the electrical signal to audio data and may transmit the audio data to the user interface adapter for processing. Audio data may be retrieved from and/or transmitted to memory by the user interface adapter. In some embodiments, the audio circuitry also may include a headset jack. The headset jack may provide an interface between the audio circuitry and removable audio input/output peripherals, such as output-only headphones or a headset with both output (e.g., a headphone for one or both ears) and input (e.g., a microphone).

In one embodiment, the touchscreen display may present content in a human-readable format to the user. For example, the content presented in the touchscreen display may take the form of electronic books, newspapers, or other readable or viewable materials. In a further embodiment, the touchscreen display may provide the text of the electronic books and also may depict any illustrations, tables, or graphic elements that may be contained in the electronic books. In one implementation, the touchscreen display may employ display technology with a relatively slow refresh rate in exchange for a relatively low rate of power consumption. This tradeoff may serve to maximize battery life. Further, since the touchscreen display may be used to depict electronic books, the content is relatively static and hence a slow-refresh rate technology may be suitable for implementing the touchscreen display. In some implementations, the touchscreen display is not responsive to user input.

In another embodiment, the e-ink display may present content in a human-readable format to the user. For example, the content presented in the e-ink display may take the form of electronic books, newspapers, or other readable or viewable materials. In a further embodiment, the e-ink display may provide the text of the electronic books and also may depict any illustrations, tables, or graphic elements that may be contained in the electronic books. In one implementation, the e-ink display may employ display technology with a relatively slow refresh rate in exchange for a relatively low rate of power consumption. This tradeoff may serve to maximize battery life. Further, since the e-ink display may be used to depict electronic books, the content is relatively static and hence a slow-refresh rate technology may be suitable for implementing the e-ink display. In some implementations, the e-ink display is not responsive to user input. For example, the one or more operational tools or the touchscreen panel may be temporarily disabled.

In the context of the present description, the term "page" may refer to a collection content that is presented at one time. For example, a page may be a virtual frame of the content, or a visual display window presenting the content to the user. Additionally, a page may not be fixed permanently, in contrast to the pages of published "hard" books. In another embodiment, pages may be redefined or repaginated when, for example, the user chooses a different font or font size for displaying the content.

FIG. 5 illustrates a tablet apparatus 500 that is equipped with a navigation tool, in accordance with another embodiment. As an option, the apparatus 500 may be implemented in the context of the architecture and environment of the previous Figures or any subsequent Figure(s). Of course, however, the apparatus 500 may be implemented in any desired environment. It should also be noted that the aforementioned definitions may apply during the present description.

As shown, a tablet housing 528 is included. A first backlit touchscreen display 502 positioned on a first face of the tablet housing is included. Additionally, a second e-ink display 526 positioned on a second face of the tablet housing is included.

In one embodiment, the apparatus 500 may include, but is not limited to, a touchscreen display 502, an e-ink display 526, a first button 504 for executing a command, volume adjustment button(s) 506, an external media card slot 508, a second button 510 for executing a command, a headset jack 538, a docking/charging external port 534, a microphone 536, a panel of touch sensitive buttons 512, one or more touch sensitive sensor(s) 514, one or more speaker(s) 516, one or more optical sensor(s) 518, one or more proximity sensor(s) 520, one or more applications 522, one or more control operational tool(s) 524, a touchscreen panel 530, and a navigation tool 532. In one embodiment, the foregoing components may be positioned as depicted in FIG. 5, and, in other embodiments, they may be positioned differently (e.g. in different locations of the face shown, on a different face, removed altogether, etc.).

In the context of the present description, a navigation tool (e.g. navigation tool 532, etc.) may refer to any tool used to navigate a display. For example, the navigation tool may control a cursor on the e-ink display, be used to select an object, and/or cause menus to appear on the display. In one embodiment, the navigation tool may enable the user to flip through pages, skip chapters, operate the second e-ink display, or scroll through content on the second e-ink display. In another embodiment, the navigation tool may enable the user to activate content on the first backlit touchscreen, display content on the first backlit touchscreen, or otherwise control some aspect on the first backlit touchscreen.

As shown, the navigation tool 532 may be in the form of a squared four button formation with a center selection button. In another embodiment, the navigation tool may be implemented in many forms, including as a scroll wheel, a thumb wheel, a thumb stick, a sensor that detects and registers movement of a user's thumb or finger, a button, a touchscreen, or any other user input mechanism.

Figure 6:
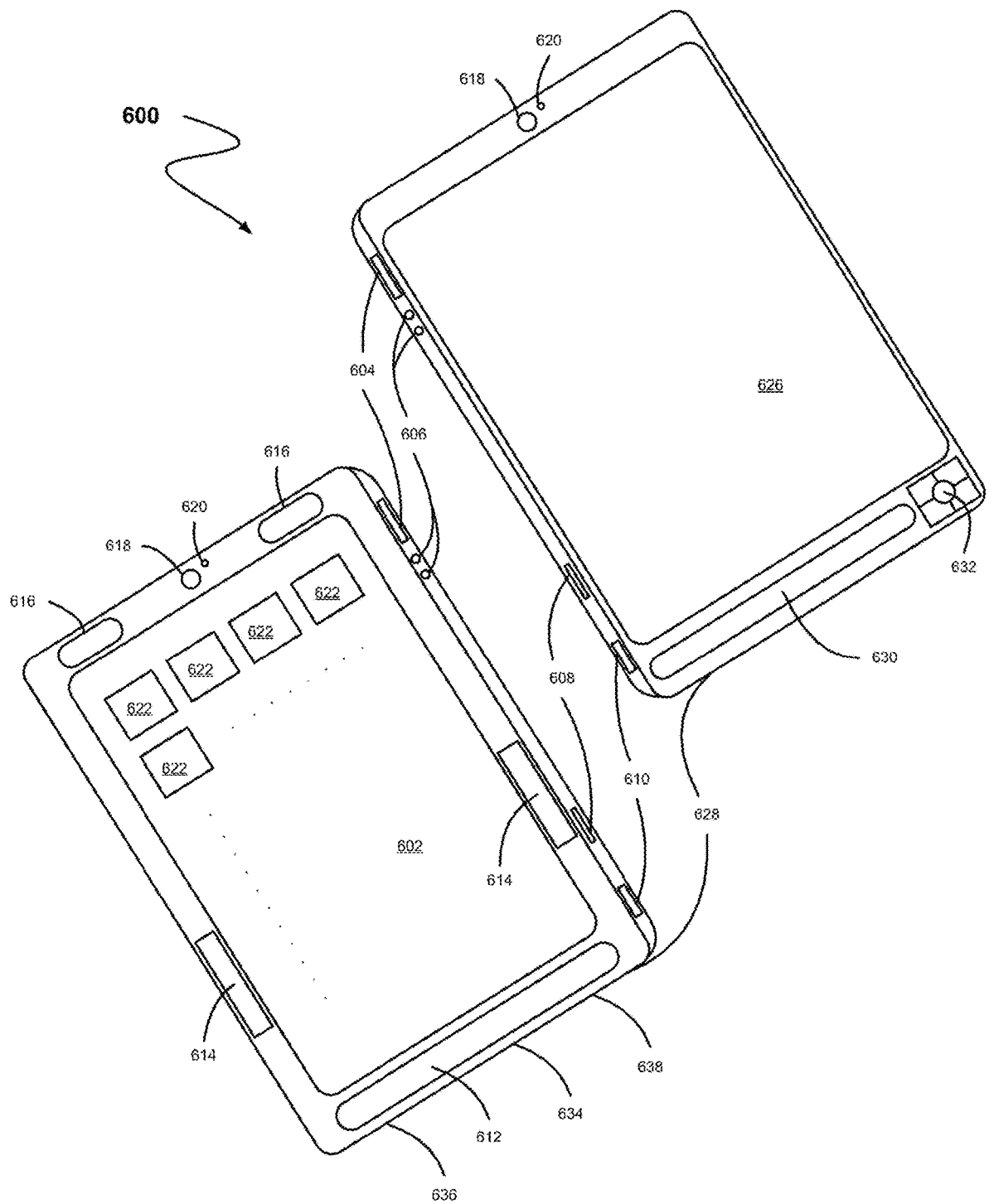
FIG. 6 illustrates a tablet apparatus having a first backlit touchscreen display and a second e-ink display, in accordance with another possible embodiment.

FIG. 6 illustrates a tablet apparatus 600 equipped with a tactile input surface, in accordance with one embodiment. As an option, the apparatus 600 may be implemented in the context of the architecture and environment of the previous Figures or any subsequent Figure(s). Of course, however, the apparatus 600 may be implemented in any desired environment. It should also be noted that the aforementioned definitions may apply during the present description.

As shown, a tablet housing 628 is included. A first backlit touchscreen display 602 positioned on a first face of the tablet housing is included. Additionally, a second e-ink display 626 positioned on a second face of the tablet housing is included.

In one embodiment, the apparatus 600 may include, but is not limited to, a touchscreen display 602, an e-ink display 626, a first button 604 for executing a command, volume adjustment button(s) 606, an external media card slot 608, a second button 610 for executing a command, a headset jack 638, a docking/charging external port 634, a microphone 636, a panel of touch sensitive buttons 612, one or more touch sensitive sensor(s) 614, one or more speaker(s) 616, one or more optical sensor(s) 618, one or more proximity sensor(s) 620, one or more applications 622, a tactile input surface 630, and a navigation tool 632. In one embodiment, the foregoing components may be positioned as depicted in FIG. 6, and, in other embodiments, they may be positioned differently (e.g. in different locations of the face shown, on a different face, removed altogether, etc.).

In the context of the present description, a tactile input surface (e.g. tactile input surface 630, etc.) refers to a surface which may receive a touch input. For example, the tactile input surface may be composed of ridges or indentations, a smooth surface, a pressure sensitive surface, or any type of surface which can receive a touch input. The tactile input surface may receive a touch input in the form of a finger swiping, pressing, or holding the surface. In one embodiment, the tactile input surface may be used to flip through pages, skip chapters, and/or navigate among menus and options.

In another embodiment, the one or more optical sensor 618 may be used as a motion sensor device to control functionality associated with the touchscreen display or the e-ink display. For example, a user may control flipping through pages by hand motions and strokes sensed by the one or more optical sensor. In one embodiment, the optical sensor may track the user's motions to control a digital object or to perform functions. In another embodiment, the optical sensor may be activated by the one or more proximity sensor(s). As such, the one or more proximity sensor(s) may help to conserve battery power by restricting when the optical sensor is used. Additionally, the sensitivity of the one or more proximity sensor(s) may be controlled based on the application that is being used.

FIG. 7 illustrates a tablet apparatus 700 having a tablet housing, a first backlit touchscreen display positioned on a first face of the tablet housing, and a second e-ink display positioned on a second face of the tablet housing, in accordance with one embodiment. As an option, the apparatus 700 may be implemented in the context of the architecture and environment of the previous Figures or any subsequent Figure(s). Of course, however, the apparatus 700 may be implemented in any desired environment. It should also be noted that the aforementioned definitions may apply during the present description.

As shown, a tablet housing 728 is included. A first backlit touchscreen display 702 positioned on a first face of the tablet housing is included. Additionally, a second e-ink display 726 positioned on a second face of the tablet housing is included.

In one embodiment, the apparatus 700 may include, but is not limited to, a touchscreen display 702, an e-ink display 726, a first button 704 for executing a command, volume adjustment button(s) 706, an external media card slot 708, a second button 710 for executing a command, a headset jack 738, a docking/charging external port 734, a microphone 736, a panel of touch sensitive buttons 712, one or more touch sensitive sensor(s) 714, one or more speaker(s) 716, one or more optical sensor(s) 718, one or more proximity sensor(s) 720, one or more applications 722, a navigation tool 730, and a command tool 732. In one embodiment, the foregoing components may be positioned as depicted in FIG. 7, and, in other embodiments, they may be positioned differently (e.g. in different locations of the face shown, on a different face, removed altogether, etc.).

In the context of the present description, a command tool (e.g. command tool 732, etc.) refers to a tool which may be used to execute a command. For example, the command tool may be used to select and highlight text, magnify the text on the e-ink display, change the text on the e-ink display, etc. In one embodiment, the command tool may work in conjunction with the navigation tool, or any other tool or sensor, to facilitate making selections or any other function.

As shown, at least one touch sensitive sensor 714 may be found on the second face of the apparatus. The touch sensitive sensor may facilitate navigating the e-ink display, including setting the size of the text, turning a page of the text, or scrolling through a page or browser. In one embodiment, the touch sensitive sensor may include functioning as a fingerprint reader, a programmable button, and/or a touchscreen displaying visual output. Additionally, the sensor may function in response to application commands (e.g. game function commands), tablet system controls (e.g. brightness settings, etc.), login verification process (e.g. authentication user), or in response to any input by the user.

In some embodiments, an accelerometer (not shown) may be used to control functionality of the touchscreen display and/or the e-ink display. For example, the accelerometer may track the movement data (e.g., X, Y, and Z axis) of the apparatus. The accelerometer may send such information to a controller (not shown) which may calculate the moving vector of the movement based on the movement data. The moving vector can then be used by the touchscreen display to control a user's actions in a game, to cause a page to turn, to put objects on the screen in perspective, etc. The moving vector can also be used by the e-ink display to cause a page to turn, to skip a chapter, or any further functionality that can be programmed to a specific user movement. In the context of the present description, a moving direction may refer to a moving vector or an acceleration vector. In the context of the present description, a moving vector may refer to any change in position an object, and an acceleration vector may refer the rate of change of both the magnitude and the direction velocity with time.

FIG. 8 illustrates a tablet apparatus 800 having a tablet housing, a first backlit touchscreen display positioned on a first face of the tablet housing, and a second e-ink display positioned on a second face of the tablet housing, in accordance with one embodiment. As an option, the apparatus 800 may be implemented in the context of the architecture and environment of the previous Figures or any subsequent Figure(s). Of course, however, the apparatus 800 may be implemented in any desired environment. It should also be noted that the aforementioned definitions may apply during the present description.

As shown, a tablet housing 828 is included. A first backlit touchscreen display 802 positioned on a first face of the tablet housing is included. Additionally, a second e-ink display 826 positioned on a second face of the tablet housing is included.

In one embodiment, the apparatus 800 may include, but is not limited to, a touchscreen display 802, an e-ink display 826, a first button 804 for executing a command, volume adjustment button(s) 806, an external media card slot 808, a second button 810 for executing a command, a headset jack 838, a docking/charging external port 834, a microphone 836, a panel of touch sensitive buttons 812, one or more touch sensitive sensor(s) 814, one or more speaker(s) 816, one or more optical sensor(s) 818, one or more proximity sensor(s) 820, one or more applications 822, one or more control operational tool(s) 824, a touchpad 830, a keyboard 826, a third button for executing a command 828, and at least one selection button 832. In one embodiment, the foregoing components may be positioned as depicted in FIG. 8, and, in other embodiments, they may be positioned differently (e.g. in different locations of the face shown, on a different face, removed altogether, etc.).

In the context of the present description, a touchpad refers to a screen used to control navigating on a display. For example, a touch initiated control function may be used to move an object or perform an action on a display or to make selections or issue commands associated with the application. In one embodiment, the touchpad may be arranged to receive input from a finger moving over the touchpad surface in order to implement the touch initiated control function. In another embodiment, tapping a finger on the touch surface may initiate a control function, similar to a select function. Further, the touchpad may be used to receive multiple inputs simultaneously. In another embodiment, a user may use more than one finger to add greater functionality to the touchpad. For example, a two finger swipe may indicate skipping to the next chapter, whereas two fingers separating may cause magnification the text.

In one embodiment, the third button 828 may be used to power on/off the touchpad, implement a predefined state of settings, and/or execute any preconfigured command. As such, the third button may be used to help conserve the power of the apparatus by disabling power when it may not be needed.

In another embodiment, the at least one selection button(s) 832 may be used to select an object being displayed on the e-ink display. For example, using the touchpad, the user may navigate to objects and use the at least one selection button(s) to select the object. In another embodiment, the at least one selection button(s) may be configured to execute a command. For example, one of the selection buttons may be used to bring up a list of options associated with an object, and another selection button may be configured to execute the selection. In a further embodiment, the length of depressed time of the selection button(s) may be associated with additional functionality. For example, depressing a selection button for a predetermined amount of time may cause the display to undo the last object selection, to bring up a menu of commands, to highlight the selected object, to email the object to a contact, and/or any further preconfigured command associated with the selection button.

In some embodiments, the keyboard 826 may include a plurality of keys. As shown, the keyboard may include at least 26 alphabet keys arranged in a QWERTY format as well as other function keys (such as space bar, control keys, function keys, and so forth). In another embodiment, the keyboard may include other arrangements of the 26 alphabet keys that do not conform to the QWERTY layout. The keys may be separated into two groups including a first or left-side group of keys and a second or right-side group of keys. In one embodiment, the key groups are separated by the touchpad. Additionally, individual keys may be sized to accommodate a user's thumb or finger. In further embodiments, the orientation the keys of the keyboard facilitates ergonomic operation by a user's thumbs when the user may grasp the two lower corners of the apparatus with two hands.

As shown, the control operational tool 824 may be in more than one form. For example, the control operational tool(s) may be in the form of a scroll wheel, a thumb wheel, a thumb stick, a sensor that detects and registers movement of a user's thumb or finger, a button, a touchscreen, or any other user input mechanism. In another embodiment, the control operational tool(s) may enable the user to activate content on the first backlit touchscreen, display content on the first backlit touchscreen, or otherwise control some aspect on the first backlit touchscreen.

FIG. 9 illustrates a tablet apparatus 900 having a tablet housing, a first backlit touchscreen display positioned on a first face of the tablet housing, and a second e-ink display positioned on a second face of the tablet housing, in accordance with one embodiment. As an option, the apparatus 900 may be implemented in the context of the architecture and environment of the previous Figures or any subsequent Figure(s). Of course, however, the apparatus 900 may be implemented in any desired environment. It should also be noted that the aforementioned definitions may apply during the present description.

As shown, a tablet housing 928 is included. A first backlit touchscreen display 902 positioned on a first face of the tablet housing is included. Additionally, a second e-ink display 926 positioned on a second face of the tablet housing is included.

In one embodiment, the apparatus 900 may include, but is not limited to, a touchscreen display 902, an e-ink display 926, a first button 904 for executing a command, volume adjustment button(s) 906, an external media card slot 908, a second button 910 for executing a command, a headset jack 938, a docking/charging external port 934, a microphone 936, at least one touch sensitive button(s) 912a-c, one or more touch sensitive sensor(s) 914, one or more speaker(s) 916, one or more optical sensor(s) 918, one or more proximity sensor(s) 920, one or more applications 922, and one or more operational tools 924. In one embodiment, the foregoing components may be positioned as depicted in FIG. 9, and, in other embodiments, they may be positioned differently (e.g. in different locations of the face shown, on a different face, removed altogether, etc.).

In the context of the present description, at least one touch-sensitive button(s) 912a-c refers to a touch sensitive button for activating or deactivating at least one function. For example, the touch-sensitive button may include a home button 912b, a back button 912a, a menu option button, or any other programmable function 912c.

FIG. 10 illustrates a tablet apparatus 1000 having a tablet housing, a first backlit touchscreen display positioned on a first face of the tablet housing, and a second e-ink display positioned on a second face of the tablet housing, in accordance with one embodiment. As an option, the apparatus 1000 may be implemented in the context of the architecture and environment of the previous Figures or any subsequent Figure(s). Of course, however, the apparatus 1000 may be implemented in any desired environment. It should also be noted that the aforementioned definitions may apply during the present description.

As shown, a tablet housing 1028 is included. A first backlit touchscreen display positioned 1002 on a first face of the tablet housing is included. Additionally, a second e-ink display 1026 positioned on a second face of the tablet housing is included.

In one embodiment, the apparatus 1000 may include, but is not limited to, a touchscreen display 1002, an e-ink display 1026, a first button 1004 for executing a command, volume adjustment button(s) 1006, an external media card slot 1008, a second button 1010 for executing a command, a headset jack 1038, a docking/charging external port 1034, a microphone 1036, at least one touch sensitive button(s) 1012a-c, one or more touch sensitive sensor(s) 1014, one or more speaker(s) 1016, one or more optical sensor(s) 1018, one or more proximity sensor(s) 1020, one or more applications 1022, and one or more operational tools 1024. In one embodiment, the foregoing components may be positioned as depicted in FIG. 10, and, in other embodiments, they may be positioned differently (e.g. in different locations of the face shown, on a different face, removed altogether, etc.).

As shown, positioning of the one or more optical sensor 1018, the one or more proximity sensor(s) 1020, and/or the one or more speaker(s) 1016 may be changed. In one embodiment, the one or more optical sensor 1018, the one or more proximity sensor(s) 1020, and/or the one or more speaker(s) 1016 may be located on the top of the apparatus display, on the sides of the apparatus display, or in any other location on the apparatus.

Figure 11:
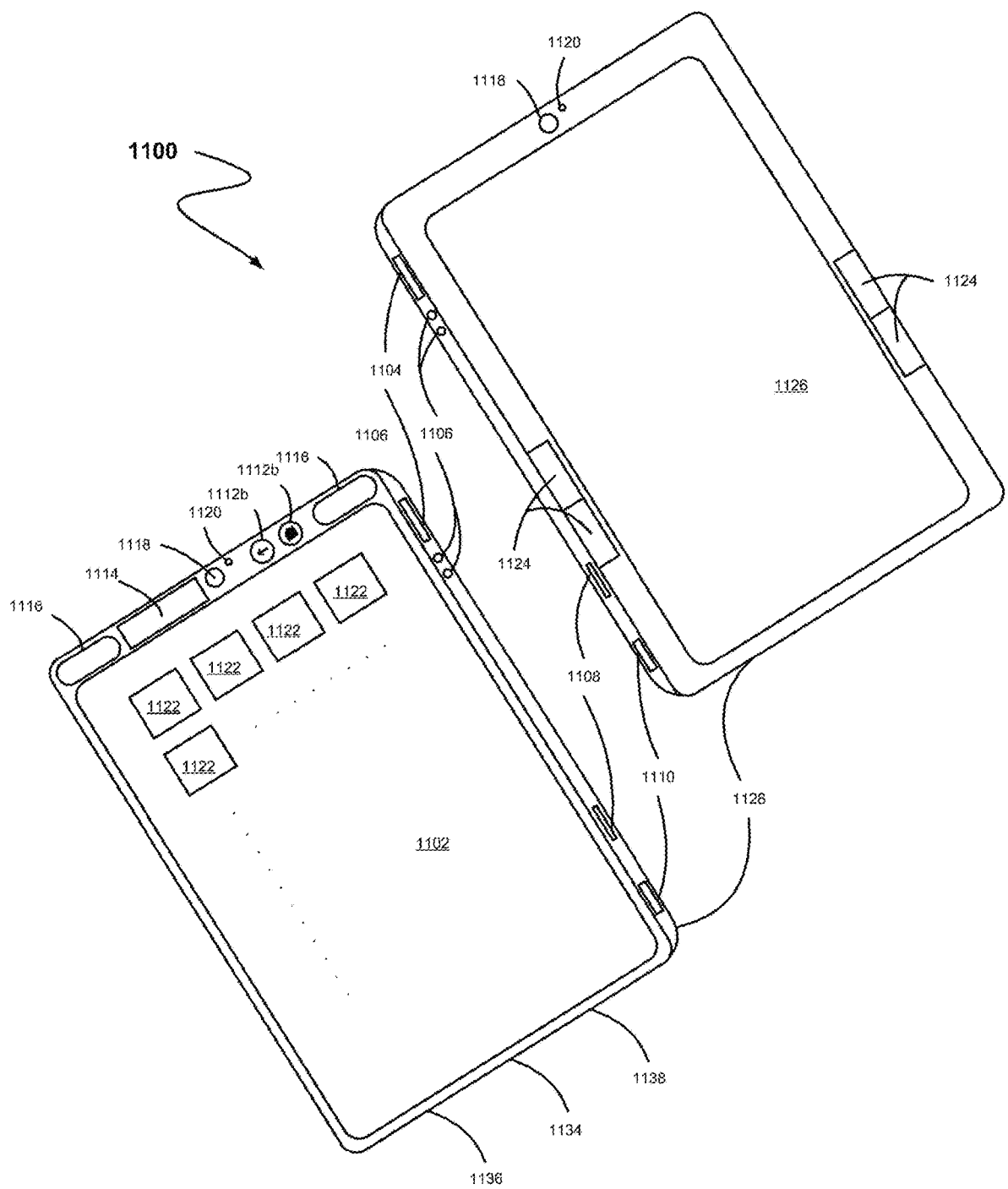
FIG. 11 illustrates a tablet apparatus having a first backlit touchscreen display and a second e-ink display, in accordance with another possible embodiment.

FIG. 11 illustrates a tablet apparatus 1100 having a tablet housing, a first backlit touchscreen display positioned on a first face of the tablet housing, and a second e-ink display positioned on a second face of the tablet housing, in accordance with one embodiment. As an option, the apparatus 1100 may be implemented in the context of the architecture and environment of the previous Figures or any subsequent Figure(s). Of course, however, the apparatus 1100 may be implemented in any desired environment. It should also be noted that the aforementioned definitions may apply during the present description.

As shown, a tablet housing 1128 is included. A first backlit touchscreen display 1102 positioned on a first face of the tablet housing is included. Additionally, a second e-ink display 1126 positioned on a second face of the tablet housing is included.

In one embodiment, the apparatus 1100 may include, but is not limited to, a touchscreen display 1102, an e-ink display 1126, a first button 1104 for executing a command, volume adjustment button(s) 1106, an external media card slot 1108, a second button 1110 for executing a command, a headset jack 1138, a docking/charging external port 1134, a microphone 1136, at least one touch sensitive button(s) 1112a-b, one or more touch sensitive sensor(s) 1114, one or more speaker(s) 1116, one or more optical sensor(s) 1118, one or more proximity sensor(s) 1120, one or more applications 1122, and one or more operational tools 1124. In one embodiment, the foregoing components may be positioned as depicted in FIG. 11, and, in other embodiments, they may be positioned differently (e.g. in different locations of the face shown, on a different face, removed altogether, etc.).

As shown, in one embodiment, positioning of the at least one touch sensitive button(s) 1112a-b and one or more touch sensitive sensor(s) 1114 may be changed. In one embodiment, the at least one touch sensitive button(s) 1112a-b and the one or more touch sensitive sensor(s) 1114 may be located on the top of the apparatus display, on the sides of the apparatus display, or in any other location on the apparatus.

Figure 12:
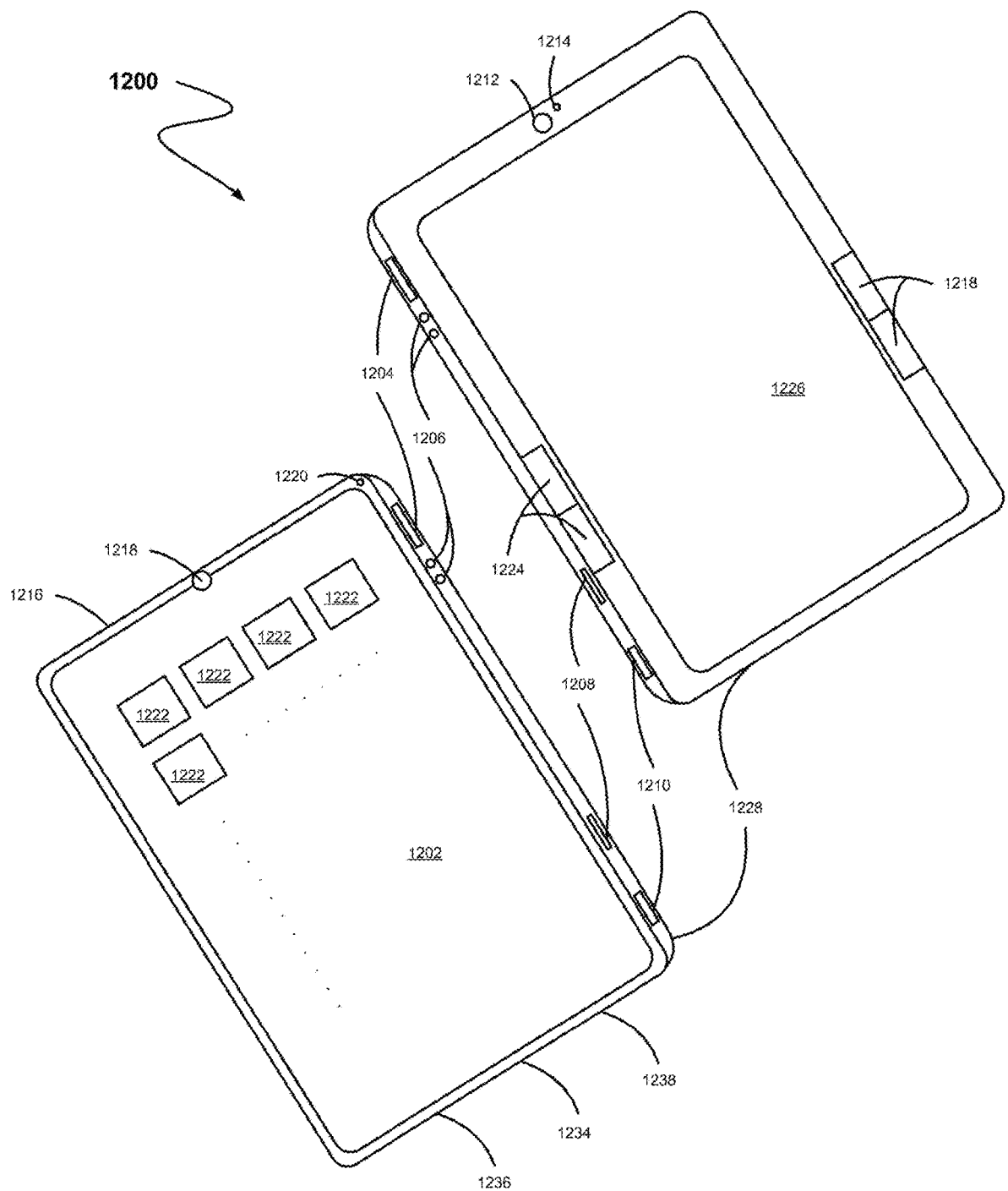
FIG. 12 illustrates a tablet apparatus having a first backlit touchscreen display and a second e-ink display, in accordance with another possible embodiment.

FIG. 12 illustrates a tablet apparatus 1200 having a tablet housing, a first backlit touchscreen display positioned on a first face of the tablet housing, and a second e-ink display positioned on a second face of the tablet housing, in accordance with one embodiment. As an option, the apparatus 1200 may be implemented in the context of the architecture and environment of the previous Figures or any subsequent Figure(s). Of course, however, the apparatus 1200 may be implemented in any desired environment. It should also be noted that the aforementioned definitions may apply during the present description.

As shown, a tablet housing 1228 is included. A first backlit touchscreen display 1202 positioned on a first face of the tablet housing is included. Additionally, a second e-ink display 1226 positioned on a second face of the tablet housing is included.

In one embodiment, the apparatus 1200 may include, but is not limited to, a touchscreen display 1202, an e-ink display 1226, a first button 1204 for executing a command, volume adjustment button(s) 1206, an external media card slot 1208, a second button 1210 for executing a command, a headset jack 1238, a docking/charging external port 1234, a microphone 1236, one or more speaker(s) 1216, one or more optical sensor(s) 1218, one or more proximity sensor(s) 1220, one or more applications 1222, and one or more operational tools 1124. In one embodiment, the foregoing components may be positioned as depicted in FIG. 12, and, in other embodiments, they may be positioned differently (e.g. in different locations of the face shown, on a different face, removed altogether, etc.).

As shown, in one embodiment, the touchscreen display 1202 may occupy the majority of the first face of the apparatus. In such an arrangement, the touchscreen display may also incorporate additional functionality. For example, the touchscreen display may scan fingerprints for authentication, may have optional parts of the screen to operate as touch buttons to navigate the apparatus, and/or may include any type of touch scanner or sensor that may exist separate from the main touchscreen display. In another embodiment, the touchscreen display may occupy the entire first face with all sensors (e.g. optical, proximity) integrated below the touchscreen.

Figure 13:
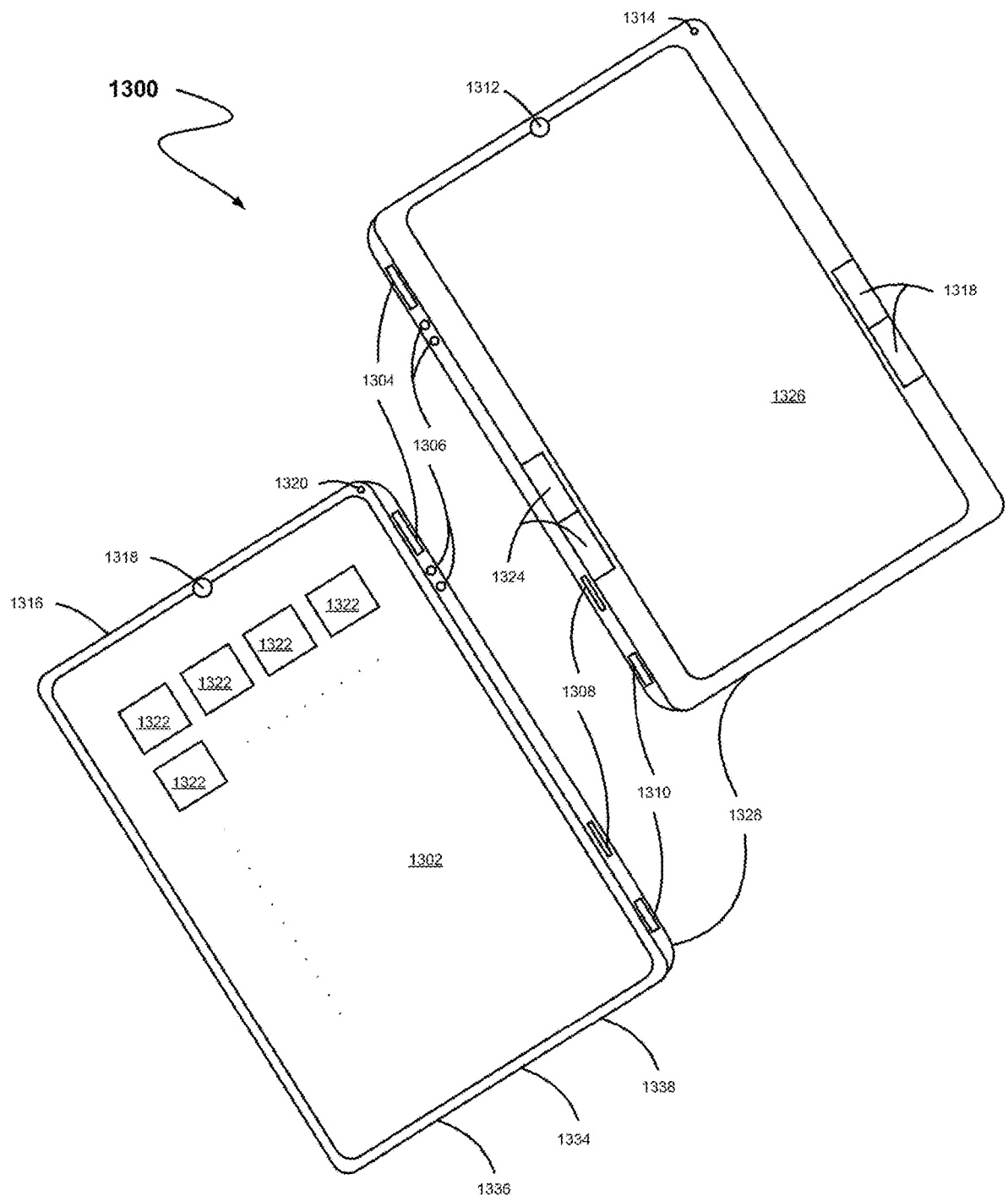
FIG. 13 illustrates a tablet apparatus having a first backlit touchscreen display and a second e-ink display, in accordance with another possible embodiment.

FIG. 13 illustrates a tablet apparatus 1300 having a tablet housing, a first backlit touchscreen display positioned on a first face of the tablet housing, and a second e-ink display positioned on a second face of the tablet housing, in accordance with one embodiment. As an option, the apparatus 1300 may be implemented in the context of the architecture and environment of the previous Figures or any subsequent Figure(s). Of course, however, the apparatus 1300 may be implemented in any desired environment. It should also be noted that the aforementioned definitions may apply during the present description.

As shown, a tablet housing 1328 is included. A first backlit touchscreen display 1302 positioned on a first face of the tablet housing is included. Additionally, a second e-ink display 1326 positioned on a second face of the tablet housing is included.

In one embodiment, the apparatus 1300 may include, but is not limited to, a touchscreen display 1302, an e-ink display 1326, a first button 1304 for executing a command, volume adjustment button(s) 1306, an external media card slot 1308, a second button 1310 for executing a command, a headset jack 1338, a docking/charging external port 1334, a microphone 1336, one or more speaker(s) 1316, one or more optical sensor(s) 1318, one or more proximity sensor(s) 1320, one or more applications 1322, and one or more operational tools 1324. In one embodiment, the foregoing components may be positioned as depicted in FIG. 13, and, in other embodiments, they may be positioned differently (e.g. in different locations of the face shown, on a different face, removed altogether, etc.).

As shown, in one embodiment, the e-ink display 1326 may occupy the majority of the second face of the apparatus. In another embodiment, the one or more optical sensor(s) may be incorporated directly into the touchscreen display and/or the e-ink display. In a further embodiment, the second face may not include one or more operational tools but the second face may simply be covered completely by the e-ink display. In such an arrangement, control of the e-ink display may be by the touchscreen display, or by side mounted operational tools.

Figure 14:
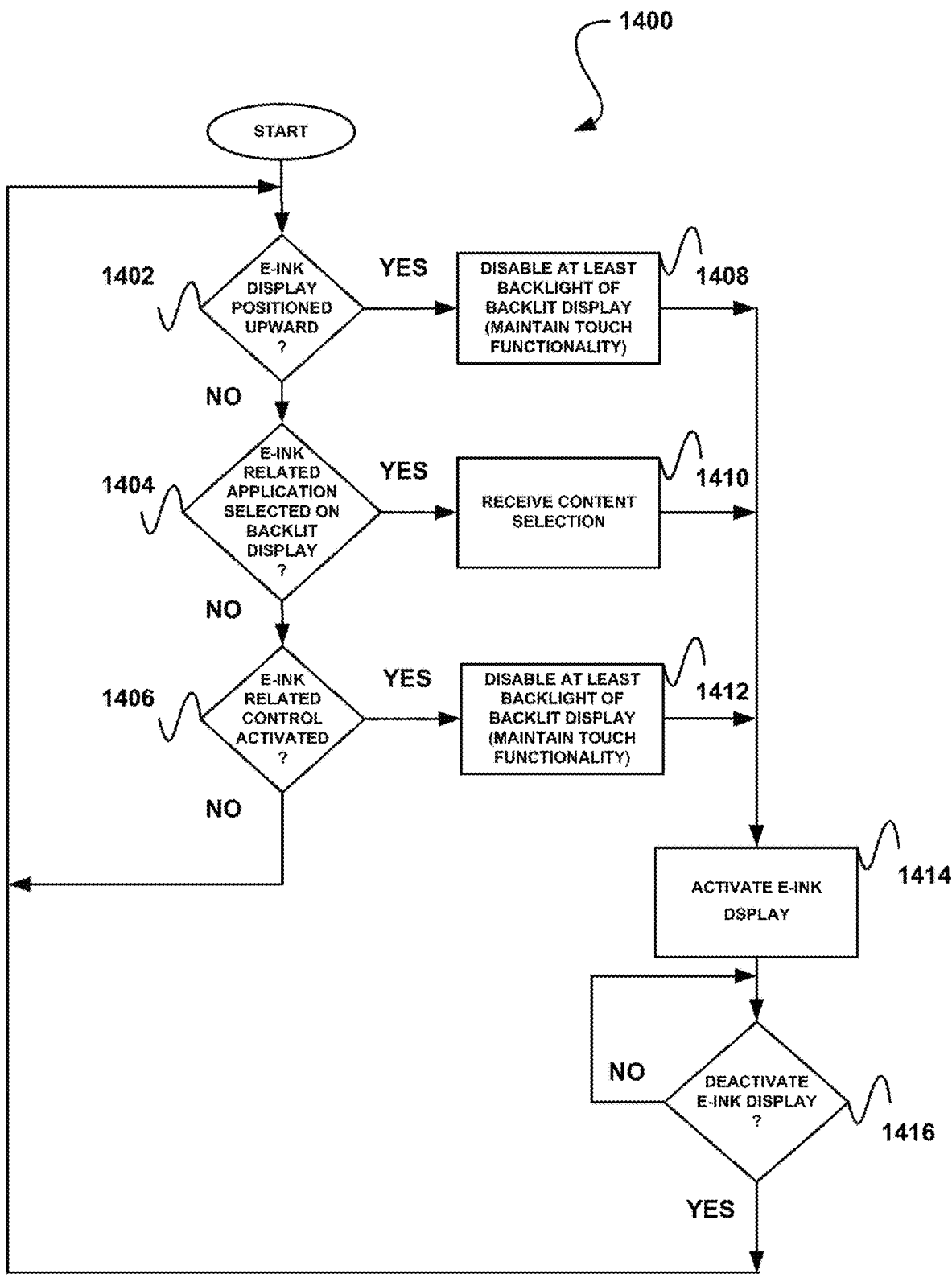
FIG. 14 illustrates a method for activating an e-ink display, in accordance with another possible embodiment.

FIG. 14 shows a method 1400 for activating an e-ink display. As an option, the method 1400 may be implemented in the context of the architecture and environment of the previous Figures or any subsequent Figure(s). Of course, however, the method 1400 may be carried out in any desired environment. It should also be noted that the aforementioned definitions may apply during the present description.

As shown, it is determined whether an e-ink display is positioned upwards. See decision 1402. In various embodiments, the determination the e-ink display being positioned upwards may be determined by the accelerometer (based on a detection the movement of the apparatus). For example, the accelerometer may determine that the orientation the apparatus has changed such that the second face is now positioned upwards. In one embodiment, the accelerometer may deactivate the touchscreen display once the second face e-ink display has been activated. In another embodiment, the accelerometer may disable the backlight of the touchscreen display while maintaining touch functionality on the touchscreen display. In a further embodiment, the accelerometer may be configured to not only activate the e-ink display but to also deactivate it once the second face is no longer in a set orientation.

In another embodiment, the accelerometer may work in conjunction with a proximity sensor to activate the e-ink display. For example, the accelerometer may determine that the apparatus has changed orientation (e.g. the apparatus has been turned over, etc.), prompting a potential activation a display. The proximity sensor may then be used to determine, for example, whether the touchscreen display or the e-ink reader display should be activated or deactivated based on input from the proximity reader. In one embodiment, the proximity sensor may be configured to activate a display based on a distance from the user to the apparatus. In another embodiment, the proximity sensor may be configured to deactivate a display. For example, a display may be deactivated based on a close distance of a cover or another object over the sensor. In another embodiment, the proximity sensor may deactivate a sensor based on a close distance of an object for a set preconfigured time threshold.

In a further embodiment, the accelerometer may work in conjunction with an optical sensor to activate the e-ink display. For example, the accelerometer may determine that the apparatus has changed orientation, prompting a potential activation a display. The optical sensor may then be used to scan the surroundings to determine which display on the apparatus should be activated. For example, the optical sensor may take a video scan of the surroundings to determine which display is being used by a user. This may be accomplished by determining whether a human face is facing the display, etc. In another embodiment, the optical sensor may scan a user's face to authenticate a user before activating a display.

As shown, it is determined whether an e-ink related application is selected on the touchscreen display. See decision 1404. In one embodiment, an application displayed on the touchscreen display may be used to activate the e-ink display. For example, an application on the touchscreen display may be entitled "E-ink Reader" and may be used to activate the e-ink display. After selecting the "E-ink Reader," navigating the e-ink display may be done by control tools on the second face of the apparatus, or on the touchscreen display. In another embodiment, the "E-ink Reader" may be used to navigate through e-books and other saved content. Upon selection of the desired content (that is adapted for e-ink display viewing or is otherwise associated with/configured for e-ink display viewing), the touchscreen may prompt the user if it is desired to activate the e-ink display. For example, after selecting material on the e-ink reader application, the touchscreen display may prompt, "Would you like to view the selected material on the e-ink display?" and display a "yes" and "no" button by which the user can make a selection. As such, activation the e-ink display may be done by a specialized e-ink reader application. Of course, any application may also be configured to make use of the e-ink display, and similarly allow the user to select content and activate the display. For example, a newspaper application, or any other application, may be configured to use the e-ink display and similarly prompt the user if it desired to activate the e-ink display.

In one embodiment, the e-ink display may be activated based on the content being viewed on the touchscreen display. For example, if a user accessed an application relating to a newspaper, a journal, or any other text-based application that could exist in print form, the touchscreen display may prompt the user to select the appropriate display on which the material is to be viewed (e.g. touchscreen display or e-ink display). In a further embodiment, if any viewed content being displayed on the touchscreen display may relate to viewing an image, text, or otherwise related printed material, the touchscreen display may prompt the user to select the appropriate display on which the material is to be viewed (e.g. touchscreen display or e-ink display). For example, if a user selects to view a portable document format (pdf) file, the touchscreen display may prompt the user if it is desired to activate the e-ink display. Similarly, the same prompt may be given whenever a user selects a document, a picture album, a game, reads an email, etc. In another embodiment, the user may specify in the settings of the apparatus which content receives a prompt to activate the e-ink display. In a further embodiment, the user may specify in the settings of the apparatus which content automatically activates the e-ink display. In another embodiment, once the e-ink display has been activated based on the content identified, at least the backlight of the touchscreen display may be disabled. As such, the apparatus may receive content selection. See operation 1410.

As shown, it is determined whether e-ink related control has been activated. See decision 1406. For example, a hardware switch, a configurable button, or any other hardware tool on the apparatus may be used to activate the e-ink display. In another embodiment, software applications may include functionality to decide which display is to be used. For example, after selecting an application, the application software may first determine how many displays are present, and then determine which display would be best for the application. Based on such a determination, the application may find that the e-ink display is present and would be optimal for the application. In some embodiments, the touchscreen display functionality may still retain touch sensitivity even though the backlight has been disabled. See operation 1412.

In further embodiments, after the e-ink display has been activated, it may remain activated until it is determined that the e-ink display is no longer being used. For example, the e-ink display may be positioned downwards, the optical sensor may sense that the user is not present near the face of the e-ink display, the proximity sensor may sense that a case cover has closed over e-ink display or that a user is no longer within a certain distance of the screen, a timer may have expired without any user interaction, an application on the touchscreen display may have been activated causing the e-ink display to turn off, and/or any other input or command may be used to signal to the apparatus that the e-ink display is no longer in use.

In various embodiments, the e-ink display may be deactivated in a variety of ways. See decision 1416. For example, the e-ink display may be manually deactivated (via a button or selection in association with the e-ink display, e.g. using controls on e-ink display face; or via a button or selection in association with the backlit display, i.e. via the an application that was used to retrieve the content being displayed on the e-ink display, etc.). Further, the e-ink display may be deactivated automatically (e.g. after a timeout, etc.). In such embodiment, any action (e.g. a movement vector, press of an e-ink button, etc.) may prompt the awakening of the e-ink display. For that matter, upon awaking from any "sleep" mode, the tablet may be adapted for only activating the display (e.g. e-ink display or backlit display, etc.) that was already activated before the "sleep" mode was initiated. Thus, the "state" of the tablet before and after the "sleep" mode may be maintained consistent.

Of course, the method 1400 may be modified in any desired manner, in various embodiments. For example, any one or more of decisions 1402, 1404, and/or 1406 may be optionally omitted as desired.

Figure 15:
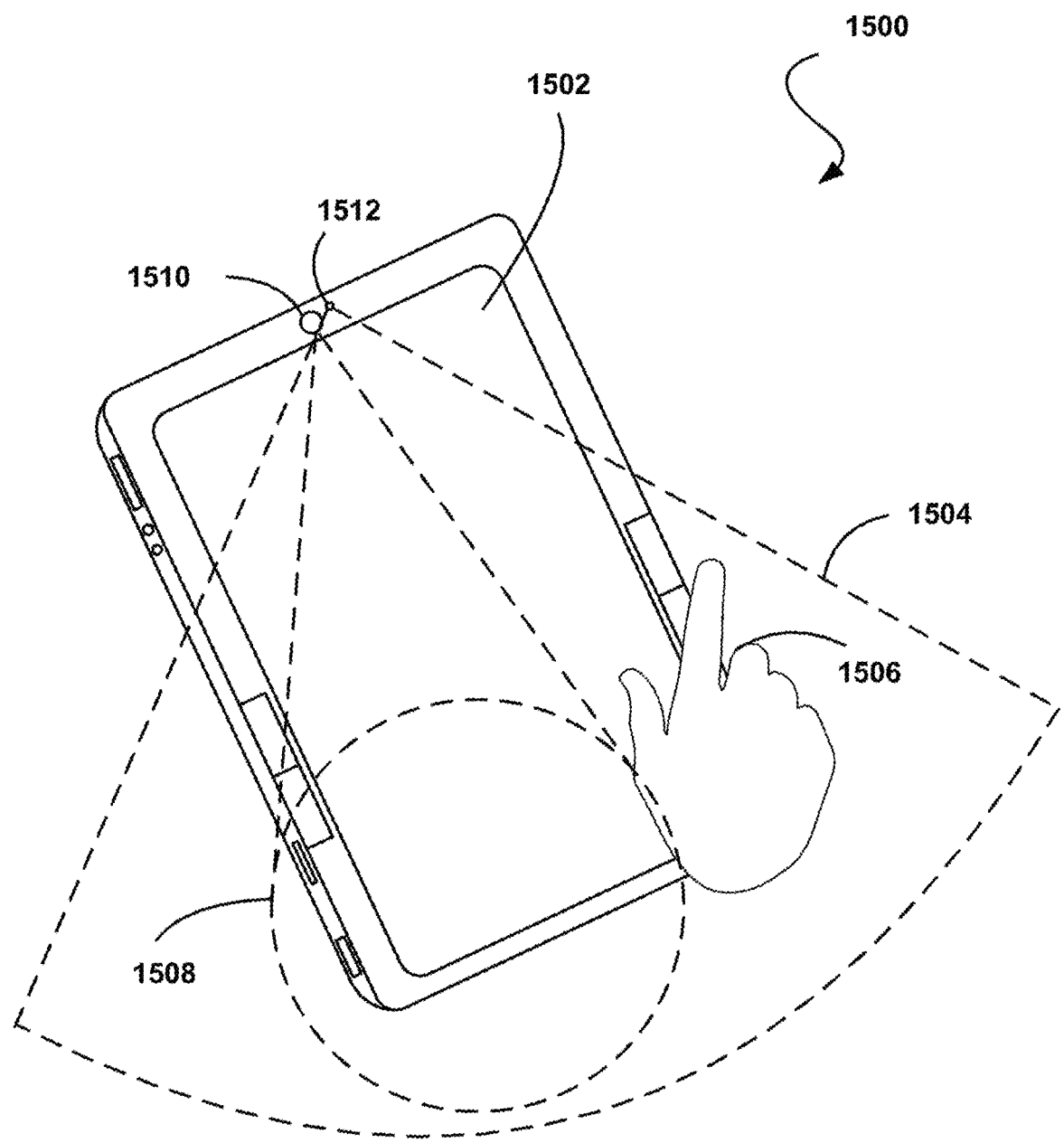
FIG. 15 illustrates a system for activating an e-ink display, in accordance with another possible embodiment.

FIG. 15 illustrates a system 1500 for activating an e-ink display. As an option, the system 1500 may be implemented in the context of the architecture and environment of the previous Figures or any subsequent Figure(s). Of course, however, the system 1500 may be implemented in any desired environment. The aforementioned definitions may apply during the present description.

As shown, an e-ink display 1502 may be positioned upwards. A proximity sensor 1512 is included. Additionally, an optical sensor 1510 is included. In one embodiment, the proximity sensor and the optical sensor may be positioned next to each other. In another embodiment, the proximity sensor and the optical sensor may be positioned anywhere on the system.

In one embodiment, an accelerometer (not shown) may be used to activate the optical sensor and the proximity sensor in response to the apparatus being turned over. As such, battery power is conserved and used for the optical sensor and proximity sensor only once it has been determined that the apparatus has been turned over.

As shown, the determination the e-ink display being positioned upwards may be determined by the proximity sensor. In one embodiment, the proximity sensor may be configured to activate a display based on a detected object found within a preconfigured set distance 1504 from e-ink display. In another embodiment, the proximity sensor may be configured to not activate, or even deactivate a display based on an object at a close distance (e.g. less than 1 inch, etc.). For example, a tablet cover or some other covering may be placed around the apparatus to protect it when not in use.

As shown, the determination the e-ink display being positioned upwards may be determined by the optical sensor. In one embodiment, the optical sensor may be used to scan the surroundings 1508 to determine which display on the apparatus should be activated. For example, the optical sensor may take a video scan of the surroundings to determine which display is being used by a user. In another embodiment, the optical sensor may scan a user's face to authenticate a user before activating a display.

As shown, the determination the e-ink display being positioned upwards may be determined by scanning the number of contact points 1506 on the touchscreen display or any touch sensitive sensor. For example, in one embodiment, the apparatus may determine that if more than four points of contact (or any preconfigured number) are made with the touchscreen display (i.e. finger tips holding up the apparatus), that the apparatus is positioned with the e-ink display up. In another embodiment, the apparatus may determine by contact points on touch sensitive sensors located on the face of the touchscreen display or on the face of the e-ink display whether the touchscreen display or the e-ink display is positioned upward. For example, if only one or two contact points were detected, then the user may be holding the apparatus with one or two hands with the majority of the fingers on the back of the apparatus and the thumbs positioned on the face of the e-ink reader.

Figures 16A, 16B:
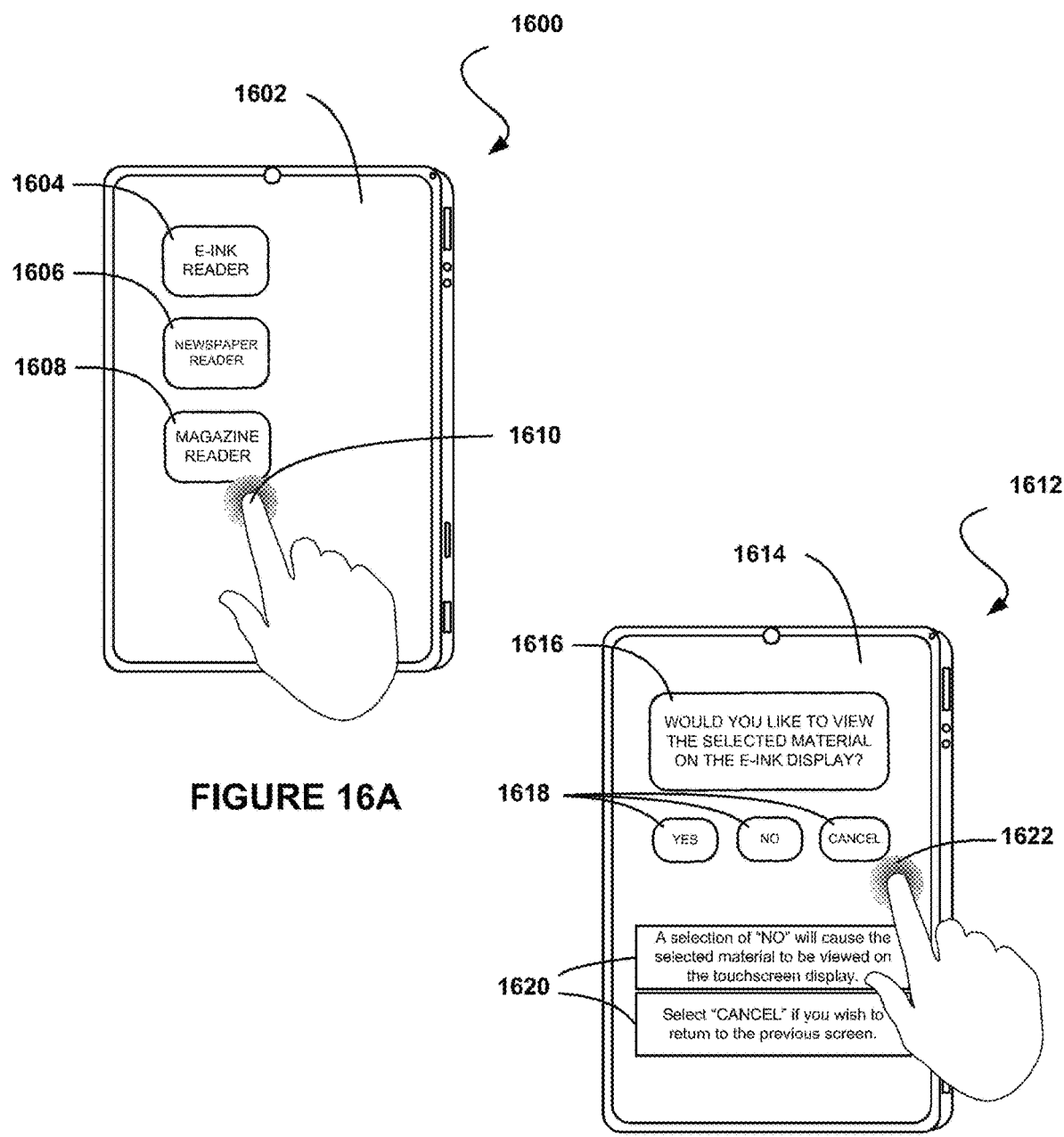
FIG. 16A shows a user interface for determining whether an e-ink related application is selected on a touchscreen display, in accordance with another possible embodiment.
FIG. 16B shows a user interface for determining whether an e-ink display should be activated, in accordance with another possible embodiment.

FIG. 16A shows a user interface 1600 for determining whether an e-ink related application is selected on a touchscreen display. As an option, the user interface 1600 may be implemented in the context of the architecture and environment of the previous Figures or any subsequent Figure(s). Of course, however, the user interface 1600 may be implemented in any desired environment. It should also be noted that the aforementioned definitions may apply during the present description.

As shown, a user may navigate a touchscreen display 1602. In one embodiment, the user may use a finger 1610 to navigate and select content on the screen. In another embodiment, a stylus, pen, or other potentially conductive material may be used.

As shown, an application 1604 may relate directly to an e-ink display. In one embodiment, an application displayed on the touchscreen display may be used to activate the e-ink display. For example, an application on the touchscreen display may be entitled "E-ink Reader" and may be used to activate the e-ink display. After selecting the "E-ink Reader," navigating the e-ink display may be done by control tools on the second face of the apparatus, or on the touchscreen display. In another embodiment, the "E-ink Reader" may be used to navigate through e-books and other saved content. Of course, any content or function may be programmed to the "E-ink Reader" application. Such programming may, in one embodiment, include any association between certain content and the desired/default display (e.g. e-ink display, etc.). Further, such association may be governed by the content provider and/or a configuration of the tablet by the user and/or tablet maker.

As shown, an application 1606 may relate directly to an e-ink display. In one embodiment, an application displayed on the touchscreen display may be used to activate the e-ink display. For example, an application on the touchscreen display may be entitled "Newspaper Reader" and may be used to select, navigate, and read newspapers. In one embodiment, the "Newspaper Reader" may automatically activate the e-ink display in response to a selection by a user. The automatic activation may be based on preconfigured configuration settings by the user. In another embodiment, the "Newspaper Reader" may function as a browser to peruse and tag daily news. In the context of the present description, tagging refers to associating a filtering tag to selected content. After selecting the desired content, the user may then read the selected content on the e-ink display.

As shown, an application 1608 may relate directly to an e-ink display. In one embodiment, an application displayed on the touchscreen display may be used to activate the e-ink display. For example, an application on the touchscreen display may be entitled "Magazine Reader" and may be used to select, navigate, and read magazines. In one embodiment, the "Magazine Reader" may automatically activate the e-ink display in response to a selection by a user. The automatic activation may be based on preconfigured configuration settings by the user. In another embodiment, the "Magazine Reader" may function as a browser to peruse and tag magazines. After selecting the desired content, the user may then read the selected content on the e-ink display.

In another embodiment, any application may be programmed to activate the e-ink reader. For example, games, document readers, photo viewing, and/or any application accessible on the apparatus may be configured to use the e-ink display.

FIG. 16B shows a user interface 1612 for determining whether an e-ink display should be activated. As an option, the user interface 1612 may be implemented in the context of the architecture and environment of the previous Figures or any subsequent Figure(s). Of course, however, the user interface 1612 may be implemented in any desired environment. It should also be noted that the aforementioned definitions may apply during the present description.

As shown, a user may navigate the touchscreen display 1614. In one embodiment, the user may use a finger 1622 to navigate and select content on the screen. In another embodiment, a stylus, pen, or other potentially conductive material may be used.

As shown, an application may prompt 1616 the user if it is desired to activate the e-ink display. For example, after selecting material on an application, the touchscreen display may show the prompt, "Would you like to view the selected material on the e-ink display?" Of course, any prompt may be displayed to the user requesting if it is desired to activate the e-ink display. In another embodiment, the application may be preconfigured so that a prompt is not given and the e-ink display is automatically activated.

As shown, an application may receive user feedback 1618. For example, a user may indicate whether it is desired to activate the e-ink display by selecting an appropriate button in the form of "yes," "no," or "cancel." Of course, the application may be programmed to receive the feedback in any manner. For example, the user may swipe a fingerprint on the touch sensitive sensor to automatically activate the e-ink display, the optical camera may determine by motions whether the e-ink display is to be activated, the accelerometer may determine by motions whether the e-ink display is to be activated, and/or any sensor may be used to receive user feedback as to whether the e-ink display is to be activated.

As shown, part of the screen may describe 1620 what the user feedback buttons may do. For example, the touchscreen display may show the following explanations: "A selection "NO" will cause the selected material to be viewed on the touchscreen display," and "Select "CANCEL" if you wish to return to the previous screen." Of course, any explanation to facilitate user navigation may be presented on the touchscreen display. In another embodiment, no explanations are presented to the user.

Figure 17:
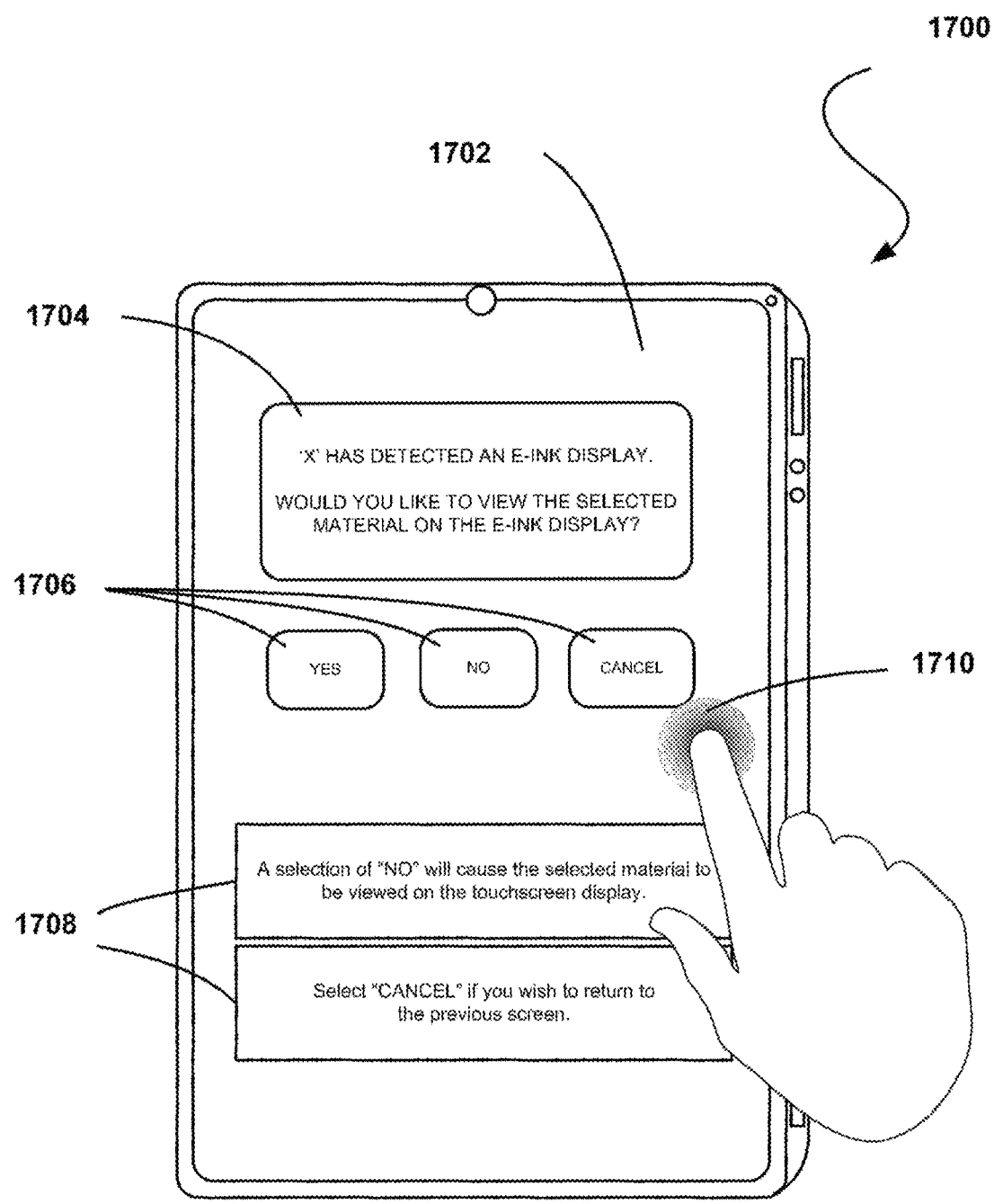
FIG. 17 shows a user interface for determining whether an e-ink display should be activated, in accordance with another possible embodiment.

FIG. 17 shows a user interface 1700 for determining whether an e-ink display should be activated. As an option, the user interface 1700 may be implemented in the context of the architecture and environment of the previous Figures or any subsequent Figure(s). Of course, however, the user interface 1700 may be implemented in any desired environment. It should also be noted that the aforementioned definitions may apply during the present description.

As shown, a user may navigate the touchscreen display 1702. In one embodiment, the user may use a finger 1710 to navigate and select content on the screen. In another embodiment, a stylus, pen, or other potentially conductive material may be used.

As shown, an application may detect an e-ink display and indication the same with appropriate indicia 1704. For example, after making a selection content, the application may detect an e-ink display and prompt the reader "'X' HAS DETECTED AN E-INK DISPLAY. WOULD YOU LIKE TO VIEW THE SELECTED MATERIAL ON THE E-INK DISPLAY?" In the context of the present description, 'X' refers to any application that may be on the apparatus. In one embodiment, the application may be programmed to automatically search for an e-ink display upon startup and then prompt the user once a selection has been made. In another embodiment, the application may be programmed to search for an e-ink display once content has been selected by the user. For example, an application may have both a game interface and a reading interface. The game interface may be optimized on the touchscreen display whereas the reading interface may be optimized on the e-ink display. In such an embodiment, the application may search for an e-ink display only when appropriate content (e.g. reading material, etc.) has been selected by the user.

As shown, an application may receive user feedback 1706. For example, a user may indicate whether it is desired to activate the e-ink display by selecting an appropriate button in the form of "yes," "no," or "cancel." Of course, the application may be programmed to receive the feedback in any manner. For example, the user may swipe a fingerprint on the touch sensitive sensor to automatically activate the e-ink display, the optical camera may determine by motions whether the e-ink display is to be activated, the accelerometer may determine by motions whether the e-ink display is to be activated, and/or any sensor may be used to receive user feedback as to whether the e-ink display is to be activated. In another embodiment, the application may be programmed to automatically activate the requested content on the e-ink display. For example, if a user regularly selects the e-ink display to read newspaper articles, the application may be preconfigured to automatically activate the e-ink reader every time newspaper content is selected. Of course, any feature may be preconfigured on the apparatus and may be used to activate the e-ink display.

As shown, part of the screen may describe 1708 what the user feedback buttons may do. For example, part of the touchscreen display may describe what the user feedback buttons may do. For example, the touchscreen display may show the following explanations: "A selection "NO" will cause the selected material to be viewed on the touchscreen display," and "Select "CANCEL" if you wish to return to the previous screen." Of course, any explanation to facilitate user navigation may be presented on the touchscreen display. In another embodiment, no explanations are presented to the user.

Figure 18:
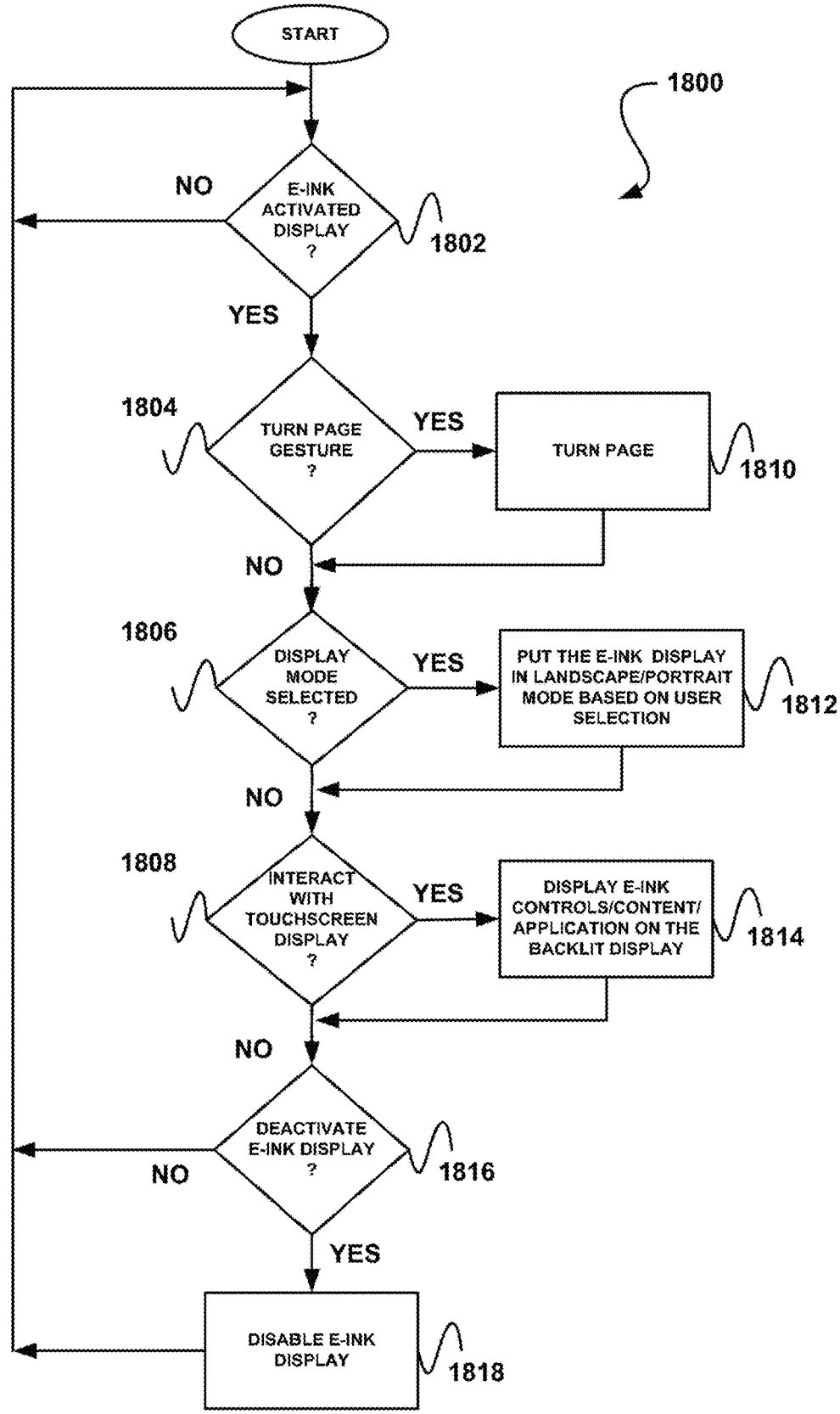
FIG. 18 shows a method for using an e-ink display, in accordance with another possible embodiment.

FIG. 18 shows a method 1800 for using an e-ink display. As an option, the method 1800 may be implemented in the context of the architecture and environment of the previous Figures or any subsequent Figure(s). Of course, however, the method 1800 may be carried out in any desired environment. It should also be noted that the aforementioned definitions may apply during the present description.

As shown, it is determined whether the e-ink display has been activated. See decision 1802. For example, the e-ink display may be positioned upwards, the optical sensor may sense that the user is present near the face of the e-ink display, the proximity sensor may sense that a case cover is not closed over e-ink display or that a user is within a certain amount of distance, an application on the touchscreen display may have been activated causing the e-ink display to turn on, content on the touchscreen display may have been selected prompting the user to activate the e-ink display, and/or any other input or command may be used to signal to the apparatus that the e-ink display is to be activated.

As shown, if it is determined that the e-ink display has been activated, then it is determined whether there has been a turn page gesture, or a gesture to turn the page. See decision 1804. For example, an accelerometer may be used to turn the page based on motion from the user. The user may move the device to the right to turn the page or move the device to the left to turn the page back. The user may turn the device (e.g. alter the viewing angle) to cause the page to turn and advance or, in another embodiment, cause the page to go back.

In another embodiment, the optical sensor may be used to turn the page. For example, a hand motion to the right may cause the page to turn and advance, or a hand motion to the left may cause the page to turn and go back. In a further embodiment, the proximity sensor may work in conjunction with the optical sensor to increase effectiveness of the sensors (e.g. only certain motions at specific distances may cause the page to turn).

In one embodiment, the microphone may be used to turn the page. For example, after the e-ink display has been activated, the microphone may also be activated to receive voice commands from the user. The user may state "next page" to go to the next page, or "last page" to go to the past page. Additionally, the user may state "next chapter" and cause the e-ink display to display the next chapter. In some embodiments, the user may record any string of words to be associated with any preconfigured command.

Further, in one embodiment, command buttons may be used to turn the page. For example, a physical button located on the side of the device may cause the e-ink display to turn to the next page, or to the past page. Of course, any programmable button may also be configured to advance the reading material to the next page or to any predefined function. If it is determined that a gesture has been performed to turn the page, then the page may be turned. See operation 1810.

As shown, it is determined if a display mode has been selected. See decision 1806. For example, the display mode may be put in a landscape or portrait. In one embodiment, the user may specify the e-ink display mode, for example, by a control button, a touchscreen below the e-ink display, and/or the touchscreen display on the first face. In another embodiment, the application may specify the e-ink display mode, and/or the content may indicate what type of display may be preferred (e.g. a photo or a .pdf document may display automatically in landscape format). In a further embodiment, a physical button may switch the display mode. As such, based on the selection by the user, the e-ink display may be put in landscape or portrait mode. See operation 1812.

As shown, it is determined if there is any interaction with the touchscreen display. See decision 1808. For example, content may be selected on the touchscreen display without a backlight, the orientation the apparatus may indicate that it has been flipped over from the second face to the first face, and/or a physical button may be pressed activating (i.e. turning on the backlight) the touchscreen display. Of course, any sensor or input may be used to indicate if there is interaction with the touchscreen display.

As shown, if it is determined that there is some interaction with a touchscreen display, then the touchscreen display displays e-ink controls, content, and/or application(s) on the backlit display. See operation 1814. For example, among other things, a social networking prompt may be displayed asking the user what was thought of the book, a rating system may be displayed asking the user to rate the material, a control guide may be displayed prompting the user to select the next chapter or any specific location in the material, a trashcan may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general may be displayed to the user. In one embodiment, based on the content of what may be displayed on the e-ink display, advertisements may be tailored and be displayed on the touchscreen display when the orientation is reversed.

In another embodiment, the first backlit touchscreen display may be capable of being utilized as a control for the second e-ink display. For example, an e-ink display application located on the touchscreen display may permit the user to view a thumbnail or even a larger image of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display. In another embodiment, the apparatus may include a camera positioned on the second face of the tablet housing, and the apparatus may be operable such that content displayed utilizing the second e-ink display is controlled utilizing the camera.

As shown, it is determined whether to deactivate the e-ink display. See decision 1816. For example, the e-ink display may be positioned downwards for a preconfigured set amount of time, the optical sensor may sense that the user is not present near the face of the e-ink display, the proximity sensor may sense that a case cover has closed over e-ink display or that a user is no longer within a certain amount of distance, a timer may have expired without any user interaction, an application on the touchscreen display may have been used to notify the apparatus that the e-ink display is no longer needed, any application on the touchscreen display which would not use the e-ink display may have been activated and/or any other input or command which may be used to signal to the apparatus that the e-ink display is no longer in use. In another embodiment, a physical button may be switched to deactivate the e-ink display.

As shown, if it determined to deactivate the e-ink display, the e-ink display may then be disabled. See decision 1818. In another embodiment, at least one of the first backlit touchscreen display or the second e-ink display may be either powered-down or may display a screensaver screen in response to the determining as to whether the first face of the tablet housing or the second face of the tablet housing is in the predetermined orientation. In the context of the present description, a screensaver screen may refer to a set screen that replaces the image on a screen whenever a screen is not in use.

In some embodiments, at least one of the first backlit touchscreen display or the second e-ink display may be either powered-down or may display a screensaver screen in response to a detection a first one or more controls associated with the first backlit touchscreen display or second one or more controls associated with the second e-ink display are being used. Additionally, in another embodiment, the second e-ink display may display a screensaver screen that includes a trademark of the tablet housing. Further, the second e-ink display may display a screensaver screen that includes a color or design that matches the second face of the tablet housing.

In one embodiment, an orientation detection mechanism may be provided for determining whether the first face of the tablet housing or the second face of the tablet housing is in a predetermined orientation. In another embodiment, at least one of the first backlit touchscreen display or the second e-ink display may be either powered-down or may display a screensaver screen in response to the determining as to whether the first face of the tablet housing or the second face of the tablet housing is in the predetermined orientation.

Figure 19:
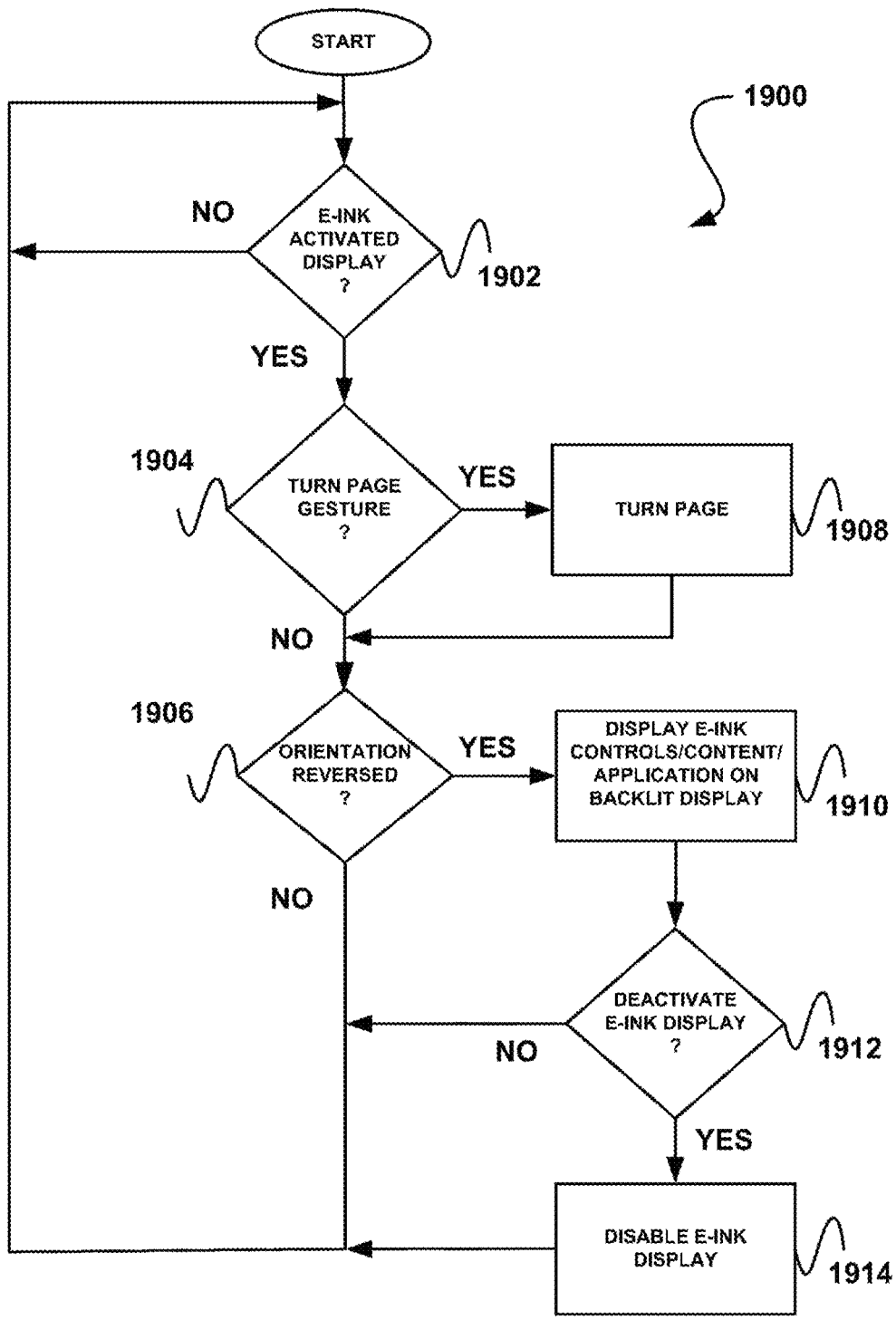
FIG. 19 shows a method for using an e-ink display, in accordance with another possible embodiment.

FIG. 19 shows a method 1900 for using an e-ink display. As an option, the method 1900 may be implemented in the context of the architecture and environment of the previous Figures or any subsequent Figure(s). Of course, however, the method 1900 may be carried out in any desired environment. It should also be noted that the aforementioned definitions may apply during the present description.

As shown, it is determined if the e-ink display has been activated. See decision 1902. For example, the e-ink display may be positioned upwards, the optical sensor may sense that the user is present near the face of the e-ink display, the proximity sensor may sense that a case cover is not closed over e-ink display or that a user is within a certain amount of distance, an application on the touchscreen display may have been activated causing the e-ink display to turn on, content on the touchscreen display may have been selected prompting the user to activate the e-ink display, and/or any other input or command may be used to signal to the apparatus that the e-ink display is to be activated.

As shown, if it is determined that the e-ink display has been activated, then it is determined whether there has been a turn page gesture, or a gesture to turn the page. See decision 1904. For example, an accelerometer may be used to turn the page based on motion from the user. The user may move the device to the right to turn the page or move the device to the left to turn the page back. The user may turn the device (e.g. alter the viewing angle) to cause the page to turn and advance or, in another embodiment, cause the page to go back.

In another embodiment, the optical sensor may be used to turn the page. For example, a hand motion to the right may cause the page to turn and advance, or a hand motion to the left may cause the page to turn and go back. In a further embodiment, the proximity sensor may work in conjunction with the optical sensor to increase effectiveness of the sensors (e.g. only certain motions at specific distances may cause the page to turn).

In one embodiment, the microphone may be used to turn the page. For example, after the e-ink display has been activated, the microphone may also be activated to receive voice commands from the user. The user may state "next page" to go to the next page, or "last page" to go to the past page. Additionally, the user may state "next chapter" and cause the e-ink display to display the next chapter. In some embodiments, the user may record any string of words to be associated with any preconfigured command.

Further, in one embodiment, command buttons may be used to turn the page. For example, a physical button located on the side of the device may cause the e-ink display to turn to the next page, or to the past page. Of course, any programmable button may also be configured to advance the reading material to the next page.

If it is determined that a gesture has been performed to turn the page, then the page may be turned. See operation 1908.

As shown, it is determined whether the orientation has been reversed. See decision 1906. For example, while reading a book, the user may flip the apparatus over to access another application, watch a movie, or perform some other command. The accelerometer, optical sensor, proximity sensor, and any other sensor mounted on the device may be used to assess whether the apparatus has been flipped and the e-ink display is no longer being used.

As shown, if the orientation has been reversed, then e-ink controls, content, and/or applications may be displayed on the touchscreen display. See operation 1910. For example, after flipping the apparatus over (i.e. so that the first face is facing towards the user), the touchscreen display may be activated (backlight may remain off or turn on, depending on user settings) and further controls, content, and/or applications are presented to the user. Of course, after the orientation has been reversed, anything may be presented to the user. For example, among other things, a social networking prompt may be displayed asking the user what was thought of the book, a rating system may be displayed asking the user to rate the material, a control guide may be displayed prompting the user to select the next chapter or any specific location in the material, a trashcan may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general may be displayed to the user. In one embodiment, based on the content of what may be displayed on the e-ink display, advertisements may be tailored and be displayed on the touchscreen display when the orientation is reversed.

In another embodiment, the first backlit touchscreen display may be capable of being utilized as a control for the second e-ink display. For example, an e-ink display application located on the touchscreen display may permit the user to view a thumbnail or even larger of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display. In another embodiment, the apparatus may include a camera positioned on the second face of the tablet housing, and the apparatus may be operable such that content displayed utilizing the second e-ink display is controlled utilizing the camera.

In another embodiment, the apparatus may include an application that may be accessible via the first backlit touchscreen display and may be further capable of being utilized to select content that is displayed utilizing the second e-ink display.

As shown, after the orientation is found to be reversed, it is determined whether to deactivate the e-ink display. See decision 1912. For example, the e-ink display may be positioned downwards for a preconfigured set amount of time, the optical sensor may sense that the user is not present near the face of the e-ink display, the proximity sensor may sense that a case cover has closed over e-ink display or that a user is no longer within a certain amount of distance, a timer may have expired without any user interaction, an application on the touchscreen display may have been used to notify the apparatus that the e-ink display is no longer needed, any application on the touchscreen display which would not use the e-ink display may have been activated and/or any other input or command which may be used to signal to the apparatus that the e-ink display is no longer in use. In another embodiment, a physical button may be switched to deactivate the e-ink display.

As shown, if it determined to deactivate the e-ink display, the e-ink display may then be disabled. See decision 1914. In another embodiment, at least one of the first backlit touchscreen display or the second e-ink display may be either powered-down or may display a screensaver screen in response to the determining as to whether the first face of the tablet housing or the second face of the tablet housing is in the predetermined orientation. In some embodiments, at least one of the first backlit touchscreen display or the second e-ink display may be either powered-down or may display a screensaver screen in response to a detection a first one or more controls associated with the first backlit touchscreen display or second one or more controls associated with the second e-ink display are being used. Additionally, in another embodiment, the second e-ink display may display a screensaver screen that includes a trademark of the tablet housing. Further, the second e-ink display may display a screensaver screen that includes a color or design that matches the second face of the tablet housing.

Figure 20A:
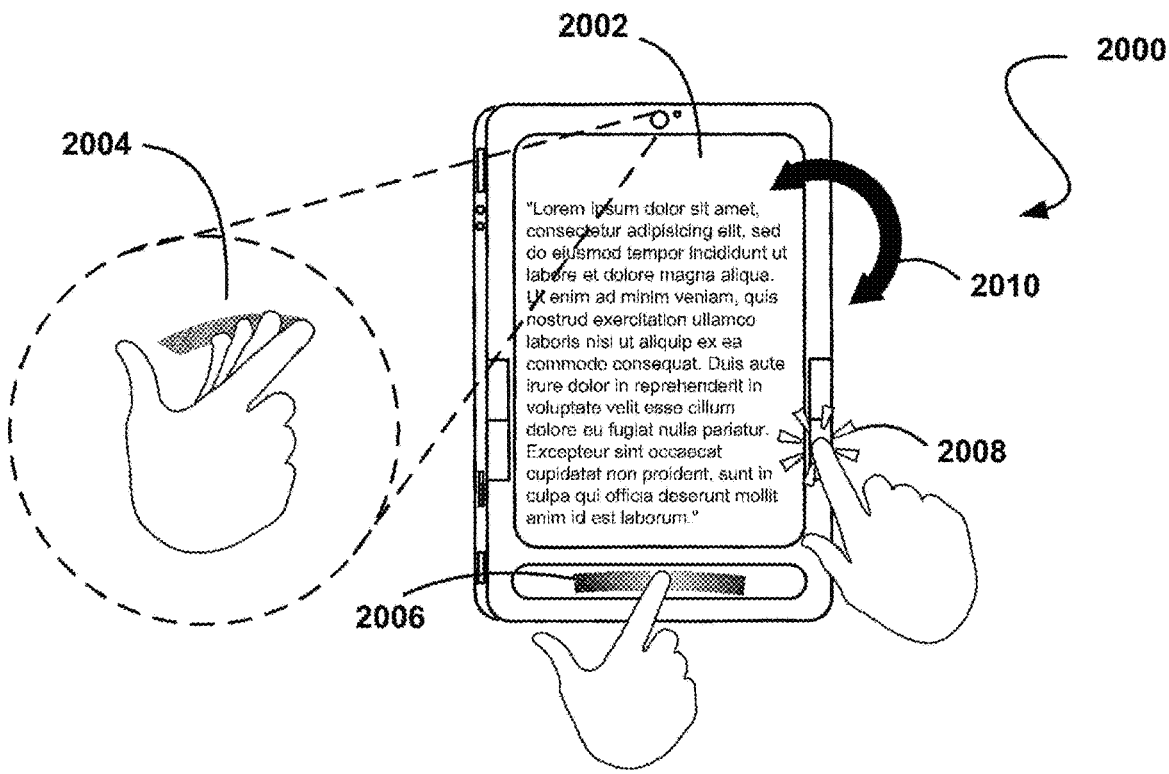
FIG. 20A illustrates a system for using an e-ink display, in accordance with another possible embodiment.

FIG. 20A illustrates a system 2000 for using an e-ink display. As an option, the method 2000 may be implemented in the context of the architecture and environment of the previous Figures or any subsequent Figure(s). Of course, however, the method 2000 may be carried out in any desired environment. It should also be noted that the aforementioned definitions may apply during the present description.

As shown, an activated e-ink display 2002 is included. For example, in one embodiment, text may be displayed on the display. Of course, any image, text, or content may also be displayed.

As shown, the optical sensor 2004 may be used to turn the page. For example, a finger motion to the right may cause the page to turn and advance. In another embodiment, a finger motion to the left may cause the page to turn and go back. In a further embodiment, the proximity sensor may work in conjunction with the optical sensor to increase effectiveness of the sensors (e.g. only motion at a set distance will cause the page to turn). Of course, any object may be used to cause the page to turn through use of the optical sensor.

As shown, a touchscreen panel 2006 may be used to turn a page. For example, in one embodiment, a user may swipe a finger on the touchscreen panel to the right to cause the page to turn and advance. In another embodiment, the user may swipe a finger on the touchscreen panel to the left to cause the page to turn and go back. Of course, any object which can be sensed by the touchscreen panel may be used. Additionally, any stroke, touch, or motion may be set to a preconfigured function.

As shown, command buttons 2008 may be used to turn a page. For example, a physical button located on the side of the device may cause the e-ink display to turn to the next page, or to the past page. Of course, any programmable button may also be configured to advance the reading material to the next page.

As shown, the apparatus may be turned 2010 to facilitate turning a page. In one embodiment, an accelerometer may be used to turn the page based on motion from the user. The user may move the device to the right to turn the page or move the device to the left to turn the page back. Additionally, the user may turn the device to cause the page to turn and advance or, in another embodiment, cause the page to go back. Of course, any sensor which can determine that the apparatus is being turned may be used to facilitate turning a page.

In a further embodiment, voice commands may be used to operate turning a page. For example, after the e-ink display has been activated, the microphone may also be activated to receive voice commands from the user. The user may state "next page" to go to the next page, or "last page" to go to the past page. Additionally, the user may state "next chapter" and cause the e-ink display to display the next chapter. In some embodiments, the user may record any string of words to be associated with any preconfigured command.

In another embodiment, the apparatus may be configured to detect a simulated page turning, utilizing a sensor (e.g. a camera, etc.). For example, a user may have the ability to move a hand as if turning a page and a sensor of the apparatus may detect this motion and, as a result, turn the page. The detection of the hand motion may be accomplished in a variety of ways, such as generating a motion vector based on the hand movement, utilizing image recognition to recognize the hand, utilizing image recognition to detect a rotation of the hand, and various other techniques.

Figure 20B:
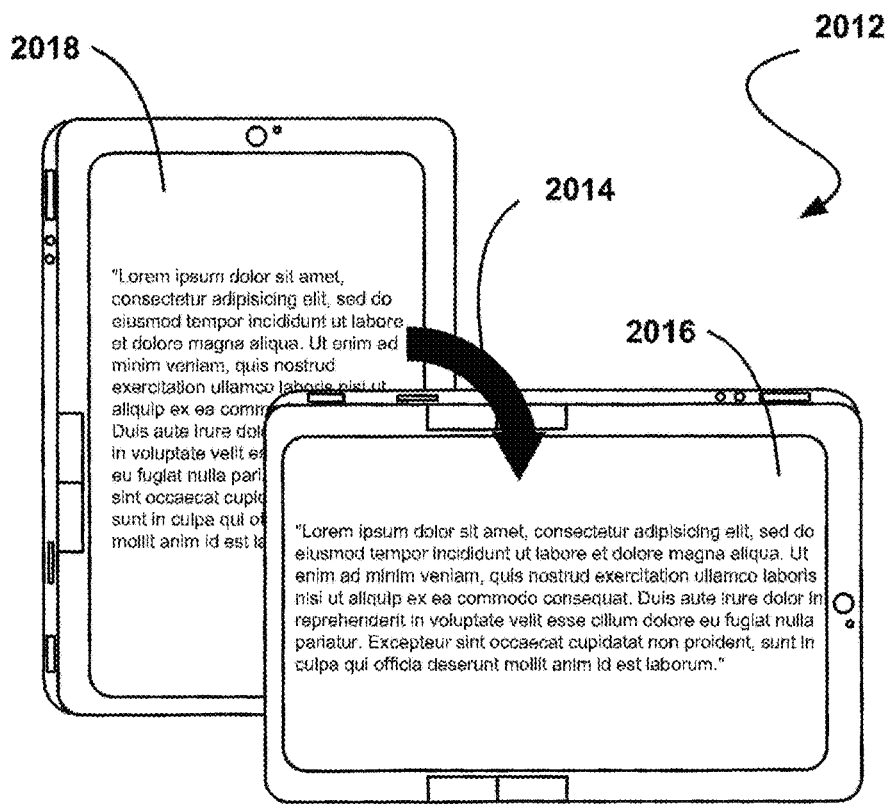
FIG. 20B illustrates a system for using an e-ink display, in accordance with another possible embodiment.

FIG. 20B illustrates a system 2012 for using an e-ink display. As an option, the method 2012 may be implemented in the context of the architecture and environment of the previous Figures or any subsequent Figure(s). Of course, however, the method 2012 may be carried out in any desired environment. It should also be noted that the aforementioned definitions may apply during the present description.

As shown, the apparatus may be positioned in an upright or portrait position 2018. The apparatus may be turned 2014. After turning, the e-ink display may adjust and switch 2016 to a landscape position or a portrait position (e.g. the opposite position that it was set at originally).

In the context of the present description, a portrait position refers to having the apparatus in a position where the height is greater than the width. Further, in the context of the present description, a landscape position refers to having the apparatus in a position where the width is greater than the height.

In one embodiment, the apparatus may switch from portrait to landscape (or from landscape to portrait) automatically. For example, an accelerometer may determine that the apparatus is being turned and automatically switch the orientation the display. In another embodiment, the orientation may change based on the displayed content. For example, if a photo was too wide to be properly shown in portrait mode, the apparatus may automatically switch the display into landscape mode to accommodate the dimensions of the photo. Of course, any content may be preconfigured to automatically switch the orientation the e-ink display. Additionally, the apparatus may switch orientation automatically regardless of the content that is being presented.

In another embodiment, the apparatus may switch from portrait to landscape (or from landscape to portrait) manually. For example, the apparatus may have a physical button, a control button, a switch, or any other type of mechanical tool to assist with manually turning the orientation the e-ink display.

Figure 21A:
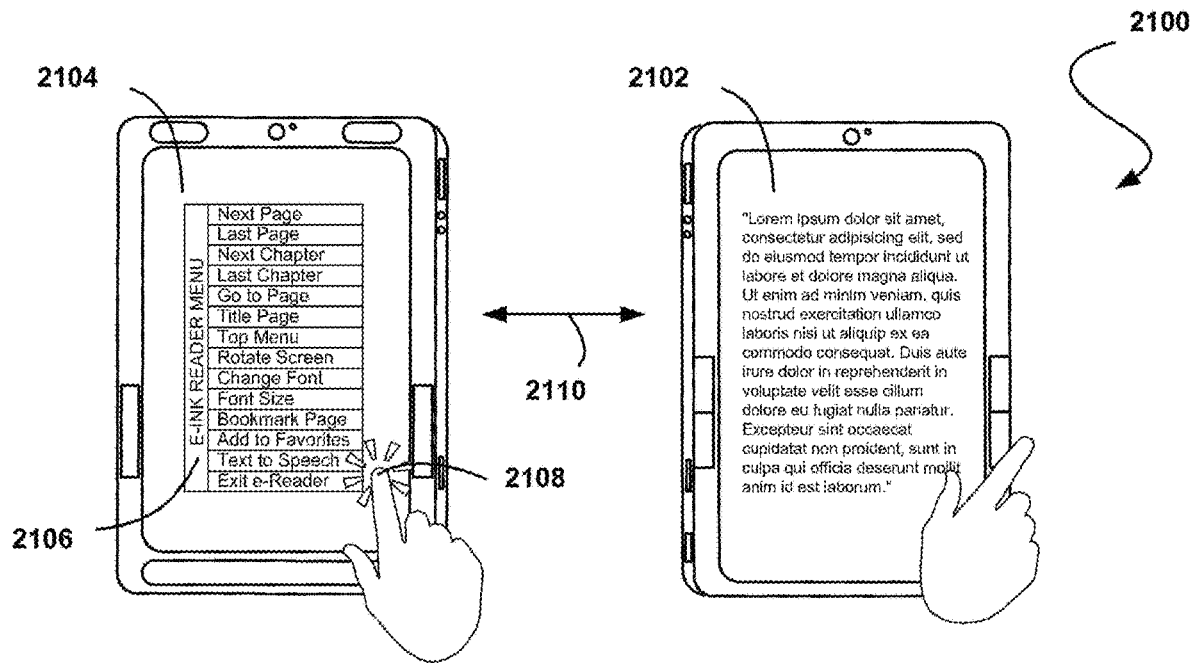
FIG. 21A illustrates a system for using an e-ink display, in accordance with another possible embodiment.

FIG. 21A illustrates a system 2100 for using an e-ink display. As an option, the method 2100 may be implemented in the context of the architecture and environment of the previous Figures or any subsequent Figure(s). Of course, however, the method 2100 may be carried out in any desired environment. It should also be noted that the aforementioned definitions may apply during the present description.

As shown, an activated e-ink display 2102 is included. The apparatus may be flipped 2110 from the second face (i.e. the e-ink display) to the first face (i.e. the touchscreen display).

As shown, the touchscreen display may be used 2104. In one embodiment, the touchscreen display may have its backlight off or the backlight may be activated by turning the apparatus over from the second face (e.g. e-ink display) to the first face (e.g. touchscreen display). In another embodiment, the apparatus may not be fully turned over from the second face to the first face in order to access the touchscreen display. For example, the user may raise the apparatus above the head to view the underside of the apparatus and thereby make a selection on the touchscreen display. As such, the apparatus may be orientated in any manner to permit the user to interact with the touchscreen display.

As shown, a user may interact with the touchscreen display through a menu system 2106. For example, in one embodiment, a menu may be presented to the user displaying any of the following options: "Next Page," "Last Page," "Next Chapter," "Last Chapter," "Go to Page," "Title Page," "Top Menu," "Rotate Screen," "Change Font," "Font Size," "Bookmark Page," "Add to Favorites," "Text to Speech," and "Exit e-Reader." Of course any option may be presented to the user for selection. In another embodiment, a social networking prompt may be displayed asking the user what was thought of the book, a rating system may be displayed asking the user to rate the material, a trashcan icon may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general. In one embodiment, based on the content of what may be displayed on the e-ink display, advertisements may be tailored and be displayed on the touchscreen display.

In a further embodiment, the touchscreen display may be utilized as a control for the e-ink display. For example, an e-ink display application located on the touchscreen display may permit the user to view a thumbnail or even larger of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display. In another embodiment, the apparatus may include a camera positioned on the second face of the tablet housing, and the apparatus may be operable such that content displayed utilizing the second e-ink display is controlled utilizing the camera.

As shown, the user may interact 2108 with the touchscreen display. For example, the user may use a finger to select the desired option on the menu. Of course, any object which can be used as an input on a touchscreen display may be used to receive user feedback and/or selection.

Figure 21B:
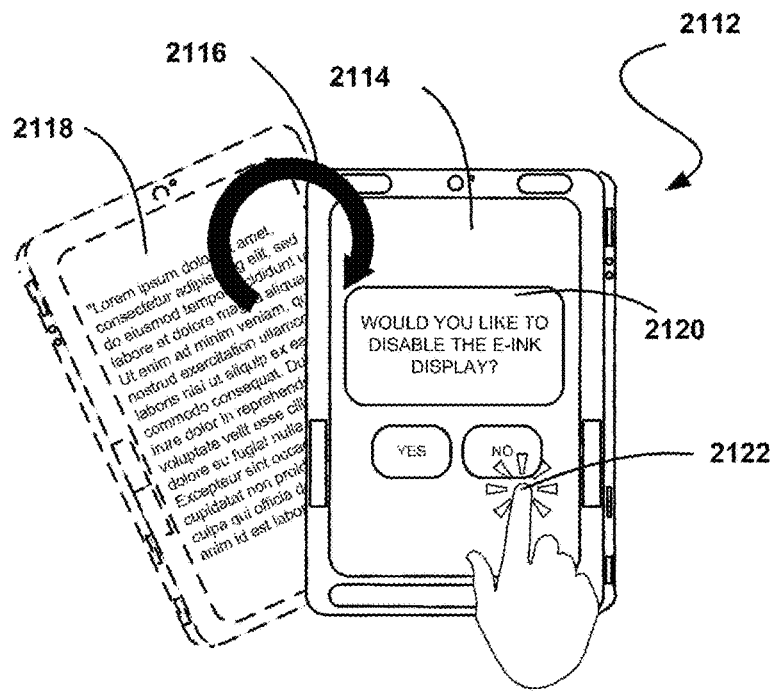
FIG. 21B illustrates a system for disabling an e-ink display, in accordance with another possible embodiment.

FIG. 21B illustrates a system 2112 for disabling an e-ink display. As an option, the method 2112 may be implemented in the context of the architecture and environment of the previous Figures or any subsequent Figure(s). Of course, however, the method 2112 may be carried out in any desired environment. It should also be noted that the aforementioned definitions may apply during the present description.

Additionally, in the context of the present description, disabling an e-ink display may refer to causing the e-ink display to be unresponsive to further commands. For example, disabling an e-ink display may cause the e-ink to not respond to specific command buttons, page turn buttons, inputs from proximity sensors or optical sensors, etc. Of course, the e-ink display may be disabled only temporarily. For example, after the e-ink display has been disabled it may also be re-activated.

As shown, an activated e-ink display 2118 is included. The apparatus may be turned over 2116 so that the first face with the touchscreen display is positioned upward. Additionally, an activated touchscreen display 2114 is included.

In various embodiments, there are many ways in which the e-ink display may be disabled. For example, the e-ink display may be positioned downwards for a preconfigured set amount of time, the optical sensor may sense that the user is not present near the face of the e-ink display, the proximity sensor may sense that a case cover has closed over the e-ink display or that a user is no longer within a certain amount of distance of the sensor, a timer may have expired without any user interaction, an application on the touchscreen display may have been used to notify the apparatus that the e-ink display is no longer needed, any application on the touchscreen display which would not use the e-ink display may have been activated and/or any other input or command which may be used to signal to the apparatus that the e-ink display is no longer in use. In another embodiment, a physical button may be switched to deactivate the e-ink display.

As shown, a prompt 2120 may be displayed asking the user if it is desired to disable the e-ink display. In one embodiment, the prompt may state "Would you like to disable the e-ink display?" Of course, any prompt may be given to the user relating to disabling the e-ink display. In response to the prompt, the user may make a selection. For example, below the prompt may be displayed options "yes" and "no." In another embodiment, any option requesting feedback may be displayed to the user.

As shown, a user may make a selection 2122 of one of the options. In one embodiment, the user may use a finger to navigate and select content on the screen. In another embodiment, a stylus, pen, or other potentially conductive material may be used. Further, in various embodiments, other sensors may be used to select an option. For example, a microphone may be used, the optical sensor may receive input through observed motions, and/or an accelerometer may be used to move a cursor with an automatic selection based on a preconfigured set interval (e.g. 2 seconds of hovering above a selection object).

FIGS. 22A-C illustrate a cover 2200 having a first planar portion, a second planar portion, a seam which connects the first and second planar portions, and a hinge along the seam to which a tablet apparatus may be coupled, in accordance with one embodiment. As an option, the cover 2200 may be implemented in the context of the architecture and environment of the previous Figures or any subsequent Figure(s). Of course, however, the cover 2200 may be carried out in any desired environment. It should also be noted that the aforementioned definitions may apply during the present description.

As shown, a first and second planar portion 2206 are identified. A hinge 2202 along the seam of where the first and second planar portions are connected is identified. Additionally, a tablet apparatus 2204 which may be coupled to the hinge is identified.

In one embodiment, a tablet cover that may include a first planar portion and a second planar portion that may have a hinged relationship along a seam therebetween, and a peripheral edge of the tablet housing may be coupleable along the seam. Additionally, the tablet cover may be fabricated in any manner and constructed by any material. In one embodiment, the hinge may be physically connected to the tablet cover and to the apparatus. In another embodiment, the hinge may be a magnet between the tablet cover and the apparatus. Of course, any mechanism may be used to attach or connect the cover to the tablet apparatus.

In a further embodiment, a tablet cover may be comprised of a bumper. In the context of the present description, a bumper refers to a material which covers the outer periphery of a tablet apparatus. For example, the bumper may be constructed of a silicon compound and surround the outer edge of the apparatus (i.e. any edge of the tablet apparatus).

Figure 23A:
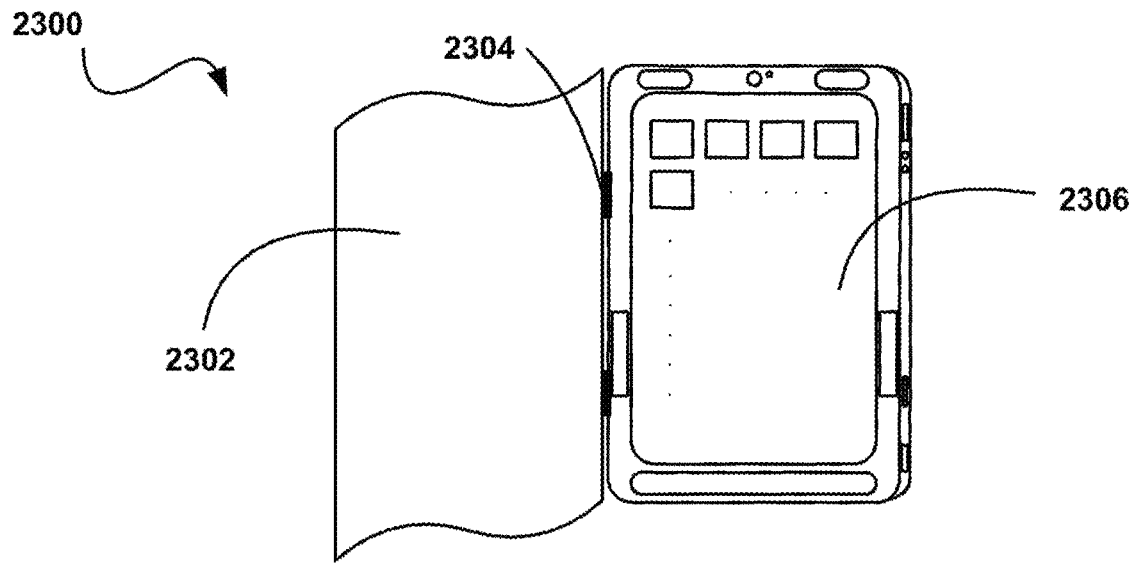
FIGS. 23A-B illustrate a cover having a seam to which a tablet apparatus may be coupled, in accordance with another embodiment.
Figure 23B:
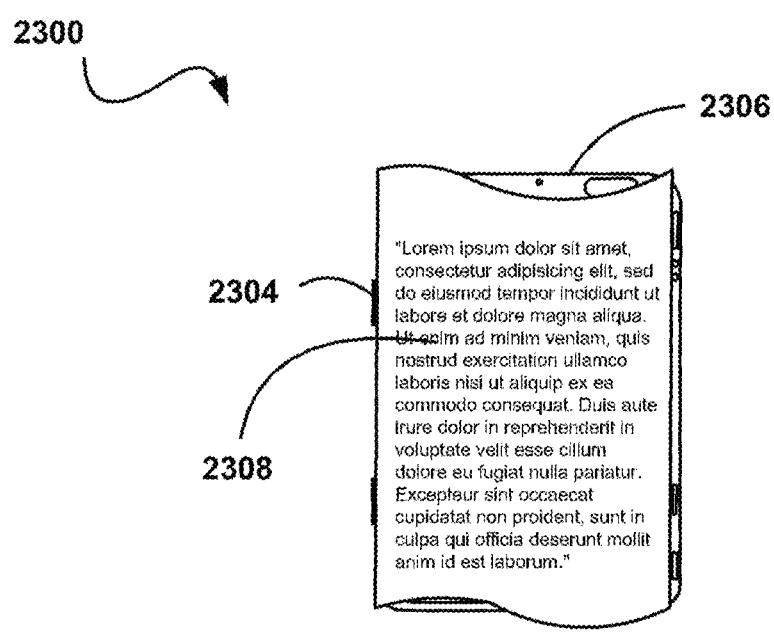

FIGS. 23A-B illustrate a cover 2300 having a first planar portion, and a hinge along the seam to which a tablet apparatus may be coupled, in accordance with one embodiment. As an option, the cover 2300 may be implemented in the context of the architecture and environment of the previous Figures or any subsequent Figure(s). Of course, however, the cover 2300 may be carried out in any desired environment. It should also be noted that the aforementioned definitions may apply during the present description.

As shown, a touchscreen display 2306 is included. A back face 2302 of a cover is included. Additionally, a hinge 2304 connecting the touchscreen display to the cover is illustrated.

In various embodiments, the cover may be composed of any material. For example, the cover may be constructed of leather, silicon, metal compounds, plastic, or any other material which may be suitable to cover the tablet apparatus. In one embodiment, the cover may be one flexible. For example, the cover may be constructed of a material that bends easily without breaking, or the material may be constructed in parts and connected with multiple seams to permit folding of the cover without breaking. In another embodiment, the cover may be rigid.

As shown, the front face of the cover 2308 may function as an e-ink display. For example, the material may be composed of flexible plastic sheets which may be used to display e-ink. In another embodiment, the e-ink may be displayed on any flexible substrate which can function both as an e-ink display and as a cover for the touchscreen display. Of course, the cover which may function as an e-ink display may incorporate any of the prior embodiments discussed previously.

In various embodiments, control of the e-ink display cover may occur on the touchscreen display. For example, the touchscreen display may display e-ink controls, content, and/or application(s) on the backlit display. In various embodiments, a social networking prompt may be displayed asking the user what was thought of the book, a rating system may be displayed asking the user to rate the material, a control guide may be displayed prompting the user to select the next chapter or any specific location in the material, a trashcan may be displayed prompting the user to throw away the material, a return rented materials prompt may be displayed prompting the user to return the rented digital materials to the proper location, and/or anything that may be related in some fashion either to the material displayed on the e-ink display, or to the e-ink reader in general. In one embodiment, based on the content of what may be displayed on the e-ink display, advertisements may be tailored and be displayed on the touchscreen. In another embodiment, based on the content of what may be displayed on the touchscreen display, advertisements may be tailed and be displayed on the e-ink display cover.

In another embodiment, the first backlit touchscreen display may be capable of being utilized as a control for the e-ink display cover. For example, an e-ink display application located on the touchscreen display may permit the user to view a thumbnail or even larger of what currently is displayed on the e-ink display, select content to highlight, add comments to the text using a stylus or any input tool (e.g. digital keyboard, microphone, etc.), and/or even control basic functions including go to next chapter, turn the page, go to the title page or appendix, enlarge the text, configure automatic page turns (e.g. after 1 minute, automatically turn the page), enable text-reading software, and/or download digital material. In some embodiments, the touchscreen display may include digital applications which may be used to control the e-ink display. For example, a digital rental application may permit the user to select books to rent for a limited time period, a photography management application may permit the user to select a photo album to be viewed on the e-ink display, and/or any application which may have printed-material related content may be used to control the e-ink display.

In a further embodiment, physical control buttons may be constructed into the cover of the e-ink display. For example, command buttons may be programmed to turn the page of the display, skip to the next chapter, etc. In another embodiment, the command buttons may only function when the e-ink cover display is being actively used. In the context of the present description, being actively used may refer to the e-ink display cover receiving a command (e.g. page turn, etc.) within a set preconfigured time period. Of course, any sensor on the apparatus (e.g. accelerometer, optical sensor, proximity sensor) may be configured to cause the page to turn, or to do any other preconfigured function.

Figure 24A:
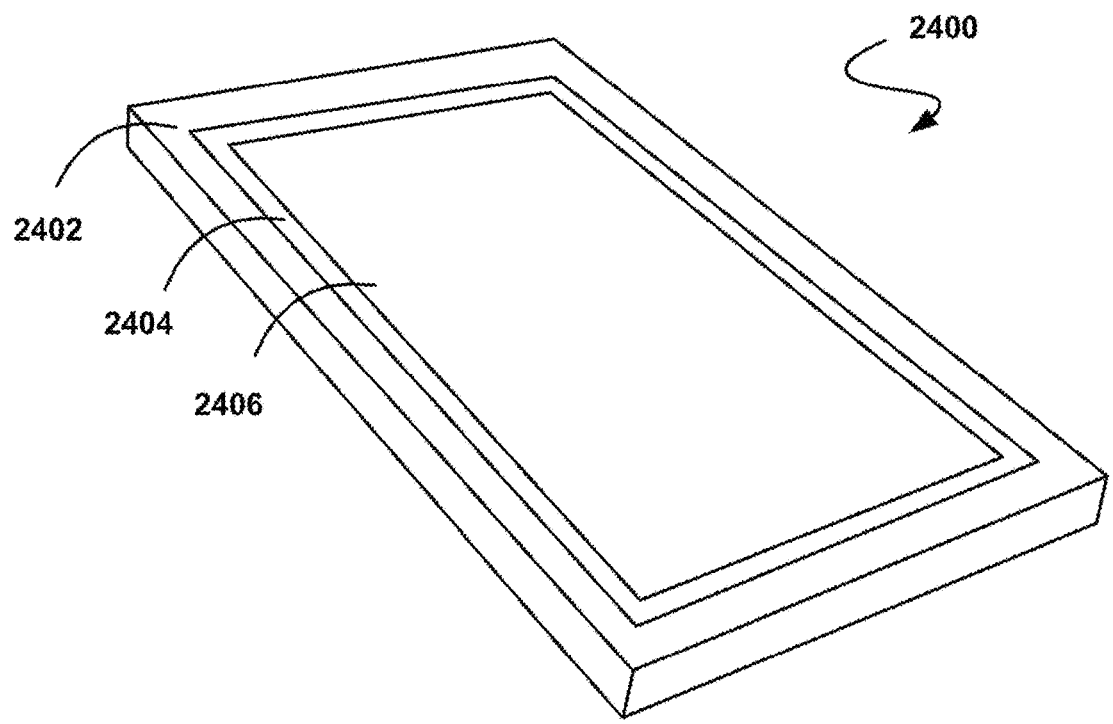
FIG. 24A illustrates a tablet apparatus, in accordance with one embodiment.

FIG. 24A illustrates a tablet apparatus 2400 having a tablet housing, a first backlit touchscreen display positioned on a first face of the tablet housing, and a second e-ink display positioned on the first face of the tablet housing, in accordance with one embodiment. As an option, the apparatus 2400 may be implemented in the context of the architecture and environment of the previous Figures or any subsequent Figure(s). Of course, however, the apparatus 2400 may be carried out in any desired environment. It should also be noted that the aforementioned definitions may apply during the present description.

As shown, a tablet housing 2402 is included. A first backlit touchscreen display 2404 positioned on a first face of the tablet housing is included. Additionally, a second e-ink display 2406 positioned on the first face of the tablet housing is also included.

In one embodiment, the e-ink display may function separate from the touchscreen display. For example, whenever the e-ink display functionality is requested, the touchscreen display may be disabled. In another embodiment, the e-ink display may be activated or deactivated by a mechanical power button.

In another embodiment, the e-ink display may function concurrently with the touchscreen display. For example, if parts of the touchscreen display include text, such text may be displayed using the e-text screen. In another embodiment, any item may be preconfigured to use the e-ink display. As such, battery life may be preserved and eye strain may be reduced.

In various embodiments, the e-ink reader screen and touchscreen display may be divided into sections. For example, while reading a book utilizing the e-ink display, the bottom of the touchscreen display may include images of controls (e.g. page forward, page back, settings, etc.) which can be selected by the user. Additionally, when watching a movie, any part of the e-text display may display appropriate text. Of course, both the e-ink display and the touchscreen display may be integrated (i.e. used) in any other manner together. In a further embodiment, to preserve battery life, the touchscreen display may be disabled and only the e-ink display activated and controlled by manual buttons. Additionally, a majority of the touchscreen display may be disabled while maintaining a touch sensitive panel to add functionality and control to the e-ink display.

In another embodiment, any section the screen that requires a high refresh rate may utilize the touchscreen display. In the context of the present description, a high refresh rate may refer to a refresh that is near continuous. For example, watching a movie may require a near continuous refresh rate and so would benefit from a touchscreen display. In one embodiment, the tablet apparatus may switch between an e-ink display and a touchscreen display based on one or more features of visual content. For example, the apparatus may display visual content with a low rate of change and/or simple color composition on an e-ink display and visual content with a high rate of change or detailed color composition on a video display. In another embodiment, the refresh rate may be set by the user. As such, in various embodiments, the tablet apparatus may determine whether the refresh rate of change is above a first threshold set by the user. For example, the tablet apparatus may compare the rate of change to a threshold to determine if the visual content is relatively static (e.g., below the threshold) or relatively dynamic (e.g., above the threshold).

In one embodiment, the e-ink display may display visual content in black-and-white or grayscale. In other embodiments, the e-ink display may display visual content in color. In one embodiment, the e-ink display may display visual content at any suitable brightness level or resolution. For example, the brightness level or resolution the e-ink display can be adjusted by a user (e.g., through display configuration options). In one embodiment, the tablet apparatus may configure the e-ink display or a portion the e-ink display to be translucent. For example, the tablet apparatus can configure an e-ink display or a portion thereof to transmit at least 50% of the light incident on the display, at least 60% of the light incident on the display, at least 70% of the light incident on the display, at least 80% of the light incident on the display, at least 90% of the light incident on the display, 100% of the light incident on the display, or any other suitable amount of light incident on the display.

In a further embodiment, a tablet apparatus may configure an e-ink display or a portion thereof to be translucent so that a user may see visual content provided by a video display under the e-ink display electronic paper display and under the touchscreen display. In another embodiment, the e-ink display may be located under the video display. Additionally, the tablet apparatus may configure the e-ink display or a portion thereof to be translucent using any suitable technique.

In some embodiments, portions of the e-ink display may be independently enabled. For example, portions of the e-ink display may be activated to provide visual content while other portions of the e-ink display may be configured to be translucent. In some embodiments, the e-ink display may include multiple regions that can be independently enabled. For example, a region the e-ink display may be translucent at a particular location the e-ink display, and that region may provide a segment of visual content corresponding to that location (e.g., lower right-hand corner) but displayed on the touchscreen display.

In some embodiments, the e-ink display may be configured to be translucent by changing the state of material in the display. An electronic paper display may include individually addressable microcapsules, each of which can include particles of different colors, and the particles may have different properties depending on the state of the particles. For example, the particles may appear a particular color in a solid state (e.g., white or black or any other combination color) but appear translucent in a gaseous state. In such embodiments, the electronic paper display or a portion thereof may be configured to be translucent by changing the state of the particles. For example, an electronic paper display can heat particles to convert them from solid to gas and, therefore, configure the electronic paper display to be translucent.

In some embodiments, a user can configure a system to specify if and how the tablet apparatus switches between the e-ink display and the touchscreen display. A user may be able to configure any aspect of determining one or more features of visual content and switching between displays based on the one or more determined features. For example, a user may be able to specify which feature of the visual content may be the basis for switching between displays. In some embodiments, a configuration screen may include an option for specifying if the tablet apparatus can independently switch regions of a composite display between portions of an electronic paper display and corresponding portions of a video display. In various embodiments, a configuration screen may include an option for specifying which features of visual content a tablet apparatus may switch between an e-ink display and a touchscreen display.

In a further embodiment, the e-ink display and touchscreen display may be used in conjunction to create a 3-D effect. For example, text or an image may be displayed on the e-ink display with 3-D shadowing displayed on the video display (e.g. below the e-ink display). As such, a 3-D effect may be produced by having visual content displayed on both the e-ink display and the video display. In another embodiment, the touchscreen display may be used to create a 3-D effect as used in conjunction with either the e-ink display or the video display.

Figure 24B:
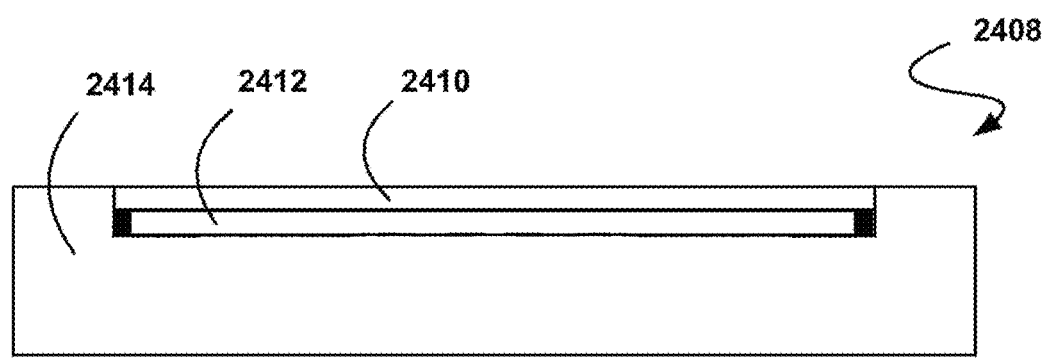
FIG. 24B illustrates a cross section a tablet apparatus, in accordance with one embodiment.

FIG. 24B illustrates a cross section a tablet apparatus 2408 having a tablet housing, a first backlit touchscreen display positioned on a first face of the tablet housing, and a second e-ink display positioned on the first face of the tablet housing, in accordance with one embodiment. As an option, the cross section 2408 may be implemented in the context of the architecture and environment of the previous Figures or any subsequent Figure(s). Of course, however, the cross section 2408 may be carried out in any desired environment. It should also be noted that the aforementioned definitions may apply during the present description.

As shown, a tablet housing 2414 is included. A first backlit touchscreen display 2410 positioned on a first face of the tablet housing is included. Additionally, a second e-ink display 2412 positioned on the first face of the tablet housing is also identified.

In one embodiment, the e-ink display may be positioned under the touchscreen display. For example, such a configuration may permit a user to still give feedback (e.g. select options on the screen) while maintaining the benefit of having the high contrast of an e-ink display. In another embodiment, an additional screen, such as a video screen, may be positioned below the e-ink display to permit continuous viewing of video content. Such a positioning may also be advantageous as the e-ink may also be set as translucent so that the video may be viewed without any obstructions. Of course, the displays on the tablet apparatus may be arranged in any manner and in any order.

Figure 25:
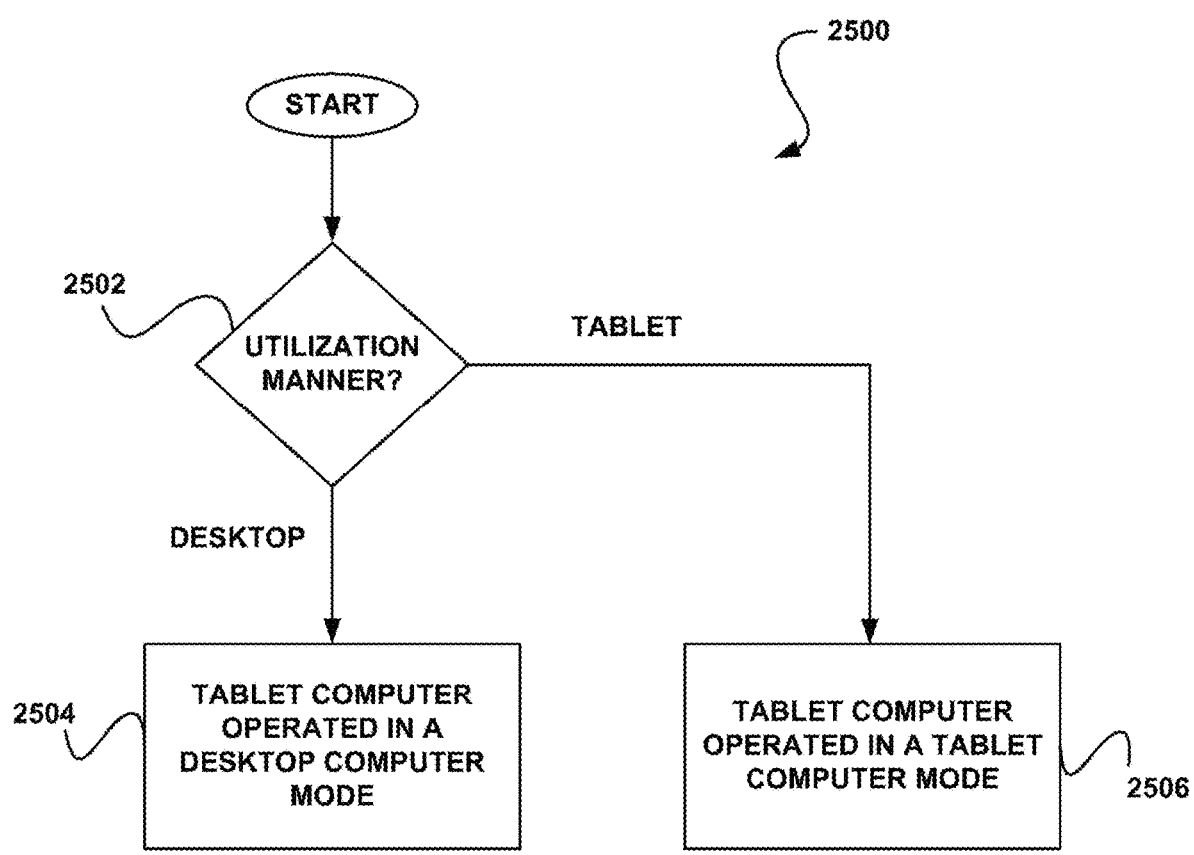
FIG. 25 shows a method for operating a tablet computer in a desktop computer mode, in accordance with one embodiment.

FIG. 25 shows a method 2500 for operating a tablet computer in a desktop computer mode, in accordance with one embodiment. As an option, the method 2500 may be implemented in the context of the architecture and environment of the previous Figures or any subsequent Figure(s). For example, the tablet computer disclosed herein may or may not include an e-ink display and/or any of the features described hereinabove. Of course, however, the method 2500 may be carried out in any desired environment. It should also be noted that the aforementioned definitions may apply during the present description.

As shown, it is determined whether a tablet computer is being utilized in a desktop computer manner or a tablet computer manner. See decision 2502.

In the context of the present description, utilization of a tablet computer in a desktop computer manner refers to any use of the tablet computer which requires the movement of the tablet computer to be confined to the vicinity of a predominantly stationary device, support structure, and/or apparatus. For example, in one embodiment, such utilization may include the use of the tablet computer in conjunction with an external display device (e.g. computer monitor, television, projector, etc.). In another embodiment, such utilization may include the use of the tablet computer in conjunction with an input device (e.g. keyboard, mouse, etc.). In yet another embodiment, such utilization may include the use of the tablet computer in conjunction with a mount, or any other stationary entity. To this end, the use herein of the term "desktop" in the context of desktop computer manner or a similar term should only be limited as defined, and not be construed as being limited to a work environment, thereby clearly encompassing other environments (e.g. social, entertainment, household, etc.).

In the context of the present description, a mount refers to a support structure that holds the tablet in a particular location, in a particular orientation. In various embodiments, the mount may include, but is not limited to, a display mount or an input mount. In the context of the present description, a display mount holds the tablet computer in such a way that it may function as a desktop computer display. Other example embodiments of a mount include, but are not limited to, mounts that can hold a tablet computer in a position typical to that of a television, a picture frame, a recipe book, and/or any device or object which displays visual information.

Additionally, in the context of the present description, an input mount is a mount which holds the tablet computer at an angle and height ideal for use as an input device. For example, in various embodiments, an input mount may include, but is not limited to, a keyboard mount, a trackpad mount, and/or a mount positioned similar to any other type of input device.

Furthermore, in the context of the present description, utilization of a tablet computer in a tablet computer manner refers to using the tablet computer in any manner that is not a desktop computer manner. For example, in one embodiment, the use of the tablet computer while being handheld and not connected to any external display device or input device.

Further, determining whether a tablet computer is being utilized in a desktop computer manner or a tablet computer manner may be based on any number of criteria. For example, in one embodiment, the determination of the manner of use may be based on a detection of a presence of the tablet computer on a display mount (e.g. wall mount, desktop stand, etc.). In another embodiment, the determination of the manner of use may be based on a detection of a presence of the tablet computer with respect to a keyboard mount.

In yet another embodiment, the determination of the manner of use may be based on a detection of a presence of the tablet computer in a proximity of a display (e.g. computer monitor, television, projector, etc.). Additionally, in another embodiment, the determination of the manner of use may be based on a detection of a presence of the tablet computer in a proximity of a keyboard.

In one embodiment, the determination of the manner of use may be based on a detection of a presence of the tablet computer in a proximity of a storage device. For example, the storage device may include an external hard drive, an external SSD, and/or any other device including memory. As an option, a wired connection between the tablet computer and a display, keyboard, storage device, and/or intermediary device/interface may be considered proximate, independent of the spatial relationship between the two devices.

In still another embodiment, the determination of the manner of use may be based on a detection of a presence of a sleeve for receiving the tablet computer, the sleeve including a top surface that simulates a tactile feel of a physical-button equipped keyboard while allowing touchscreen interaction with at least a portion of a backlit touchscreen display of the tablet computer.

The detection of the presence of another device or structure for the purpose of determining the manner of tablet computer use may be accomplished in a number of ways. In one embodiment, the tablet computer may detect the presence of a particular device or mount by receiving a signal (e.g. RFID, NFC, WiFi, ZigBee, Bluetooth, etc.) transmitted by the external device. In another embodiment, the tablet computer may detect the presence of a mount by sensing the magnetic field associated with one or more magnets embedded in the mount.

In another embodiment, determining whether a tablet computer is being utilized in a desktop manner or a tablet computer manner may be based upon user input (e.g. hardware switch, GUI input, etc.). In another embodiment, the determination may be made based upon whether the tablet computer has remained motionless for a predefined period of time. In yet another embodiment, the determination may be made based upon whether the tablet computer has remained in a predefined orientation for a predefined period of time. As an option, the predefined orientation may be associated with the use of a mobile stand (e.g. multipurpose cover, folding travel stand, etc.).

If it is determined that the tablet computer is being utilized in a desktop computer manner, the tablet computer is operated in the desktop computer mode. See operation 2504.

In the context of the present description, a computer mode refers to a collection of tablet computer properties or lack thereof associated with a particular use scenario. For example, in various embodiments, the tablet computer properties may include, but are not limited to, user preferences, input options, output options, power conservation policies, processing capacity, access permissions, and/or any other type of setting that may be attributable to a tablet computer. Switching between modes may be done automatically (e.g. environmental, spatial, temporal, and/or situational triggers, etc.) or manually (e.g. triggered by user input, etc.). In this way, the tablet computer properties can be tailored to specific use environments and situations, maximizing the functionality of the device.

In the context of the present description, a desktop computer mode refers to a collection of tablet computer properties associated with operating the tablet computer in a desktop setting. A desktop computer mode may include using the tablet computer as an input device. For example, in one embodiment, the tablet computer may be utilized as a keyboard in the desktop computer mode for receiving input adapted for being processed by the tablet computer to produce output for display utilizing a display device. In another embodiment, the tablet computer may be utilized as a keyboard in conjunction with a sleeve, the sleeve including a top surface that simulates a tactile feel of a physical-button equipped keyboard while allowing touchscreen interaction with at least a portion of a backlit touchscreen display of the tablet computer.

Further, a desktop computer mode may include operating the tablet computer as a display. For example, in one embodiment, the tablet computer may be utilized as a display in the desktop computer mode for displaying output (e.g. text, graphics, etc.) produced by processing input received utilizing an input device (e.g. keyboard, mouse, etc.) separate from the tablet computer. In another embodiment, the input device may include a smart phone. In one embodiment, the tablet computer may be capable of operating in a landscape mode when positioned on a display mount (e.g. wall mounted tablet holder, desktop tablet holder, desktop mounted tablet holder, etc.) in a horizontal orientation, in the desktop computer mode. In another embodiment, the tablet computer may be capable of operating in a portrait mode when positioned on a display mount in a vertical orientation, in the desktop computer mode. In still another embodiment, the tablet computer may be capable of operating in a dual display mode (e.g. two displays operating as a single display, etc.) when positioned on a display mount next to another tablet computer, in the desktop computer mode.

In still another embodiment, initiation of operation of the tablet computer in desktop computer mode may automatically prompt automatic powering up and/or removal of a standby status of peripherals including, but not limited to a monitor, printer, etc. Conversely, termination of operation of the tablet computer in desktop computer mode may automatically prompt automatic powering down and/or initiation of a standby status of peripherals including, but not limited to a monitor, printer, etc. Still yet, any resources (e.g. on-line application, hard drive, etc.) that requires a log-in may be automatically logged in or out based on the initiation or termination of the operation of the tablet computer in desktop computer mode. This may, in one embodiment, all be accomplished by a control signal being sent from the tablet computer to the corresponding peripheral/resource.

As an option, a desktop computer mode may be altered or chosen based on a tablet computer's ability to differentiate between a plurality of mounts. In one embodiment, at least one aspect of the tablet computer may be altered based upon a determination of which of a plurality of different display mounts the tablet computer is operating with, in the desktop computer mode. The at least one aspect altered may include, but is not limited to, access to at least one resource (e.g. printer, server, display, keyboard, storage, etc.), display brightness, sound volume, input method, etc. In another embodiment, the at least one aspect may include disabling at least one capability of the tablet computer.

Optionally, a desktop computer mode may provide access to resources not available when the tablet computer is operated in a tablet computer mode. In one embodiment, access to different resources of at least one server may be conditionally provided based on the whether the tablet computer is being utilized in the tablet computer manner or the desktop computer manner. For example, streaming movies over a network while utilizing the tablet computer in a tablet computer manner may only provide a stereo audio track, while streaming a movie in a desktop computer manner may provide a surround sound audio track.

As an option, a desktop computer mode may disable aspects of the tablet computer. In one embodiment, a plurality of different capabilities may be conditionally disabled based on the whether the tablet computer is being operated in the desktop computer mode. In another embodiment, the capabilities may involve use of a physical start button. For example, the capabilities may include a required use of a physical start button to prompt the tablet computer from a sleep mode. In this case, the tablet computer may be prompted from a sleep mode by another method (e.g. gesture, sound, wireless signal, etc.).

In another embodiment where the tablet is used in a desktop computer mode in a role other than a keyboard, the disabled capabilities may involve the appearance of a virtual keyboard that is displayed on a touchscreen of the tablet computer for input purposes, when certain input fields, icons, etc. are selected (e.g. by touch gesture or otherwise, etc.). In such desktop computer mode embodiment, such virtual keyboard would not be necessary (and possibly problematically require screen real-estate) in view of the optional use of a keyboard in the desktop computer mode. To this end, such capability may be selectively disabled in the present desktop computer mode embodiment.

A desktop computer mode may allow the tablet computer to receive input through a number of different means. In various embodiments, the tablet computer includes a camera. A desktop computer mode may include utilizing the camera as a control input device. For example, in one embodiment, the camera may be utilized to detect control gestures without a user having to physically touch the tablet computer. In the context of the present description, control gestures refer to hand and/or finger motions using one or both hands, representing control commands to be executed by the tablet computer.

In other embodiments, motions may be detected, utilized, etc. for controlling the tablet computer, mobile device, etc. (or any other device, etc.), utilizing any one or more techniques described in U.S. Provisional Application Ser. No. 61/415,170, filed Nov. 18, 2010, which is incorporated herein by reference in its entirety for all purposes. Of course, any technique, embodiment, feature, etc. disclosed in U.S. Provisional Application Ser. No. 61/415,170, filed Nov. 18, 2010, may be incorporated with any one or more (or none) of the embodiments disclosed herein.

In various embodiments, the tablet computer may be used in conjunction with a smart phone, such that the smart phone operates as an input device. For example, in one embodiment, the smart phone may be utilized to detect control gestures for controlling the tablet computer, in the desktop computer mode. In another embodiment, the control gestures for controlling the tablet computer may be available only when the smart phone is working in connection with the tablet computer in the desktop computer mode. In yet another embodiment, the smart phone may provide a laser projected virtual keyboard. Additionally, in another embodiment, the smart phone may be utilized as a mouse, a trackpad, or any other physical input device.

In still another embodiment, the tablet computer may include a projector (e.g. LCD projector, DLP projector, laser diode projector, etc.), and the projector may be utilized to display a virtual keyboard that is capable of being used to receive input for the tablet computer, while in the desktop computer mode.

If it is determined that the tablet computer is being utilized in the tablet computer manner, the tablet computer is operated in the tablet computer mode. See operation 2506.

In the context of the present invention, a tablet computer mode refers to a collection of tablet computer properties associated with operating the tablet computer separate from a desktop setting. For example, in one embodiment, a tablet computer mode may reduce the processor speed to extend battery life.

More illustrative information will now be set forth regarding various optional architectures and features with which the foregoing techniques discussed in the context of any of the present or previous figure(s) may or may not be implemented, per the desires of the user. For instance, various optional examples and/or options associated with the determination of the manner of utilization in decision 2502, the operation of the tablet computer in a desktop computer mode of operation 2504, the operation of the tablet computer in a tablet computer mode of operation 2506, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 26:
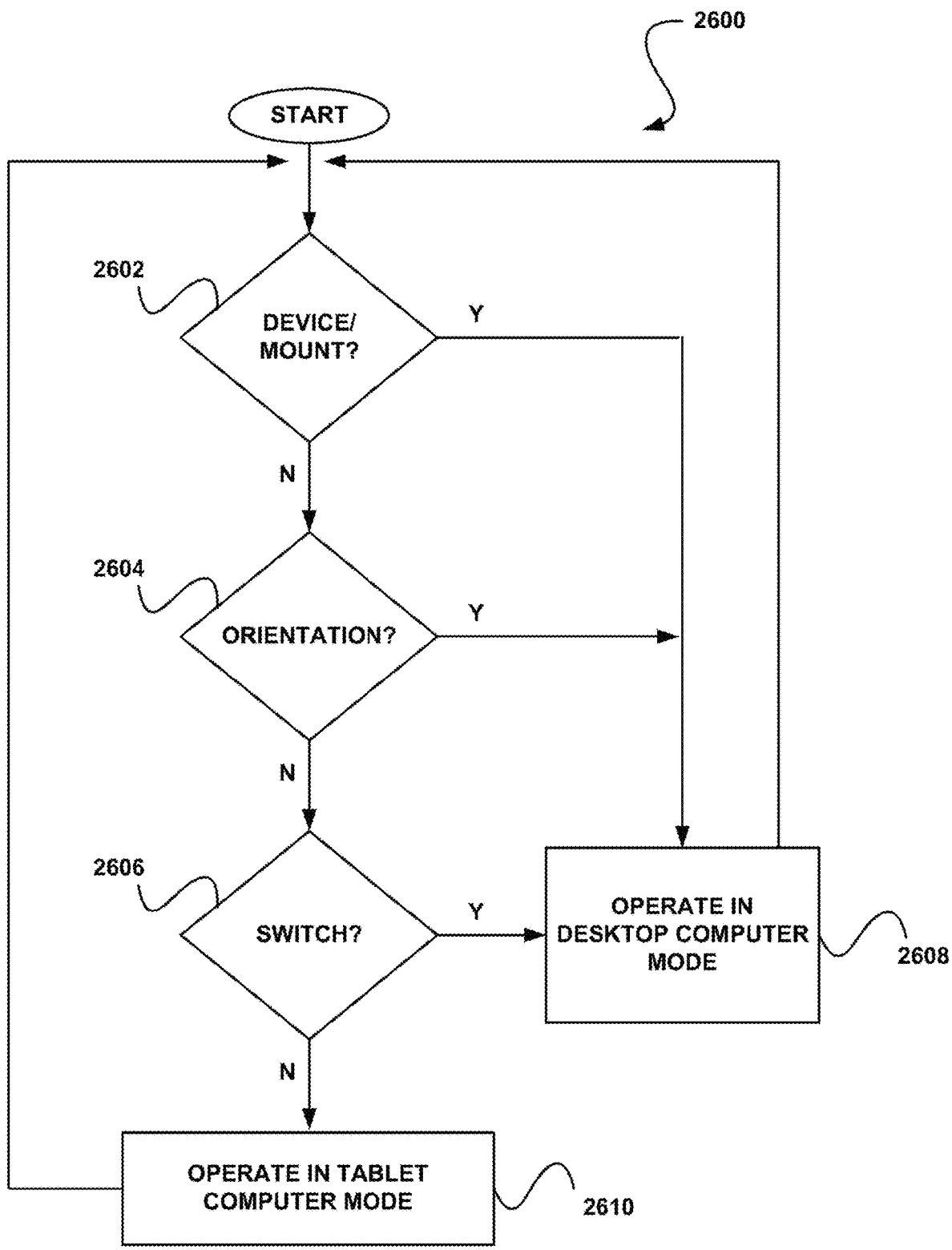
FIG. 26 shows a method for determining whether a tablet computer is being utilized in a desktop computer manner, in accordance with one embodiment.

FIG. 26 shows a method 2600 for determining whether a tablet computer is being utilized in a desktop computer manner. As an option, the method 2600 may be implemented in the context of the architecture and environment of the previous Figures or any subsequent Figure(s). Of course, however, the method 2600 may be carried out in any desired environment. It should also be noted that the aforementioned definitions may apply during the present description.

As shown, it is determined whether a tablet computer is being utilized in a desktop computer manner in connection with a known desktop peripheral device or known mount. See determination 2602.

In the context of the present description, a desktop peripheral device is a device external to the tablet computer that can be associated with desktop computer use. For example, in various embodiments, desktop peripheral devices may include, but are not limited to, display devices, input devices, magnetic storage devices, solid state storage devices, optical storage devices, audio devices, printers, game controllers, and/or any other device capable of interfacing with the tablet computer which a user wishes to associate with a desktop setting.

In various embodiments, a desktop peripheral device may be associated with an identifier, which may be detected by the tablet computer (e.g. wireless signal, passive RFID tag response, audio signal, etc.). In one embodiment, the identifier may explicitly describe the associated desktop peripheral device (e.g. device make and model, etc.). In another embodiment, the identifier may be random, such that it is impossible to determine the device type, make, and/or model of the desktop peripheral device using just the identifier. In yet another embodiment, the identifier may only describe the device type. In still another embodiment, all desktop peripheral devices of the same make and model may share the same identifier. In another embodiment, the identifier may be used to differentiate between two desktop peripheral devices of identical make and model.

In yet another embodiment, the identifier may be broadcast in such a way that it is difficult to detect through interior and/or exterior walls of a property (e.g. home, apartment, office, etc.). This may be accomplished by limiting signal strength, hiding the signal in a large number of false identifiers, using highly directional antennae, and/or any other method of hiding a signal. In this way, it would be difficult to determine what types of devices are located within a property or room.

In various embodiments, the tablet computer may also detect whether the desktop peripheral device is available for use with the tablet. Desktop peripheral devices may be able to transmit their identity and availability, even while in a sleep mode or turned off. As an option, the tablet computer may also be able to control the desktop peripheral device. For example, in one embodiment, a tablet computer, having detected the presence of a desktop peripheral device that is not available for use may instruct the desktop peripheral device to make itself available (e.g. change the video input on a television, change the audio input on a stereo, power up a monitor from sleep mode, turn on a printer, etc.).

In the context of the present description, a known desktop peripheral device is a desktop peripheral device that has previously been paired with the tablet computer. Further, in the context of the present description, pairing a desktop peripheral device with a tablet computer refers to the establishment of trigger parameters for that particular device. For example, in one embodiment, once a user has established trigger parameters for a particular display, that display may be able to cause the tablet computer to operate in a desktop computer mode without further user input. As an option, a user may specify that all peripheral desktop devices of the same type (e.g. all keyboards, all displays, etc.) share the same trigger parameters.

Additionally, in the context of the present description, trigger parameters define the specific conditions in which a particular device or object may cause a tablet computer to operate in a desktop computer mode. In various embodiments, trigger parameters may include, but are not limited to, threshold proximity, device availability, tablet computer power source, and/or a schedule. Additional trigger parameters may include a powering on and/or off of a peripheral such as a monitor, etc. As a further option, user input (e.g. user confirmation, password entry, authentication, etc.) may or may not be required in combination with any one or more of the above, in order to avoid an unwanted mode switch.

In the context of the present description, threshold proximity refers to the distance at which a known desktop peripheral device may trigger a desktop computer mode. The distance between a tablet computer and a desktop peripheral device may be determined in a number of ways, including, but not limited to, measuring the strength of an identifier or other signal associated with the desktop peripheral device, triangulating the relative position of a desktop peripheral device transmitting signals from multiple locations on the device, and/or any other method of measuring the distance between two points in space.

In one embodiment, the threshold proximity may be predefined by the device manufacturer. In another embodiment, the threshold proximity may be established by a user through a tablet computer GUI. As an option, a wired connection between the tablet computer and a desktop peripheral device may be considered within the proximity threshold, independent of the actual spatial relationship between the two devices.

In one embodiment, a user may define a set of trigger parameters for a particular desktop peripheral device to be used when the tablet computer is battery powered, and another set of trigger parameters to be used when the tablet is powered by an external source. For example, in one embodiment, proximity to a display device may trigger a desktop computer mode when the tablet computer is connected to a power source, but not when the tablet computer is operating using battery power.

In one embodiment, a user may define trigger parameters based on a schedule. For example, in one embodiment, a user may specify that a game controller may only trigger a desktop computer mode after a certain time of day, or on the weekend. In another embodiment, a user may specify that a tablet computer may only command a particular desktop peripheral device to make itself available late at night, when such an action is less likely to disrupt someone else's use of the peripheral (e.g. television, stereo, etc.).

Mounts may be classified as one of two types, active or passive. In the context of the present description, an active mount is a powered mount from which proximity to the tablet computer can be determined, similar to one embodiment of the desktop peripheral device. For example, in one embodiment, an active display mount may include a power cord to charge a tablet computer as well as power an optional transmitter that broadcasts an identifier associated with that mount. Active mounts may be treated as desktop peripheral devices. Any previous or subsequent discussion regarding features, functionality, capabilities, etc. of desktop peripheral devices may also apply to active mounts.

Additionally, in the context of the present description, a passive mount is a mount that does not actively transmit an identifier. In one embodiment, a passive mount may incorporate one or more magnets which interact with sensors in a tablet computer. The tablet computer may determine the type of mount it is in contact with by the location of the magnets. For example, in one embodiment, a magnet detected at the corner of the tablet computer may indicate a display mount, while a magnet detected in the middle of one side of the tablet computer may indicate a keyboard mount. In another embodiment, a passive mount may also incorporate a passive RFID tag to provide an identifier when energized by a signal produced by the tablet computer.

In various embodiments, trigger parameters for mounts may be based upon contact between the tablet computer and a mount. For example, in one embodiment, a user may define trigger parameters for a particular display mount such that the tablet computer may begin to operate in a desktop computer mode once contact with that display mount has been detected.

In various embodiments, contact between a tablet computer and a mount may be determined in a number of ways.

For example, in one embodiment, contact between the tablet computer and a mount may be determined by the interaction between one or more magnets embedded in the mount and sensors in the tablet computer.

In another embodiment, contact between a tablet computer and an active mount may be defined as the smallest threshold proximity that can be discerned (e.g. maximum signal strength, minimum triangulated distance, etc.).

In yet another embodiment, contact between a mount and a tablet computer may be detected when the tablet begins to charge through an induction pad incorporated into the mount.

In still another embodiment, the determination whether the tablet computer is in contact with a mount may be based upon a device identifier or other signal received over a wired interface. In various embodiments, a mount may incorporate a cable interface which plugs into the tablet computer when it is placed in the mount. This cable interface may provide power to the tablet computer. This cable interface may also provide a wired connection to desktop peripherals with which a wireless connection may be too slow, impractical, or insecure.

If it is determined that a tablet computer is not being utilized in a desktop computer manner due to a known desktop peripheral device or mount, it is then determined whether the tablet computer is in a predetermined orientation associated with utilization in a desktop computer manner. See determination 2604. In various embodiments, the orientation of the tablet computer is determined using one or more internal accelerometers. Additionally, in various embodiments, the predetermined orientation may be the orientation assumed by the tablet computer when it is placed on a tablet stand, on a surface.

In one embodiment, the predetermined orientation may be the orientation associated with the use of a particular tablet stand. In another embodiment, the predetermined orientation may be selected by the user from a plurality of orientations associated with a plurality of known desktop stands. In yet another embodiment, the user may predefine the triggering orientation through a tablet computer GUI. In still another embodiment, a plurality of predetermined orientations may be associated with utilization in a desktop computer manner.

Further, in one embodiment, maintenance of the predetermined orientation may be required for a predetermined amount of time. In this way, accidental mode switches may be prevented. In another embodiment, a user can specify the predetermined amount of time. In still another embodiment, further determinations regarding the manner of utilization of the tablet computer are not delayed while waiting to determine if a predetermined orientation will be held for the predetermined amount of time.

If it is determined that the tablet computer is not in a predetermined orientation associated with utilization in a desktop computer manner, it is then determined whether the user has manually activated a desktop computer mode. See determination 2606. In one embodiment, the user may activate desktop computer mode by toggling a hardware switch. In another embodiment, the user may activate a desktop computer mode using a tablet computer GUI. In this way, the user can operate their tablet computer in desktop computer mode in a situation which might not satisfy the previous determinations, such as on a turbulent plane ride.

If the result of any of the determinations 2602 through 2606 were in the affirmative, the tablet computer is made to operate in a desktop computer mode. In one embodiment, the user may use a tablet computer GUI to specify that one or more of these determinations be skipped/avoided. As a specific example, a user may manually disable efforts to detect proximity to desktop peripheral devices or mounts. This may be done to reduce power consumption, or to avoid interference while on an airplane.

If the result of any of the determinations 2602 through 2606 were in the affirmative, the tablet computer is made to operate in a desktop computer mode. See operation 2608. In one embodiment, there is a single predefined desktop computer mode which may be activated by the affirmative determination. In another embodiment, one of a plurality of predefined desktop computer modes is activated. As an option, a user may define the one or more desktop computer modes (e.g. home, work, etc.).

Once the tablet computer is operating in a desktop computer mode, it is again determined whether the tablet computer is still being utilized in a desktop computer manner, by continuing to make determinations 2602 through 2606 as needed. In one embodiment, it may be determined whether the tablet computer is being used in a desktop computer manner associated with a different desktop computer mode.

If the result of determinations 2602 through 2606 were each negative, then the tablet computer is being utilized in a tablet computer manner, and is made to operate in a tablet computer mode. See operation 2610. Once the tablet computer is operating in a tablet computer mode, it is again determined whether the tablet computer is being utilized in a desktop computer manner, by again making determinations 2602 through 2606 as needed.

It should be noted that, while multiple determinations 2602 through 2606 are disclosed, it is conceived that that only a subset of such determinations (e.g. a single one) or even a different type of determination(s) is utilized for similar purposes. Further, the decision to revert to tablet computer mode may take the form of the reverse of the determinations 2602 through 2606 disclosed above. For example, such reversion may take place after a dismount/disconnection, accelerometer-detected movement of the tablet off a mount or other predetermined position, etc.

In various embodiments, a tablet computer mode may be defined to extend battery life. In one embodiment, a tablet computer mode may increase the amount of time between emitting active RFID signals. In another embodiment, the screen brightness may be reduced. In yet another embodiment, the power devoted to detecting desktop peripheral devices may be reduced.

In one embodiment, a tablet computer mode may vary depending on the location of the tablet computer (e.g. using GPS signals, etc.). For example, a tablet computer may only determine whether desktop peripheral devices or mounts are present when the tablet computer is in one or more predefined locations, such as an office or home. In one embodiment, the tablet computer mode may depend on location and the location may be configurable. For example, in one embodiment, an application associated with the tablet computer may be utilize to select locations (e.g. based on an address, GPS coordinates, etc.) where the tablet computer mode is to be or is not to be activated. In one embodiment, the GUI associated with the application may be utilized to select one or more locations on a map indicating where the tablet computer mode is to be or is not to be activated.

In another embodiment, the tablet computer mode may depend on location and the location may be automatically configurable. For example, in one embodiment, a user may select to be in desktop computer mode or tablet computer mode in a certain area. The computer (or computer code associated therewith) may determine whether the particular mode has been selected on one or more other occasions in the same general area (e.g. based on a log file, etc.). If the particular mode has been selected on one or more other occasions in the same general area, the computer may determine to automatically activate the particular mode (e.g. desktop mode or tablet mode, etc.) in the future, when the computer is in the general location.

The location may be determined in a variety of ways. For example, in one embodiment, the location may be determined utilizing GPS coordinates associated with a current location of the computer. In one embodiment, the location may be determined based on a radius from the determined coordinates. In this way, when the computer is generally in the same location, the mode may be activated.

In another embodiment, the location may be based on an address. For example, if the computer is determined to be located at a particular address (e.g. or within a threshold distance, etc.), the mode may be activated. In another embodiment, signal strength of a known device (e.g. a wireless router, etc.) may be utilized to determine whether the mode should be activated.

For example, in one embodiment, the computer may be configured to detect signal strengths of one or more wireless routers in a particular location. Once the computer has detected the signal strengths, the computer may determine whether a desktop mode or table computer mode is more appropriate. In various embodiments, the determination may be made based on a current mode of the computer and/or based on user input (e.g. in one embodiment, a user may initially be prompted to select an appropriate mode, etc.). In one embodiment, a range of the signal strengths (e.g. a min, max, etc.) may be utilized to determine whether a desktop mode or table computer mode is more appropriate. Based on this determination, the computer may be configured such that the appropriate mode may be automatically selected in the future, when the computer is in the location.

In another embodiment, a tablet computer mode may vary depending on the speed in which the tablet computer is moving. For example, a user may define a tablet computer mode such that the tablet computer does not listen (or reduce a listening cycle) for desktop peripheral devices or mounts when it is determined that the tablet computer is moving faster than a person might move in a desktop setting. As an option, the sensors used to detect desktop peripheral devices and mounts may not be reactivated until the speed of the tablet computer has been below a predefined threshold for a predefined amount of time.

In one embodiment, the tablet computer mode may be activated whenever the computer detects a movement beyond a threshold distance. For example, in one embodiment, the computer may be configured to operate in a tablet computer mode whenever the computer is moving more than a distance that would indicate ordinary desktop movement (e.g. >0.5 cm, 1 cm, etc.).

In another embodiment, a camera associated with the computer may be utilized to determine in which mode the computer should operate. For example, in one embodiment, the camera may be utilized to detect a scene (e.g. a background scene, etc.). Based on the detected scene, the computer may automatically determine a mode in which to operate.

For example, in one embodiment, one or more image processing techniques may be utilized to determine whether a background in one or more captured images is static, thus indicating the computer is stationary. In this case, the determined mode may be the desktop mode. As another example, one or more image processing techniques may be utilized to determine whether a background in one or more captured images is a known background (e.g. of an office, etc.). In this case, the determined mode may be the mode associated with the known background.

As another example, one or more image processing techniques may be utilized to determine whether a background in one or more captured images is non-static. In this case, the determined mode may be a tablet mode. In another embodiment, a microphone associated with the computer may be utilized to determine in which mode the computer should operate.

For example, a microphone associated with the computer may detect ambient noise. Based on the detected ambient noise, the mode may be determined. For example, if the ambient noise is determined by the computer (or computer code associated therewith) to be ambient office noise (e.g. based on a lack of talking, based on printer noise, based on a frequency analysis of the ambient noise, etc.), it may be determined that a desktop mode is appropriate. On the other hand, if the ambient noise is determined by the computer (or computer code associated therewith) to be ambient outdoor noise (e.g. based on talking, based on vehicle traffic, based on a frequency analysis of the ambient noise, etc.), it may be determined that a tablet mode is appropriate. Of course, any number of techniques may be used to determine the appropriate mode for the computer.

Figure 27:
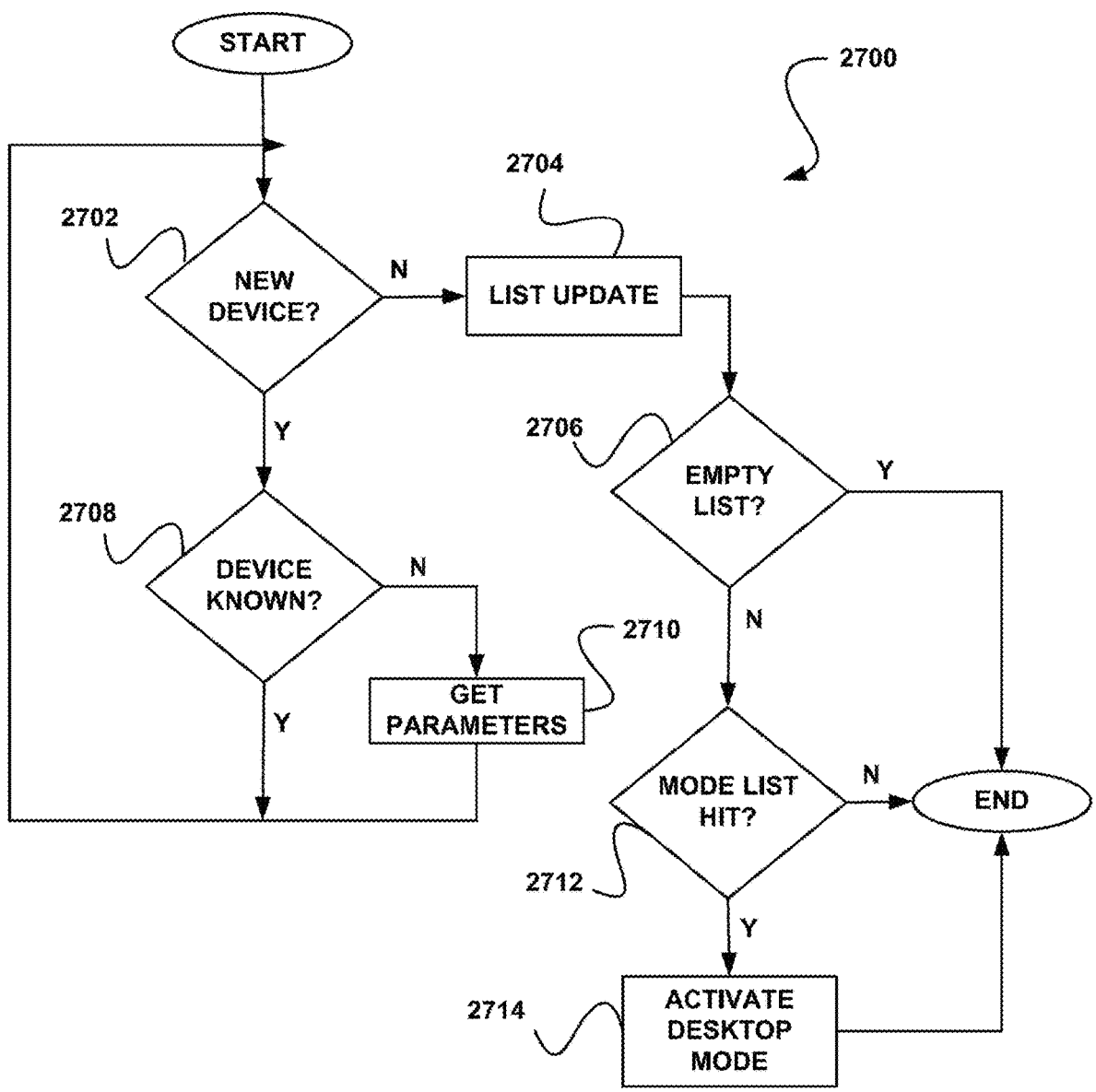
FIG. 27 shows a method for determining whether a tablet computer is being utilized in a desktop computer manner due to a desktop peripheral device or mount, in accordance with one embodiment.

FIG. 27 shows a method 2700 for determining whether a tablet computer is being utilized in a desktop computer manner due to a desktop peripheral device or mount, in accordance with one embodiment. As an option, the method 2700 may be implemented in the context of the architecture and environment of the previous Figures or any subsequent Figure(s). Of course, however, the method 2700 may be implemented in any desired environment. The aforementioned definitions may apply during the present description.

As shown, it is determined whether the tablet computer can sense a desktop peripheral device or mount which is not on the visible device list. See determination 2702. In the context of the present description, a visible device list refers to a list of all desktop peripheral devices and/or mounts which a tablet computer is able to detect at the present time. In one embodiment, the visible device list is maintained in the memory of the tablet computer. In another embodiment, if it is determined that the tablet computer can sense a desktop peripheral device or mount which is not on the visible device list, the device or mount is added to the visible device list.

In one embodiment, the detection of a plurality of desktop peripheral devices and/or mounts not on the visible device list may result in the plurality being added to the visible device list. In subsequent steps of method 2700, the plurality of devices and/or mounts are treated in parallel. In another embodiment, the detection of a plurality of devices and/or mounts is handled in a serial fashion, one desktop peripheral device or mount at a time.

If it is determined that the tablet computer cannot sense a desktop peripheral device or mount which is not on the visible device list, then the visible device list and the trigger device list are both updated. See operation 2704. In the context of the present description, the trigger device list is a subset of the visible device list containing all desktop peripheral devices and mounts whose trigger parameters are presently satisfied. Additionally, in the context of the present description, updating the visible device list refers to removing any desktop peripheral devices or mounts from the list which the tablet computer can no longer detect. Furthermore, in the context of the present description, updating the trigger device list refers to evaluating the trigger parameters for all devices on the visible device list, and amending the trigger device list accordingly.

As shown, it is determined whether the trigger device list is empty. See determination 2706. If the trigger device list is empty, the tablet computer is not configured for being utilized in a desktop computer manner due to a desktop peripheral device or mount. In one embodiment, it may also be determined if the visible device list is empty. If the visible device list is empty, further determinations regarding proximity to or contact with desktop peripheral devices and mounts may be performed less frequently. In this way, battery power may be extended while the tablet computer is being used in a mobile setting, for example, yet still automatically detect and react to the presence of desktop peripheral devices and mounts. Once a single device or mount is detected, the determination may be performed more frequently to provide greater responsiveness, in accordance with one embodiment.

If it is determined in 2702 that the tablet computer can sense a desktop peripheral device or mount which is not on the visible device list, it is then determined if the newly visible device or mount is known. See determination 2708. In various embodiments, the tablet computer maintains a list of all known desktop peripheral devices and known mounts (i.e. devices and mounts for which trigger parameters have been established).

If it is determined that the newly visible desktop peripheral device or mount is not known, the trigger parameters for the unknown device or mount are established. See operation 2710. In one embodiment, the user may be prompted to define the trigger parameters for the newly discovered device or mount. In another embodiment, the user may only be prompted to define the trigger parameters if the tablet computer has been placed in a learning mode. More optional information on such learning mode will be set forth later in the context of different embodiments.

In yet another embodiment, the unknown desktop peripheral device or mount may be given a set of default trigger parameters, without prompting the user. The default trigger parameters may vary depending on the type of device or mount detected. As an option, the user may be able to predefine the default trigger parameters given to new devices and mounts. In another embodiment, the default trigger parameters are predefined.

If it is determined in 2706 that the trigger device list is not empty, it is then determined whether the tablet computer is operating in the most appropriate desktop computer mode. See determination 2712. In various embodiments, the tablet computer may operate in one of a plurality of desktop computer modes. In one embodiment, these modes are indexed in a desktop computer mode list, along with their associated mode conditions.

In the context of the present description, a mode condition is a condition that must be satisfied before the associated computer mode may be activated. Mode conditions may include, but are not limited to, the presence of a particular desktop peripheral device, contact with a certain type of mount, a certain time of day or day of the week, a geographic location, and/or any other environmental, spatial, temporal, or situational detail.

In various embodiments, the activation of a desktop computer mode may be conditional on the satisfaction of the trigger parameters of one or more desktop peripheral devices and/or mounts. For example, in one embodiment, a user may define a desktop computer mode which activates when an available display is within a certain threshold distance of the tablet computer (e.g. a couple feet, physically connected/mounted, etc.).

In various embodiments, the activation of a desktop computer mode may be conditional upon time. For example, in one embodiment, a desktop computer mode may be defined such that it may only be activated on Tuesdays, or between 9 am and 11 am. In another embodiment, a desktop computer mode may be defined which may only remain activated for a set amount of time per day, week, or month. As a specific example, a user may create a desktop computer mode which limits the amount of time the tablet computer may operate as a video game console within a given week. In yet another embodiment, a tablet computer GUI may report the amount of time the tablet computer has spent operating in various computer modes, as well as the time remaining on computer modes with temporal budgets.

In various embodiments, the activation of a desktop computer mode may be conditioned upon the geographic location of the tablet computer. For example, in one embodiment, a user may define a desktop computer mode which relies on the presence of a mouse, and a different desktop computer mode which relies on the same mouse, but at a different location, such as an office (e.g. as determined by a check-in procedure, GPS coordinates, etc.). In this way, desktop computer modes can be defined which depend on the presence and availability of desktop peripheral devices which are easily transported, such as mice, keyboards, and/or any other small desktop peripheral device. As another example, a user may define a desktop computer mode for home use, which commands all displays within range to make themselves available to the tablet computer, and a similar desktop computer mode for use at a relative's home, which prompts the user for confirmation before demanding availability.

In various embodiments, the activation of a desktop computer mode may be conditioned upon other environmental or situational details. For example, in one embodiment, a user may define a desktop computer mode to require access to a Wi-Fi network. In another embodiment, a user may define a desktop computer mode that will not activate if the tablet is only able to attain a cellular data connection. In yet another embodiment, a desktop computer mode may be defined such that it will only be available in low lighting conditions, such as the dim lights of a home theater setting.

In one embodiment, the determination of which desktop computer mode the tablet computer should operate in is performed by evaluating the mode conditions of each desktop computer mode in the desktop computer mode list until a desktop computer mode is found whose mode conditions are satisfied. As an option, the desktop computer mode list may be ordered by priority, such that the evaluation begins with the highest priority desktop computer mode and ends with the lowest priority. In one embodiment, the tablet computer user may specify the priority of the desktop computer modes.

As a specific example, a user might define a desktop computer mode which requires the proximity and availability of a game controller and a display; upon activation of this mode, the tablet computer display is deactivated to conserve VRAM, and a list of game applications is presented. The user might place this desktop computer mode at a higher priority than a mode that requires a display and a mouse, wherein the tablet is used as a keyboard. Such a prioritization would allow the user to initiate a gaming experience simply by activating a game controller (i.e. making it available), even if a keyboard was also present.

If it is determined that the tablet computer is not operating in the most appropriate desktop computer mode, the appropriate desktop computer mode is activated. See operation 2714. In various embodiments, the tablet computer may employ the method shown in FIG. 28

Figure 28:
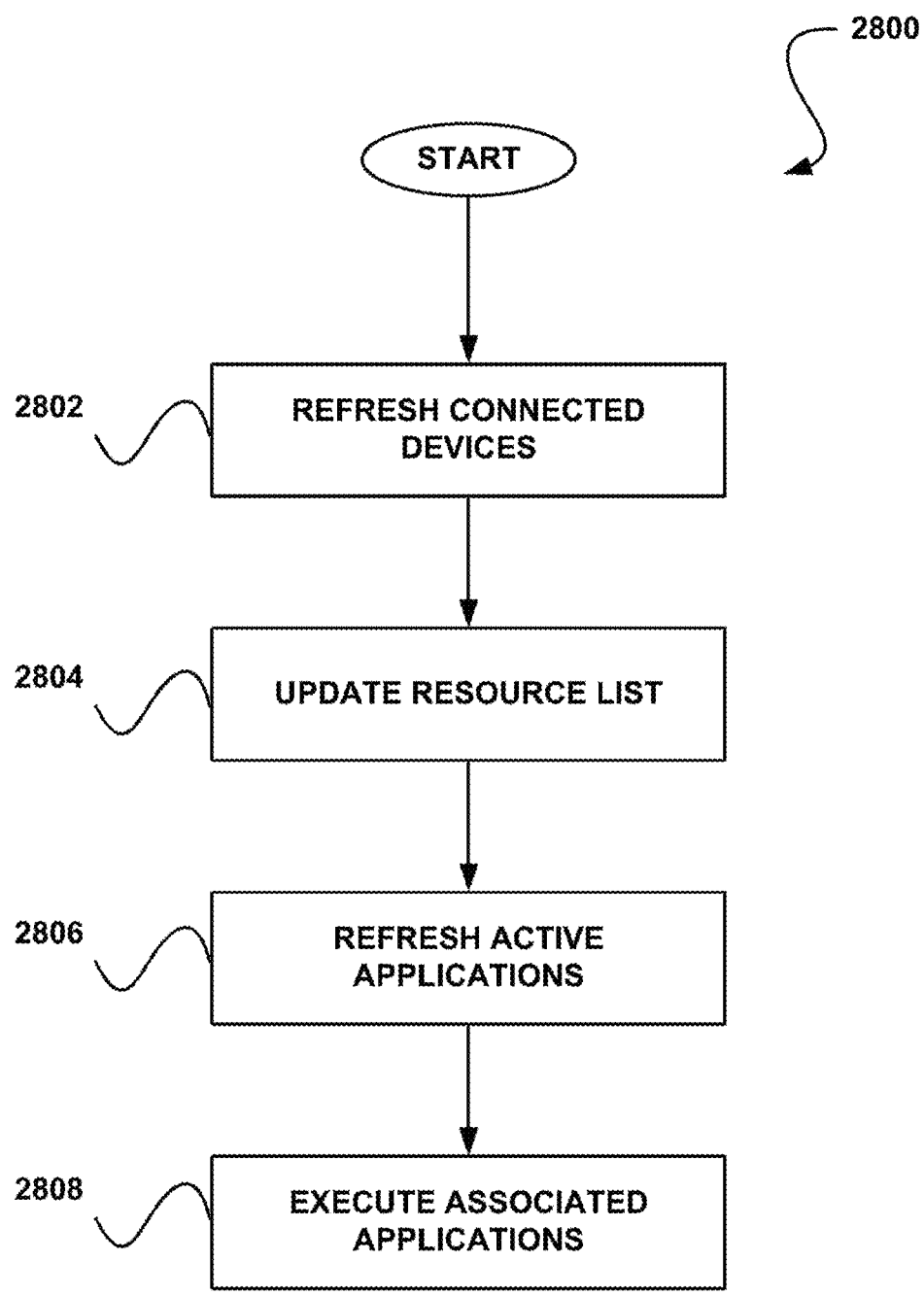
FIG. 28 shows a method for activating a desktop computer mode, in accordance with one embodiment.

FIG. 28 shows a method 2800 for activating a desktop computer mode, in accordance with one embodiment. As an option, the method 2800 may be implemented in the context of the architecture and environment of the previous Figures or any subsequent Figure(s). Of course, however, the method 2800 may be carried out in any desired environment. It should also be noted that the aforementioned definitions may apply during the present description.

As shown, desktop peripheral device connections are refreshed. See operation 2802. A tablet computer may be in a first desktop computer mode when the mode conditions of a second desktop computer mode of a higher priority are satisfied, according to one embodiment. If the tablet computer has a functional line of communication with one or more desktop peripheral devices as a result of operating in the first desktop computer mode, it may be necessary to disconnect one or more of those desktop peripheral devices before the second desktop computer mode may be fully activated. Additionally, the activation may include forming new connections to one or more additional desktop peripheral devices. In this way, possible conflicts caused by multiple devices filling a single role (e.g. keyboards, mice, etc.) may be avoided.

In the context of the present description, disconnecting a desktop peripheral device refers to the termination of functional, non-tangible connections between the desktop peripheral device and the tablet computer. Examples include, but are not limited to, unmounting a hard drive storage device, ending transmission of a video signal to an external display, and/or severing any other form of communication between a tablet computer and a desktop peripheral device.

In one embodiment, some or all desktop peripheral devices are disconnected before activating a different desktop computer mode. In another embodiment, only desktop peripheral devices which are of the same type (e.g. keyboard, mouse, etc.) as the desktop peripheral devices required by the activation are disconnected. In yet another embodiment, only the desktop peripheral devices which cannot be utilized simultaneously with those required by the activation are disconnected. For example, a first mouse may be replaced by a second mouse, but a first hard drive may be used at the same time as a second hard drive.

As shown, a tablet resource list is updated. See operation 2804. In various embodiments, the tablet computer maintains a record of resources available to applications (e.g. processors, graphics processors, memory, storage, displays, etc.). In one embodiment, the tablet computer may run applications which are multimodal. In the context of the present description, a multimodal application refers to an application which is able to take advantage of functionality and resources unique to different computer modes of a tablet computer. For example, a multimodal application executed while the tablet computer is operating in a tablet computer mode may utilize a simplified user interface with few on-screen options.

The same applications, when executed on the tablet computer while it is operating in a desktop computer mode involving an external display of higher resolution might show a user interface with more on-screen options, taking advantage of the increased screen real estate. Other user interface-related parameters that may be utilized (particularly in an embodiment where the tablet computer is not be used as a display in desktop mode) include, but are not limited to font size, icon size (e.g. application icon size, etc), etc. To this end, the user interface may be better suited to accommodate mouse-based selections as opposed to finger gestures. Of course, finger gestures may still be used in addition to mouse-based selections. Still other user interface-related parameters that may be utilized (particularly in an embodiment where the tablet computer is not be used as a display in desktop mode) include, but are not limited to an open application status bar that shows all applications that are open and possibly even different instances therein, etc. so as to allow more convenient switching of focus between multiple applications and/or instances thereof. To this end, a user may experience features that are associated with a desktop environment, in the appropriate mode.

Yet another example of a multimodal application is a voice-command personal assistant application. Such application may serve additional purposes in desktop mode. For example, a number of available commands may be increased when in the desktop mode, where such additional commands may allow voice-command of the various peripherals, applications, resources etc. that are only available via desktop mode. Further, while such additional desktop mode-related voice commands may be received during use of the tablet mode, they may be saved or otherwise queued for execution when the tablet computer enters a desktop mode in which the peripherals, applications, resources etc. are available to accommodate the desktop mode-related voice command(s) received earlier in the tablet mode. Just by way of example, a user may say "archive picture to external hard drive," "print document at work," "display dinner reminder on home display," etc. and such commands may be executed after and upon the tablet computer being triggered into the appropriate (e.g. home, work, etc.) desktop mode.

Other examples of multimodal applications may include, but are not limited to, game applications which adapt to available graphics processing power and memory, and drawing applications which adapt to available input devices.

Furthermore, active applications are refreshed. See operation 2806. Transitioning into a desktop computer mode may provide access to resources which were unavailable when an application was first executed. In the context of the present description, refreshing an active application refers to instructing the active application to reevaluate one or more code segments used to initialize aspects of the application which might be affected by the change in resources.

Refreshing the active applications allows the user to immediately take advantage of new resources associated with the new computer mode, and minimizes the disruption to the user experience when resources are removed. For example, in one embodiment, as part of a transition which results in a tablet computer acting as an application specific input device not present in the previous computer mode, a word processor application may restart its GUI, moving tool bars and statistics reporting from an external display to the tablet display. In another embodiment, a transition triggered by the removal of an external GPU may cause a game to reinitialize the rendering system, allowing the game to continue with lower processing requirements (e.g. reduced resolution, simple models, smaller textures, etc.).

In one embodiment, activating a desktop computer mode may refresh all aspects of active applications which may possibly be affected by a computer mode transition (i.e. user interface, sound, resolution, input options, etc.). In another embodiment, the active application refresh associated with the activation of a desktop computer mode only involves the application code segments that are actually affected. For example, a transition between desktop computer modes which does not change display or input functionality may not cause a reevaluation of active application code segments related to the user interface.

In one embodiment, the tablet user may be prompted by an active application to choose whether to take advantage of one or more resources made available in a new desktop computer mode. In another embodiment, the refresh of active applications is performed without user input. In still another embodiment, a user may define a desktop computer mode such that specific applications will not be refreshed when that desktop mode is activated.

As shown, associated applications are executed. See operation 2808. A user may define a desktop computer mode such that one or more applications are automatically executed when that desktop computer mode is activated. In one embodiment, a user may also define a desktop computer mode such that all active applications are terminated upon mode activation.

A desktop computer mode may be associated with user applications and/or system applications. In the context of the present description, a user application is an application which provides a specific functionality to the user, which they may execute at will. In some embodiments, multiple user applications of the same type may be executed at the same time. Additionally, in the context of the present description, a system application is part of the tablet computer operating system which serves as a foundation for the user's interaction with the tablet computer. For example, in one embodiment, a system application may allow the user to see the user interfaces of two active user applications at the same time, in the same display. In another embodiment, a system application may only allow the user to see the user interface of a single user application at any given time. In some embodiments, multiple system applications of certain types may not be executed at the same time. Examples of system applications include, but are not limited to, window managers, task managers, file system managers, file browsers, application launchers, and/or any other element of the tablet computer operating system which affects the way a user interacts with the tablet computer.

The execution of associated applications upon activation of a desktop computer mode may include the termination and/or execution of one or more system applications. For example, in one embodiment, a transition from a tablet computer mode to a desktop computer mode may require the termination of a first system application which only allows a user to view the interface of a single active user application at one time, and the execution of a second system application which allows the user interfaces of multiple active user applications to be displayed at the same time. In another embodiment, a transition from a first desktop computer mode to a second desktop computer mode may require the termination of a system application which serves as a file system browser, and the execution of a system application which serves as an application launcher. In this way, computer modes may be defined to tailor the user experience to the intended application and available forms of interaction. For example, a streamlined and focused interface for a tablet computer mode, a dynamic multitasking interface for a desktop computer mode associate with productivity, and a simplified application launcher for a desktop computer mode associated with entertainment.

In one embodiment, the user is able to specify which system applications are associated with a desktop computer mode. In another embodiment, associated system applications are determined by whether a computer mode is associated with a tablet manner of utilization or a desktop manner of utilization.

In one embodiment, a particular user application may be prevented from running when the tablet computer is operating in a particular desktop computer mode. In another embodiment, a particular user application may only be executed when the tablet computer is operating in a particular desktop computer mode.

In still another embodiment, a desktop computer mode may be associated with a plurality of user applications, which are presented for the user to choose from once the desktop computer mode is activated. For example, a desktop computer mode which requires the presence of an HDTV and a surround sound system, and is intended for home entertainment use, might present the user with a limited selection of predefined, appropriate applications such as a video rental portal, links to streaming video sites, and/or a home media management application.

Depending on how the desktop computer modes are defined, transitioning a tablet computer from a first computer mode to a second computer mode may be disruptive to the user experience. In various embodiments, a user may define how disruptions caused by computer mode transitions are handled. Examples of possible disruptions include, but are not limited to, terminating applications, changing display devices, accidental computer mode changes, and/or any other event or action which may disrupt the user experience.

If a second computer mode is associated with the execution of a particular application, a transition between a first and the second computer modes may require the termination of active applications to free resources which will be required. In one embodiment, the user may be prompted whether they wish to save their work before their application is terminated. In another embodiment, the associated application is not executed. As an option, the user is informed that the application was not executed due to limited resources.

In another embodiment, the entire contents of the tablet computer RAM memory associated with the application marked for termination may be stored before terminating the application in preparation to transition to a different computer mode. The terminated application, including open documents, may be restored when the tablet computer returns to the first computer mode. As an option, the stored application session may be restored at the request of the user, independent of the computer mode, so long as the necessary resources are available. In another embodiment, the user may be prompted with the option to restore from one or more saved sessions when transitioning into a computer mode where sessions had been saved previously. In still another embodiment, the user may specify preferences regarding how many sessions may be stored, whether they are automatically deleted after remaining dormant for a predetermined period of time, and/or whether they are automatically restored the next time the associated computer mode is activated.

If the second computer mode is associated with a display or plurality of displays of different resolution than the one or more displays associated with the first computer mode, a transition between the first and second computer modes may require a rearrangement of the active elements of the GUI (windows, icons, menus, etc.). In one embodiment, windows may be scaled to the same size, relative to the display device, upon transitioning between desktop computer modes. In another embodiment, windows may retain their original pixel location and size upon transitioning between computer modes. In yet another embodiment, the tablet computer may employ a resolution independent GUI, which scales with display size. In various embodiments, the user may be able to define preferences as to how scaling occurs upon transition between computer modes.

It is possible that the activation of a computer mode may be unwanted. In one embodiment, the user may be able to specify, for a particular computer mode, whether it can be activated automatically or if the user will be prompted for confirmation before activation can take place. In another embodiment, a user may define criteria wherein a mode may activate automatically when the criteria are satisfied, but will otherwise ask for confirmation before activation. The criteria may include, but are not limited to, time of day, day of the week, geographic location, etc.

Figure 29:
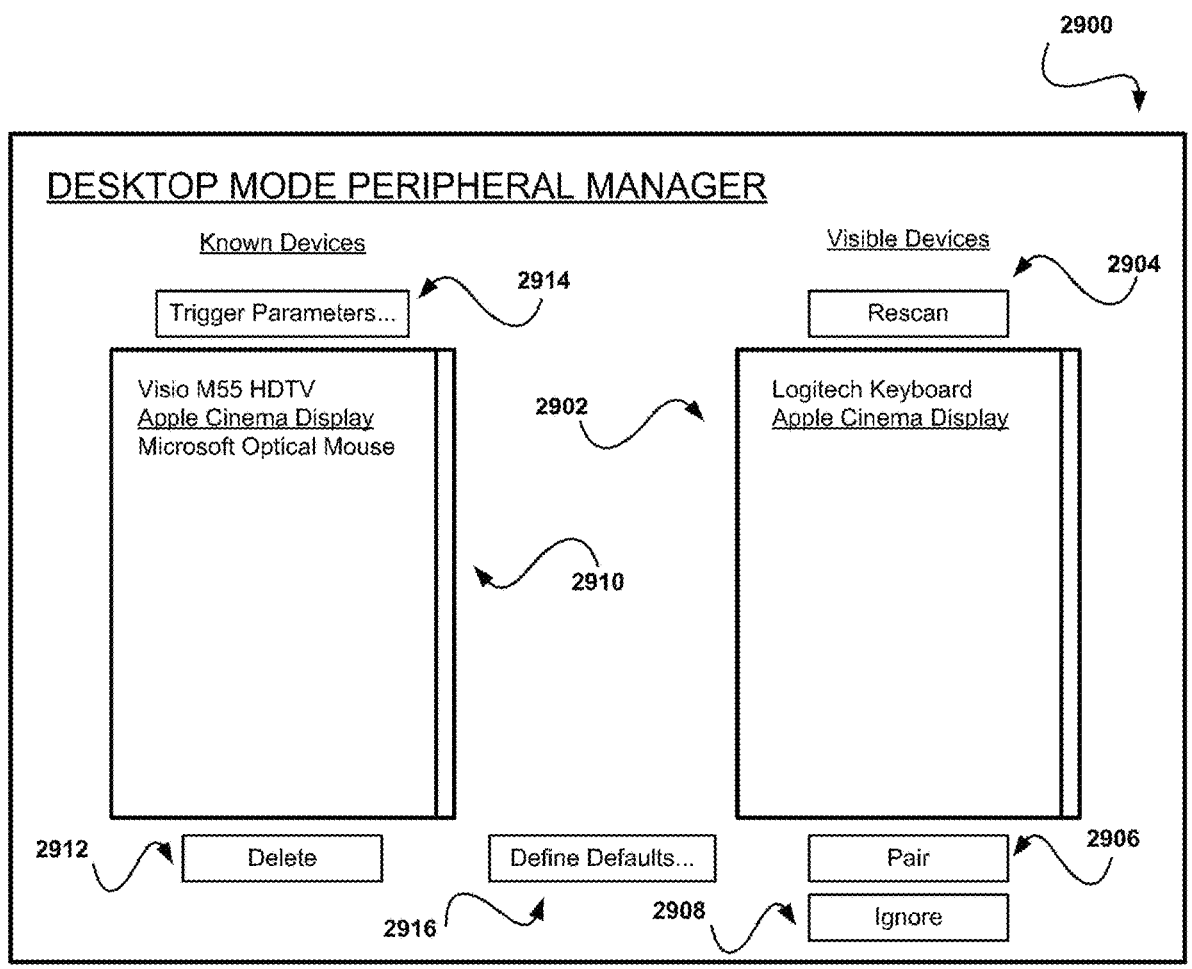
FIG. 29 shows a user interface for managing desktop peripheral devices and mounts, in accordance with one embodiment.

FIG. 29 shows a user interface 2900 for managing desktop peripheral devices and mounts, in accordance with one embodiment. As an option, the user interface 2900 may be implemented in the context of the architecture and environment of the previous Figures or any subsequent Figure(s). Of course, however, the user interface 2900 may be implemented in any desired environment. The aforementioned definitions may apply during the present description.

As shown, the user interface 2900 may be utilized to create, configure, and delete relationships between the tablet computer and desktop peripheral devices and mounts. In one embodiment, the user interface may include a list 2902 which lists all desktop peripheral devices and mounts which are currently visible to the tablet computer. In the context of the present description, being visible to the tablet computer refers to being susceptible to detection by the tablet computer, whether by sensing a wireless signal, detecting a wired connection, sensing a magnetic field, and/or any other method of detecting the presence of a device. In one embodiment, list 2902 is the visible device list previously discussed. As an option, list 2902 may be continuously updated as scans are automatically performed.

In various embodiments, known desktop peripheral devices and known mounts in list 2902 may be highlighted, to indicate that trigger parameters have already been defined for those devices. In one embodiment, list 2902 is sorted by order of device discovery. In another embodiment, list 2902 is divided between known and unknown entities.

As shown, in one embodiment, the user interface 2900 may include a button 2904 to manually initiate a scan for visible devices and mounts. In some embodiments, button 2904 makes use of the method shown in FIG. 27. In one embodiment, button 2904 may initiate a scan, even if continuous scans have been disabled. In another embodiment, a user may interact with button 2904 only when continuous scanning has been disabled.

In some embodiments, it may be possible for a user to instruct a tablet computer to temporarily or permanently ignore a known or unknown device or mount. In one embodiment, an ignored device cannot activate a computer mode, but may still be utilized by the tablet computer in whatever the present computer mode may be. In another embodiment, manually initiating a scan for visible devices may make some or all previously ignored desktop peripheral devices and mounts visible once again. In yet another embodiment, the restoration of visibility to ignored devices and mounts through a manually initiated scan is limited to those which were only being ignored for a specified period of time.

In various embodiments, a scan for desktop peripheral devices may be initiated by a user through interacting with a hardware button and/or a software button in a user interface other than 2900. In one embodiment, the user interface 2900 may be presented to a user in response to the user initiating a scan for unknown desktop peripheral devices, and the scan detecting one or more unknown desktop peripheral devices.

As shown, in one embodiment, the user interface 2900 may include a button 2906 to pair a device or mount selected in list 2902 with the tablet computer. In one embodiment, a user may interact with button 2906 only if the device or mount selected is not a known device or mount. In various embodiments, operating the button 2906 may display the user interface shown in FIG. 30, allowing a user to specify trigger parameters for the selected device or mount.

As shown, in one embodiment, the user interface 2900 may include a button 2908 to ignore a device or mount selected in list 2902. In one embodiment, selecting button 2908 presents the user with a user interface offering the option to ignore the selection for a certain period of time, or permanently. As an option, the user may rename the device (i.e. "neighbor's TV", etc.). In another embodiment, the user may also be presented with a list of devices and mounts currently being ignored, with the option of removing one or more devices and mounts from the list.

In one embodiment, the user interface 2900 may include a list 2910 of all known desktop peripheral devices and mounts. In another embodiment, currently visible, known desktop peripheral devices and mounts in list 2910 may be highlighted.

Further, in one embodiment, the user interface 2900 may include button 2912 to delete the trigger parameters of a known desktop peripheral device or mount selected in list 2910, removing it from the list. Additionally, in one embodiment, the user interface 2900 may include button 2914 to modify the trigger parameters of a known desktop peripheral device or mount selected in list 2910, where operating the button 2914 may display the user interface shown in FIG. 30.

As shown, in one embodiment, the user interface 2900 may include button 2916 to allow the user to define default trigger parameters for one or more types of desktop peripheral devices or mounts. In one embodiment, a user may select a known desktop peripheral device or mount to provide the default trigger parameters for devices or mounts of that type (e.g. displays, keyboards, wall mounts, etc.). In another embodiment, a user may create a default set of trigger parameters for use with a particular type of device or mount which is not tied to the trigger parameters of a known device or mount.

In still another embodiment, a user may be informed whether defaults have been established for subsets of one or more device or mount types. In another embodiment, the user may be given the option of overriding previously established default trigger parameters for device type subsets.

In one embodiment, the user interface 2900 or the like may be presented to a user in response to a tablet computer interacting with a desktop peripheral device for the first time. In another embodiment, the user interface 2900 or the like may be presented to a user in response to a user request.

In one embodiment, once the user initiates a pairing with a selected unknown desktop peripheral device or mount, or initiates the modification of the trigger parameters of a selected known desktop peripheral device or mount, the user may be presented with a plurality of options associated with the trigger parameters of the selected device or mount. In one embodiment, the user may be presented with the options associated with the trigger parameters of the selected desktop peripheral device via a user interface. For example, FIG.

30 shows a user interface that may be utilized to define or modify trigger parameters for a desktop peripheral device.

It should be noted that the term "button" may include/refer any input mechanism (e.g. indicia for selection via a touchscreen, etc.), etc.

Figure 30:
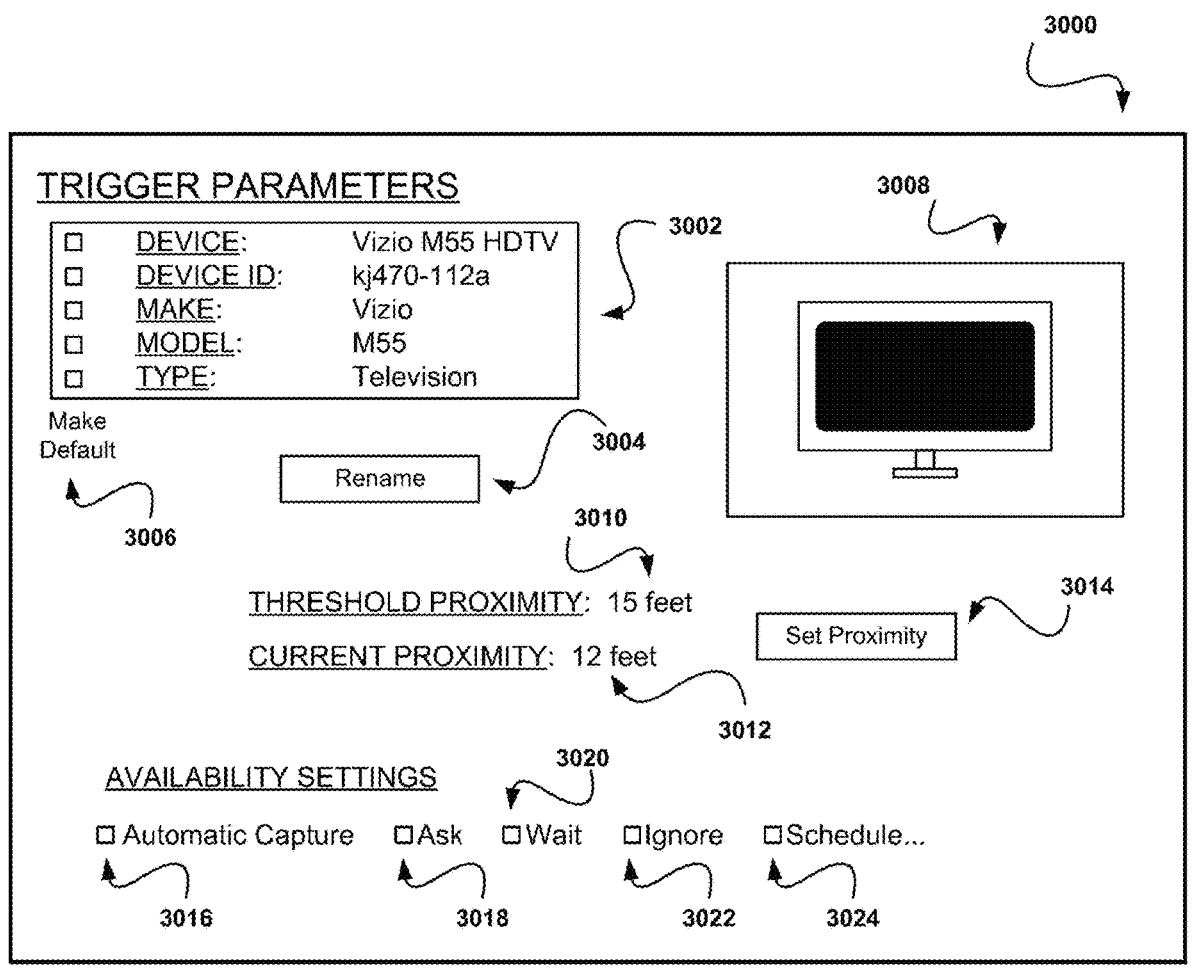
FIG. 30 shows a user interface for defining trigger parameters associated with a desktop peripheral device or mount, in accordance with one embodiment.

FIG. 30 shows a user interface 3000 for defining trigger parameters associated with a desktop peripheral device or mount, in accordance with one embodiment. As an option, the user interface 3000 may be implemented in the context of the architecture and environment of the previous Figures or any subsequent Figure(s). Of course, however, the user interface 3000 may be implemented in any desired environment. The aforementioned definitions may apply during the present description.

As shown, the user interface 3000 may be utilized to define trigger parameters for a desktop peripheral device or mount. In one embodiment, the user interface 3000 may be presented to the user when the tablet computer detects an unknown desktop peripheral device or mount. In another embodiment, the user interface may be presented to the user only in response to a user request.

In various embodiments, the user interface may include one or more text fields 3002 which describe a desktop peripheral device or mount. In one embodiment, the text fields may include, but are not limited to, a device name, a unique device identifier, a device make, a device model, a device type, and/or any other information describing a device.

In various embodiments, the user interface 3000 may include a button 3004 to redefine the device name associated with the trigger parameters. As an option, the default device name may include the make, model, and type of device. In this way, a user may more easily distinguish between multiple devices of the same type by specifying more descriptive names (e.g. "work monitor", "home monitor", etc.).

As shown, the user interface 3000 may include a collection of check boxes 3006, one for each of the descriptive text fields 3002, which allow the user to establish the present set of trigger parameters as defaults for a subset of possible desktop peripheral devices and mounts. For example, selecting the check box next to the device model may establish the present set of trigger parameters as the default for all devices of that model. In one embodiment, a user may, using checkboxes 3006, establish the present set of trigger parameters as the default for all other devices of the same type, make, model, and/or device name. In another embodiment, if the selection of one or more of the check boxes 3006 conflicts with a preexisting default, the user may be presented with a warning indicating the current default, and asking for confirmation before establishing a new default.

The user interface 3000 may include a graphical depiction 3008 of the device or mount associated with the present set of trigger parameters, according to one embodiment. In another embodiment, the graphical depiction may be provided by the user. In yet another embodiment, the graphical depiction may be automatically downloaded from a server. In still another embodiment, the graphical depiction may display an iconic representation of the type of device associated with the present set of trigger parameters.

As shown, the user interface 3000 may include a text field 3010 displaying the threshold proximity established as a trigger parameter for the present device or mount. Additionally, in one embodiment, the user interface may also include a text field 3012 displaying the current distance between the tablet computer and the present device or mount. In one embodiment the proximities may be displayed with units of distance (e.g. feet, meters, etc.). In another embodiment, the proximities may be displayed as signal strengths. In still another embodiment, the current distance displayed in 3012 may be reported as a percentage of the threshold proximity. In yet another embodiment, the proximities may be displayed using a unitless metric.

In various embodiments, the user interface may include a button 3014 to define the threshold proximity. In one embodiment, button 3014 may prompt the user to input a new proximity threshold. In another embodiment, button 3014 may define the current distance 3012 as the new threshold proximity.

Another trigger parameter is the availability of the present device or mount. The user interface may include one or more check boxes to allow the user to define the availability trigger parameter(s) which must be met before the present device may activate a computer mode. In various embodiments, only one button may be selected.

In one embodiment, the user interface 3000 may include a check box 3016 to indicate that availability of the present device is not to be taken into consideration as a trigger parameter, and that if all trigger parameters have been satisfied for the device, the device should be commanded to make itself available, if necessary. In one embodiment, check box 3016 may only be selectable if the present device is capable of reporting its availability to a tablet computer, and is capable of making itself available upon receipt of a command from a tablet computer.

In another embodiment, the user interface 3000 may include a check box 3018 to indicate that availability of the present device is to be treated as a trigger parameter, and that the present device will not be commanded to make itself available without user confirmation. For example, in one embodiment, once all other trigger parameters have been satisfied, and the device is not currently available, the user may be presented with a user interface asking for confirmation before ordering the device to make itself available. As an option, check box 3018 may only be selectable if the present device is capable of reporting its availability to a tablet computer, and is capable of making itself available upon receipt of a command from a tablet computer.

In another embodiment, the user interface 3000 may include a check box 3020 to indicate that availability of the present device is to be treated as a trigger parameter, but the device should not be instructed to make itself available. As an option, check box 3020 may only be selectable if the present device is capable of reporting its availability to a tablet computer.

In still another embodiment, the user interface 3000 may include a check box 3022 to indicate that the availability of the present device is not to be treated as a trigger parameter. In one embodiment, this may be the default availability constraint for all devices and mounts which are not able to report their availability.

In another embodiment, the user interface 3000 may include a check box 3024 to indicate that the role of availability of the present device may change over time. In one embodiment, check box 3024 may cause a user interface to be presented, where a user can specify the times of day and days of the week associated with various availability requirements of the present device. For example, a user may specify that a tablet computer can only command the present device to make itself available on weekends, and must wait for the device to become available on weekdays.

Figure 31:
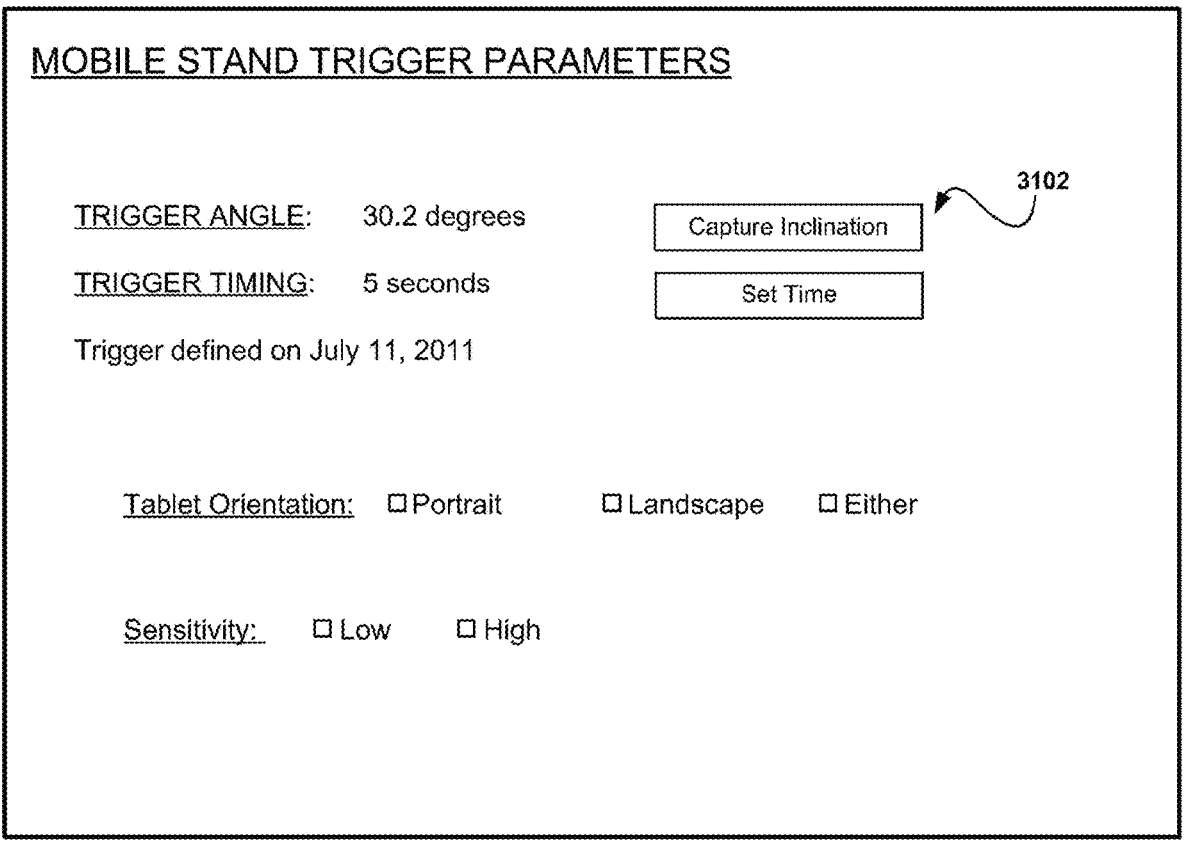
FIG. 31 shows a user interface for defining trigger parameters associated with the use of a mobile stand, in accordance with one embodiment.

FIG. 31 shows a user interface 3100 for defining trigger parameters associated with the use of a mobile stand, in accordance with one embodiment. As an option, the user interface 3100 may be implemented in the context of the architecture and environment of the previous Figures or any subsequent Figure(s). Of course, however, the user interface 3100 may be implemented in any desired environment. The aforementioned definitions may apply during the present description.

As shown, the user interface 3100 may be presented to a user to define trigger parameters associated with the use of a mobile stand. The trigger parameters associated with the use of a mobile stand may include, but are not limited to, a trigger angle, a trigger delay, allowed orientation, sensitivity, and/or any other type of trigger parameter.

In one embodiment, the user interface 3100 may display a trigger angle which may activate a desktop computer mode if the tablet computer is held at that particular angle. In another embodiment, the user interface may also display a trigger delay, which is the amount of time that the tablet computer must remain at the trigger angle before a desktop computer mode may be activated.

As shown, user interface 3100 may be utilized to determine the current inclination of the tablet computer, and define a new trigger angle. For example, in one embodiment, the user interface may include button 3102 to capture the present inclination of the tablet computer. In another embodiment, button 3102 may cause a user interface to be presented to the user, informing them the inclination of the tablet computer was about to be captured. In still another embodiment, the user may be given a countdown before the inclination of the tablet computer is captured. In yet another embodiment, the user interface 3100 may also include functionality that allows a user to define a trigger delay.

The user interface 3100 may include various functionality for the definition of additional trigger parameters associated with the use of a mobile stand. For example, in one embodiment, the user interface may allow a user to specify whether the trigger parameters require the tablet computer to be in a portrait orientation, a landscape orientation, or either. In another embodiment, the user interface may allow a user to specify the tolerance for the trigger angle. This allows the user to balance between sensitivity to unintended movement of the tablet computer and responsiveness when transitioning to another computer mode not based on the inclination of the tablet computer.

In still another embodiment where the tablet computer includes an e-ink display on a back face thereof (see disclosures thereof hereinabove, for example), a trigger for a first desktop mode may be a detection of the e-ink display being positioned in a forward facing orientation. Further, a trigger for a second desktop mode may be a detection of the backlit display being positioned in a forward facing orientation.

Figure 32A:
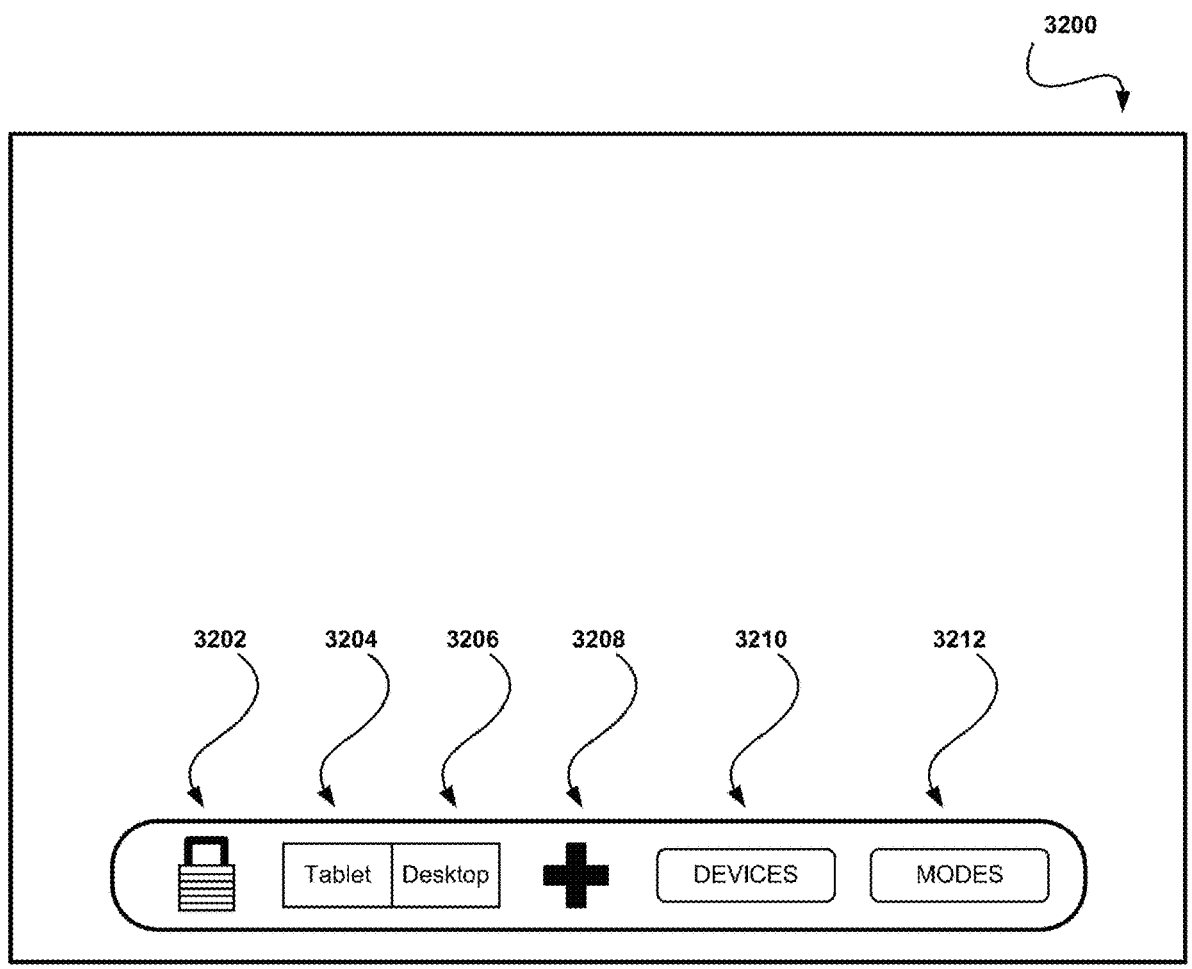
FIG. 32A shows a user interface where a user can manually switch between a desktop computer mode and a tablet computer mode, in accordance with one embodiment.

FIG. 32A shows a user interface 3200 for manually switching between a desktop computer mode and a tablet computer mode, in accordance with one embodiment. As an option, the user interface 3200 may be implemented in the context of the architecture and environment of the previous Figures or any subsequent Figure(s). Of course, however, the user interface 3200 may be implemented in any desired environment. The aforementioned definitions may apply during the present description.

The user interface 3200 may be utilized to present computer mode configuration functionality to the user in a non-obtrusive way. For example, in one embodiment, the user interface may be localized along one edge of a display. In another embodiment, the user interface may be displayed on top of an active application. As an option, the user interface may fade away if no user input is received within a certain period of time. In yet another embodiment, the user may request user interface 3200 by pressing a hardware button one or more times. In still another embodiment, the user interface may be accessed through a general system settings user interface.

As shown, the user interface 3200 may be utilized to manually activate a computer mode. For example, in one embodiment, the user interface may include a button 3202 which can engage or disengage the automatic management of computer modes. When button 3202 is locked, the functionality used to automatically determine the manner in which the tablet computer is being utilized may be disengaged. Accordingly, buttons 3204 and 3206 become available to the user. In another embodiment, the user may be prompted for confirmation before switching computer modes.

In one embodiment, buttons 3204 and 3206 may be used to toggle between a desktop computer mode and a tablet computer mode. In another embodiment, selection of a mode button may display the user interface shown in FIG. 32B, allowing the user to choose from a plurality of modes. In yet another embodiment, the selection of a mode button results in the activation of a predefined computer mode of appropriate type. In still another embodiment, user interface 3200 may display the name and/or type of the current computer mode.

As shown, the user interface 3200 may be utilized to provide the user with easy access to computer mode settings and options. For example, in one embodiment, the user interface may include a button 3208 to place the tablet computer in a learning mode. While in learning mode, the detection of unknown desktop peripheral devices or mounts may result in user interface 2900 of FIG. 29 or user interface 3000 of FIG. 30 being presented to the user, facilitating the definition of trigger parameters.

Additionally, user interface 3200 may be utilized to access a desktop peripheral device and mount manager. For example, in one embodiment, the user interface may include a button 3210 which presents to a user the device and mount manager shown in user interface 2900 of FIG. 29.

Furthermore, user interface 3200 may be utilized to access a computer mode manager. For example, in one embodiment, the user interface may include a button 3212 which presents to a user the desktop computer mode manager shown in user interface 3300 of FIG. 33.

Figure 32B:
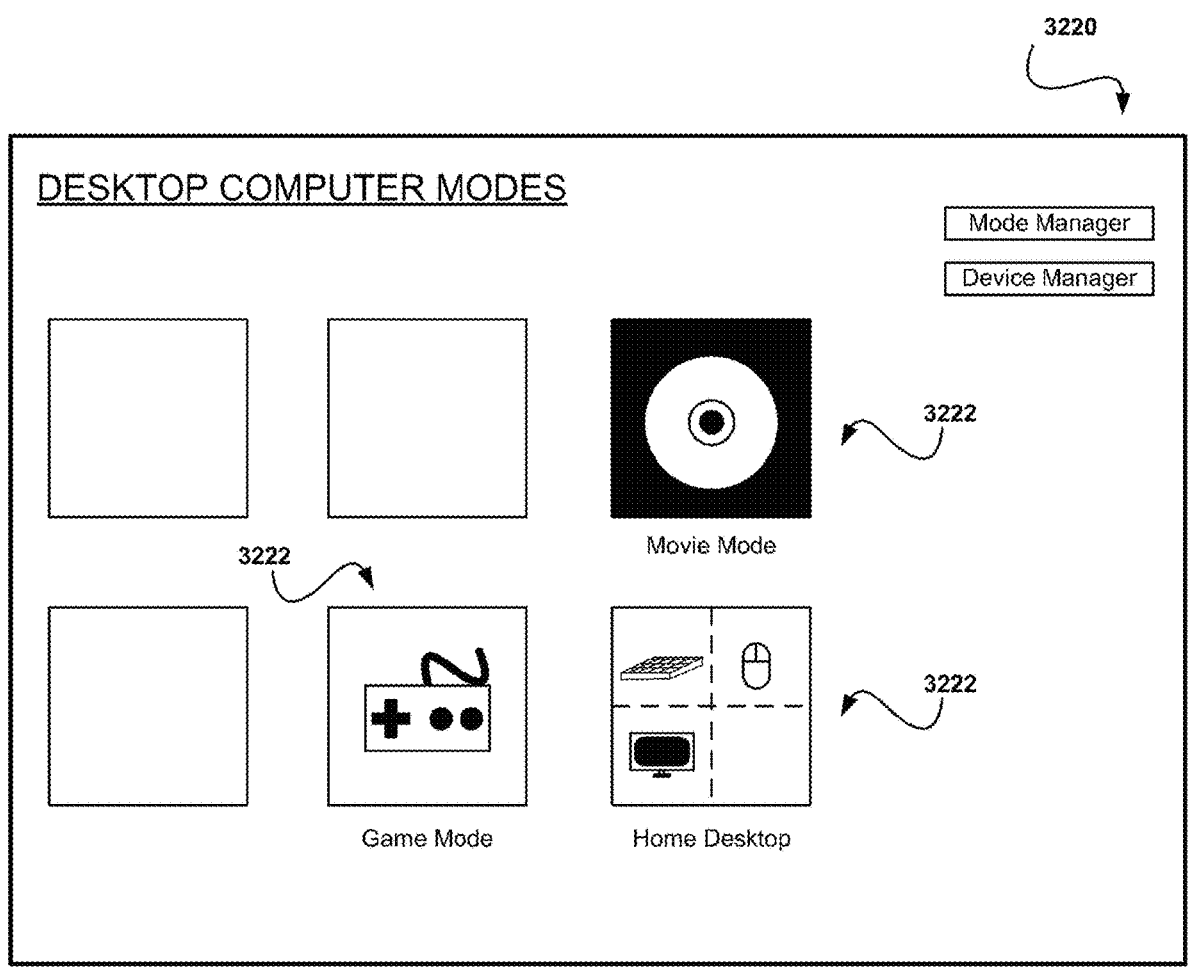
FIG. 32B shows a user interface where a user can select from a plurality of desktop computer modes, in accordance with one embodiment.

FIG. 32B shows a user interface 3220 where a user can select from a plurality of desktop computer modes, in accordance with one embodiment. As an option, the user interface 3220 may be implemented in the context of the architecture and environment of the previous Figures or any subsequent Figure(s). Of course, however, the user interface 3220 may be implemented in any desired environment. The aforementioned definitions may apply during the present description.

In various embodiments, a user may define a plurality of desktop computer modes. As shown, the user interface 3220 may be utilized to manually select a desktop computer mode. In one embodiment, the user interface may include buttons 3222 representing individual desktop computer modes. As an option, these buttons may include a graphic representation of the desktop computer mode (e.g. a representative icon chosen by the user, a miniaturize screenshot of a saved state, a collection of iconic representations of the devices utilized by the mode, a photograph provided by the user, etc.) and/or a mode name. In another embodiment, one of the desktop computer mode buttons may be highlighted, if that particular mode is the currently active computer mode. As an option, the name and/or graphic representation of the currently active computer mode may be indicated elsewhere in the user interface if the associated mode button is not present.

In still another embodiment, a user may only be able to select modes for which all mode conditions have been satisfied. As an option, mode buttons representing computer modes whose mode conditions have not been satisfied may be presented to the user dimmed, crossed out, and/or may be hidden from view. In yet another embodiment, the user may be able to rearrange the order in which the mode buttons are displayed. In another embodiment, the mode buttons may be ordered according to their priority. Furthermore, in one embodiment, the user may be presented with more than one screen of mode buttons.

Figure 33:
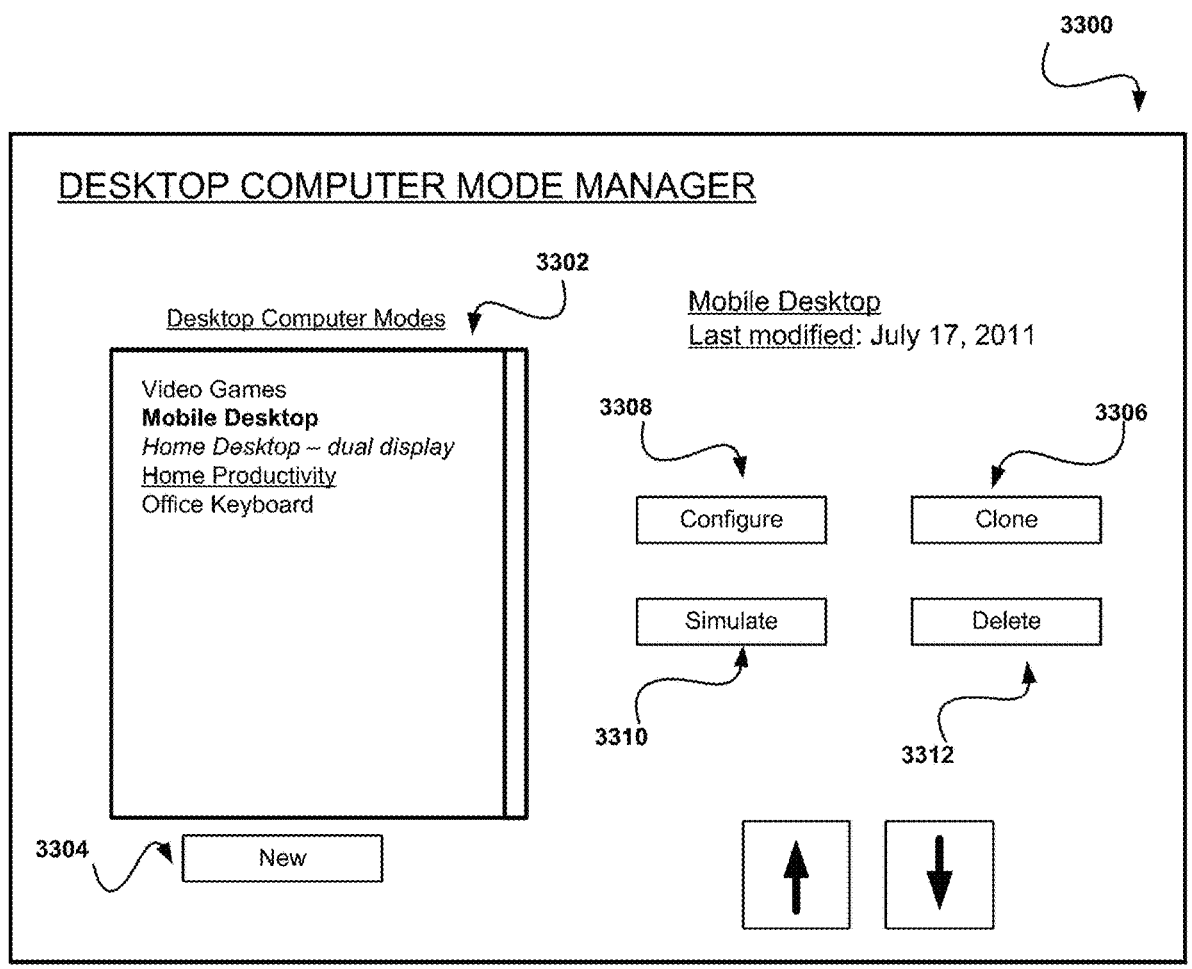
FIG. 33 shows a user interface for managing desktop computer modes, in accordance with one embodiment.

FIG. 33 shows a user interface 3300 for managing desktop computer modes, in accordance with one embodiment. As an option, the user interface 3300 may be implemented in the context of the architecture and environment of the previous Figures or any subsequent Figure(s). Of course, however, the user interface 3300 may be implemented in any desired environment. The aforementioned definitions may apply during the present description.

As shown, the user interface 3300 may be utilized to create, manage, and delete desktop computer modes. For example, in various embodiments, the user interface may include a list 3302 of all defined desktop computer modes. In one embodiment, the list may be ordered by mode priority (i.e. the order in which the mode conditions of each mode are evaluated when determining what mode should be active). In another embodiment, the user may be able to prioritize the computer modes by dragging them to different locations in the list. In still another embodiment, the user interface may include buttons to move a computer mode selected in the list higher and lower.

In one embodiment, the name of the currently active mode may be stylized in list 3302, if present. In another embodiment, the names of blocked computer modes may be highlighted in the list. In the context of the present description, a blocked computer mode refers to a computer mode which will, at least in part, not be able to activate, as a consequence of the defined mode conditions and/or mode priority. For example, if the mode conditions for a computer mode are identical to, or a superset of, the mode conditions defined for another computer mode of higher priority, the lower priority mode will never activate, and is blocked.

As shown, the user interface 3300 may be utilized to create a new desktop computer mode. For example, in one embodiment, the user interface may include a button 3304 to create a new computer mode. As an option, the new computer mode may be predefined using default mode conditions. In another embodiment, selecting button 3304 may result in displaying FIG. 34, where the new computer mode may be configured. In still another embodiment, the user interface may include a button 3306 to create a new computer mode which is a duplicate of the computer mode selected in list 3302.

The user interface 3300 may be utilized to manage desktop computer modes. As shown, in one embodiment, information describing a computer mode selected in list 3302 may be displayed. The information displayed may include, but is not limited to, the mode name, the last modification date, a graphical representation of the selected mode, and/or any other information describing the selected computer mode. In another embodiment, the user interface may include a button 3308 to configure the selected mode.

Figure 34:
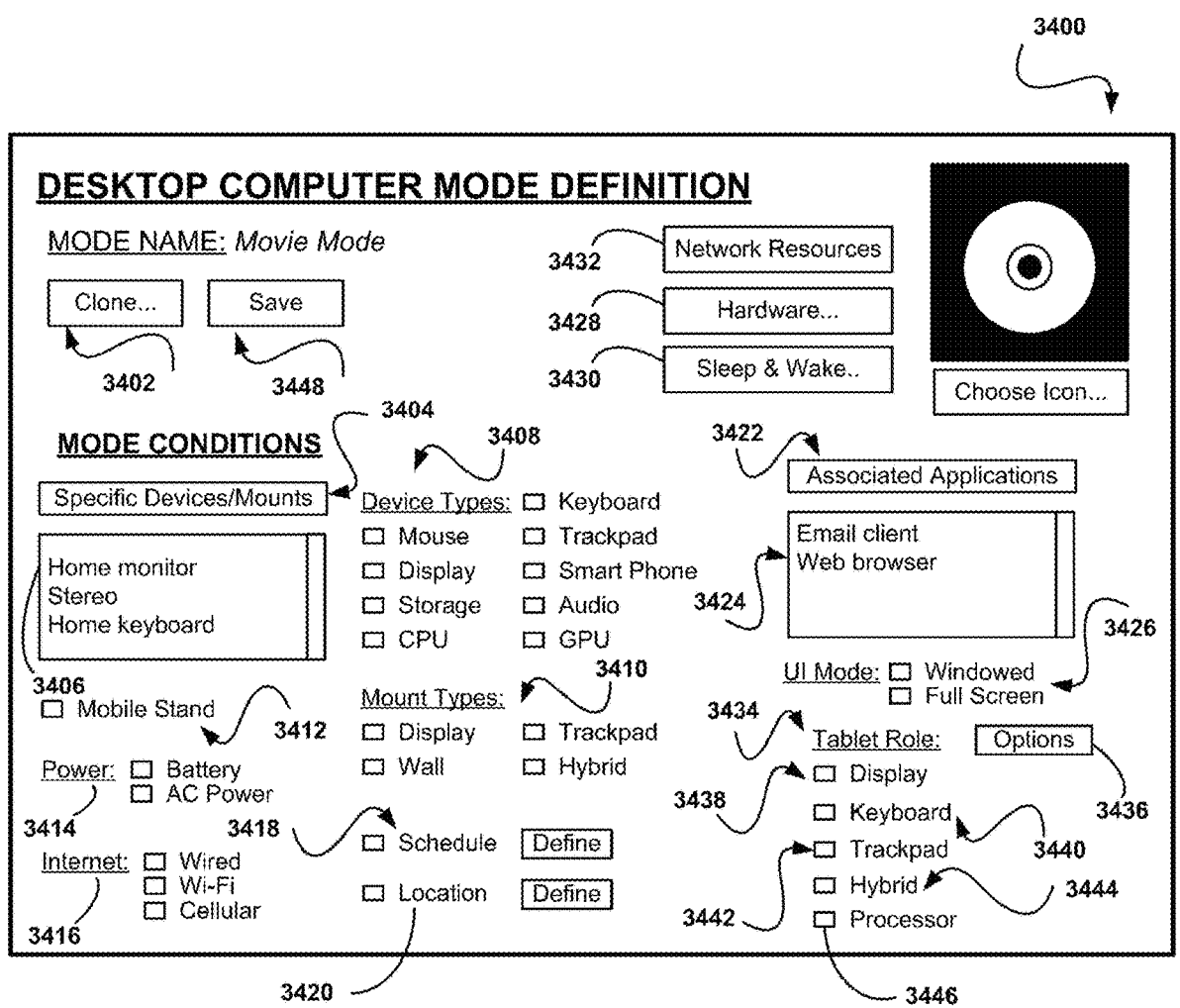
FIG. 34 shows a user interface for defining a desktop computer mode, in accordance with one embodiment.

In still another embodiment, selecting button 3308 may result in displaying FIG. 34, where the selected computer mode may be configured.

As shown, the user interface 3300 may be utilized to determine the exact set of conditions which must be satisfied before a selected computer mode would be activated. For example, in one embodiment, the user interface may include a button 3310, which presents to the user a list of all conditions which must be satisfied, and all conditions which must not be satisfied, in order for the selected computer mode to be activated. In this way, the user is able to determine if a particular computer mode will activate as the user intended, without having to physically recreate the triggering scenario.

The user interface 3300 may be utilized to delete a selected desktop computer mode. For example, in one embodiment, the user interface may include a button 3312 to delete the selected computer mode. As an option, the user may be prompted for confirmation before a computer mode is deleted.

FIG. 34 shows a user interface 3400 for defining a desktop computer mode, in accordance with one embodiment. As an option, the user interface 3400 may be implemented in the context of the architecture and environment of the previous Figures or any subsequent Figure(s). Of course, however, the user interface 3400 may be implemented in any desired environment. The aforementioned definitions may apply during the present description.

As shown, the user interface 3400 may be utilized to define a desktop computer mode. For example, in one embodiment, the user interface may include a mode name and/or a graphical representation of the desktop computer mode. In another embodiment, the user interface may include a button 3402 to clone the definition of a second desktop computer mode. In this way, a user may easily create a number of similar desktop computer modes without having to repeatedly enter identical parameters.

The user interface 3400 may be utilized to define the mode conditions associated with a desktop computer mode. In various embodiments, the mode conditions may include, but are not limited to, specific peripherals, generic peripheral types, locations, schedules, network types, and/or power sources.

In one embodiment, the user interface 3400 may include a button 3404 to allow a user to select specific peripherals to act as mode conditions. For example, in one embodiment, selecting button 3404 may present the user with a list of all known peripheral devices and mounts. The user may select one or more peripherals from the list, which will act as mode conditions, in accordance to the established trigger parameters defined for each peripheral. As an option, the user interface 3400 may also include a list 3406 which lists the peripherals acting as mode conditions for the present desktop computer mode.

In one embodiment, the user interface 3400 may include a plurality of check boxes 3408 which represent a plurality of generic peripheral device types. The generic device types may include, but are not limited to, keyboard, mouse, trackpad, smartphone, display, storage, CPU, GPU, audio, and/or any other type of desktop peripheral device. As an option, a user may be presented with user interface 3000 of FIG. 30 or the like in response to selecting a generic device type name next to a check box, allowing the user to modify the default trigger parameters associated with that particular peripheral device type.

In one embodiment, the user interface 3400 may include a plurality of check boxes 3410 which represent a plurality of generic peripheral mount types. The generic mount types may include, but are not limited to, display, keyboard, trackpad, wall, and/or any other type of desktop mount. As an option, a user may be presented with user interface 3000 of FIG. 30 or the like in response to selecting a generic mount type name next to a check box, allowing the user to modify the default trigger parameters associated with that particular mount type.

In one embodiment, the user interface 3400 may include a check box 3412 to establish a predefined "mobile stand" trigger as a mode condition. As an option, a user may be presented with user interface 3100 of FIG. 31 or the like in response to selecting the words "mobile stand" or the like next to check box 3412, allowing the user to modify the trigger parameters associated with using a mobile stand.

In one embodiment, the user interface 3400 may include a collection of check boxes 3414 which allow a user to define one or more types of power source as mode conditions. The types of power sources may include, but are not limited to, battery, AC, and/or any other type of power source.

In one embodiment, the user interface 3400 may include a collection of check boxes 3416 which allow a user to define one or more types of internet connections as mode conditions. The types of internet connections may include, but are not limited to, wired, Wi-Fi, cellular, and/or any other type of internet connection.

In one embodiment, the user interface 3400 may include a check box 3418 which allows the user to define a schedule as a mode condition, such that the mode may only activate according to that schedule. For example, a user may specify that the mode may only activate between 4 pm and 8 pm, or only on weekends. In another embodiment, a user may be able to specify periods of time when the present desktop computer mode cannot activate, effectively acting as negative mode conditions. In yet another embodiment, the user may be able to specify a time limit as a mode condition. In still another embodiment, the user may be presented with a user interface which allows them to define a schedule, in response to selecting the word "schedule" or the like, next to check box 3418.

In one embodiment, the user interface 3400 may include a check box 3420 which allows the user to utilize a geographic location as a mode condition, such that the mode may only activate when the tablet computer is in proximity to that location. For example, a user may specify that the mode may only activate when the tablet computer is located within the user's home. In another embodiment, a user is able to specify one or more geographic locations where the present desktop computer mode may not activate, effectively acting as negative mode conditions. In yet another embodiment, the user may be presented with a user interface which allows them to specify locations, in response to selecting the word "location" or the like, next to check box 3420. In various embodiments, the location may be specified as a street address, a city, a latitude/longitude coordinate pair, and/or any other geographic descriptor.

The user interface 3400 may be utilized to define what happens when the mode conditions of the present desktop computer mode are satisfied. For example, in one embodiment, the user interface may be utilized to associate one or more applications with the present desktop computer mode. In one embodiment, the user interface may include a button 3422 which presents a user interface to the user which allows them to select one or more user application which will be executed when the present desktop computer mode is activated. As an option, the user may specify that all previous active applications be terminated upon activation of the present desktop computer mode. In another embodiment, a user may specify a plurality of applications which will be presented to the user as part of a simplified application launcher interface, when the present computer mode is active. In yet another embodiment, the user interface 3400 may also include a list 3424 which names all applications currently associated with the present desktop computer mode.

The user interface 3400 may also be utilized to define the type of user experience provided by the tablet computer when the present desktop computer mode is activated. For example, in one embodiment, the user interface may include a plurality of radio buttons 3426 which allow the user to define the type of multitasking user experience associated with the desktop computer mode. The types of multitasking user experience include, but are not limited to, windowed (i.e. the user interfaces of multiple applications are visible simultaneously, etc.), full screen (i.e. only the user interface of a single user application may be displayed at any one time), and/or any other type of multitasking user experience.

The user interface 3400 may be utilized to specify the role of hardware controls in the present desktop computer mode. For example, in one embodiment, the user interface may include a button 3428 which presents the user with a user interface that allows them to define the functionality associated with the one or more hardware buttons present on the tablet computer. In one embodiment, the user may be able to disable one or more hardware buttons. As an option, disabling a hardware button may automatically make available an alternative method for accomplishing the task associated with the disabled button. In another embodiment, the user may be able to assign different functionality to one or more hardware buttons. As a specific example, in a desktop computer mode triggered by contact with a display mount which blocks access to the tablet computer power button, the user may desire to reassign the power button to a more accessible volume button. In another example, the user may associate a hardware button with the activation/deactivation of a particular input mode, such as a laser projection keyboard.

The user interface 3400 may be utilized to specify how to handle special user interactions in the present desktop computer mode. For example, it may be specified how a user may wake the tablet computer from a low-power sleep state. In one embodiment, the user interface may contain a button 3430 which presents the user with a user interface that allows them to select one or more ways in which the tablet computer may be woken from a sleep state. The methods may include, but are not limited to, pressing a hardware button, activating a peripheral device, performing a particular control gesture in front of a video camera associated with the tablet computer, a particular voice command, clapping, and/or any other method of interacting with the tablet computer. In one embodiment, the user is also able to select one or more ways to place the tablet computer in a sleep mode.

The user interface 3400 may be utilized to associate the present desktop computer mode with one or more network resources. For example, in one embodiment, the user interface may include a button 3432 which presents the user with a user interface that allows them to specify one or more network resources which are to be made available (e.g. shared drive mounted, cloud storage account logged into, etc.) when the present desktop computer mode is activated.

In another embodiment, the user may enter account information (e.g. username, password, etc.) associated with a specified network resource.

When defining a desktop computer mode, the role of the tablet computer may be established. As shown, the user interface 3400 may be utilized to specify and configure a tablet role to be associated with the present desktop computer mode. For example, in one embodiment, the user interface may include a collection of buttons 3434 associated with different tablet roles. In another embodiment, this collection of buttons may also include a button 3436 to configure the selected tablet role.

In one embodiment, the tablet role collection 3434 may include a button 3438 to specify that the tablet computer will operate in the role of a display device in the present desktop computer mode. In one embodiment, while fulfilling a display role, the utilization of the tablet computer may be directed mainly to processing, and displaying the results of the processing. In various embodiments, a display role may minimize the amount of input received through the tablet computer touch screen. In one embodiment, the display role may be configured such that the tablet computer utilizes forms of user interaction that do not require physical contact with the tablet, such as control gestures and/or a laser projected keyboard. In another embodiment, the touch interface of the tablet display may be disabled. As an option, the user may be warned if a desktop computer mode is being configured such that there are no available means of input.

In another embodiment, the tablet role collection 3434 may include a button 3440 to specify that the tablet computer will operate in the role of a keyboard device in the present desktop computer mode. In one embodiment, while fulfilling a keyboard role, the utilization of the tablet computer may be directed mainly to processing, and receiving keyboard input to control the processing. As an option, the user may be warned if a desktop computer mode is being configured such that there are no available means of display. In another embodiment, the keyboard displayed on the tablet computer display may be dynamic, changing in appearance and functionality depending on which active application is being used. For example, in one embodiment, the labeling of the function keys along the top of the keyboard may change depending on which application is being used. In another embodiment, the keys displayed on the keyboard may change depending on which application is active (e.g. a number pad for a spreadsheet application, WASD directional keys for a game, an enlarged and simplified keyset for applications directed towards children, etc.). In still another embodiment, the keyboard role may be configured such that the tablet computer also accepts control gestures through a built-in camera.

In another embodiment, the tablet role collection 3434 may include a button 3442 to specify that the tablet computer will operate in the role of a trackpad device in the present desktop computer mode. In one embodiment, while fulfilling a trackpad role, the utilization of the tablet computer may be directed mainly to processing, and receiving trackpad input to control the processing. In another embodiment, the trackpad displayed on the tablet computer may also receive multitouch gestures. In still another embodiment, the trackpad role may be configured such that the tablet computer also accepts control gestures through a built-in camera.

In one embodiment, the tablet role collection 3434 may include a button 3444 to specify that the tablet computer will operate in the role of a hybrid input device in the present desktop computer mode. In the context of the present description, hybrid input device refers to an application dependent input device which also operates as a display in a limited capacity. For example, in one embodiment, while operating as a hybrid input device, the tablet computer may display the toolbars of the currently active application, providing the user with a simple interface to elements of the application while also freeing up screen real estate. In one embodiment, elements of the hybrid input device role may be configured by the user on a per-application basis. In another embodiment, the hybrid input device role is implemented by each application in a predefined manner.

In one embodiment, while fulfilling a hybrid input device role, the utilization of the tablet computer may be directed mainly to processing, and receiving input to control the processing. As an option, the user may be warned if a desktop computer mode is being configured such that there are no available means of display. In another embodiment, the hybrid input device role may be configured such that the tablet computer also provides other forms of user interaction, such as control gestures and/or a laser projected keyboard.

In one embodiment, the tablet role collection 3434 may include a button 3446 to specify that the tablet computer will operate in the role of a processor device in the present desktop computer mode. In the context of the present description, the processor device role refers to a scenario where the tablet computer is operating with the tablet display disabled. In one embodiment, a first tablet operating in the processor device role may be utilized by a second tablet computer to perform distributed, parallel calculations. As an option, the user may be warned if a desktop computer mode is being configured such that there are no available means of display. In another embodiment, the processor device role may be configured such that the tablet computer also provides forms of user interaction which do not require the use of the tablet display, such as control gestures and/or a laser projected keyboard.

As shown, the user interface 3400 may be utilized to save a desktop computer mode. For example, in one embodiment, the user interface may include a button 3448 to initiate the process of saving the present desktop computer mode. In one embodiment, the desktop computer mode may be evaluated for conflicts before being saved. Possible conflicts may include, but are not limited to, configurations missing a means for text input, configurations missing a means for indication (i.e. missing a mouse, trackpad, and touchscreen), configurations missing a means to display processing results, and/or any other type of conflict which may prevent the desktop computer mode from providing functionality to the user. In another embodiment, the user may be prompted if a conflict is found, informing them of the nature of the conflict.

In various embodiments, the interfaces of FIGS. 29 through 34 (or any of the interfaces for that matter) may be displayed utilizing the tablet computer mode and/or desktop computer mode. In still other embodiments, the interfaces of FIGS. 29 through 34 (or any of the interfaces for that matter) may take the form of webpages displayed utilizing a web browser on any desired computer, handheld device, etc. In such case, any of the parameters or other input disclosed herein may be entered without use of the tablet computer, whereby such parameters or other input (or derivatives thereof) may be pushed to the tablet computer for configuration/updated purposes.

In one embodiment, when the tablet computer is being operated in the desktop computer mode and is not serving as a keyboard or primary display as disclosed herein, the touchscreen of the tablet computer may serve as a secondary display. In one embodiment, the tablet computer may serve as such secondary display in a position between a conventional keyboard and a conventional primary display, facing a user, angled between 25-65 degrees so as to allow viewing by the user while the user is manipulating the keyboard and viewing the conventional primary display during desktop use, and within reaching distance of such user manipulating the keyboard and viewing the conventional primary display (for providing finger gestures via the tablet computer touchscreen).

To accomplish this, the tablet computer may be positioned on an independent, separate mount (e.g. stand, resting platform, etc.) situated between the keyboard and primary display, in accordance with one possible embodiment. In another possible embodiment, the tablet computer may be positioned in the manner set forth above, on a mount coupled (e.g. integrally or otherwise) to the keyboard. To this end, the tablet computer would extend upwardly and in a rearward direction from an upper edge of the keyboard (possibly in a substantially same plane as an operating surface of the keyboard). In yet another embodiment, the tablet computer may be positioned in the manner set forth above, on a mount coupled (e.g. integrally or otherwise) to the primary display. To this end, the tablet computer would extend downwardly and in a forward direction from a bottom edge of the primary display that is vertically oriented.

In another embodiment, when the tablet computer is being operated in the desktop computer mode and is serving as a keyboard as disclosed herein, the aforementioned interfaces of FIGS. 29 through 34 (or any of the interfaces disclosed herein, for that matter) may be displayed in a section of the tablet computer that is not displaying the keyboard. For example, a user may have an ability to configure the keyboard displayed on the tablet computer to either consume the entire touchscreen of the tablet screen or only a portion thereof (e.g. bottom portion, in landscape position, etc.) such that any of the aforementioned interfaces (or any others disclosed herein) may be positioned thereabove for viewing and/or manipulation by a user typing using the keyboard.

In any such embodiments, the tablet computer display (or portion thereof) may be used to display information, application interfaces, etc. secondarily with respect to the primary display. For example, in such secondary role, the tablet computer display may depict the interfaces of FIGS. 29 through 34 (or any of the interfaces disclosed herein, for that matter), and/or others, as well.

For example, in such secondary display role during desktop mode, the tablet computer display may be used to display: 1) an e-mail interface that displays a plurality of e-mails as they are received during desktop use and allow a reply to/forwarding of such received emails, 2) a task manager for setting, defining, and a plurality of tasks to be completed and an ability to set and display reminders for the same during desktop use, 3) a calendar for setting, defining, and displaying a plurality of scheduled events (e.g. meetings, etc.) in a day, week, month, etc. format, 4) social networking interface for displaying real-time pushed/pulled social network updates (e.g. news, feeds, etc.) as they are received along with an ability to respond, post user status updates, etc. during desktop use, 5) a web browser for searching for and browsing information on a network such as the Internet, 6) a music interface for searching, playing, pausing and otherwise controlling music playback during use of the tablet computer in the desktop mode, 7) an application/file explorer (e.g. manager, etc.) interface for displaying a plurality of application and/or files (which may each possibly indicate associated applications in connection with an associated icon) for browsing file folders of such files and further selecting the same for launching the same for display on the primary display and/or the tablet computer display, 8) a control panel which allows users to view and manipulate basic system settings and controls, such as adding hardware, adding and removing software, controlling user accounts, and changing accessibility options associated with the desktop mode use (and possibly even tablet mode use), and/or 9) a video conference control interface for initiating, managing, controlling, etc. a video conference while, a) displaying a video feed from a local camera of a user of the desktop thus freeing the primary display to be used solely (or at least substantially) for display of an incoming video feed from a third party, and/or b) displaying the video feed from the local camera of the user of the desktop and the incoming video feed from the third party, thereby freeing the primary display to be used solely (or at least substantially) for display of work product that is the subject of the user's primary attention and/or being shared with the third party.

By this design, in one possible embodiment, the tablet computer display be used as a secondary interface to display any one or more of the above without necessarily disrupting (at least in part) the use of the primary display for other primary matters (e.g. word processing, graphic design, and/or other work/entertainment-related tasks, etc.). For example, the tablet computer display may be secondarily used as an interface to display any one or more of the above without necessarily requiring application context switching among the different windows/interfaces displayed on the primary display, as well as allow finger gesture manipulation in connection with what is displayed on the primary display.

In still another embodiment, the tablet computer display may be used as a secondary interface to manipulate anything displayed on the primary display. Such manipulation may include the use of the touchscreen of the tablet computer in a manner that allows touch gestures to zoom in, zoom out, rotate, crop, swipe, flip, drag, etc. in connection with any content (e.g. document, picture, etc.) that is displayed using the primary display. Any such manipulation may, in one embodiment, only be displayed on the tablet computer display. Of course, however, such manipulation may, in another embodiment, be displayed on both the tablet computer display and the primary display (such that the content and the manipulation of the content on the tablet computer display are simultaneously displayed on the primary display).

To initiate the foregoing technique, in accordance with one embodiment; an application interface, content within an application instance (e.g. document, file etc.), and/or a portion thereof may be selected using an icon, menu option, etc. for being displayed on the tablet computer display, for the purpose of finger gesture manipulation, etc. Further, in other embodiments where a primary display includes a touchscreen, such selection may be accomplished by swiping items down from the primary screen down to the secondary screen of the tablet computer. Of course, other embodiments are contemplated where the tablet computer touchscreen is used for any gesture manipulation purpose disclosed herein, but the backlight of the tablet computer is not activated (for power savings, etc.).

In other embodiment where the tablet computer display mimics the primary display, the user may choose to simply use his/her fingers to manipulate the content shown on the primary display, by touching (e.g. manipulating, and/or applying gestures to content, etc.) the touchscreen of the tablet computer.

In another optional embodiment, a power-save mode that results in deactivation (i.e. power down) of the tablet computer display backlight (or entry into a screensaver mode), may be disabled during desktop mode so that the secondary interface features disclosed herein may be displayed continuously while the tablet computer display is being used in the desktop mode. In another embodiment, the foregoing feature may be only conditionally enabled, based on whether the primary display is activated/being used. In other words, the tablet computer display may enter a screensaver mode or the backlight may be powered down coincidently (or at least as a function of) the screensaver or power down of the primary display.

Of course, the foregoing interfaces, features, etc. may be provided in any role/mode (other than the secondary mode) disclosed herein (or even not disclosed). Further, a user may be able to configure the tablet computer (using the various configuration interfaces disclosed herein, for example, etc.) to include any one or more of the foregoing features/interfaces (or any other disclosed herein), including what interfaces (or portion thereof) are displayed, how they are displayed (e.g. format, arrangement, etc.), when they are display (time of day), and in which tablet mode they are displayed (e.g. tablet mode, desktop_1 mode, desktop_2 mode, etc.).

In other embodiments, any of the applications disclosed herein may take the form of one or more online application (and/or related features, techniques, etc.) described in U.S. application Ser. No. 12/340,533, filed Dec. 19, 2008, which is incorporated herein by reference in its entirety for all purposes. Of course, any technique, embodiment, feature, etc. disclosed in U.S. application Ser. No. 12/340,533, filed Dec. 19, 2008, may be incorporated with any one or more (or none) of the embodiments disclosed herein.

Figure 35:
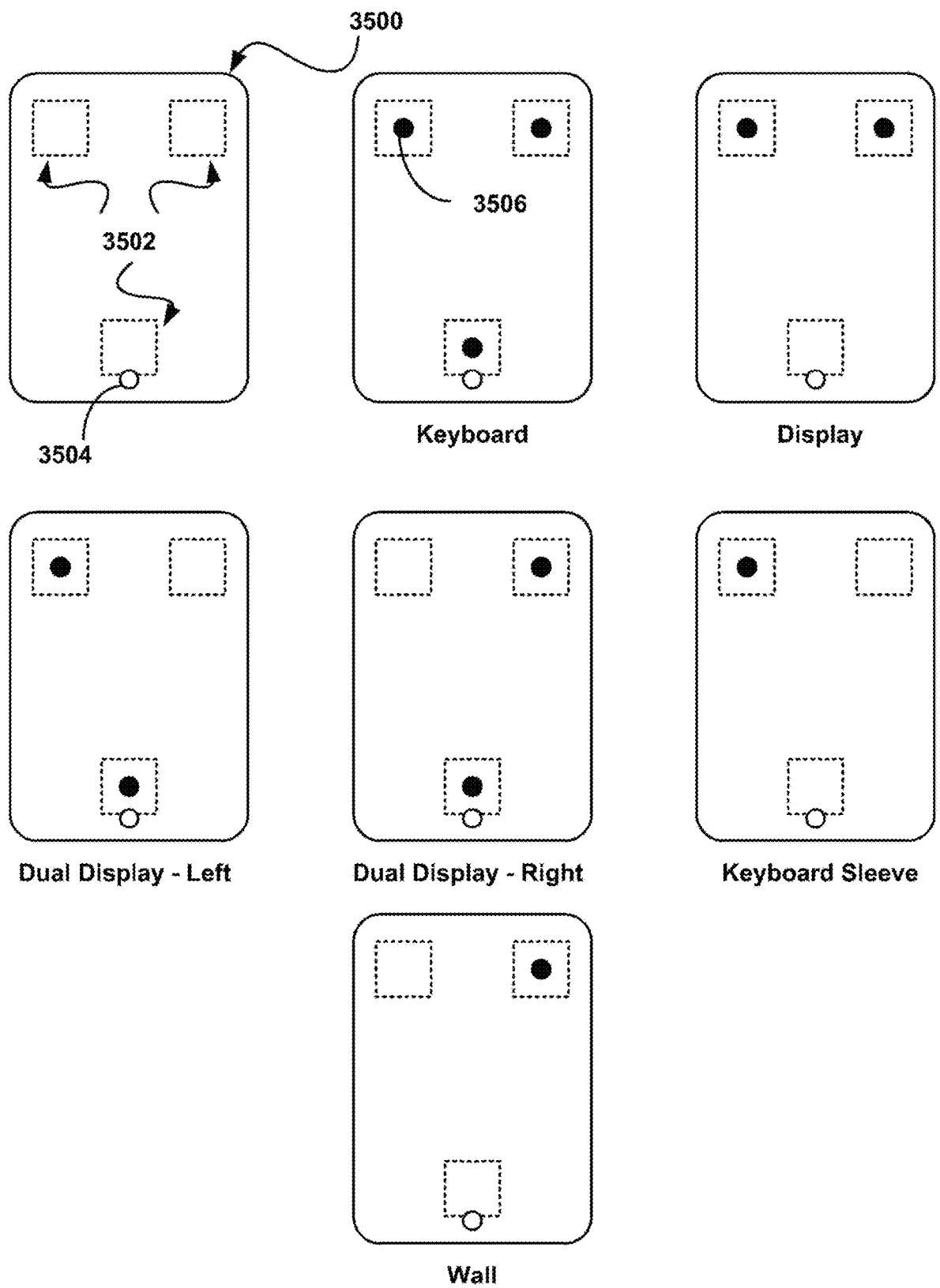
FIG. 35 shows an exemplary implementation of a method to identify a mount using magnets, in accordance with one embodiment.

FIG. 35 shows a plurality of exemplary implementations of a method to identify a mount using magnets, in accordance with one embodiment. As an option, this method may be implemented in the context of the architecture and environment of the previous Figures or any subsequent Figure(s). Of course, however, this method may be implemented in any desired environment. The aforementioned definitions may apply during the present description.

In one embodiment, a tablet computer in contact with a mount may determine the type of mount by sensing the interaction between magnets embedded in the mount and sensors within the tablet computer responsive to a magnetic field. As shown in FIG. 35, a tablet computer may include one or more sensors 3502 which are responsive to magnetic fields [or any other communication (transmitter/sensor) mechanism, for that matter]. For example, in one embodiment, a tablet computer includes three magnetic sensors 3502 situated on the back face of the tablet computer, one located behind a home button 3504 and two located in the far corners, as shown. In another embodiment, one or more magnets may be embedded within a tablet computer mount. A variety of mount types may be identified by sensing the presence of a magnet near on or more of the sensors 3502. The mount types which may be detected include, but are not limited to, keyboard mounts, display mounts, dual tablet mounts, keyboard sleeve mounts, and/or wall mounts. In yet another embodiment, a tablet computer may distinguish between the left side and right side of a dual tablet mount based on magnet placement. In various embodiments, the magnets may be chosen such that their strength is great enough to be detected, yet weak enough to not interfere with the operation of the tablet computer.

Figure 36A:
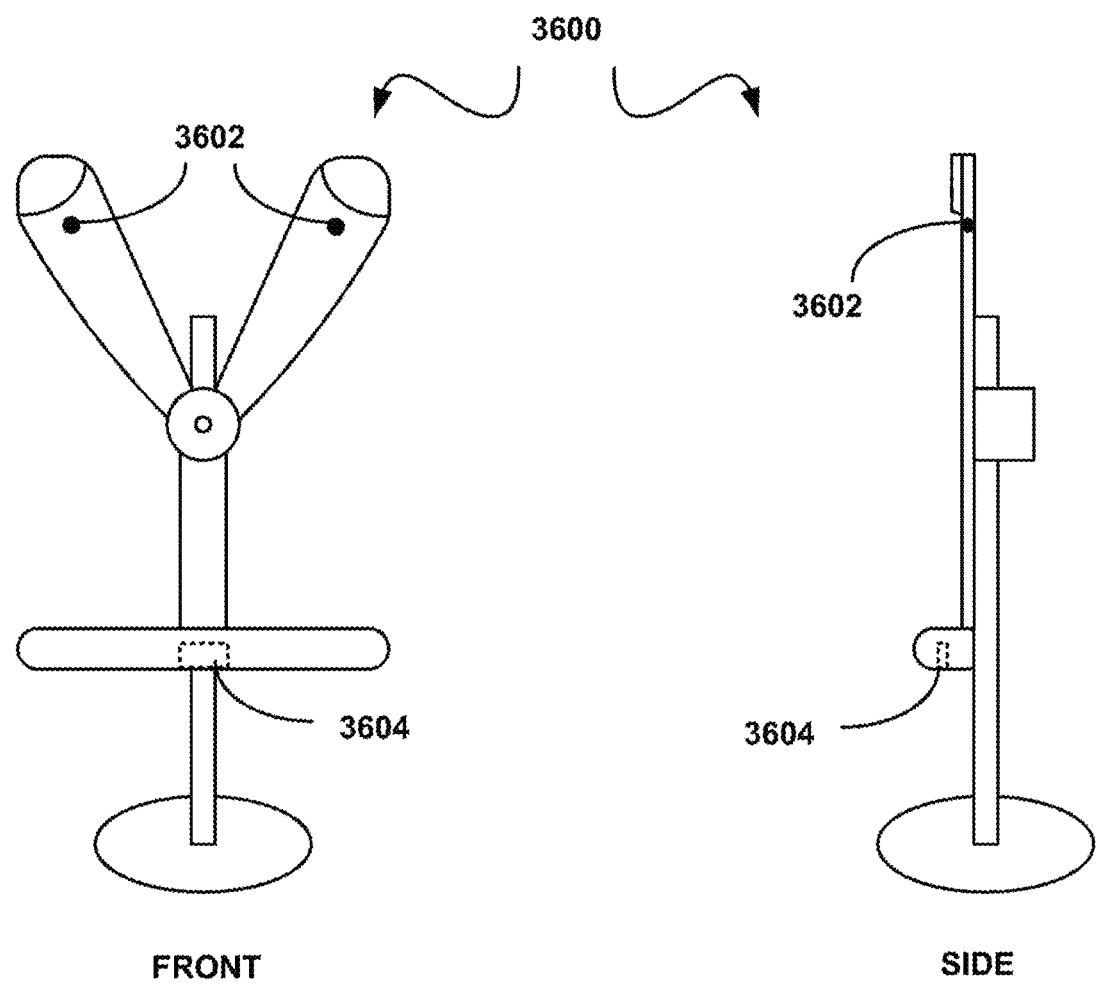
FIG. 36A shows a display mount apparatus in a portrait orientation, in accordance with one embodiment.

FIG. 36A shows a display mount apparatus 3600 in a portrait orientation, in accordance with one embodiment. As an option, apparatus 3600 may be implemented in the context of the architecture and environment of the previous Figures or any subsequent Figure(s). Of course, however, the apparatus 3600 may be implemented in any desired environment. The aforementioned definitions may apply during the present description.

As shown, the display mount 3600 may be identifiable to a tablet computer. For example, in one embodiment, the display mount 3600 may include one or more magnets 3602 embedded within the body of the mount. The placement of the magnets may indicate to the tablet computer that it is in contact with a display mount. In another embodiment, the display mount 3600 may include an RFID tag encoded with at least a unique identifier and a mount type.

As shown, the display mount 3600 may be utilized to provide a mounted tablet computer with wired connection to power and/or data sources. For example, in one embodiment, the display mount 3600 may include a tablet computer docking connector 3604 to provide power to a mounted tablet computer. In another embodiment, the display mount 3600 may provide power and a wired data connection to other resources and devices. In still another embodiment, the display mount 3600 may include an inductive charging plate for charging a tablet computer.

Figure 36B:
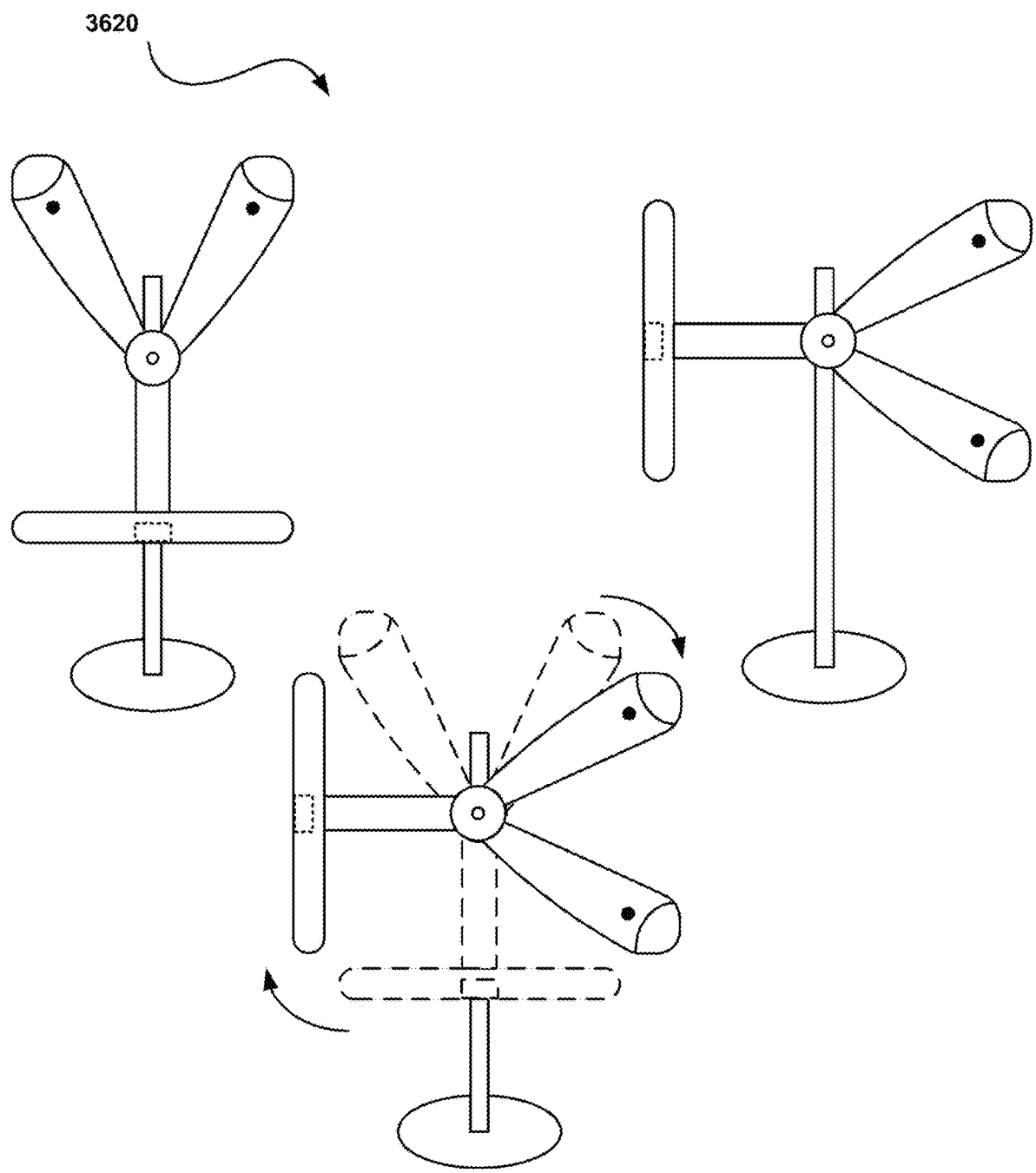
FIG. 36B shows a display mount apparatus in a landscape orientation, in accordance with one embodiment.

FIG. 36B shows a display mount apparatus 3620 in a landscape orientation, in accordance with one embodiment. As an option, apparatus 3620 may be implemented in the context of the architecture and environment of the previous Figures or any subsequent Figure(s). Of course, however, the apparatus 3620 may be implemented in any desired environment. The aforementioned definitions may apply during the present description.

As shown, the display mount 3620 may be utilized in more than one orientation. For example, in one embodiment, display mount 3620 may be placed in either a portrait orientation or a landscape orientation. In another embodiment, a mounted tablet may be rotated from one orientation to another without being removed from the display mount 3620. In still another embodiment, the display mount 3620 may be placed on an articulated arm to allow a user to further adjust the position of the mounted tablet computer.

Figure 36C:
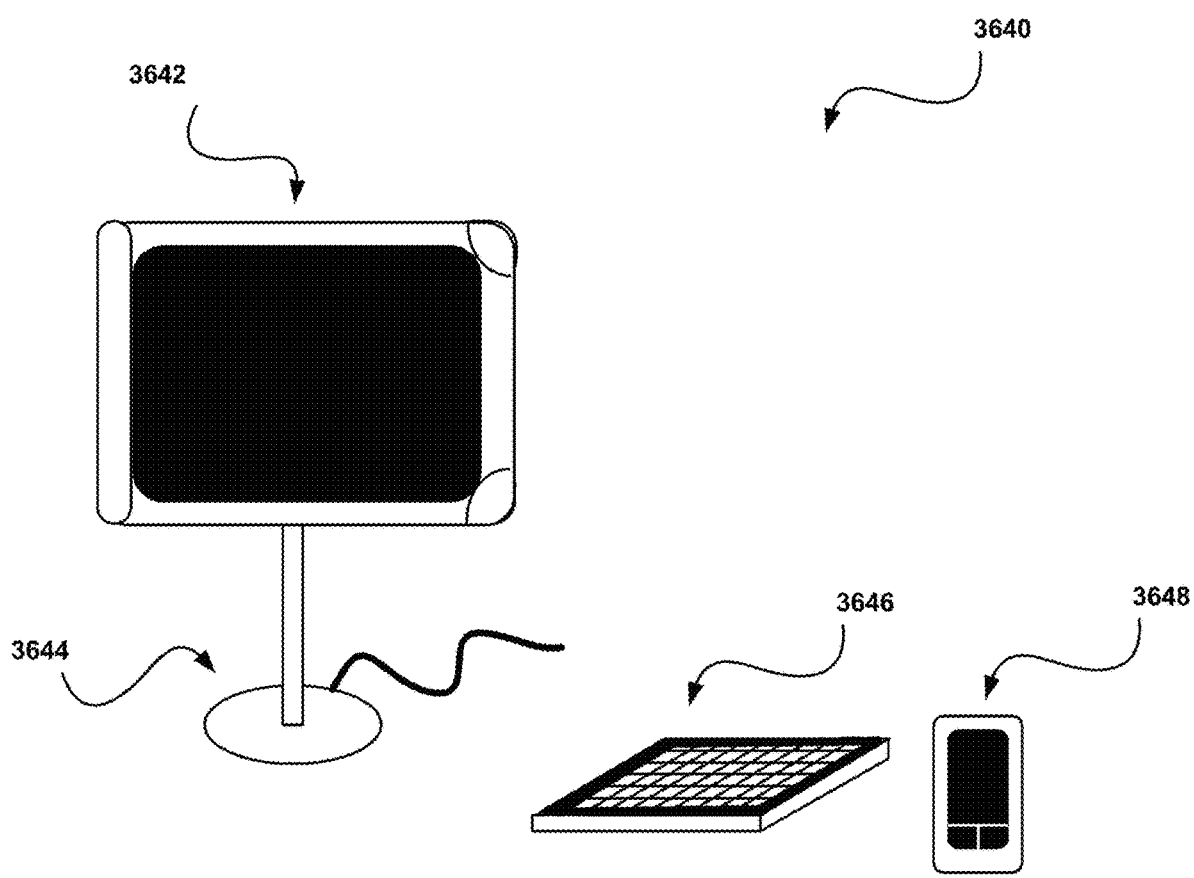
FIG. 36C shows a system for utilizing a tablet computer as a display, in accordance with one embodiment.

FIG. 36C shows a system 3640 for utilizing a tablet computer as a display, in accordance with one embodiment. As an option, system 3640 may be implemented in the context of the architecture and environment of the previous Figures or any subsequent Figure(s). Of course, however, the system 3640 may be implemented in any desired environment. The aforementioned definitions may apply during the present description.

In various embodiments, a tablet computer 3642 attached to a display mount 3644 may receive input from one or more other devices. For example, in one embodiment, the tablet computer 3642 may receive input through a wireless connection to a keyboard 3646.

In another embodiment, the tablet computer may receive input through a wireless connection to a smart phone 3648. A smart phone may be utilized as an input device by a tablet computer in multiple ways. For example, in one embodiment, the smart phone may be utilized as a trackpad device for moving a cursor displayed on the tablet computer. In another embodiment, the smart phone may be utilized as a remote camera to detect and report the use of control gestures. In still another embodiment, the smart phone may be used as a hybrid input device. In yet another embodiment, a smart phone may be used as a remote microphone which conveys voice commands to the tablet computer. In another embodiment, a smart phone may project a virtual keyboard to be used in conjunction with the tablet computer.

Figure 37A:
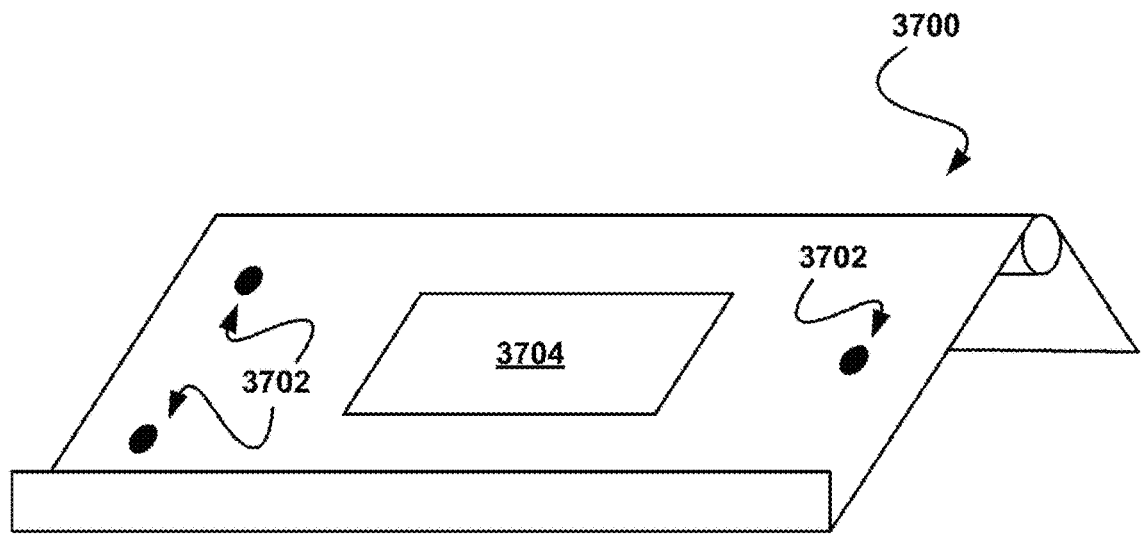
FIG. 37A shows a keyboard mount apparatus, in accordance with one embodiment.

FIG. 37A shows a keyboard mount apparatus 3700 for utilizing a tablet computer as a keyboard, in accordance with one embodiment. As an option, apparatus 3700 may be implemented in the context of the architecture and environment of the previous Figures or any subsequent Figure(s). Of course, however, the apparatus 3700 may be implemented in any desired environment. The aforementioned definitions may apply during the present description.

As shown, the keyboard mount 3700 may be identifiable to a tablet computer. For example, in one embodiment, the keyboard mount 3700 may include one or more magnets 3702 embedded within the body of the mount. The placement of the magnets may indicate to the tablet computer that it is in contact with a keyboard mount. In another embodiment, the keyboard mount 3700 may include an RFID tag encoded with at least a unique identifier and a mount type.

As shown, the keyboard mount 3700 may be utilized to provide power to a tablet computer. For example, in one embodiment, the keyboard mount includes an inductive charging plate 3704 to provide power to a tablet computer. In another embodiment, the keyboard mount may also incorporate a tablet computer dock connector to provide power and/or wired communication with resource and devices.

Figure 37B:
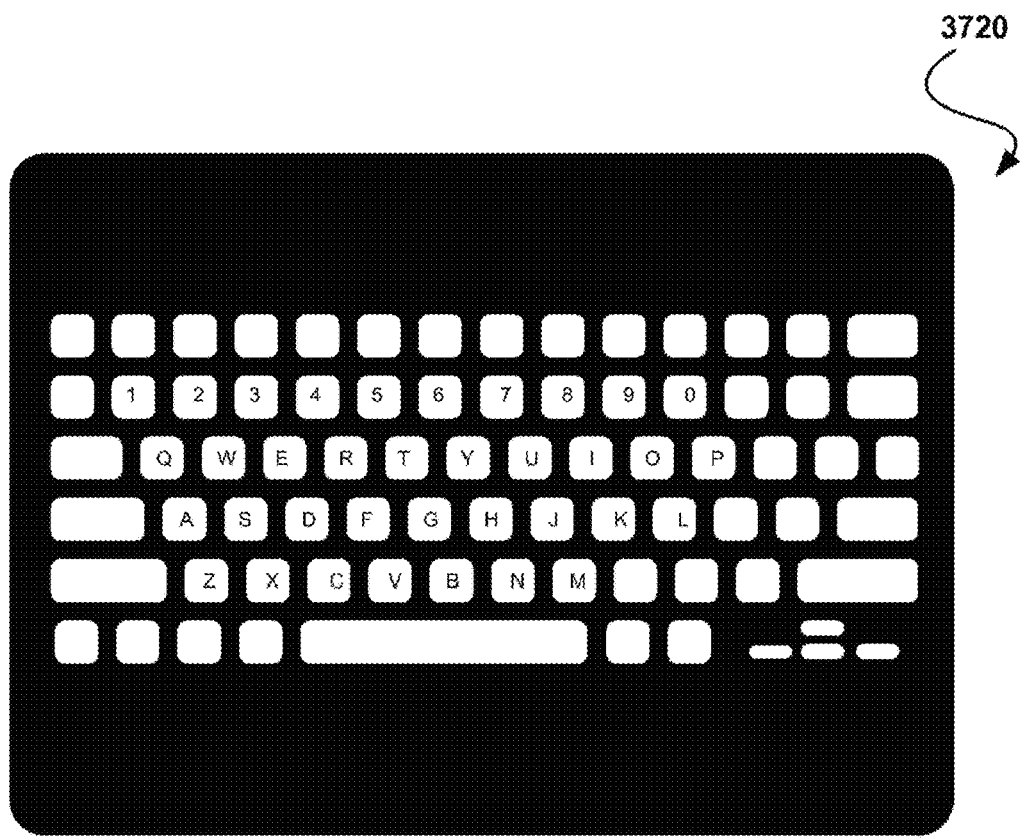
FIG. 37B shows a user interface for utilizing a tablet computer as a keyboard input device, in accordance with one embodiment.

FIG. 37B shows a user interface 3720 for utilizing a tablet computer as a keyboard, in accordance with one embodiment. As an option, user interface 3720 may be implemented in the context of the architecture and environment of the previous Figures or any subsequent Figure(s). Of course, however, the user interface 3720 may be implemented in any desired environment. The aforementioned definitions may apply during the present description.

As shown, the user interface 3720 may allow the tablet computer to be utilized as a keyboard input device. For example, in one embodiment, the user interface may include a graphical representation of a QWERTY keyboard. In another embodiment, the user interface may include dynamic elements in addition to a standard set of keyboard keys. The dynamic elements may include, but are not limited to, application launchers, clocks, buttons specific to the presently active application, and/or any other element which may depend on one or more factors. In still another embodiment, the user interface may be adapted to the alphabet of one of a plurality of languages. In yet another embodiment, the user interface may be implemented such that the tablet computer provides a very short vibration in response to the pressing of an on-screen key, providing tactile feedback to the user.

Figure 37C:
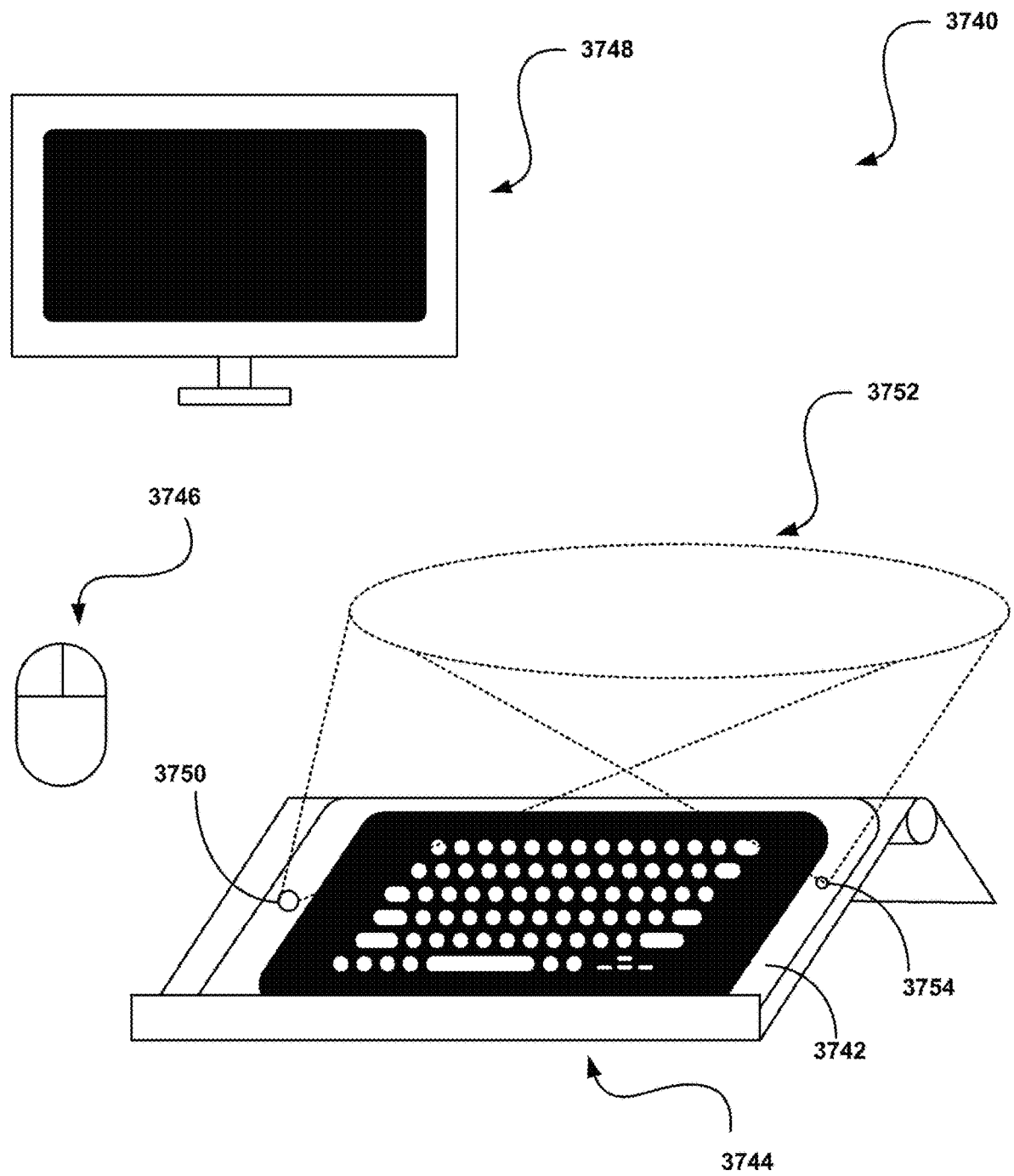
FIG. 37C shows a system for utilizing a tablet computer as a keyboard in conjunction with a keyboard mount, in accordance with one embodiment.

FIG. 37C shows a system 3740 for utilizing a tablet computer as a keyboard in conjunction with a keyboard mount, in accordance with one embodiment. As an option, system 3740 may be implemented in the context of the architecture and environment of the previous Figures or any subsequent Figure(s). Of course, however, the system 3740 may be implemented in any desired environment. The aforementioned definitions may apply during the present description.

In various embodiments, a tablet computer 3742 attached to a keyboard mount 3744 may receive input from, and provide output to, one or more other devices. For example, in one embodiment, the tablet computer 3742 may receive input from a mouse 3746 through a wireless connection. In another embodiment, the tablet computer may provide graphical output to an external display 3748 through a wireless connection.

While functioning as a keyboard device, a tablet computer 3742 may also receive input from the user which does not require physical contact. For example, in one embodiment, the tablet computer may be receptive to control gestures detected by a first built-in camera 3750 when the gestures are executed within the volume of space 3752. As an option, a second built-in camera 3742 may be utilized to allow the tablet computer to perform stereoscopic gesture recognition (e.g. able to determine the distance above the tablet computer at which a control gesture is being performed, etc.). In this way, the set of distinct control gestures may be augmented with additional intuitive control gestures. As a specific example, a user may change the system volume level by raising and lowering their hand over the tablet computer.

Figure 38A:
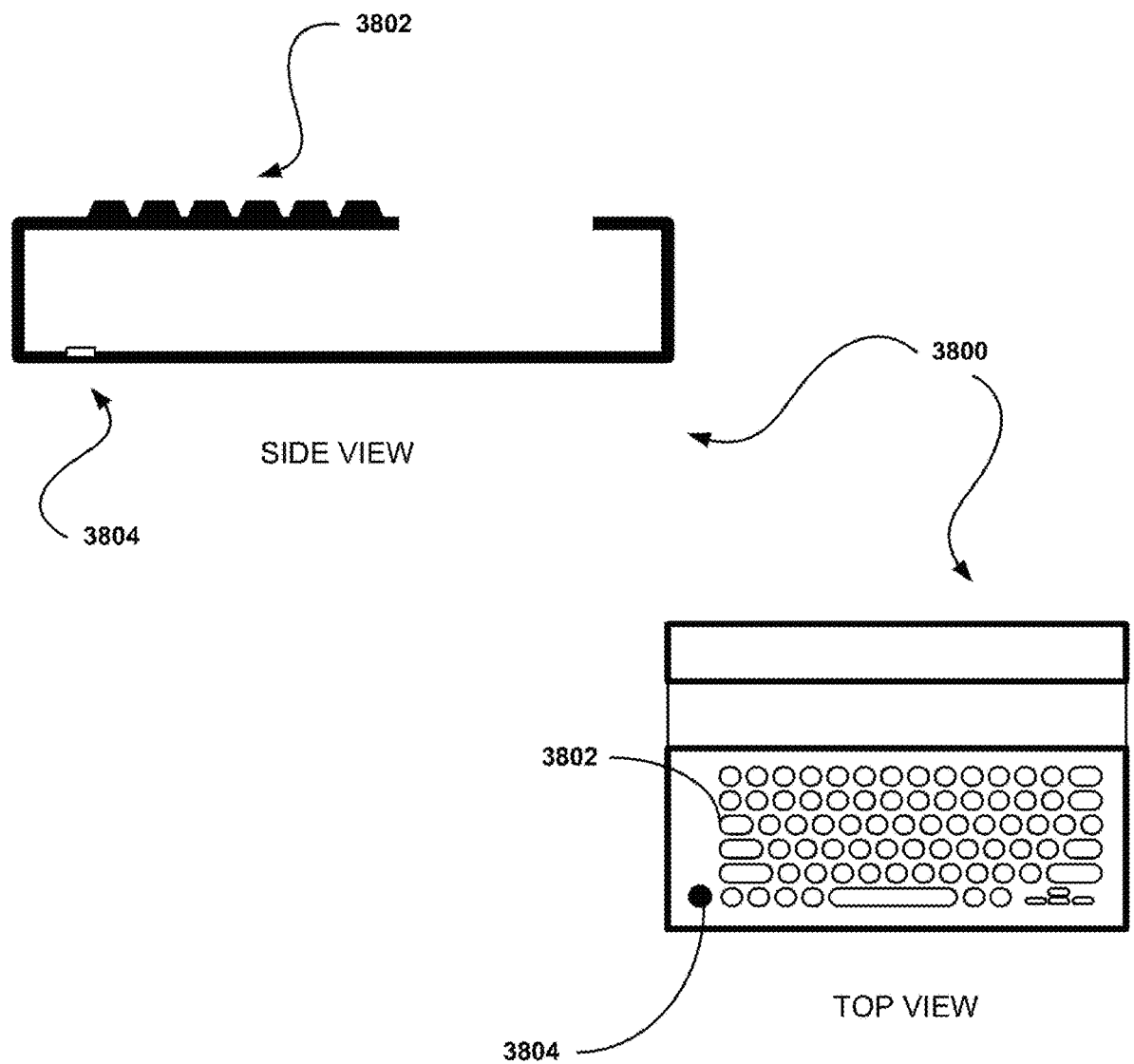
FIG. 38A shows a keyboard sleeve mount apparatus, in accordance with one embodiment.

FIG. 38A shows a keyboard sleeve mount apparatus 3800 for utilizing a tablet computer as a keyboard, in accordance with one embodiment. As an option, apparatus 3800 may be implemented in the context of the architecture and environment of the previous Figures or any subsequent Figure(s). Of course, however, the apparatus 3800 may be implemented in any desired environment. The aforementioned definitions may apply during the present description.

As shown, the keyboard sleeve mount 3800 may be utilized to enhance the user experience when using the tablet computer as a keyboard device. For example, in one embodiment, the keyboard sleeve mount may envelop some or all of a tablet computer, providing a top surface 3802 which simulates the tactile feel of a physical-button equipped keyboard. In some embodiments, the keyboard sleeve mount also allows for touchscreen interaction with at least a portion of the touchscreen display of the tablet computer. In one embodiment, the keyboard sleeve mount may be constructed out of a flexible material (e.g. silicone, rubber, etc.). In another embodiment, the keyboard sleeve mount may be constructed out of a transparent or translucent material, allowing a portion of the light from the tablet display to pass through the top surface of the sleeve.

As shown, the keyboard sleeve mount 3800 may be identifiable to a tablet computer. For example, in one embodiment, the keyboard sleeve mount 3800 may include one or more magnets 3804 embedded within the body of the sleeve. The placement of the magnets may indicate to the tablet computer that it is in contact with a keyboard sleeve mount. In another embodiment, the keyboard sleeve mount 3800 may include an RFID tag encoded with at least a unique identifier and a mount type.

Figure 38B:
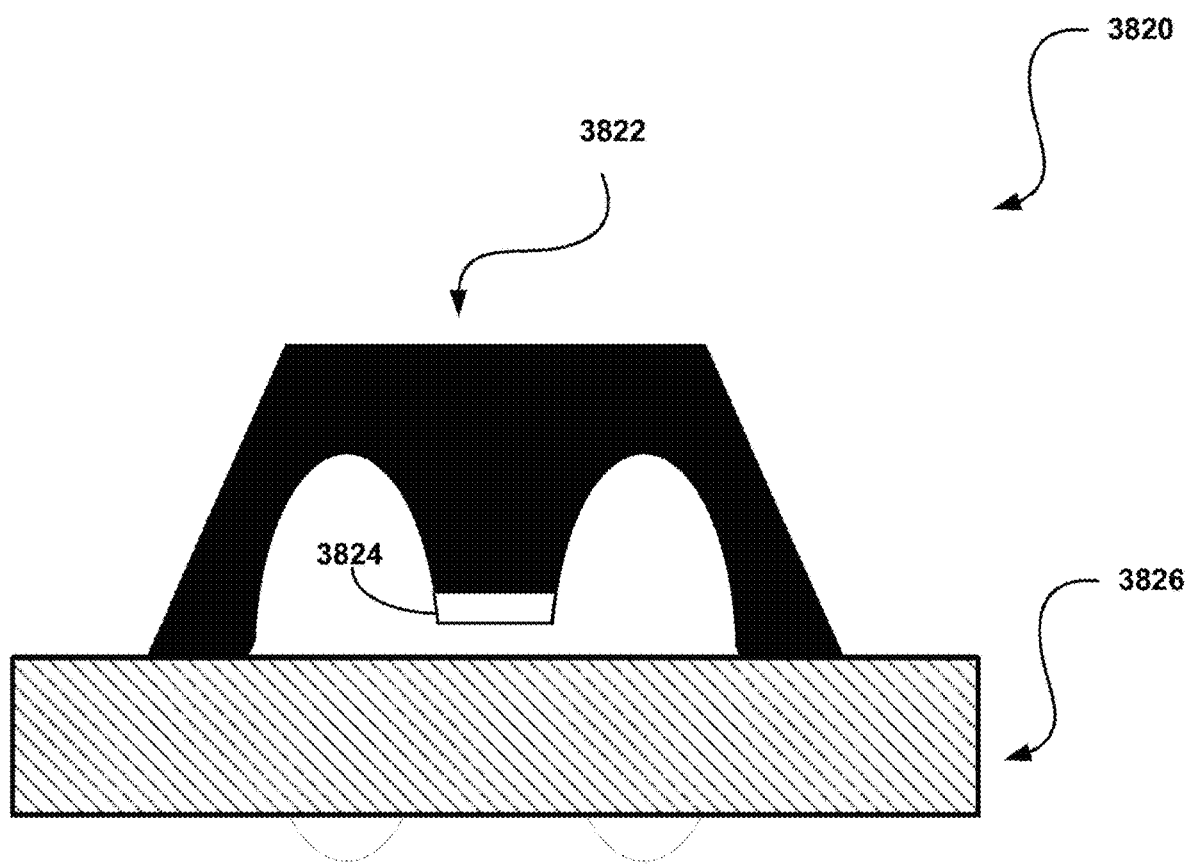
FIG. 38B shows a cross section of a key situated on the top surface of a keyboard sleeve mount apparatus, in accordance with one embodiment.

FIG. 38B shows a cross section of a key 3820 situated on the top surface of a keyboard sleeve mount apparatus, in accordance with one embodiment. As an option, apparatus 3820 may be implemented in the context of the architecture and environment of the previous Figures or any subsequent Figure(s). Of course, however, the apparatus 3820 may be implemented in any desired environment. The aforementioned definitions may apply during the present description.

As shown, the key 3820 situated on the top surface of a keyboard sleeve mount may be utilized to translate physical pressure into effective interaction with the touchscreen display of a tablet computer. For example, in one embodiment, the key may be constructed out of a flexible material 3822, with an internal nub whose cap 3824 is situated a short distance away from the tablet computer touchscreen display 3826. The cap 3824 may be composed of material whose contact may be discernable by the touchscreen display.

Pressing the key results in the cap making contact with an area of the touchscreen display. In one embodiment, the thickness of the walls of the key is thick enough to provide resistance to finger pressure, while thin enough to provide a smooth motion.

Figure 38C:
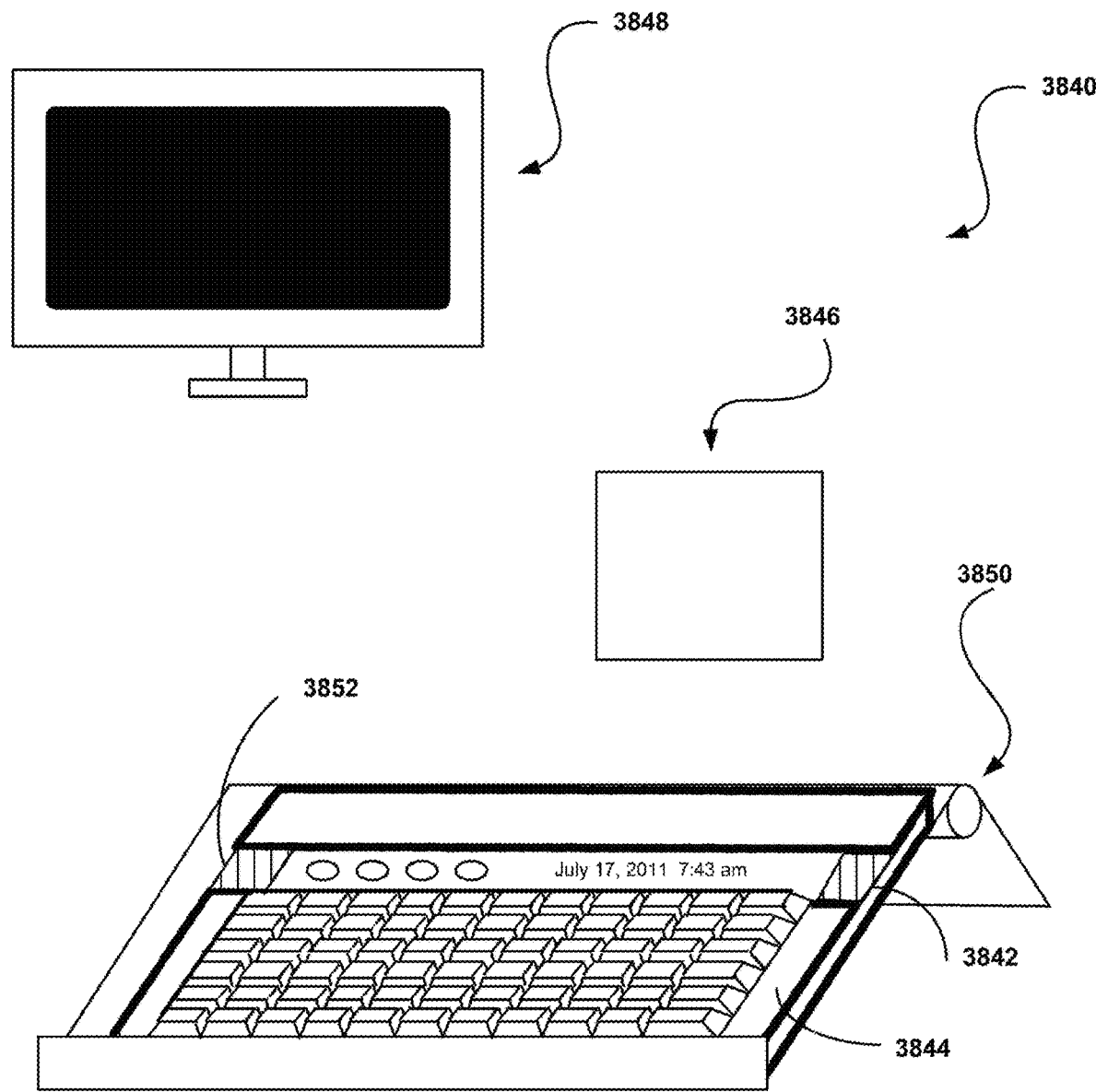
FIG. 38C shows a system for utilizing a tablet computer as a keyboard in conjunction with a keyboard sleeve mount, in accordance with one embodiment.

FIG. 38C shows a system 3840 for utilizing a tablet computer as a keyboard in conjunction with a keyboard sleeve mount, in accordance with one embodiment. As an option, system 3840 may be implemented in the context of the architecture and environment of the previous Figures or any subsequent Figure(s). Of course, however, the system 3840 may be implemented in any desired environment. The aforementioned definitions may apply during the present description.

In various embodiments, a tablet computer 3842 attached to a keyboard sleeve mount 3844 may receive input from, and provide output to, one or more other devices. For example, in one embodiment, the tablet computer 3842 may receive input from a trackpad 3846 through a wireless connection. In another embodiment, the tablet computer may provide graphical output to a second tablet computer in a display mount 3848, through a wireless connection. The second tablet computer is in a display mount, and is operating as a display device.

As shown, a tablet computer being utilized as a keyboard device in conjunction with a keyboard sleeve mount may additionally be used with a keyboard mount 3850. In one embodiment, the tablet computer may be able to detect the presence of the keyboard mount in addition to the keyboard sleeve mount, allowing the user to define desktop computer modes for that specific situation. In another embodiment, the sleeve may be too thick for the tablet to detect the presence of the keyboard mount 3850. In still another embodiment, the sleeve material may be thin enough that the tablet computer may receive power from the inductive charging plate incorporated into the keyboard mount.

Figure 39A:
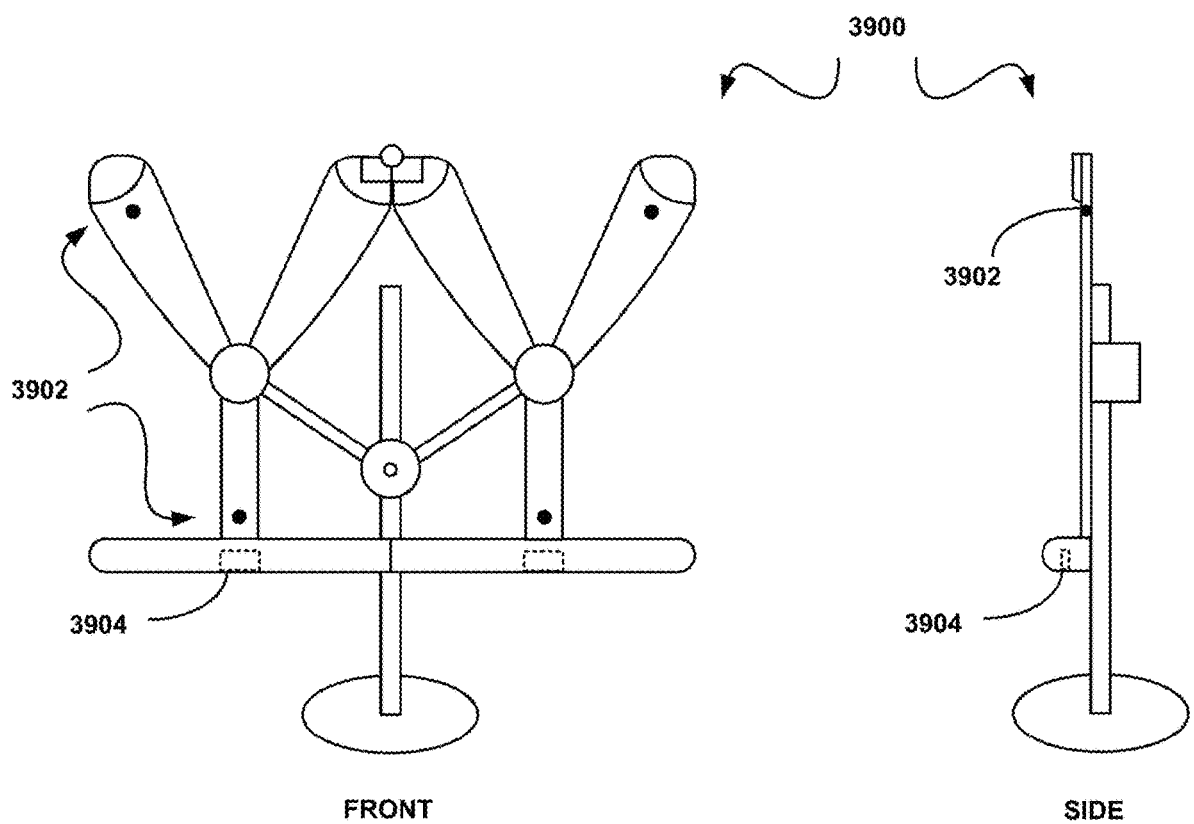
FIG. 39A shows a dual display mount apparatus in a portrait orientation, in accordance with one embodiment.

FIG. 39A shows a dual display mount apparatus 3900 for utilizing two tablet computers as a display device in a portrait orientation, in accordance with one embodiment. As an option, apparatus 3900 may be implemented in the context of the architecture and environment of the previous Figures or any subsequent Figure(s). Of course, however, the apparatus 3900 may be implemented in any desired environment. The aforementioned definitions may apply during the present description.

As shown, the dual display mount 3900 may be identifiable to a tablet computer. For example, in one embodiment, the dual display mount 3900 may include one or more magnets 3902 embedded within the body of the mount. The placement of the magnets may indicate to the tablet computer that it is in contact with a dual display mount. As an option, the placement of the magnets may allow the tablet computers to determine which side of the dual display mount they are in contact with. In another embodiment, the dual display mount 3900 may include an RFID tag encoded with at least a unique identifier and a mount type.

As shown, the dual display mount 3900 may be utilized to provide power to the two tablet computers. For example, in one embodiment, the dual display mount may incorporate tablet computer dock connectors 3904 to provide power and/or wired communication between the two tablet computers, as well as with other resources and devices. In another embodiment, the dual display mount may include inductive charging plates to provide power to the tablet computers.

FIG. 39B shows a dual display mount apparatus 3920 in a landscape orientation, in accordance with one embodiment. As an option, apparatus 3920 may be implemented in the context of the architecture and environment of the previous Figures or any subsequent Figure(s). Of course, however, the apparatus 3920 may be implemented in any desired environment. The aforementioned definitions may apply during the present description.

As shown, the dual display mount 3920 may allow the tablet computers to be utilized in more than one orientation. For example, in one embodiment, dual display mount 3920 may be placed in either a portrait orientation or a landscape orientation. In another embodiment, the mounted tablets may be rotated from one orientation to another without being removed from the dual display mount 3920. In still another embodiment, the dual display mount 3920 may be placed on an articulated arm to allow a user to further adjust the position of the mounted tablet computers.

Figure 39C:
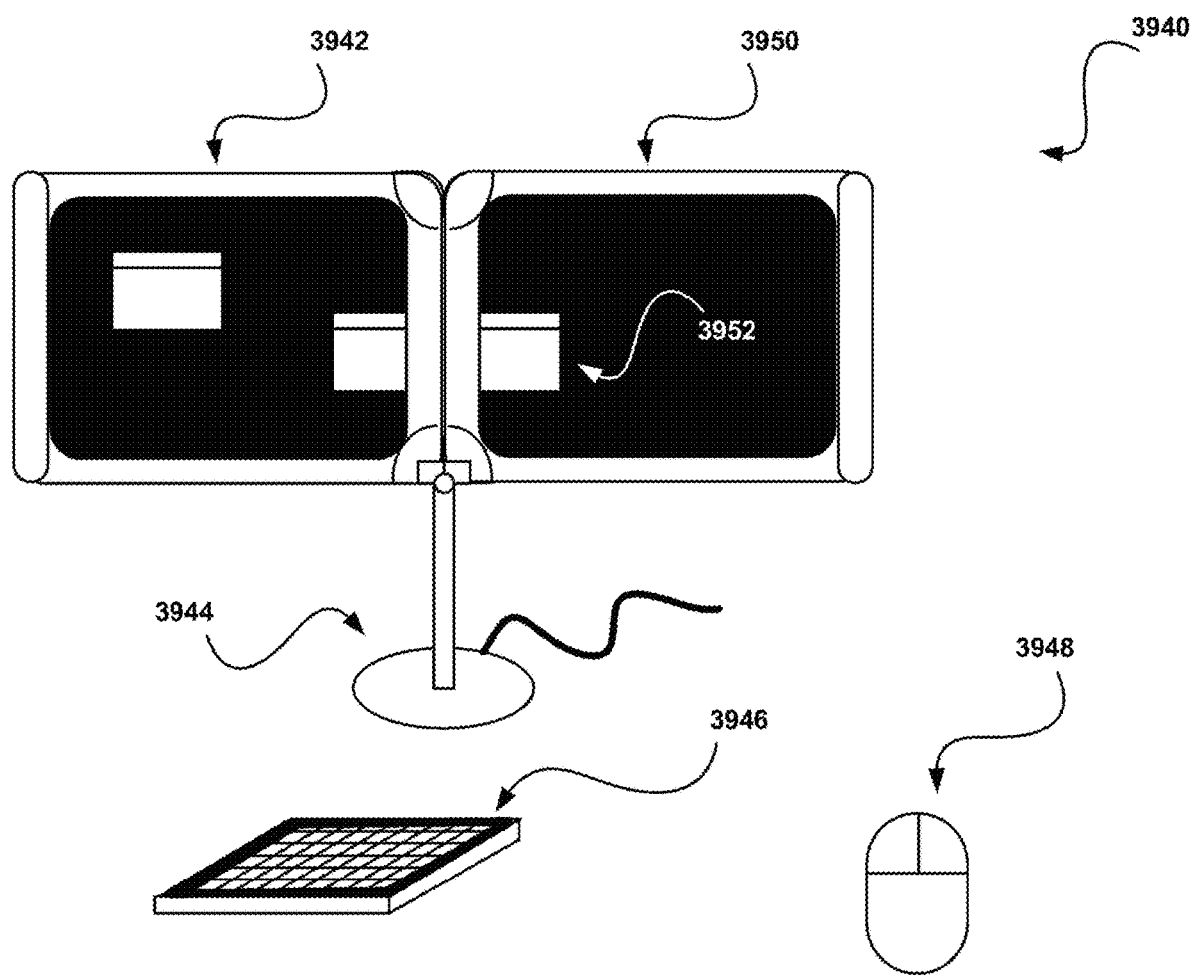
FIG. 39C shows a system for utilizing two tablet computers as a single display, in accordance with one embodiment.

FIG. 39C shows a system 3940 for utilizing two tablet computers as a single display, in accordance with one embodiment. As an option, system 3940 may be implemented in the context of the architecture and environment of the previous Figures or any subsequent Figure(s). Of course, however, the system 3940 may be implemented in any desired environment. The aforementioned definitions may apply during the present description.

In various embodiments, a tablet computer 3942 attached to a dual display mount 3944 may receive input from one or more other devices. For example, in one embodiment, the tablet computer 3942 may receive input through a wireless connection to a keyboard 3946. In another embodiment, the tablet computer 3942 may receive input through a wireless connection with a mouse 3948.

As shown, tablet computers 3942 and 3950 may be utilized together while mounted in dual display mount 3944. For example, in one embodiment, the touchscreen displays of both tablet computer may function as a single display, such that user interface window 3952 may span both displays.

While operating together as a single display, the two tablet computers may also share processing duties. In one embodiment, the processors of both tablet computers may operate together in a parallel fashion. In another embodiment, the tablets may have a master/slave relationship, with the master tablet computer performing all processing, and the slave tablet computer simply responsible to display the content it receives from the master tablet computer. In still another embodiment, the two tablet computers operate as separate computers which share a single set of input devices, such that when the cursor reaches the edge of one tablet display, it appears at the edge of the other tablet display, while still keeping active applications separated. As an option, passing input control from a first tablet computer to a second tablet computer also copies the contents of the clipboard. In this way, a user may copy or cut content from an application running in one tablet computer and pasting it into an application running on the second tablet computer.

In another embodiment, the previously mentioned dual display functionality may be available without use of a dual display mount. In still another embodiment, the previously mentioned shared processing functionality may be available when one or more tablet computer are used in a processor role.

Figure 40:
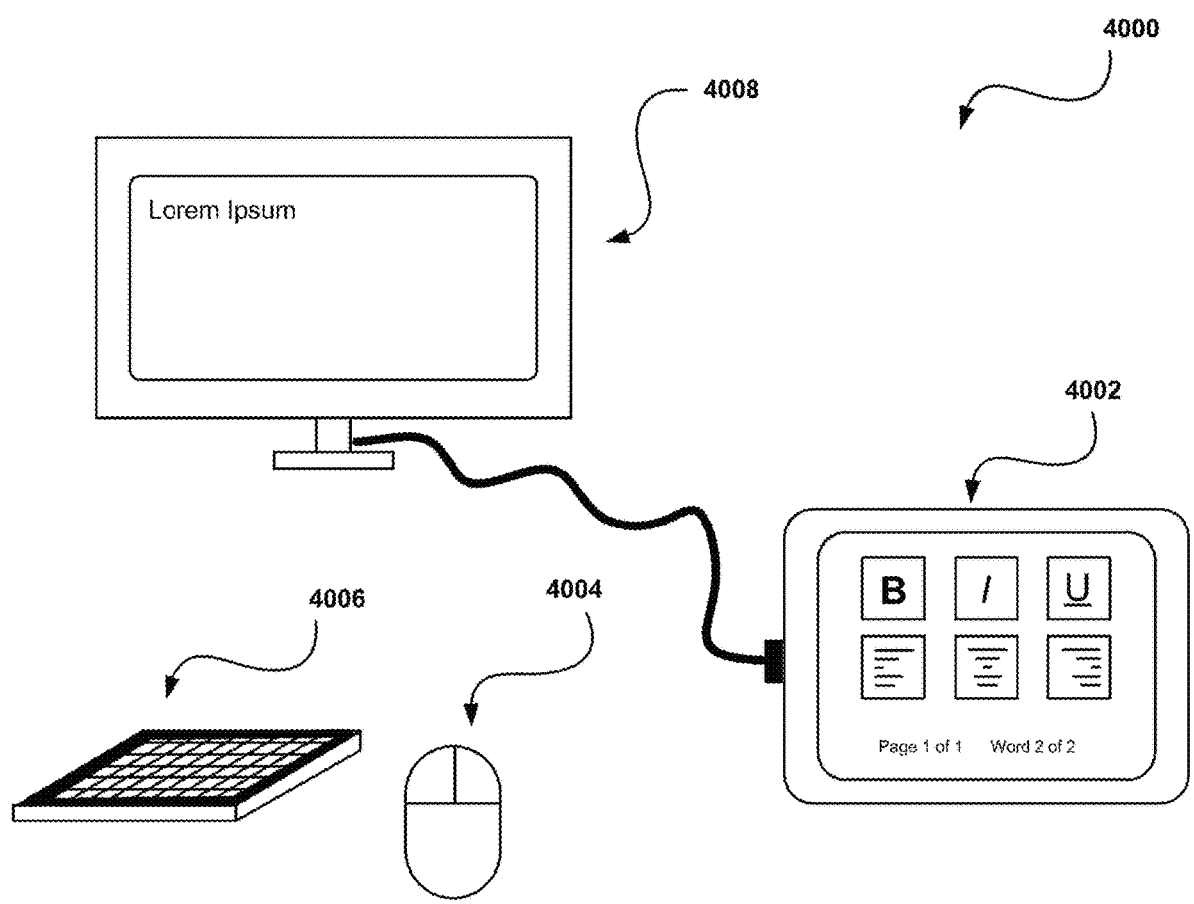
FIG. 40 shows a system for utilizing a tablet computer as a hybrid input device, in accordance with one embodiment.

FIG. 40 shows a system 4000 for utilizing a tablet computer as a hybrid input device, in accordance with one embodiment. As an option, system 4000 may be implemented in the context of the architecture and environment of the previous Figures or any subsequent Figure(s). Of course, however, the system 4000 may be implemented in any desired environment. The aforementioned definitions may apply during the present description.

In various embodiments, a tablet computer 4002 being utilized as a hybrid input device may receive input from, and provide output to, one or more other devices. For example, in one embodiment, the tablet computer 4002 may receive input from a mouse 4004 and a keyboard 4006 using wireless connections. In another embodiment, the tablet computer may provide graphical output to a computer display 4008, through a wired connection.

In various embodiments, a hybrid input device may serve as a dynamic source of input, being configured for specific applications. As a specific example, FIG. 40 illustrates a tablet computer running a word processing application while operating in a desktop computer mode. The tablet computer is being utilized as a hybrid input device. The availability of a hybrid input device has allowed the application to simplify the main user interface displayed on computer display 4008, allowing the user to focus on writing. The toolbars associated with the word processing application, as well as information such as word count and page number, are presented to the user through the tablet computer display.

A hybrid input device may be reconfigured by an active application, according to its needs, and according to one embodiment. For example, a graphics application may use the tablet computer to display tool bars, a color picker, and a means to navigate around an image. In another specific example, a game application may use the tablet computer to display special commands, a map, game statistics, and/or a user manual.

In one embodiment, applications must be preconfigured to take advantage of a hybrid input device. In another embodiment, the hybrid input device may display a generic interface when the active application was not configured to make use of a hybrid input device. In various embodiments, the generic interface may include, but is not limited to, an application launcher, a clock, a calendar, a social network update field, and/or system statistics. The system statistics may include, but are not limited to, operating temperature, available storage capacity, battery status, and/or any other metric associated with the operation of the tablet computer.

Figure 41A:
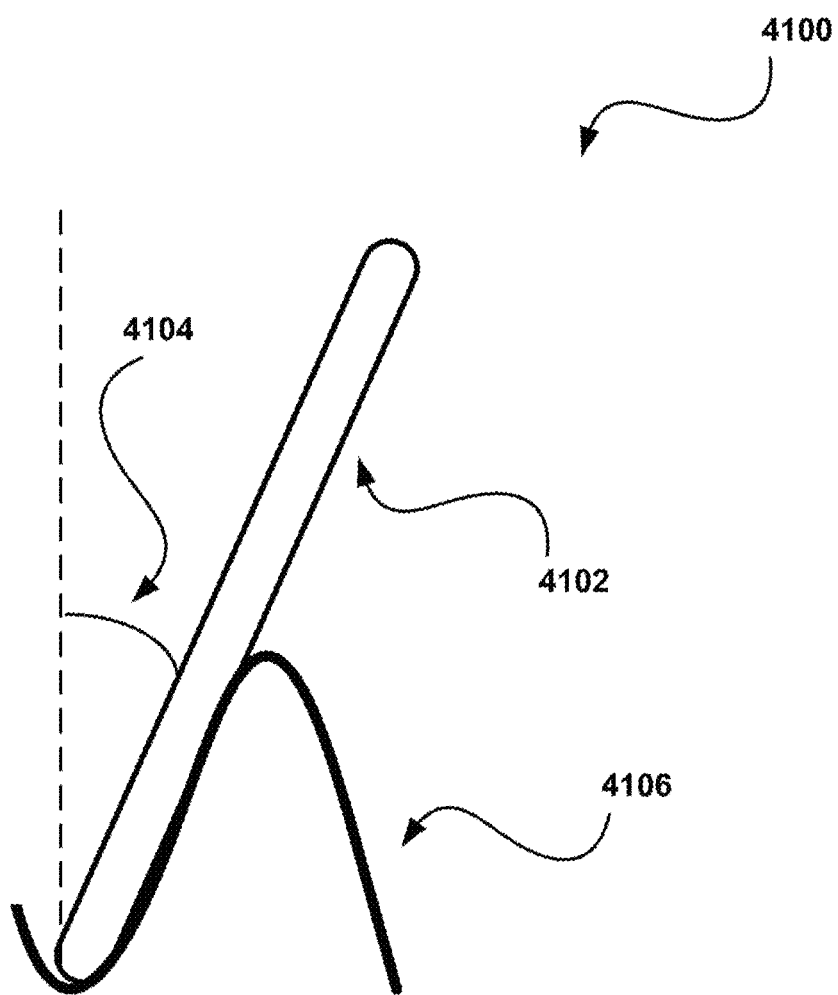
FIG. 41A shows a system for utilizing a tablet computer at a predetermined orientation and in a desktop computer manner, in accordance with one embodiment.

FIG. 41A shows a system 4100 for utilizing a tablet computer at a predetermined orientation, in accordance with one embodiment. As an option, system 4100 may be implemented in the context of the architecture and environment of the previous Figures or any subsequent Figure(s). Of course, however, the system 4100 may be implemented in any desired environment. The aforementioned definitions may apply during the present description.

One of the multiple ways in which a tablet computer may be utilized in a desktop computer manner is to maintain a predetermined orientation for a predetermined amount of time, in accordance with one embodiment. As shown, a tablet computer 4102 may be maintained in a predetermined orientation 4104 when used in conjunction with a mobile tablet stand 4106. In this way, a user may utilize a tablet computer in a desktop computer manner simply by placing it in a tablet stand which is easily portable.

Figure 41B:
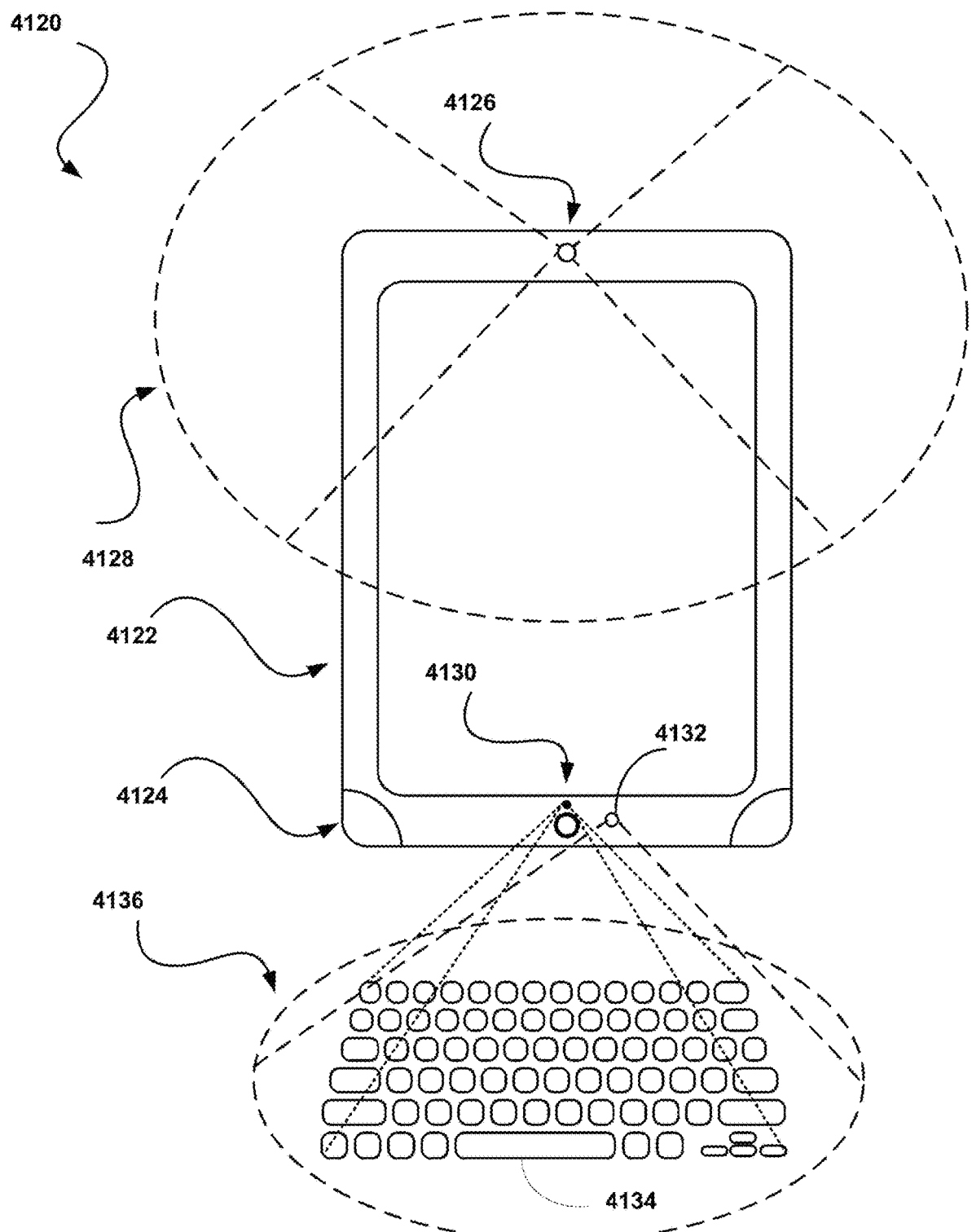
FIG. 41B shows a system for utilizing a tablet computer as a mobile desktop computer, in accordance with one embodiment.

FIG. 41B shows a system 4120 for utilizing a tablet computer as a mobile desktop computer, in accordance with one embodiment. As an option, system 4120 may be implemented in the context of the architecture and environment of the previous Figures or any subsequent Figure(s). Of course, however, the system 4120 may be implemented in any desired environment. The aforementioned definitions may apply during the present description.

As shown, a tablet computer 4122 held at a predetermined orientation by a tablet stand 4124 may receive input from the user which does not require physical contact. For example, in one embodiment, the tablet computer may be receptive to control gestures detected by a first built-in camera 4126 when executed within the volume of space 4128. As an option, a second built-in camera 4132 may be utilized to allow the tablet computer to perform stereoscopic gesture recognition (e.g. able to determine the distance from the tablet computer at which a control gesture is being performed, etc.). In this way, the set of distinct control gestures may be augmented with additional intuitive control gestures. As a specific example, a user may interact with a three dimensional object on the tablet computer display by moving their hands within the volume of space 4128.

In another embodiment, the tablet computer 4122 may be receptive to input from a projected laser keyboard 4134. In one embodiment, the laser projector 4130 may project a virtual keyboard 4134 onto a flat surface in front of the tablet computer. A user may type on the virtual keys as though they were physical buttons. The built-in camera 4132, which may be configured to monitor the volume 4136, may be used to determine the position of the user's hands with respect to the virtual keyboard, and translate the finger positions into keystrokes. In another embodiment, the tablet computer may also be equipped with a laser projector and camera on the long side, to provide the same functionality when the tablet computer is used in a landscape orientation.

Figure 42A:
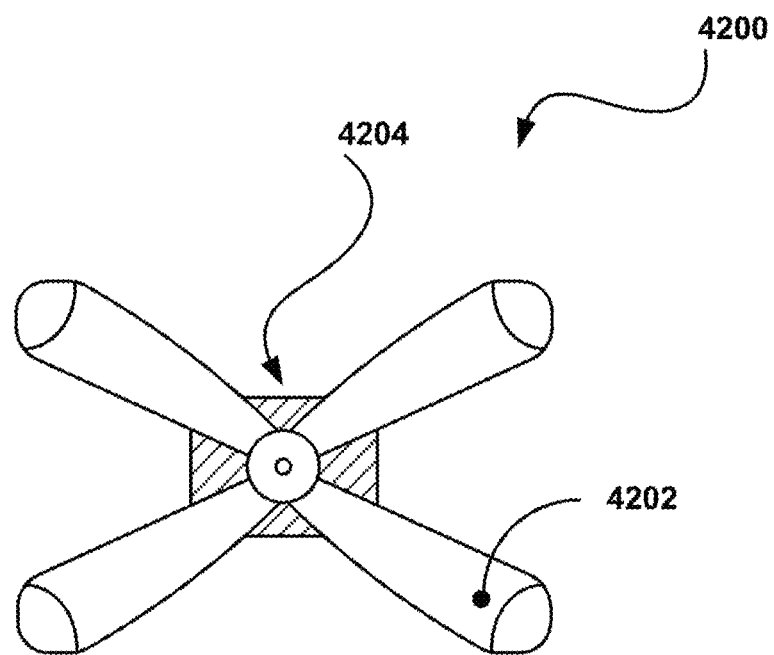
FIG. 42A shows a wall mount apparatus in a landscape orientation, in accordance with one embodiment.

FIG. 42A shows a wall mount apparatus 4200 in a landscape orientation, in accordance with one embodiment. As an option, apparatus 4200 may be implemented in the context of the architecture and environment of the previous Figures or any subsequent Figure(s). Of course, however, the apparatus 4200 may be implemented in any desired environment. The aforementioned definitions may apply during the present description.

As shown, the wall mount 4200 may be identifiable to a tablet computer. For example, in one embodiment, the wall mount 4200 may include one or more magnets 4202 embedded within the body of the mount. The placement of the magnets may indicate to the tablet computer that it is in contact with a wall mount. In another embodiment, the wall mount 4200 may include an RFID tag encoded with at least a unique identifier and a mount type.

As shown, the wall mount 4200 may be utilized to provide a mounted tablet computer with a connection to power and/or data sources. For example, in one embodiment, the wall mount 4200 may include an inductive charging plate 4204 for charging a tablet computer. In another embodiment, the wall mount 4200 may include a tablet computer docking connector to provide power and/or data to a mounted tablet computer.

Figure 42B:
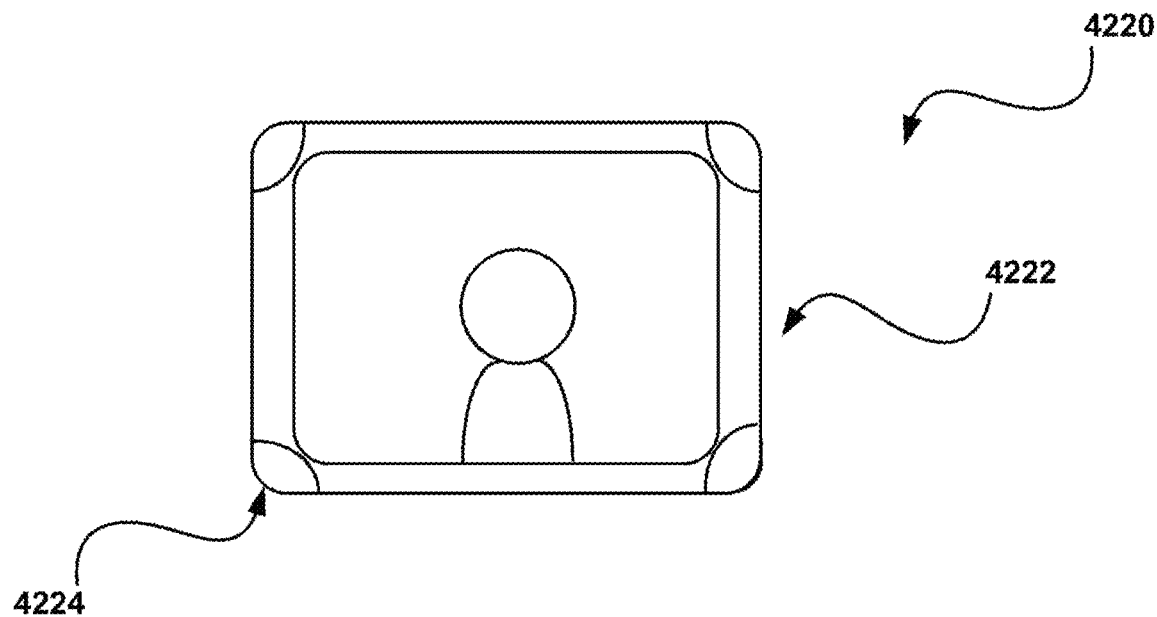
FIG. 42B shows a system for utilizing a tablet computer as a picture frame, in accordance with one embodiment.

FIG. 42B shows a system 4220 for utilizing a tablet computer as a picture frame, in accordance with one embodiment. As an option, system 4220 may be implemented in the context of the architecture and environment of the previous Figures or any subsequent Figure(s). Of course, however, the system 4220 may be implemented in any desired environment. The aforementioned definitions may apply during the present description.

A powered wall mount may provide a useful storage location for a tablet computer when not in use. As shown, a tablet computer 4222 may be mounted in a wall mount 4224. In one embodiment, the tablet computer may be utilized as a digital picture frame while mounted in the wall mount. In another embodiment, the tablet computer may be configured such that, upon placement in a wall mount, a slideshow begins automatically. In yet another embodiment, the user may configure what information is displayed once a tablet computer has been mounted in a wall mount. As an option, the tablet computer may be configured to retrieve photographs from a remote server or cloud storage service or device.

While functioning as a picture frame, a tablet computer 4222 may also be utilized as a server, providing access to files and resources localized on the tablet computer. In one embodiment, the tablet may be able to receive input from the user which does not require physical contact. For example, in one embodiment, the tablet computer may be receptive to control gestures and/or voice commands.

Figure 43:
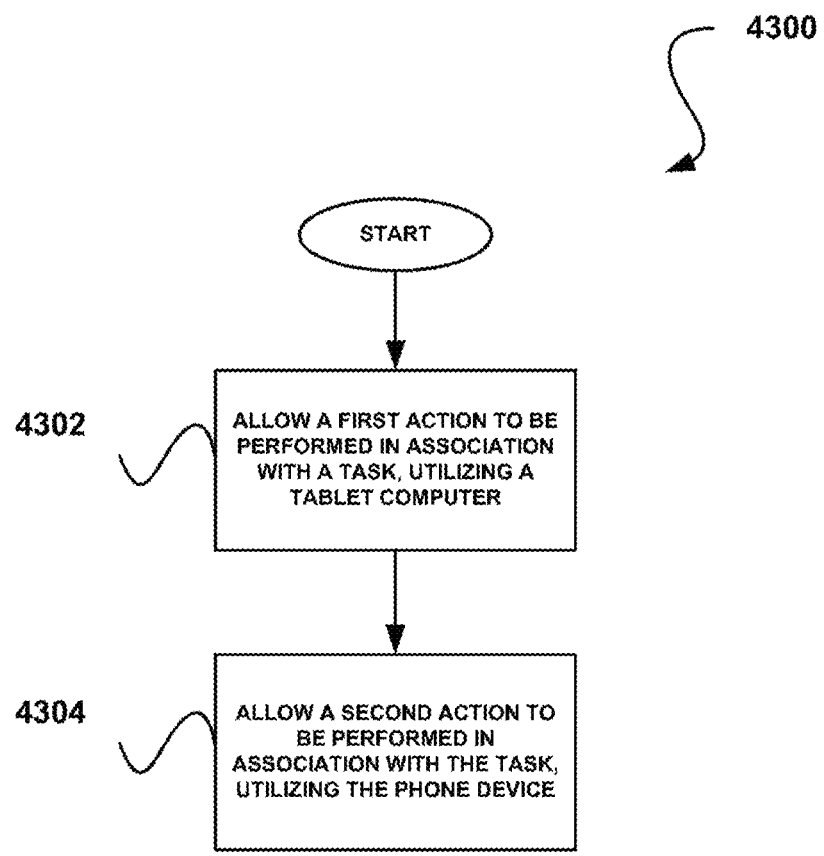
FIG. 43 shows a method for integrating a tablet computer and a phone device, in accordance with one possible embodiment.

FIG. 43 shows a method 4300 for integrating a tablet computer and a phone device, in accordance with one possible embodiment. As an option, the method 4300 may be implemented in the context of the architecture and environment of any subsequent Figure(s). Of course, however, the method 4300 may be carried out in any desired environment.

As shown, a first action to be performed in association with a task utilizing a tablet computer is allowed. See operation 4302. In the context of the present description, an action refers to any step or procedure that is performed. For example, in various embodiments, actions may include, but are not limited to, activating a camera, taking a picture, opening a document, controlling a peripheral device, writing comments, or any other action which is performed and/or is invoked by the user or a device. In some embodiments, these actions may be manually invoked by a user. In other embodiments, these actions may be invoked automatically by a device.

In the context of the present description, a task may refer to one or more functions. For example, a task may include executing a program, making a call, creating a document, using an application, taking a picture, or any other function or group of functions. Additionally, in the context of the present description, a tablet computer refers to any portable computer shaped and/or sized like a tablet. For example, in one embodiment, the tablet computer may include a personal digital assistant (PDA), a laptop personal computer with a rotatable touchscreen, a tablet (e.g. Apple i-pad, Microsoft Slate, etc.), and/or any other portable computer shaped and/or sized like a tablet. In another embodiment, the tablet computer may include a cellular phone, or any other mobile device. In one embodiment, the tablet computer may include a touch screen.

As shown, a second action to be performed in association with the task utilizing a phone device is allowed. See operation 4304. In the context of the present description, a phone device refers to any apparatus that is portable and provides telephonic functions. For example, in various embodiments, a phone device may include a cellular phone, smart phones, an IPHONE, a BLACKBERRY, a PDA, a hand held computer, a tablet computer, or any apparatus that is portable and may provide telephonic functions. In addition, in some embodiments, a phone device may include any device capable of receiving broadband access through a UTMS, CDMA, GSM EDGE, WIMAX, LTE, or LTE Advanced system, or any other mobile telecommunication broadband system.

In one embodiment, the phone device may include a device with cellular phone capabilities. In another embodiment, the phone device may include a short-range wireless communication protocol headset. In the context of the present description, short-range wireless communication protocol headset may refer to any wireless protocol that functions at a short-range. For example, in one embodiment, the short-range wireless communication protocol may include Wireless USB, Bluetooth, Wi-Fi, or any other wireless protocol which may function at a short-range.

In one embodiment, the short-range wireless communication protocol headset may be capable of being used to receive voice commands in association with the tablet computer. In another embodiment, the short-range wireless communication protocol headset may be capable of being used to receive voice dictation in association with the tablet computer. In a further embodiment, the task may include data communication over a network, and the first action and the second action may involve a collaboration of network or processing resources of the phone device and the tablet computer.

In one embodiment, it may be determined whether the task is being resumed utilizing the phone device, such that the second action is allowed to be performed in association with the task, if it is determined that the task is being resumed utilizing the phone device. For example, in one embodiment, a document may be created on a tablet device, and when subsequently opened on the phone device, a prompt may be given to the user asking if the document was to be resumed. Of course, any program or function may be started on a tablet device and subsequently resumed on a phone device. Additionally, any function may be used to determine if a task if being resumed utilizing the phone device. For example, a prompt requesting user feedback may be given, a device id may be verified, a screen resolution may be used to determine the type of device being used, or any other software or hardware mechanisms may be used to determine if the task is being resumed utilizing the phone device.

In another embodiment, the task may include presenting a presentation utilizing the phone device that includes a projector, and the first action includes receiving a projector control command and the second action includes displaying output utilizing the projector based on the projector control command. In the context of the present description, a projector control command may refer to any directive that controls a projector. For example, in various embodiments, a projector control command may include activating, shutting down, sleeping, focusing, zooming, and/or any other directive that controls a projector.

In one embodiment, the task may include collaboratively utilizing the tablet computer and the phone device as a desktop computer, and the first action may include receiving a gesture command utilizing the phone device and the second action may include displaying an output utilizing the tablet computer based on the gesture command. In the context of the present description, a gesture command may refer to any command associated with a gesture. For example, in one embodiment, a user may draw a circle or an arrow on a screen which may allow for functions such as zooming, bringing up a preset location or application. Of course, any gesture may be used to invoke any function. In one embodiment, a gesture command may be preconfigured to invoke a function. In another embodiment, a gesture command may be configured at run-time. For example, after completing a gesture, a list of possible commands may be displayed to the user which may be selected.

In another embodiment, the task may include receiving input utilizing the phone device, processing the input utilizing the tablet computer, and displaying output based on the processing utilizing the tablet computer, and the first action may include receiving a gesture command utilizing the phone device and the second action may include displaying output utilizing the tablet computer based on the gesture command.

In some embodiments, the task may include utilizing an application accessible utilizing the tablet computer and the phone device, and the first action includes initiating the task with the application utilizing the tablet computer and the second action includes continuing with the already-initiated task with the application utilizing the phone device. In the context of the present description, an already-initiated task refers to a task which had been previously begun. In one embodiment, the already-initiated task may be accessed by executing the application utilizing the phone device and subsequently selecting the task with the executed application.

In another embodiment, upon selection of the task, a state of the application in connection with the tablet computer, may be utilized to continue with the already-initiated task with the application utilizing the phone device. In the context of the present description, a state of the application refers to data relating to an application which is retrieved.

In some embodiments, the task may include a video conference, and the first action may include initiating the task with the phone device and the second action may include providing video communication in association with the video conference utilizing a camera and a display of the tablet computer. For example, in one embodiment, the phone device may be capable of being used to generate a secondary video feed in association with the video conference. In another embodiment, the phone device may be capable of being used to generate a still picture that is capable of being shared in association with the video conference. In still another embodiment, the phone device may be capable of being used to generate an audio feed in association with the video conference.

Of course, the various embodiments set forth herein may be implemented utilizing hardware, software, or any desired combination thereof. For that matter, any type of logic may be utilized which is capable of implementing the various functionality set forth herein.

More illustrative information will now be set forth regarding various optional architectures and features with which the foregoing techniques discussed in the context of any of the present or previous figure(s) may or may not be implemented, per the desires of the user. For instance, various optional examples and/or options associated with allowing a first action to be performed in association with a task utilizing a tablet computer 4302, allowing a second action to be performed in association with the task, utilizing a phone device 4304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

As an option, the aforementioned mobile device may be capable of operating in a location-specific mode. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

Figure 44:
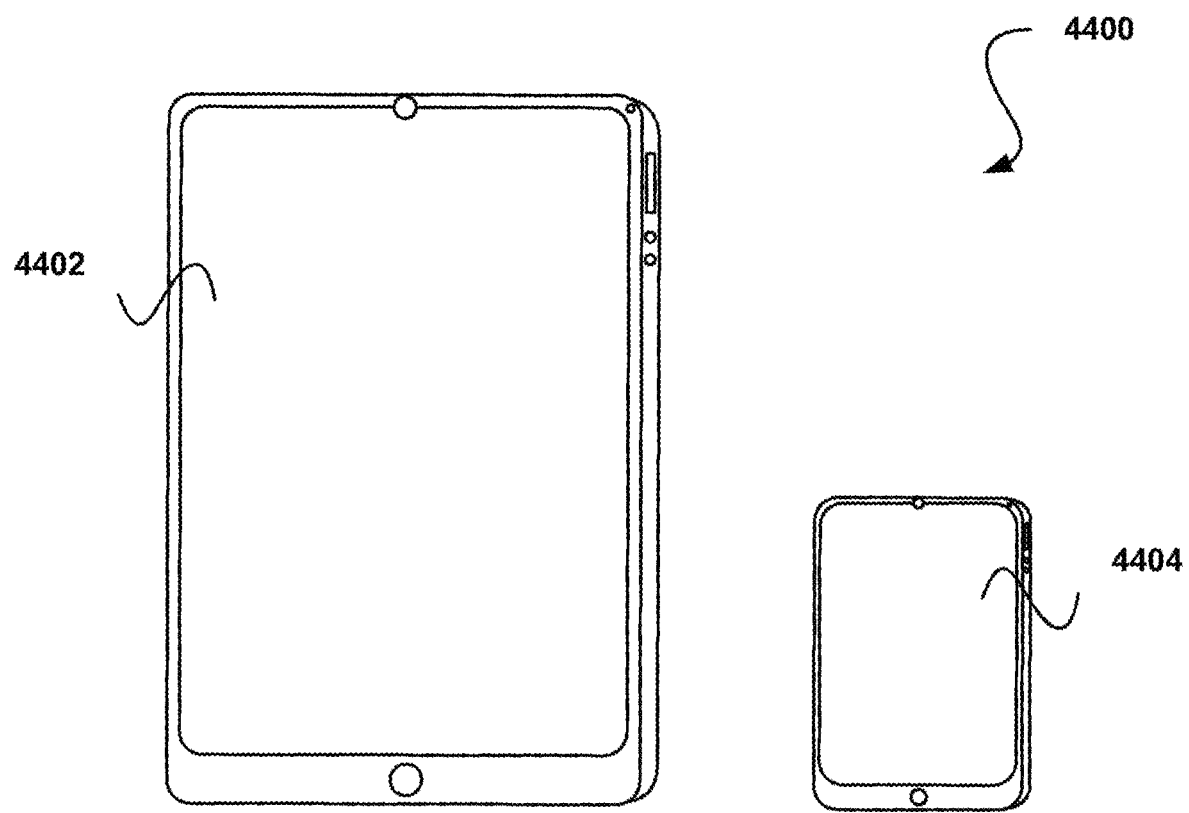
FIG. 44 shows a system for integrating a tablet computer and a phone device, in accordance with one possible embodiment.

FIG. 44 illustrates a system 4400 for integrating a tablet computer and a phone device, in accordance with one possible embodiment. As an option, the system 4400 may be implemented in the context of the architecture and environment of the previous Figures or any subsequent Figure(s). Of course, however, the system 4400 may be carried out in any desired environment. It should also be noted that the aforementioned definitions may apply during the present description.

As shown, a tablet computer 4402 may be included. Additionally, a phone device 4404 may be included.

In one embodiment, the tablet computer and the phone device may communicate by various techniques. For example, in one embodiment, the tablet computer and the phone device may communicate wirelessly, using such protocols as, for example, Wireless USB, Bluetooth, Wi-Fi, near-field, or any other wireless protocol. Additionally, in one embodiment, the tablet computer and the phone device may communicate by an external connector. For example, the tablet computer and the phone device may communicate by a serial, parallel, USB, or any other port which may be used to transfer data and/or used for communication between two devices. Additionally, in a further embodiment, any type of interface card may be used for communication between the tablet computer and the phone device.

In another embodiment, the tablet computer and the phone device may communicate automatically or manually. For example, in one embodiment, a device may include a communication switch or physical button by which communication is established with another device. Additionally, an application may be used to establish communication between the two devices. Of course, any manual technique may be used to establish communication between the two devices.

In another embodiment, a tablet computer may establish communication with a phone device automatically. For example, after the two devices are connected, communication may automatically be exchanged. In one embodiment, such exchange may be based on preconfigured settings.

In one embodiment, the tablet computer and the phone device may establish connection wirelessly. For example, the tablet computer and the phone device may connect by a listen process. In one embodiment, after a device is connected to a wireless communication system, the device may enter a listen state wherein the device listens in the common frequency sequence, which periodically changes frequency. When in listen state, if a request to send a signal is received from another device, the device may enter a receive state. Included in receive state may be a state for sending a clear to send signal. After the clear to send signal is sent, the device may default to a state for receiving data in the designated channel. If no data is received, the device may revert to the listen state. If data is received, then the device may enter a state for sending an acknowledgement ACK. The device may then default back to the listen state.

While in the transmit state, the device may enter a carrier sense state. In the context of the present description, a carrier sense state may refer to sensing whether the carrier (i.e. the current frequency in the common frequency sequence) is busy or free. If the carrier is busy, the device may enter a back off state. In the context of the present description, a back off state may refer to a temporary state based off of a timer. In one embodiment, a device may revert to the listen state until the back off timer expires or a request to send (RTS) event occurs. If, instead, the carrier is free, the device may enter a send state for sending a RTS signal to another peer device. The device may listen for a clear to sent signal. If a clear to sent signal is received, then the device may enter another send state for sending data. After data is sent, the device may listen for an acknowledgement (ACK) that the data was received. If no clear to sent signal is received, the device may enter the back off state, may set the back off timer, and may revert to the listen state. After data is sent, if an ACK signal is received, the device may erase the transmission buffer, and may default back to the listen state. If no ACK signal is received, the transmission buffer may not be cleared, and the device may revert to the listen state and may increment a retry limiter counter associated with that transmit buffer. If the limited retries are exceeded, the buffer may be cleared and an internal error may be noted. Of course, any method may be employed by which the computer tablet and the phone device may communication.

In another embodiment, the tablet computer and the phone device may establish a wired connection. For example, the tablet computer and the phone device may be connected by an Ethernet cord, a port connecting the two devices, an USB cable, or any other physical technique which may be used to connect the tablet computer and the phone device.

In another embodiment, the tablet computer and the phone device communicate via a peer-to-peer protocol. In the context of the present description, a peer-to-peer protocol may refer to a distributed application architecture that partitions tasks or workloads between peers. For example, wireless devices within range of each other may discover and may communicate directly without involving central access points. In another embodiment, a bridge may function as a connection point for a peer-to-peer protocol. Of course, any other technique may also be used to discover and foster communication between two devices.

In one embodiment the peer-to-peer protocol system may be configured to provide visibility to only users on one or more identified networks thereby precluding access to users residing outside the identified LANs. Additionally, such access restrictions may be enforced by firewalls or via the private network configuration, for example. Additionally, any other security mechanism may be used to protect and secure the network by which the tablet computer and the phone device communicate.

In a further embodiment, a relative position may be determined of the tablet computer and the phone device, and at least one of the tablet computer and the phone device may be operated in a predetermined mode based on the determined relative position. Additionally, computer code may be included for determining a relative position of the tablet computer and the phone device, and operating at least one of the tablet computer and the phone device in a predetermined mode based on the determined relative position. For example, in one embodiment, when a phone device is brought within a set distance of a tablet computer, the phone device may automatically operate as a projector. In another embodiment, when a phone device is brought within a set distance of a tablet computer, the phone device may automatically operate as a keyboard to the tablet computer. Of course, in one embodiment, the tablet computer and the phone device may each be preconfigured to operate in any mode based on the relative position.

Figure 45:
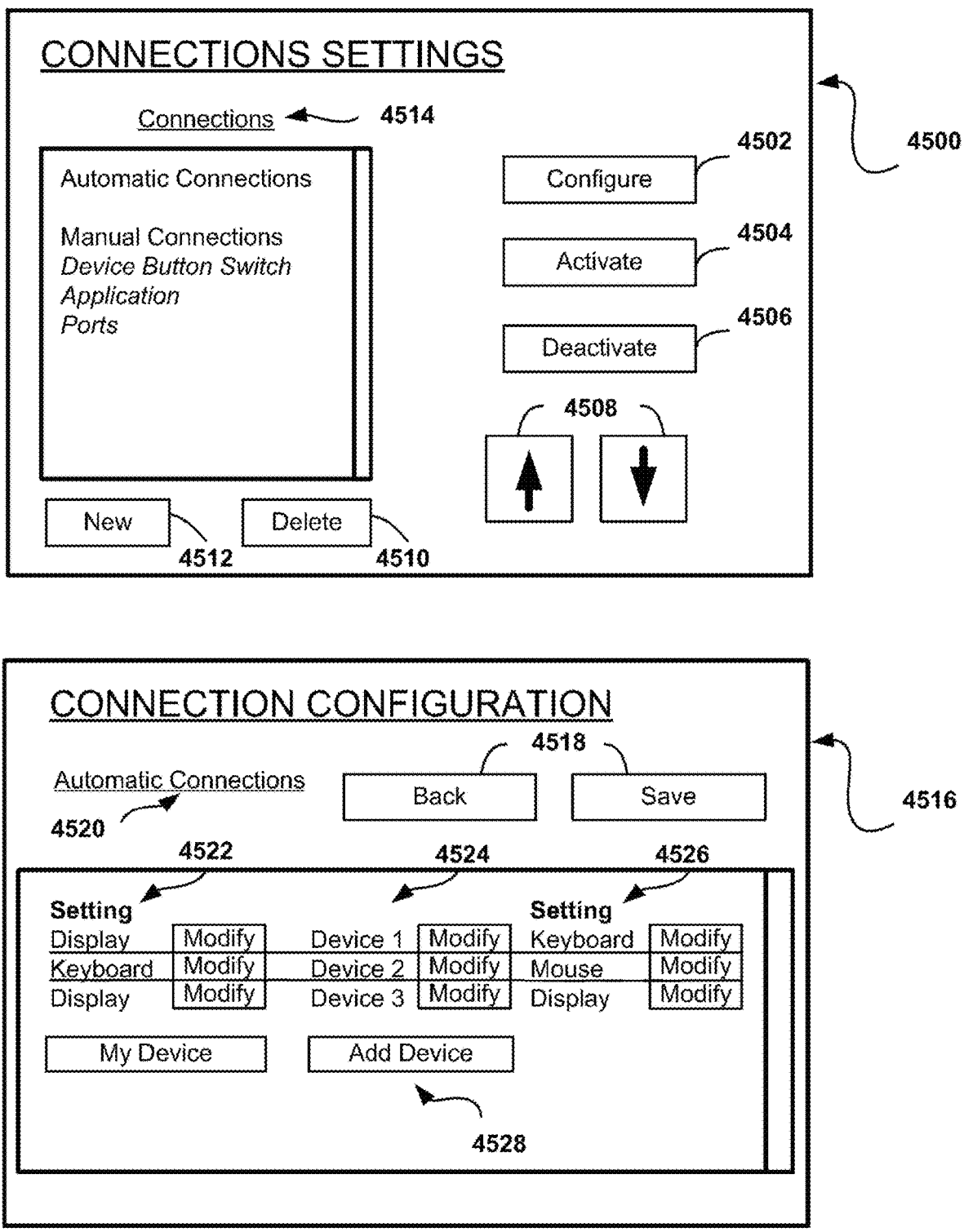
FIG. 45 shows a user interface for configuring connection settings, in accordance with one possible embodiment.

FIG. 45 shows a user interface for configuring connection settings, in accordance with one possible embodiment. As an option, the user interface 4500 may be implemented in the context of the architecture and environment of the previous Figures or any subsequent Figure(s). Of course, however, the user interface 4500 may be carried out in any desired environment. It should also be noted that the aforementioned definitions may apply during the present description.

As shown, a first user interface 4500 may be used to select a connection type 4514, to configure the selection 4502, to activate the selection 4504, to deactivate the selection 4506, to delete a selection 4510, and/or to create a connection 4512.

In one embodiment, the connection interface may automatically list all available connections (e.g. network based, application based, ports, cables, etc.). Further, applications on the device may be used to scour networks, listen for devices, and collect and list any potential connections. In another embodiment, the list of connections may be manually populated by adding each new connection (e.g. setup for every connection type, etc.).

As shown, selection arrows 4508 may be used to select the appropriate connection. Of course, any method may be used to select the connection. In one embodiment, the user may select the connection by touch (e.g. touch the connection text to select, etc.). In another embodiment, the user may use a stylus, pen, or a potentially conductive material to select the connection.

In one embodiment, the user may activate and/or deactivate a connection automatically. For example, in one embodiment, when a second device is brought within a preconfigured geographic proximity of a first device, the first device may automatically establish a connection with the second device (or the second device may automatically establish a connection with the first device). Additionally, if a first device is attached to a second device (e.g. by a hinge, slot, or some other attachment, etc.), communication may automatically be established between the two devices. In another embodiment, any attachment connected between two devices (e.g. cord, etc.) may automatically trigger a connection between the devices. Further, in some embodiments, a connection may be automatically disconnected by removing a cord, moving a second device away to a preconfigured geographic proximity of a first device, removing a second device from an attachment on a first device, and/or any other method may be used to automatically disconnect a connection between two devices. In other embodiments, an activation (e.g. execution, power-up, etc.) of the second device may prompt the aforementioned connectivity with the first device. In still additional embodiments, detection of an event via the second device may prompt the aforementioned connectivity.

In other embodiments, the user may activate and deactivate a connection manually. For example, in one embodiment, a user may first connect a cord between two devices, and thereafter establish a connection. In some embodiments, the connection may be activated through an application (e.g. an application to share information, a collaboration application, etc.). In other embodiments, the connection may be activated through a connection settings interface (e.g. select an available connection and activate, etc.). Of course, any method may be used to manually establish a connection between two devices. Additionally, although the above examples have illustrated activating and/or deactivating a connection between a first device and a second device (automatic and manual), any number of devices and connections may, in like manner, be activated and/or deactivated.

Further, in one embodiment, the user may wish to activate and deactivate a connection manually to preserve privacy and security. For example, in some embodiments, a phone device may be used in a financial institution where a manual connection between a phone device, operated by the user, and a tablet computer, operated by the financial institution, may be used to transfer, deposit, or otherwise manipulate a user's funds. Additionally, such a connection may provide greater interaction between the financial institution and a user (e.g. send live quotes, project financial analysis, etc.). In another embodiment, a parent may wish to activate and deactivate a connection manually to limit a child's access to the Internet. For example, in some embodiments, a phone device, operated by a child, may be used to access the Internet by manually connecting to a tablet computer, operated by a parent. Such a connection may permit a parent to monitor, actively control, and potentially even limit, a child's access to the Internet. Of course, a connection between a tablet computer and a phone device may be used in any manner and with respect to any application.

As shown, after selecting to configure a connection, a user interface 4516 may be used to modify connection settings. While user interface 4516 is shown in a single interface, in other embodiments, each of such connection settings may be separately established, maintained, managed, etc. by separate applications that require or benefit from such device connections.

In one embodiment, the user interface may be used to configure connection settings for automatic connections (e.g. 4520, etc.). In other embodiments, the user interface may be used to configure connection settings for manual connections, application connections, and/or any other type of connection.

As shown, settings associated with a user's device 4522, settings associated with another device 4526, and a list of other devices with which a connection has been or may be established 4528, may be included on the user interface.

In one embodiment, the connection configuration list connection settings row by row. For example, on one row, the user's device setting may be displayed and modified, the associated device may be displayed and modified, and the associated device's setting may be displayed and modified. The next row may include settings relative to the user's device and another device. In various embodiments, the user's device and another device may be set to act as a display, a keyboard, a mouse, a video conference interface, a calculator, a scanner, a painting device, a speaker system, and/or any other type of function that may be preconfigured on either device. As such, in some embodiments, connections between devices may be modified, configured, and saved.

As shown, "add device" 4528 may be included on the user interface. In one embodiment, upon selection of "add device," the device may initiate a setup wizard to locate or specify a device location (e.g. utilizing an IP address, Bluetooth connection, etc.) as well as corresponding settings for both the user device and the added device. Of course, an advanced setup interface (e.g. input directly by the user, etc.) may also be used to add additional devices, or any other method may be employed to input new devices and associated settings.

As shown, the user interface may include navigation buttons 4518. In one embodiment, the navigation buttons may include "back" for going to the prior page (e.g. connection settings page, etc.) and/or "save" to implement any changes that may have occurred on the connection configuration user interface page. Of course, any type of button may be included to facilitate navigation of the user interface and may be preconfigured for a specific function. In another embodiment, the user interface may automatically save any changes and/or modifications set by the user, as well as may rely on hardware designs (e.g. a set "back" button, etc.) to facilitate navigation.

In various embodiments, the settings entered utilizing the user interface of FIG. 45 may be automatically synchronized with other devices that are pre-configured to collaborate with the user device. For example, if a newly added first row of settings involves the user device and a first other device that is pre-configured to operate with the user device, such newly added first row of settings would be synchronized with the first other device, such that a similar interface associated with the first other device would show such configuration, etc. Similarly, if a newly added second row of settings involves the user device and a second other device that is pre-configured to operate with the user device, such newly added second row of settings would be synchronized with the second other device, such that a similar interface associated with the second other device would show such configuration, etc. Conversely, if a newly added row of settings using a similar interface on a third device (and such settings involve the user device, and the third other device is pre-configured to operate with the user device), such newly added row of settings would be synchronized with the user device, such that the corresponding interface associated with the user device would show such configuration, etc. To this end, a user of multiple devices may configure each of them using any one or more of such devices and such settings propagate accordingly.

Further, in various embodiments, the user may create multiple modes/roles for each of a plurality of devices (each represented by one of the aforementioned row of settings). To this end, a user's phone or tablet device may serve as a gesture mouse or keyboard in connection with a work computer/tablet in a first mode/role; may serve as a projector in connection with and under the control of a different tablet in a second mode/role; may serve as a remote control for a user's television in a third mode/role; may serve as a control interface for a user's vehicle in a fourth mode/role; may serve as a control interface for an array of home appliances in a fifth mode/role; etc.

Figure 46:
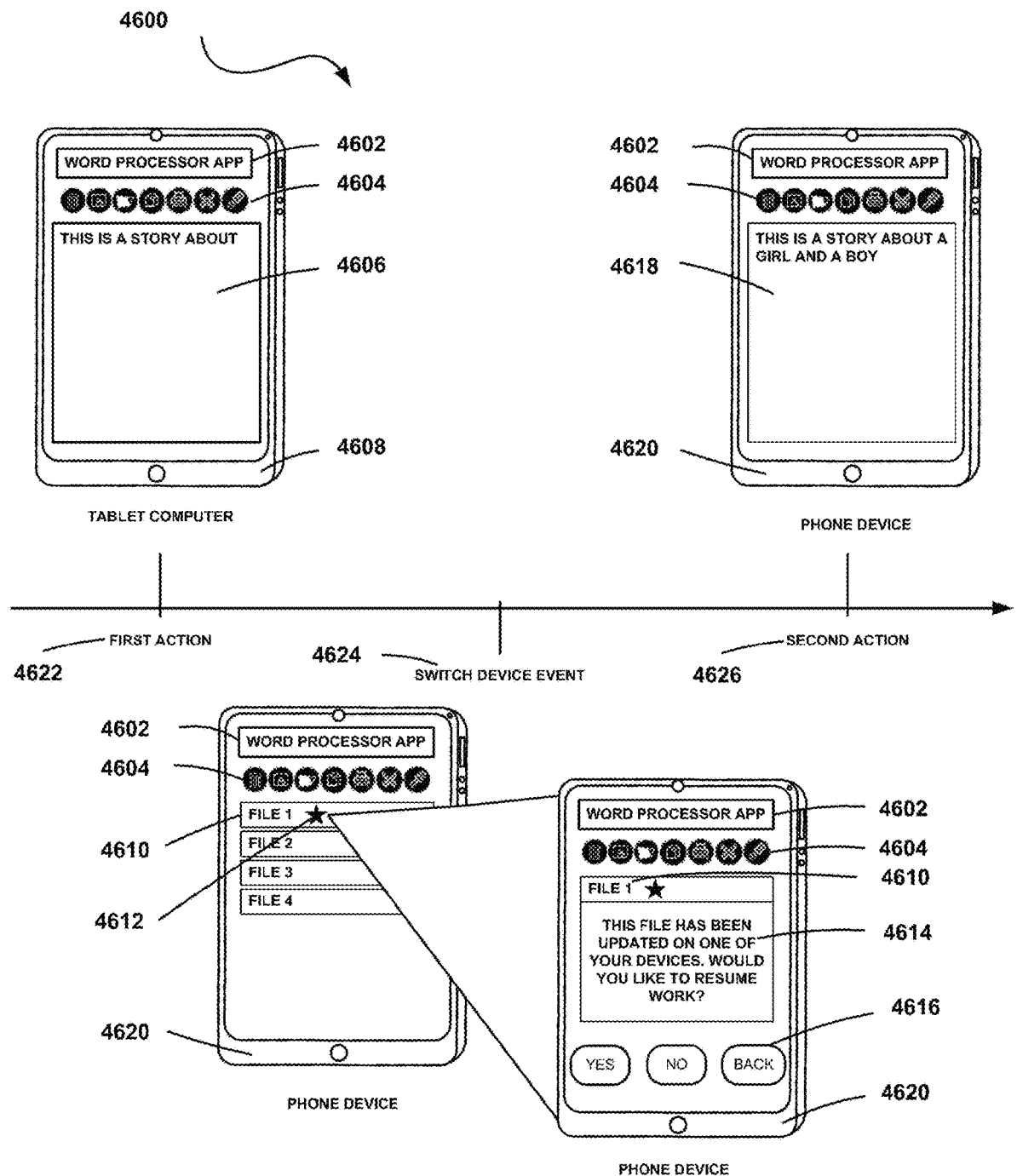
FIG. 46 shows a timeline for integrating a tablet computer and a phone device, in accordance with one possible embodiment.

FIG. 46 shows a timeline 4600 for integrating a tablet computer and a phone device, in accordance with one possible embodiment. As an option, the timeline 4600 may be implemented in the context of the architecture and environment of the previous Figures or any subsequent Figure(s). Of course, however, the timeline 4600 may be carried out in any desired environment. It should also be noted that the aforementioned definitions may apply during the present description.

As shown, a tablet computer 4608 may be included. Additionally, a phone device 4620 may be included.

As shown, an application 4602 may be included. In one embodiment, the application may include a word processing application, a camera, a sharing platform, a game, and/or any application which may include saving data. In another embodiment, the application may allow for joint collaboration between more than one user and more than one device. For example, multiple users may work together on a single document, with the collaborative document shown on each of the user's devices. In the present exemplary embodiment, the application 4602 is shown to include the word processing application.

As shown, a control panel 4604 may be included. In one embodiment, the panel may include a button for discarding, saving, opening, copying, printing, cutting, settings, and/or any other button which may be used to control some function of the application. Of course, any button may be configured to any function. In another embodiment, the control panel may include functions for controlling some aspect of another device. For example, the panel may include a button for zooming the camera lens, taking a photo, displaying an image, rearranging the display on another device, disabling the device, and/or any other function which may be used to control some aspect of another device.

As shown, an original document 4606 contains inputted text. In one embodiment, the text may be inputted by a variety of sources. For example, in one embodiment, a phone device or another tablet may function as a keyboard for inputting the text. In another embodiment, a physical, digital, or projected keyboard may function for inputting the text. In a further embodiment, a microphone (i.e. speech-to-text) may be used to input text. Of course, any other device and/or technique may be used to input text.

As shown, a first action 4622 may be allowed. In various embodiments, a first action may include activating a camera, taking a picture, editing a document, controlling a peripheral device, writing comments, or any other procedure which is performed having been invoked by the user. In some embodiments, these actions may be manually invoked by a user. In other embodiments, these actions may be invoked automatically by a device. In another embodiment, the first action may include saving data. For example, after saving the data, the application may be later reopened on another device and resumed from the saved state.

As shown a switch device event 4624 may be detected. In the context of the present description, a switch device event may include any event where a saved state may be resumed on another device. For example, in one embodiment, a document may have been created, edited, and saved. Such a document may then be subsequently opened on another device and resumed from the point at which the document had been closed on the first device. In another embodiment, the saving of the state of the application may be automatic or manual. Of course, any state may be saved and resumed on another device.

As shown, a phone device 4620 may be included. Of course, any apparatus that is portable and provides telephonic functions may be used as a phone device. For example, in various embodiments, a phone device may include a cellular phone, smart phones, an IPHONE, a BLACKBERRY, a PDA, a hand held computer, a tablet computer, or any apparatus that is portable and may provide telephonic functions.

As shown, a collection of saved files 4610 may be displayed to a user utilizing the phone device 4620. In one embodiment, the saved files on the application may be displayed in a list. Of course, the view may be modified and preconfigured in any manner. In another embodiment, the view of the saved files may be displayed based on the device that accesses the files. For example, in one embodiment, a device with a smaller screen may display only the first few words of text of the file, whereas with a device with a larger screen, the entire name of the file may be displayed. Additionally, in another embodiment, the saved files may be arranged to facilitate easy selection. For example, a file name may be displayed as a link, or the file name may be enclosed within any type of surrounding to facilitate selection.

As shown, a marking 4612 may be displayed as well. In one embodiment, the marking may be used to designate if a file has been updated since the last time the application was opened. Of course, the marking may include a star, a tab, or any other marking. In another embodiment, no marking may be used. Instead, in one embodiment, the text may be bolded to show that a file has been updated. In another embodiment, a photo file may be displayed in a yellow frame to show that it has been updated. Of course, any manner may be used to signify that a file or application data has been updated (and potentially by which of a plurality of devices).

As shown, a prompt 4614 may be included. In one embodiment, after selecting a "file 1," a prompt may state, "This file has been updated on one of your devices. Would you like to resume work?" Of course, any prompt may be given to a user requesting if it is desired to resume work on saved data. For instance, the last one or more devices that were used to update the corresponding file or application data may be identified. In another embodiment, a prompt may not be given. For example, a user may preconfigure settings so that work may be resumed without being prompted.

As shown, an application may receive user feedback 4616. For example, a user may indicate whether it is desired to resume work by selecting an appropriate button in the form of "yes," "no," or "cancel." Of course, the application may be programmed to receive the feedback in any manner. For example, a sensor may be used to scan a user's fingerprint and implement preconfigured settings, including automatically selecting a pre-selected button. In another embodiment, the application may further request a form of security clearance before resuming work. For example, a user may need to enter a password, scan a finger, take a photo image, and/or use any other technique to verify a user's identity.

As shown, a second action 4626 may be allowed. In various embodiments, a second action may include further using a camera, altering a picture, editing a document, further controlling a peripheral device, writing additional comments, or any other procedure which is performed using any type of saved data and/or application state. Of course, any additional second action may be performed.

As shown, resumed work 4618 may be included. For example, a document may receive further text input in addition to that which was saved prior to the switch device event. In one embodiment, any alteration may be made to the saved data. For example, a photo may be cropped and adjusted (i.e. contrast, brightness, etc.), a game may be further played, a to-do list may be updated, and/or any file and/or application may be accessed, adjusted, and/or updated.

Figure 47:
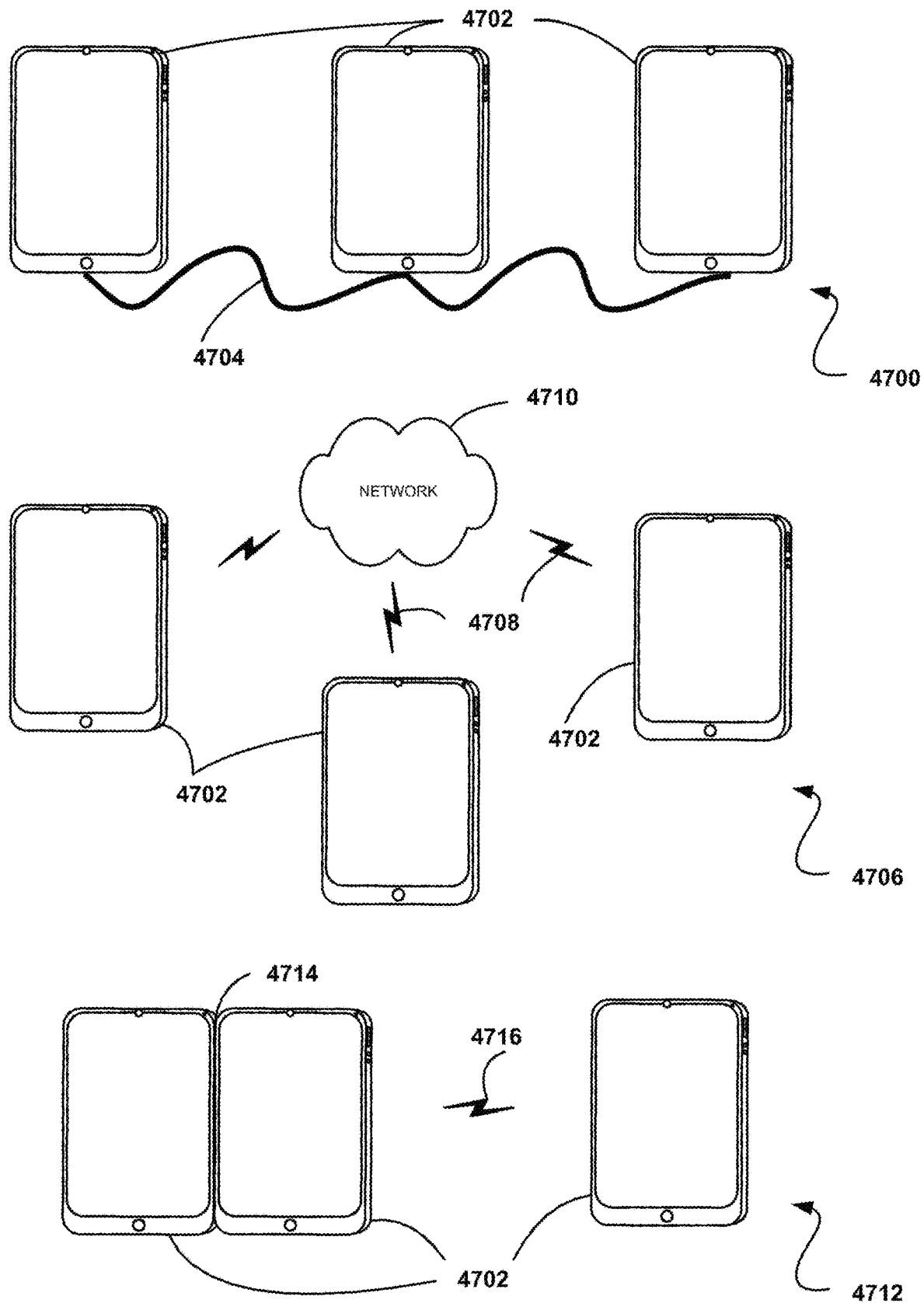
FIG. 47 shows systems used for connecting a tablet computer and a phone device, in accordance with one possible embodiment.

FIG. 47 shows systems 4700, 4706, and 4712 for connecting a tablet computer and a phone device, in accordance with one possible embodiment. As an option, the systems 4700, 4706, and 4712 may be implemented in the context of the architecture and environment of the previous Figures or any subsequent Figure(s). Of course, however, the systems 4700, 4706, and 4712 may be implemented in any desired environment. It should also be noted that the aforementioned definitions may apply during the present description.

As shown, two or more devices 4702 may be included. In one embodiment, the first device may be a tablet computer and the second device may be a phone device. Additionally, any additional device connected to the tablet computer or the phone device may be a tablet computer, a phone device, any device (e.g. peripheral, etc.) which is portable and has a touchscreen, or any other device.

As shown, a cord 4704 may be used to connect the two or more devices. In one embodiment, the cord (e.g. USB, firewire, etc.) may be used to connect the devices. Of course, any type of physical connector may be used to connect the two or more devices.

As shown, a wireless connection 4708 may be used to connect the two or more devices. In one embodiment, the two or more devices may use a wireless connection to connect to a network (e.g. 4710, internal network system, internet, etc.) by which the devices may then communicate and connect.

In one embodiment, the network may include a local wireless communications network (e.g. WiFi, wireless LAN, etc.). In some embodiments, the device may first need to login to a central station (e.g. router, hub, etc.) and thereby gain access to the network. Gaining access to the network may permit the device to then establish communication with another device logged into the network. Additionally, the connection via the network may have a relatively large bandwidth, such that a relative large amount of data can be exchanged in a short time. Further, any number of devices may connect to the network and thereby establish a connection to other devices.

As shown, a wireless connection 4716 may also be used to connect the two or more devices. In one embodiment, the devices may rely on a short-range communication (e.g. Bluetooth, Near Field Communication, ZigBee, etc.) to establish communication between two or more devices. In various embodiments, any number of devices may use short-range communication to establish communication (e.g. with the first and/or second device, and/or between all devices within short-range) between devices.

Figure 48:
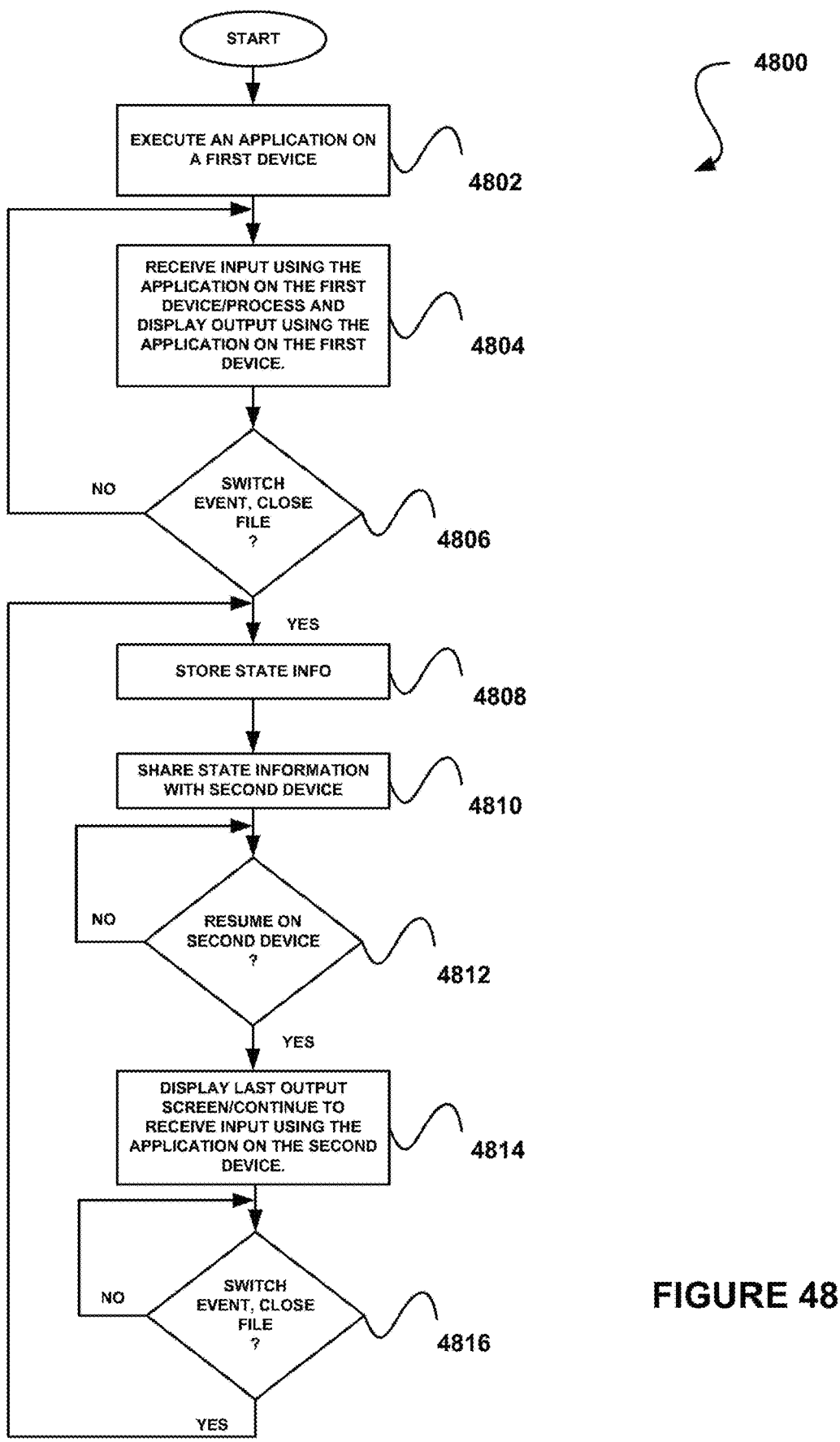
FIG. 48 shows a method for integrating a tablet computer and a phone device, based on a switch event, in accordance with one possible embodiment.

FIG. 48 shows a method 4800 for integrating a tablet computer and a phone device, based on a switch event, in accordance with one possible embodiment. As an option, the method 4800 may be implemented in the context of the architecture and environment of the previous Figures or any subsequent Figure(s). Of course, however, the method 4800 may be carried out in any desired environment. It should also be noted that the aforementioned definitions may apply during the present description.

As shown, an application on a first device may be executed. See operation 4802. In one embodiment, such an application may be capable of being used to initiate, contribute to, and/or complete a task. For example, the application or task may include starting a program, making a call, creating a document, taking a picture, or executing any other single block of functions. In another embodiment, the application may include initializing a social networking application, a joint collaboration platform, a cloud based application, and/or any other type of application.

As shown, input using the application on the first device may be received and output using the application on the first device may be processed and displayed. See operation 4804. For example, in one embodiment, a word processing application may receive a text input and display the text output on the device display. In another embodiment, a photo may be opened and receive inputs in the form of crop and alteration (e.g. brightness, contrast, etc.) commands and display the output on the device display. Of course, any input may be received on any application.

As shown, it is determined if a switch event has occurred or a file has been closed. See decision 4806. In one embodiment, a switch event may include any event where a saved state may be resumed on another device. For example, in one embodiment, a document may have been created, edited, and saved. Such a document may then be subsequently opened on another device and resumed. In another embodiment, the file may be closed and later resumed from the point at which the document had been closed on the first device. Of course, the closing of an application or program would also inherently close the file and store the state as well.

Additionally, in a further embodiment, the saved state may occur periodically and automatically. For example, in one embodiment, the user may preconfigure settings of an application automatically save a state every hour. Of course, any time period may be preconfigured by the user.

In another embodiment, the first device may continue to have an application and file open, and subsequently open the application and file on a second device. In such a situation, the saved state may be opened on the second device, and the application and file may be automatically closed on the first device. In a further embodiment, when a first device and a second device are within a specified distance of each other, the first device may automatically revert to a specified function (e.g. digital keyboard, display, etc.) and the second device may automatically open the saved state of the file. In another embodiment, the first device may have a file open, and a second device may open the same file which may automatically close the file on the first device.

For example, an embodiment is contemplated where a first device is a desktop/laptop device or a tablet that serves as a computing device (possibly higher capacity), and a second device includes a phone or mobile tablet device (possibly lower capacity). In such embodiment, the first device may be utilized to perform first actions in association with a task (e.g. create and edit a document, etc.) after which the switch event may be associated with/prompted by a close file event, device/application shut-down, device standby, device mode change (see any of the mode/role changes disclosed herein), device undocking, etc. of the first device (or even second device). In such case, the second device may be used to seamlessly resume with the task by being prompted to do so, etc. (e.g. possibly after opening the same application on the second device, in connection with a task list posted on the second device, etc.).

In one embodiment, the first device may have a file open, and a second device may open the same file without closing the file on the first device. For example, both devices may access the same file and make changes to the document that may be displayed on both the first and second devices. In one embodiment, each device may store a local copy of the file and send updated state changes to the other device. In another embodiment, the devices may communicate with real time updates and may display any changes made immediately. In a further embodiment, the devices may be connected to the cloud (e.g. internet, etc.) and each device accesses a common cloud platform which saves the changes to the file from all devices.

If it is determined that a switch event has occurred or a file has been closed, the state information may be stored, as shown. See operation 4808. In one embodiment, the state information may include saved data relating to an application. For example, the state information may include file metadata, data files (e.g. text files or binary files), or any other data relating to the application and/or file. In one embodiment, the state information may also include a user id, a timestamp, and/or any other information that may be relevant later when the file is reopened.

As shown, state information is shared with the second device. See operation 4810. In one embodiment, the sharing may be performed immediately or as needed. For example, once the first and second devices establish communication with each other, state information may be exchanged. As discussed above, communication may be established wirelessly or by a wired connection and may be automatic or manual.

In one embodiment, once an application is opened on a second device, the application may request updates from any other device. In another embodiment, the first device may automatically send state information updates to other devices at set intervals. For example, the updates may be set immediately upon saving a state or closing a file, or may be sent at a sent at a set later time period.

In another embodiment, the communication may be established by a peer-to-peer protocol. For example, wireless devices within range of each other may discover and may communicate directly without involving central access points. In another embodiment, a bridge may function as a connection point for a peer-to-peer protocol. Of course, any other technique may also be used to discover and foster communication between two devices. As an option, the peer-to-peer protocol (or any other similar direct communication protocol) may be conditionally used (in lieu of or in addition to) any server interaction, if such server interaction is not available, to thereby ensure connectivity, synchronization, etc.

In one embodiment the peer-to-peer protocol system may be configured to provide visibility to only users on one or more identified networks thereby precluding access to users residing outside the identified LANs. Additionally, such access restrictions may be enforced by firewalls or via the private network configuration, for example. Additionally, any other security mechanism may be used to protect and secure the network by which the tablet computer and the phone device communicate.

In a further embodiment, the devices may communicate through a server. For example, a local server may allow the devices to locally communicate. In another embodiment, the devices may communicate through an online (i.e. cloud-based) server. Of course, the devices may communicate through any type of server, regardless of whether the server is local or remote based.

As shown, it is determined whether to resume the state information on a second device. See decision 4812. In various embodiments, state information may be resumed based on user input or device settings. For example, in one embodiment, an application or a file may be selected by the user and opened. After the user selects such an application or a file, a prompt may be given to the user requesting if it is desired to resume the saved state. In another embodiment, no prompt may be given and the file or application may simply be opened without any user feedback. As another example, in one embodiment, state information may be resumed based on settings the user has preconfigured on the device. For example, the user may configure the device to automatically open any state information upon selecting a file and/or an application.

If it is determined to resume the state information on a second device, a last output screen may be displayed and input may continue to be received using the application on the second device, as shown. See operation 4814. For example, in one embodiment, the word processing application may be retrieved and initially display the last output screen as seen on the first device. Additional text may then be inputted and displayed into the application through the second device. In another embodiment, a game application may be retrieved and display the last output screen as seen on the first device. Playing the game may then be continued on the second device. Of course, any application may be resumed on a second device, and display the last output screen from the first device and receive input using the application on the second device.

As shown, it is determined if a switch event has occurred or a file has been closed. See decision 4816. In one embodiment, a switch event may include any event where a saved state may be resumed on another device. For example, in one embodiment, a document may have been created, edited, and saved. Such a document may then be subsequently opened on another device and resumed. In another embodiment, the file may be closed and later resumed from the point at which the document had been closed on the first device. Of course, the closing of an application or program would also inherently close the file and store the state as well.

Additionally, in a further embodiment, the saved state may occur periodically and automatically. For example, in one embodiment, the user may preconfigure settings of an application automatically save a state every hour. Of course, any time period may be preconfigured by the user.

In another embodiment, the first device may continue to have an application and file open, and subsequently open the application and file on a second device. In such a situation, the saved state may be opened on the second device, and the application and file may be closed on the first device. In a further embodiment, when a first device and a second device are within a specified distance of each other, the first device may automatically revert to a specified function (e.g. digital keyboard, display, etc.) and the second device may automatically open the saved state of the file. In another embodiment, the first device may have a file open, and a second device may open the same file which may automatically close the file on the first device.

In one embodiment, the first device may have a file open, and a second device may open the same file without closing the file on the first device. For example, both devices may access the same file and make changes to the document that may be displayed on both the first and second devices. In one embodiment, each device may store a local copy of the file and send updated state changes to the other device. In various embodiments, the updated state changes may occur periodically (e.g. once every X minutes or seconds, etc.) and/or as a result of an action (e.g. a save command initiated by the user, etc.).

In another embodiment, the devices may communicate with real time updates and may display any changes made immediately. In a further embodiment, the devices may be connected to the cloud (e.g. internet, etc.) and each device accesses a common cloud platform which saves the changes to the file from all devices.

If it is determined that a switch event has occurred or a file has been closed, the state information may be stored, as shown. See operation 4808. At this point, in one embodiment, the state information may be resumed on a third, fourth, or any number of additional devices. As such, tablet computers and phone devices may be constantly integrated so that switching from one device to another is a seamless and fluid experience for the user. For example, a user may start a word document on a tablet computer. While traveling, the user may continue the word document on a phone device. And later, the user may further continue the word document on another tablet computer. Transitioning from one device to the next may thus be completely more seamlessly. In the context of the present description, seamless refers to a consistent look and uninterrupted transition of work on a file regardless of the device used to access the file.

For example, transitioning from one device to another may permit resuming work on a file. In one embodiment, the user may be permitted to resume work on a file immediately. In such a configuration, the user's devices may be connected on a peer-to-peer network or to a broadband internet connection.

Figure 49:
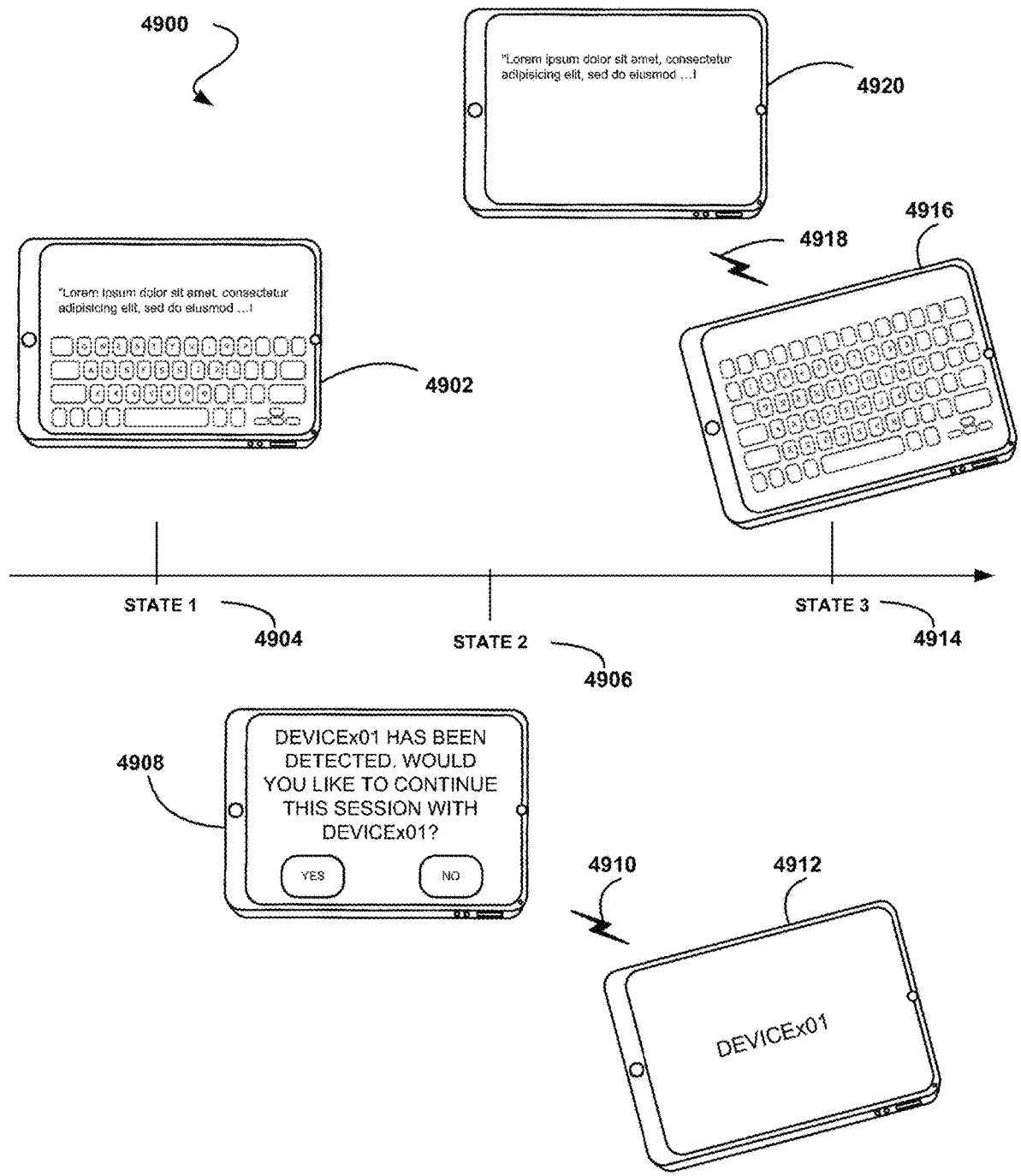
FIG. 49 shows a timeline for connecting a tablet computer and a phone device, in accordance with one possible embodiment.

FIG. 49 shows a timeline 4900 for connecting a tablet computer and a phone device, in accordance with one possible embodiment. As an option, the timeline 4900 may be implemented in the context of the architecture and environment of the previous Figures or any subsequent Figure(s). Of course, however, the timeline 4900 may be carried out in any desired environment. It should also be noted that the aforementioned definitions may apply during the present description.

As shown, state 1 4904 may be included on the timeline. In one embodiment, a first state may involve a device (e.g. 4902, tablet computer, phone device, etc.) which receives an input from a user and displays the output. In one embodiment, the display may be both an input device and an output device simultaneously. Additionally, in other embodiments, in addition to being an output device, the display may be a cursor controlling device, where a finger, stylus, or other apparatus interacting with the display results in cursor events. Of course, the display may function in any manner by which an input is received and an output is displayed.

In some embodiments, the device may include a word processing application where text is inputted by an on-screen keyboard and displayed (i.e. outputted, etc.) on the device display. In another embodiment, the device may include a photo editing application where displayed input keys have preconfigured functions (e.g. curve, layers, b&w, etc.) which may be used to edit a photo. Such input keys may be arranged on a digital image editing keyboard.

In another embodiment, the device may include an industrial process design application. For example, a collaborative design module within the application may permit a reviewer to capture and annotate screens using an input (e.g. electronic pen, finger, stylus, etc.) and screen capture capability of the device. The annotated captured screens may thereafter be placed within a data storage on the network or emailed to a developer of the industrial process control system using the wireless network connectivity feature of the device. As such, during a design and development phase of a project, developers may use the device to annotate changes, develop graphics, and track changes to process control designs.

Additionally, the device may be used to for production management usage. For example, the device may be utilized during production meetings, shift reviews and production management applications. Additionally, the device may support integrating data from applications (e.g., database programs) which may enable the user to bring plant data (e.g., real time, historical, etc.) which may be transported to a variety of locations including a plant floor and a conference room. Of course, any application may be used to receive user input and display the output.

As shown, state 2 4906 may be included on the timeline. In one embodiment, the state 2 may involve a first device (e.g. 4908, same device as in state 1, etc.) and a second device (e.g. 4912, etc.). Additionally, a wireless connection 4910 may be included. In one embodiment, the wireless connection may be used to connect the first device to the second device, or to any additional device which seeks to connect with either the first or second device.

In one embodiment, the first device may prompt the user with "DEVICEx01 HAS BEEN DETECTED. WOULD YOU LIKE TO CONTINUE THE SESSION WITH DEVICEx01?" In one embodiment, this prompt may be displayed as soon as a connection (e.g. automatic, manual, etc.) is activated between the two devices. In other embodiments, the prompt may be delivered in association a close file event, device/application shut-down, device standby, device mode change (see any of the mode/role changes disclosed herein), and/or device undocking, etc. of the first device (or even second device).

Additionally, a user may be presented with buttons "yes" and "no" by which user may input feedback. In one embodiment, if the user selects "no," the first device display reverts back to what was displayed in state 1 (e.g. 4904, etc.). If the user selects "yes," the first device advances to state 3 (e.g. 4914, etc.).

As shown, state 3 4914 may be included on the timeline. In one embodiment, the state 3 may involve a first device (e.g. 4920, same device as in state 1, etc.) and a second device (e.g. 4916, etc.). Additionally, a wireless connection 4918 may be included and may be used to connect device 4920 to device 4916. In various embodiments, any number of devices may be used and connected wirelessly.

In one embodiment, after a user selects "yes" in response to continuing an application session on the first device, the two devices automatically activate preconfigured settings and resume the application being used in state 1. For example, the first device (e.g. 4920, etc.) may automatically function as a display (e.g. display inputted text, etc.). Additionally, the second device (e.g. 4916) may automatically function as an on-screen keyboard. Of course, the first device, the second device, and/or any other device which may be connected, may automatically function in any preconfigured setting. Additionally, although the above example automatically activates preconfigured settings, the devices may also activate settings manually. Further, the settings may be configured at the time of connection (e.g. dropdown menu may appear on each screen requesting the setting to be activated, etc.), which especially may occur if a device had not previously been recorded and configured.

Figure 50:
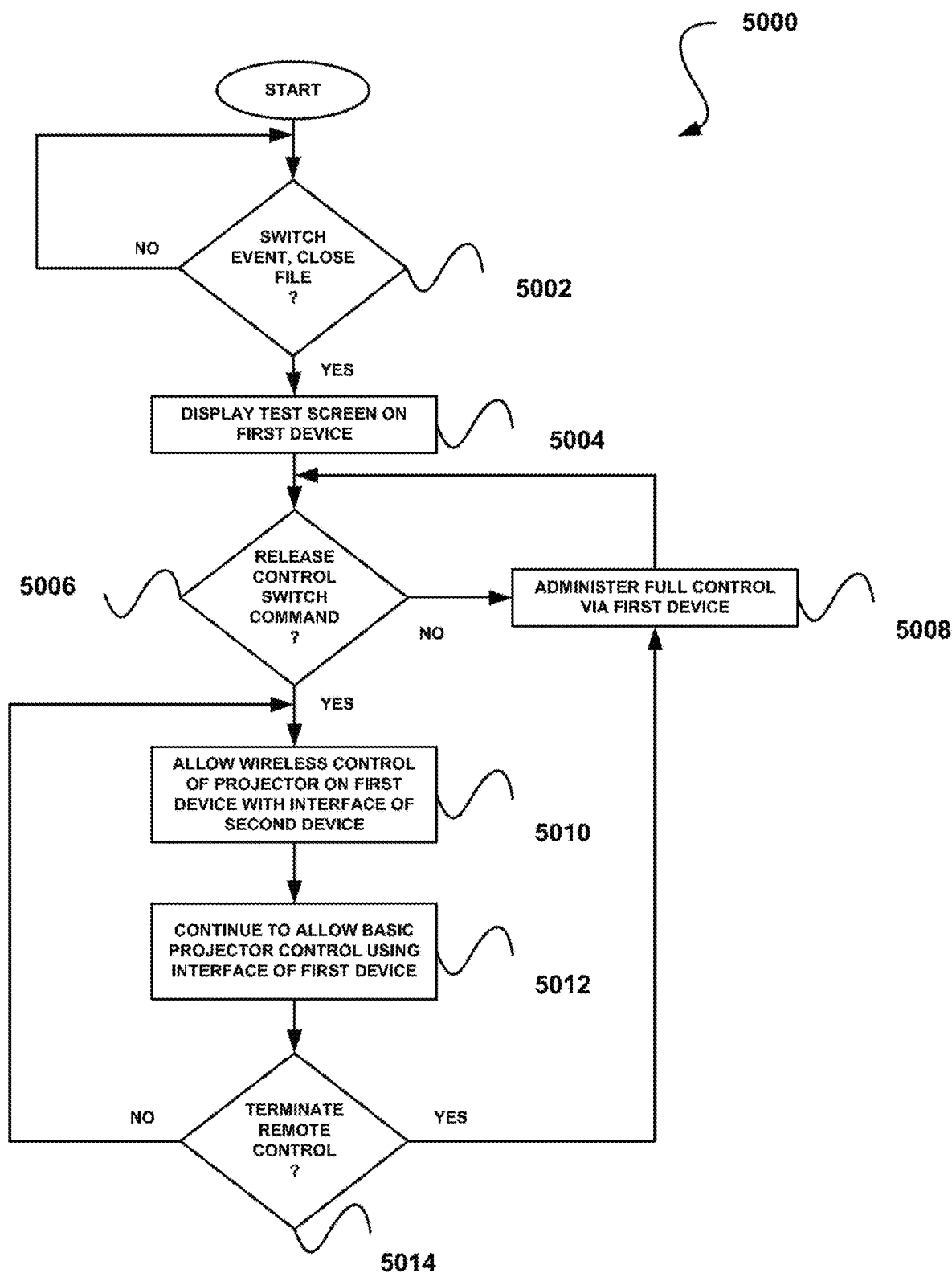
FIG. 50 shows a method for controlling a projector, in accordance with one possible embodiment.

FIG. 50 shows a method 5000 for controlling a projector, in accordance with one possible embodiment. As an option, the method 5000 may be implemented in the context of the architecture and environment of the previous Figures or any subsequent Figure(s). Of course, however, the method 5000 may be carried out in any desired environment. It should also be noted that the aforementioned definitions may apply during the present description.

As shown, it is determined if a switch event has occurred or a file has been closed. See decision 5002. In one embodiment, a switch event may include any event where a saved state may be resumed on another device. For example, in one embodiment, a document may have been created, edited, and saved. Such a document may then be subsequently opened on another device and resumed. In another embodiment, the file may be closed and later resumed from the point at which the document had been closed on the first device. Of course, the closing of an application or program would also inherently close the file and store the state as well.

In another embodiment, the first device may continue to have an application and file open, and subsequently open the application and file on a second device. In such a situation, the saved state may be opened on the second device, and the application and file may be closed on the first device. In a further embodiment, when a first device and a second device are within a specified distance of each other, the first device may automatically revert to a specified function (e.g. digital keyboard, display, etc.) and the second device may automatically open the saved state of the file. In another embodiment, the first device may have a file open, and a second device may open the same file which may automatically close the file on the first device.

In one embodiment, the first device may have a file open, and a second device may open the same file without closing the file on the first device. For example, both devices may access the same file and make changes to the document that may be displayed on both the first and second devices. In one embodiment, each device may store a local copy of the file and send updated state changes to the other device. In another embodiment, the devices may communicate with real time updates and may display any changes made immediately. In a further embodiment, the devices may be connected to the cloud (e.g. internet, etc.) and each device accesses a common cloud platform which saves the changes to the file from all devices.

If it is determined that a switch event has occurred or a file has been closed, a test screen may be displayed on the first device, as shown. See operation 5004. It should be strongly noted that, in the context of the present embodiment, decision 5002 is clearly optional and other embodiments are contemplated where such decision 5002 is omitted.

In one embodiment, a test card, or test pattern may be displayed. Additionally, the screen may cycle through different display resolutions until a set resolution is selected by a user. Of course, any image may be displayed as a test screen, and any technique may be used to display the test screen on the first device.

In another embodiment, the test screen being displayed may be a screen offering additional control and functionality of the device. For example, in one embodiment, the test screen displayed may include control buttons such as "release control to device," "allow device to remotely login," "alter test screen," or any other button that may relate to control and/or functionality of the device. Of course, the test screen may additionally include an "exit" or "resume" option.

As shown, it is determined whether to release a control switch command. See decision 5006. In various embodiments, a release control switch command may occur automatically or manually. For example, after a test screen is displayed on the first device, the first device may be used as a projector to display a device's display. In such a scenario, control of the first device may be released. The first device may then be controlled by a second device and/or another device. In one embodiment, releasing control of the first device may be partial or complete. For example, after releasing control switch command, a first device may be completely controlled by another device. In another embodiment, functions of the first device may be controlled by another device while maintaining some control functionality on the touchscreen display. In another embodiment, after releasing control switch command, more than one additional device may partially or completely control the first device. For example, more than one tablet computer may alter some aspect of control of the first device (e.g. zoom, brightness, sharpness, etc.) and even content.

If it is not determined to release control switch command, full control is administered via the first device. See operation 5008. For example, in one embodiment, the first device may function as a projector. This may be accomplished with the first device being a dedicated projector, the first device being a phone or tablet device with an integrated projector, the first device being a phone or tablet device with a retrofitted projector, etc.

In any case, under one potential embodiment, full control of the projector may be at least initially accomplished through exclusive use of the first device. For example, in one embodiment, the first device may include on a screen (e.g. touchscreen, etc.) a picture of content that is to be displayed, along with command functions, including, but not limited to, "settings," "zoom," "keystone," "brightness," and/or any other control function.

In another embodiment, the spatial arrangement on the first device for the control switch command and for the picture of what is being projected, may be enlarged or rearranged. For example, the command buttons may be grouped together in a rectangle format (two columns of buttons), or stretched along the bottom of the display on one row. In another embodiment, the picture of what is being projected may be enlarged or minimized. Alterations to the size may be accomplished by dragging the border of the frame to the desired height and width.

In a further embodiment, if the picture that is being projected is enlarged, the command buttons may be automatically resized and reduced in size. For example, as the picture of what is being projected is enlarged, the grouping of the command buttons may switch to another part of the screen where there is room to accommodate the grouping of the command buttons, or the command buttons may be reduced in number so that only a few buttons are displayed to accommodate the larger display of what is being projected.

If it is determined to release control switch command, wireless control of projector on first device with an interface of the second device is allowed. See operation 5010. For example, control of the projector may be done through use of an interface on the second device. In one embodiment, the interface on the second device may display the controls shown on the first device (as well as content to be/that is being displayed, optionally). In another embodiment, the second device may display separate controls than that shown on the first device. For example, if the first device is a phone device (with an integrated or retrofitted projector) and the second device is a tablet computer, the interface on the tablet computer may be more full and complete than that which may be displayed on the phone device's smaller screen and resolution.

As shown, basic projector control using interface of first device may continue to be allowed. See operation 5012. In one embodiment, the projector on the first device may be controlled in part by the interface of the second device while still maintaining input control functionality. For example, the interface on the first device may still display command buttons such as "minimize," "zoom," "brightness," and/or any other buttons that may control the projector. Of course, any button may be assigned to be displayed on the interface of the first device. To this end, at least rudimentary control of projector settings may be accomplished utilizing the first device, while control is administered via the interface of the second device. Of course, in various embodiments, the control administered via the interface of the second device may involve just the same rudimentary control (similar to the first device), full control of both content to be/that is being displayed and projector settings, just control of content to be/that is being displayed, etc.

In another embodiment, the interface of the first device may disable the background lighting of its screen to conserve battery, while still maintaining touch sensitive functionality. In a further embodiment, the interface of the first device may automatically display a different interface based on the type of second device. For example, if the second device is a phone device which controls in part the projector on the first device, the first device interface may display the same interface as the second device. In another scenario, if the second device is a tablet computer with a larger screen to display controls, the interface on the first display may display only the view of the projector, but with a tap of the screen may bring up control buttons displayed on top of the display of the projector.

As shown, it is determined to terminate the remote control. See decision 5014. In various embodiments, many techniques may be used to terminate the remote control of the projector. For example, in one embodiment, one of the control buttons may be labeled "terminate remote control," or upon touching the screen of the second device, the user may be prompted with a choice to terminate the remote control. In another embodiment, if the projector is turned off, the remote control may be automatically terminated. Of course, the projector may be turned off by the first device and/or by the second device.

In another embodiment, the remote control may be terminated based off of a threshold of inactivity. For example, the user may specify in the settings to terminate the remote control if no input is received within a set time period (e.g. fifteen minutes, etc.). In another embodiment, the remote control may be terminated based of the distance between the first device and the second device. For example, the user may specify in the settings that if the second device is a certain distance from the first device (e.g. more than 50 feet), that the remote control may be automatically terminated. Additionally, if the distance between the first device and the second device causes communication between the two devices to fail, the remote control may also be terminated. Of course, any other mechanism may be used to terminate the remote control.

It should be noted that, while a single second device is disclosed hereinabove for controlling the projector associated with the first device, a plurality of additional devices may be used for such control, particularly in a collaborative environment. In such embodiment, a single one (or more) of such additional device may be equipped with a higher level of control (e.g. full control of both content to be/that is being displayed and projector settings, etc.), while the remaining additional device may be allowed just control of content to be/that is being displayed, etc.

In some embodiments, the aforementioned collaboration may include any of the features disclosure hereinafter with respect to the video conferencing/collaboration embodiments. To this end, any one or more such video conferencing/collaboration features may be included in combination with at least one device (but also multiple) being used to control a projector such that at least one projector-equipped site may allow multiple users to view via a projector what would otherwise be viewed just by a screen of a device in a manner disclosed herein.

Figure 51A:
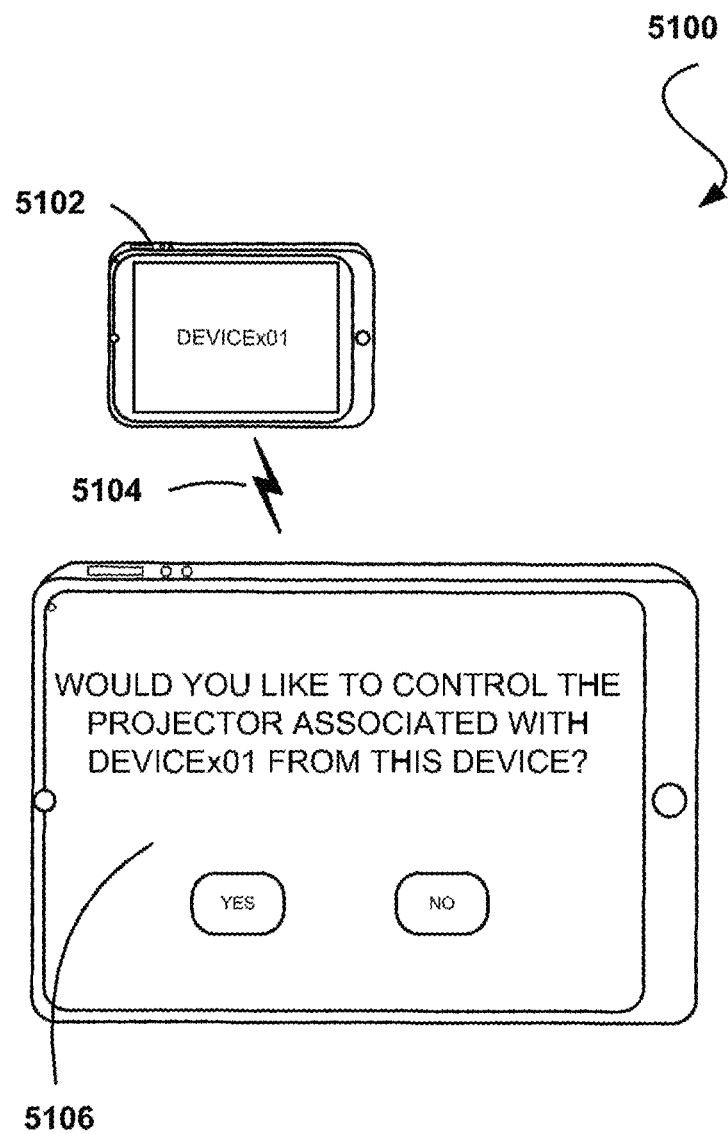
FIG. 51A shows a system for controlling a projector on a phone device from a tablet computer, in accordance with one possible embodiment.

FIG. 51A shows a system 5100 for controlling a projector on a phone device from a tablet computer, in accordance with one possible embodiment. As an option, the system 5100 may be implemented in the context of the architecture and environment of the previous Figures or any subsequent Figure(s). Of course, however, the system 5100 may be carried out in any desired environment. It should also be noted that the aforementioned definitions may apply during the present description.

As shown, a device 5102 and a device 5106 may be included in the system. Additionally, in one embodiment, a wireless connection 5104 may be used to connect device 5102 to device 5106.

In one embodiment, after a connection is activated between two devices (e.g. automatically, manually, etc.), a first device may prompt "WOULD YOU LIKE TO CONTROL THE PROJECTOR ASSOCIATED WITH DEVICEx01 FROM THIS DEVICE?" In various embodiments, the prompt may be given by a connection manager on the device, an application, and/or any other technique by which a connection is recognized and a prompt may be given in response.

In another embodiment, once a connection is activated, the devices may apply automatic preconfigured settings, including, for example, controlling a projector (associated with a device) by another device. As such, a prompt may be avoided based on preconfigured settings. Of course, the user may configure the tablet computer and the phone device (and any additional device as well) to function in any manner desired, including in response to activated connections. Thus, in various optional embodiments, the aforementioned prompt(s) may be provided only if both devices are subject to configuration settings (like those described above, for example) that pre-configure an allowance of the projector-control interworking disclosed herein.

In various embodiments, a prompt may be given to release control to another device. In other embodiments, a physical switch, an attachment (e.g. attach one device to another, etc.), and/or a device periphery (e.g. optical camera, proximity sensor, etc.) may be used to release control to another device.

Figure 51B:
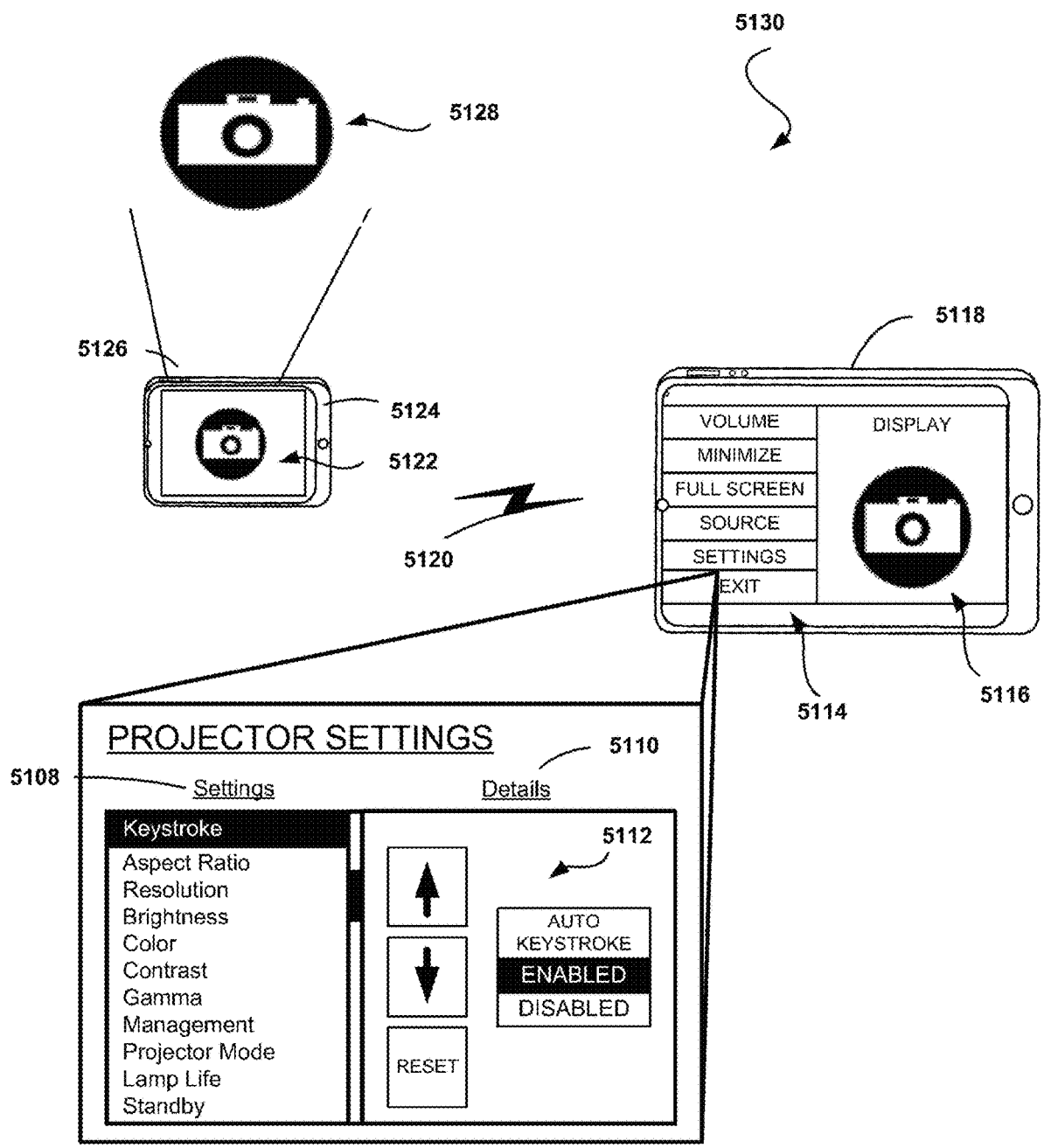
FIG. 51B shows a system and a user interface for controlling a projector on a phone device from a tablet computer, in accordance with one possible embodiment.

FIG. 51B shows a system and a user interface 5130 for controlling a projector on a phone device from a tablet computer, in accordance with one possible embodiment. As an option, the system and user interface 5130 may be implemented in the context of the architecture and environment of the previous Figures or any subsequent Figure(s). Of course, however, the system and user interface 5130 may be implemented in any desired environment. It should also be noted that the aforementioned definitions may apply during the present description.

As shown, a first device 5118 and a second device 5124 may be included. A wireless connection 5120 may be included. The user interface on device 5118 may include an output panel display 5116 and a list of functions 5114. The projector settings interface on device 5118 may include a settings pane 5108, a details pane 5110, and corresponding functions associated with settings 5112. Additionally, the device 5124 may include a display 5122, a projector 51026, and a projected image 5128. Of course, for purposes of simplicity, only two devices are illustrated. However, any number of devices may be connected and controlled in a similar manner as described above and below.

If a user selects to control a first device with a projector (e.g. FIG. 51A, etc.), control of the projector may be released to a second device. In one embodiment, the second device may include an output panel display which may be used to visualize the media which may be projected by the projector on the first device. In one embodiment, the output panel display may be manipulated to control the first device with a projector. For example, a user may expand an image by touching the screen with two fingers and separating the fingers, or may change the orientation of the projected image by touching a corner of the media with some input (e.g. finger, stylus, pen, etc.) and rotating the corner until the desired orientation is achieved.

In another embodiment, the output panel display on the second device may include a set of buttons for controlling the first device. For example, such buttons may include "sharpness" or "clarity," "blank screen," and/or any other function which may be preconfigured and used to control the first device. In another embodiment, the buttons may automatically minimize, but may be activated (i.e. reappear on the display, etc.) by a swipe of the display, a preconfigured touch motion, and/or any other function (e.g. touch, button, etc.) which may be used to activate the buttons.

In various embodiments, a list of functions may be displayed on the second device. In various embodiments, the list of functions may include "volume," "minimize," "full screen," "source" (e.g. media source to be projected, etc.), "settings," "exit," and/or any other preconfigured function. In some embodiments, selecting a function may execute an immediate action (e.g. exit, full screen, minimize, etc.) or initiate another screen (e.g. settings, source, etc.). For example, selecting "settings" on the second device associated with a projector may initiate a projector settings interface. The projector settings interface may be divided into two panels, a settings panel and an associated details panel pertaining to a selection of a setting. In various embodiments, the settings on the projector settings interface may include "keystroke," "aspect ratio," "resolution," "brightness," "color," "contrast," "gamma," "management," "projector mode," "lamp life," "standby," and/or any additional function which may control some aspect of the projector on the first device. In one embodiment, selection of "keystroke," may bring up configurable settings located in the details pane. For example, the keystroke may be increased or decreased by selecting the up or down arrows, and may be reset by selecting the "reset" button. Additionally, an "auto keystroke" function may be "enabled" or "disabled." Of course, any configuration function may be associated with each selected setting.

In one embodiment, while the second device controls the first device, the first device may display the media to be projected. In another embodiment, the first device may be configured to display a blank screen, a preset icon, or anything else. Of course, the first device may display any media object or nothing at all. Additionally, the display on the first device may be preconfigured and be automatically displayed, or may be manually configured by the second device after the two devices have connected. In various embodiments, the projector may be located on any face or side of the first device (e.g. located on the side of the device, on the back face, etc.). In some embodiments, the projector on the first device may be located on the top side of the device so that when the device is laid down, media can still be projected from the device. Additionally, the first device may include a retractable stand so that the device may be configured to optimize the projected image. Again, however, it should be noted that the first device may be a dedicated projector, a phone or tablet device with an integrated projector, a phone or tablet device with a retrofitted projector, etc. or any other device with projector-like capabilities.

For that matter, any of the features disclosed herein may be utilized in the context of an embodiment where, instead of a projector-enabled device, a television (e.g. HDTV, monitor, etc.) is substituted therefore, etc. To this end, a television may be used to display any content capable of being displayed by the aforementioned projector-related device.

Figure 52:
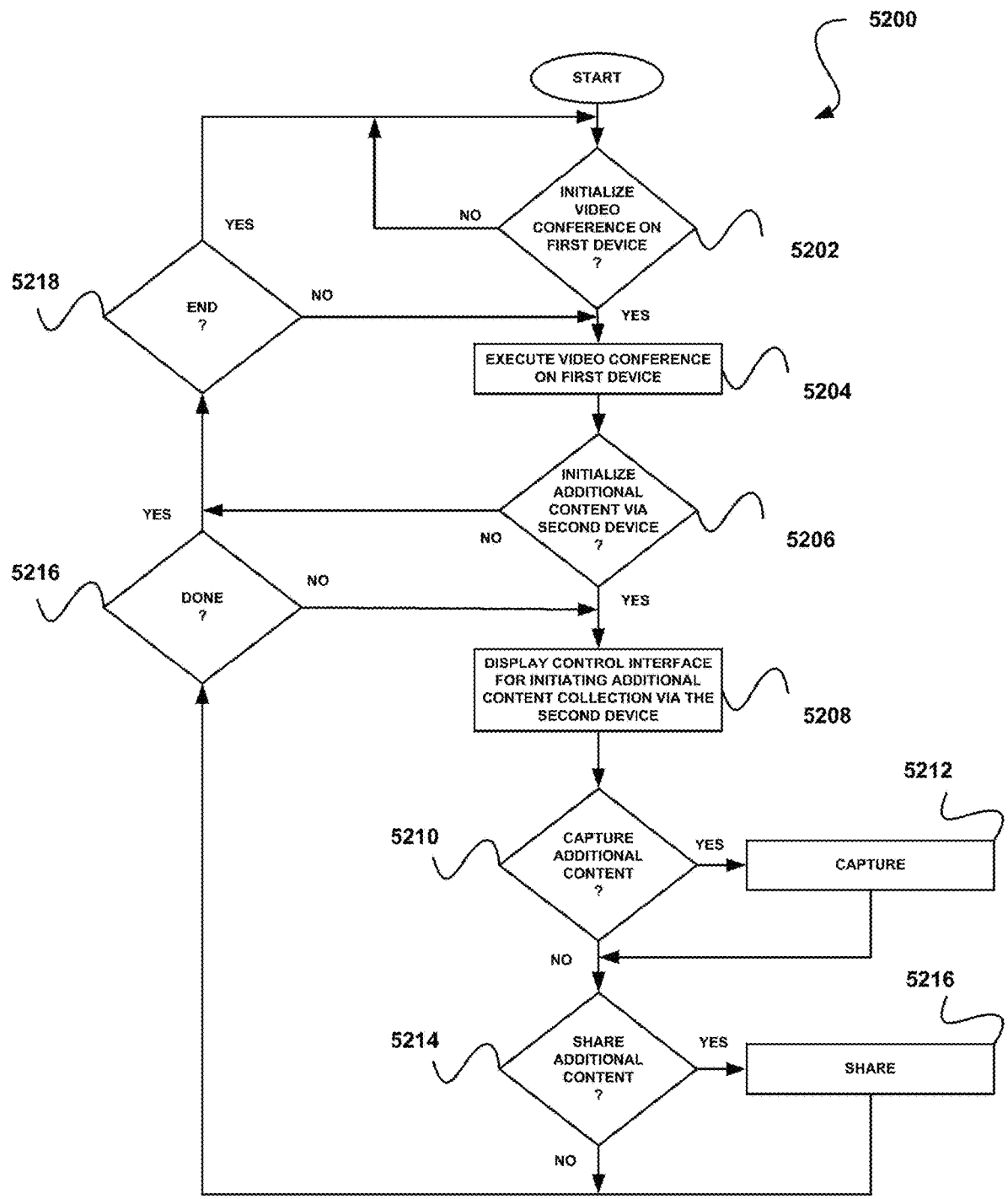
FIG. 52 shows a method for executing a video conference, in accordance with one possible embodiment.

FIG. 52 shows a method 5200 for executing a video conference, in accordance with one possible embodiment. As an option, the method 5200 may be implemented in the context of the architecture and environment of the previous Figures or any subsequent Figure(s). Of course, however, the method 5200 may be carried out in any desired environment. It should also be noted that the aforementioned definitions may apply during the present description.

As shown, it is first determined to initialize a video conference on a first device. See decision 5202. In one embodiment, a first device may call a second device and add on a video function. In another embodiment, the devices may automatically add on a video function if it is determined that both devices are video capable. Additionally, the user of each device may specify in the settings of the device whether the device should automatically add a video feed if it is available.

In one embodiment, the level of security may determine whether to initialize a video conference on a first device. For example, the first device may communicate with a base transceiver station which may contain equipment for transmitting and receiving of radio signals (transceivers) from a communication tower. The base transceiver station may also have other equipment for encrypting and decrypting communication with the Base Station Controller. In one embodiment, if a user successfully passes through a set level of security protocols, the user may be permitted to directly initialize a video conference with a second device. In another embodiment, a first device may have a key or permission id by which a video stream may be automatically commenced with a second device.

In another embodiment, the first device may initiate the video conference by establishing a reliable connection (i.e. broadband connection) with a mobile network. For example, the mobile network may be a CDMA2000, W-CDMA, UMTS, UTRAN, or FOMA mobile network. A packet data serving node may act as a connection point between the Radio Access and Internet Protocol (IP) networks. The packet data serving node may be responsible for managing Point-to-Point Protocol (PPP) sessions between the mobile device's core IP network and the mobile device. A home agent may be a router located in a home network of the mobile device which may allow a mobile device to connect to the Internet or data network by assigning an IP address. The home agent may forward packets to an appropriate network when a mobile device is away from its home area or home network. In one embodiment, a video conference may be initialized by connecting to a reliable wireless network. As such, the first device may initialize a video conference on a first device by connecting to a mobile network or to a home network, and/or any other type of data streaming network.

In one embodiment, the video conference may be initialized on a first device by working in conjunction with a mobility manager. In the context of the present description, a mobility manger refers to a system that may maintain a state of sessions being directed from the network. The mobility manger may manage a handoff of a session based on various pre-handoff conditions. For example, in one embodiment, a first condition may be based on the signal strength from the base stations to the mobile devices. The mobility manager may average the signal strength and can make the condition positive for a handoff based on preconfigured threshold limits. A second condition, in another embodiment, may use a time-sampling algorithm to detect the length the signal strength remains at or above a predetermined threshold before making the condition positive for the handoff.

In a further embodiment, a third condition may be based on the reservation of appropriate channel bandwidth. For example, once the channel bandwidth has been reserved, the mobility manager may consider the condition to be positive (i.e. permissible to establish a video conference). The handoff may be accomplished based on a make and break model where the second session to the new access network and/or device is first initiated by the network, and for an instance in time there may be two active sessions for that mobile device. On the confirmation of a successful establishment of the second session, the first session may be terminated.

In another embodiment, the mobility manager may also be configured with business rules or policies to initiate the handoff if there is a loss of signal. For example, the mobility manager may be configured to handoff to an available access network with a lower delivery cost such as WiFi or 4G for example. In order to facilitate a successful handoff, the media manager may buffer the media transactions occurring during the handoff process (the first session) so that users do not experience a disruption of their services (e.g., during a video session where there's a loss of media that may result in pixilation, etc.).

In various embodiments, a resource manager may assist in initializing a video conference on a first device. For example, the resource manager may provide the ability to reserve resources (e.g. bandwidth) by manipulating the frequency spectrum of any wireless access technology. In one embodiment, such access technologies may include, but are not limited to, IEEE 802.11, IEEE 802.15, 802.16. Of course, any wireless access technology may be manipulated. In another embodiment, the resource manager may accomplish the reservation of resources by monitoring the available usage in a particular channel associated with various wireless frequency spectrum agnostics of the underlying wireless technology being used. The resource manager may also be configured to ensure that higher priority traffic gets assigned a pipe of bandwidth within the channel without affecting the other traffic traversing the channel. The resource manager may also ensure that media is transcoded to a proper codec for all end points (devices within a session) when sessions are handed off to other access networks that may provide higher bandwidth capabilities. As such, a resource manager may assist in initializing a video conference on a first device.

In a further embodiment, a first device and a second device may each call into a video server service, thereby enabling the devices to connect and share a video stream. Such a video server service may include a wide range of functions for multimedia resources. For example, functions may include a provision of resources to be controlled by the MRFC, a mixing of incoming media streams, a sourcing media streams (e.g. for multimedia announcements, etc.), and a processing of media streams. Of course, any mechanism may be used to initialize a video conference on a first device.

As shown, if a video conference on a first device is initialized, then a video conference on a first device may be executed. See operation 5204. In one embodiment, an application on the first device may execute a video conference on a first device. For example, the application may connect the first device to a second device. In another embodiment, the application may automatically connect the first device to the second device automatically. For example, the application may save a username and password of the user of the first device and may use such information to connect the first device to a second device. Of course, any login identification may be saved and used by the application. In another embodiment, the application may request additionally information from the user (e.g. name to be displayed, initial size of camera screens, additional security protocols, etc.) before connecting the first device to the second device.

In one embodiment, a video conference is executed on a first device by a video conference server. For example, a video conference server may include a processor, an input module, and an output module. Each processor of a video conference client may execute a video conference client application that allows video conference clients (e.g. first device, second device, etc.) to exchange audiovisual data with each other via the video conference server. In one embodiment, the processor of the video conference server executes a videoconference server application.

As shown, it is determined to initialize additional content via the second device. See decision 5206. In various embodiments, many mechanisms exist by which the additional content may be initialized. For example, in one embodiment, the user on the first device may be presented with a list of additional content which the user on the first device may select. In different embodiments, the additional content may be received from any sensor (e.g. additional camera, voice recorder, device sensor such as an accelerometer/location-based sensor, etc.) associated with the first device and/or any sensor (e.g. first camera, second camera, microphone, voice recorder, device sensor such as an accelerometer/location-based sensor, etc.) associated with a second device (or even multiple additional devices, etc.). In an embodiment involving additional content received in connection with the second device, such second device may or may not be under the control of the user of the first device.

If the second device is under the control of the user of the first device (i.e. same user, etc.), the second device and first device may be pre-configured to cooperate together such that such additional content is fed to the first device in the context of a video conference, possibly, in one embodiment, using the configuration settings or any other features discussed hereinabove in the context of previously-described embodiments. Further, the second device may optionally be prompted to engage in such additional content-providing role when certain one or more conditions are met. One possible condition may involve the first device operating in video conferencing mode by having an outstanding video conference request outstanding to at least one third party, having a video conference active with at least one third party, having a video conference application open, etc. One or more of the foregoing conditions may also be required on the second device. Further conditions may include an active connection with the second device, a predetermined maximum distance proximity threshold between the first/second device, etc.

In one particular embodiment, the user on the second device may initialize the additional content. For example, the user on the second device may initialize a second camera, connect to another person to the video conference, record the conversation, record the video conference, and/or provide any additional content which is available on the second device.

In another possible embodiment, the additional content on the second device may be initialized by a server. For example, the server may identify additional content on the second device and, based on preconfigured settings set by the user, automatically initialize such content. For example, the server may identify a web camera within a set proximity of the second device and may use the web camera as the main input for the video conference. In another embodiment, the server may identify a printer wirelessly connected to the second device and may use the printer to print an image. Of course, the server may identify any content available on the second device, and initialize such content on the second device. In a further embodiment, the initialization of additional content by the server may be automatic. In another embodiment, the server may prompt the user of the first device, and/or the user of the second device if it is desired to connect additional content available on the second device.

For purposes of simplicity, a first device and a second device are discussed. However, any number of devices may be connected and any additional content available on any of the devices may be initialized. Of course, in such a configuration, security parameters and preconfigured user settings may determine the level of access one device has to another, as well as the level of control one device has over another.

In another embodiment, the video conference may function in a presentation mode. In such a mode, the video conference participants (e.g. user of device 1, user of device 2, etc.) may employ a video conference application to log in to a video conference server. After login, one of the video conference participants may choose to become a presenter, and so may employ the video conference application to request presenter status. For example, the display of each video conference participant may display a control bar having a button to request presenter status. The control bar may include a plurality of control buttons. For example, in one embodiment, a control button, when activated, may cause an output module to send an action command requesting presenter status to the video conference server. In response to the action command, the video conference server may grant presenter status to the requesting participant. In another embodiment, multiple participants may request presenter status contemporaneously. In such cases, the video conference server may arbitrate to determine to which participant presenter status should be granted.

Once a presenter has been selected, one of the other video conference participants may then choose to become a director, and may employ the video conference client to request director status. In one embodiment, director status is available to any participant with appropriate rights at the start of the videoconference. In the context of the present description, director status refers to an ability to control the displays and additional content of other participants' devices. Once the video conference server has granted director status to a videoconference participant, the status may remain with that participant until that participant releases it or departs the videoconference.

In one embodiment, the control bar may include a control button that, when activated, causes an action command requesting director status to be sent to videoconference server. Alternatively, a participant may use a settings window of his video conference application to request director status. In one embodiment, a settings window on a user's device may include a "Start Controlling" button which, when selected, causes an output module to send an action command requesting director status to the video conference server. Of course, any command button may be preconfigured or set to send an action command requesting director status to the video conference server.

Upon receiving the action command, the video conference server may grant or reject the request for director status. In one embodiment, rejection may occur when a director status has already been assigned, or when requests are received from multiple participants. In the case of multiple requests, the video conference server may select one of the requests based on priority, order of receipt of the requests, or any other policy, and may grant the selected request while rejecting the others. In another embodiment, rejection may also occur if the videoconference does not allow directors, if the requesting participant is not allowed to become a director due to server-configurable user access rights, and/or any other policy set by the server or the participants.

When a participant is granted director status, videoconference server may notify the other video conference participants of the change in status. The user interfaces of the video conference applications may react to the notification. For example, the "Start Controlling" button in the settings window, and a "Start Directing" button in the control bar, may be changed to appear disabled to the non-director participants, and may be changed to "Stop Controlling" and "Stop Directing" functions for the director participant. In another embodiment, other visual markers identifying the director participant may also appear within the videoconference client application user interfaces for the meeting participants. For example, the color of the director's name or iconic representation as displayed in an interface component may change to reflect the director status.

In one embodiment, each video conference participant's application may maintain the identity of the last director assigned in the video conference, and may notify the user when a change occurs. As such, if a particular participant becomes a director, releases director status, and regains it again (or otherwise leaves the meeting and rejoins later), other participants may be notified of the participant's director status only once. Of course, if a different participant becomes the director participant, notifications may be sent again. For example, when the director changes, the display modules of the non-director video conference participants' display may include a participant director dialog box.

In another embodiment, the video conference may function, in connection with at least one device, in a reviewer mode. In such a mode, a device may optionally be able to control the display of the video conference content (to multiple onsite participants) via a television and/or projector, using any one or more of the techniques discussed hereinabove in connection with previously-described embodiments.

If it is determined to initialize additional content via the second device, the control interface for initiating additional content collection via the second device is displayed. See operation 5208. In one embodiment, the control interface may be displayed on the second device. In another embodiment, the control interface may be displayed on any other device (e.g. first device, etc.). The control interface may include functionality relating to the additional content. For example, in one embodiment, the control interface may relate to a second camera and may include buttons such as "enable camera," "take snapshot," "record video," as well as a "settings" button to manipulate the configuration of the camera. Of course, any button may be displayed to the user relating to functions associated with the additional content. In another embodiment, the control interface may relate to a microphone and may include such buttons such as "turn on," "listen," "mute," "record audio," or any other button relating to functionality of the microphone. Of course, the control interface may include anything relating to initiating the additional content.

As shown, it is determined to capture additional content. See decision 5210. In various embodiments, the user of the second device may capture additional content manually or automatically. For example, in one embodiment, the device may include a second camera and a photo may be captured by selecting a "take snapshot" button on the control interface of the second device. In another embodiment, the device may be configured to automatically take a photo after a set time period (i.e. a timer) has been selected by the user.

Additionally, the timer may repeat continually during the video conference so that snapshots of the second camera are taken at regular intervals. In various embodiments, the control interface of the second device may be displayed and controlled (e.g. user may select "take snapshot" or set a timer and interval to take photos, etc.) on other devices (e.g. first device).

If it is determined to capture additional content, the content may be captured. See operation 5212. In one embodiment, the content may be captured by storing the content in a local cache located on the second device. Additionally, the content may be stored in memory on the second device. In another embodiment, the content may be transferred from the local cache on the second device to the memory of another device. In a further embodiment, the content may be transferred from the local cache on the second device to the memory of a server.

It is determined to share additional content. See decision 5214. In various embodiments, any content may be shared. For example, a podcast, a video, an audio recording, a TV program, or any other content that may be viewed on the second device. Additionally, shared content may include other types of content, such as, for example, one or more links to content (e.g., links to video, podcasts, TV programs, etc.) stored at a remote server. In the context of the present description, a link refers to any reference to content (e.g., a web page, a video file, a podcast, streaming video, etc.). In some implementations, a link may include a Uniform Resource Locator (URL) of content. In another embodiment, if a device or a server contains stored content, a prompt may be given to the user of the device if it is desired to share the additional content.

Additionally, the additional content may be shared manually. In one embodiment, a user may select the additional content to be shared whereupon a prompt is given to the user requesting how the content is to be shared. For example, the prompt may request the manner in which the additional content is to be shared, including, for example, email, push mail, text messaging, media messaging, or any other mechanism which may transfer the additional content to another user. In another embodiment, the prompt may request another manner in which the additional content is to be shared, including, for example, uploading to a server, uploading to a blog, connecting the media to a social networking site, and/or any other server based service. Of course, the server based service may extend beyond a web-based service and include any type of network system by which data may be exchanged.

In a further embodiment, any mechanism may permit the additional content to be shared. For example, in one embodiment, a mechanical button on the device may cause the additional content to be shared. Upon activating the mechanical button, the user may be displayed with a prompt of how the content is to be shared, or the mechanical button may be preconfigured to automatically send the additional content in a set manner (e.g. by email, etc.). In another embodiment, a gesture may be recorded by a camera and used to send the additional content to a preconfigured server. In a further embodiment, when a device is brought within a proximity of another device (e.g. tablet computer, phone device, etc.), the additional content may be automatically shared based off of preconfigured configurations, or manually shared (e.g. bump content to another user, etc.).

As shown, if it is determined to share additional content, the content is shared. See operation 5216. Many techniques may be used to share the content. For example, in one embodiment, a device may send the additional content to a central posting server. The content posting server may store the additional content for sharing with users within a designated community of users (e.g., with users operating the video conference application). The content posting server may store any type of content posted by content sharing device including, for example, video files, streaming video, podcasts, DVB-H, images, or links to video files, streaming video, podcasts, images, and/or any content file associated with the device.

In another embodiment, content may be shared by "pushing" the content from the content sharing device to a user device, or to content posting server. In the context of the present description, "pushing" may refer to a method of content delivery to a mobile device whereby the content is automatically delivered without any action being required on the part of the mobile device user. Additionally, the content may be "pulled" directly from the user's device and put on a content posting server. In the context of the present description, "pulling" may refer to a method of content delivery to a mobile device that is initiated by the mobile device requesting the content with or without any action being required on the part of the mobile device user.

In one embodiment, the pushing system may function as a mobile content pushing system which may work simultaneously with several mobile platforms or transport types. For example, the additional content may be pushed using such platforms such as, but not limited to, Research in Motion's (RIM's) Blackberry/BES platform, or another suitable platform. The transport type may be any transport that allows a real time push of content to a mobile device, or any other mechanism that may put the content directly onto the mobile devices over the air. In another embodiment, the mobile content pushing system may push the additional content to a mobile device infrastructure, or it may retrieve the content from a central content storage and then push the content files to the mobile device infrastructure. In another embodiment, if two devices are brought within a preconfigured proximity, one device may automatically or manually push additional content to another device. Additionally, in one embodiment, a user of another device may be notified that the additional content has been downloaded and/or is available.

Additionally, sharing additional content may be facilitated by establishing a community of users for content sharing. Various techniques may be used for establishing a community of users. For example, a user operating content sharing device may access a "my community" window and select an "add contact" operation. The user may enter an identifier associated with the other user that is desired to be added to the user's community of users. Subsequent to addition of a contact to a user's community of users, the contact may accept or reject addition to the community of users and, if accepted, the user may subsequently share content with that contact.

In one embodiment, sharing additional content may be facilitated by establishing a linkage between users. For example, in one embodiment, a linkage may be established between a first and second user. In various embodiments, the linkage may include a direct relationship, or an indirect relationship through another user. For example, the first user and second user may have an accepted relationship (e.g. a friend, white listed, etc.). As another example, the first user and second user may be several degrees separated (e.g. the first user is friends with a third who is friends with the second user, etc.).

In one embodiment, the degree of separation may be predetermined (e.g. only for friends of friends, friends of friends of friends, product/service provider-customer, etc.). In another embodiment, the relationship may be an unestablished relationship (e.g. a stranger, unconfirmed friend, etc.). In various embodiments, the relationship for users may be filtered based on demographics, having a common location, a history of downloaded applications or content, similarity, ranking in an application or content, achievements for an application or content, and/or any other aspect capable of being filtered.

In one embodiment, a device may download content from a centralized server and may store the content in its memory. For example, a device may download video files, stream a video, stream a podcasts, and/or cause the additional content to be shared in any manner. In some implementations, the stored content may include a link(s) to content viewed at a device. For example, the link(s) may include a uniform resource locator(s) (URLs) associated with the content. In implementations that store links as content, the content downloaded by content sharing device may only be stored temporarily while the content is being viewed by the user. The link(s) associated with the network location of the content, however may be stored on the device for subsequent sharing with the community of users.

In another embodiment, the additional content may be shared through social networking websites and/or related applications. For example, a social networking website may include a web server, an action log, a wall post generator, an email generator, a sharing module, a member profile store, an application data store, a group store, a shared content store, and an event store. In other embodiments, the social networking website may include additional, fewer, or different modules for various applications. Conventional components such as network interfaces, security mechanisms, load balancers, failover servers, and management and network operations consoles may additionally be used to facility and protect the social networking websites and/or related applications.

In one embodiment, the web server may link the social networking website via the network to one or more client devices. The web server may serve web pages, as well as other web-related content, such as Java, Flash, XML, and so forth. The web server may include a mail server or other messaging functionality for receiving and routing messages between the social networking website and the client devices. The messages may be instant messages, queued messages (e.g., email), text and SMS messages, or any other suitable messaging technique that would apply to sharing additional content.

In some embodiments, the social networking websites and/or application may populate an action log with information about member actions to track them. For example, the additional content may be tracked and automatically posted as a member's action. Additionally, the wall post generator may generate wall post messages for members. For example, a message about a new application being available, or that additional content is available, may be posted on a member's wall. The email generator may generate email messages to members, and in some embodiments, may even include the additional content as an attachment.

In a further embodiment, a device may be configured so that all actions may be monitored and recorded by a social networking website and/or application. For example, the social networking website and/or application may maintain data about a number of different types of objects, such as content that is selected, additional content that is recorded and/or captured, actions taken during the video conference, and/or any other action which may be taken by the user. Each object type may have information fields that are suitable for the storing information appropriate to the type of object. For example, the additional content that is recorded may contain data structures that include the time and location for an event. Additionally, actions taken during the video conference may contain data structures with fields suitable for describing a member's profile (e.g. length of time of conference call, participants with which the user interacted, etc.).

The sharing module associated with the social networking websites and/or application may allow the sharing of additional content from external websites and/or servers with members of the social networking website. The sharing module may be capable of receiving a request to share content, retrieving the content from the external website, and storing the content in the social networking website. The shared content store may be used for storing this content, also referred to as shared content. The sharing module may be also capable of formatting the shared content, transmitting the stored content to various destinations in the social networking website, and tracking the shared content. Users which are members of the social networking website and/or application may download the shared content from the website to the device. In some embodiments, the downloading may be automatic (e.g. pushing) or it may be manual (e.g. once the application is activated and loaded it searches for additional content, etc.). In a further embodiment, once content is uploaded by a user, other participants of the social networking website and/or application may receive immediate notifications of the uploaded material. For example, in one embodiment, the users may receive a text message or a wall posting indicating that additional content had been uploaded. Additionally, the uploaded content may be accessible immediately directly from the wall posting, or from another appropriate retrieval service, site, and/or application.

As shown, it is determined if the additional content collection is done. See decision 5216. For example, a server may pull additional content from the device and once it has completed, send an acknowledge message to the device indicating that the uploading of additional content is complete. In another embodiment, if the device has not been activated or used for a set preconfigured time interval, the device may automatically determine that the additional content collection is done.

In one embodiment, the device may prompt the user requesting if additional content collection has completed. This may occur after a set preconfigured time interval of inactivity, or may occur every time additional content completes being uploaded to another device and/or to a server. Of course, any other mechanism may be used to determine if additional content collection is done.

If it is determined that the additional content collection is done, it is determined whether to end the video conference. See decision 5218. For example, in one embodiment, the user may end the video conference by selecting an "end conference" button found on the display of the first device, or on the control interface of the second device. Additionally, in another embodiment, closing the application and/or returning to the home screen of the device during the video conference may cause the video conference to end. In a further embodiment, other programs may be executed while the video conference is occurring, including but not limited to, browsing the Internet, checking email, weather, stocks, and/or any other application.

In one embodiment, applications may be able to interact with the video conference and/or provide input to the video conference. For example, the user may select music playback and have that music output be provided to the video conference. In another embodiment, the user may specify in the settings of the device and/or application the manner in which the video conference may end. For example, a period of inactivity, the invocation of another application, another user ending a video conference, a social networking response signaling the video conference is "bad," a poor data connection, and/or any other feature which may relate to the video conference may be used to end the video conference. Of course, any feature of the device, including sensors, accelerometers, gestures, and/or any other feature may be used to also end the video conference.

Figure 53:
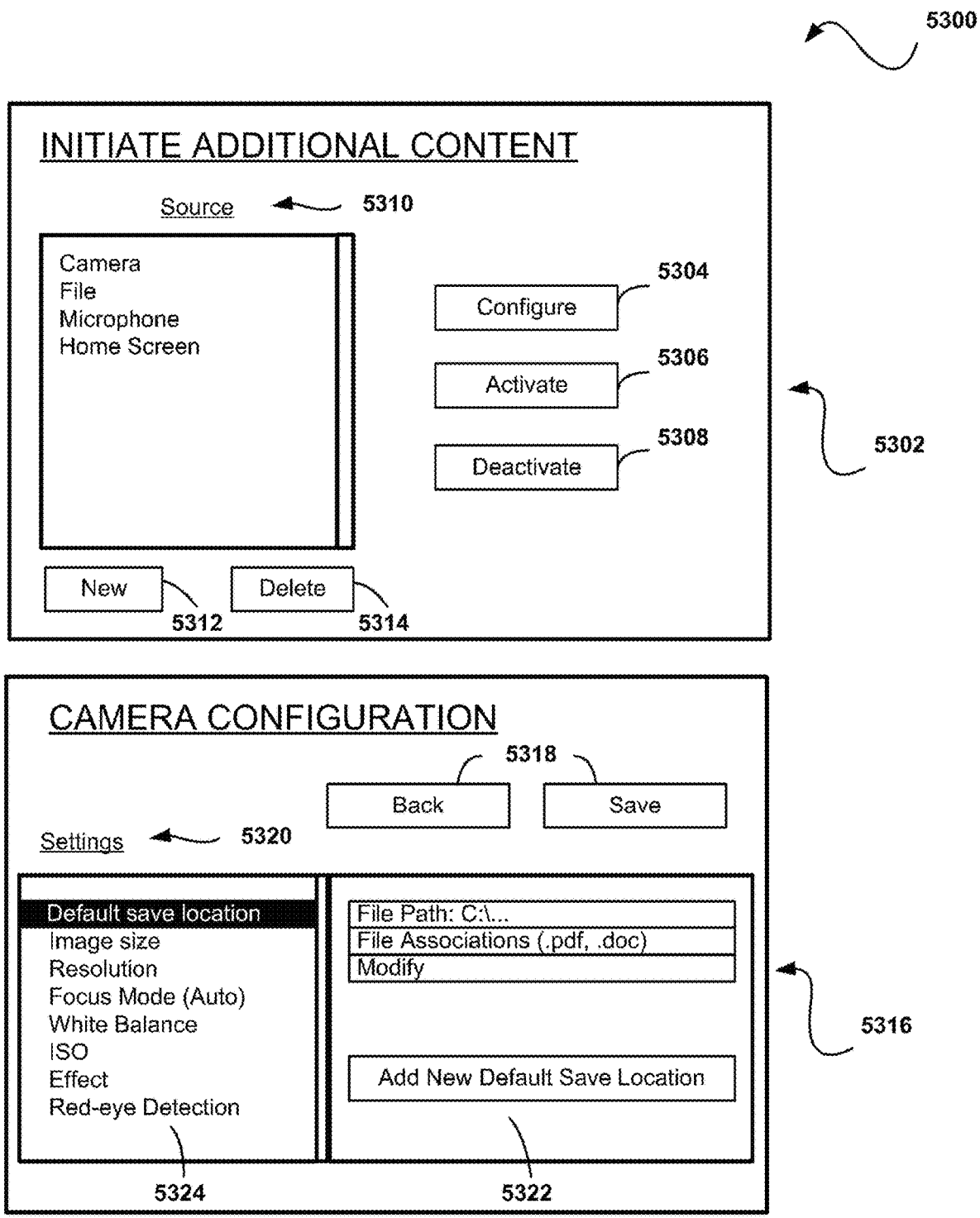
FIG. 53 shows a user interface for initiating additional content on another device, in accordance with one possible embodiment.

FIG. 53 shows user interfaces 5300 for initiating additional content on another device, in accordance with one possible embodiment. As an option, the user interfaces 5300 may be implemented in the context of the architecture and environment of the previous Figures or any subsequent Figure(s). Of course, however, the user interfaces 5300 may be carried out in any desired environment. It should also be noted that the aforementioned definitions may apply during the present description.

As shown, a user interface 5302 may be used to initiate additional content. The user interface may include a content "source" panel 5310 with an accompanying "new" button 5312 and a "delete" button 5314. Additionally, the interface may include a "configure" button 5304, an "activate" button 5306, and a "deactivate" button 5308.

In one embodiment, while a video conference is being executed on a first device, a user may initialize additional content via a second device. For example, a video panel may indicate available resources to initiate on a second device, the video conference application may include a button entitled "initialize additional content," a user of a second device may send a request to a user of a first device an invitation to initialize additional content via the second device, and/or any method may be used to initialize additional content via a second device.

After additional content has been initiated, a user interface may be displayed by which a user may select additional content. For example, in one embodiment, the user interface associated with initiating additional content may include a list of available content from the source device (i.e. the device which was selected from the video conference interface screen, etc.). In various embodiments, the additional content may include a camera, a file, a microphone, remote desktop (i.e. home screen of device, etc.), and/or any resource on the device which may be remotely controlled, as well as any file type which may be transferred from one device to another (e.g. jpeg, .doc, .pdf, etc.).

In one embodiment, a camera may be controlled (e.g. zoom lens, capture image, etc.), a microphone may be utilized (e.g. adjust sound levels, make recordings, etc.), a file may be accessed and downloaded onto a first device, the display (i.e. home screen) of the second device may be remotely controlled (i.e. remote desktop, etc.), and/or any aspect associated with the second device may be controlled and/or otherwise manipulated. In another embodiment, such settings may be configured by selecting a "configure" button. Additionally, when configuration of the additional content is complete, the user may select an "activate" button whereby the additional content is initialized (e.g. camera, or any selected additional content, on the second device is displayed on the first device, etc.).

In some embodiments, the list of additional content may be static (i.e. updated manually by the user, etc.). In such cases, the user interface may include a "new" and "delete" button whereby the user of the first device may select a new content source on the second device. Additionally, such content sources may also be deleted from the sources list by the user of the first device.

Once an additional content has been activated, the video conference screen may create a separate box for manipulation of the additional content. Such a box may be enlarged (e.g. full screen, half screen, any set size determined by the user, etc.), temporarily minimized, or otherwise manipulated.

As shown, a user interface 5316 may be used to configure a camera. The user interface may include a "settings" panel 5320, a "back" button and a "save" button 5318, as well as a panel to display the details associated with a selected setting 5322.

In one embodiment, upon selection of "camera" and "configure" under the user interface associated with initializing additional content, a configuration interface initiates. The "settings" panel on the configuration interface includes configurable parameters, including, but not limited to, "default save location," "image size," "resolution," "focus mode (Auto)," "white balance," "ISO," "effect," "red-eye detection," and/or any other configurable setting which may control in some aspect the camera.

In one embodiment, a default save location may be selected and configured based on parameters including, but not limited to, a default file path associated with specific file types. Of course, a default path may be selected for all files regardless of the file association. However, in some embodiments, the user may specify default save locations based off of file types (e.g. jpeg files are stored in/myphotos, etc.). Additionally, the user may modify the file paths, associations, and/or create additional save locations. In various embodiments, the user may select the size of the image to be captured (e.g. large, medium, small, email-sized, etc.), the resolution of the image (e.g. 1280×800, 800×600, etc.), the focus mode (e.g. portrait, landscape, action, etc.), the white balance (e.g. custom, tungsten, fluorescent, daylight, flash, cloudy, shade, auto, etc.), the ISO (e.g. 100, 200, 400, 800, 1600, etc.), effect (e.g. b&w, textured, toned, etc.), red-eye detection (e.g. on/off, automatic, etc.), as well as any other feature which may be used to control some aspect of the camera. Of course, any configurable setting associated with any of the sources used for additional content may be used to configure the additional content.

Figure 54:
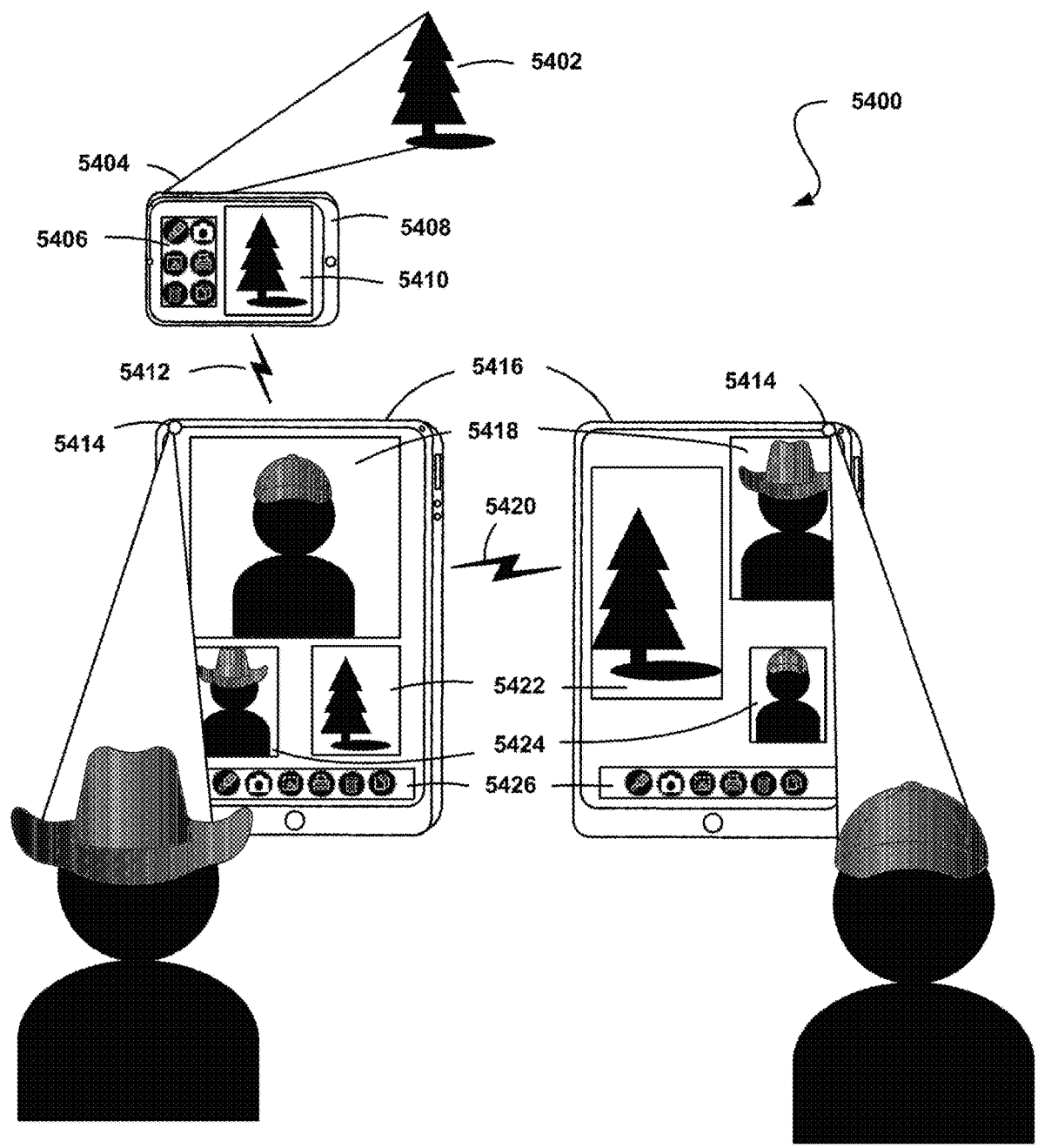
FIG. 54 shows a system for executing a video conference, in accordance with one possible embodiment.

FIG. 54 shows a system 5400 for executing a video conference, in accordance with one possible embodiment. As an option, the system 5400 may be implemented in the context of the architecture and environment of the previous Figures or any subsequent Figure(s). Of course, however, the system 5400 may be carried out in any desired environment. It should also be noted that the aforementioned definitions may apply during the present description.

As shown, a phone device 5408 may be included. Located on the phone device may be a set of command buttons 5406. Additionally, the phone device 5408 may include a camera (i.e. optical sensor) 5404 on the reverse face of the touchscreen. The object being sensed 5402 may be viewed on the touchscreen of the phone device 5410.

In one embodiment, the command buttons may be displayed on the touchscreen display of the device and may include functions such as, but not limited to, "settings," "zoom," "keystone," "brightness," and/or any other control function. Of course, any function may be preconfigured as a command button. In another embodiment the device may include on the touchscreen a picture of what is being sensed or captured by the camera. For example, in one embodiment, the camera may function as a webcam and activated by the proximity sensor. The webcam may feed a live stream whenever an object passes within a certain preconfigured distance of the device. In another embodiment, the camera may function as a video camera and provide a live stream, or may function as a digital camera and take static photos to be sent to the participants on the video conference. Of course, the optical sensor may function in any manner to provide additional content for the video conference.

In various embodiments, any additional content may be added to the video conference (e.g. microphone, whiteboard, heat sensor, etc.). For example, in one embodiment, a microphone may be used to provide a live audio stream for the video conference, a whiteboard application (available on one of the participant's device) may be used for collaboration between the participants, a heat sensor peripheral device may be used to provide a live heat sensing video stream for the video conference, and/or any type of peripheral and/or application may be added to the video conference to provide additional functionality.

In another embodiment, the spatial arrangement of the command buttons and of the picture of what is being projected, may be enlarged or rearranged. For example, the command buttons may be grouped together in a rectangle format (two columns of buttons), or stretched along the bottom of the display on one row. In another embodiment, the picture of what is being projected may be enlarged or minimized. Alterations to the size may be accomplished by dragging the border of the frame to the desired height and width. In a further embodiment, if the picture what is being projected is enlarged, the command buttons may be automatically resized and/or reduced in size. For example, as the picture of what is being projected is enlarged, the grouping of the command buttons may switch to another part of the screen where there is room to accommodate the grouping of the command buttons, or the command buttons may be reduced in number so that only a few buttons are displayed to accommodate the larger display of what is being projected. Of course, if the command buttons are resized the picture of what is being viewed may automatically also be resized.

In another embodiment, the user of the device may alter spatial arrangement on the screen by voice commands. For example, the user may state "minimize command buttons" or "maximize viewfinder" which would cause the picture of what is being viewed to take up the entire screen of the device. The user may also state "default view" to return the arrangement of the objects (e.g. picture of what is being viewed and the command buttons) to a default arrangement. In another embodiment, if the picture of what is being viewed takes up the entire screen, the command buttons may reappear whenever the user taps the screen, pushes a mechanical button, speaks a command, or otherwise performs some preconfigured action to cause the buttons to reappear.

As shown, the phone device 5408 may communicate with another device 5416 wirelessly 5412. The phone device 5408 may communicate with one or more tablet computer(s) 5416 and also be controlled by more than one tablet computer. Further, the tablet computer 5416 may include an optical sensor 5414, a video box of the user of the device 5418, an additional content box 5422, a video box of another participant of the video conference 5424, a set of command buttons 5426, and/or any other feature which may be pertinent to a video conference session.

In one embodiment, the video box of the user of the device, the additional content box, and the video box of another participant of the video conference, may be rearranged as well as resized as desired, as described above. As such, the arrangement of what is displayed on the screen may be customized and/or altered.

In some embodiments, a video stream may not be accessible (e.g. no camera on device, malfunctioning camera, etc.), or due to decreased bandwidth, the quality of the video may fall below a preconfigured threshold. In such instances, a static image of the user may be sent to other devices. Such an image may be linked to the user's account (e.g. default image, etc.) so that any and all devices which connect to that user's device will view the same static image.

Further, in various embodiments, additional content may be added to the video conferencing relating to social networking. For example, in one embodiment of the video conference, a status update panel may include live feeds, comments, and/or any other social networking aspect. Additionally, the status update panel may include input from the user (e.g. user inputs text, searches for contact, etc.) as well as display updates from other contacts. In one embodiment, the status update panel may incorporate all feeds for all participants of the video conference. Of course, the status update panel may be preconfigured or may be configured at the time of adding the additional content. In a further embodiment, rather than displaying the status updates in a set panel, they may be temporarily displayed as an overlay to the video conference application when they are received.

Figure 55A:
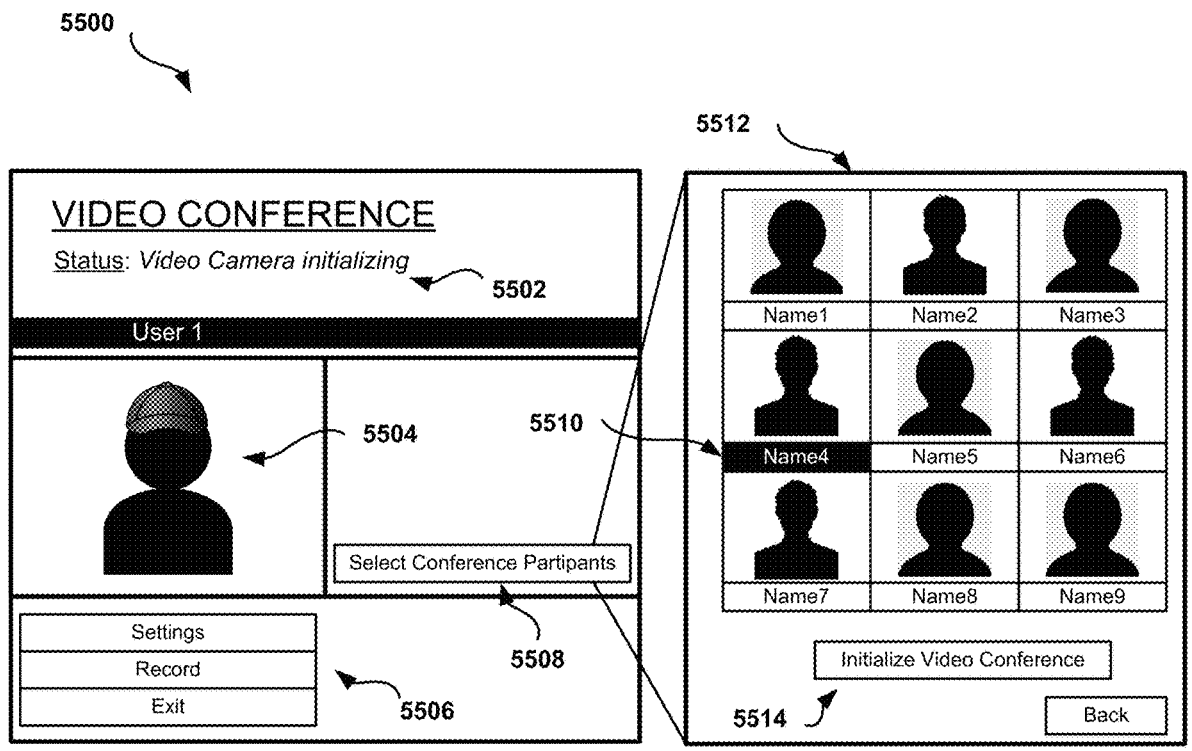
FIG. 55A shows a user interface for executing a video conference, in accordance with one possible embodiment.

FIG. 55A shows a user interface 5500 for executing a video conference, in accordance with one possible embodiment. As an option, the user interface 5500 may be implemented in the context of the architecture and environment of the previous Figures or any subsequent Figure(s). Of course, however, the user interface 5500 may be carried out in any desired environment. It should also be noted that the aforementioned definitions may apply during the present description.

As shown, a user interface for executing a video conference 5500 may be included. A status update of the video conference 5502 may be displayed. A first user (i.e. user of the device initializing the video conference, etc.) may be displayed 5504 (e.g. using the optical sensor or camera, displaying a static photo, etc.). Application command buttons 5506 may be included. Additionally, a function to select conference participants 5508, the pane to select conference participants 5512, a selected conference participant 5510, and function to initialize a video conference 5514, may be included.

In one embodiment, a video conference may display the status of the application. For example, in various embodiments, the video camera may initialize, the participants may be added, the additional content may be initialized and added, the conference may be active (i.e. all participants initialized and connected, etc.), and/or any other status may be displayed to the user. In other embodiments, the user interface may display the status as a temporary overlay in the application window. Of course, the status may be disabled and/or otherwise configured by the user under a settings option.

In another embodiment, a user may wish to record the video conference. Such a recording may be started before the conference is started (e.g. the user initiating the recording may wish to give some background before adding in other participants, etc.), during the conference call, or at any other time that is desired. Additionally, in one embodiment, conference participants may be given a prompt to agree to the recording of the video conference (e.g. given at the time of logging in, at the time the recording is requested, etc.)

Additionally, in one embodiment, a user may select conference participants. For example, in various embodiments, the user may select participants by touching a photo associated with a participant, by speaking their names into a microphone, by inputting by text the names of the participants, by receiving an email or multimedia message (e.g. photo, video, text, etc.) which includes a list of participants, and/or by any other method by which participants may be added to a video conference. In one embodiment, once participants have been selected, a user may initialize video conference.

In another embodiment, rather than selecting conference participants, a user may select to initiate a video conference with a group, business, and/or another entity comprising of two or more users. For example, in one embodiment, a group may be selected associated with a school's Parent-Teacher-Organization, or any type of organization. In other embodiments, a business may be added as a participant (e.g. engineering firm or individual adds a manufacturing firm to video conference call, etc.). Of course, a group (including businesses, and/or other entities with two or more users, etc.) may be altered to include specific participants from the entity (e.g. only the CEO and CFO are included in the video conference by default, etc.). Additionally, in other embodiments, the user may alter the default settings associated with a group so that additional participants are included in the conference call. Further, any participant on the video conference may add additional participants (individually or by group) at any time during the conference call.

Further, in some embodiments, a user may proactively decide to join a video conference. For example, in one embodiment, a user may wish to join a scheduled meeting. Rather than selecting conference participants, the user may simply select the desired conference to join. In some embodiments, permission may be required in order to join a video conference. Permission may include approval requests during the video conference to a lead participant, a string of characters sent out to all potential participants beforehand, a specified code sent out to all potential participants, role-based analysis associated with the username and login information (e.g. a CEO of a business may have a higher level of permission to join conference calls, etc.), and/or any other method which may be employed to grant permission to a potential participant.

In various embodiments, a pane to select participants may display individuals, groups, meetings, or any other entity, by name, photo, and/or any other indicia which may be used to identify the participant. The pane to select participants may include the ability to modify information associated with each potential participant, the ability to modify how the potential participants are displayed, and/or any other ability to modify some aspect associated with the participants. Of course, if the user decides not to initiate a video conference, a back button may be used to return to the prior screen and potentially exit the program.

Figure 55B:
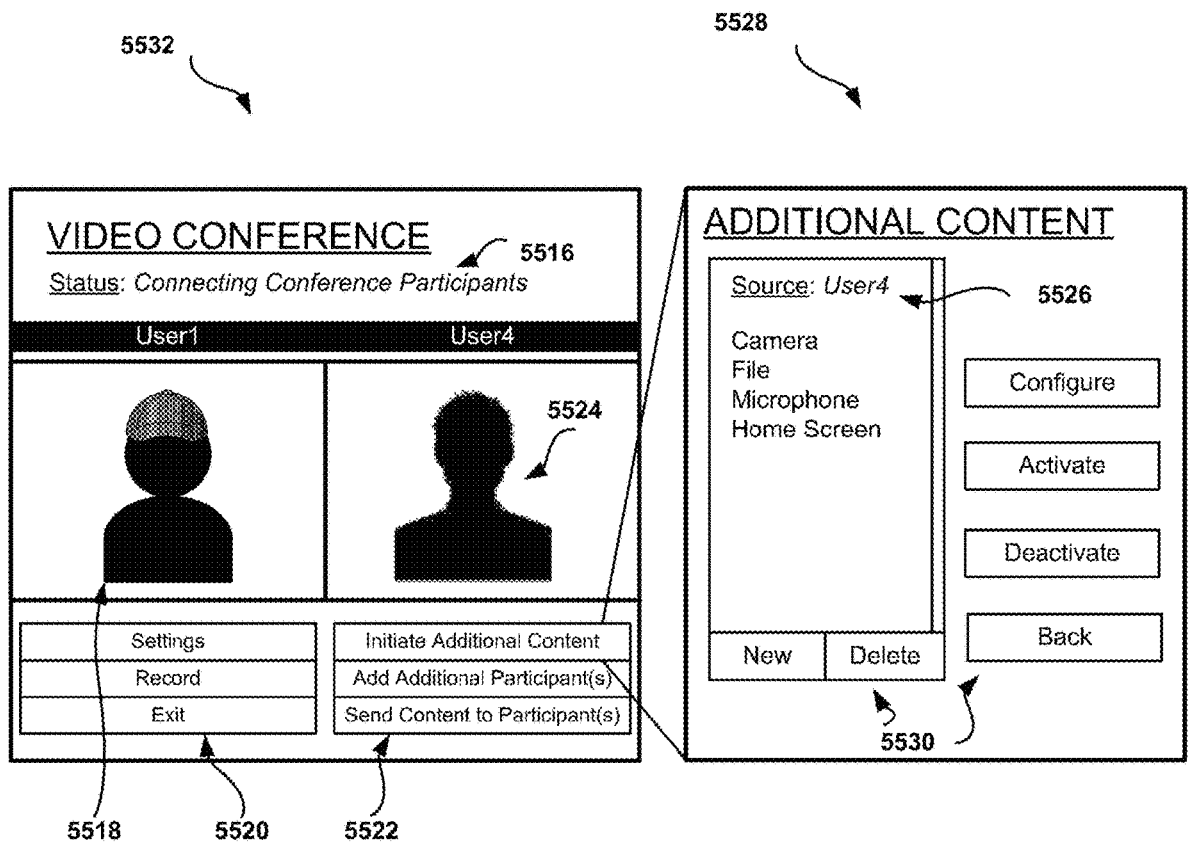
FIG. 55B shows a user interface for executing a video conference, in accordance with one possible embodiment.

FIG. 55B shows a user interface 5532 for executing a video conference, in accordance with one possible embodiment. As an option, the user interface 5532 may be implemented in the context of the architecture and environment of the previous Figures or any subsequent Figure(s). Of course, however, the user interface 5532 may be carried out in any desired environment. It should also be noted that the aforementioned definitions may apply during the present description.

As shown, a user interface for executing a video conference 5532 may be included. A status update of the video conference 5516 may be displayed. A first user (i.e. user of the device initializing the video conference, etc.) may be displayed 5518 (e.g. using the optical sensor or camera, displaying a static photo, etc.). Application command buttons 5520 may be included. A second participant may be displayed 5524. Application command buttons relating to participants 5522 may be displayed. Additionally, a function to initiate additional content 5528, select the additional content 5526, and ability to control at least some aspect of the additional content 5530 may be included.

In one embodiment, a video conference may display the status of the application. For example, in various embodiments, the video camera may initialize, the participants may be added (i.e. "connecting conference participants," etc.), the additional content may be initialized and added, the conference may be active (i.e. all participants initialized and connected, etc.), and/or any other status may be displayed to the user. In other embodiments, the user interface may display the status as a temporary overlay in the application window. Of course, the status may be disabled and/or otherwise configured by the user under a settings option.

In another embodiment, application command buttons may be used to navigate and modify the video conference application interface. For example, in one embodiment, the user may record a video conference, modify application settings (e.g. connection speed, level of latency, default download location, color schemes, etc.), exit the application, and/or otherwise control some aspect of the video conference application.

Additionally, in some embodiments, the participants of the video conference may be displayed. For example, a photo of the participant, a live video stream of the participant, and/or some other representation of the participant may be displayed. In some embodiments, there may not be enough display space to view all video streams of participants simultaneously. In such situations, the user of the device may minimize some of the video streams (e.g. only the name of the participant is shown, etc.), or otherwise manipulate the content on the display. In some embodiments, a whiteboard may be used by all participants. In such a situation, all video streams from participants may be minimized so that a whiteboard has sufficient space on the display. Of course, any object on the display may be modified in any manner (e.g. enlarged, resized, minimized, etc.) so that the display may present the video conference as desired.

In one embodiment, application command buttons may be associated with participants and may be displayed. For example, if at least one of the participants has additional content, an "initiate additional content button" may be pressed. The additional content user interface may include a source of the additional content and may further display the content available to be initiated from the user. For example, in one embodiment, a source (e.g. User4, any participant which has content potentially to be initiated, etc.) may correspond to a participant on the video conference. Additional content may be displayed relating to the specific individual (e.g. camera, file, microphone, home screen (i.e. remote desktop, etc.), etc.). In situations where a group or entity with two or more users has additional content which may be initiated, the group (e.g. ABC manufacturing firm, etc.) may be listed rather than the individuals. Of course, any entity participating with the video conference may add additional content in any manner and by any method.

In another embodiment, each additional content may be configured, activated, deactivated, added (e.g. "new," etc.), deleted, and/or modified in any other manner. For example, in one embodiment, a camera may be configured by including, but not limited to, altering the exposure, aperture, picture size, picture mode, and/or any other aspect which may be configured and relate to the camera. Of course, any of the additional sources may be configured in any manner.

In one embodiment, the list of available content from the participants may populate automatically. In other embodiments, a user may view a list of users with potential content but may need to add the content manually rather than simply selecting the content from a list under the user. Further, in some embodiments, the content may require permissions in order to be accessed (e.g. passcode, password, role-based access, etc.) and controlled (e.g. activated as part of the video conference, etc.). Once additional content has been selected and activated, a corresponding box with the additional content may appear on the main video conference interface. Of course, the user may manipulate or otherwise alter the size and shape of the additional content box.

Figure 55C:
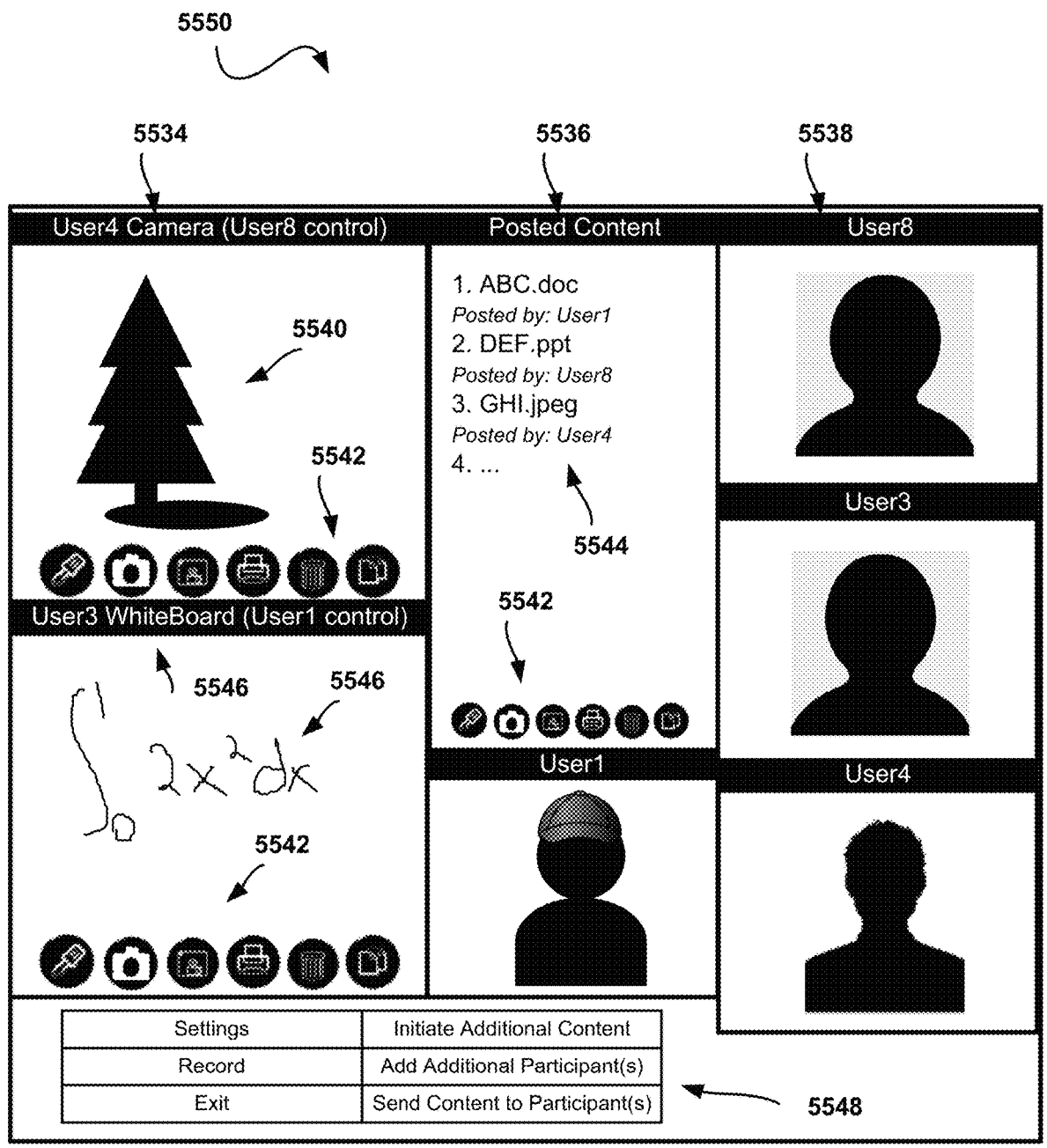
FIG. 55C shows a user interface for executing a video conference, in accordance with one possible embodiment.

FIG. 55C shows a user interface 5550 for executing a video conference, in accordance with one possible embodiment. As an option, the user interface 5550 may be implemented in the context of the architecture and environment of the previous Figures or any subsequent Figure(s). Of course, however, the user interface 5550 may be carried out in any desired environment. It should also be noted that the aforementioned definitions may apply during the present description.

As shown, a user interface may be included for executing a video conference 5550. Application command buttons 5548 and command buttons for the additional content 5542 may be included. Additional content as a camera 5534 may be included along with an image or video stream from the camera 5540. Additional content as a whiteboard 5546 may be included along with an interactive panel displaying input from users 5546. Additional content as posted content 5536 may be included along with a list of content which has been posted for all users 5544. Additionally, participants of the video conference may be displayed 5538.

In one embodiment, application command buttons may be used to navigate and modify the video conference application interface. For example, in one embodiment, the user may record a video conference, modify application settings (e.g. connection speed, level of latency, default download location, color schemes, etc.), exit the application, and/or otherwise control some aspect of the video conference application. Additionally, in some embodiments, application command buttons may be dynamic. For example, if additional content is available to be controlled during the video conference, an "initiate additional content" button may be displayed by which additional content may be activated. Additionally, a user may wish to share content with participants (e.g. camera, microphone, a file, etc.) and may do so by a "send contents to participant(s)" button.

Additionally, for each additional content which may have been added to the video conference, command buttons may be displayed to control the additional content. For example, if a camera has been added to the video conference, a user may wish to resize the camera pane, save a photo, control the zoom or direction of the lens, share a photo taken from the camera, and/or configure or alter the camera in some other manner. In like manner, if a whiteboard has been added to the video conference, a user may wish to save an image of the whiteboard, change the color of the ink used for each user, resize the image of that which has been created, and/or configure or alter the whiteboard in some other manner. Of course, any additional content which may have been added may be controlled by command buttons.

In one embodiment, the command buttons for the additional content may be displayed in a preconfigured location in relation to the additional content. In other embodiments, the command buttons may display temporarily or as an overlay to the additional content. Of course, the command buttons may be altered and/or configured in any manner by the user under the "settings" of the application.

In some embodiments, after the additional content has been activated, the title of the additional content will display the source of the additional content as well as the content (e.g. camera, microphone, etc.) which has been added. Additionally, the user who is actively controlling the additional content may also be displayed so that all participants are aware of who is control the additional content. In various embodiments, the user of the additional content remains the owner of the additional content and may take over the additional content, even if it is being actively controlled and/or used by another participant. Additionally, the additional content may be deactivated from the video conference at any time by the owner of the additional content.

In one embodiment, any number of participants may be displayed on the interface. For example, the user of the device may be displayed as well as all, or some of, the participants of the video conference. In one embodiment, a photograph, live video stream, or any other content may be used to represent the user or participants. Of course, the display of any of the participants or the user may be minimized or otherwise resized.

Figure 56:
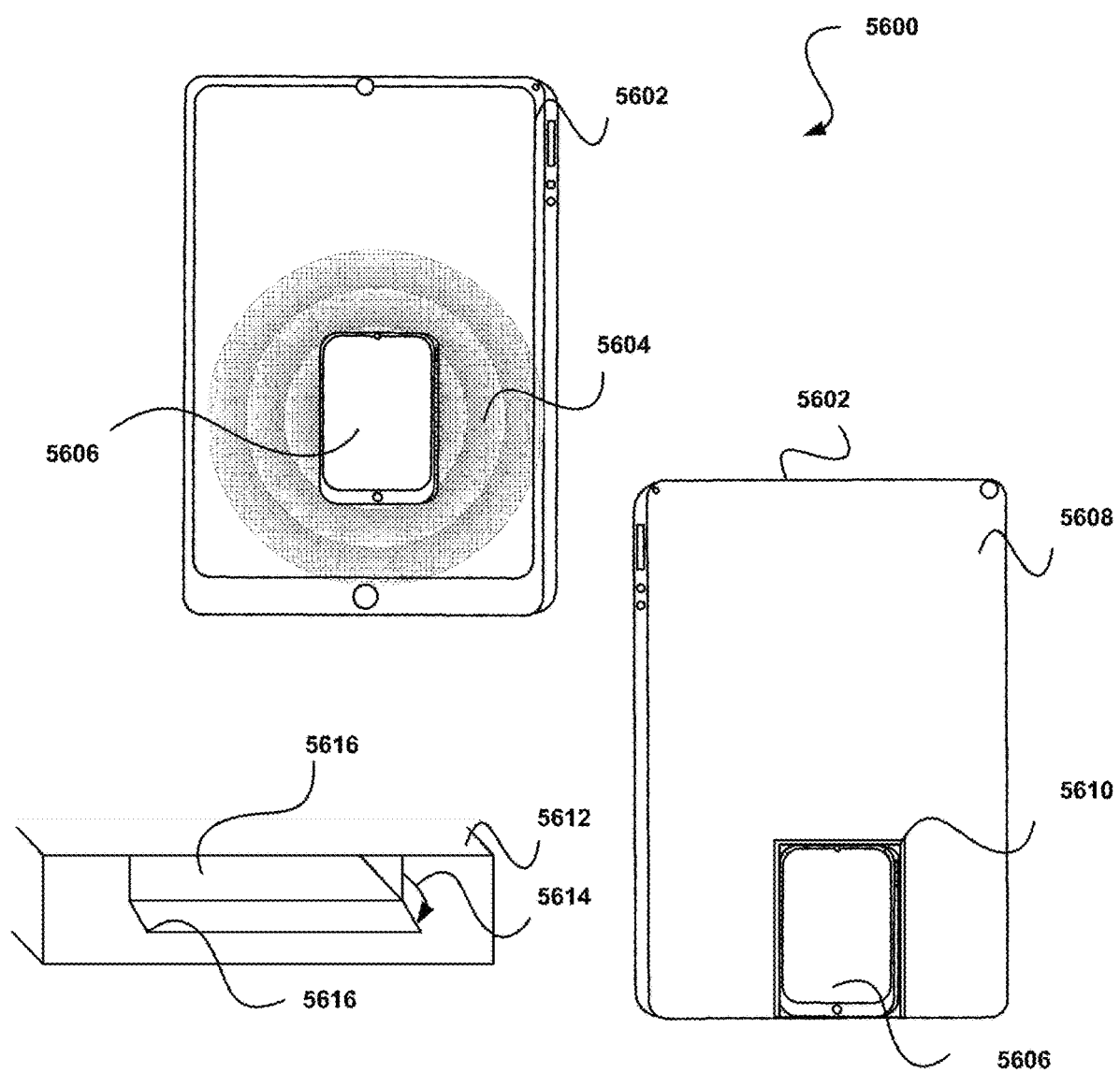
FIG. 56 shows a system integrating a tablet computer and a phone device, in accordance with one possible embodiment.

FIG. 56 shows a system 5600 for integrating a tablet computer and a phone device, in accordance with one possible embodiment. As an option, the system 5600 may be implemented in the context of the architecture and environment of the previous Figures or any subsequent Figure(s). Of course, however, the system 5600 may be carried out in any desired environment. It should also be noted that the aforementioned definitions may apply during the present description.

As shown, a tablet computer 14x02 and a phone device 14x06 may be included. The tablet computer may include object recognition 5604. The back face of the tablet computer 5608 may include a dock or pouch 5610 for the phone device 5606. Additionally, a slot 5616 may be located on one of the sides of the tablet computer 5612, and may include a lid 5616 which may be opened 5614 so that the phone device may be inserted.

In one embodiment, the tablet computer may sense a phone device. For example, the display may see (e.g. sense, determine that something has been placed on it, etc.) the object and respond appropriately. In some embodiments, the tablet computer may distinguish between hands, fingers, and objects placed on the screen.

Additionally, in various embodiments, an object may be identified by an identification tag. For example, a user may register an object (e.g. define and associate characteristics seen by the tablet computer to an object, etc.). In other embodiments, an object may be identified without an identification tag. For example, an object may be identified without an identification tag by placing the object on a surface which identifies the object using sensors which gather characteristics associated with the object. In various embodiments, by identifying characteristics, such as weight, area, temperature, geometric shape, characteristic markings, or the like, an object may be directly or indirectly identified. Once the object is identified, audio, video, a combination of audio and video, text, graphical images, pictures, and/or the like, information may be displayed to the user.

Further, in another embodiment, an indication (e.g. a light turns on, etc.) by the tablet computer may be given once an object has been placed on the surface of the tablet computer. After placing the object on the surface, a data structure database may be searched (e.g. in cases where a tag is not associated with the object, etc.) to determine the existence of a single object with physical characteristics that matches the plurality of physical characteristics. Responsive to a match either by tag matching or based off of data structure match, the tablet computer may then determine if the single object has an associated presentation or preconfigured settings to be applied (e.g. when a phone device is placed on a tablet computer, a business card may be exchanged between the two devices, etc.). Of course, the sensing of the phone device on the tablet computer may cause either device to perform in any manner. In some embodiments, the devices may perform based on preconfigured settings. In other embodiments, the devices may be configured (e.g. settings to apply, etc.) after the phone device has been seen or sensed by the tablet computer.

In some embodiment, the tablet computer may include a dock or pouch for the phone device. In various embodiments, the dock or pouch may include a port by which the tablet computer may establish communication to the phone devices. In one embodiment, the port may also permit the tablet computer to recharge the phone device, and/or otherwise provide power to the phone device. Additionally, in some embodiments, the dock or pouch may include a cover over the phone. In other embodiments, where the phone is securely mounted into the tablet computer, a cover may not be necessary to assist in securing the phone, but may nonetheless be provided to protect the phone (e.g. the tablet computer may be laid down and may thereby potentially scratch the surface of the phone device, etc.).

Additionally, in one embodiment, the tablet computer and the phone device may establish communication through a port located in the dock or pouch. In some embodiments, the tablet computer and the phone device may rely on a short-range communication (e.g. Bluetooth, Near Field Communication, ZigBee, etc.) to establish communication between the two devices.

In another embodiment, the tablet computer may include a slot for receiving the phone device. In various embodiments, the slot may include a port by which the tablet computer may establish communication to the phone devices. In one embodiment, the port may also permit the tablet computer to recharge the phone device, and/or otherwise provide power to the phone device. Additionally, in one embodiment, the tablet computer and the phone device may establish communication through a port located in the slot. In some embodiments, the tablet computer and the phone device may rely on a short-range communication (e.g. Bluetooth, Near Field Communication, ZigBee, etc.) to establish communication between the two devices. Additionally, in some embodiments, the slot may include a cover to protect both the tablet computer (e.g. debris entering the inside of the device) and the phone device.

Figure 57:
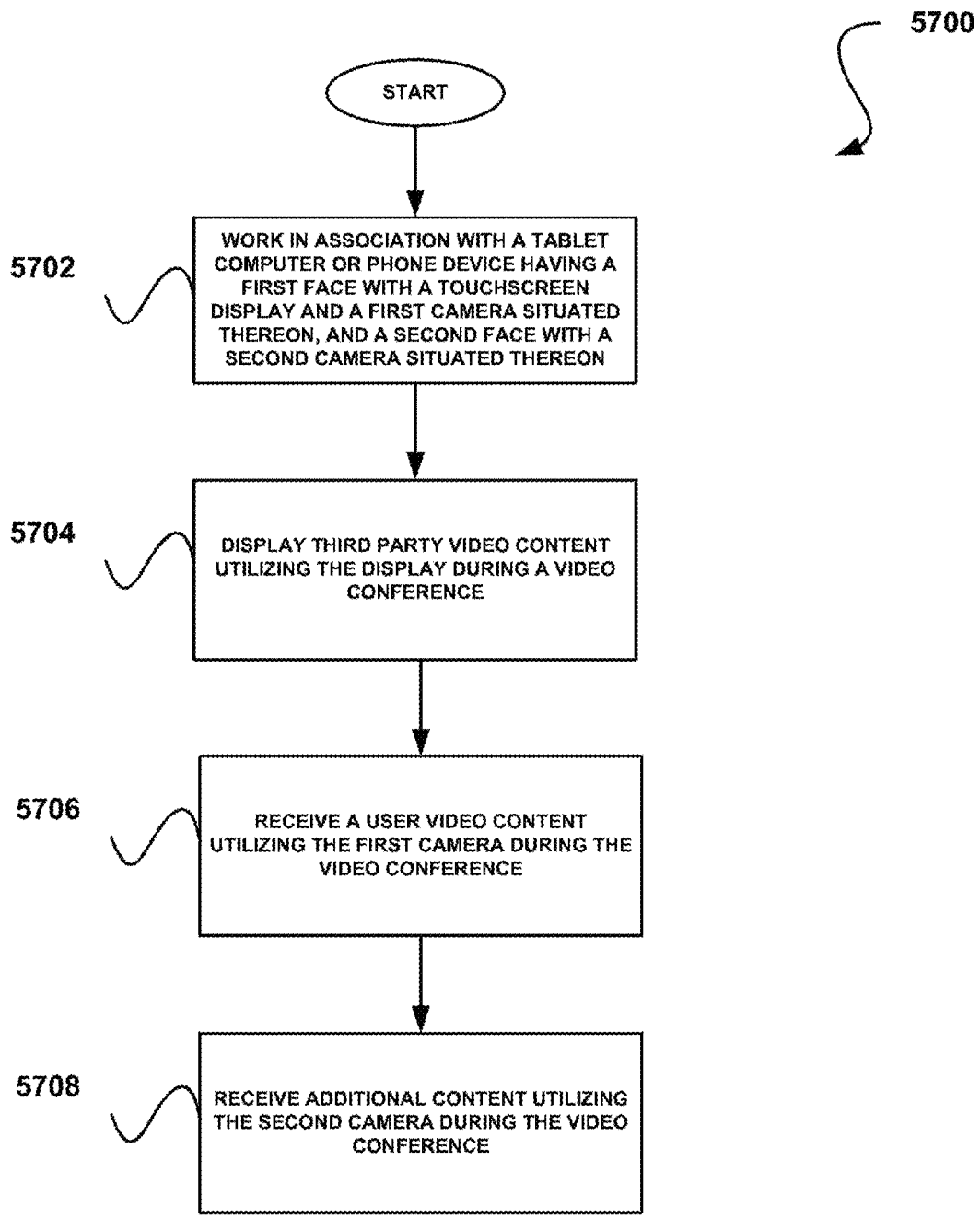
FIG. 57 shows a method for applying dual camera use during a video conference, in accordance with one possible embodiment.

FIG. 57 shows a method 5700 for applying dual camera use during a video conference, in accordance with one possible embodiment. As an option, the method 5700 may be implemented in the context of the architecture and environment of any subsequent Figure(s). Of course, however, the method 5700 may be carried out in any desired environment.

As shown, a tablet computer or phone device having a first face with a touchscreen display and a first camera situated thereon, and a second face with a second camera situated thereon, work in association with a computer readable medium. See operation 5702. In the context of the present description, a face refers to a surface.

Further, in the context of the present description, a tablet computer refers to any portable computer shaped and/or sized like a tablet. For example, in one embodiment, the tablet computer may include a personal digital assistant (PDA), a laptop personal computer with a rotatable touchscreen, a tablet (e.g. Apple i-pad, Microsoft Slate, etc.), and/or any other portable computer equipped with a touchscreen. In another embodiment, the tablet computer may include a cellular phone, or any other mobile device.

In the context of the present description, a phone device refers to any apparatus that is portable and provides telephonic functions. For example, in various embodiments, a phone device may include a cellular phone, smart phones, an IPHONE, a BLACKBERRY, a PDA, a hand held computer, a tablet computer, or any apparatus that is portable and may provide telephonic functions. In addition, in some embodiments, a phone device may include any device capable of receiving broadband access through a UTMS, CDMA, GSM EDGE, WIMAX, LTE, or LTE Advanced system, or any other mobile telecommunication broadband system.

In one embodiment, the phone device may include a device with cellular phone capabilities. In another embodiment, the phone device may include a short-range wireless communication protocol headset. In the context of the present description, short-range wireless communication protocol headset may refer to any wireless protocol that functions at a short-range. For example, in one embodiment, the short-range wireless communication protocol may include Wireless USB, Bluetooth, Wi-Fi, or any other wireless protocol which may function at a short-range. Additionally, in various embodiments, the tablet computer or phone device may include the tablet computer, and the tablet computer or phone device may include the phone device.

In the context of the present description, a touchscreen display refers to a display which may receive a touch input. For example, the touchscreen display may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen. Additionally, the touchscreen display may use LCD (liquid crystal display) technology, or LPD (light emitting polymer display) technology, although other display technologies may be used in other embodiments.

As shown, third party video content is displayed utilizing the display during a video conference. See operation 5704. In the context of the present description, third party video content may include any video content not provided by the user of the tablet computer or phone device. For example, in one embodiment, third party video content may include a video feed from another device, a webcam, a webinar, and/or any other video content. In various embodiments, the third party video content may provide a live content stream or a previously recorded content stream.

Additionally, in the context of the present description, a video conference may include allowing two locations to interact via video and audio transmissions simultaneously. For example, a video conference may provide the look and feel of a face-to-face conference. In one embodiment, a video conference system may include a pair (or more) of specially-configured video conference studios where each includes seating places for multiple persons facing one or more video conference displays. One or more video conference cameras may take images of the persons in each room, and provide the respective images to corresponding video displays in the other video conference studios, wherever they are located. As such, the participants may see and hear the other participants as if they were all together in the same room. Of course, the video conference may occur in any location.

As shown, a user video content is received utilizing the first camera during the video conference. See operation 5706. In the context of the present description, a user video content refers to video content originating from the user. For example, the user video content may include a live video feed, a recorded video, a saved webinar, and/or any video content originating from the user.

As shown, additional content is received utilizing the second camera during the video conference. See operation 5708. In the context of the present description, additional content may refer to any transmittable media. For example, additional content may include files, graphics, sounds, text, videos, and/or any other types of media forms. Additionally, the additional content may be transmitted as a saved file or via a live stream (e.g. video webcam, etc.). In another embodiment, the additional content may include a still picture, an additional video, and/or any other transmittable media.

In one embodiment, additional content received utilizing the second camera may be received simultaneously while the user video content is received utilizing the first camera. Further, additional content may be transmitted for enabling the additional content to be displayed simultaneously with the user video content on a third party device.

Of course, the various embodiments set forth herein may be implemented utilizing hardware, software, or any desired combination thereof. For that matter, any type of logic may be utilized which is capable of implementing the various functionality set forth herein.

More illustrative information will now be set forth regarding various optional architectures and features with which the foregoing techniques discussed in the context of any of the present or previous figure(s) may or may not be implemented, per the desires of the user. For instance, various optional examples and/or options associated with working in association with a tablet computer or phone device having a first face with a touchscreen display and a first camera situated thereon, and a second face with a second camera situated thereon 5702, displaying third party video content utilizing the display during a video conference 5704, receiving a user video content utilizing the first camera during the video conference 5706, receiving additional content utilizing the second camera during the video conference 5708, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 58:
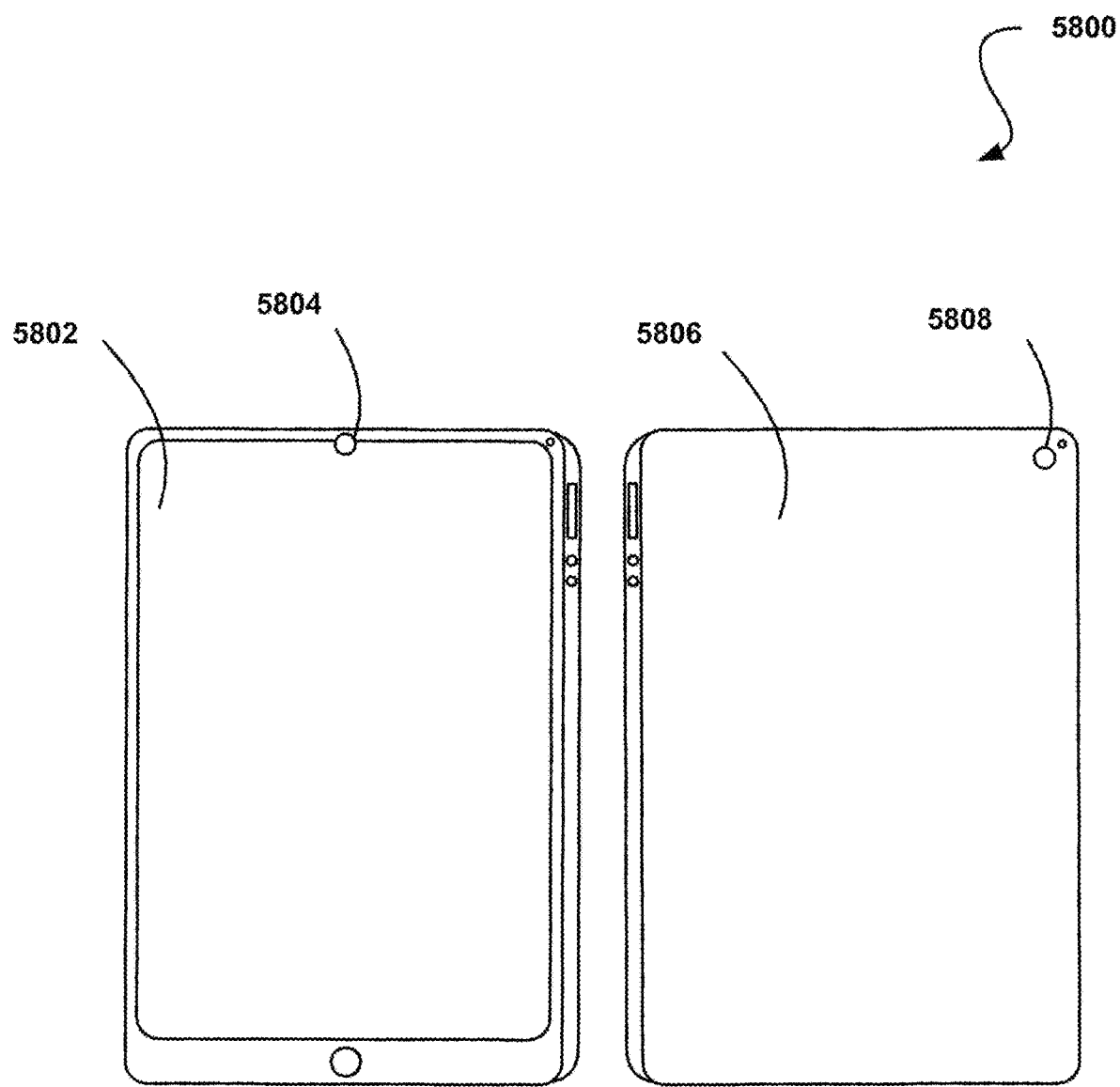
FIG. 58 shows a device having dual camera use, in accordance with one possible embodiment.

FIG. 58 illustrates a device 5800 having dual camera use, in accordance with one possible embodiment. As an option, the device 5800 may be implemented in the context of the architecture and environment of the previous Figures or any subsequent Figure(s). Of course, however, the device 5800 may be implemented in any desired environment. It should also be noted that the aforementioned definitions may apply during the present description.

As shown, a first face with a touchscreen display 5802 may be included. A first camera located on the first face 5804 may be included. Additionally, a second face 5806 with a second camera 5808 may be included.

In one embodiment, the touchscreen display may provide a device with two cameras that can take pictures and videos. In one embodiment, the device may (1) display the captured picture images and video images, (2) store the captured images for later transmission to another device, (3) transmit the captured images to one or more devices during a real-time communication session between the users of the devices, and (4) encode the captured images for local storage or for transmission to another device. For example, a real-time communication session that involves the transmission of the captured video images may be a video conference. In some embodiments, the device may transmit one camera's captured video images at any given time during a video conference. In other embodiments, however, the mobile device may transmit captured video images from both of its cameras simultaneously during a video conference or other real-time communication session.

In various embodiments, the devices may generate composite displays that include simultaneous display of multiple videos captured by multiple cameras of one or more devices. In some cases, the composite displays may place the videos in adjacent display areas (e.g., in adjacent windows). In other cases, the composite display may be a picture-in-picture (PIP) display that includes at least two display areas that show two different videos, where one of the display areas may be a background main display area and the other may be a foreground inset display area that overlaps the background main display area. Of course, other composite PIP displays that have the foreground inset display area overlapping, but not entirely inside, the background main display area, may be possible.

In addition to transmitting video content during a video conference with another device, the mobile device of some embodiments may transmit other types of content along with the conference's video content. For example, such other content may include low or high resolution picture images that are captured by one of the device's cameras, while the device's other camera may capture a video that is used in the video conference. Other examples of such other content may include (1) files and other content stored on the device, (2) the screen display of the device (i.e., the content that is displayed on the device's screen), (3) content received from another device during a video conference or other real-time communication session, etc.

In some embodiments, the devices may employ novel in-conference adjustment techniques for making adjustments during a video conference. For example, in one embodiment, while transmitting only one camera's captured video during a video conference, the device of some embodiments may dynamically switch to transmitting the video captured by another camera. In other embodiments, the device may notify any other device participating in the video conference of this switch so that the other device can provide a smooth transition on its end between the videos captured by the two cameras.

Additionally, in various embodiments, the request to switch cameras not only may originate on the "local" device that switches between its cameras during the video conference, but also may originate from the other "remote" device that is receiving the video captured by the local device. Of course, allowing one device to direct another device to switch cameras may be just one example of a remote control capability of the devices of some embodiments. Examples of other operations that can be directed to a device remotely in some embodiments may include exposure adjustment operations (e.g., auto-exposure), focus adjustment operations (e.g., auto-focus), etc.

In one embodiment, in-conference adjustment may involve real-time modifications of video displays that are generated by the devices. For example, in some embodiments, the real-time modifications of the composite video displays may involve moving one or more of the display areas within a display in response to a user's selection and movement of the display areas. In other embodiments, the video displays may be rotated on the display during a video conference. Also, the device of some embodiments allow the user of the device to flip the order of videos in a PIP display (i.e., to make the video in the foreground inset display appear in the background main display, while making the video in the background main display appear in the foreground inset display).

In different embodiments, the video conference client may be an application that may use the video conferencing functions of the video conference module (i.e. capabilities for video conference, etc.) such as a video conferencing application, a voice-over-IP (VOIP) application (e.g., Skype, etc.), an instant messaging application, and/or any other application which may use, at least in part, aspects of the video conferencing functions. In some embodiments, the video conference client may be a stand-alone application while in other embodiments the video conference client may be integrated into another application. For example, in one embodiment, the video conference client may be integrated to work in conjunction with a social networking (e.g. Facebook, etc.) site or application whereby social networking users may interact via a video conference.

Additionally, in some embodiments, the device with dual camera use may make a request and respond to a request for a video conference. For example, in one embodiment, the video conference request may start when the video conference client (or any application which may use the video conferencing resources, etc.) receives a request from a user of the first device to start a video conference with a second device. The video conference client may receive the request to start the video conference when the user of the first device selects a user interface (UI) item of a user interface displayed on the first device.

Figure 59:
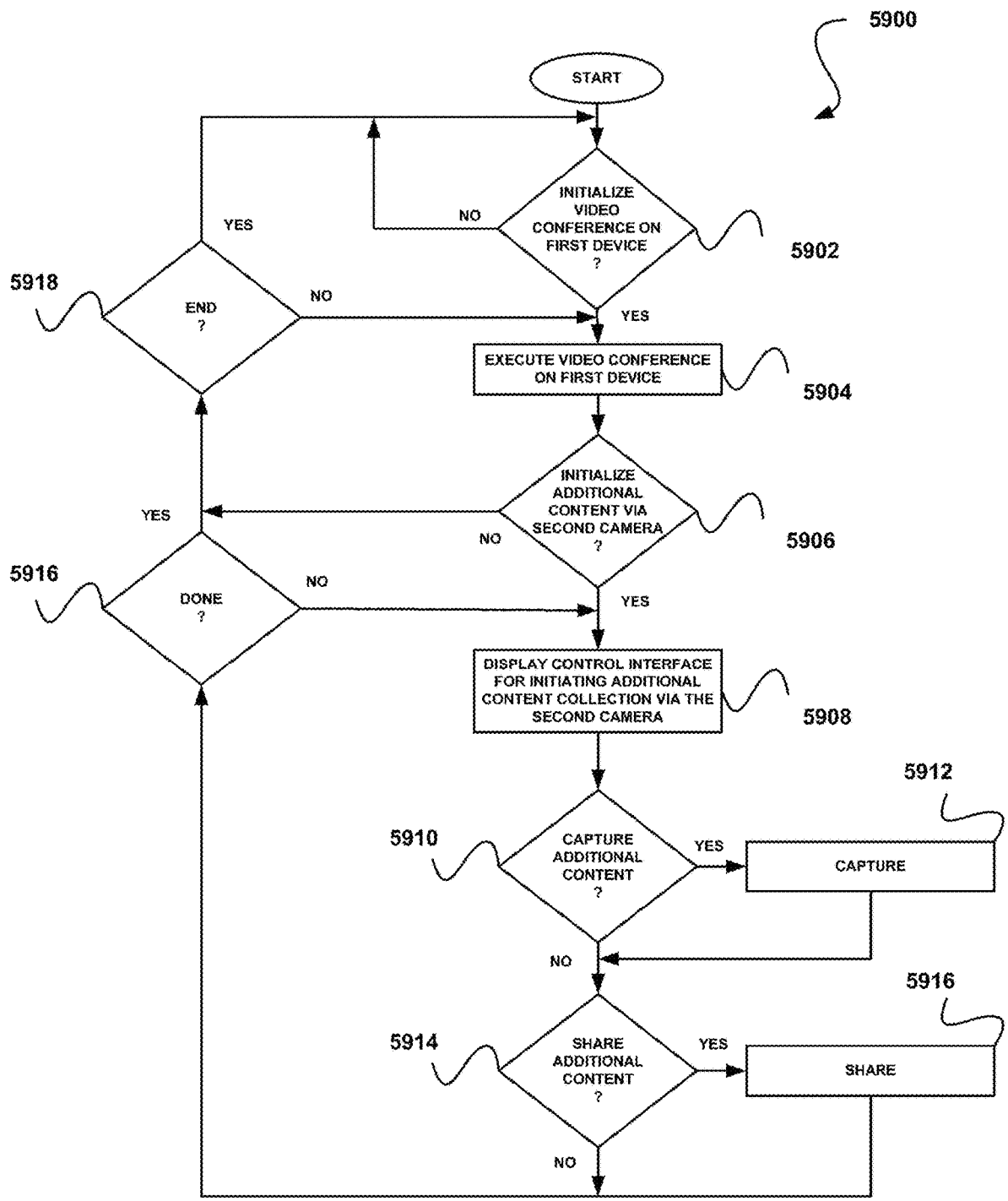
FIG. 59 shows a method for executing a video conference with a dual camera use, in accordance with one possible embodiment.

FIG. 59 shows a method 5900 for executing a video conference, in accordance with one possible embodiment. As an option, the method 5900 may be implemented in the context of the architecture and environment of the previous Figures or any subsequent Figure(s). Of course, however, the method 5900 may be carried out in any desired environment. It should also be noted that the aforementioned definitions may apply during the present description.

As shown, it is first determined to initialize a video conference on a first device. See decision 5902. In one embodiment, a first device may call a second device and add on a video function. In another embodiment, the devices may automatically add on a video function if it is determined that both devices are video capable. Additionally, the user of each device may specify in the settings of the device whether the device should automatically add a video feed if it is available.

In one embodiment, the level of security may determine whether to initialize a video conference on a first device. For example, the first device may communicate with a base transceiver station which may contain equipment for transmitting and receiving of radio signals (transceivers) from a communication tower. The base transceiver station may also have other equipment for encrypting and decrypting communication with the Base Station Controller. In one embodiment, if a user successfully passes through a set level of security protocols, the user may be permitted to directly initialize a video conference with a second device. In another embodiment, a first device may have a key or permission id by which a video stream may be automatically commenced with a second device.

In another embodiment, the first device may initiate the video conference by establishing a reliable connection (i.e. broadband connection) with a mobile network. For example, the mobile network may be a CDMA2000, W-CDMA, UMTS, UTRAN, or FOMA mobile network. A packet data serving node may act as a connection point between the Radio Access and Internet Protocol (IP) networks. The packet data serving node may be responsible for managing Point-to-Point Protocol (PPP) sessions between the mobile device's core IP network and the mobile device. A home agent may be a router located in a home network of the mobile device which may allow a mobile device to connect to the Internet or data network by assigning an IP address. The home agent may forward packets to an appropriate network when a mobile device is away from its home area or home network. In one embodiment, a video conference may be initialized by connecting to a reliable wireless network. As such, the first device may initialize a video conference on a first device by connecting to a mobile network or to a home network, and/or any other type of data streaming network.

In one embodiment, the video conference may be initialized on a first device by working in conjunction with a mobility manager. In the context of the present description, a mobility manger refers to a system that may maintain a state of sessions being directed from the network. The mobility manger may manage a handoff of a session based on various pre-handoff conditions. For example, in one embodiment, a first condition may be based on the signal strength from the base stations to the mobile devices. The mobility manager may average the signal strength and can make the condition positive for a handoff based on preconfigured threshold limits. A second condition, in another embodiment, may use a time-sampling algorithm to detect the length the signal strength remains at or above a predetermined threshold before making the condition positive for the handoff. In a further embodiment, a third condition may be based on the reservation of appropriate channel bandwidth. For example, once the channel bandwidth has been reserved, the mobility manager may consider the condition to be positive (i.e. permissible to establish a video conference). The handoff may be accomplished based on a make and break model where the second session to the new access network and/or device is first initiated by the network, and for an instance in time there may be two active sessions for that mobile device. On the confirmation of a successful establishment of the second session, the first session may be terminated.

In another embodiment, the mobility manager may also be configured with business rules or policies to initiate the handoff if there is a loss of signal. For example, the mobility manager may be configured to handoff to an available access network with a lower delivery cost such as WiFi or 4G for example. In order to facilitate a successful handoff, the media manager may buffer the media transactions occurring during the handoff process (the first session) so that users do not experience a disruption of their services (e.g., during a video session where there's a loss of media that may result in pixilation, etc.).

In various embodiments, a resource manager may assist in initializing a video conference on a first device. For example, the resource manager may provide the ability to reserve resources (e.g. bandwidth, etc.) by manipulating the frequency spectrum of any wireless access technology. In one embodiment, such access technologies may include, but are not limited to, IEEE 802.11, IEEE 802.15, 802.16. Of course, any wireless access technology may be manipulated.

In another embodiment, the resource manager may accomplish the reservation of resources by monitoring the available usage in a particular channel associated with various wireless frequency spectrum agnostics of the underlying wireless technology being used. The resource manager may also be configured to ensure that higher priority traffic gets assigned a pipe of bandwidth within the channel without affecting the other traffic traversing the channel. The resource manager may also ensure that media is transcoded to a proper codec for all end points (devices within a session) when sessions are handed off to other access networks that may provide higher bandwidth capabilities. As such, a resource manager may assist in initializing a video conference on a first device.

In a further embodiment, a first device and a second device may each call into a video server service, thereby enabling the devices to connect and share a video stream. Such a video server service may include a wide range of functions for multimedia resources. For example, functions may include a provision of resources to be controlled by the MRFC, a mixing of incoming media streams, a sourcing media streams (for multimedia announcements), and a processing of media streams. Of course, any mechanism may be used to initialize a video conference on a first device.

As shown, if a video conference on a first device is initialized, then a video conference on a first device may be executed. See operation 5904. In one embodiment, an application on the first device may execute a video conference on a first device. For example, the application may connect the first device to a second device. In another embodiment, the application may automatically connect the first device to the second device automatically. For example, the application may save a username and password of the user of the first device and may use such information to connect the first device to a second device. Of course, any login identification may be saved and used by the application. In another embodiment, the application may request additionally information from the user (e.g. name to be displayed, initial size of camera screens, additional security protocols, etc.) before connecting the first device to the second device.

In one embodiment, a video conference may be executed on a first device by a video conference server. For example, a video conference server may include a processor, an input module, and an output module. Each processor of a video conference client may execute a video conference client application that allows video conference clients (e.g. first device, second device, etc.) to exchange audiovisual data with each other via the video conference server. In one embodiment, the processor of the video conference server executes a video conference server application.

As shown, it is determined whether to initialize additional content via the second camera. See decision 5906. In various embodiments, many mechanisms exist by which the additional content may be initialized. For example, in one embodiment, the user on the first device may be presented with a list of additional content (e.g. second camera, voice recorder, device sensor, etc.) which the user on the first device may select. In another embodiment, the user on the second device may initialize the additional content. For example, the user on the second device may initialize a second camera, connect in another person to the video conference, record the conversation, record the video conference, and/or provide any additional content which is available because of the second camera. In one embodiment, one or both of the users may have the ability to record the video conference (e.g. video and audio, etc.) such that the video conference is stored in the cloud. Additionally, in one embodiment, one or both of the users may have the ability to record the video conference (e.g. video and audio, etc.) such that the video conference is stored on a remote database. Further, in one embodiment, one or both of the users may have the ability to record the video conference (e.g. video and audio, etc.) such that the video conference is stored locally.

In one embodiment, two devices may coordinate to determine which device is to store the video conference. For example, in one embodiment, the amount of resources available on a device (e.g. processing capability, memory, etc.) may be utilized to determine which device should store the video conference. Further, in one embodiment, the coordination may include storing a portion of the video conference on one device and another portion of the video conference on another device. For example, in one embodiment, a first number of minutes or seconds of the video conference may be stored on a first device and a second number of minutes or seconds of the video conference may be stored on a second device (e.g. to split the load on each device, etc.). In one embodiment, the portions of the video conference may be accessible by either device.

In one embodiment, the video conference may be stored on more than two devices in a distributed manner. Further, in one embodiment, the devices may be able to seamlessly access the entire video conference by receiving streaming data from the other devices.

In one embodiment, the additional content via the second camera may be initialized by a server. For example, the server may identify additional content available from the second camera (e.g. live stream, taped recording, saved images, etc.), and, based on preconfigured settings set by the user, automatically initialize such content. For example, the server may identify a web camera within a set proximity of the first device and may automatically use the web camera as the main additional content input for the video conference. In a further embodiment, the initialization of additional content by the server may be automatic. In another embodiment, the server may prompt the user of the first device, and/or the user of the second device if it is desired to connect additional content available via the second camera.

For purposes of simplicity, a first device and a second device are discussed. However, any number of devices may be connected and any additional content available on any of the devices may be initialized. Of course, in such a configuration, security parameters and preconfigured user settings may determine the level of access one device has to another, as well as the level of control one device has over another.

In another embodiment, the video conference may function in a presentation mode. In such a mode, the video conference participants (e.g. user of device 1, user of device 2, etc.) may employ a video conference application to log in to a video conference server. After login, one of the video conference participants may choose to become a presenter, and so may employ the video conference application to request presenter status. For example, the display of each video conference participant may display a control bar having a button to request presenter status. The control bar may include a plurality of control buttons. For example, in one embodiment, a control button, when activated, may cause an output module to send an action command requesting presenter status to the video conference server. In response to the action command, the video conference server may grant presenter status to the requesting participant. In another embodiment, multiple participants may request presenter status contemporaneously. In such cases, the video conference server may arbitrate to determine to which participant presenter status should be granted.

Once a presenter has been selected, one of the other video conference participants may then choose to become a director, and may employ the video conference client to request director status. In one embodiment, director status may be available to any participant with appropriate rights at the start of the videoconference. In the context of the present description, director status refers to an ability to control the displays and additional content of other participants' devices. Once the video conference server has granted director status to a videoconference participant, the status may remain with that participant until that participant releases it or departs the videoconference.

In one embodiment, the control bar may include a control button that, when activated, causes an action command requesting director status to be sent to videoconference server. Alternatively, a participant may use a settings window of his video conference application to request director status. In one embodiment, a settings window on a user's device may include a "Start Controlling" button which, when selected, causes an output module to send an action command requesting director status to the video conference server. Of course, any command button may be preconfigured or set to send an action command requesting director status to the video conference server.

Upon receiving the action command, the video conference server may grant or reject the request for director status. In one embodiment, rejection may occur when a director status has already been assigned, or when requests are received from multiple participants. In the case of multiple requests, the video conference server may select one of the requests based on priority, order of receipt of the requests, or any other policy, and may grant the selected request while rejecting the others. In another embodiment, rejection may also occur if the videoconference does not allow directors, if the requesting participant is not allowed to become a director due to server-configurable user access rights, and/or any other policy set by the server or the participants.

When a participant is granted director status, videoconference server may notify the other video conference participants of the change in status. The user interfaces of the video conference applications may react to the notification. For example, the "Start Controlling" button in the settings window, and a "Start Directing" button in the control bar, may be changed to appear disabled to the non-director participants, and may be changed to "Stop Controlling" and "Stop Directing" functions for the director participant. In another embodiment, other visual markers identifying the director participant may also appear within the videoconference client application user interfaces for the meeting participants. For example, the color of the director's name or iconic representation as displayed in an interface component may change to reflect the director status.

In one embodiment, each video conference participant's application may maintain the identity of the last director assigned in the video conference, and may notify the user when a change occurs. As such, if a particular participant becomes a director, releases director status, and regains it again (or otherwise leaves the meeting and rejoins later), other participants may be notified of the participant's director status only once. Of course, if a different participant becomes the director participant, notifications may be sent again. For example, when the director changes, the display modules of the non-director video conference participants' display may include a participant director dialog box.

If it is determined to initialize additional content via the second camera, the control interface for initiating additional content collection via the second camera may be displayed. See operation 5908. In one embodiment, the control interface may be displayed on the first device. In another embodiment, the control interface may be displayed on any other device. The control interface may include functionality relating to the additional content. For example, in one embodiment, the control interface may relate to a second camera and may include buttons such as "enable camera," "take snapshot," "record video," as well as a "settings" button to manipulate the configuration of the camera. Of course, any button may be displayed to the user relating to functions associated with the additional content.

As shown, it is determined to capture additional content. See decision 5910. In various embodiments, the user of the second device may capture additional content manually or automatically. For example, in one embodiment, the device may include a second camera and a photo may be captured by selecting a "take snapshot" button on the control interface of the second device. In another embodiment, the device may be configured to automatically take a photo after a set time period (i.e. a timer) has been selected by the user. Additionally, the timer may repeat continually during the video conference so that snapshots of the second camera are taken at regular intervals. In various embodiments, the control interface of the second device may be displayed and controlled (e.g. user may select "take snapshot" or set a timer and interval to take photos, etc.) on other devices (e.g. first device).

If it is determined to capture additional content, the content may be captured. See operation 5912. In one embodiment, the content may be captured by storing the content in a local cache located on the second device. Additionally, the content may be stored in memory on the second device. In another embodiment, the content may be transferred from the local cache on the second device to the memory of another device. In a further embodiment, the content may be transferred from the local cache on the second device to the memory of a server.

It is determined to share additional content. See decision 5914. In various embodiments, any content may be shared. For example, a podcast, a video, an audio recording, a TV program, or any other content that may be viewed on the second device. Additionally, shared content may include other types of content, such as, for example, one or more links to content (e.g., links to video, podcasts, TV programs, etc.) stored at a remote server. In the context of the present description, a link refers to any reference to content (e.g., a web page, a video file, a podcast, streaming video, etc.). In some implementations, a link may include a Uniform Resource Locator (URL) of content. In another embodiment, if a device or a server contains stored content, a prompt may be given to the user of the device if it is desired to share the additional content.

Additionally, the additional content may be shared manually. In one embodiment, a user may select the additional content to be shared whereupon a prompt is given to the user requesting how the content is to be shared. For example, the prompt may request the manner in which the additional content is to be shared, including, for example, email, push mail, text messaging, media messaging, or any other mechanism which may transfer the additional content to another user. In another embodiment, the prompt may request another manner in which the additional content is to be shared, including, for example, uploading to a server, uploading to a blog, connecting the media to a social networking site, and/or any other server based service. Of course, the server based service may extend beyond a web-based service and include any type of network system by which data may be exchanged.

In a further embodiment, any mechanism may permit the additional content to be shared. For example, in one embodiment, a mechanical button on the device may cause the additional content to be shared. Upon activating the mechanical button, the user may be displayed with a prompt of how the content is to be shared, or the mechanical button may be preconfigured to automatically send the additional content in a set manner (e.g. by email, etc.). In another embodiment, a gesture may be recorded by a camera and used to send the additional content to a preconfigured server. In a further embodiment, when a device is brought within a proximity of another device (e.g. tablet computer, phone device, etc.), the additional content may be automatically shared based off of preconfigured configurations, or manually shared (e.g. bump content to another user, etc.).

In one embodiment, the content may be shared automatically based on a location of the device. For example, in one embodiment, the device location may be determined. In various embodiments, the device location may be determined utilizing GPS, triangulation, an IP address, and/or various other techniques. In one embodiment, once the device location is determined, it may be determined whether the device is in a location that is associated with sharing content. In various embodiments, locations that are associated with sharing content may be determined by the user of the device, an owner of the device, a company associated with the device, an application associated with the device, and/or various other techniques. In one embodiment, if it is determined that the device is in a location associated with sharing, the content may be shared with devices associated with the same location.

Devices that are associated with the same location may be determined in a variety of ways. For example, in one embodiment, system associated with the location may determine which devices are associated with the location. In this case, the system may detect signals from devices, log devices that have been manually or automatically checked in to the location (e.g. utilizing a signal associated with the device, utilizing a bar code associated with the device, etc.), and/or determine which devices are utilizing a network associated with the location, etc.

As shown, if it is determined to share additional content, the content is shared. See operation 5916. Many techniques may be used to share the content. For example, in one embodiment, a device may send the additional content to a central posting server. The content posting server may store the additional content for sharing with users within a designated community of users (e.g., with users operating the video conference application). The content posting server may store any type of content posted by content sharing device including, for example, video files, streaming video, podcasts, DVB-H, images, or links to video files, streaming video, podcasts, images, and/or any content file associated with the device.

In another embodiment, content may be shared by "pushing" the content from the content sharing device to a user device, or to content posting server. In the context of the present description, "pushing" may refer to a method of content delivery to a mobile device whereby the content is automatically delivered without any action being required on the part of the mobile device user. Additionally, the content may be "pulled" directly from the user's device and put on a content posting server. In the context of the present description, "pulling" may refer to a method of content delivery to a mobile device that is initiated by the mobile device requesting the content with or without any action being required on the part of the mobile device user.

In one embodiment, the pushing system may function as a mobile content pushing system which may work simultaneously with several mobile platforms or transport types. For example, the additional content may be pushed using such platforms such as, but not limited to, Research in Motion's (RIM's) Blackberry/BES platform, or another suitable platform. The transport type may be any transport that allows a real time push of content to a mobile device, or any other mechanism that may put the content directly onto the mobile devices over the air. In another embodiment, the mobile content pushing system may push the additional content to a mobile device infrastructure, or it may retrieve the content from a central content storage and then push the content files to the mobile device infrastructure. In another embodiment, if two devices are brought within a preconfigured proximity, one device may automatically or manually push additional content to another device.

Additionally, sharing additional content may be facilitated by establishing a community of users for content sharing. Various techniques may be used for establishing a community of users. For example, a user operating content sharing device may access a "my community" window and select an "add contact" operation. The user may enter an identifier associated with the other user that is desired to be added to the user's community of users. Subsequent to addition of a contact to a user's community of users, the contact may accept or reject addition to the community of users and, if accepted, the user may subsequently share content with that contact.

In one embodiment, a device may download content from a centralized server and may store the content in its memory. For example, a device may download video files, stream a video, stream a podcasts, and/or cause the additional content to be shared in any manner. In some implementations, the stored content may include a link(s) to content viewed at a device. For example, the link(s) may include a uniform resource locator(s) (URLs) associated with the content. In implementations that store links as content, the content downloaded by content sharing device may only be stored temporarily while the content is being viewed by the user. The link(s) associated with the network location of the content, however may be stored on the device for subsequent sharing with the community of users.

In another embodiment, the additional content may be shared through social networking websites and/or related applications. For example, a social networking website may include a web server, an action log, a wall post generator, an email generator, a sharing module, a member profile store, an application data store, a group store, a shared content store, and an event store. In other embodiments, the social networking website may include additional, fewer, or different modules for various applications. Conventional components such as network interfaces, security mechanisms, load balancers, failover servers, and management and network operations consoles may additionally be used to facility and protect the social networking websites and/or related applications.

In one embodiment, the web server may link the social networking website via the network to one or more client devices. The web server may serve web pages, as well as other web-related content, such as Java, Flash, XML, and so forth. The web server may include a mail server or other messaging functionality for receiving and routing messages between the social networking website and the client devices. The messages may be instant messages, queued messages (e.g., email), text and SMS messages, or any other suitable messaging technique that would apply to sharing additional content.

In some embodiments, the social networking websites and/or application may populate an action log with information about member actions to track them. For example, the additional content may be tracked and automatically posted as a member's action. Additionally, the wall post generator may generate wall post messages for members. For example, a message about a new application being available, or that additional content is available, may be posted on a member's wall. The email generator may generate email messages to members, and in some embodiments, may even include the additional content as an attachment.

In a further embodiment, a device may be configured so that all actions may be monitored and recorded by a social networking website and/or application. For example, the social networking website and/or application may maintain data about a number of different types of objects, such as content that is selected, additional content that is recorded and/or captured, actions taken during the video conference, and/or any other action which may be taken by the user. Each object type may have information fields that are suitable for the storing information appropriate to the type of object. For example, the additional content that is recorded may contain data structures that include the time and location for an event. Additionally, actions taken during the video conference may contain data structures with fields suitable for describing a member's profile (e.g. length of time of conference call, participants with which the user interacted, etc.).

The sharing module associated with the social networking websites and/or application may allow the sharing of additional content from external websites and/or servers with members of the social networking website. The sharing module may be capable of receiving a request to share content, retrieving the content from the external website, and storing the content in the social networking website. The shared content store may be used for storing this content, also referred to as shared content. The sharing module may be also capable of formatting the shared content, transmitting the stored content to various destinations in the social networking website, and tracking the shared content. Users which are members of the social networking website and/or application may download the shared content from the website to the device.

In some embodiments, the downloading may be automatic (e.g. pushing) or it may be manual (e.g. once the application is activated and loaded it searches for additional content). In a further embodiment, once content is uploaded by a user, other participants of the social networking website and/or application may receive immediate notifications of the uploaded material. For example, in one embodiment, the users may receive a text message or a wall posting indicating that additional content had been uploaded. Additionally, the uploaded content may be accessible immediately directly from the wall posting, or from another appropriate retrieval service, site, and/or application.

As shown, it is determined if the additional content collection is done. See decision 5916. For example, a server may pull additional content from the device and once it has completed, send an acknowledge message to the device indicating that the uploading of additional content is complete. In another embodiment, if the device has not been activated or used for a set preconfigured time interval, the device may automatically determine that the additional content collection is done.

In one embodiment, the device may prompt the user requesting if additional content collection has completed. This may occur after a set preconfigured time interval of inactivity, or may occur every time additional content completes being uploaded to another device and/or to a server. Of course, any other mechanism may be used to determine if additional content collection is done.

If it is determined that the additional content collection is done, it is determined whether to end the video conference. See decision 5918. For example, in one embodiment, the user may end the video conference by selecting an "end conference" button found on the display of the first device, or on the control interface of the second device. Additionally, in another embodiment, closing the application and/or returning to the home screen of the device during the video conference may cause the video conference to end.

In a further embodiment, other programs may be executed while the video conference is occurring, including but not limited to, browsing the Internet, checking email, weather, stocks, and/or any other application. In one embodiment, applications may be able to interact with the video conference and/or provide input to the video conference. For example, the user may select music playback and have that music output be provided to the video conference. In another embodiment, the user may specify in the settings of the device and/or application the manner in which the video conference may end. For example, a period of inactivity, the invocation of another application, another user ending a video conference, a social networking response signaling the video conference is "bad," a poor data connection, and/or any other feature which may relate to the video conference may be used to end the video conference. Of course, any feature of the device, including sensors, accelerometers, gestures, and/or any other feature may be used to also end the video conference.

In another embodiment, a video conference may be established relying on interaction from a server. For example, in one embodiment, a video conference client may send a video conference request, which indicates a second device as the recipient based on input from the user of the first device, to a video conference server. The video conference server may forward the video conference request to the video conference client of the second device. In some embodiments, the video conference server may forward the video conference request to the video conference client of the second device using push technology. Additionally, the video conference server initiates the transmission of the video conference request to the video conference client of the second device.

In some embodiments, when the video conference client of the second device receives the video conference request, a user interface may be displayed on the device of the second device to indicate to the user of the second device that the user of the first device sent a request to start a video conference and to prompt the user of the second device to accept or reject the video conference request. Additionally, in other embodiments, the user of the second device may accept the video conference request by selecting a (any) user interface item of a user interface associated with the video conference client.

After the video conference server receives the video conference acceptance from the video conference client of the second device, the video conference server forwards the video conference acceptance to the video conference client of the first device. Some embodiments of the video conference server may forward the video conference acceptance to the video conference client of the first device using push technology.

In some embodiments, upon receiving the video conference acceptance, a video conference may be established between the first device and the second device. In different embodiments, the video conference may be established by different methods. For example, in some embodiments, the video conference may be established by negotiating a connection between the first device and the second device, determining a bit rate at which to encode video, exchanging video between the first device and the second device, and/or any other method which may be used to send and receive live video from at least two devices.

Additionally, in one embodiment, the user of the second device may accept the video conference request automatically. For example, in some embodiments, the second device may be configured (e.g., through the preference settings of the device) to automatically accept incoming video conference requests without displaying a UI. Moreover, the user of the second device may also automatically reject the video conference request through preconfigured preference settings of the device. In such cases, in certain embodiments, instead of sending a video conference acceptance, the video conference client of the second device sends a video conference rejection to the video conference server, which forwards the video conference rejection to the video conference client of the first device. The video conference may then never be established.

In some embodiments, a video conference may be initiated based on an ongoing phone call. For example, in one embodiment, while the user of a phone device is engaged in a phone call with a second user, the user may turn the phone call into a video conference with the permission of the other party.

In various embodiments, the user interface associated with the video conference may include a name field, a selection menu, and a selectable UI item. For example, in one embodiment, the name field may display the name of the person on the other end of the phone call, with whom a user would like to request a video conference. The selectable UI item (which can be implemented as a selectable button) may provide a selectable End Call option for the user to end the phone call. The selection menu may display a menu of selectable UI items, such as a Speakerphone item, a Mute item, a Keypad item, a Phonebook item, a Hold item, a Video Conference item, etc. Of course, in other embodiments, the selection menu may be displayed in any manner.

In some embodiments, the front camera may be the default camera selected by the device at the start of a video conference. Additionally, in one embodiment, a live video of the user of the first device may automatically commence once the video conference client is activated. In other embodiments, the user may preconfigure the default camera, the arrangement of the display, and/or any aspect relating to the video conference. In some embodiments, the user of the first device may be allowed to select a second camera as the camera for starting the video conference, configured when the video conference client is activated.

Additionally, in certain embodiments, a user of a first device already having participating in a phone conversation may switch to a video conference. For example, while engaging in a phone conversation, a video conference tool may be selected to activate a voice conference. While waiting for the voice conference client to load, a still image that is stored on the first device may provide a state of the voice conference (e.g., "Conference Being Established," etc.). Voice functionality, relative to the phone conversation, may remain intact while the voice conference loads and connects the two users. Additionally, in some embodiment, the user of the first device may control the voice conference client even while it is loading. For example, an end button may allow the user to cancel entering the video conference and revert back to the phone call if it is decided not to enter the video (e.g., while the user is waiting for the remote user to respond to the request, etc.).

In various embodiments, after the user of the second device accepts a video conference request (e.g. during the telephone conversation, etc.), the display area that displays the video of the local user (that is being captured by the front camera in this example) may gradually decrease in size (i.e., gradually shrinks) so that a live video of the user of the second device may be displayed. For example, in one embodiment, the shrinking of the video of the user of the first device may create a PIP display that has a foreground inset display of the video of the user of the first device and a background main display of the remote user (e.g. user of the second device, etc.). Of course, the display may function in any preconfigured manner (e.g. default settings set by the user, etc.).

In one embodiment, the video conference client may provide command buttons initially displayed as the video conference commences. For example, the command buttons may be selectable buttons initially displayed below the PIP display. In different embodiments, the command buttons may fade away during the video conference, thereby allowing the PIP display to take up the entire display area of the device. For example, the PIP display may include two video displays: a larger background display from the camera from the second device and a smaller foreground inset display from the camera on the first device. The command buttons may then reappear at a single finger tap at the bottom of the display area of the device, giving the user access to all options associated with the command buttons. In some embodiments, the command buttons may include "end conference," "revert to phone conversation," "record conversation," "add participant," and/or any additional function which may control some aspect of the video conference client.

In some embodiments, the arrangement of the display of the video conference client may be customized. For example, in one embodiment, instead of having a larger background display of the user of the second device, the larger background display may be of the local user (e.g. user of the first device) and the smaller foreground inset display of the user of the second device. Further, in other embodiments, a user may switch during a video conference between the local cameras (e.g. camera on the first device, etc.)

and/or remote cameras (e.g. camera on the second device, etc.) as the cameras for the inset and main views in the PIP display. Additionally, in some embodiments, the local and remote videos may appear on the display in two side-by-side display areas (e.g., left and right display windows, or top and bottom display windows) or two diagonally aligned display areas. The manner of the PIP display or a default display mode may be specified by the user through the settings (e.g. preference settings, etc.) of the device or through controls that the user can select during a video conference.

In other embodiments, the command buttons may include a mute button for muting the audio of the other user during the video conference, an end conference button for ending the video conference, a switch camera button for switching cameras, and/or any other function which may relate to some control aspect of the video conference client. The command buttons may be operated by a single finger tap, by toggling a switch on the device, by giving voice commands, and/or by any other method whereby the command buttons may be controlled.

In various embodiments, before a video conference commences, the video conference client may enter a preview mode. For example, after an invited recipient has agreed to join a video conference, a full screen video from the remote device's front camera (e.g. user of the first device, user who initiated the video conference, etc.) may be displayed on the display of the device. In one embodiment, a small preview overlay box may be displayed from the local device's front camera (e.g. user of the second device, user who accepted the video conference, etc.) to confirm that the video is displayed properly (e.g. lighting or color balance is correct, user is satisfied with the image, etc.) before actual transmission of the video from the user of the second device begins.

In one embodiment, the preview overlay box may be displayed for a preconfigured set period of time (e.g. 10 seconds) before the actual transmission begins. In other embodiments, the preview overlay box may require user feedback (e.g. click "begin video conference," etc.) in order for the transmission to begin. In some embodiments, a notation, such as a "Preview" notation, may be displayed below the display area to indicate that the invite recipient is in the preview mode. In other embodiments, after the user has accepted to participate in a video conference, and before the user of the second device has completed accepting the preview, the display of the user of the first device may include "Video Conference Accepted—Awaiting Transmission," or any other text relating to the transmission of the video from the second device.

In a few embodiments, the invited recipient (e.g. user of the second device, etc.) may select the back camera as the default camera for the start of the video conference, or may select the front or back camera at the beginning of the video conference. In other embodiments, the selection of the front or back camera may be a defined parameter set during the "Preview" of the video feed (e.g. user specifies which camera to use, etc.). Of course, in some embodiments, a preview mode may not be included, but rather the video conference may start immediately after the invite recipient (e.g. user of the second device, etc.) accepts the request.

In one embodiment, a video conference may be commenced during a telephone call. In other embodiments, the video conference may be commenced in any manner. For example, a user may look through a contacts list on a device for the person with whom he wants to engage in a video conference, similar to how he would find a contact to call. Additionally, the user may select the person to start a video conference (e.g., through a single finger tap on the person's name, etc.). In other embodiments, the selection may trigger the contact user interface to display the contact's information and various user selectable options, including "telephone," "send email," "text," "video conference," and/or any other function relating to contacting a contact. Additionally, in one embodiment, a user of the first device may select a person to start a video conference by a "Recent" call history that lists a particular number or name of a person with whom the user of the first device recently corresponded (e.g. video conference, phone call, text message, chat, etc.).

In one embodiment, if a video conference has been started during a telephone call, the audio data may be transitioned from one network to another. For example, in some embodiments, during a telephone call, audio data (e.g., voice, etc.) may be transmitted through one communication channel (over a communication network like a circuit-switched communication network or a packet-switched communication network) and, during a video conference, audio data may be transmitted through another communication channel. In such embodiments, audio data (e.g., voice) may be transmitted through a communication channel before the video conference is established, and once the video conference is established, audio may be transmitted through a different communication channel (instead of the communication channel used during the telephone call).

In some embodiments, in order to provide a seamless transition (e.g., handoff) of audio data from the telephone call to the video conference, the telephone call may not be terminated before establishing the video conference. For example, in some embodiments, a peer-to-peer video conference connection may be established before terminating the phone call and starting to transmit audio/video data through the peer-to-peer communication session. Alternatively, in other embodiments, a peer-to-peer video conference connection may be established and start to transmit audio/video data through the peer-to-peer communication session before terminating the phone call and starting to present the received audio/video data.

Additionally, in one embodiment, a peer-to-peer video conference connection of some embodiments may allow the other devices in the video conference to directly communicate with each other (instead of communicating through a central server, for example). In other embodiments, a peer-to-peer video conference may allow the devices in the video conferences to share resources with each other. For example, through a control communication channel of a video conference, one device may remotely control operations of another device in the video conference by sending instructions from the one device to the other device to direct the other device to process images differently (i.e., share its image processing resource) such as an exposure adjustment operation, a focus adjustment operation, a switch camera operation, and/or any other function relating to control of a resource.

Figure 60:
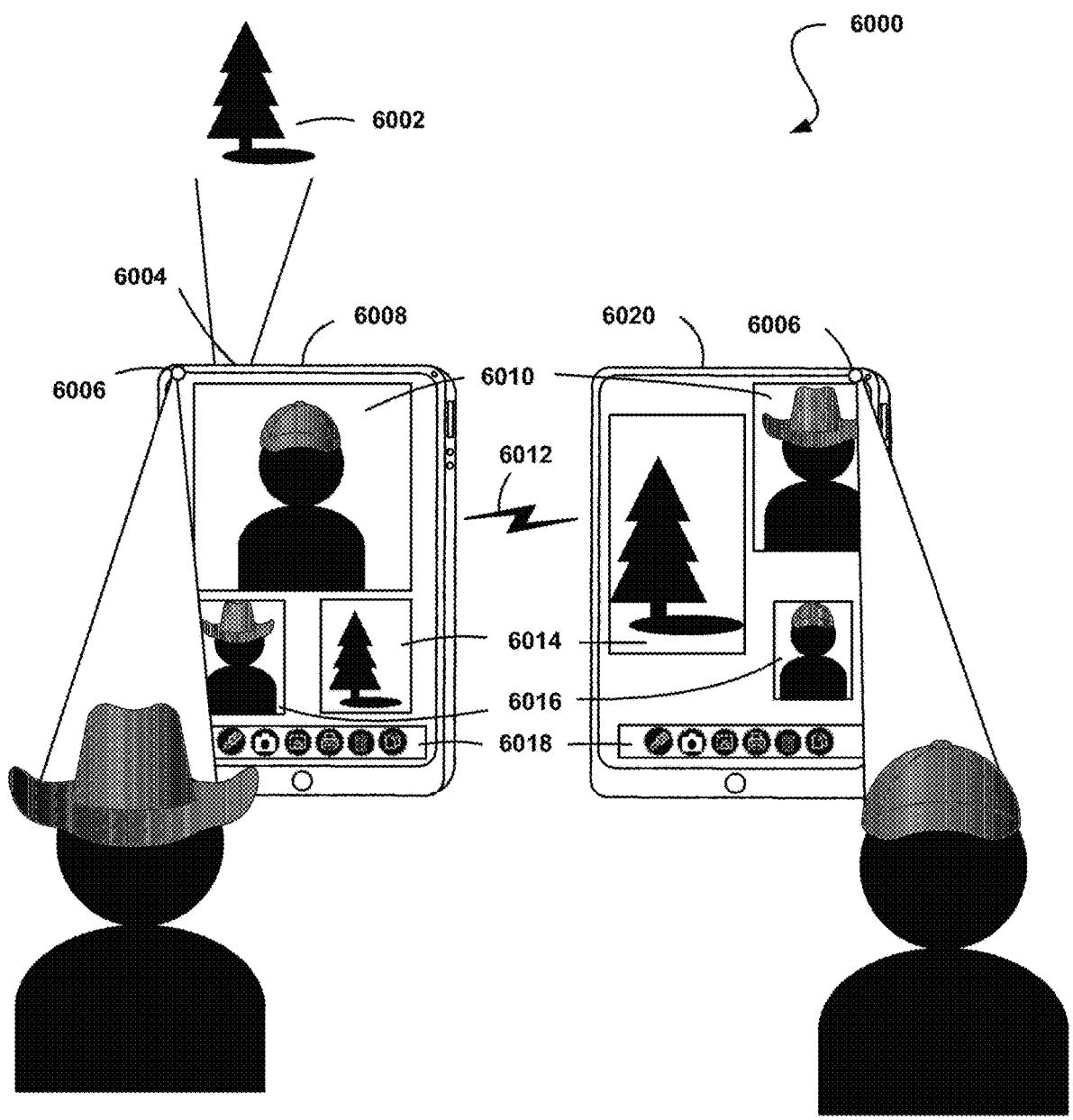
FIG. 60 shows a system for dual camera use during a video conference, in accordance with one possible embodiment.

FIG. 60 shows a system 6000 for dual camera use during a video conference, in accordance with one possible embodiment. As an option, the system 6000 may be implemented in the context of the architecture and environment of the previous Figures or any subsequent Figure(s). Of course, however, the system 6000 may be implemented in any desired environment. It should also be noted that the aforementioned definitions may apply during the present description.

As shown, a first device 6008 and a second device 6020 may be included. Located on the devices may be a set of command buttons 6018. Additionally, the devices may include a camera (i.e. optical sensor) 6006 on the front face of the device and a camera (i.e. optical sensor) 6004 on the rear face of the device. The object being sensed 6002 by the camera on the rear face may be viewed on the touchscreen of the phone device 6014. Additionally, the user of the device 6016 may be displayed, as well as the participant (e.g., user of the second device, etc.) of the video conference 6010 may be displayed. The devices 6008 and 6020 may communicate wirelessly 6012.

In one embodiment, the command buttons may be displayed on the touchscreen display of the device and may include functions such as, but not limited to, "settings," "zoom," "keystone," "brightness," and/or any other control function. Of course, any function may be preconfigured as a command button. In another embodiment, the device may include on the touchscreen a picture of what is being sensed or captured by the camera. For example, in one embodiment, the camera may function as a webcam and may be activated by the proximity sensor. The webcam may feed a live stream whenever an object passes within a certain preconfigured distance of the device. In another embodiment, the camera may function as a video camera and provide a live stream, or may function as a digital camera and take static photos to be sent to the participants on the video conference. Of course, the optical sensor may function in any manner to provide additional content for the video conference.

In other embodiments, the second camera may be added to the video conference to add additional functionality. For example, the second camera may allow users to exchange QR codes (or any other type of code, including, e.g., UPC, EAN, etc.), activate camera-dependent applications (e.g. a night sky application that allows the user to point the camera at the sky and be informed of what planet, constellation, star, etc. the camera is pointed at, a traveling application that may allow the user to point the camera at an object and be informed of what the object is, etc.), take a photo, interact by a game, and/or add any additional content functionality to the video conference.

In various embodiments, any additional content may be added to the video conference (e.g. microphone, whiteboard, heat sensor, etc.). For example, in one embodiment, a microphone may be used to provide a live audio stream for the video conference, a whiteboard application (available on one of the participant's device) may be used for collaboration between the participants, a heat sensor peripheral device may be used to provide a live heat sensing video stream for the video conference, and/or any type of peripheral and/or application may be added to the video conference to provide additional functionality. Additionally, the additional content may be transmitted for enabling the additional content to be displayed simultaneously with the user video content on a third party device.

In another embodiment, the spatial arrangement of the command buttons and of the picture of what is being projected, may be enlarged or rearranged. For example, the command buttons may be grouped together in a rectangle format (two columns of buttons), or stretched along the bottom of the display on one row. In another embodiment, the picture of what is being projected may be enlarged or minimized. Alterations to the size may be accomplished by dragging the border of the frame to the desired height and width.

In a further embodiment, if the picture what is being projected is enlarged, the command buttons may be automatically resized and/or reduced in size. For example, as the picture of what is being projected is enlarged, the grouping of the command buttons may switch to another part of the screen where there is room to accommodate the grouping of the command buttons, or the command buttons may be reduced in number so that only a few buttons are displayed to accommodate the larger display of what is being projected. Of course, if the command buttons are resized the picture of what is being viewed may automatically also be resized.

In another embodiment, the user of the device may alter spatial arrangement on the screen by voice commands. For example, the user may state "minimize command buttons" or "maximize viewfinder" which would cause the picture of what is being viewed to take up the entire screen of the device. The user may also state "default view" to return the arrangement of the objects (e.g. picture of what is being viewed and the command buttons) to a default arrangement. In another embodiment, if the picture of what is being viewed takes up the entire screen, the command buttons may reappear whenever the user taps the screen, pushes a mechanical button, speaks a command, or otherwise performs some preconfigured action to cause the buttons to reappear.

In one embodiment, the video box of the user of the device, the additional content box, and the video box of another participant of the video conference, may be rearranged as well as resized as desired, as described above. As such, the arrangement of what is displayed on the screen may be customized and/or altered. In some embodiments, a video stream may not be accessible (e.g. no camera on second device, malfunctioning camera, etc.), or due to decreased bandwidth, the quality of the video may fall below a preconfigured threshold. In such instances, a static image of the user may be sent to other devices. Such an image may be linked to the user's account (e.g. default image, etc.) so that any and all devices which connect to that user's device will view the same static image. Of course, use of the static image may be intended as a temporary replacement, as a focus of the video conference may be to provide two simultaneous video streams.

Figure 61:
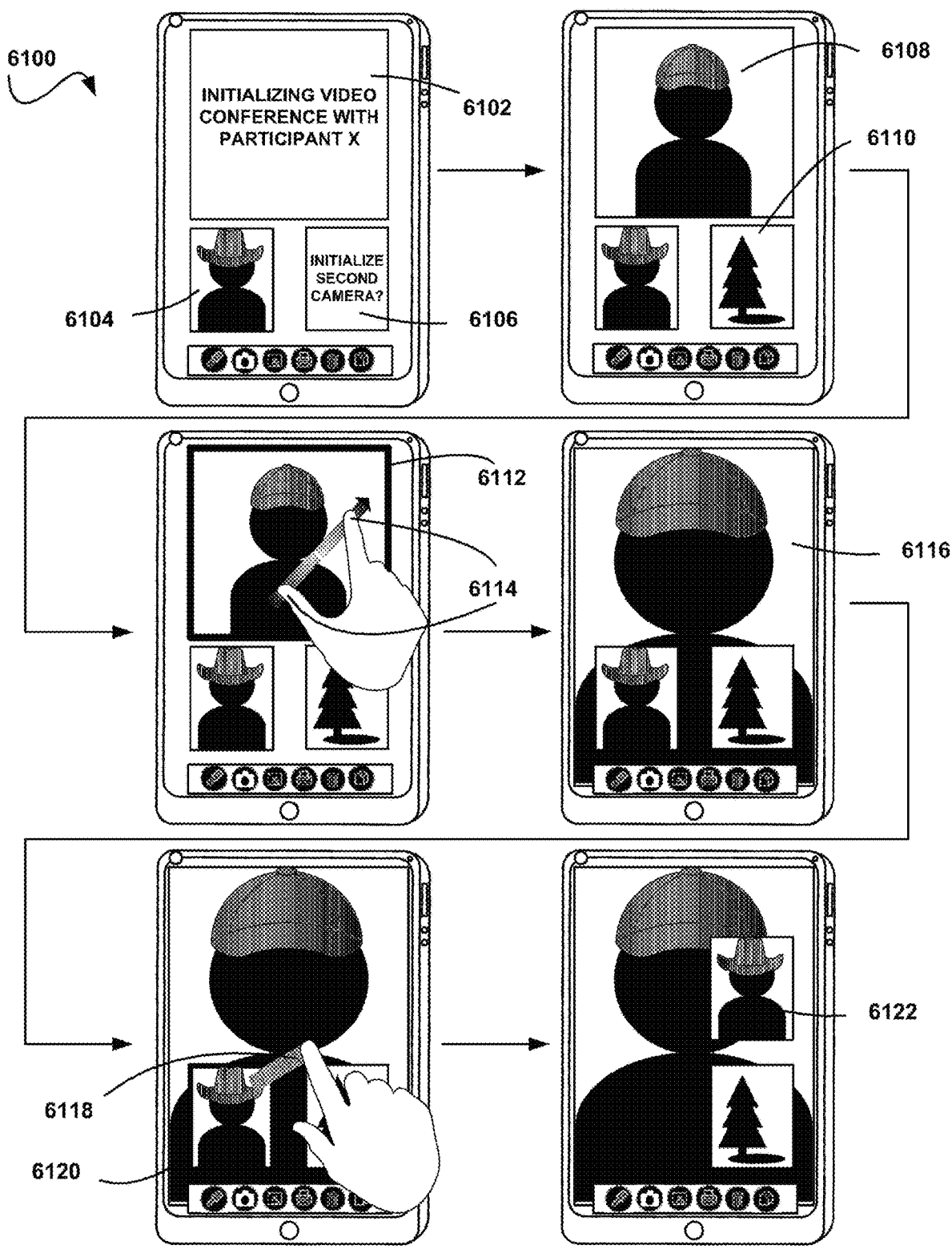
FIG. 61 shows a sequence of user interfaces utilizing dual camera use during a video conference, in accordance with one possible embodiment.

FIG. 61 shows a sequence of user interfaces 6100 utilizing dual camera use during a video conference, in accordance with one possible embodiment. As an option, the sequence of user interfaces 6100 may be implemented in the context of the architecture and environment of the previous Figures or any subsequent Figure(s). Of course, however, the sequence of user interfaces 6100 may be carried out in any desired environment. It should also be noted that the aforementioned definitions may apply during the present description.

As shown in the first sequence, a video conference may be initialized 6102 on a first device. A user of the first device may be displayed 6104 as well as the option to initialize the second camera 6106.

In one embodiment, a video conference may be initialized by more than one method. For example, in one embodiment, a video conference may be initialized by selecting a video conference client. In other embodiments, the video conference may be initialized within a phone application, within a social networking application (e.g. Facebook, etc.), based on of a location (e.g. GPS coordinates indicate user is at designed location, etc.), based on a time (e.g. time triggered video conference, etc.), and/or any other method which may cause a video conference to initialize.

Additionally, in some embodiments, once the video conference client (or whatever application uses the video conference resources) initializes, the device may automatically connect the requested participant, as well as initialize the second camera. Of course, the user may preconfigure settings in the video conference client, or in any application that uses the video conference resources, to set up the video conference to act in any manner (e.g. automatically connect the second camera, automatically connect other participants, request setup information from the user at the time of initialization, etc.). Of course, although the described video conference may occur between two devices, any number of devices may be connected to the video conference.

As shown in the next sequence, a user of a second device 6108 (e.g. initialized video conference, etc.) may be displayed, as well as an initialized second camera 6110 may be displayed.

In one embodiment, the user of a second device may appear in the background while the user of the first device and the second camera may be displayed as inset boxes in the foreground (e.g. PIP overlays, etc.). Of course, the display may be preconfigured, or configured at initialization, by the user in any manner.

As shown in the next sequence, a display of the user of the second device may be selected 6112, and the display of the user of the second device may be enlarged 6114.

In various embodiments, a display area may be selected by many methods. For example, in one embodiment, the display area may be selected by holding down with one finger any part of the display area for a set preconfigured amount of time (e.g. threshold, etc.), by giving a voice command to select a participant's box (e.g. select display of participant X, etc.), by motion sensors (e.g. camera processes motions by the user which are used to control the display, etc.), by double tapping a display area, and/or any other method may be used to select a display area.

Additionally, in some embodiments, a display area may be resized. For example, in one embodiment, after selecting a display area, the display area may be resized by spreading apart two fingers to enlarge the display, or bringing together two fingers to reduce the decrease the size of the display. In other embodiments, after selecting a display area, preconfigured finger motions may cause the display area to be resized (e.g. motion of the letter "M" may cause the display area to maximize, whereas motion of the letter "R" may cause the display area to reduce in size, etc.). Additionally, in one embodiment, tapping the display area a set number of times (e.g. 3 quick taps, etc.) may cause the display area to increase or decrease in size. In a further embodiment, the use of more than one finger may be associated with different commands. For example, a two finger swipe from left to right on the display area may automatically cause the display area to increase in size, whereas a three finger swipe from left to right may cause the display area to increase in brightness. Of course, any configuration relating to the use of more than one finger may be preconfigured and set by the user.

As shown in the next sequence, the result of the enlargement of the display of the user of the second device may be displayed 6116. In one embodiment, the enlargement of the display of the user of the second device may fill the entire display of the device. Additionally, the display may overlay any and all other displays on the video conference client. Of course, in such a configuration, double tapping the screen (or giving any other preconfigured input) may cause the other displays to reappear.

Although the resizing of the display of the user of the second device has been illustrated, resizing of any of the displays on the video conference may operate in a similar manner.

As shown in the next sequence, the display of the user of the first device may be selected 6120. Additionally, the display area of the user of the first device may be moved 6118 to a different location on the display of the device.

In some embodiments, a user of a device may modify the arrangement of a display by moving around one or more display areas on the display. For example, an inset display area of a PIP display may be selected and moved. Additionally, in one embodiment, the user may want to move a foreground inset display area for a variety of reasons, such as when this area is blocking an area of interest of the background display area. Of course, the inset display may be moved for any reason and by any manner (e.g. oral commands, button with preconfigured settings, etc.).

In one embodiment, a user may perform a snap-to-corner operation by placing a finger (or any other pointing medium which may be used for input) anywhere within the inset display area (e.g. display area of the user of the first device, etc.). The selected inset display area may be displayed in terms of a thick border. In other embodiments, the selected area may be indicated in different ways, such as by highlighting the display area, by causing the display area to vibrate, and/or any other way by which a selection is communicated to the user of the device. In one embodiment, to move the selected inset display area, the user may drag a finger towards any corner of the PIP display.

After the user has removed the finger from the screen of the device, the inset display area may still move towards the corner of the PIP display that was identified based on the user's finger movement. In other words, after the finger starts the movement of the inset display area towards the corner of the PIP display, the video conference client user interface may maintain this movement even after the finger is removed. In some embodiments, to maintain this movement, the UI may require the user's drag operation to be larger than a particular threshold amount (e.g., longer than a particular distance or longer than a particular length of time, etc.) before the user removes his finger; otherwise, the inset display area may snap back to its original position. Further, in one embodiment, the thick border around the selected inset display area may be removed to indicate that the snap-to-corner operation is completed.

Additionally, in another embodiment, wherever the user may remove the finger may determine where the drag operation stops. In other embodiments, the inset display area may be relocated in other manners. For example, the user may specify where to direct the inset display area before the inset display area actually starts to move (e.g. touch on screen where the inset display area is to be positioned, etc.), the inset display area may slide and snap-to-corners by simply tilting the device at different angles, and/or any other function may be used to relocate the inset display area.

As shown in the next sequence, the results of the moved display of the user of the first device may be displayed 6122. Of course, although the above description of moving a display area related to a display area of the user of the first device, similar methods may be employed to move any display area on the video conference client and/or application using video conferencing resources.

Figure 62:
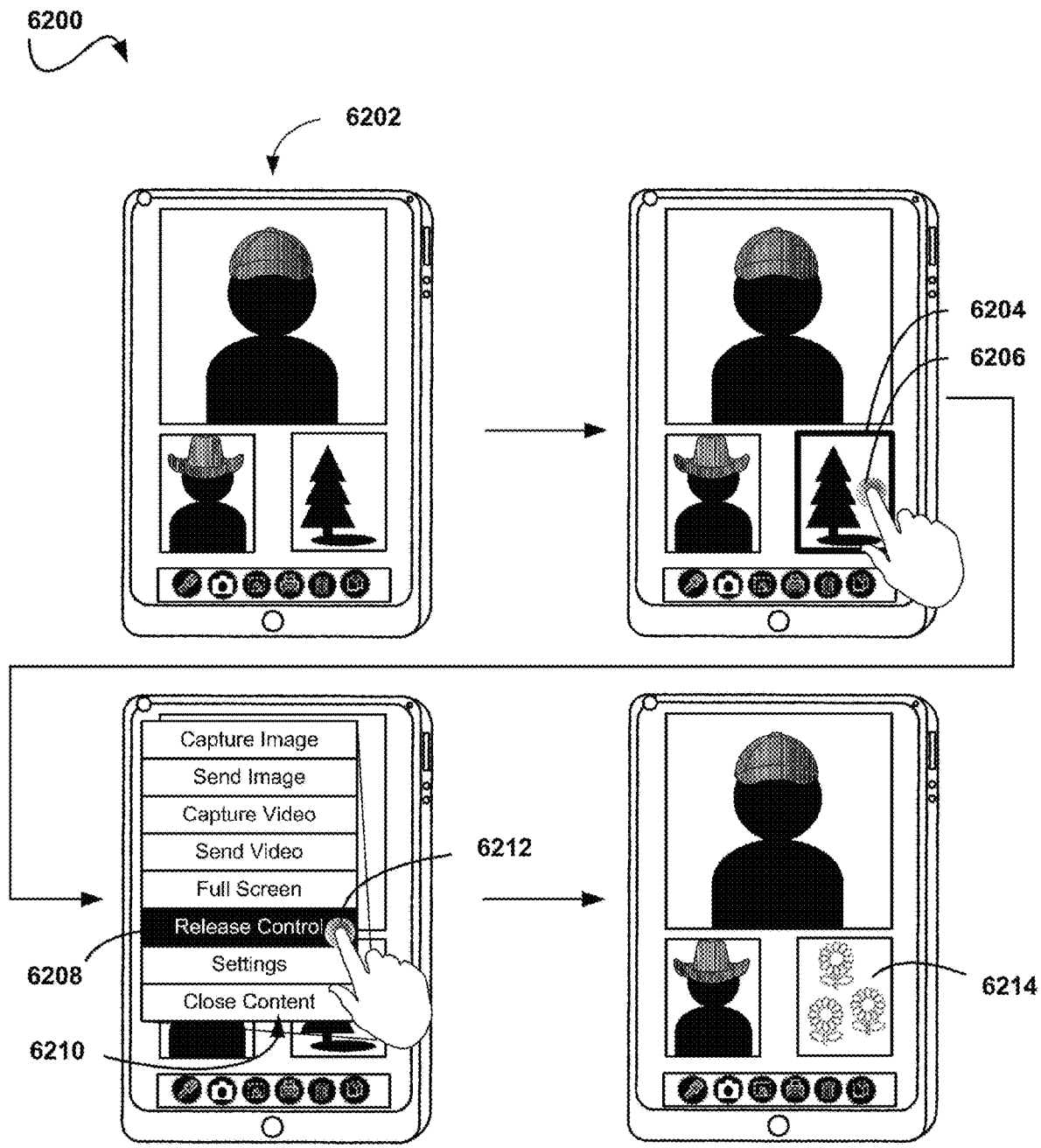
FIG. 62 shows a sequence of user interfaces utilizing dual camera use during a video conference, in accordance with one possible embodiment.

FIG. 62 shows a sequence of user interfaces 6200 utilizing dual camera use during a video conference, in accordance with one possible embodiment. As an option, the sequence of user interfaces 6200 may be implemented in the context of the architecture and environment of the previous Figures or any subsequent Figure(s). Of course, however, the sequence of user interfaces 6200 may be carried out in any desired environment. It should also be noted that the aforementioned definitions may apply during the present description.

As shown in the first sequence, a video conference client and/or application may be initiated 6202. In the next sequence, a display area of a second camera may be selected 6204 by a user of the device 6206.

In one embodiment, a thick border may be used to notify the user of the device that a display area has been selected. In other embodiments, the selected area may be indicated in different ways, such as by highlighting the display area, by causing the display area to vibrate, and/or any other way by which a selection is communicated to the user of the device.

In various embodiments, a finger may be used to select a display area by holding a finger on the display area for a set period for time (e.g. time threshold, etc.). In other embodiments, a display area may be selected by voice commands, a preconfigured button, a navigation control panel, and/or any other method by which a display area may be activated. In one embodiment, once a video conference initializes between a user of a first device and a user of a second device (or between any number of devices), the display areas of those two users may be automatically disabled (i.e. cannot be selected, etc.) so that any motion or touch to any part of the screen will automatically select the display area of the second camera, or cause any preconfigured function to occur to the display area of the second camera.

In the next sequence, a menu associated with the display area of the second camera 6210 may be displayed. Additionally, an item of the menu may be selected 6208 by a user 6212.

In one embodiment, the menu may include a variety of options. For example, in one embodiment, the menu may include "capture image," "send image," "capture video," "send video," "full screen," "release control," "settings," "close content," and/or any other option which may relate to the second camera. In various embodiments, capture image may relate to taking a picture, send image may relate to capturing the image and sending it or sending a saved imaged, capture video may relate to recording a video, send video may relate to recording a video and sending it or sending a saved video, full screen may cause the display area of the second camera to take up the entire display of the device, release control may permit another participant of the video conference to control at least some aspect associated with the second camera (or any additional content which may be added), settings may relate to any configuration of the camera (e.g. default save location, camera parameters including, e.g., white space or color scheme, etc.), and close content may relate to closing the display area of the second camera, or any additional content. Of course, the menu that may be presented to the user of the device may be modified and preconfigured in any manner.

Additionally, the menu may display options relating to the application using the second camera. For example, in a social networking application using the second camera on the video conference, the application menu may include such options as "post this to your account," "send update with photo," "upload photo and tweet," and/or any other option which may relate to social networking and a camera. Of course, any application using the second camera on the video conference may also have preconfigured menus and options.

In the next sequence, the results of a release control selection 6214 may be displayed. In one embodiment, the user of the second device may control some aspect of the second camera on the first device. For example, in one embodiment, the user of the second device may control the recording of the second camera, the zoom of the lens of the second camera, the exposure of the second camera, and/or any other function associated with the second camera which may be potentially controlled remotely by another user. In some embodiments, where the lens of the second camera may be mounted on a pivot or movable face, the direction and angle, among other parameters, may be controlled remotely by a user of a second device.

Figure 63:
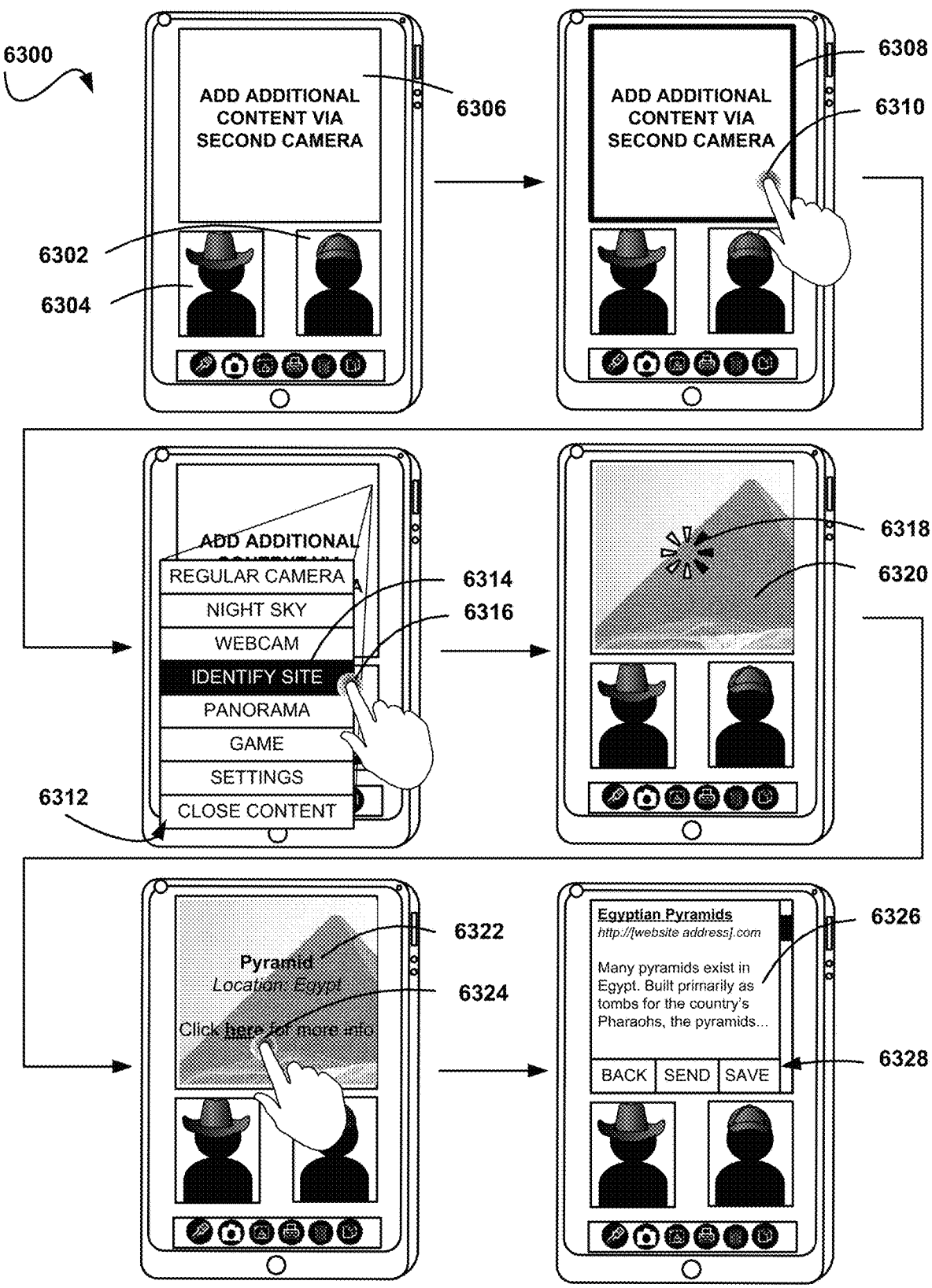
FIG. 63 shows a sequence of user interfaces utilizing dual camera use during a video conference, in accordance with one possible embodiment.

FIG. 63 shows a sequence of user interfaces 6300 utilizing dual camera use during a video conference, in accordance with one possible embodiment. As an option, the sequence of user interfaces 6300 may be implemented in the context of the architecture and environment of the previous Figures or any subsequent Figure(s). Of course, however, the sequence of user interfaces 6300 may be carried out in any desired environment. It should also be noted that the aforementioned definitions may apply during the present description.

As shown in the first sequence, a user of a first device 6304 and a user of a second device 6302 may be shown. Additionally, a display area relating to the second camera 6306 may be displayed. As discussed above, in various embodiments, the video conference may be initiated by a variety of methods (e.g. applications, video conference client, etc.).

In the next sequence, a display area relating to the second camera may be selected 6308 by a user of the device 6310. In one embodiment, a thick border may be used to notify the user of the device that a display area has been selected. In other embodiments, the selected area may be indicated in different ways, such as by highlighting the display area, by causing the display area to vibrate, and/or any other way by which a selection is communicated to the user of the device.

In various embodiments, a finger may be used to select a display area by holding a finger on the display area for a set period for time (e.g. time threshold, etc.). In other embodiments, a display area may be selected by voice commands, a preconfigured button, a navigation control panel, and/or any other method by which a display area may be activated. In one embodiment, once a video conference initializes between a user of a first device and a user of a second device (or between any number of devices), the display areas of those two users may be automatically disabled (i.e. cannot be selected, etc.) so that any motion or touch to any part of the screen will automatically select the display area of the second camera, or cause any preconfigured function to occur to the display area of the second camera.

In the next sequence, a menu associated with the display area of the second camera 6312 may be displayed. Additionally, an item of the menu may be selected 6314 by a user 6316.

In one embodiment, the menu may include a variety of options. For example, in one embodiment, the menu may include "regular camera," "night sky," "webcam," "identity site," "panorama," "game," "settings," "close content," and/or any other application and/or function which may be integrated with at least some aspect of the second camera. Of course, the menu that may be presented to the user of the device may be modified and preconfigured in any manner.

In one embodiment, the second camera may function as a normal camera. For example, the second camera may take pictures, record video, function as a webcam, and/or function in any manner relating to a normal handheld digital camera and/or digital video camera (i.e. camcorder functionality, etc.). In another embodiment, the second camera may be integrated into another camera application. For example, a picture may be captured by the camera and then post-processed within the display area of the second camera and viewed by all participants.

In one embodiment, a photo may be taken. The application may automatically generate a menu of possible alterations (e.g. crop, brighten, saturation, etc.). After making initial alterations, the user may make further alterations (e.g. transform the image into b&w, etc.). In some embodiments, the alterations to the photo may occur by the user of the first device (e.g. where the second camera is located, etc.). In other embodiments, the alterations may be done by another user of a different device (e.g. remote processing, etc.) or the alterations may be done by more than one user on more than one device where the alterations represent a joint collaboration between all users.

In another embodiment, the second camera may be integrated into a night sky application to be used during a video conference. For example, after selecting night sky on the popup menu, a star gazing application may commence in the display area of the second camera. The user may point the camera toward any star, planet, or constellation in the sky, and the application may not only show what the camera would see but overlay the display with names of the stars, planets, constellations, and/or any other relevant material relating to sky gazing. Of course, such settings (e.g. name, type, etc.) may be preconfigured to be displayed.

In one embodiment, the second camera may function as a webcam. For example, in some embodiments, after being activated, the camera video may provide a "live feed" for a website and/or application, may provide a live video to be displayed on a social network site, may provide security surveillance capabilities, may provide a video broadcasting service, and/or any other webcam related function.

In another embodiment, the second camera may function to identify a site. For example, in one embodiment, the camera may be used to capture an image of a known object (e.g. building, monument, park, etc.). The application may automatically match the object with data information (e.g. name, history, location, etc.) which may appear as a temporary overlay. In other embodiments, a link may appear under the photo for additional information and when clicked, the second camera display area may display information relating to the object (e.g. second camera display area may function also as a browser to display information relating to the object, etc.). The application may gather information on the object captured based on GPS location, cell phone triangulation, and/or any other method whereby location of the device may be determined.

In another embodiment, after capturing an image of the object, and having been given information relating thereto, the second camera display area may additional contain command buttons. For example, such buttons may prompt the user to go "back" to the last page (e.g. picture of captured image, application to identify site, etc.), "save" the information relating to the captured object, "send" the object (e.g. email, social networking posting, etc.), and/or any other functional commands which may facilitate viewing of the information. Of course, any button, identification of object, and/or any other utility related to the identify site may be preconfigured by the user in settings.

Additionally, in another embodiment, the second camera may function with a panorama application. For example, in one embodiment, the second camera may be used to capture a series of images and then string the images together to form a panoramic photo. For example, in various embodiments, the application may prompt the user how to take each photo so that a panoramic image may be optimized. After finishing the series of photos, the application may prompt the user "Would you like to now create your panoramic image?" After the processing is complete, a panoramic image may be displayed in the display area of the second camera. In one embodiment, the processing (i.e. stitching together of the photos) of the panoramic photo may occur on the first device, or on the second device, or on any of the devices which are connected to the video conference. In another embodiment, the processing of the panoramic photo may occur on the device that has control of the application.

In one embodiment, the second camera may function with a game application. For example, in one embodiment, the user of the first device may start a camera based game application. The game application may be an augmented reality game, such as, but not limited to SpecTrek, iSnipeYou, or any other type of game which relies on a camera. In some embodiments, the user of the first device (with the second camera) may play and the user of the second device may watch. In other embodiments, the user of the first device may start the game application which relies on the camera, and the user of the second device may interact with the game as well (e.g. second person in the game, etc.).

In a further embodiment, the user of the first device and the user of the second device may each start the game application which relies on each of their second camera. A second camera display for each of the users may appear in the video conference client. The users may play a joint game (e.g. mission based, strategy based, etc.), be able to control each of their players independently, and each receive content input based off of input from the second camera. Of course, the game may provide interaction between the two (or more) devices in any manner, as long as the game relies upon a second camera and functions within a video conference environment.

Additionally, in various embodiments, the second camera may relate to a social networking application. For example, in one embodiment, a social networking application may use the second camera during a video conference, and may include such options as "post this to your account," "send update with photo," "upload photo and tweet," and/or any other option which may relate to social networking and a camera. Of course, any application using the second camera on the video conference may also have preconfigured menus and options.

In a further embodiment, the second camera may function with any application and provide a greater degree of interaction between a user of a first device and a user of a second device (or more). For example, an interactive whiteboard based off of video feeds from each of the devices (e.g. changes are made to a physical whiteboard by each of the users in their respective locations and the whiteboard application merges changes from both users, etc.), a photography based application which takes photos from each of the users' second camera and creates one photo based off of at least two inputs (one from each user's second camera), a dashboard application which displays the speed, distance, and second camera images of each participant (e.g. for use in a marathon or other physical event, mounted on the helmet of handlebar of a mountain bike, etc.), and/or any other application which requires multiple inputs (e.g. one from each user's second camera) and which may be combined together to create one fluid display which may be universally displayed on all user's devices. Of course, any of the foregoing may be further integrated with respect to social networking sites. For example, the dashboard application may not only be merging information (e.g. statistics, etc.) and video feeds from each of the participants but may additionally be posting automatic updates (e.g. Facebook, Twitter, etc.) to each of the participant's respective social networking account(s).

Additionally, the menu relating to the second camera may also include settings relating to settings any parameter associated with the second camera, or with any application which relies on the second camera. Further, the second camera may be closed (e.g. minimized, etc.) during the video conference. Of course, any selectable content may be displayed to the user in relation to the display area of the second camera.

In the next sequence, a video feed of the desired object may be displayed 6320. Additionally, a progress bar of the application identifying the object may be displayed 6318.

In one embodiment, the object captured by the second camera may be a monument or known structure (e.g. Egyptian pyramid, etc.). In another embodiment, the captured object may be artwork, landmarks, points of interest, and/or any other object which may be captured by the second camera. In other embodiments, the second camera may even take a photo of a known individual and information may be generated relating thereto. Additionally, the progress bar displayed as an overlay over the captured image may be displayed to indicate progress of locating information relating to the captured image, or nothing may be displayed. Of course, the user may specify in the settings how the application may function and display.

In the next sequence, information relating to the captured content may be displayed 6322. Additionally, the user may select to view additional information relating to the captured content 6324.

In one embodiment, all information relating to the captured content may be automatically displayed on the display area of the second camera. In another embodiment, only a portion of the information relating to the captured content may be displayed, but the user may have the option to view additional information relating to the identified object. In various embodiments, the user may select to view additional information relating to the identified object in a variety of ways. For example, the user of the device may select with a finger to view additional information, an oral command may be given to view more information, an accelerometer may be used to view information (e.g. shifting the device sharply in a preconfigured direction, etc.), and/or any method may be used by which the additional information may be selected.

In the next sequence, additional information relating to the identified content may be displayed 6326. Additionally, command buttons relating to the application may be displayed 6328.

In some embodiments, the additional information may be displayed to the user in a variety of ways. In one embodiment, the additional information may be displayed as an overlay over the identified object. In another embodiment, the additional information may be displayed as a separate browser within the display area of the second camera. Of course, the additional information may be presented in any manner to the user.

In other embodiments, a command bar may be displayed to the user relating to the additional information. For example, such command buttons may prompt the user to go "back" to the last page (e.g. picture of captured image, application to identify site, etc.), "save" the information relating to the captured object, "send" the object (e.g. email, social networking posting, etc.), and/or any other functional commands which may facilitate viewing of the information. Of course, any button, identification of object, and/or any other utility related to the identify site may be preconfigured by the user in settings.

Figure 64:
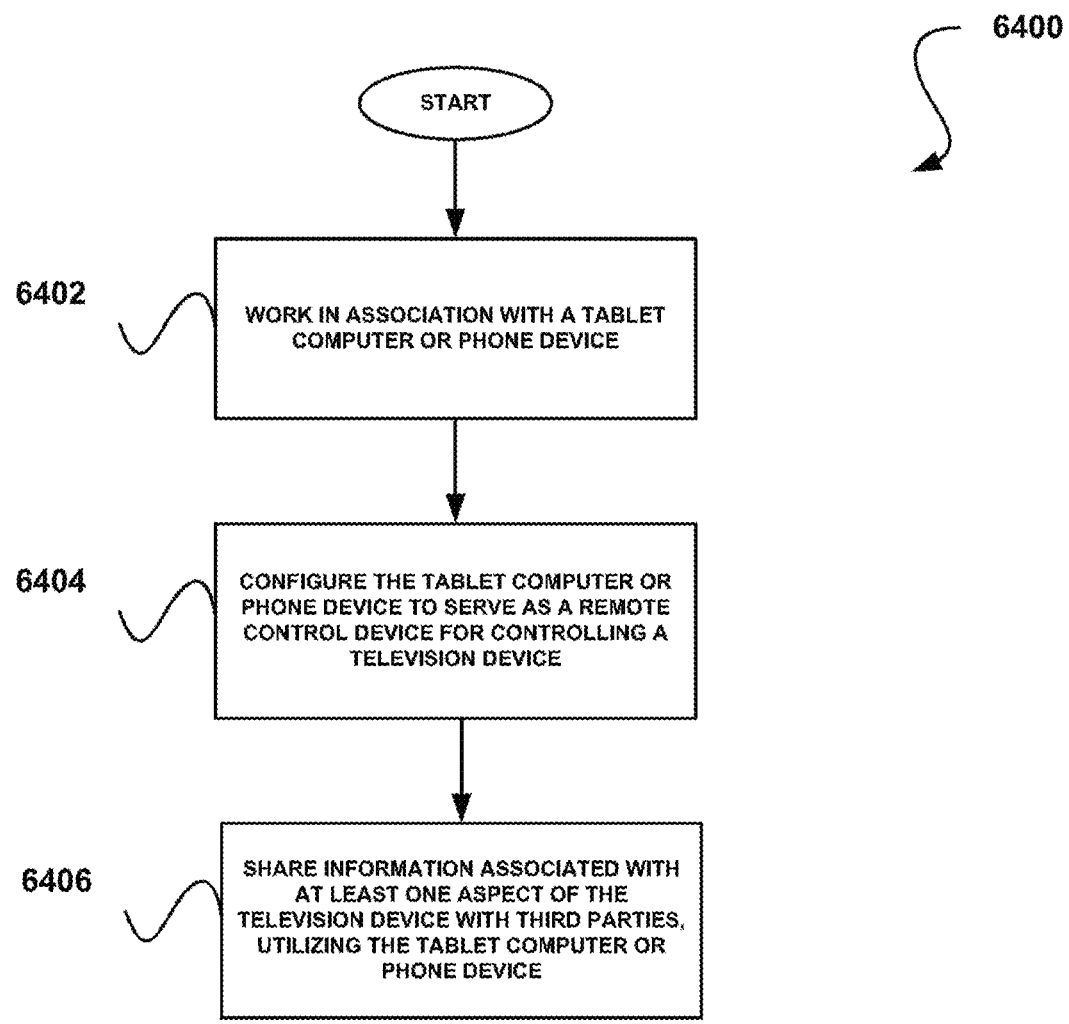
FIG. 64 shows a method for sharing information associated with a television device, in accordance with one possible embodiment.

FIG. 64 shows a method 6400 for sharing information associated with a television device, in accordance with one possible embodiment. As an option, the method 6400 may be implemented in the context of the architecture and environment of any subsequent Figure(s). Of course, however, the method 6400 may be carried out in any desired environment.

As shown, a computer readable medium works in association with a tablet computer or phone device. See operation 6402. In the context of the present description, a tablet computer refers to any portable computer shaped and/or sized like a tablet. For example, in one embodiment, the tablet computer may include a personal digital assistant (PDA), a laptop personal computer with a rotatable touchscreen, a tablet (e.g. Apple i-pad, Microsoft Slate, etc.), and/or any other portable computer shaped and/or sized like a tablet. In another embodiment, the tablet computer may include a cellular phone, or any other mobile device. In one embodiment, the tablet computer may include a touch screen. In a further embodiment, the tablet computer or phone device may include a tablet computer.

In the context of the present description, a phone device refers to any apparatus that is portable and provides telephonic functions. For example, in various embodiments, a phone device may include a cellular phone, smart phones, an IPHONE, a BLACKBERRY, a PDA, a hand held computer, a tablet computer, or any apparatus that is portable and may provide telephonic functions. In addition, in some embodiments, a phone device may include any device capable of receiving broadband access through a UTMS, CDMA, GSM EDGE, WIMAX, LTE, or LTE Advanced system, or any other mobile telecommunication broadband system.

In one embodiment, the phone device may include a device with cellular phone capabilities. In another embodiment, the phone device may include a short-range wireless communication protocol headset. In the context of the present description, short-range wireless communication protocol headset may refer to any wireless protocol that functions at a short-range. For example, in one embodiment, the short-range wireless communication protocol may include Wireless USB, Bluetooth, Wi-Fi, or any other wireless protocol which may function at a short-range. In a further embodiment, the tablet computer or phone device may include a phone device.

As shown, the tablet computer or phone device is configured to serve as a remote control device for controlling a television device. See operation 6404. In the context of the present description, a remote control device may include a first device used to control a second device. In one embodiment, the control of the second device may occur wirelessly (e.g. Bluetooth, Wi-Fi, etc.). In other embodiments, the control of the second device may occur physically (e.g. cord attachment between the two devices, etc.). Still yet, in a further embodiment, the control of the second device by the first device may occur through the cloud.

In the context of the present description, a television device refers to any device which may receive a television signal. In one embodiment, the television signal may include a broadcast signal, a signal transmitted by cable, a closed-circuit signal, digital signals, signals relayed by satellites, and/or any other television related signal relayed and/or transmitted by any method. In another embodiment, the television device may include a television, a set-top box, an integrated receiver/decoder (e.g. IRDs, etc.), a television converter box, and/or any other device which may connect to a television and to an external signal source (for receiving signals to be displayed on the television).

In one embodiment, the remote control device may include part of a visual display shown on the television. For example, in one embodiment, the remote control device may display the video stream being sent to the television. Such video stream may be controlled (e.g. stopped, recorded, etc.) by the remote control device. In another embodiment, the remote control device may include an electronic program guide (EPG) by which the user may make selections on what to view. The EPG may show the preferred programs available for viewing on the television. The EPG may list any number of elements to aid the viewer in search of a desired program, such as, for example, channel and program information. Additionally, in one embodiment, the EPG may be received from the television, over the wireless link, or may be obtained from the Internet. In other embodiments, the user may receive internet feeds (e.g. video podcasts, news cast, movie, television show, etc.) on the remote control device which may be used to control what is displayed on the television. In other embodiments, the remote control device may be used in any manner to control at least a portion of the television device.

Additionally, in another embodiment, the television may send additional program information to the remote control device. For example, in one embodiment, the television may send a video stream of the channel being previewed on the remote control device from the television to the remote control device. The user may select a channel for preview on the remote control device by touching the area of the display over the desired channel. The user may confirm a desired channel by submitting the channel to the television. For example, in one embodiment, the user may touch the video selection twice to display the desired channel on the television. Of course, in other embodiments, the user may select the desired content in any manner (e.g. voice commands, input means, gestures, etc.).

In one embodiment, the remote control device may provide several fundamental functions, such as controlling the power on/off state, audio level of television, and channel selection. In another embodiment, the remote control device may include a keypad or keyboard (e.g. physical or digital, etc.) by which the user may input information into the remote control device to potentially control some aspect of the television device.

Further, in one embodiment, the remote control device sends signals to the television device to control at least one aspect of the television device. After receiving the signal, television device may perform a corresponding function in response to the signal and enters a state (e.g. change channel, stream internet video, record program, etc.). The television device may transmit information representing the state to the remote control device. For example, if the remote control device transmits a mute state to a television device, the television device may enter the mute state and may transmit information reflecting the mute state to the remote control device. Of course, in various embodiments, the remote control device may be used to operate other functions of the television device, including, for example, security monitoring, accessing the Internet, sending emails, and/or any other function which may use a television display.

Additionally, the remote control device may be used to receive gesture input to control the television device. Through moving a body, a user may create gestures. In the context of the present description, a gesture may comprise a motion or pose by a user that may be captured as image data and parsed for meaning. In one embodiment, a gesture may be dynamic, comprising a motion (e.g. mimicking throwing a ball, etc.). In another embodiment, a gesture may be a static pose (e.g. holding one's crossed forearms in front of torso, etc.). A gesture may also incorporate other objects, such as by swinging a mock sword. A gesture may comprise more than one body part, such as clapping the hands together, or pursing one's lips.

In various embodiments, gestures may be used for input in a general computing context. For instance, various motions of the hands or other body parts may correspond to common system wide tasks such as navigate up or down in a hierarchical list, open a file, close a file, and save a file. Gestures may also be used in a video-game-specific context, depending on the game. For example, in one embodiment, with a driving game, various motions of the hands and feet may correspond to steering a vehicle in a direction, shifting gears, accelerating, and braking.

Additionally, gestures may be generated by a movement. For example, a user may generate a gesture that corresponds to walking or running, by walking or running in place. The user may alternately lift and drop each leg to mimic walking without moving. The system may parse this gesture by analyzing each hip and each thigh. In one embodiment, a step may be recognized when one hip-thigh angle exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

In some embodiments, given a "walk or run" gesture, an application may set values for application-determined parameters associated with this gesture. These parameters may include a threshold angle, the number of steps required to initiate a walk or run gesture, a number of periods where no step occurs to end the gesture, a threshold period that determines whether the gesture is a walk or a run, and/or any other preconfigured parameters associated with a gesture. A fast period may correspond to a run, as the user will be moving his legs quickly, and a slower period may correspond to a walk.

Additionally, in various embodiments, there are a variety of outputs that may be associated with the gesture. For example, in one embodiment, there may be a baseline "yes or no" as to whether a gesture is occurring, which may correspond to a set function (e.g. wave hand to the right to change a channel, etc.). There also may be a confidence level, which corresponds to the likelihood that the user's tracked movement corresponds to the gesture. This could be a linear scale that ranges over floating point numbers between 0 and 1, inclusive. In some embodiments, applications which use gesture input may have preconfigured confidence levels associated with each gesture (e.g. at least a 0.95 confidence level associated with the gesture, etc.). Of course, in other embodiments, the confidence level may be preconfigured for each and every gesture so that the system accurately recognizes and matches a motion to a gesture.

In one embodiment, the remote control device may include a front facing camera which may receive input from a user. For example, the camera may capture a depth image of a scene, may determine whether one or more targets or objects in the scene corresponds to a human target such as the user, and/or may provide any additional functionality to control the television device.

In various embodiments, techniques may be used to determine whether a target or object corresponds to a human target (e.g. the user, etc.). For example, each of the targets may be flood filled and compared to a pattern of a human body model. Each target or object that matches the human body model may then be scanned to generate a skeletal model associated therewith. The skeletal model may then be provided to the computing environment such that the computing environment may track the skeletal model, render an avatar associated with the skeletal model, and may determine which controls to perform in an application based on, for example, gestures of the user that have been recognized from the skeletal model. In one embodiment, a gesture recognizer engine may be used to determine when a particular gesture has been made by the user.

Additionally, in one embodiment, any gesture may potentially be used to control at least some aspect of the television. For example, the television may provide an interactive game wherein movements and/or gestures from the user are used to control a player's avatar. Movements by the user may be interpreted as controls or actions, such as a control to bob, weave, shuffle, block, jab, hop, select and/or control any aspect of that which is displayed on the television device.

In another embodiment, gestures may be based off of movement of an object other than the user. For example, in some embodiments, the user of an electronic game may be holding an object (e.g. sword, racket, etc.) such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

Furthermore, in other embodiments, some movements may be interpreted as controls that may correspond to actions other than controlling a player avatar. For example, virtually any controllable aspect of an operating system and/or application may be controlled by movements of the target such as the user. In various embodiments, the player may use movements to end, pause, or save a game, select a level, view high scores, communicate with a friend, open another application, change the channel, modify the volume, and/or change any aspect associated with the television device.

In one embodiment, the camera may be configured to capture video with depth information including a depth image that may include depth values via any suitable technique including, for example, time-of-flight, structured light, stereo image, or any other method by which depth values may be determined. In another embodiment, a capture device other than the front facing camera may be used. For example, two or more physically separated cameras that may view a scene from different angles, thereby providing visual stereo data that may be used to generate depth information.

In a further embodiment, the gestures may be associated with sign language. For example, a user may use the capture device (e.g. camera, etc.) to record him signing (e.g. ASL, etc.). The captured signing may be used to control at least one aspect of the television (e.g. signing "go to channel 53" will cause the television to go to channel 53, etc.). In another embodiment, the signing may be transcribed as digital text (e.g. used for social networking, sending emails, etc.). Of course, in other embodiments, the signing may be used in any manner to control at least a portion of an aspect associated with the television device.

As shown, information associated with at least one aspect of the television device is shared with third parties, utilizing the tablet computer or phone device. See operation 6406.

In one embodiment, sharing with third parties may include an aspect associated with social networking. For example, in one embodiment, a user of the television device may have enjoyed viewing a program, and may wish to post (e.g. via Facebook, Twitter, etc.) a comment relating thereto. In another embodiment, a user of the television device may record (e.g. DVR, etc.) at least a portion of the media displayed on the television device, and then may send and/or upload the recording to social networking websites (e.g. a portion of a webcast may be uploaded to a Facebook comment, etc.).

In another embodiment, sharing with third parties may include setting up an event prior to the event taking place. For example, in one embodiment, the user of the television device may wish to invite other friends to view a televised program with him (e.g. Monday night football, etc.). The user may set up the event, and subsequently invite each of his friends to attend. When viewing the event, the user and the connected friends may exchange comments and/or data during the program. For example, in one embodiment, each of the friends may provide a live video feed (e.g. webcam linked to each of their remote control devices, etc.) which may be viewed on each of the user's and friend's television devices. In another embodiment, each of the user and friends may provide real-time comments which may be displayed on each of the television devices.

In one embodiment, sharing with third parties may include providing for remote control through the cloud. For example, a television device may provide a video stream of what is currently being viewed on the device to a cloud based server and/or service. In one embodiment, what is being viewed on a television device may be recorded to a cloud based system. In another embodiment, the remote control device may be geographically far (e.g. greater than 150 ft, etc.) from the television device. In such situations, the user may control the television device through the remote control device which may connect to a cloud based service to control the television device.

Additionally, in another embodiment, sharing with third parties may include providing security functions for the television device. For example, a parent may wish to filter the content of what is viewed, of comments that are exchanged, and/or any other aspect relating to limiting access to at least an aspect associated with the television device. The filtering of the content, and review of comments (e.g. filter out profanity, etc.) may be managed by a content filtering service. In another embodiment, a parent may wish to observe what a child is watching. The parent may login into a cloud-based application which may connect to the television device and which may then display whatever is being viewed on the television device.

In some embodiments, sharing with third parties may also include a business aspect to facilitate connection between businesses and clients. For example, a televised meeting may enable more than one business to interact and exchange information. In one embodiment, the televised meeting program may include a product release news conference and the connected businesses may immediately exchange ideas, strategies, and/or information in live time as they view the product release. Of course, in various embodiments, the sharing of information with third parties may include any additional aspect where at least some aspect associated with the television device is shared with a third party.

Further, in one embodiment, the at least one aspect of the television device may include use of the television device, content currently being viewed utilizing the television device, content historically viewed utilizing the television device, and/or any aspect related to the television device. In another embodiment, the at least one aspect of the television device may include content being, or having been, viewed by a friend or by any other user of the television device.

More illustrative information will now be set forth regarding various optional architectures and features with which the foregoing techniques discussed in the context of any of the present or previous figure(s) may or may not be implemented, per the desires of the user. For instance, various optional examples and/or options associated with working in association with a tablet computer or phone device 6402, configuring the tablet computer or phone device to serve as a remote control device for controlling a television device 6404, sharing information associated with at least one aspect of the television device with third parties, utilizing the tablet computer or phone device 6406, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 65:
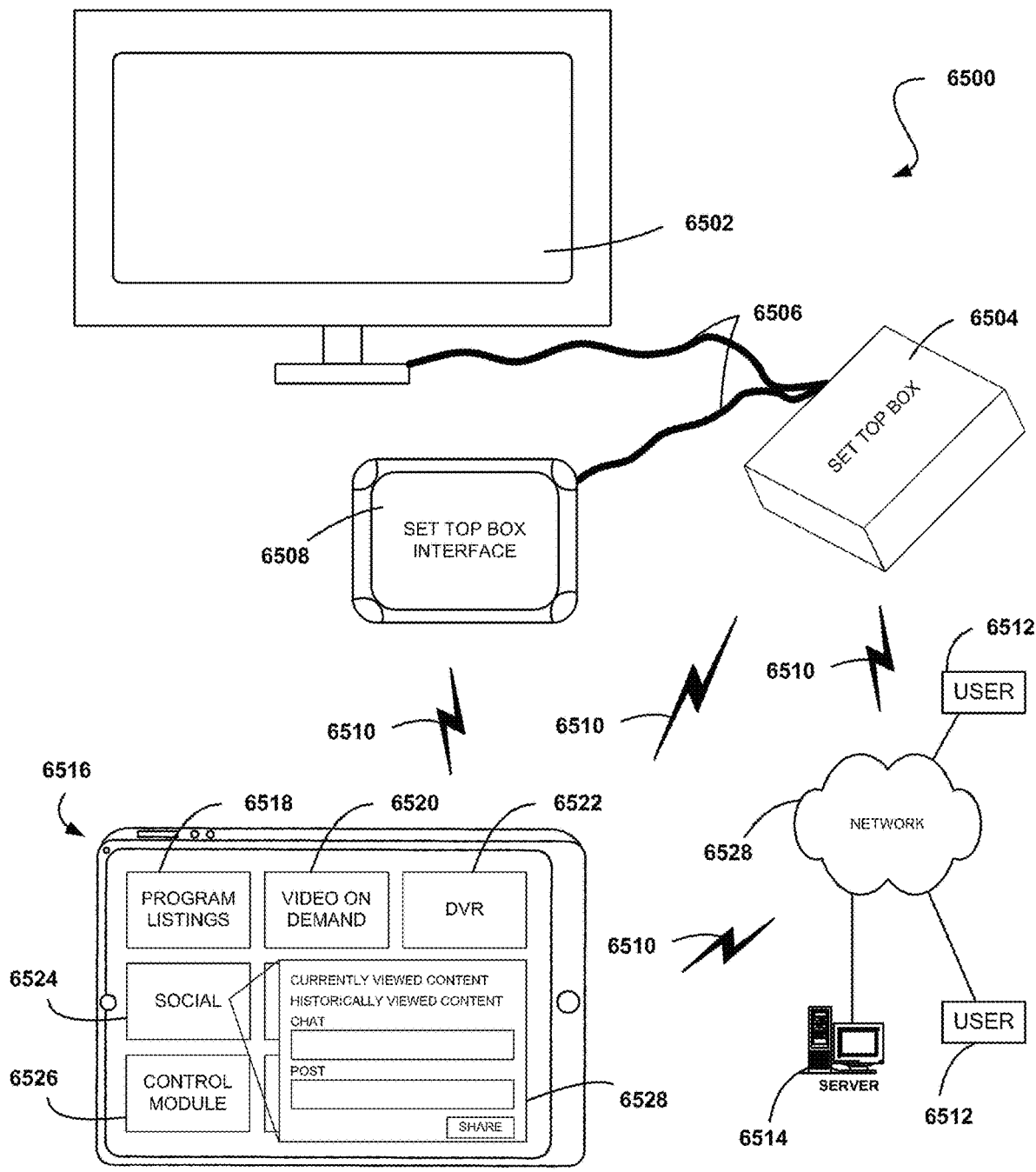
FIG. 65 shows a system for controlling and interacting with a television device, in accordance with one possible embodiment.

FIG. 65 shows a system 6500 for controlling and interacting with a television device, in accordance with one possible embodiment. As an option, the system 6500 may be implemented in the context of the architecture and environment of the previous Figures or any subsequent Figure(s). Of course, however, the system 6500 may be implemented in any desired environment. It should also be noted that the aforementioned definitions may apply during the present description.

As shown, a television device 6502, a set-top box 6504, a set-top box interface 6508, and a tablet computer or phone device 6516, may be included.

In various embodiment, the television device may include a tube based device, a digital light processing (DLP) device, a liquid crystal display (LCD), a plasma display panel (PDP), or any other type of device which may receive a video and audio input (e.g. television monitor). Additionally, the television device may be a standalone device (e.g. standard television set, etc.), or may be found on a number of other types of devices, including portable televisions, a display device equipped with a USB television tuner, and/or any other type of device which may function as a television.

Additionally, in other embodiments, a set-top box may include any device which may contain a tuner, may connect to a television device, and may connect to an external signal source. The set-top box may receive from the external signal source a television signal which may then be displayed on the television device. In some embodiments, the set-top box may be physically connected (e.g. cord, etc.) to the television device. In other embodiments, the set-top box may connect to the television device via short range communication (e.g. Bluetooth, Near Field Communication, ZigBee, etc.).

In one embodiment, the set-top box may receive a television cable signal, satellite signal, a digital signal, a network signal (e.g. providing access to an intranet or internet, etc.), and/or any other type of signal that may contain a video and audio feed which may be viewed on the television device. In another embodiment, a set-top box may be connected to a server to provide a signal. For example, a set-top box and a server may both be located on a wireless network. The server may provide an internet signal which may provide internet tv to the set-top box. In other embodiments, set-top boxes may allow users to digitally record programming content such as television programs, lock certain channels from being accessed without permission, view electronic program guide data, set personal preferences that control how the program guide data and/or programming content is presented to the user, and/or provide any functionality to assist in providing a signal to be displayed to the television device.

Additionally, in some embodiments, the set-top box may include a local cache. For example, the set-top box may include a single centralized cache for all users and/or friends. The cache may include frequently used pages, quick access to historically viewed content, and/or any other page and/or content which may be retrieved. In one embodiment, each time a request is made for a page and/or content, the cache may be checked before retrieving the requested material from the server and/or other cable provider (e.g. external recording system associated with the cable provider, etc.). In other embodiments, a time-out function (e.g. older than 1 month, etc.) may be provided to remove old objects from the cache.

In one embodiment, the set-top box may include an interface to be displayed on the television device. The interface may include a settings option where a user may preconfigure functions (e.g. set-top box automatically logs in user to subscriber service, etc.) and modify customizable preferences and/or menus. In one embodiment, menu preferences may include user-selectable options regarding the content of a main menu and certain features of how pages (e.g. internet web pages displayed on the television device, etc.) are to be displayed. For example, a user may request that menus be created dynamically according to the time of day, as well as with respect to the profile of the user. Thus, menus may be tailored to the particular timing and content needs of the user.

In some embodiments, the set-top box may be used to browse the internet on the television device. For example, in many embodiments, if the user selects to view an internet webpage, the webpage selection may be automatically translated into an Internet address, and the connected server may retrieve the webpage associated with the translated Internet address. The server may then transform the Web-based format into signals suitable for display on television. The processed webpage may then be transmitted to television via the set-top box and displayed to the user.

Further, in some embodiments, the set-top box may be controlled remotely. For example, in one embodiment, the set-top box may have an always-on connection with a network (e.g. the Internet, etc.). An access device (e.g. phone device, etc.) may remotely access a set-top box at any time because the set top box may have an always-on connection. In other embodiments, the set-top box does may not have an always-on connection, in which case the set-top box may establish a bi-directional connection with the network such that the set top box may be remotely accessed and programmed.

In other embodiments, the always-on connection of the set top box may allow users to log on to the set top box with a remote access device using standard protocols. In some instances, the user may be authenticated by the set top box or through an authentication service. After logging on to the set top box, the program guide data from the set top box of the user may be served or transmitted to the remote access device. This may enable the user to remotely view the program guide data that is stored on their own set top box on a remotely located access device. Additionally, in another embodiment, the program guide data may be presented to a user as it is presented to a user when the program guide data is accessed from the set top-box directly (i.e. menu is not formatted for the client device, etc.). In other embodiments, the set-top box may present customized menus and interfaces dependent on the type of device which remotely accesses the set-top box. In some instances, the access device may use a device service that formats the program guide data according to the access device.

In some embodiments, a user a user may be able to remotely schedule an event or input programming instructions using the program guide data that may be displayed on the access device (e.g. phone device, etc.). After an event has been selected or scheduled, the event may be sent back to the set top box. The set top box then may implement the event that was created at the remote access device. In this manner, a user may be able to remotely access and program a set-top box or remotely schedule an event.

In one embodiment, in order to remotely access a set-top box, a user may need to pass an authorization step. For example, in one embodiment, a login with a username and password may be sufficient. In other embodiment, a challenge and response may be given to the user, or a third party authentication service may be used to authenticate the user (assuming that the user has registered with a third party authentication service). For example, Microsoft Passport™ may be one example of a third party authentication service.

In further embodiments, because a user may be remotely logging on to the set-top box, the set-top box may typically have an Internet Protocol (IP) address. Such an IP address may be known to the user or may be determined from configuration data of the set-top box. In some instances, the set-top box may be identified using a static IP address or by a third party service that may provide a link to the IP address of the set-top box. For example, in a cable system, the IP address of the set top box may be supplied by the cable company and may be dynamic.

In other embodiments, the set-top box may include a set-top box interface. The set-top box interface may be an optional feature. For example, the set-top box may use the television display as an interface display controlled by a remote control device. In other embodiments, however, a separate set-top box interface may be provided to facilitate navigation of the set-top box, and for altering some aspect associated with the television display.

In one embodiment, the set-top box interface may include a main scrollable folder containing a plurality of elements. In some embodiments, the plurality of elements may include additional subfolders to facilitate functionality and navigation. A fixed focus pointer (e.g. controlled by a mouse, remote control, or another input device, etc.) may select one of the pluralities of elements of the main folder in response to interaction of a user. In other embodiments, menu hierarchy with any number of levels may be displayed.

In some embodiments, a whole or a partial structure of a user interface may be transmitted to a memory unit in a second device (e.g. phone device, etc.) and used in a user interface of the second device alone or with an original user interface of the second device.

Additionally, the interface may be customized and preconfigured for a variety of set interfaces. For example, in many embodiments, the interface may be set for an electronic program guides (EPG), interactive program guides (IPGs), channels, recordings, movies, sports, favorites, preferences or reminders, and/or any other feature associated with the set-top box. In other embodiments, the interface may be used to organize elements of content and information. For example, the interface may be used to organize elements associated with photographs, personal files and archives, reminders, calendars, radio channels, satellite channels, email, internet links, databases, multimedia services (MMS), internet protocol data casting (IPDC), videos, email, personal information management (PIM), advertisements, coupons, electronic shopping and billing, Internet, news groups, chat channels, games, gambling, and/or any other feature desired by the user.

In one embodiment, the set-top box may receive information, messages and media content over-the-air (OTA). For example, such information, messages, and media content may be sent from a digital video broadcasting (DVB) network, an analog TV network, a satellite TV network, the Internet, or any other related network. Information, messages and media content may also be received from a wireless handset device over any wireless short range networks or over-the-air (OTA), such as Bluetooth, WLAN, Wi-Fi or infrared link, and/or any other short range network. Additionally, information, messages, and media content may also be received from any wireless network or over-the-air (OTA), such as a wireless telecom network, WLAN, Bluetooth, WLAN, Wi-Fi, infrared link or wireless Internet networks, and/or any other wireless network. Information, messages and media content may also be received from a personal computer (PC) over Bluetooth, WLAN, LAN, Wi-Fi, infrared link or over-the-air (OTA), or may be received from any wireline network, such as the Internet, LAN, PSTN, or related network.

In some embodiments, information or messages may be transmitted from a set-top box to an intermediary device for further usage in another environment, for storage, or for manipulation. For example, in one embodiment, photos may be manipulated by a picture manipulator program in an intermediary device (e.g. PC, etc.). In a further embodiment, the intermediary device may download information and messages, and/or a complete or partial user interface structure from a set-top box to one of its memory units, and later transmit the information and messages with or without the complete or partial user interface structure for presentation to some other set-top box. Alternatively, user interfaces from the user's device and some other set-top box may combine to construct a new user interface, or alternative the user interface from the user's device may replace the user interface in a some other set-top box as long as the user uses the other set-top box. Additionally, the other set-top box may be used with its own user interface. In another embodiment, the other set-top box may be located apart from the first set-top box. For example, the other set-top box may be in a hotel room, in a summer cottage, in a friend's place, at work, in a train, in a car, in an airplane, and/or any other location which may use a set-top box.

In one embodiment, a user may have photos from a business trip stored in a wireless device. At work, the user may connect the wireless device to one of the set-top boxes in the office, control the set-top boxes wirelessly (e.g. via Bluetooth, WLAN, OTA, or some other wireless network, etc.) with the user interface stored in the wireless device, and transmit the photos wirelessly (e.g. via Bluetooth, WLAN, OTA, or some other wireless network, etc.) to the set-top box for presentation. If the content is not stored in the wireless device, it may be requested from some other storage unit in any network using the set-top box by the user's own user interface. One or more of the photos transmitted to the set-top box may be stored in one of the memory units in the set-top box, or may be deleted automatically or by user's requests.

As shown, the television device 6502 and the set-top box 6504, as well as the set-top box 6504 and the set-top box interface 6508, may provide communication 6506. Additionally, the set-top box 6504, the set-top box interface 6508, the network 6528, and the tablet computer or phone device 6516, may communicate wirelessly 6510.

In one embodiment, the communication may be a physical cord between the television device and the set-top box, and between the set-top box and the set-top box interface. For example, a RF coaxial cable, an HDMI, and/or any other type of physical cord may be used to connect the devices. In another embodiment, the communication between the television device and the set-top box, and between the set-top box and the set-top box interface may occur wirelessly. For example, the wireless communication may occur by short-range communication protocol. In one embodiment, the short-range wireless communication protocol may include Wireless USB, Bluetooth, Wi-Fi, or any other wireless protocol which may function at a short-range. In another embodiment, the wireless communication between the set-top box and the network, between the set-top box and the tablet computer or phone device, between the set-top box interface and the tablet computer or phone device, and between the network and the tablet computer or phone device, may also occur by short-range communication protocol.

In another embodiment, any device which may transmit and receive a wireless communication may communicate with the phone device, network, set-top box, set-top box interface, or the television device to control at least some aspect associated with the television device. For example, other devices may include a cellular phone, another set-top box, a television computing device, a desktop computing device, a laptop computing device, another handheld tablet computer, and/or any other device which may transmit and receive a wireless communication and be used to control at least some aspect associated with the television device.

In a further embodiment, each device which may transmit and receive a wireless communication may a wireless transmitter, a wireless receiver, and a short-range wireless communicator. The wireless transmitter may be capable of transmitting a wireless-communication signal according to one or more communication protocols, such as those for a wireless LAN (Local Area Network) or a wireless PAN (Personal Area Network). These protocols may include those of the IEEE 802.11 and Bluetooth families of protocols. The wireless receiver may be capable of receiving a wireless-communication signal according to one or more communication protocols, such as those noted for wireless transmitter. The wireless transmitter and wireless receiver may be separate or combined (often called a transceiver) and may be hardware combined with or separate from software. The wireless transmitter and the wireless receiver may be capable of modulating and demodulating a wireless signal, respectively.

As shown, the network 6528 may include other users 6512 and a server 6514. In one embodiment, the other user(s) may be friends of the user of the television device who also want to participate (e.g. attend, watch a show together, etc.) virtually. In a separate embodiment, the other user(s) may be a parent verifying what a child is watching on television, a user who wants to log in to the television device system to watch a show, and/or any other type of user who may desire to connect to the network system to control at least some aspect associated with the television device.

In one embodiment, the network may include any type of network system (e.g. LAN, WLAN, WAN, MAN, CAN, PAN, DAN, etc.). Additionally, the network may be an intranet network system or an internet network system (e.g. cloud based, etc.).

As shown, the tablet computer or phone device 6516 may include a user interface providing a selectable pane for program listings 6518, video on demand 6520, DVR 6522, social 6524, and a control module 6526. Additionally, a popup of a selected pane 6528 relating to the social pane 6524 may be shown. Of course, in various embodiments, the selectable panes may be preconfigured for any specific function, and/or related application which may control at least some aspect associated with the television device.

In one embodiment, program listings may include electronic program guides (EPG). For example, the program listings may include a menu of current broadcast programming, as well as the schedule for current and/or upcoming programming. In some embodiments, the user may view past programs on the menu. In a separate embodiment, the EPG may work in association with a digital recorder (e.g. DVR, etc.) to automatically record shows so that when a past program is viewed on the menu, it may be selected and viewed on the television device.

In another embodiment, the EPG may be interactive. For example, the user of the tablet computer or phone device may select a program which would automatically launch the program. In other embodiments, the EPG may be non-interactive. For example, the menu may display current, future, or past programs. However, rather than selecting the item on the EPG, the user may use the non-interactive EPG as a reference to program (e.g. record, etc.) a show on a separate application, change the channel on the television device to go to the requested program, and/or perform any other command on the tablet computer or phone device to control at least some aspect associated with the television device.

Additionally, in other embodiments, the user interface may include a selectable pane for video on demand (VOD). For example, in one embodiment, the VOD system may stream content through a set-top box, a computer connected to the television device, or even directly to the television device. Additionally, the VOD system may download requested content to a device (e.g. computer, etc.), may record the requested content using a digital video record (e.g. DVR, personal video recorder, etc.), or may send the requested content to a portable media player for later viewing. In some embodiments, the VOD system may include pay-per view content, or may include free content. In other embodiments, the requested content may be received from the internet, from a cable provider, and/or any other VOD source. For example, in another embodiment, a VOD system may be included as in-flight entertainment. In such an embodiment, the user may select content available from the airlines. In other embodiments, the user may connect to his own set-top box at home (e.g. via internet, etc.), and request VOD from his own television device system. In a further embodiment, a user using the in-flight entertainment system may be connected to another set-top box system (e.g. a friend's system, etc.) and thereby interact and control at least some aspect associated with a friend's television device.

In another embodiment, controls may be associated with the VOD. For example, a user may pause, fast forward, rewind, and/or otherwise control some aspect associated with the VOD. For example, in another embodiment, it may be permissible to record at least a portion of the content of the VOD. In such an embodiment, a user may select to record a portion of the VOD, which may then be shared with the user's friends (e.g. shared on social networking, etc.).

In one embodiment, the user interface may include a selectable pane for digital video recorder (DVR). In another embodiment, the DVR may record the desired content in a digital format to a disk drive, USB flash drive, SD memory card or other local or networked mass storage device. In one embodiment, DVR functionality may be included on a set-top box. In another embodiment, DVR functionality may be included directly on the television device. For example, the television device may include a storage device and software to record desired content. Additionally, these systems may simplify the wiring and installation for the user, because they do not use ports (SCART or HDMI), and they only need to use only one device and power and the same remote control instead of two.

In some embodiments, the DVR may include features such as automatic commercial skip, the sharing of recordings over the Internet, recording onto DVDs, remote control facilities using PDAs, networked PCs, and Web browsers, and/or any additional feature which may alter some aspect associated with the desired content which is displayed on the television device.

In other embodiments, the DVR may be associated with a security system. For example, such a system may be capable of recording multiple input streams in parallel. Additionally, in one embodiment, the security system may include wireless ports (e.g. Bluetooth, WiFi, etc.), so that they can play and record files to or from cellular phones and other devices. In a separate embodiment, DVRs may record requested content in any format. For example, DVRs may record and play H.264, MPEG-4 Part 2, MPEG-2 .mpg, MPEG-2 .TS, VOB and ISO images video, with MP3 and AC3 audio tracks, and/or any other preconfigured format. Additionally, DVRs may be used to display images (e.g. JPEG, PNG, TIFF, etc.), and play music files (e.g. MPEG, etc.).

In one embodiment, the user interface may include a selectable pane for social features. For example, the social features may enable the user to connect to and interact with friends (e.g. other users through the network, etc.). For example, while viewing a program, the user may receive notifications from one of his friends, including, for example, "I'm loving this", "Check out this new show!" The notifications may relate to what the user is viewing, or may relate to a separate program. In situations where the notification refers to a separate program, the user may click on the notification which may take the user directly to what the friend is watching. In one embodiment, the user may see exactly what the friend was referring to (e.g. the program is shown at the same point as when the comment was made, etc.). The user may additionally activate a chat window and communicate with the friend that gave the notification. Other friends may see the notifications and likewise join the viewing. In a separate embodiment, the user may recommend the program (e.g. during the program, or after, etc.) on a social networking site (e.g. Facebook, Twitter, etc.).

In another embodiment, a status of a user may be automatically updated based on what the user is viewing. For example, a social networking site may be running (or running in the background) and thus displayed on a tablet computer while the user is viewing a program (e.g. selected utilizing the tablet computer, etc.). Such social networking site may include any of the features disclosed herein in connection with the social network site/functionality disclosed herein. In one embodiment, a status of the user on a social networking site may be automatically updated based on the program the user has selected and/or a current data stream associated with a viewed program. As an example, in one embodiment, the status of the user may indicate "Skip is watching Cheers," or "Skip is watching Cheers on Channel X," etc. Of course, such status update notifications may be automatically generated or generated manually.

In another embodiment, the user may invite others and/or be invited to view the television content/attend the television viewing session. This may be accomplished, in one embodiment, by treating the television content viewing session as an "event," etc. that can be scheduled, subject of invitations/acceptances, and/or related communications, etc., utilizing the social networking site.

In still additional embodiments, the planned television content viewing session may be associated with a social network "group" of members, particularly where the television content is reoccurring (e.g. a season of shows, etc.). The creation of such group may prompted by a first social network member (of a group of friends) to initiate the same, or by a content provider that controls, owns, and/or distributes the television content.

In another embodiment, the user may "check-in" to a viewing of the television content in connection with the social networking site. For example, the tablet/mobile device and/or television screen may, in response to selection of check-in icon/indicia, list a plurality of television content items for selection by the user, which in turn associates the television content/viewing session with a user profile of the user in connection with the social networking site.

In one embodiment, a user may initiate a posting of a comment/status (e.g. a "like" rating, etc.) in association with television content (inside or outside the context of any of the foregoing techniques, etc.). As an option, such selection may be effected by the user selecting a comment or status icon displayed on the tablet/mobile device and/or television screen. In such case, the user may select a location (e.g. home, at bar X, etc.) and/or television content, such that information on such location and/or television content may be included with the user's post via a social network site (e.g. a "wall," "feed," etc.).

In any of the embodiments disclosed herein, and particularly the comment/status posting and check-in functionalities, the television content items may include only and/or a combination of any one or more of: a television content item that has already been viewed (e.g. within a predetermined timeframe, within a predetermined threshold number of most recent items, etc.), a currently viewed television content item, a television content item scheduled to be viewed, a past/present/future television content time associated with at least one social member (e.g. "friend" of the user, etc.). In one embodiment, the foregoing items may be manually entered. In other embodiments, the forgoing items may be identified automatically, and automatically included or presented for manual selection by a user (e.g. via a drop down list, etc.). As an option, such drop down list and any other television content identification may only conditionally provided based on whether it has been established that the user is currently viewing/has viewed the television content, is a member of an associated group, has checked-in to a television content viewing session or related event, etc. To this end, the option to select television content (to comment upon, check-in in association therewith) is only presented if it is potentially relevant to the user's current activities or planned viewing activities.

In one embodiment, any of the foregoing television content item (and/or related information) to be included or referenced in a post, provided as an option to check-in, (or otherwise used), etc. may be automatically identified in any desired manner, such utilizing a electronic program guide (EPG), a database of scheduled recordings maintained by the user, a viewing history, and/or any other technique, etc. In another example, video and/or audio signatures may be used to identify the same by looking up signatures via an on-line database that correlates signatures with television content item identifiers/information. Still yet, the information associated with the television content item information may be gleaned from the EPG, metadata associated with a video, and/or may even include a segment (e.g. clip of a predetermined or configurable length, etc.) thereof.

In the case of a segment, a portion of television video content may be selected based on when a user either selects to check-in, selects an icon to initiate a process to post a comment (by invoking a comment screen, etc.), and/or selects to finalize the post process by actually posting, etc. In the context of one possible embodiment, if 10 minutes into a 1 hour video ("10 minute mark"), a user selects a post/comment button, and takes 5 minutes to draft a comment before actually posting the same; such comment may be accompanied by a video segment in the form of a video file of just the video segment, a pointer to the segment within a video file of the entire video, and/or link to any of the foregoing. Further, such video segment may begin at, be centered at, or terminate at the aforementioned 10 minute mark, so that a reviewer of the post may quickly access a relevant portion of the video that is being commented upon.

Thus, in some embodiments, a selection of such item-related information may be manually and/or automatically selected, in a manner similar to (or different from) the selection options set forth hereinabove with respect to selection of the items themselves.

In addition to selecting the location and/or television content in connection with the posting of the comment/status (or any other posting, for that matter) using the foregoing techniques, a privacy selection may also be designated to either limit or expand an audience who will have access to the comment/status. In various embodiments, such audience may include all social network members (i.e. no privacy) and/or a subset of the social network members that includes one or more of the following: members who are friends of the posting member, members who are colleagues of the posting member, members who have viewed the television content that is the subject of the posting in the past, members who are currently viewing the television content that is the subject of the posting (regardless of relationship with the posting member), members who have planned to view the television content that is the subject of the posting, members of the social network who are also members of a group affiliated with the television content that is the subject of the posting, etc. In one embodiment, the various options above may be delineated in a drop down list for selection purposes prior to posting, and/or may be manually configured, refined, edited, etc.

Thus, in various embodiments, the foregoing posting may be accomplished in a variety of ways. For example, the tablet/mobile device may be used to display the aforementioned comment/status indicia for selection on a screen of the tablet/mobile device to thereby initiate a posting via a posting interface that may include a comment/status text entry field, along with any of the selection mechanisms disclosed hereinabove (and hereinafter). In various embodiments, any of the foregoing television content (or related information, etc.) may be retrieved locally from the tablet/mobile device, the set top box and/or interface, and/or the server.

In other embodiments, the set-top box may be used to display the aforementioned comment/status indicia on the television for selection on an interface of the television to thereby initiate a posting via a posting interface on the television that may include a comment/status text entry field, along with any of the selection mechanisms disclosed hereinabove (and hereinafter). In various embodiments, any of the foregoing television content (or related information, etc.) may be retrieved locally from the set top box and/or interface, and/or the server. In such embodiment, the tablet/mobile device (or even a dumb-down remote control) may be used to control the set top box in the foregoing manner.

In still even another embodiment, the tablet/mobile device may be used to display the aforementioned comment/status indicia on the television for selection on an interface of the television to thereby initiate a posting via a posting interface on the television that may include a comment/status text entry field, along with any of the selection mechanisms disclosed hereinabove (and hereinafter). This may, for example, be accomplished by way of direct communication with the television and/or set top box/interface. Or, in other embodiments, it may be accomplished by way of communication between the tablet/mobile device and the server which, in turn, communicates with the set top box/interface (which controls/displays via the television).

In other embodiments, this may be accomplished without the set top box, such that the tablet pushes visual interfaces directly to the television (and thus operates as a set top box/interface). Again, as in the previous various embodiments, any of the foregoing television content (or related information, etc.) may be retrieved locally from the set top box and/or interface, and/or a server. In such embodiment, the tablet/mobile device (or even a dumb-down remote control) may be used to control the set top box in the foregoing manner.

As is thus readily apparent, any one or more components and/or functionalities disclosed in connection with the television device 6502, the set-top box 6504, the set-top box interface 6508, and/or the tablet computer or phone device 6516; may be integrated with one or more of the television device 6502, the set-top box 6504, the set-top box interface 6508, and/or the tablet computer or phone device 6516. For example, the television device 6502 may include the functionalities of the set-top box 6504 and/or the set-top box interface 6508 (and even the tablet/mobile device 6516), such that just the tablet/mobile device 6516 is required to operate therewith (or a dumb-down remote control).

To this end, the social networking ability may be part of the television device, the set-top box, the tablet computer or phone device, or any other device which may be connected to the television device and which may control at least some aspect of it. In another embodiment, all features relating to the social networking may be controlled and received by the tablet computer or phone device. For example, a user may use the tablet computer or phone device to communicate with other friends while away from the television device. When the user is within a preconfigured proximity to the television device, checked-in to a viewing session, etc.: however, the user's tablet computer or phone device may automatically connect to the television device (directly or via a set-top box and/or server), in order to control at least some aspect associated with it (see functionality disclosed hereinabove). For example, after turning on the television device, the screen may include an overlay of what other friends are viewing, a list of saved chats of things to view on the television device, and/or any other further social networking interaction (e.g. posts, comments, likes, etc.) between the user and at least one friend.

In one embodiment, the tablet computer or phone device may communicate the social networking features directly to the television device (e.g. wirelessly, etc.). In other embodiments, the tablet computer or phone device may interact with the set-top box, or the set-top box interface, to communicate the social networking features to the television device. In another embodiment, social networking features may reside on the network side (e.g. within Internet Protocol (IP) Multimedia Subsystem (IMS) platform, within the IMS platform, within a server system, etc.).

In one embodiment, comments associated with a program that are made by social media contacts may be displayed on the television. In one embodiment, the comments may be displayed on the television in the form of a dialogue box or pop-up. In one embodiment, the comments may be displayed on a portion of the screen that is not interfering with viewing the program (or minimally interfering). For example, in one embodiment, the comments may be displayed at the bottom of the screen.

In one embodiment, all social media contacts that are watching the program and that have selected to view comments may be capable of viewing the comments. In one embodiment, the user that initiates the comments may restrict other users from viewing the comments. In one embodiment, each comment may indicate the user from which it originated. In one embodiment, only the most recent comments may be presented on the screen. For example, in one embodiment, only the last two most recent comments may be presented. In another embodiment, the number of comments presented may be configurable by each user.

In one embodiment, the comments may be introduced as sprites. In the context of the present description, a sprite refers to any two-dimensional image, animation, text, or graphical overlay that is integrated into a larger scene, scene, image, or series of images. In one embodiment, a set-top box may introduce the comments as sprites. In another embodiment, the tablet may introduce the comments as sprites. In another embodiment, a mobile phone may introduce the comments as sprites. In one embodiment, the tablet may communicate with the set-top box to introduce the comments as sprites. In another embodiment, the phone may communicate with the set-top box to introduce the comments as sprites. In one embodiment, the comments may originate from a user typing on the tablet computer. In another embodiment, the comments may originate from a user typing on a mobile phone. In another embodiment, the comments may include voice comments. In one embodiment, the tablet or the mobile phone may receive voice comments from a user, convert the voice comments to text, and utilize the text to generate the comment. In one embodiment, the comments may be posted on the social networking site and may be transferred to the television. More information will be set forth later on various options regarding such commenting, which may or may not be incorporated with the foregoing.

Additionally, in other embodiments, the social networking application may enable a television viewer to join or form an online community for purposes of television viewing, indicate the viewer's "television presence" (e.g., what television programming the viewer is currently watching or recording, etc.), determine what other community members are watching, provide feedback on television programs, communicate with other community members, and use community viewing habits and preferences to determine what to watch or record. In one embodiment, the social networking application may provide interoperability with one or more communities contained in external online social networks 121 (e.g., Facebook, Myspace, etc.). Such social network communities may be considered external in a sense that they are not controlled by the service provider, and thus, are not part of the service provider's communication system. Interoperability with external online social networks may enable users to import existing community information and to share presence/status updates and other information across different heterogeneous social networks.

In some embodiments, the social networking application (e.g. located on the computer tablet or phone device, etc.) may work with a communication module and/or a media server. Such modules, located on any of the devices which may interact (e.g. communicate, etc.) with the television device may assist the social networking application to establish a communication session among community members (e.g. friends of the user, etc.) who are watching the same television program. In one embodiment, these communications sessions may include instant messaging, Short Message Service (SMS), Multimedia Message Service (MMS), e-mail, voice, or video sessions depending on the capabilities of the user's media devices and preferences specified in user profile. In other embodiments, the social networking application may determine the most appropriate type of communication session, the communication module may direct the communication to the appropriate target devices, and the media server may convert the communication and any associated media content to a format appropriate for the target device.

In one embodiment, the use of IP may permit television services to be integrated with broadband Internet services, and thus, share common connections to a user site. In another embodiment, IP packets may be more readily manipulated, and may provide users with greater flexibility in terms of control, as well as offer superior methods for increasing the availability of media content. For example, the social networking functionality may be delivered through a multicast (or unicast) from the IPTV system.

In another embodiment, the tablet computer or phone device may be configured to process data streams, including causing a social networking application and/or one or more components of received media content (e.g., video component and/or an audio component) to be presented on (or at) the television device. Presentation of the media content may be in response to a command received from the social networking application, and may include: displaying, recording, playing, rewinding, forwarding, toggling, selecting, zooming, or any other processing technique that may enable users to experience media content. For example, the tablet computer or phone device may provide one or more signals to the television device so that the display may present social networking application overlaid on the media content (e.g., video 219) to a user, wherein the social networking application enables users to interact with other members of the social network or community. Alternatively, in another embodiment, signals from the tablet computer or phone device, may be configured and provided to the television device in response to a received control command from the social networking application.

In some embodiments, the social networking application may require some type of authentication. For example, authorization schemes may be provided by the service provider network and/or various other content providers (e.g., broadcast television systems, third-party content provider systems, servers, etc.). In various embodiments, types of authentication may include a user name and password, a key access number, a unique machine identifier (e.g., MAC address), and the like, as well as combinations thereof. In one embodiment, authentication information may be stored locally at memory, in a repository connected to a set-top box or to the tablet computer or phone device, or at a remote repository (e.g., user profile repository, etc.).

In another embodiment, the authentication process may occur on an authentication module (e.g. located on the set-top box, the set-top box interface, the tablet computer, the phone device, etc.). In one embodiment, the authentication module may facilitate the reception of data from single or disparate sources. For example, in various embodiments, the tablet computer or phone device (or the set-top box, or the set-top box interface, etc.) may receive a broadcast video from a first source (e.g., IPTV system via packet-based network, etc.), signals from social networking applications at a second source (e.g., IMS platform, connected friend, etc.), and a media content stream from a third source accessible over a data network. In such a configuration, the television device (e.g. sent via the tablet computer or phone device, etc.) may present the broadcast video, social networking applications, and media content stream to the user. This presentation may be experienced separately, concurrently, in a toggled fashion, or with zooming, maximizing, minimizing, or trick capabilities, or equivalent mode.

In one embodiment, the tablet computer or phone device may be configured to also include a presentation module by which a presentation may be displayed on the television device. For example, a presentation by the user may be displayed on the user's television device, as well as on other friends' television devices. The presentation may allow for interaction (e.g. chat, comments, etc.) to be viewed as the presentation progresses. In another embodiment, the presentation module may be configured to receive data streams (e.g., AV feed(s) and/or social networking control commands, etc.) and output a result to the television device.

In another embodiment, the presentation module may provide a user interface for the social networking application to be displayed on the television device. For example, in certain embodiments, the social networking application may be overlaid on the video content output of the television device via the presentation module. In any case, however, the data streams may include content received in response to user commands specifying: broadcast channels to be made available, a list of media content to be recorded, an on-demand program (e.g., VOD, AOD, etc.) to be received, or other content available over a data network to be retrieved, such as content from an audio and/or video sharing site.

In one embodiment, members of an online social network may be invited to view a particular program by the user of the television device. In some embodiments, the invitation may occur through a set-top box, a set-top box interface, a computer tablet, a phone device, and/or any additional device which may be connected to the television device and which may control at least some aspect associated with it. Further, in some embodiments, invitations may be displayed in the program guide, or on the television device display, so that invitees may quickly determine whether they are available to view the offered program and provide a response.

In a further embodiment, the tablet computer, the phone device, the television device and/or any device which may receive an invitation may be configured to automatically accept invitations from community members designated as "best friends" or equivalent, record invitations from community members designated as "OK friends" or equivalent, and decline invitations from community members designated as "blocked friends" or equivalent. Of course, in other embodiments, the user may have the option to manually override automatic invitation responses. Consequently, the process determines whether the user has configured the device receiving the invite for automatic invitation responses. If such a feature is invoked, the device receiving the invitation may respond according to the selections/criteria provided by the user.

In one embodiment, an invitee may respond in a variety of manners. For example, if no automatic response is set, the invitees may respond, but not limited to, in one of three ways: (1) accept the invitation to view the program live; (2) accept the invitation to record the show, in which case the recording also will include all community events related to the program (e.g., program feedback, instant messaging chat logs, e-mail transcripts, etc.); or (3) decline the invitation. Of course, in other embodiments, any customizable response may be preconfigured and set by the user.

In other embodiments, the user may interact with other users (e.g. friends, etc.) via the social networking application in a variety of other ways. For example, the user may launch a game to be displayed on the television device, and invite other users to participate in the game. In such an embodiment, the social networking game may be an overlay on top of a televised program, or may be in the foreground of the television device. In another embodiment, the social networking application may be used to foster collaboration between users by providing a whiteboard on the television display and receiving inputs from other users which are displayed in real time on the television device.

In some embodiments, the user may input through the tablet computer or phone device a rating of what is being viewed on the television device. For example, while watching or after watching a television program, the user may select "like" or "dislike" which may automatically update a social networking page (e.g. Facebook, Twitter, etc.). In another embodiment, the user may share snapshots of what is being, upload links that were displayed on the television program (i.e. interactive selections, etc.), or otherwise post some update from the user or from any of the user's friends. Additionally, the user may commence an interactive viewing session with other friends. Such an interactive viewing session may include providing access to the controls (e.g. play, pause, search for a new video, etc.) to any of the users or friends logged into the interactive session. Additionally, when an interactive video session is started, the chat feature may be muted to everyone by default. In another embodiment, a button may be provided to override the default mute action. Of course, in a variety of embodiments, the social networking application may be preconfigured to operate in any manner desired by the user.

In one embodiment, the user may be presented with a list of recommended shows to watch, based off of "likes" or ratings otherwise given by the user's friends. For example, if more than one user indicates that they "like" the program, the program may appear on a recommended viewings pane for the user. In a separate embodiment, content viewed by the user may be uploaded to be stored (e.g. DVR, cloud based storage system, etc.). At a later time, the user may then wish to select the uploaded content and share it (e.g. post it to a social networking page, send it to a friend, etc.). Thus, the interaction between the user and the user's friends may be in real-time (e.g. synchronous interaction, etc.), or may occur asynchronously. Additionally, storing content to be later shared may enable the user to preview content to be shared to avoid any potentially embarrassing content from being posted and/or shared.

In one embodiment, the user interface may include a selectable pane for a control module. For example, in one embodiment, the control module may be used to control any aspect of the television device (e.g. volume, brightness, sleep period, etc.). In another embodiment, the control module may be used to configure any aspect of the set-top box or of the set-top box interface. For example, in one embodiment, the authorization process, the cable subscription process, and/or any other process relating to a set-top box and a television device, may be configured, In a further embodiment, the control module may be used to configure any aspect of the tablet computer or phone device. For example, in one embodiment, the user may configure social networking settings, including friend status (e.g. "best friends," "ok friends," "blocked friends," etc.), automatic configuration settings upon connection between the television device (or any other) and the tablet computer or phone device (e.g. display a list of recommended programs to view, etc.), remote login settings (e.g. ability to log in to the television device from afar and control social networking and at least some aspect associated with the television device, etc.), and/or any additional function which may relate to social networking settings and at least some aspect associated with the television device.

Figure 66:
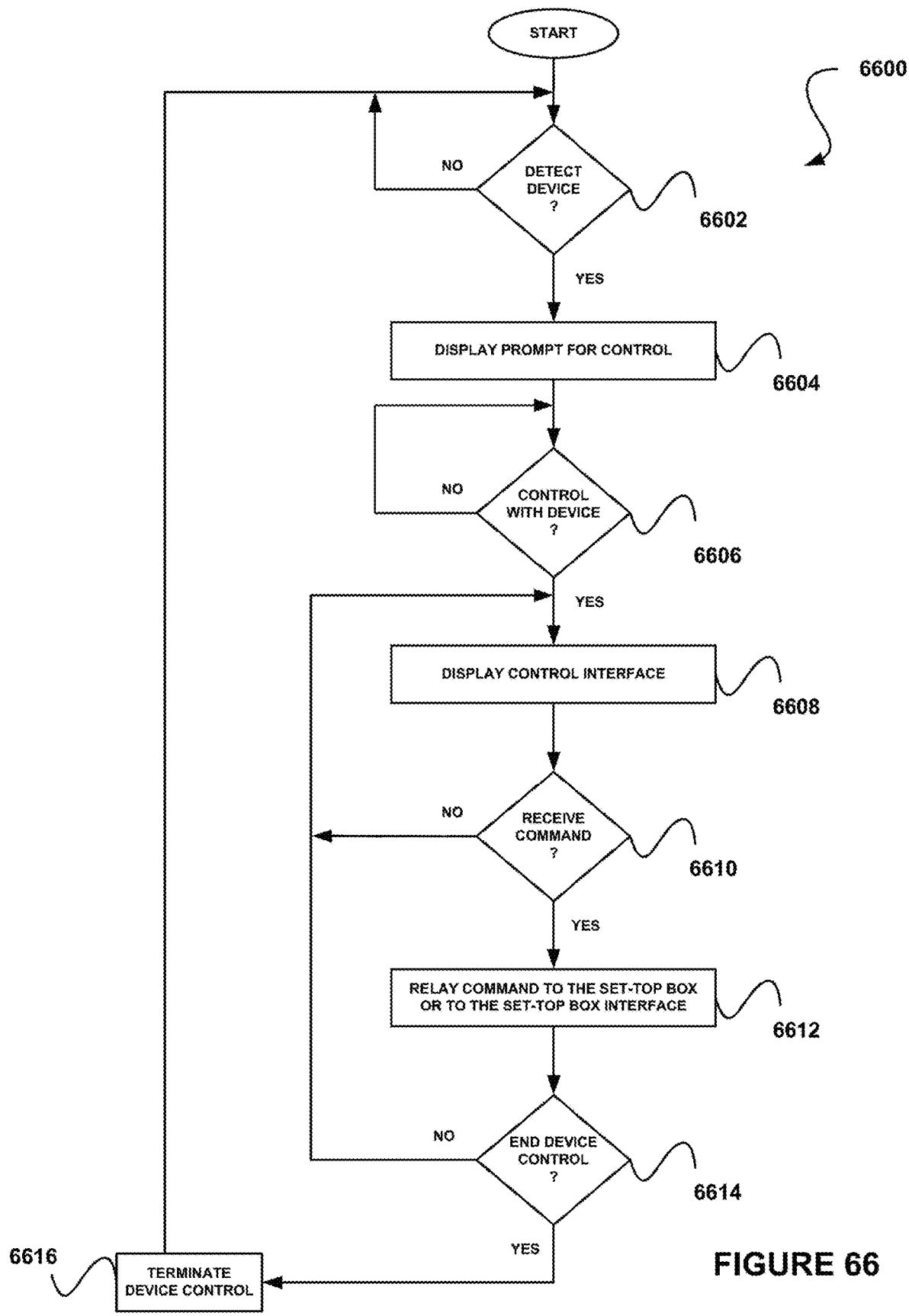
FIG. 66 shows a method for controlling a television device by a client device, in accordance with one possible embodiment.

FIG. 66 shows a method 6600 for controlling a television device by a client device, in accordance with one possible embodiment. As an option, the method 6600 may be implemented in the context of the architecture and environment of the previous Figures or any subsequent Figure(s). Of course, however, the method 6600 may be carried out in any desired environment. It should also be noted that the aforementioned definitions may apply during the present description.

As shown, it is determined whether a device is detected. See decision 6602. In various embodiments, the device may be detected by a variety of methods. For example, in one embodiment, the device may be detected manually. In one embodiment, the tablet computer or phone device may, upon a selection by the user, detect potentially devices to which it may connect to (e.g. television device, set-top box device, set-top box interface, etc.). In another embodiment, a separate device (e.g. television device, set-top box device, set-top box interface, etc.) may detect, upon a selection by the user, the tablet computer or the phone device. Additionally, the selection by the user (on any of the devices, including, e.g., television device, set-top box, set-top box interface, tablet computer, phone device, etc.) may include a voice command (e.g. "discover devices," etc.), a touch selection on the touchscreen, an activated button on the device, etc.

In one embodiment, the device may be detected automatically. For example, in one embodiment, the tablet computer or phone device may have preconfigured settings wherein once the device is within a set proximity (e.g. within ten feet, etc.) of the television device (or the set-top box, set-top box interface, etc.), the tablet computer or phone device may be automatically detected. In another embodiment, the tablet computer or phone device may have preconfigured settings wherein once the device is connected to a local network (e.g. WiFi, etc.), the tablet computer or phone device may be automatically detected (e.g. seen by other devices, etc.). In other embodiments, the tablet computer or phone device may be detected by a variety of other methods. For example, Bluetooth, NearField Communication, ZigBee, or any other short-range communication, may be used to detect a device.

In some embodiments, once the device has been detected, communication between the devices (e.g. between the tablet computer or phone device and the television device, set-top box, or set-top box interface, etc.) may be automatically established. In one embodiment, the communication may be manually established by selecting a "connect to" button, giving a voice command (e.g. "connect to the device," etc.), and/or otherwise giving some command to the device to establish communication with another device.

In some embodiments, the device may be detected by connecting a physical cord between the tablet computer or phone device and another device (e.g. television device, set-top box, set-top box interface, etc.). Similar to as explained above, once a cord is attached, communication may be established (automatic or manual, etc.) between the two devices. In a further embodiment, the device may be detected by placing it in a mount.

As shown, if it is determined that a device is detected, a prompt for control is displayed. See operation 6604.

In one embodiment, the prompt for control may relate to authentication. For example, the user of the device may have the ability to opt in to controlling another device. In one embodiment, the device may include a user interface where a prompt is displayed stating "Would you like to control DEVICE X?" or "Please enter DEVICE X Passcode to control DEVICE X," or any other type of prompt where the user may decide whether to control the other device. As has been illustrated, the authentication protocols may be integrated along with granting control to a device. Of course, in other embodiments, the authentication process may be a separate process (e.g. after desiring to control DEVICE X, the user may be prompted to then enter a passcode, etc.) or may only arise with respect to certain features of the device (e.g. changing user account settings, etc.).

In another embodiment, a prompt for control may be dependent on whether it is a first time connection or an already established connection. For example, if the device is being used to control for the first time, a wizard screen may be displayed on the device to walk the user through a series of steps to properly set up the connection between the device and the controlled device (e.g. what aspects will be controlled, connection to be established automatically in the future, etc.). In another embodiment, the user may set up the connection manually (e.g. advanced setup, etc.) or it may occur automatically (e.g. apply default settings, etc.).

In one embodiment, if the device (e.g. tablet computer or phone device, etc.) has an already established connection with the device to be controlled (e.g. television device, set-top box, set-top box interface, etc.), a preconfigured page may be displayed on the device. For example, the page may state "You may now control DEVICE X," or any other prompt which may be preconfigured by the user. In a separate embodiment, no prompt may be displayed and control of the device may be automatically established.

In a further embodiment, once a device has been detected, the tablet computer or phone device may automatically take on a preconfigured interface. For example, if a user was viewing a movie on the tablet computer and then connected to the television device, the display on the tablet computer may be altered in that the movie display (which was in full-screen) may be reduced to a small window and additional functions (e.g. relating to the television, including, e.g., volume, channel, brightness, etc.) may be displayed on the screen along with a program guide and recommended programs from social networking connections. The movie that was being displayed may then be displayed on the television device. Of course, in another embodiment, the display of the tablet computer (or phone device, or any device which is being used, etc.) may be preconfigured in any manner by the user.

As shown, it is determined whether to control with device. See decision 6606.

In some embodiments, the device may automatically or manually establish control with device. For example, in one embodiment, the device may sense that the tablet computer or phone device is being used to control the device for a first time. In such a scenario, the device may request additional information from the user (e.g. authentication requirements to apply in the future, prompt to be displayed, etc.). In another embodiment, where control had already been established once before, a simple prompt of "Would you like to control DEVICE X" may be given with the ability to select "yes" or "no". In other embodiments, any type of prompt may be given to the user requesting user input relating to establish control of a device.

In other embodiments, the device may automatically establish control with device. For example, in one embodiment, the device may sense that the tablet computer or phone device is being used to control the device for a first time. In such a scenario, the tablet computer or phone device may recognize that it is a first-time connection but may determine that a similar connection (e.g. of another multimedia device, etc.) had been made in the past and apply applicable settings to the control of the device. Of course, in some embodiments, the user may preconfigure the automatic settings of the tablet computer of phone device relating to new connecting to new devices. In other scenarios where it is not a first-time connection (e.g. connection with the device has occurred at least once in the past and been set up, etc.), the device may automatically agree to control the device with the tablet computer or phone device.

As shown, if it determined to control with device, a control interface is displayed. See operation 6608.

In one embodiment, the control interface may be dependent on the user using the tablet computer or phone device. For example, if a parent were logged into the tablet computer or phone device, the user may have unlimited access to all features (e.g. programs, channels, etc.) associated with the television device. In another embodiment, if a child were logged into the tablet computer or phone device, the user may have limited access to the features (e.g. only a few channels, limited times of viewing, etc.). Additionally, in other embodiments, the screen control interface may be personalized according to the user of the tablet computer or phone device. In various embodiments, the control interface may be altered (e.g. layout may be rearranged, color schemes, etc.) according to media preferences (e.g. focus on news stories and programs, family friendly programming, etc.), time of day (e.g. morning focuses on news, evening focuses on entertainment, etc.), user (e.g. classics programming for the elderly, cartoons for kids, etc.), and/or by any other feature which may alter the control interface. In another embodiment, the control interface may be associated with policies or roles. For example, all kids, parents, and even guests (e.g. restrictions on purchasing, etc.) in a household may have a preconfigured (e.g. by the administrator, etc.) control interface.

Additionally, in one embodiment, more than one device may be connected to the set-top box, the set-top box interface, and/or the television device. The control interface may be adapted and/or altered depending on the number and types of devices that are connected. For example, if a parent and a child each had a tablet computer, the parent's tablet computer may displayed the control interface relating to controlling the program they are viewing, and the child's tablet may display a social networking interface relating to the program being viewed (and which may be viewed on the television device as well). Thus, the control interface of more than one device may be used in association to control some aspect relating to the television device.

As shown, it is determined whether a command is received. See decision 6610.

The command may be made or received by any technique. For example, in various embodiments, a command may be received through a selection (e.g. select a feature on the control interface, etc.), through an auditory command, through a physical button, a keystroke, and/or any other method by which a command may be received.

As shown, if it is determined that a command is received, a command to the set-top box or to the set-top box interface is relayed. See operation 6612.

In various embodiments, the set-top box or the set-top box interface may receive a command wirelessly or by a physical connection. For example, in one embodiment, the tablet device may be mounted onto a centralized coffee table, with a cord running from the mount to the set-top box. In another embodiment, the command may be received through a short-range wireless communication (e.g. WiFi, Bluetooth, Zigbee, etc.).

As shown, it is determined whether to end device control. See decision 6614. Additionally, if it is determined to end device control, the device control is terminated. See operation 6616.

In some embodiments, a period of inactivity may cause the device to end control. For example, in one embodiment, the tablet computer or phone device may have a time-out setting (e.g. one hour, etc.) where if no user input is received, the device may end control. In other embodiments, as long as the device is within a set proximity of the television device (or set-top box, set-top box interface, etc.), the device may always retain control.

In one embodiment, if the set-top box, the set-top box interface, and/or the television device is powered off, the device control may automatically end. Additionally, in other embodiments, if the device is taken beyond the proximity of the television device (or set-top box, set-top box interface, etc.), the device control may automatically end. Where the device has been taken beyond the proximity border (e.g. 50 feet, etc.) and the device control has ended, the device interface may resume the preconfigured standard (i.e. not attached to any other peripheral device, etc.) settings and user interface. Additionally, if the device has been logged off of a network (e.g. WiFi, etc.), the device control may end. In one embodiment, where a device has been logged off of a network due to a network error (e.g. IP conflict, etc.), the device may reestablish connection, and hence control, with the television device through an alternative short-range wireless communication (e.g. Bluetooth, Zigbee, etc.). Of course, in some embodiments, the device may have a preconfigured time limit (e.g. 5 minutes, etc.) wherein control may be established by an alternative wireless means (e.g. Bluetooth, Zigbee, etc.) before reverting back to the tablet's preconfigured interface (based off of no connections with peripheral devices, etc.).

Figure 67A:
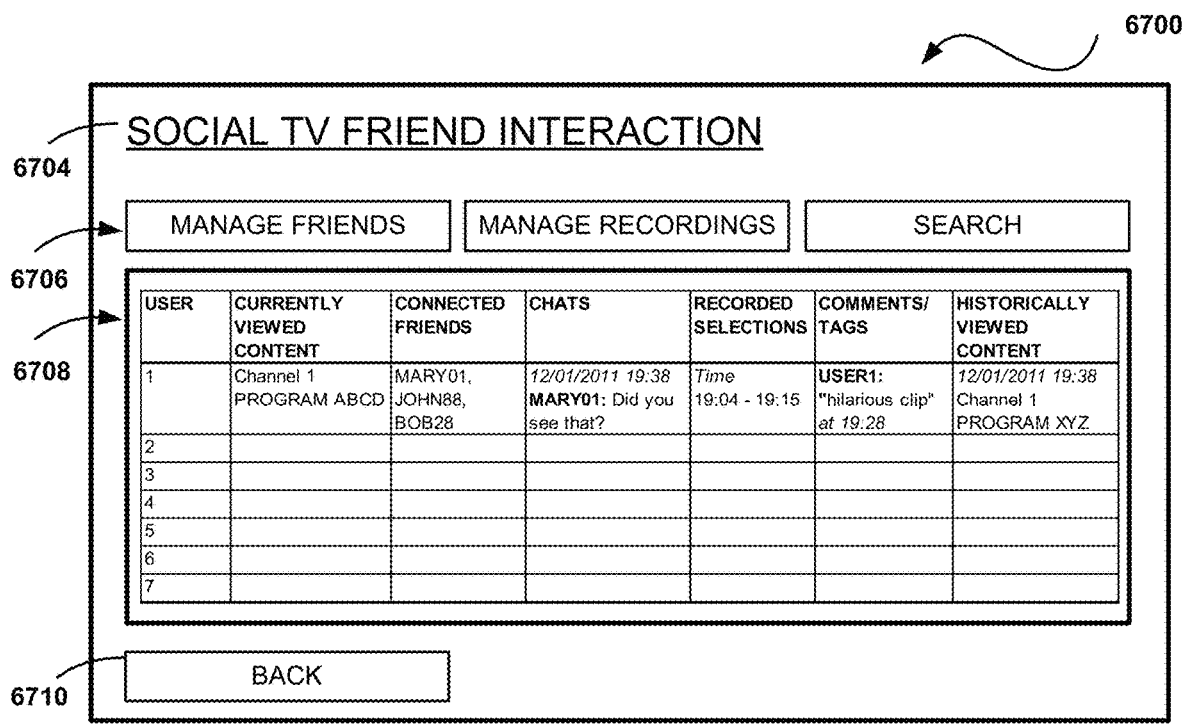
FIG. 67A shows a user interface for managing social interactions, in accordance with one possible embodiment.

FIG. 67A shows a user interface 6700 for managing social interactions, in accordance with one possible embodiment. As an option, the user interface 6700 may be implemented in the context of the architecture and environment of the previous Figures or any subsequent Figure(s). Of course, however, the user interface 6700 may be carried out in any desired environment. It should also be noted that the aforementioned definitions may apply during the present description.

As shown, the user interface may include a title navigation bar 6704, a series of selectable buttons for receiving user feedback 6706, a pane associated with past and currently viewed programs organized by user 6708, and a navigation button 6710.

In one embodiment, the title navigation bar may be static. For example, the title bar may be comprised of text including, e.g., "social TV friend interaction," or any other preconfigured text. In another embodiment, the title navigation bar may be dynamic. For example, the title may display headlines from a RSS feed or stream, or updates from social networking sites. In another embodiment, the title navigation bar may include both static and dynamic features. For example, a static title may be displayed by default until an update arrives at which time the static title fades (or decreases in opacity) to display the feed update. In a separate embodiment, the title navigation bar may provide for user interaction. For example, if an RSS feed is displayed on the title navigation bar, a user may select the feed which may automatically bring up the full content associated with the feed. Of course, the interaction with the title navigation bar as just described may be applied to any navigation bar pane within the user interface on the tablet computer o phone device associated with controlling at least some aspect associated with the television device.

In another embodiment, the series of selectable buttons for receiving user feedback may relate to any preconfigured function. For example, in one embodiment, the selectable buttons may include "manage friends," "manage recordings," "search," and/or any other button which is set by the user. Through "manage friends," the user may add/delete and/or otherwise manage a list of current friends. Additionally, the user may select policies or rules to be applied to every friend. For example, the user may group together a grouping of friends (e.g. "best friends," etc.) and establish a policy whereby if anyone from the "best friends" list should send him a message that it may automatically appear on the screen of both the tablet computer or phone device and on the television device as well. Additionally, the user may search for additional friends to add to the list of friends and with which interaction may be established. In a further embodiment, the user may discover a potential friend and make an initial contact with the person (e.g. user may send message to potential friend, "I like watching PROGRAM X. Would you like to watch it with me and interact?" In another embodiment, the "manage friends" tab may correlate friends list from a variety of social networking media sites (e.g. Facebook, Twitter, etc.).

In one embodiment, the policies may be associated on a hierarchy. For example, policies associated with friends may rank lower in priority than policies associated with other users of tablet computers or phone devices which may connect also to the television device. In one embodiment, more than one user may be connected to the television device, and each may control at least some aspect associated with the television device. Where more than one tablet computer or phone device is connected to control at least some aspect associated with the television device, the tablet computer or phone device may have a master device whose policies may control. For example, if a parent and child each have their tablet computer connected to control at least some aspect associated with the television device, the parent's tablet computer may be ranked higher in a hierarchy compared to the child's tablet computer, and thus, the parent's policies may apply to what is viewed on the television device. The policies applied by the parent may determine the extent to which other devices (e.g. the tablet computer associated with the child, etc.) may interact and control at least some aspect associated with the television device. In a separate embodiment, if several friends gathered at one location to watch a program, and if each of the friends had a tablet computer, the user of the tablet computer who lives at the location may have a higher priority than the friends (e.g. guests, etc.) which may be logged into the local network system.

In one embodiment, the manage recordings button may be associated with any recording made using the tablet computer and/or phone device associated with the television device. For example, in one embodiment, the user may preprogram a show to automatically record at a certain time (e.g. DVR, etc.). In another embodiment, while viewing a program, the user may decide to go back to a certain time location (e.g. hour 0: minutes 14, etc.) and record a segment of a show. Of course, in such an embodiment, the set-top box may include the ability to go back in time on a program (e.g. up to 30 minutes, etc.). In another embodiment, while viewing a program, the user may desire to record what is being viewed and may record a segment. In a further embodiment, if a user watches a program with more than one friend at more than one location, any of the friends may be configured to record at least a portion of the program, send the program to each of the friends, and/or potentially distribute the saved recording among the number of participants so that the recording is equally stored (e.g. ⅕ of the entire show is saved on each of the five participants devices, etc.) on each of the devices so that not one user has the burden of saving the program.

In another embodiment, the manage recordings may also be used to synchronize and apply settings associated with social networking. For example, recordings made by a user may be set to automatically upload to a social networking site with a preconfigured template comment (e.g. "I just watched _____. It was great. Check out this clip." etc.). In other embodiments, the recordings may be configured to associate with a blog, a feed, and/or any other type of social networking related function.

In a separate embodiment, the recordings may be manipulated. For example, the user may extract the audio track from the video recording, may capture a single image from the video recording, may input comments (e.g. written subtitles, audio overlay, etc.), and/or otherwise alter the recording in some manner. Thus, in various embodiments, the user may be permitted to interact more fully in altering the recordings. Of course, the altered recordings may be shared in any manner as described hereinabove or below.

In one embodiment, the selectable buttons may include a search feature. The search feature may permit the user to search for chats, friends, selections, users, viewed content, recorded content, and/or any feature and/or content which may relate at least in some aspect to interacting with the television device. In one embodiment, the search function may be linked to an external site search engine (e.g. Google, etc.) to search the content locally (e.g. on your tablet, etc.) or may relate to social networking in that content, e.g., uploaded and shared by your friends may relate to at least some aspect (e.g. a good program recommended by a friend in their posting, etc.) associated with a television device.

In one embodiment, a pane may be associated with past and currently viewed programs organized by a user. For example, list in the pane may be organized by the user and be associated with friends, content, comments, etc. that relate to the user and the associated program. In one embodiment, upon selecting a user, a separate user interface may open wherein the pane may be organized by programs viewed and being viewed. Information relating to the programs (e.g. date, time, channel, friends connected, etc.) may be displayed on separate columns. In a further embodiment, the user may select any of the aspects associated with the program to access greater detail relating to the information. For example, in relation to a program which aired on Nov. 5, 2011, the user may select the comments box to see all comments which were posted by friends relating to that program. In another embodiment, the user may click on a specific friend (e.g. "MARY01," etc.) to view what programs that friend has viewed and may be viewing. For example, after clicking on a friend's social networking id, the pane may display a list of programs that the friend has viewed and may be viewing, listed by the date the program was recorded.

In another embodiment, the list may include a title of the user that is currently logged into the tablet computer or phone device (e.g. "Bob," etc.), and the list may be organized by the programs viewed by the date recorded. In one embodiment, the list may be populated automatically (e.g. keeps a running history of all actions/events, etc.). For example, in various embodiments, receiving a comment, saving at least a portion of the program, receiving chats during a program, and/or receiving or sending anything to enable interaction during or after a program may cause the history table to be populated. In another embodiment, the user may select which programs and/or actions may be saved to the pane. For example, while viewing a program, the user may select "save to history" to save the program and associated comments, recordings, etc.

In a further embodiment, the list may be reorganized by selecting any of the column titles located in the header of the table (e.g. the top row, etc.). For example, if a user wanted to organize the content based off of chats, the user may select "chats" in the header of the table to reorganize the table based on chats. Additionally, the user may create any additional columns and/or criteria as necessary to improve interaction between the user, the television, and any social networking.

In one embodiment, the user interface may include a "back" button to enable the user to go back to the control interface to control at least some aspect associated with the television device (e.g. channel, volume, mute, program listings, etc.). Of course, in other embodiments, the navigation button may be preconfigured in any manner and assigned to any preconfigured function (e.g. save changes, create new recording, etc.). Additionally, in one embodiment, the tablet computer or phone device may have touch sensitive or physical buttons including a back button. As such, a back button on the user interface may not be necessary in such circumstances.

Figure 67B:
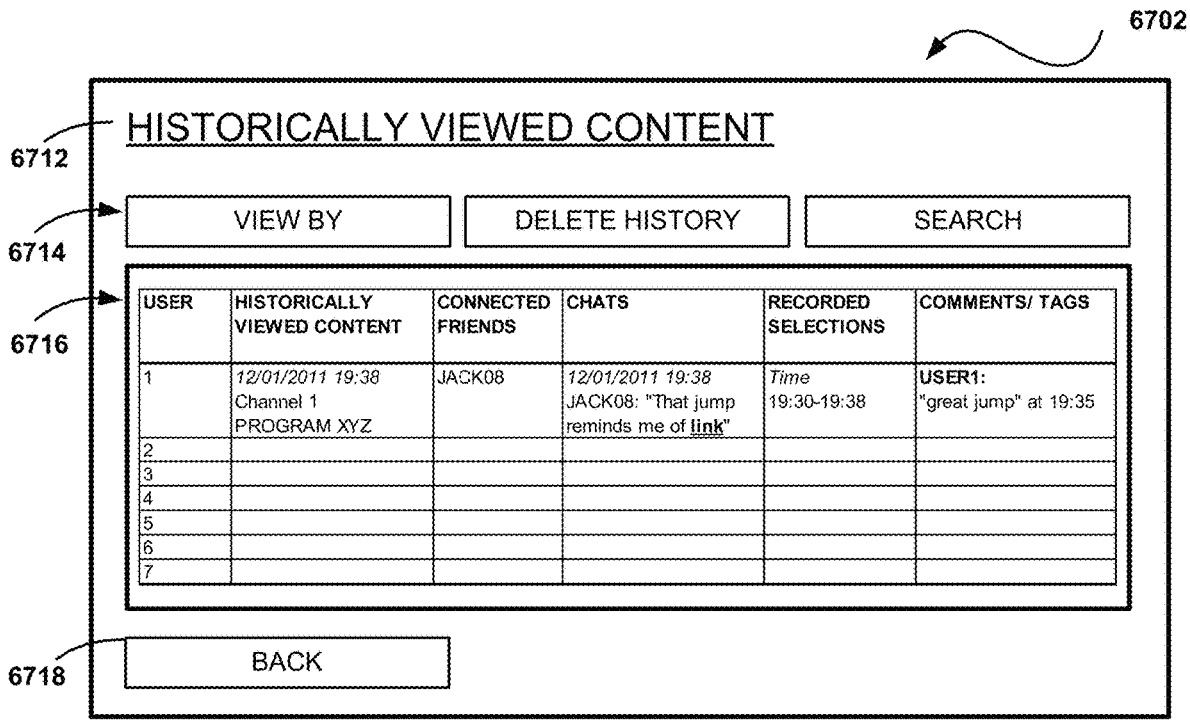
FIG. 67B shows a user interface for managing historically viewed content, in accordance with one possible embodiment.

FIG. 67B shows a user interface 6702 for managing historically viewed content, in accordance with one possible embodiment. As an option, the user interface 6702 may be implemented in the context of the architecture and environment of the previous Figures or any subsequent Figure(s). Of course, however, the user interface 6702 may be carried out in any desired environment. It should also be noted that the aforementioned definitions may apply during the present description.

As shown, the user interface may include a title navigation bar 6712, a series of selectable buttons for receiving user feedback 6714, a pane associated with past and currently viewed programs organized by user 6716, and a navigation button 6718.

In one embodiment, the title navigation bar may be static. For example, the title bar may be comprised of text including, e.g., "social TV friend interaction," or any other preconfigured text. In another embodiment, the title navigation bar may be dynamic. For example, the title may display headlines from a RSS feed or stream, or updates from social networking sites. In another embodiment, the title navigation bar may include both static and dynamic features. For example, a static title may be displayed by default until an update arrives at which time the static title fades (or decreases in opacity) to display the feed update. In a separate embodiment, the title navigation bar may provide for user interaction. For example, if an RSS feed is displayed on the title navigation bar, a user may select the feed which may automatically bring up the full content associated with the feed. Of course, the interaction with the title navigation bar as just described may be applied to any navigation bar pane within the user interface on the tablet computer o phone device associated with controlling at least some aspect associated with the television device.

In another embodiment, the series of selectable buttons for receiving user feedback may relate to any preconfigured function. For example, in one embodiment, the selectable buttons may include "view by," "delete history," "search," and/or any other function which is set by the user. The view by button may permit the user to arrange the user interface screen in any manner. For example, the pane displaying the historically viewed content may be enlarged to fill most of the screen while navigation buttons may be reduced in size, the text on the screen, the colors displayed, or any other esthetic feature may be altered and/or configured by the user. In another embodiment, the view by feature may permit the user to rapidly organize the content displayed on the table. For example, the content may be displayed according to the date viewed, or by the number of chats recorded, or by the number of selections from each program viewed, and/or any other feature by which the table may be organized.

Additionally, in one embodiment, the user may alter the table of historically viewed content by deleting at least a portion of what is displayed and/or saved. For example, the user may wish to delete any program and associated information which is older than six months (i.e. the content was viewed over six months ago, etc.). In some embodiments, the historically viewed content may automatically delete content. For example, the user may set the tablet computer to delete all historically viewed content which is older than six months. In other embodiments, the historically viewed content may not be deleted automatically but may require user feedback (e.g. user selecting "delete history," etc.) in order for the history to be deleted. In one embodiment, where there memory is not available on the tablet computer or phone device, the tablet computer or phone device may seek to store any recordings to a default cloud location. Additionally, the tablet computer or phone device may not be enabled to save any additional information to the device until the user deletes at least a portion of the historically viewed content.

In one embodiment, the selectable buttons may include a search feature. The search feature may permit the user to search for chats, friends, selections, users, viewed content, recorded content, and/or any feature and/or content which may relate at least in some aspect to interacting with the television device. In one embodiment, the search function may be linked to an external site search engine (e.g. Google, etc.) to search the content locally (e.g. on your tablet, etc.) or may relate to social networking in that content, e.g., uploaded and shared by your friends may relate to at least some aspect (e.g. a good program recommended by a friend in their posting, etc.) associated with a television device.

In one embodiment, a pane may be associated with past programs organized by a user. For example, list in the pane may be organized by the user and be associated with friends, content, comments, etc. that relate to the user and the associated program. In one embodiment, upon selecting a user, a separate user interface may open wherein the pane may be organized by programs viewed and being viewed. Information relating to the programs (e.g. date, time, channel, friends connected, etc.) may be displayed on separate columns. In a further embodiment, the user may select any of the aspects associated with the program to access greater detail relating to the information. For example, in relation to a program which aired on Nov. 5, 2011, the user may select the comments box to see all comments which were posted by friends relating to that program. In another embodiment, the user may click on a specific friend (e.g. "MARY01," etc.) to view what programs that friend has viewed and may be viewing. For example, after clicking on a friend's social networking id, the pane may display a list of programs that the friend has viewed and may be viewing, listed by the date the program was recorded.

In another embodiment, the list may include a title of the user that is currently logged into the tablet computer or phone device (e.g. "Bob," etc.), and the list may be organized by the programs viewed by the date recorded. In one embodiment, the list may be populated automatically (e.g. keeps a running history of all actions/events, etc.). For example, in various embodiments, receiving a comment, saving at least a portion of the program, receiving chats during a program, and/or receiving or sending anything to enable interaction during or after a program may cause the history table to be populated. In another embodiment, the user may select which programs and/or actions may be saved to the pane. For example, while viewing a program, the user may select "save to history" to save the program and associated comments, recordings, etc.

In a further embodiment, the list may be reorganized by selecting any of the column titles located in the header of the table (e.g. the top row, etc.). For example, if a user wanted to organize the content based off of chats, the user may select "chats" in the header of the table to reorganize the table based on chats. Additionally, in other embodiments, the user may create any additional columns (e.g. tags, places, etc.) and/or criteria as necessary to improve interaction between the user, the television, and any social networking.

In one embodiment, the user interface may include a "back" button to enable the user to go back to the control interface to control at least some aspect associated with the television device (e.g. channel, volume, mute, program listings, etc.). Of course, in other embodiments, the navigation button may be preconfigured in any manner and assigned to any preconfigured function (e.g. save changes, create new recording, etc.). Additionally, in one embodiment, the tablet computer or phone device may have touch sensitive or physical buttons including a back button. As such, a back button on the user interface may not be necessary in such circumstances.

Figure 67C:
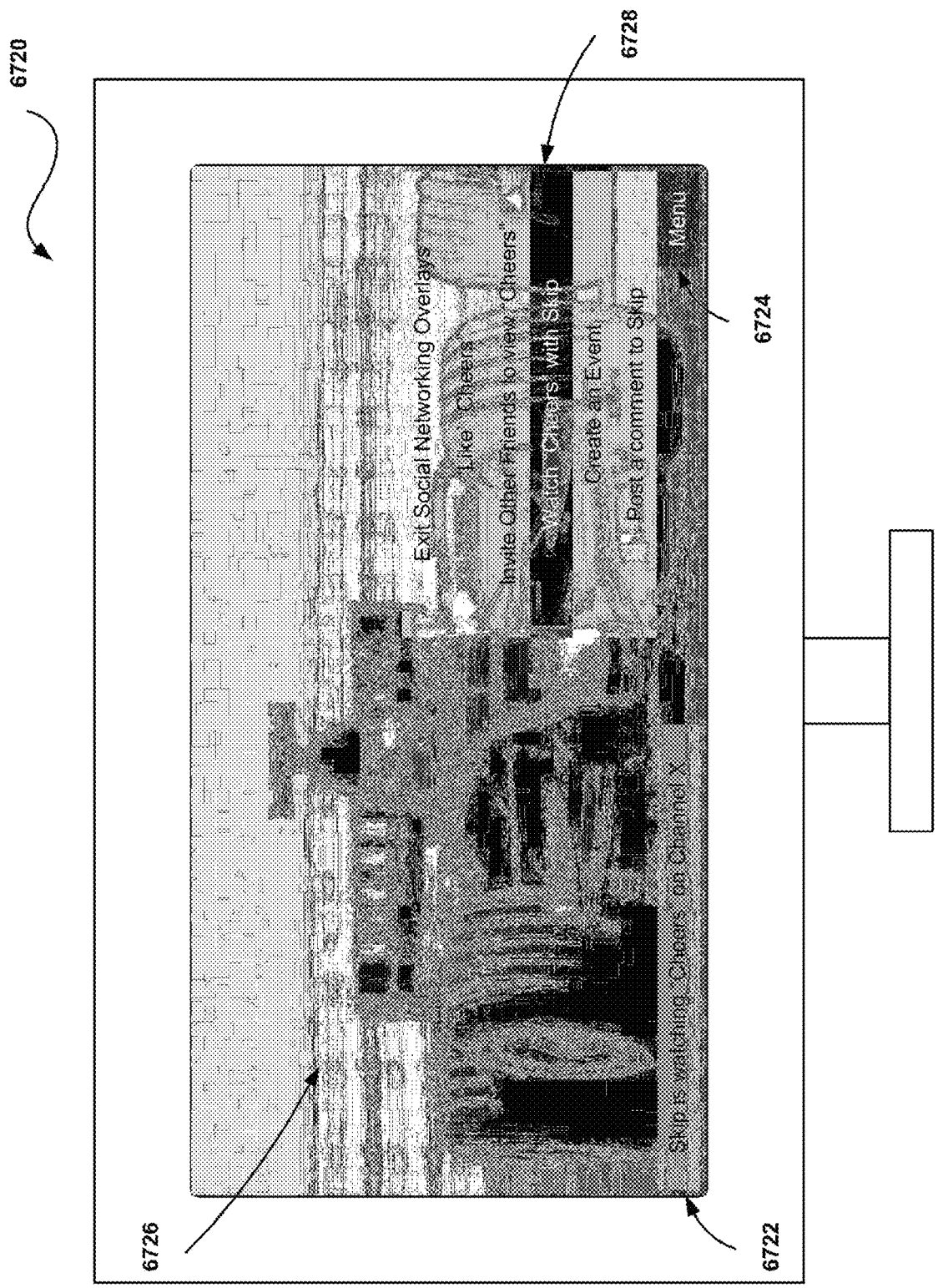
FIG. 67C shows a user interface for managing social interactions on a television, in accordance with one possible embodiment.

FIG. 67C shows a user interface 6720 for managing social interactions on a television, in accordance with one possible embodiment. As an option, the user interface 6720 may be implemented in the context of the architecture and environment of the previous Figures or any subsequent Figure(s). Of course, however, the user interface 6720 may be carried out in any desired environment. It should also be noted that the aforementioned definitions may apply during the present description.

As shown, a television show may be included 6726. Live information relating to social feeds 6722 may be displayed, as well as a menu 6724 relating to the social feeds. Additionally, a selection of one of the menu options 6728 may be included.

In one embodiment, the television show may relate to any content available through cable broadcasting, internet streaming, DVD player, and/or any other media source. In one embodiment, the live information relating to social feeds may be a ticker (e.g. similar to Twitter status update, etc.). For example, the live information may be dynamic and display updates in real time. In other embodiments, the live information relating to social feeds may be updated at regular intervals (e.g. once every hour, etc.).

In another embodiment, the menu options associated with the social feeds may relate to content on the social feed. For example, the social feed may include "Skip is watching "Cheers" on ChannelX." The menu options associated with the social feed may include "exit social networking overlays," "'like' "Cheers"," "watch "Cheers" with Skip," "Create an Event," "Post a comment to Skip," and/or any other function with may relate to Skip's viewing of Cheers. Of course, the menu options may relate in any manner to the social feeds.

In one embodiment, a selection of one of the menu options may be performed by selecting the option on a tablet computer or phone device. In another embodiment, the selection of one of the menu options may be initiated by verbal commands (e.g. "watch "Cheers" with Skip," etc.), gestures (e.g. navigate hands so as to select "Watch "Cheers" with Skip," etc.), and/or by any other manner by which a menu option may be selected.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67D:
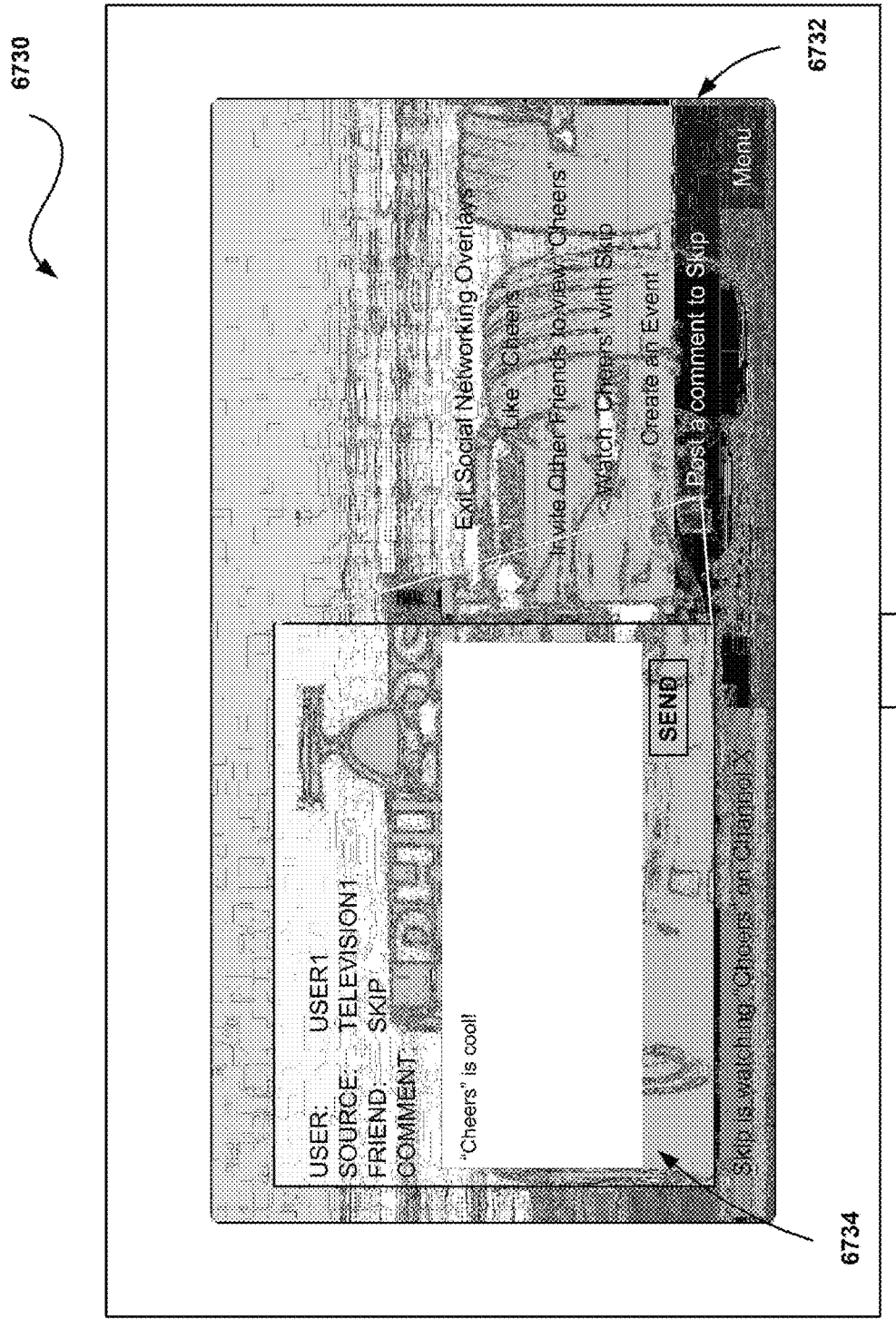
FIG. 67D shows a user interface for managing social interactions on a television, in accordance with one possible embodiment.

FIG. 67D shows a user interface 6730 for managing social interactions on a television, in accordance with one possible embodiment. As an option, the user interface 6730 may be implemented in the context of the architecture and environment of the previous Figures or any subsequent Figure(s). Of course, however, the user interface 6730 may be carried out in any desired environment. It should also be noted that the aforementioned definitions may apply during the present description.

As shown, a selection of one of the menu options 6732 may bring up a further interface 6734.

In one embodiment, a selection of one of the menu options may be performed by selecting the option on a tablet computer or phone device. In another embodiment, the selection of one of the menu options may be initiated by verbal commands (e.g. "watch "Cheers" with Skip," etc.), gestures (e.g. navigate hands so as to select "Watch "Cheers" with Skip," etc.), and/or by any other manner by which a menu option may be selected.

In another embodiment, a selection of "Post a Comment to Skip" may bring up a comment dialogue box. For example, in one embodiment, the dialogue box may include the name of the user (e.g. User1, etc.), the source of the comment (e.g. Television1, etc.), the destination of the friend (e.g. Skip, etc.), and a comment by the user. In various embodiments, the comment by the user may be written out in any manner. For example, the user may use a text-to-speech recognition module to translate the user's words into written text. In another embodiment, the user may use an external keyboard, a digital keyboard (e.g. located on a tablet computer, etc.), a remote control interface (e.g. individual selection of letters, etc.), and/or any other method by which text may be inputted into the comment box.

In some embodiments, the user may use a database of pre-scripted text responses and simply select a preconfigured text response to use as a comment (e.g. "I like the show too," "do you want to watch it together?," etc.). In another embodiment, the user may preconfigure the settings to automatically select to post a comment to the social feed (e.g. once a social feed is received, a comment dialogue box immediately opens, etc.). Of course, however, the user may preconfigure the system to act in any manner.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67E:
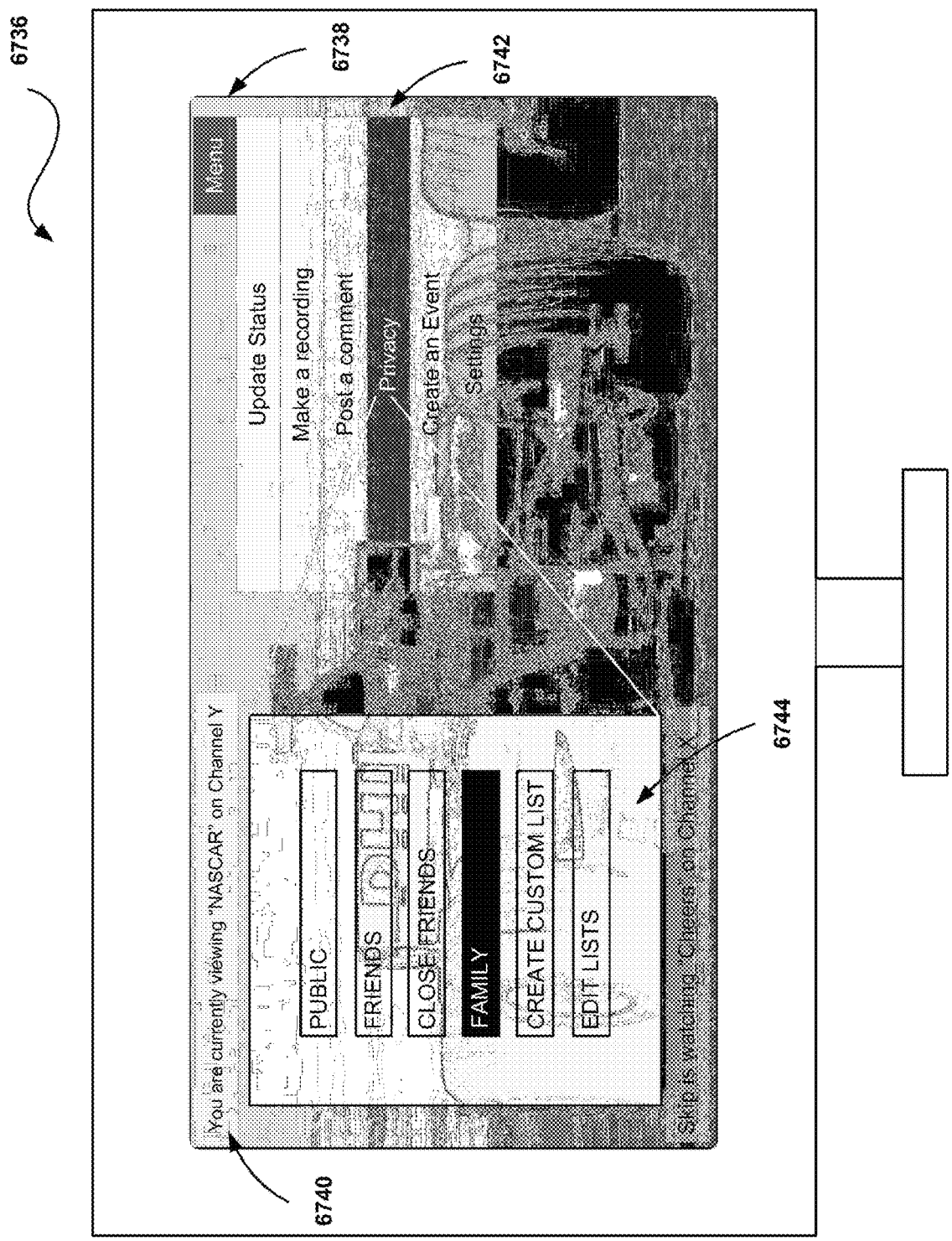
FIG. 67E shows a user interface for managing privacy settings associated with social interactions, in accordance with one possible embodiment.

FIG. 67E shows a user interface 6736 for managing privacy settings associated with social interactions, in accordance with one possible embodiment. As an option, the user interface 6736 may be implemented in the context of the architecture and environment of the previous Figures or any subsequent Figure(s). Of course, however, the user interface 6736 may be carried out in any desired environment. It should also be noted that the aforementioned definitions may apply during the present description.

As shown, a user's current status 6740 may be included. Additionally, a menu 6738, a selected option 6742, and a list of privacy groups 6744 may be included.

In one embodiment, the user's current status may be displayed continuously on the television device. In another embodiment, the user's current status may only be displayed whenever a menu option, or another remote controlled function, is executed (e.g. pressed on a remote control, etc.).

In a further embodiment, the user's current status may be represented by text, a number (e.g. a channel number, etc.), and/or any other indicia.

In another embodiment, a menu may be used to control at least some aspect associated with the television device. For example, in one embodiment, the menu may include "update status," "make a recording," "post a comment," "privacy," "create an event, "settings," and/or any other function which may relate in some way to the television device.

In various embodiments, the user may limit how the user's status is viewed by other users and/or friends (e.g. privacy settings, etc.). For example, the user may organize lists of friends. Each list of friend may be assigned to a policy (e.g. allow friends to see all of my activity, allow friends only to see my activity that I approve, etc.). Selection of a privacy setting may limit whether other friends may see what the user is viewing. For example, in one embodiment, selection of "Family" may cause all family members to see what the user is watching. In another embodiment, selection of "friends," may cause friends to see whatever the user approves is being watched (e.g. "update status" may allow the user to approve of what is being watched, etc.). Of course, the lists of friends may be altered and/or organized in any manner by the user.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67F:
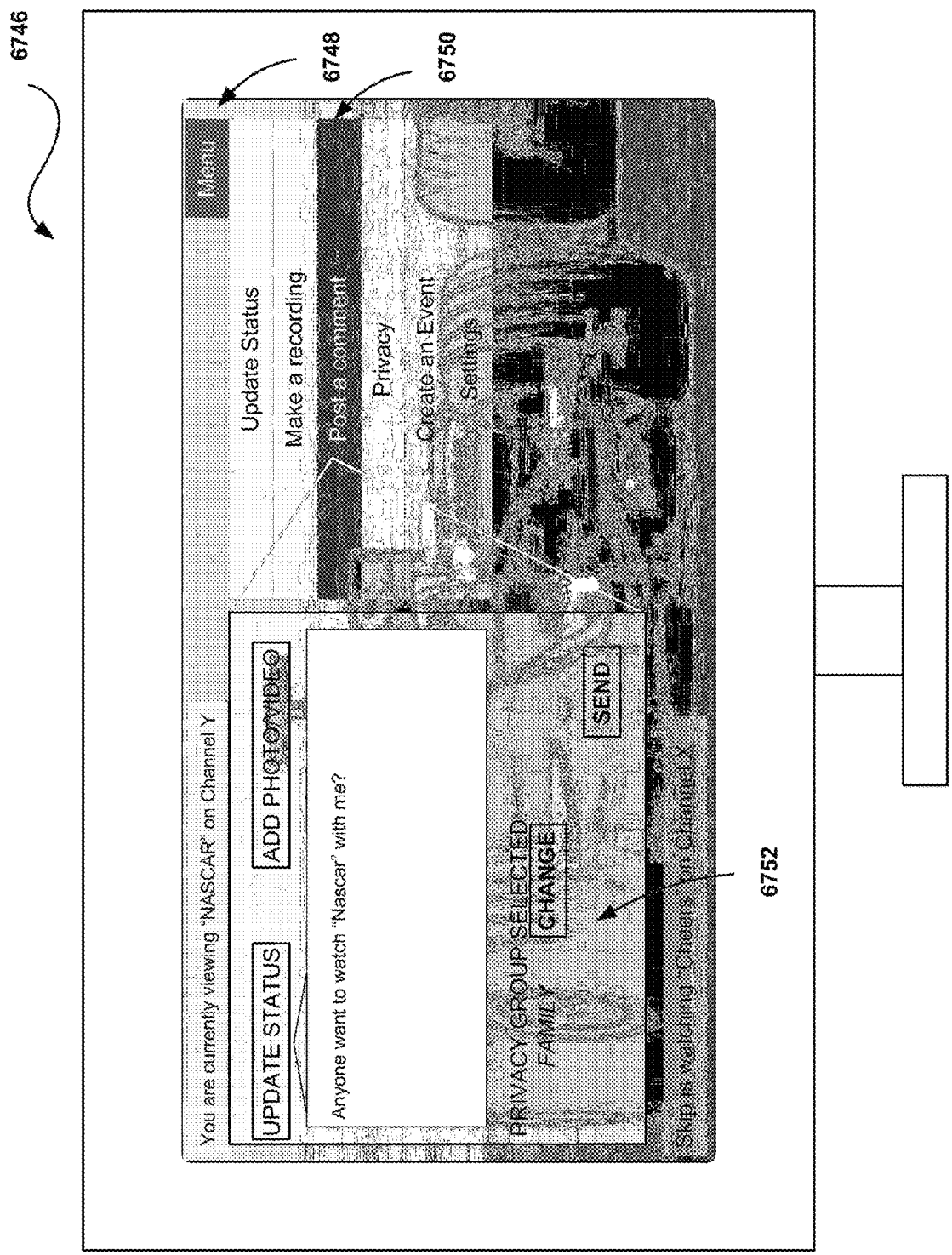
FIG. 67F shows a user interface for updating a status associated with social interactions, in accordance with one possible embodiment.

FIG. 67F shows a user interface 6746 for updating a status associated with social interactions, in accordance with one possible embodiment. As an option, the user interface 6746 may be implemented in the context of the architecture and environment of the previous Figures or any subsequent Figure(s). Of course, however, the user interface 6746 may be carried out in any desired environment. It should also be noted that the aforementioned definitions may apply during the present description.

As shown, menu 6748, a selected option 6750, and a comment dialogue box 6752 may be included.

In one embodiment, a menu may be used to control at least some aspect associated with the television device. For example, in one embodiment, the menu may include "update status," "make a recording," "post a comment," "privacy," "create an event, "settings," and/or any other function which may relate in some way to the television device.

In another embodiment, a user may select "Post a Comment" which may bring up another comment dialogue box. Of course, the user may select any menu option in any manner (e.g. touch, auditory, visual, etc.).

In one embodiment, the comment dialogue box may include "update status," "add photo/video," a comment text box, the ability to change the selected privacy group, the ability to "send" the comment, and/or any other function which may relate to a comment dialogue box.

In a further embodiment, the user may preconfigure the comment dialogue box to automatically update at least one social networking feed (e.g. Twitter, Facebook, etc.). In another embodiment, the comment dialogue box may update social feeds for other users that are also watching a television device (e.g. update sent to active connections, etc.).

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67G:
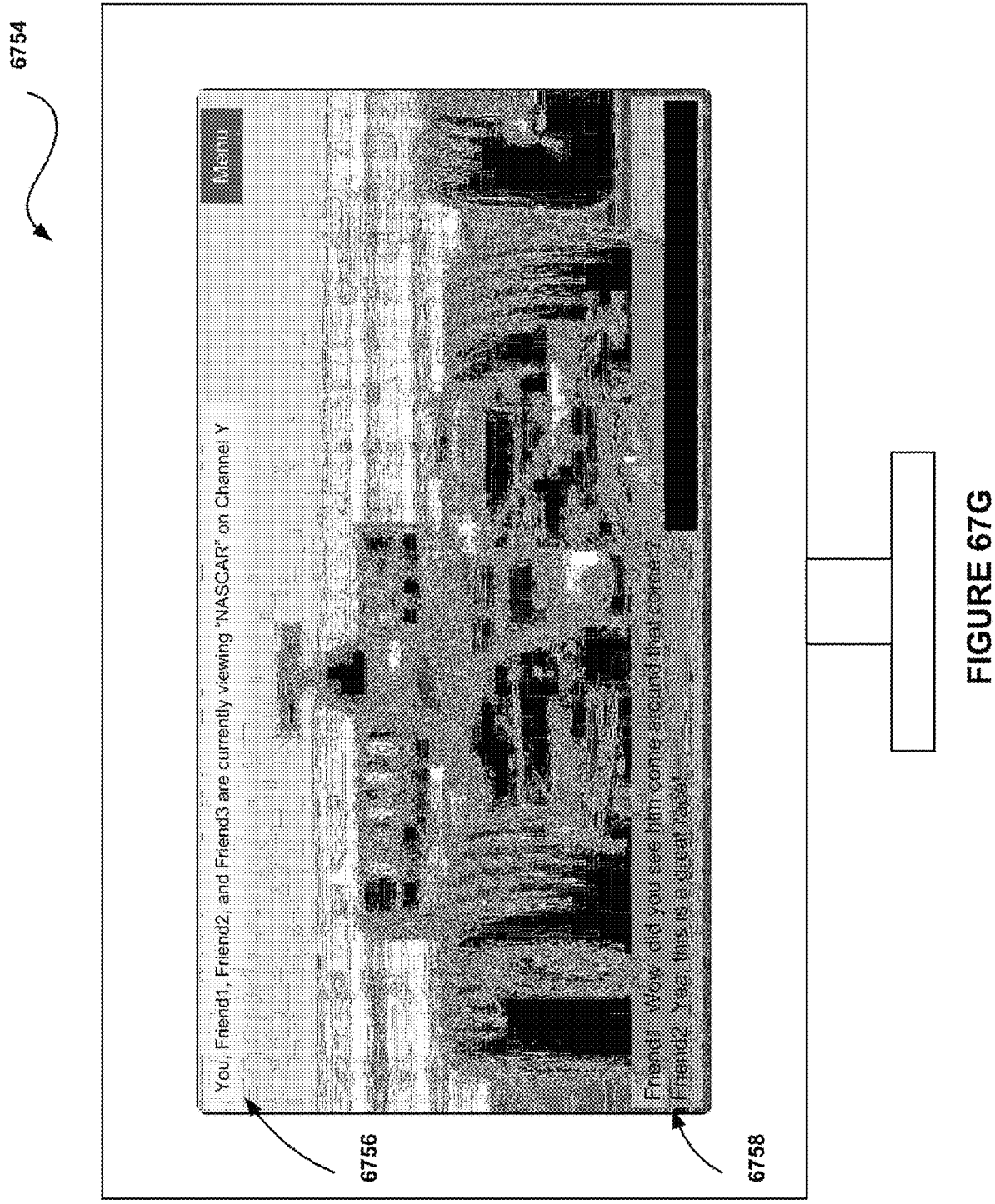
FIG. 67G shows a user interface for interacting with social connections on a television, in accordance with one possible embodiment.

FIG. 67G shows a user interface 6754 for interacting with social connections on a television, in accordance with one possible embodiment. As an option, the user interface 6754 may be implemented in the context of the architecture and environment of the previous Figures or any subsequent Figure(s). Of course, however, the user interface 6754 may be carried out in any desired environment. It should also be noted that the aforementioned definitions may apply during the present description.

As shown, a status update bar 6756, and a comments update feed 6758 may be displayed.

In one embodiment, the status update bar may display any other friend who is watching the same television content as the user. In one embodiment, the status update bar may be continuously displayed on the top of the television device. In another embodiment, the status update bar may be displayed only when an update is received (e.g. another friend is now viewing the same television content, etc.). Of course, the user may preconfigure the status update bar to operate in any manner.

In another embodiment, the comments update feed may display comments from other friends. In one embodiment, the comments update feed may be displayed when other users are viewing the same television content. In other embodiments, the comments update feed may display any comment from any friend. In some embodiments, the comments update feed may be assigned a policy (e.g. display all incoming updates, display only updates from "Family," etc.). Of course, the comments update feed may be preconfigured in any manner by the user.

In some embodiments, the user may respond to any comments by directly typing a comment in the comments update feed text box. To this end, the comments update feed may show updates by any friend, as well as any updates inputted by the user. Of course, the comments update feed may be preconfigured in any manner by the user.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67H:
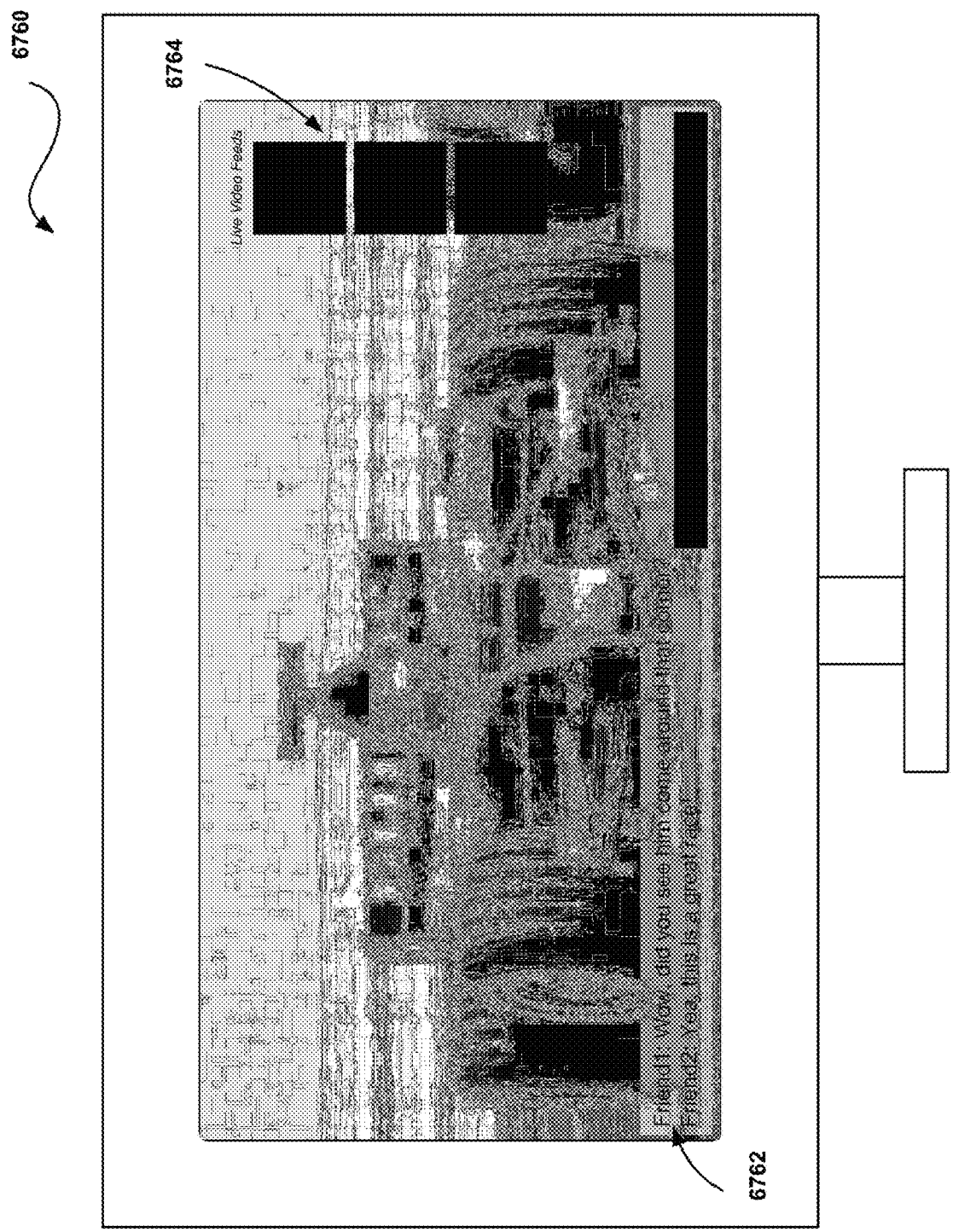
FIG. 67H shows a user interface for interacting with social connections on a television, in accordance with one possible embodiment.

FIG. 67H shows a user interface 6760 for interacting with social connections on a television, in accordance with one possible embodiment. As an option, the user interface 6760 may be implemented in the context of the architecture and environment of the previous Figures or any subsequent Figure(s). Of course, however, the user interface 6760 may be carried out in any desired environment. It should also be noted that the aforementioned definitions may apply during the present description.

As shown, a comments update feed 6762 and live video feeds 6764 may be displayed.

In another embodiment, the comments update feed may display comments from other friends. In one embodiment, the comments update feed may be displayed when other users are viewing the same television content. In other embodiments, the comments update feed may display any comment from any friend. In some embodiments, the comments update feed may be assigned a policy (e.g. display all incoming updates, display only updates from "Family," etc.). Of course, the comments update feed may be preconfigured in any manner by the user.

In some embodiments, the user may respond to any comments by directly typing a comment in the comments update feed text box. To this end, the comments update feed may show updates by any friend, as well as any updates inputted by the user. Of course, the comments update feed may be preconfigured in any manner by the user.

In one embodiment, the live video feeds may show a video stream from friends viewing the same television content as the user. In some embodiments, the live video feeds may show any video stream from any number of friends. Of course, the user may determine (e.g. in real-time or preconfigured, etc.) the video feeds to be displayed.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67I:
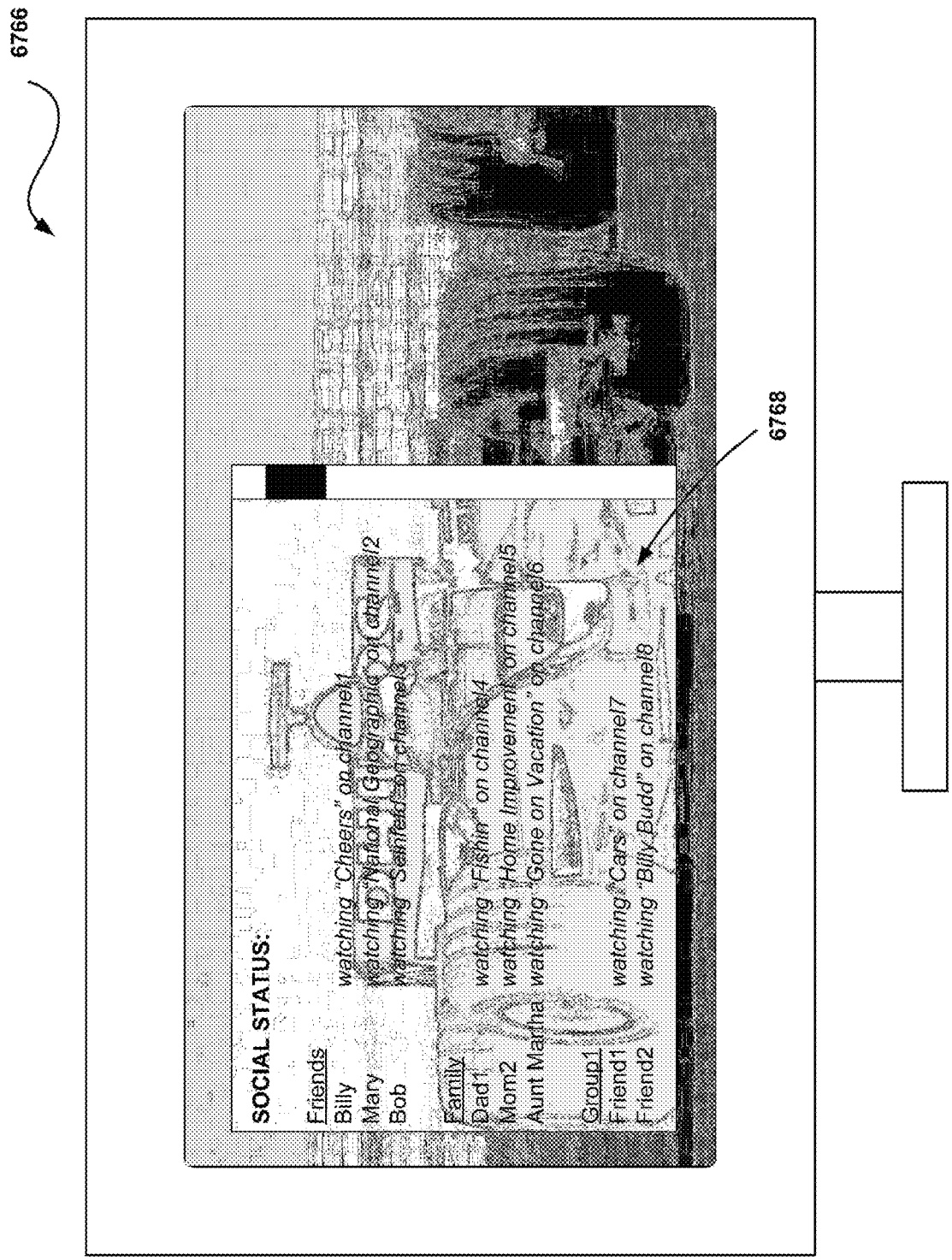
FIG. 67I shows a user interface for viewing social interactions on a television, in accordance with one possible embodiment.

FIG. 67I shows a user interface 6766 for viewing social interactions on a television, in accordance with one possible embodiment. As an option, the user interface 6766 may be implemented in the context of the architecture and environment of the previous Figures or any subsequent Figure(s). Of course, however, the user interface 6766 may be carried out in any desired environment. It should also be noted that the aforementioned definitions may apply during the present description.

As shown, a status of social interactions 6768 may be displayed. In one embodiment, the status of social interactions may categorize friends by priority groups (e.g. Friends, Family, Group1, etc.), display all individuals who are currently present (e.g. interacting with a television device, etc.), display the television content being viewed by each individual, and/or display any other information relating to social interactions.

In one embodiment, the status of social interactions may be viewed through any type of command (e.g. auditory, gesture, touch, etc.). In another embodiment, the tablet computer, phone device, television remote control, or a set-top box control may include a "social status" button to check the social status of any active connections (e.g. those friends who are connected to a social networking platform and who are viewing a television content, etc.).

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving)

list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67J:
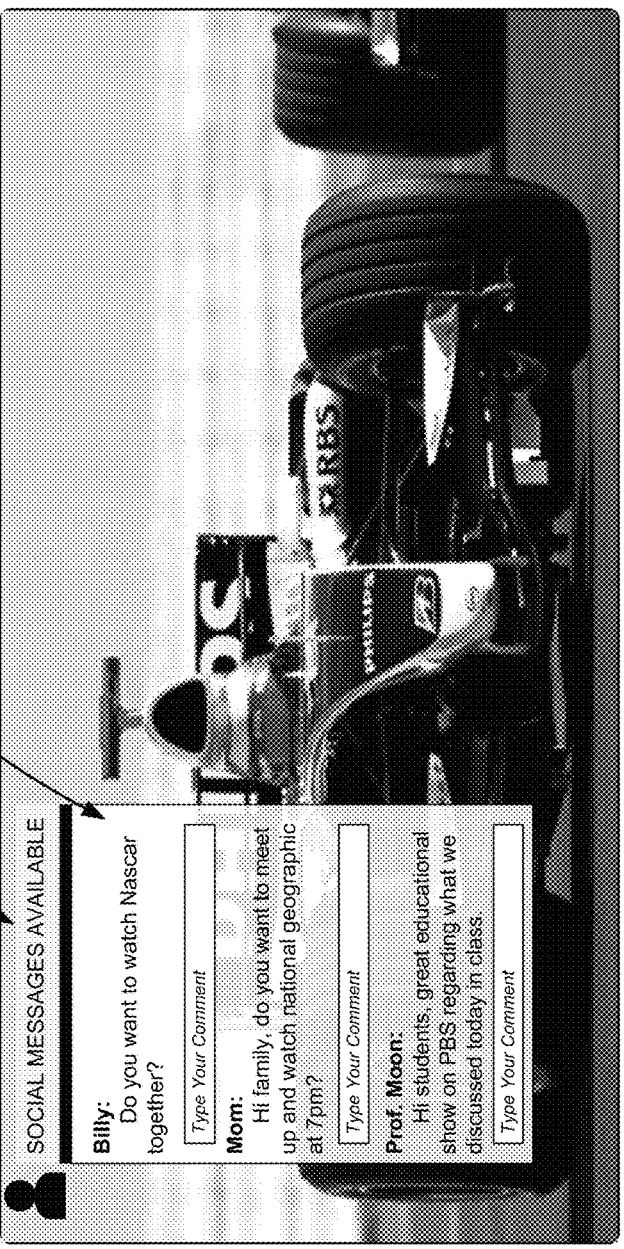
FIG. 67J shows a user interface for viewing social interactions on a television, in accordance with one possible embodiment.

FIG. 67J shows a user interface 6770 for viewing social interactions on a television, in accordance with one possible embodiment. As an option, the user interface 6770 may be implemented in the context of the architecture and environment of the previous Figures or any subsequent Figure(s). Of course, however, the user interface 6770 may be carried out in any desired environment. It should also be noted that the aforementioned definitions may apply during the present description.

As shown, icon 6774 may be displayed notifying the user of new social messages, text 6772 may be displayed notifying the user of new social messages, and a drop-down menu may show new social messages 6776.

In one embodiment, the icon may only be displayed on the television device when a new social message is received. In another embodiment, the text may only be displayed on the television device when a new social message is received. In a further embodiment, any combination of the icon and/or text may be displayed on the television device when a new social message is received. Additionally, in various embodiments, the icon and/or text may be positioned in any manner and resized according to predefined settings set by the user.

In another embodiment, the drop-down menu may be selected. For example, a user may select the icon or text to display the drop-down menu associated with new social messages. For example, in various embodiments, the drop-down menu may show a message from various friends: "Billy: Do you want to watch Nascar together?," "Mom: Hi family, do you want to meet up and watch national geographic at 7 pm?," "Prof. Moon: Hi students, great educational show on PBS regarding what we discussed today in class." To this end, social messages may relate to any environment and/or be associated with any friends. For example, in one embodiment, the drop-down menu may be preconfigured to only show messages associated with a business. In some embodiments, the social messaging may be configured to facilitate interaction with business contacts. For example, a news bulletin may be discussed immediately by business contacts (e.g. business contacts may send a comment to other contacts, etc.). Of course, the drop-down menu displaying social messages may be preconfigured in any manner by the user.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67K:
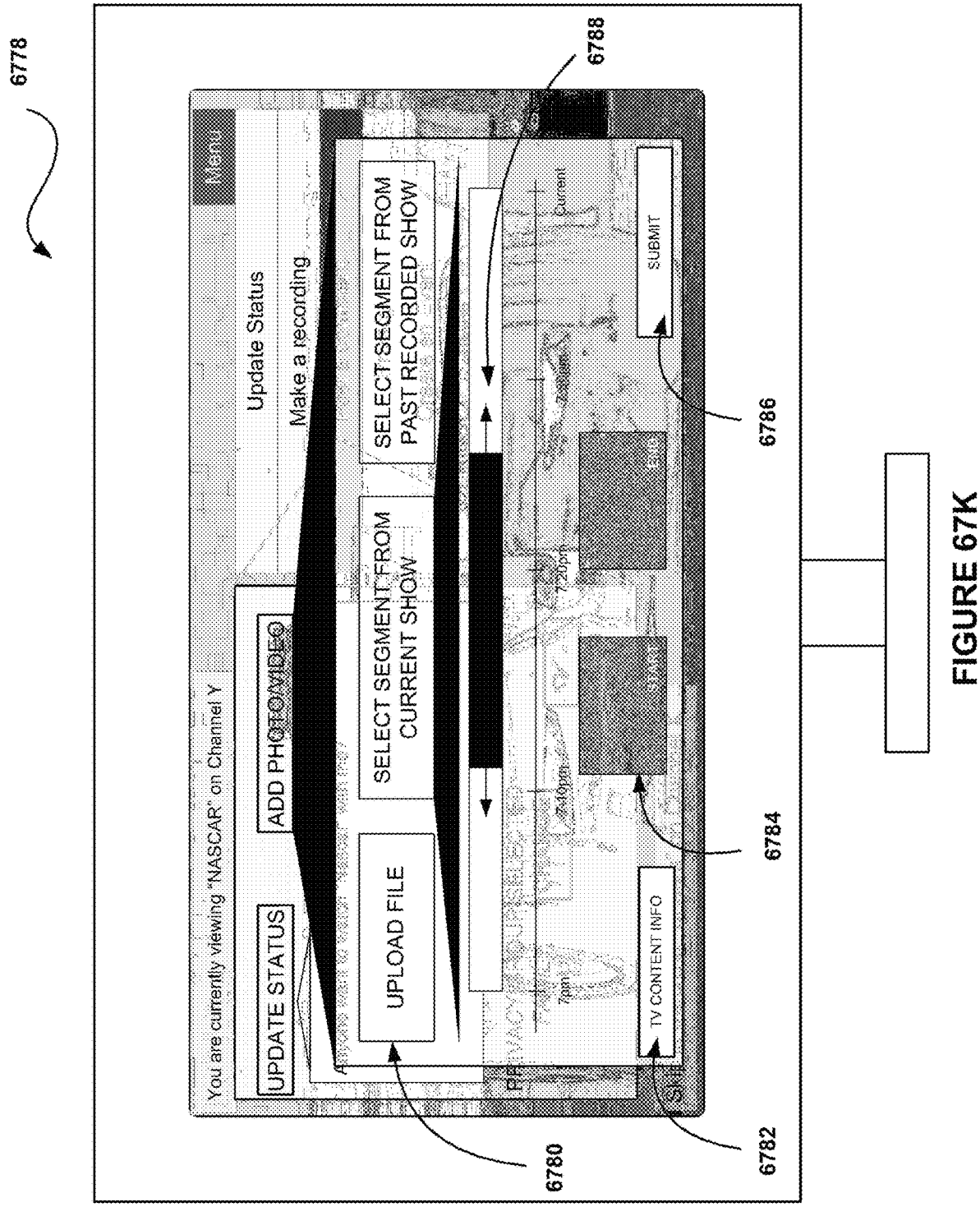
FIG. 67K shows a user interface for recording show segments associated with social interactions, in accordance with one possible embodiment.

FIG. 67K shows a user interface 6778 for recording show segments associated with social interactions, in accordance with one possible embodiment. As an option, the user interface 6778 may be implemented in the context of the architecture and environment of the previous Figures or any subsequent Figure(s). Of course, however, the user interface 6778 may be carried out in any desired environment. It should also be noted that the aforementioned definitions may apply during the present description.

As shown, navigation buttons 6780 associated with the add photo/video option, a TV content info button 6782, a customizable and selectable timeline 6788, a start and end video frame 6784, and a submit button 6786 may be included.

In one embodiment, the navigation buttons may include "upload file," "select segment form current show," "select segment from past recorded shows," and/or any other buttons which may be associated with the add photo/video option. In one embodiment, the user may upload a file from any source (e.g. local, cloud-based, etc.). In another embodiment, the user may upload a file by recording a video file (e.g. through a camera associated with the tablet computer, phone device, set-top box, television device, etc.).

In another embodiment, the user may select to add a segment from a previously recorded television content. For example, the user, while watching a television content, may be reminded of a clip from another show that was viewed a few weeks earlier. The user may select the show, identify the clip from the show to be uploaded, and then attach the clip to the user's comment.

In one embodiment, the user may select a segment from the currently viewed show. In one embodiment, the user may only select content that has already played on the television device (e.g. no content may be selected in the future, etc.). In another embodiment, the TV content info button may specify information relating to the television show which may be added to the recorded segment. For example, the TV content information may include "include title of program," "include date viewed," "specify relevant time segment," "entire tv content segment," "include list of viewers," "upload copy to cloud storage," and/or any other functionality which may be associated with the currently viewed show.

In one embodiment, the customizable and selectable timeline may permit the user to select the start and end frames of the clip to be shared. In one embodiment, the user may select the entire show to be shared. In other embodiments, the user may select only part of the show to be shared. In one embodiment, the start and end frames may dynamically change as the user drags the timeline bars in either the direction toward the current time, or towards the original time that the show commenced.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 67L:
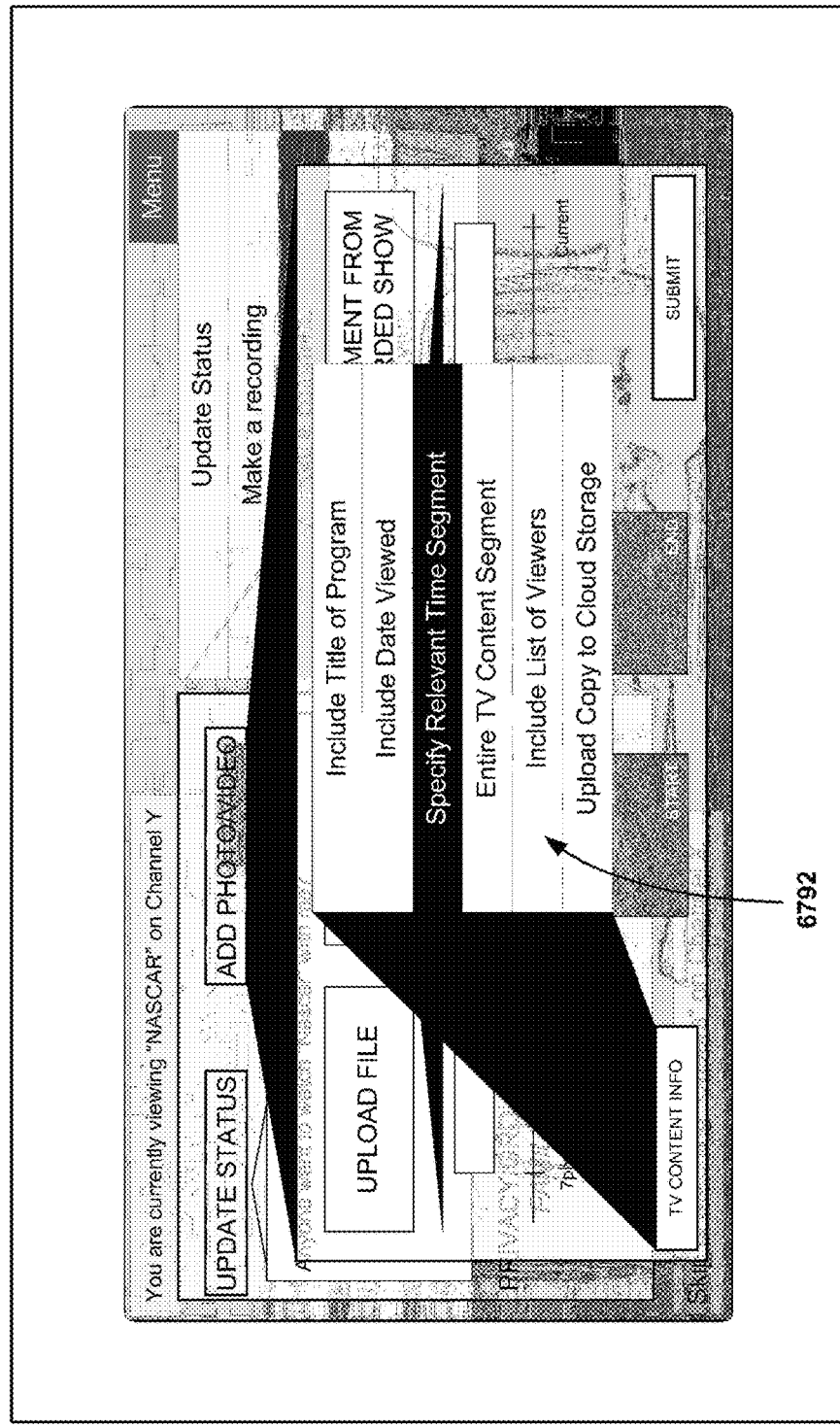
FIG. 67L shows a user interface for specifying television content information, in accordance with one possible embodiment.

FIG. 67L shows a user interface 6790 for specifying television content information, in accordance with one possible embodiment. As an option, the user interface 6790 may be implemented in the context of the architecture and environment of the previous Figures or any subsequent Figure(s). Of course, however, the user interface 6790 may be carried out in any desired environment. It should also be noted that the aforementioned definitions may apply during the present description.

As shown, options 6792 associated with TV content info may be displayed. In one embodiment, the TV content info button may specify information relating to the television show which may be added to the recorded segment. For example, the TV content information may include "include title of program," "include date viewed," "specify relevant time segment," "entire tv content segment," "include list of viewers," "upload copy to cloud storage," and/or any other functionality which may be associated with the currently viewed show.

In one embodiment, the customizable and selectable timeline may permit the user to select the start and end frames of the clip to be shared. In one embodiment, the user may select the entire show to be shared. In other embodiments, the user may select only part of the show to be shared. In one embodiment, the start and end frames may dynamically change as the user drags the timeline bars in either the direction toward the current time, or towards the original time that the show commenced.

In various embodiments, any third party social content (e.g. comments, posts, etc.) that are posted by third parties may be received (e.g. via set top box interface 6508 and/or set top box 6504 via the network 6528 and/or tablet/mobile device 6516 via any of 6510, etc.) for being displayed via the television 6502. Of course, user posted social content may be displayed to others in similar ways using similar equipment. The display of such social content may, in various embodiments, take the form of, for example, a single or more line ticker running on the bottom or elsewhere on the screen that moves from left to right and lists the comments with possible identifiers (e.g. name of poster, date of post, etc.). In other embodiments, a larger portion of the screen (e.g. side toolbar, lower toolbar, etc.) may be allocated for displaying each comment/post in a static (e.g. non-moving) list summary form, for allowing the user to select and thus expand a particular comment/post summary in the list. Even still, a similar alert (e.g. indicia, the aforementioned sprites, etc.) may prompt the viewer to expand, retrieve, open, or otherwise access a particular comment/post summary(ies) utilizing an interface on the television and/or tablet/mobile device.

In various embodiments, any of the above social content (or any other social content interactions) may be displayed while (e.g. simultaneously) with television content (e.g. TV show, video, movie, VoD, sports game, etc.) on the television (and/or even the tablet/mobile device). As an option, the television content may or may not be resized to accommodate the social content. Such resizing may be automatic or manual. For example, in one embodiment, the user may select the relative size, position, etc. of the social content and television content. For that matter, any of the features set forth herein (e.g. triggering, timing, amount, etc. of social content display, etc.) may be user configurable.

In other embodiments, the social content may overlay with television content (e.g. with or without translucency, etc.). In still another embodiment, a simple visual alert (e.g. indicia, icon, etc. with or without an audible alert) may be displayed simultaneously with the television content. Such visual alert may be as simple as an icon, a short text script that says "social messages available," or the like, which does not (but could) necessarily include the comment/post, poster name, etc., but instead simply serves to prompt the user to access the comment/post via the television and/or tablet/mobile device 6516 (or any other device, for that matter). In one embodiment, a selection of the aforementioned short script (or other indicia) may prompt social content augmentation.

As an option, in one possible embodiment, a selection of a particular social content (e.g. to expand it, read it, reply to it, etc.), a selection to initiate a social content posting, and/or any social content augmentation and/or interaction, etc. using the television and/or mobile/tablet device, etc.) may automatically result in a pausing (and possibly buffering, etc.) of the television content. Still yet, such pausing may automatically be terminated during the cessation of any of the foregoing (e.g. close social content posting, finish reply, finish posting, finish interaction, etc.), such that the television content is automatically resumed (e.g. played, etc.) using the television and/or mobile/tablet device, etc. Again, this feature may or may not be user configurable. To this end, the user may more seamlessly multitask between social content and television content interaction/viewing.

In still other embodiments, the aforementioned social content may be only displayed (or may be more fully displayed—or more social content may be displayed) when the television content is interrupted. For example, any of the foregoing social content augmentation may be automatically initiated in response to a user selection of a pause button/icon (e.g. which may result in buffering, storage, or a simple pause, etc.). In another example, any of the foregoing social content augmentation may be automatically initiated in response to a user selection of a rewind, fast forward, stop, etc. button/icon button/icon, such that the social content augmentation is displayed simultaneously with such and/or any other functions. In yet another example, any of the foregoing social content augmentation may be automatically initiated in response to a user selection of a channel change button/icon, such that the social content augmentation is displayed simultaneously with channel surfing.

In another example, any of the foregoing social content augmentation may be automatically initiated in response to a user selection of a electronic programming guide (EPG) button/icon, such that the social content augmentation is displayed simultaneously with the EPG. In one embodiment, a new instance of social content may be displayed in connection with any new instance of EPG being displayed (e.g. when a user flips to a new channel listing (e.g. vertical movement), time listing (e.g. horizontal movement), and/or any other movement within the EPG material. Still yet, any of the foregoing social content augmentation may be automatically initiated in response to a user selection of a social content-related button/icon, possibly during a commercial, a break in programming, a less interesting portion of television content. In other embodiments, any of the foregoing social content augmentation may be initiated after automatic detection of a commercial, etc.

To this end, social content augmentation may optionally be timed when a user may be less focused on a particular piece of television content. In any of the foregoing embodiments, the aforementioned resizing of the video content may or may not be implemented to facilitate viewing of both social and television/EPG content.

As a further option, the social content may be filtered, prioritized, ordered, etc. based on a variety of factors such as a rating of the social content (e.g. number of "likes," etc.), whether the social content was posted or commented upon/liked, etc. by social network members who have a relationship (e.g. are "friends") with the viewing member, made in connection with the "currently" viewed television content now and/or a previous viewing time, etc. Of course, any of the foregoing may be user configurable by allowing the user to subscribe to groups and/or social network member feeds, manipulating content filter settings, etc.

In additional optional embodiments, each of the aforementioned comments postings/summaries (and/or list) may each include one or more advertisements displayed adjacent thereto. In one embodiment, the comments postings/summaries (and/or list) may each include one or more advertisements may not necessarily be viewable via the television, but only when viewed via the tablet/mobile device (or any device, for that matter. Further, advertisers may be given the option (possibly via a self-serve web interface) to select a time, day, type of content, specific content title, profile demographic of viewer, etc. that prompts display of advertisement in connection with the social content.

Figure 68:
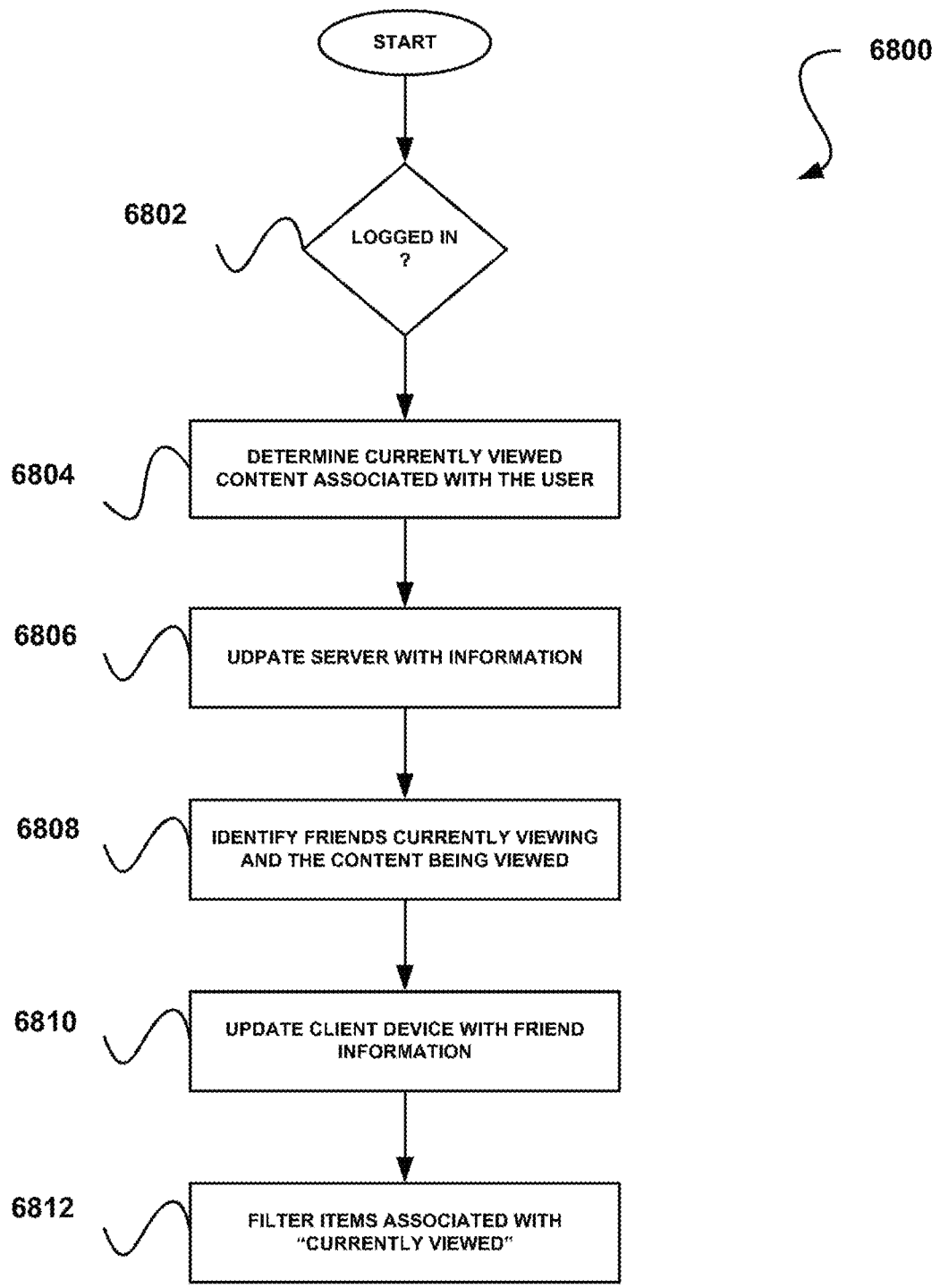
FIG. 68 shows a method for updating a client device with friend information, in accordance with one possible embodiment.

FIG. 68 shows a method 6800 for updating a client device with friend information, in accordance with one possible embodiment. As an option, the user interface 6702 may be implemented in the context of the architecture and environment of the previous Figures or any subsequent Figure(s). Of course, however, the user interface 6702 may be carried out in any desired environment. It should also be noted that the aforementioned definitions may apply during the present description.

As shown, it is determined whether a user is logged in. See decision 6802.

In one embodiment, the user may be automatically logged in. For example, the computer tablet or phone device may have the user scan a fingerprint, complete an image verification process using the camera, and/or otherwise have the user give some input to inform the tablet computer or the phone device of the identity of the user. In one embodiment, the identity of the user may be identified by a personalized pattern unlock. For example, in one embodiment, the unlock screen of the device may be unlocked based on a touch gesture having a predefined shape (e.g. a letter, arrow, etc.).

Additionally, in various embodiments, a user may execute an action by inputting a touch gesture directly from a lock screen (e.g. to login to the device, etc.). A lock screen view may be displayed on the tablet computer or phone device to prevent unauthorized and inadvertent access to the device's data. While the device is locked, a touch gesture having a pre-defined shape may be detected on a touch screen of the device independently of the initial position of the touch gesture on the touch screen. In response to detection of the touch gesture, a particular action (e.g. implementation of settings relating to the particular user, access to applications, etc.) may be executed on the device. The particular action may be determined according to the pre-defined shape. For example, the pre-defined shape may be assigned to a particular user, or to an assigned set of policies. In one embodiment, each particular user of a household may have a pre-defined shape. Additionally, other pre-defined shapes may be linked to a set of policies including for example, a set of policies relating to a guest user of the device (e.g. more restricted access, etc.), a child user of the device, the time of day (e.g. in the morning, the user may wish to view something different than at night, etc.), and/or any other function desired by the user.

In one embodiment, the tablet computer or phone device may include a touch receiver which may accept input from a touchscreen. For example, the touch receiver may receive touch input including a position that the user touched as defined by an X and Y coordinate on the touchscreen. The user may touch the screen with a finger, stylus, or any other object which may be used to provide input to the device. Touch receiver may be able to receive multiple touches simultaneously if, for example, the user selects multiple locations on the screen. The screen may detect touches using any technology known in the art including, but not limited to, resistive, capacitive, infrared, surface acoustic wave, strain gauge, optical imaging, acoustic pulse recognition, frustrated total internal reflection, and diffused laser imaging technologies.

In various embodiments, a gesture definition module may enable a user to define a touch gesture to initiate an associated action. In one embodiment, the gesture definition module may present an interface to define a touch gesture for an action. For example, gesture definition module may present the user with a list of actions for which the user may define a gesture. The user may select an action from the list of actions. For example, the mobile device may enable a user to enter a touch gesture using an interface. In response to the selection, gesture definition module may prompt the user for the touch gesture. The user may move a finger along the mobile device's touch screen to input the gesture. The touch receiver may receive the input and forward the data specifying the input to a gesture definition module. The gesture definition module may store data specifying at least the shape of the touch gesture into a gesture database. The gesture database may be located on the device (e.g. tablet computer or phone device, etc.) locally. Or, in an alternative embodiment, the gesture database may be located in the cloud or in some other network location (e.g. localized server, etc.) so that a variety of devices may each provide a consistent interface regardless of the device used and the location in which the device is used.

In a separate embodiment, the user may be automatically logged in upon recognition of an external identification device. For example, a keylike transducer (e.g. advanced key, etc.) may be used by the user to verify the identity of the user. The keylike transducer may be set up to link the key to the user so that when the keylike transducer is within a set proximity of the tablet computer or phone device, it may automatically login the user. In another embodiment, the tablet computer or phone device may recognize the identity of the user based associated with the keylike transducer, but may not implement the preconfigured settings until the user activates (e.g. touches the screen, presses the power button, etc.) the tablet computer or phone device in some manner.

In one embodiment, the tablet computer or phone device may be used by just one user. In such a scenario, the user may still wish for security reasons to implement a lock-screen (requiring an unlock gesture) and/or verification based on a keylike transducer. Thus, the tablet computer or phone device may remain secure when not in use by the user.

As shown, if it determined that a user is logged in, currently viewed content associated with the user is determined. See operation 6804. In one embodiment, the tablet computer or the phone device may communicate with the set-top box or the set-top box interface to determine current program listings. The user of the tablet computer or phone device may select the program to be viewed on the television device. Additionally, the user interface for managing social interactions on the device may also be used to determine what the user is viewing.

As shown, a server is updated with information. See operation 6806. In one embodiment, the server may poll at set intervals for any update and/or changes made to the user interface on the tablet computer or phone device associated with the content being viewed by the user. In other embodiments, the set-top box, the set-top box interface, or even the tablet computer or phone device, may "push" (e.g. automatic update, etc.) the changes and/or updates to the server. In a further embodiment, the server may be in constant communication with all other devices connected to the local network, and may receive updates and/or changes to the content the user is viewing automatically and immediately.

As shown, friends are identified currently viewing and the content being viewed. See operation 6808. In one embodiment, a server located at each of the locations where each of the friends is located may receive updates of each of the friend's devices relating to what is being viewed. The server associated with the user of the tablet computer or phone device may receive and correlate all of the updates from each of the friend's devices. In another embodiment, the friends currently viewing a program as well as the content being viewed may be uploaded to a cloud-based server system which may then be communicated to each of the connected friends as appropriate (e.g. according to preconfigured settings, etc.).

As shown, the client device is updated with friend information. See operation 6810. In one embodiment, the tablet computer or phone device may display a user interface where each friend is listed with the content that each is viewing. In another embodiment, a list of friends and the content each is viewing may appear as an overlay on the tablet computer or phone device and/or on the television device. In a further embodiment, a list of friends and the content each is viewing may appear solely on the tablet computer or phone device, or on the television device, per the settings preconfigured by the user. In an alternative embodiment, the tablet computer or phone device may only display (e.g. as a subpane, overlay, etc.) a list of friends who are viewing the same content as the user of the tablet computer or phone device.

In another embodiment, the client device may be updated with friend information by policies and/or rules. For example, the user may establish policies for "best friends," "friends," and "blocked friends." A list associated with "best friends" may be displayed on a first page of an interface, while a list of friends or blocked friends may be available on subsequent pages of the interface.

In some embodiments, in addition to displaying friends that are currently viewing as well as the content each is viewing, a control option may be associated and/or displayed for every friend. For example, the user of the tablet computer or phone device may wish to interact with a friend. The user may invite the friend to view a show. The user may then request to control the friend's device so that the user may modify how the friend views the material. Additionally, a group of friends may each participate together in a viewing of a program, and may control at least some aspect associated with each of the friend's or user's devices.

In a separate embodiment, the user of a tablet computer or phone device may gain control of another friend's device. The user may capture an image of the screen, modify the image, and then set the image as the wallpaper of the friend's device. Of course, in various embodiments, the user may alter a friend's device in any manner, pursuant to preconfigured policies and/or security permissions granted by each of the users and friends.

As shown, items associated with "currently viewed" are filtered. See operation 6812. For example, in one embodiment, the user may filter the list of content currently being viewed by the user and friends by text in the comments, the time the user logged on, the last comment to be posted, and/or any other filter which may alter the display of the list of currently viewed items.

In one embodiment, the interaction between the user and the friends may occur in real time. For example, a user may login to the television device and begin to watch a program.

A friend may invite the user to watch a different program with the friend. The user may consult a "currently viewed" items list to see if there are any other friends that may be interested in watching the program with both the first friend and the user. During the program, the friends and the user may exchange messages, share content (e.g. screenshots, recorded segments, files, etc.), and/or interact in any other manner.

In another embodiment, the interaction between the user and the friends may occur after time. For example, a user may tape a program (e.g. DVR, etc.) and then invite other friends to join in viewing the taped recording. Of course, in other embodiments, the user may send out invites at any time and in any manner to the friends. The after time interaction may also include the user consulting a "currently viewed" items list to see which friends are available to participate in viewing a program as well. As with real time interaction, once the program begins (i.e. begins playback of the recorded content, etc.), the friends and users may interact in real time. In a separate embodiment, a user may watch a program, add comments to the video (e.g. "great scene," "cool shot," etc.), and then share the program with another friend to view and add further comments. The recorded program therefore may include not only the original content but any additional interaction as well made by the user and any of the friends.

In a further embodiment, the interaction between the user and the friends may rely on simultaneous gesture inputs. For example, in one embodiment, the user of the tablet computer or phone device may provide gesture input (e.g. via camera on the tablet computer or phone device, or a camera attached to the television device, etc.) to interact with a game displayed on the television device. The user may invite a friend may join the game and provide a second gesture input (e.g. via a camera input at the second location, etc.) whereby a second interaction (e.g. player, etc.) may be incorporated into the game displayed on the television device. Of course, in various embodiments, any number of friends may simultaneously interact and provide gesture inputs from each of their locations, correlated and displayed onto one unified screen displayed at all locations. Thus, simultaneous interaction based on more than one gesture input may increase social interaction between a user and friends.

Figure 69:
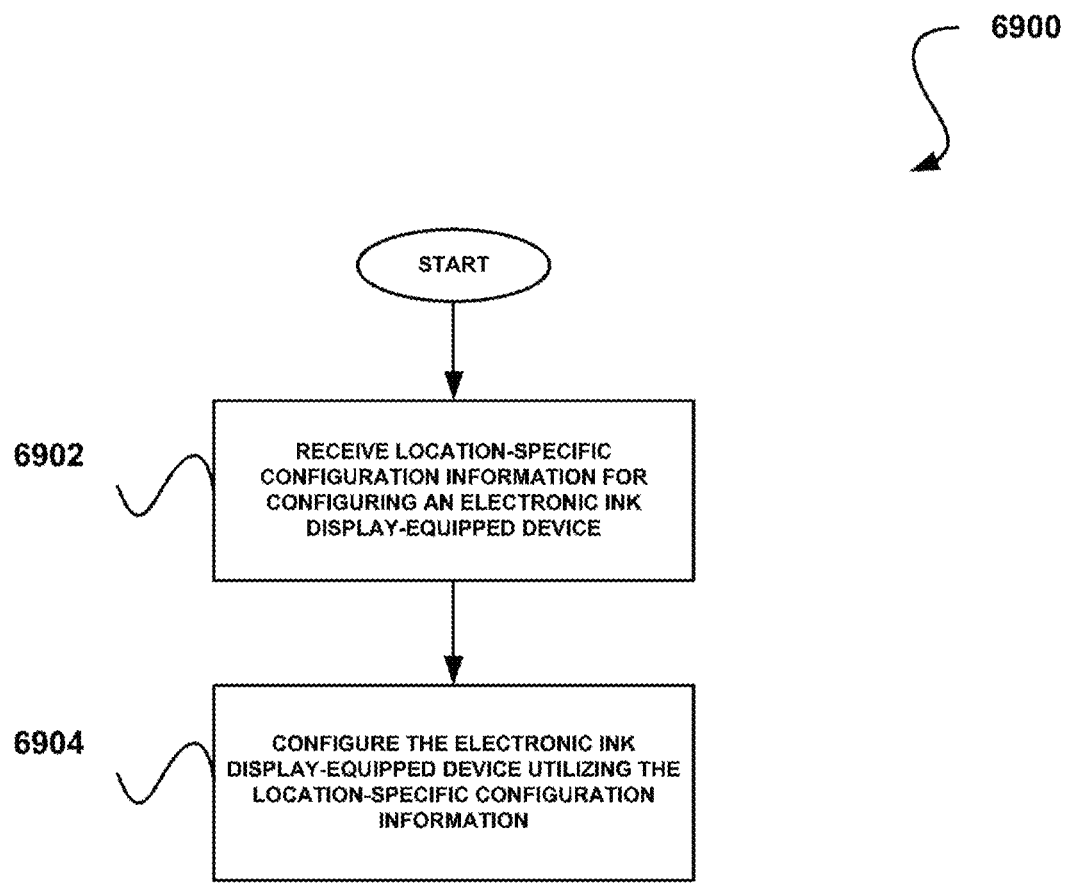
FIG. 69 shows a method for configuring an e-ink display device utilizing location specific information, in accordance with one possible embodiment.

FIG. 69 shows a method 6900 for configuring an e-ink display device utilizing location specific information, in accordance with one possible embodiment. As an option, the method 6900 may be implemented in the context of the architecture and environment of any subsequent Figure(s). Of course, however, the method 6900 may be carried out in any desired environment.

As shown, location-specific configuration information is received for configuring an electronic ink display-equipped device. See operation 6902. In the context of the present description, an electronic ink (e-ink) display refers to any display which is bi-stable. In the context of the present description, bi-stable refers to being capable of holding text or other rendered images even when very little or no power is supplied to the display. In one embodiment, the e-ink display may include a display that has a resolution 150 dpi or better. In another embodiment, the e-ink display may include any technology which may exhibit high contrast, or contrast substantially equal to that of print on paper. For example, the e-ink display may include displays such as bi-stable LCDs, MEMS, cholesteric, pigmented electrophoretic, E Ink-brand display, etc. Further, in one embodiment, the e-ink display may display visual content in black-and-white or grayscale. In some embodiments, the e-ink display may display visual content in color.

Additionally, in the context of the present description, location-specific configuration information refers to any configuration information that relies upon a location. For example, in various embodiments, the location-specific configuration information may include location information, advertising information, school information, doctor check-in information, office information, sports center information, airport information, hotel information, construction site information and/or any other location which may require specific location dependent configuration information. In other embodiments, the location-specific configuration information may be dependent on GPS coordinates, a GPRS network, a short range wireless network (e.g. WiFi, Bluetooth, etc.), a cellular wireless network (e.g. CDMA, LTE, etc.), and/or any system and/or network by which a location may be determined by the e-ink device.

In one embodiment, the e-ink device may be dependent on location-specific configuration information and may also be dependent upon the identity or role of the user. For example, a first time patient to a doctor's office may be presented with a set of first time forms. In an alternative embodiment, a second or more time patient to a doctor's office may be presented, after checking in for an appointment, with a form to update any information, an application to see past test results, an online database to explain terms that the doctor has mentioned, a set of multimedia features to entertain the patient until the doctor is available, and/or any other set of information which may be personalized to the user.

In another embodiment, rather than associate personalized information with a user, a unique identifier may be associated with the user. The unique identifier may be stored in a central database (e.g. located at the doctor's office, etc.). The central database may permit the patients to use the e-ink reader (e.g. for entertainment purposes, etc.) in a more anonymous manner. In another embodiment, the central database may be used to gather information relating directly to a user and/or a role (e.g. a first time user, etc.).

In one embodiment, information may be wirelessly downloaded to the e-ink device in response to the user logging in, a first time user inputting information, and/or any other available action which is displayed on the display and selected by the user. Additionally, downloaded information may be dependent on location sensors. For example, an e-ink reader may provide access to certain features (e.g. forms, entertainment, internet, etc.) while in the waiting room, but after moving into the examination room, the e-ink reader may automatically display a different set of features (e.g. act as a secondary display to the doctor's device, provide graphic demonstration of procedure to be discussed, etc.). In a further embodiment, the e-ink device may function dependent on another device (e.g. master-slave relationship, etc.). For example, in one embodiment, a doctor may use a device to control the e-ink device such that, for example, the doctor may be permitted to interact with the client (e.g. display charts, display tests, run diagnostic application, etc.). Further, in other embodiments, the e-ink device may function differently depending on the master-slave relationship. For example, in one embodiment, a nurse's device may use the e-ink device as an input device (e.g. input signatures, etc.), to display forms, and/or to otherwise interact with the patient in any manner.

Of course, in various embodiments, the e-ink device may be configured to automatically apply preconfigured settings based on the master-slave relationship. Additionally, the automatic settings may be applied once the e-ink device is brought within a preconfigured proximity of another master device. In a further embodiment, the e-ink device may automatically apply more than one preconfigured setting. For example, in one embodiment, if both a nurse and a doctor were present in a room, each with a device, the e-ink device associated with the patient may automatically partition half of the screen for receiving an input from the doctor's device, and the other half of the screen to receive an input from the nurse's device. Of course, the screen and/or any other feature associated with the e-ink device may be configured in any manner when connected to more than one device.

In one embodiment, the e-ink device may include at least one location sensor used to determine the location of the device. In another embodiment, the at least one location sensor may be used to wirelessly transfer to a controller a unique identifier and an indication of a location. The controller may be used to monitor all e-ink device within a set proximity, as well as to send context-sensitive information to each e-ink device based on its location. In one embodiment, the information may be selected from a database by the controller in response to the unique identifier and the e-ink device's location, and the information is wirelessly transmitted to each e-ink device.

Additionally, in another embodiment, the location of the e-ink device may be used to trigger an alarm. For example, the system may include an alarm operative to warn of a location-based violation (e.g. e-ink device is out of intended proximity range, etc.) in response to the controller. In one embodiment, the location-specific configuration information may include location information and the computer program product may be operable such that an alarm is triggered upon the electronic ink display-equipped device being moved outside predetermined limits that are based on the location information. In one embodiment, the alarm may be an audible sound. In other embodiments, the screen may indicate that the device has been moved beyond its preconfigured location, the device may be locked and a location of the e-ink device's location may be sent to a server, and/or any other method may be used to warn of a location-based violation.

In one embodiment, an alarm setting may allow an administrator of the e-ink device to specify an alarm location (e.g. proximity location, etc.). In one embodiment, the administrator may set-up the e-ink device and may configure the alarm based on the location of the e-ink device. For example, the administrator, when situated at a particular location, may simply set the apparatus to produce an output signal (e.g. alarm, etc.) based on information describing the physical location of the e-ink device which may be derived from a location detection mechanism, thereby allowing the administrator to not have to input such information. As such, there may be no requirement for the administrator to have any knowledge of where the e-ink device is located (in terms of physical geographic location) with reference to navigational co-ordinates, etc. In one embodiment, once the administrator finishes setting up the settings on an initial e-ink device, the settings may be sent wirelessly or by wire to the other e-ink devices to be used within the set preconfigured location.

In other embodiments, the administrator may configure additional information to be associated with the alarm. For example, in some embodiments, the alarm may lock and/or prevent a user from accessing and/or being permitted to use the device, the alarm may take a snapshot (e.g. photo) of the surroundings, the device may malfunction and stop working, and/or any other action may be preconfigured to respond to an alarm. In one embodiment, when the user desires to turn on the e-ink device when an alarm has been activated on the device, a snapshot (e.g. photo) may be automatically taken and sent to a central database, fingerprints may be gathered from the user (e.g. using touch sensors, etc.), and/or any feature associated with the e-ink device may be used and configure to respond in a preconfigured manner associated with the activation of an alarm. As such, supplementary information (e.g. location, fingerprints, photos, etc.) may be gathered and associated with an alarm.

In another embodiment, the setting of a location alarm may include specifying an alarm location with reference to a database. For example, such a database may contain place names or a representation of a map, and the administrator may set the alarm by specifying an alarm location with reference to the database. The database may be interrogated to obtain information describing the physical location of the selected place name or position selected on the map. This may allow an alarm to be set for a particular location without the need to have ever physically visited the location. Where the database contains a representation of a map, an alarm location may be specified in terms of features of the map. For example, the selection of a symbol on a map showing the location of a front desk may cause an alarm event that will occur when the device is within a preconfigured proximity to the front desk. Each e-ink device may receive an update (e.g. of alarms parameters and specifications, etc.) automatically. For example, the e-ink devices may be updated every night at a preconfigured time (e.g. midnight every night, etc.). In other embodiments, the e-ink devices may poll the database at set intervals to check for any updates. Of course, in other embodiments, the e-ink devices may receive updates in any manner and by any means.

In one embodiment, the location of the e-ink device may be obtained by various methods. For example, in various embodiments, the e-ink device may obtain its location based on a GPS signal (e.g. GPRS, etc.), a TV-GPS signal, location beacons, a wireless network (e.g. CDMA, WiFi, etc.), and/or short-range wireless protocols (e.g. Bluetooth, etc.). Of course, in other embodiments, any method may be used to determine the location of the e-ink device. In other embodiments, the location of the e-ink device may be obtained through a wired connection (e.g. Ethernet, device receiver, etc.).

In some embodiments, the GPS location determination accuracy may degrade or become unusable, as the GPS satellite signals generally cannot penetrate walls, roofs, and floors. In such a situation, the location sensor may comprise a TV-GPS receiver. TV-GPS may use the timing information in broadcast television signals to perform ranging measurements and to calculate location by triangulation, similar to GPS technology. Television signals are designed to penetrate deep into buildings, and may offer additional benefits such as frequency diversity by virtue of the large number of channels available.

In another embodiment, an indoor location sensor may comprise a directed energy receiver, receiving directed energy signals emitted from at least one location beacon placed in known locations throughout the set location. Each location beacon may emit a unique code or modulation, distinguishing it from all other location beacons. In this manner, a location associated with the e-ink device may be uniquely associated with each location beacon. In one embodiment, the at least one location beacon may comprise active radio frequency identification (RFID) transmitters, and the location sensor on the e-ink device may comprise an RFID reader. Alternatively, the location beacons may comprise passive RFID transmitters.

In one embodiment, the at least one location beacon may comprise acoustic emitters (e.g. ultrasonic, etc.). In still another embodiment, the at least one location beacon may transmit optical energy (e.g. infrared, etc.). In these embodiments, the location sensor may comprise a complimentary receiver operative to receive the directed energy from the location beacon and to extract the unique code. In one embodiment, the location sensor may transmit its location (or the unique code of one or more location beacons) to a server.

As shown, the electronic ink display-equipped device is configured utilizing the location-specific configuration information. See operation 6904. In the context of the present description, configure may refer to setting up or applying settings relating to a specific purpose. For example, based on the location-specific configuration information, a device may apply settings relating to a doctor's office, a law firm, a medical setting, a customer-relation setting, a tourist setting (e.g. hotel, concierge desk, etc.), an education setting (e.g. school classroom, university library, etc.), a financial setting (e.g. bank, auditing firm, etc.), and/or any other location where settings relating to a specific purpose may be applied to the e-ink device.

In one embodiment, based off of the location of the e-ink device, the device may automatically switch from using a WWAN to using a WLAN when the device moves from outside the intended location (e.g. office network area, etc.) into a separate network area (e.g. the user's network area, etc.). A geographic zone may be preconfigured to apply settings based off of the location.

In another embodiment, the geographic map and location specific information may be stored in memory on the e-ink device. Alternatively, the geographic map and location specific information may be stored centrally on a server to which devices may be network connected. In such an embodiment, upon entry into a geographic zone, the e-ink device may access the server, and then download and execute the settings associated with the location specific information for that zone. In some embodiments, the location specific information may be associated with a group policy. Such an embodiment has an advantage of centralized management of devices, in that a network administrator may quickly and easily add, delete and/or modify one or more of the settings associated with the location specific information for a plurality of e-ink devices. Policies may be set up so that different users of a given device may receive different settings associated with the location specific information, based on any number of criteria.

In one embodiment, the location specific information may be used to determine when a new geographic zone has been entered and exited, and for executing and terminating settings associated with the location specific information accordingly. Upon a determination that an e-ink device has crossed a boundary into a geographic zone, the settings associated with the location specific information for that zone may be executed. Similarly, upon a determination that an e-ink device has crossed a boundary out of a geographic zone, the settings associated with the location specific information may be stopped or reversed.

In various embodiments, settings are applied on an e-ink device. In one embodiment, an application programming interface (API) allows the location specific information to interact with the e-ink device's operating system to initiate, terminate and/or alter any of a variety of system settings on the device. In another embodiment, the e-ink device may function in a master-slave environment and display whatever is sent by a master device. In another embodiment, the e-ink device may be manually controlled through the cloud (e.g. apply, reverse, delete settings associated with location specific information, etc.).

In one embodiment, a geographic map may be uniquely created for each e-ink device. Alternatively, two or more e-ink devices may share the same geographic map. The geographic map including one or more geographic zones may be generated, for example by a user or an IT administrator, and then stored in memory on an e-ink device. Alternatively, a geographic map may be stored remotely from an e-ink device, and downloaded to the e-ink device via a portable memory, or via a network connection such as for example the Internet.

In a further embodiment, a map may be set up via the user interface on the e-ink device, or by an administrator using a different computing device. In one embodiment for setting up the map, one or more real world geographical maps may be presented to the user/administrator, and the user/administrator may select points on the real world map (e.g. using a mouse, etc.). Those points may then be translated into symbolic coordinates and stored with an association to the real world coordinates as described above, or they may be stored as the real world coordinates (longitude and latitude) as described above.

Although the above description has focused on use of an e-ink device, the above embodiments and description may equally apply with respect to use of a tablet computer or phone device rather than an e-ink device. In the context of the present description, a tablet computer refers to any portable computer shaped and/or sized like a tablet. For example, in one embodiment, the tablet computer may include a personal digital assistant (PDA), a laptop personal computer with a rotatable touchscreen, a tablet (e.g. Apple i-pad, Microsoft Slate, etc.), and/or any other portable computer shaped and/or sized like a tablet. In another embodiment, the tablet computer may include a cellular phone, or any other mobile device. In one embodiment, the tablet computer may include a touch screen. In a further embodiment, the tablet computer or phone device may include a tablet computer.

In the context of the present description, a phone device refers to any apparatus that is portable and provides telephonic functions. For example, in various embodiments, a phone device may include a cellular phone, smart phones, an IPHONE, a BLACKBERRY, a PDA, a hand held computer, a tablet computer, or any apparatus that is portable and may provide telephonic functions. In addition, in some embodiments, a phone device may include any device capable of receiving broadband access through a UTMS, CDMA, GSM EDGE, WIMAX, LTE, or LTE Advanced system, or any other mobile telecommunication broadband system.

In one embodiment, the phone device may include a device with cellular phone capabilities. In another embodiment, the phone device may include a short-range wireless communication protocol headset. In the context of the present description, short-range wireless communication protocol headset may refer to any wireless protocol that functions at a short-range. For example, in one embodiment, the short-range wireless communication protocol may include Wireless USB, Bluetooth, Wi-Fi, or any other wireless protocol which may function at a short-range.

More illustrative information will now be set forth regarding various optional architectures and features with which the foregoing techniques discussed in the context of any of the present or previous figure(s) may or may not be implemented, per the desires of the user. For instance, various optional examples and/or options associated with receiving location-specific configuration information for configuring an electronic ink display-equipped device 6902, configuring the electronic ink display-equipped device utilizing the location-specific configuration information 6904, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 70:
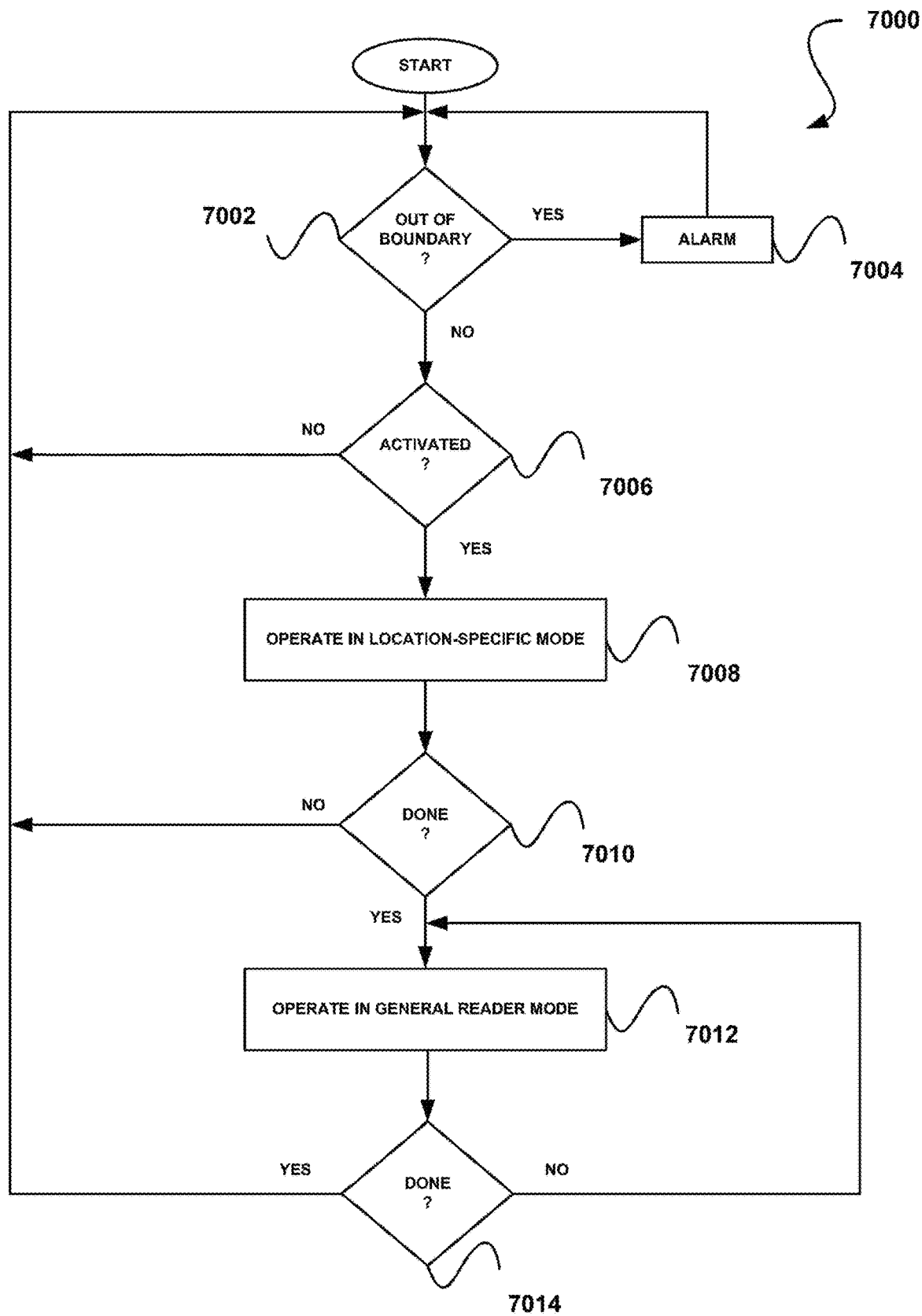
FIG. 70 shows a method for operating an e-ink display device in a location specific mode, in accordance with one possible embodiment.

FIG. 70 shows a method for operating an e-ink display device in a location specific mode, in accordance with one possible embodiment. As an option, the method 7000 may be implemented in the context of the architecture and environment of the previous Figures or any subsequent Figure(s). Of course, however, the method 7000 may be carried out in any desired environment. It should also be noted that the aforementioned definitions may apply during the present description.

As shown, it is determined whether the e-ink device is out of boundary. See decision 7002. In one embodiment, the e-ink device may include at least one location sensor used to determine the location of the device. In another embodiment, the at least one location sensor may be used to wirelessly transfer to a controller a unique identifier and an indication of a location. The controller may be used to monitor all e-ink device within a set proximity, as well as to send context-sensitive information to each e-ink device based on its location. In one embodiment, the information may be selected from a database by the controller in response to the unique identifier and the e-ink device's location, and the information is wirelessly transmitted to each e-ink device.

If it is determined that the e-ink device is out of boundary, an alarm may be triggered. See operation 7004. For example, the system may include an alarm operative to warn of a location-based violation (e.g. e-ink device is out of intended proximity range, etc.) in response to the controller. In one embodiment, the location-specific configuration information may include location information and the computer program product may be operable such that an alarm is triggered upon the electronic ink display-equipped device being moved outside predetermined limits that are based on the location information. In one embodiment, the alarm may be an audible sound. In other embodiments, the screen may indicate that the device has been moved beyond its preconfigured location, the device may be locked and a location of the e-ink device's location may be sent to a server, and/or any other method may be used to warn of a location-based violation.

If it is determined that the e-ink device is not out of boundary, it is determined whether the device is activated. See decision 7006. In one embodiment, the e-ink device may be registered and thereby activated through a cloud based system (e.g. Internet, etc.). In another embodiment, the e-ink device may be activated by a local network server. In a further embodiment, the e-ink device may be activated by entering a passcode or activation code whereby the device may be activated.

In some embodiments, the activation of the e-ink device may occur automatically. For example, in one embodiment, powering on the e-ink device for the first time may activate the device by automatically logging the device into a central database and authorizing the device by a central server. In another embodiment, the activation of the e-ink device may occur manually. For example, powering on the e-ink device for the first time may cause a prompt to be displayed requesting an activation code to be entered by the user of the device. In another embodiment, an e-ink device may be manually activated by registering the device on a central server (e.g. through navigating a set-up interface on the e-ink device or on the server client, etc.). Of course, any methods or means may be used to activate the e-ink device.

If it is determined that the e-ink device has been activated, the e-ink device is operated in location-specific mode. See operation 7008. In various embodiments, the location-specific configuration information may include location information, advertising information, school information, doctor check-in information, office information, sports center information, airport information, hotel information, construction site information and/or any other location which may require specific location dependent configuration information. In other embodiments, the location-specific configuration information may be dependent on GPS coordinates, a GPRS network, a short range wireless network (e.g. WiFi, Bluetooth, etc.), a cellular wireless network (e.g. CDMA, LTE, etc.), and/or any system and/or network by which a location may be determined by the e-ink device.

In one embodiment, the e-ink device may be dependent on location-specific configuration information and may also be dependent upon the identity or role of the user. For example, a first time patient to a doctor's office may be presented with a set of first time forms. In an alternative embodiment, a second or more time patient to a doctor's office may be presented, after checking in for an appointment, with a form to update any information, an application to see past test results, an online database to explain terms that the doctor has mentioned, a set of multimedia features to entertain the patient until the doctor is available, and/or any other set of information which may be personalized to the user.

In another embodiment, rather than associate personalized information with a user, a unique identifier may be associated with the user. The unique identifier may be stored in a central database (e.g. located at the doctor's office, etc.). The central database may permit the patients to use the e-ink reader (e.g. for entertainment purposes, etc.) in a more anonymous manner. In another embodiment, the central database may be used to gather information relating directly to a user and/or a role (e.g. a first time user, etc.).

In one embodiment, information may be wirelessly downloaded to the e-ink device in response to the user logging in, a first time user inputting information, and/or any other available action which is displayed on the display and selected by the user. Additionally, downloaded information may be dependent on location sensors. For example, an e-ink reader may provide access to certain features (e.g. forms, entertainment, internet, etc.) while in the waiting room, but after moving into the examination room, the e-ink reader may automatically display a different set of features (e.g. act as a secondary display to the doctor's device, provide graphic demonstration of procedure to be discussed, etc.). In a further embodiment, the e-ink device may function dependent on another device (e.g. master-slave relationship, etc.). For example, in one embodiment, a doctor may use a device to control the e-ink device such that, for example, the doctor may be permitted to interact with the client (e.g. display charts, display tests, run diagnostic application, etc.). Further, in other embodiments, the e-ink device may function differently depending on the master-slave relationship. For example, in one embodiment, a nurse's device may use the e-ink device as an input device (e.g. input signatures, etc.), to display forms, and/or to otherwise interact with the patient in any manner.

Of course, in various embodiments, the e-ink device may be configured to automatically apply preconfigured settings based on the master-slave relationship. Additionally, the automatic settings may be applied once the e-ink device is brought within a preconfigured proximity of another master device. In a further embodiment, the e-ink device may automatically apply more than one preconfigured setting. For example, in one embodiment, if both a nurse and a doctor were present in a room, each with a device, the e-ink device associated with the patient may automatically partition half of the screen for receiving an input from the doctor's device, and the other half of the screen to receive an input from the nurse's device. Of course, the screen and/or any other feature associated with the e-ink device may be configured in any manner when connected to more than one device.

In one embodiment, a location-specific mode may further include applying settings relating to a doctor's office, a law firm, a medical setting, a customer-relation setting, a tourist setting (e.g. hotel, concierge desk, etc.), an education setting (e.g. school classroom, university library, etc.), a financial setting (e.g. bank, auditing firm, etc.), and/or any other location where settings relating to a specific purpose may be applied to the e-ink device. In various embodiments, settings are applied on an e-ink device.

In one embodiment, an application programming interface (API) allows the location specific information to interact with the e-ink device's operating system to initiate, terminate and/or alter any of a variety of system settings on the device. In another embodiment, the e-ink device may function in a master-slave environment and display whatever is sent by a master device. In another embodiment, the e-ink device may be manually controlled through the cloud (e.g. apply, reverse, delete settings associated with location specific information, etc.).

It is determined whether the e-ink device is done operating in location-specific mode. See decision 7010. In one embodiment, a time-lapse of inactivity of the e-ink device may cause the device to be done operating in location-specific mode. In another embodiment, once the e-ink device is returned to a set location (e.g. front-desk of office, docking station for e-ink devices, etc.), the device may automatically recognize that the device is done operating in location-specific mode. In a separate embodiment, a prompt may be given to a user asking the user if the e-ink device is done operating in location-specific mode (e.g. "Would you like to end the location-specific mode session?," etc.). In some embodiments, a prompt may be dependent on a trigger (e.g. device moved into a predefined location, lapse of inactivity, etc.).

If it is determined that the e-ink device is done operating in location-specific mode, the e-ink device operates in general reader mode. See operation 7012. In the context of the present description, a general reader mode may refer to any mode not dependent on a location. In one embodiment, upon being activated, the electronic ink display-equipped device may operate initially in a location-specific mode by default for serving a purpose specific to a predetermined location. After serving the purpose (i.e. if it is determined that the e-ink device is done operating in location-specific mode), the electronic ink display-equipped device automatically may operate in a general use mode for allowing a user to review general literature. In another embodiment, in response to user selection, the electronic ink display-equipped device operates in a general use mode for allowing a user to review general literature.

In one embodiment, general literature may include mode permitting access to informational documents (e.g. about the business, etc.), a registration screen, access to entertainment resources (e.g. books, internet, videos, music, etc.) and/or include any material and/or be configured in any manner not dependent on a location. In a further embodiment, during use in a general use mode for allowing a user to review general literature, advertising may be displayed. In one embodiment, the advertising may be configured based on the location-specific configuration information, on input of a service provider that provides the electronic ink display-equipped device, on a set advertising contract that is managed by a central network server, and/or on any method by which advertising is incorporated and used by e-ink device in general reader mode.

In a separate embodiment, advertising may also be displayed in location-specific mode. In one embodiment, the advertising may be configured based on the location-specific configuration information, on input of a service provider that provides the electronic ink display-equipped device, on a set advertising contract that is managed by a central network server, and/or on any method by which advertising is incorporated and used by e-ink device in general reader mode. Further, in another embodiment, the advertising may be incorporated into the location-specific mode in any manner (e.g. in association with an application, etc.).

It is determined if the e-ink device is done operating in general reader mode. See decision 7014. In one embodiment, a time-lapse of inactivity of the e-ink device may cause the device to be done operating in general reader mode. In another embodiment, once the e-ink device is returned to a set location (e.g. front-desk of office, docking station for e-ink devices, etc.), the device may automatically recognize that the device is done operating in general reader mode. In a separate embodiment, a prompt may be given to a user asking the user if the e-ink device is done operating in general reader mode (e.g. "Would you like to end the general reader mode session?," etc.). In some embodiments, a prompt may be dependent on a trigger (e.g. device moved into a predefined location, lapse of inactivity, etc.).

Figure 71:
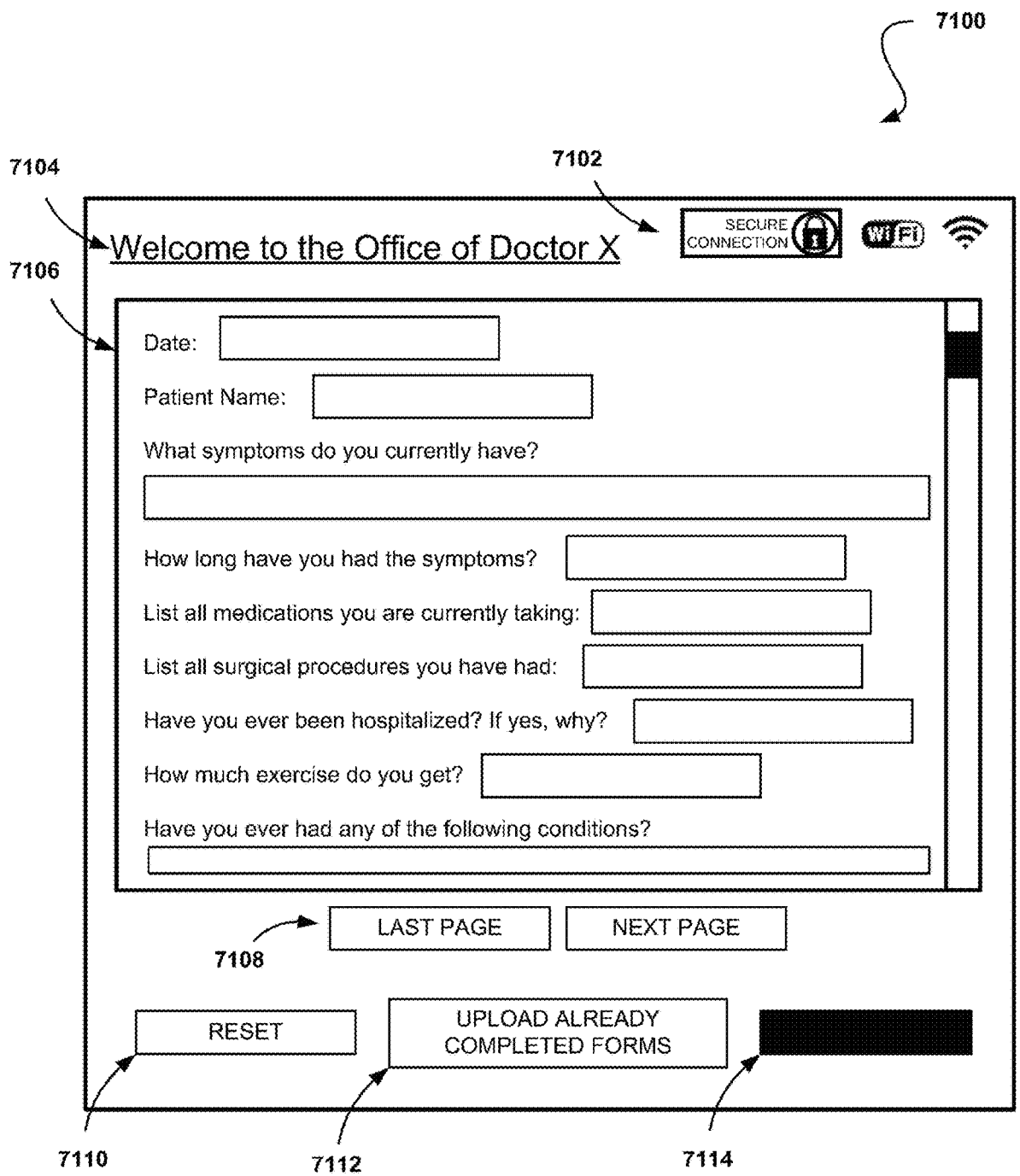
FIG. 71 shows a user interface for receiving user input at a doctor's office location specific mode, in accordance with one possible embodiment.

FIG. 71 shows a user interface for receiving user input at a doctor's office location specific mode, in accordance with one possible embodiment. As an option, the user interface 7100 may be implemented in the context of the architecture and environment of the previous Figures or any subsequent Figure(s). Of course, however, the user interface 7100 may be carried out in any desired environment. It should also be noted that the aforementioned definitions may apply during the present description.

As shown, the user interface may include wireless connection status icons and/or secure connections indicia 7102. In one embodiment, the secure connection may include a predetermined (e.g. by the Administrator, etc.) type of encryption. A status icon may be displayed on the device's display to indicate that a secure connection has been achieved. The encrypted connection may be used in any setting associated with the e-ink device. For example, a doctor's office may desire to reassure its clients (e.g. those filling out highly sensitive documents, etc.) that the connection between the e-ink device and its servers is secure.

In another embodiment, the secure connection icon may also be used to indicate that a genuine authenticated user is using the e-ink device. In one embodiment, the user may need to provide a set of credentials (e.g. username, password, member id, etc.) in order to initially have access to the device. When a user is using the device for a first time, a user may set up the authentication credentials to be used to access the device (or any device on the local network) in the future.

As shown, the Administrator, or any indicia, 7104 may be displayed. Additionally, an input pane 7106 may be displayed requesting input from a user. In various embodiments, the input pane may include a series of questions and provide a box in which the response may be given. In one embodiment, the input may include questions requesting the "Date," "Patient Name," "What symptoms do you currently have?," "How long have you had the symptoms?," "List all medications you are currently taking," "List all surgical procedures you have had," "Have you ever been hospitalized? If yes, why?," "How much exercise do you get?," "Have you had any of the following conditions," and/or any questions associated with a doctor's office. Of course, the input pane may be preconfigured and tailored for any environment and/or application.

As shown, the e-ink device may include navigation buttons. For example, in one embodiment, the navigation buttons may include "Last Page," "Next Page," and/or any other preconfigured button used to navigate the user interface. As shown, additional buttons, including "Reset" 7110, "Upload Already Completed Forms" 7112, and "Submit" 7114, used to control information in the input pane, are also displayed.

In one embodiment, the "Reset" button may clear away all entered information on the input pane page. In another embodiment, the "Reset" button may clear away all entered information on any of the input pane pages. In one embodiment, a user may "Upload Already Completed Forms." For example, a doctor's office may have a digital version of all of the documents available in the cloud (e.g. online, etc.). The user may complete the forms and save them in the cloud or on some type of memory device (e.g. Flash drive, etc.). The user may upload the completed forms by downloading the forms from the cloud, or by uploading the completed forms from the memory device. In a further embodiment, the user may simply email all of the completed forms to a specified location (e.g. email address, etc.) and input an access code to by-step the forms on the e-ink device.

In one embodiment, the "Submit" button may compile and transmit all of the entered data to a central network database and/or server. In another embodiment, a user may not submit all of the entered data until required questions have been completed. In such a situation, the selection box may be grayed out until the user has completed entering all requested information.

In one embodiment, the e-ink device may receive input from the user by a physical keyboard located on the device. In another embodiment, the e-ink device may include a touchscreen whereby a user may enter the requested information through a digital keyboard. Of course, any means (e.g. finger, stylus, pen, etc.) suitable for inputting may be used to input the information.

Figure 72:
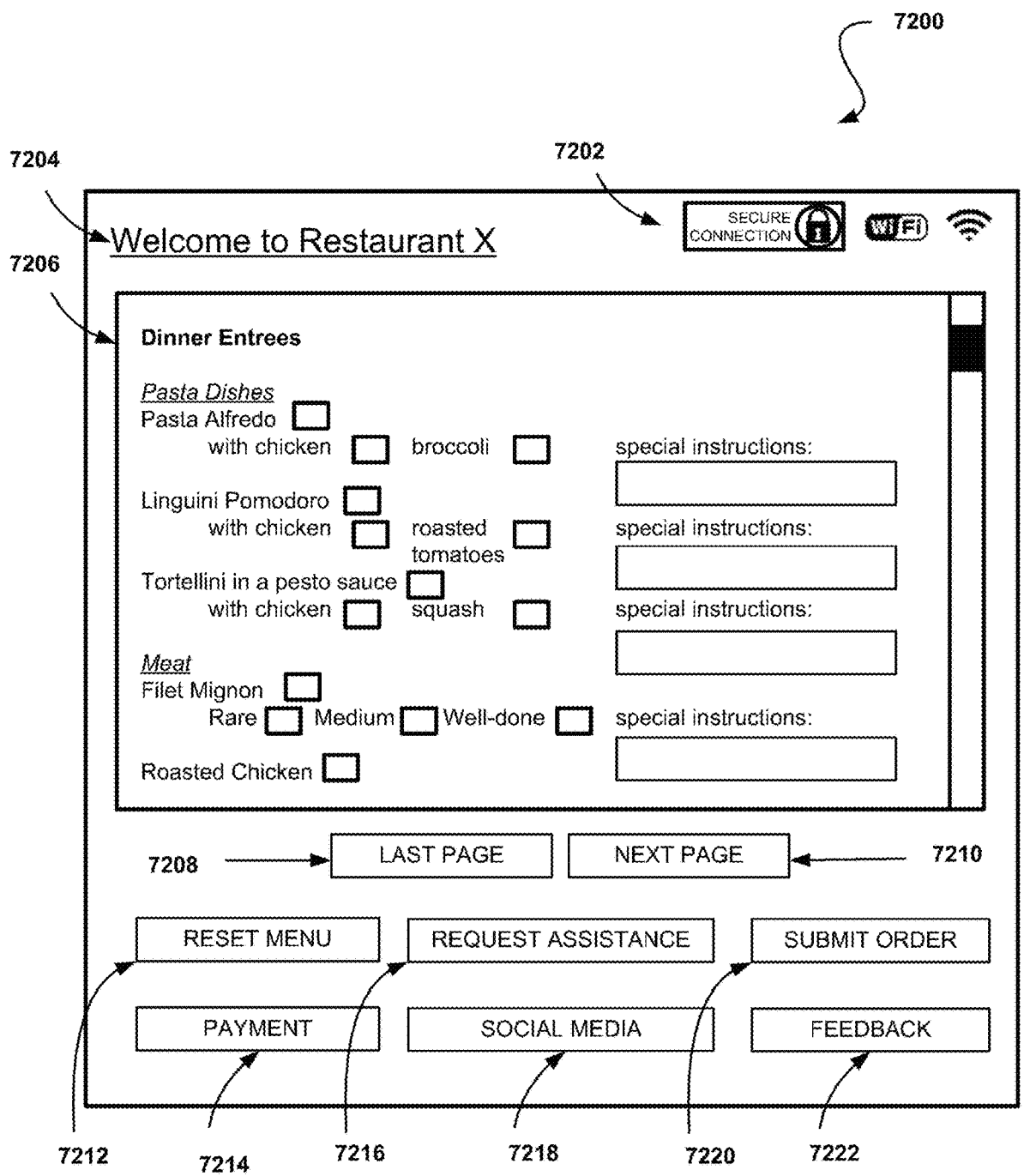
FIG. 72 shows a user interface for receiving user input at a restaurant location specific mode, in accordance with one possible embodiment.

FIG. 72 shows a user interface for receiving user input at a restaurant location specific mode, in accordance with one possible embodiment. As an option, the user interface 7200 may be implemented in the context of the architecture and environment of the previous Figures or any subsequent Figure(s). Of course, however, the user interface 7200 may be carried out in any desired environment. It should also be noted that the aforementioned definitions may apply during the present description.

As shown, the user interface may include wireless connection status icons and/or secure connections indicia 7202. In one embodiment, the secure connection may include a predetermined (e.g. by the Administrator, etc.) type of encryption. A status icon may be displayed on the device's display to indicate that a secure connection has been achieved. The encrypted connection may be used in any setting associated with the e-ink device. For example, a restaurant may desire to reassure its clients (e.g. those using the device to pay for their meal, etc.) that the connection between the e-ink device and its servers is secure.

As shown, the Administrator, or any indicia, 7204 may be displayed. Additionally, an input pane 7206 may be displayed requesting input from a user. In various embodiments, the input pane may request information from the user, including permitting the user to make a selection of dinner menu items. For example, the user may select a dinner entree, including "Pasta Alfredo," "Linguini Pomodoro," "Tortellini in a pesto sauce," "Filet Mignon," "Roasted Chicken," and/or any dinner item. For each of the dinner entrees, the user may select additional items to add onto the dish, including "with chicken," "with broccoli," "with roasted tomatoes," "with squash," and select how well done the dish is to be cooked, including "rare," "medium," "well-done." For each of the items, an input box of "special instructions" may permit the user to indicate further instructions on how the dish is to be prepared (e.g. include no onions, etc.). Of course, any selectable item may be included on the input pane. In a separate embodiment, an input pane page may prompt the user to "invent your own dish," and provide a list of ingredients which the user may select.

As shown, navigation buttons "Last Page" 7208 and "Next Page" 7210 may be displayed. Of course, any text may be displayed on the buttons (e.g. Dinner Items, Appetizers, etc.) in place of "Last Page" and "Next Page." Additionally, buttons are included to facilitate interaction between the user of the e-ink device and the restaurant establishment. For example, buttons to facilitate interaction may include "reset menu" 7212, "payment" 7214, "request assistance" 7216, "social media" 7218, "submit order" 7220, "feedback" 7222, and/or any other button that may be used to facilitate interaction between the user of the e-ink device and the restaurant establishment.

In one embodiment, the "reset menu" may uncheck any selection and delete any comments in "special instructions." In another embodiment, the "reset menu" may display a further popup window requesting the user to indicate which pages to reset. In one embodiment, the "payment" button may permit the user to prepay for the meal, or to pay for the meal at any time before leaving the restaurant. In various embodiments, the payment may be received through traditional means (e.g. credit card, debit card, etc.). In other embodiments, the payment may be paid through online means (e.g. paypal, Facebook credits, google account, etc.). In one embodiment, upon selecting the "payment" button, the e-ink device may request the user to place a digital wallet (e.g. Google Wallet, etc.) located on a smartphone or another device near the sensor on the e-ink device.

In one embodiment, the user may "request assistance" in using the e-ink device from the restaurant establishment. In another embodiment, the "social media" button may permit posting updates on any social networking site (e.g. Facebook, twitter, LinkedIn, etc.). Additionally, the "social media" may be used to rate the food (e.g. via Yelp, etc.), give reviews about the restaurant establishment (e.g. via Yelp, etc.), and/or interact in some way with a social networking site. In one embodiment, the "submit order" may transmit the menu order to be processed. In some embodiments, the "submit order" may also activate a separate screen (e.g. videos, music, advertisements, etc.), a ticker to countdown until the meal will be delivered, and/or any screen that may further cause interaction with the user. In a further embodiment, the "feedback" button may bring up a feedback form (e.g. with selectable ratings, etc.), an input box for any comments, and/or any other display whereby the user may submit some feedback to the restaurant establishment.

Figure 73:
FIG. 73 shows a user interface for notifying the user that the device has been removed from its intended location, in accordance with one possible embodiment.

FIG. 73 shows a user interface for notifying the user that the device has been removed from its intended location, in accordance with one possible embodiment. As an option, the user interface 7300 may be implemented in the context of the architecture and environment of the previous Figures or any subsequent Figure(s). Of course, however, the user interface 7300 may be carried out in any desired environment. It should also be noted that the aforementioned definitions may apply during the present description.

As shown, the user interface may include wireless connection status icons and/or GPS status icons 7302. In various embodiments, the WiFi connection status icon may indicate the strength of the WiFi signal, the GPS connection status icon may indicate the strength of the GPS signal, and/or any type of connection status may be included. As shown, the status of the device 7304 (e.g. sending data to owner, gathering GPS signal, locking the device, etc.) may be displayed. Of course, in other embodiments, the status of the device may remain hidden from the user.

As shown, a display pane 7306, may notify the user that the device has been removed from its intended location. In one embodiment, the pane may display "Warning," "This device has been removed from its intended location," "The device is now locked and the GPS coordinates will be sent to the owner," "Please return this device to: The Office of Doctor X, 12345 Street A, City, State, Zip Code, (XXX) XXX-XXXX," and/or any other predetermined text. In other embodiments, the pane may cause interaction with a user. For example, in one embodiment, the pane may request the identity of the user, ability for the user to purchase the device (and thereby unlock it), step by step instructions on how to return the device, and/or any other item which may cause interaction with a user.

Additionally, in one embodiment, the device may apply preconfigured settings triggered by an alarm. For example, the screen of the e-ink device may indicate that the device has been moved beyond its preconfigured location, the device may be locked and a location of the e-ink device's location may be sent to a server, and/or any other method may be used to warn of a location-based violation. In one embodiment, an alarm setting may allow an administrator of the e-ink device to specify an alarm location (e.g. proximity location, etc.).

In other embodiments, the administrator may configure additional information to be associated with the alarm. For example, in some embodiments, the alarm may lock and/or prevent a user from accessing and/or being permitted to use the device, the alarm may take a snapshot (e.g. photo) of the surroundings, the device may malfunction and stop working, and/or any other action may be preconfigured to respond to an alarm. In one embodiment, when the user desires to turn on the e-ink device when an alarm has been activated on the device, a snapshot (e.g. photo) may be automatically taken and sent to a central database, fingerprints may be gathered from the user (e.g. using touch sensors, etc.), and/or any feature associated with the e-ink device may be used and configure to respond in a preconfigured manner associated with the activation of an alarm. As such, supplementary information (e.g. location, fingerprints, photos, etc.) may be gathered and associated with an alarm.

As shown, an administration code button 7308 may be included. The administration code button may be used to input an administration code to bypass the alarm. For example, the e-ink device may be temporarily given to a user to facilitate interaction with the office. In one embodiment, a patient may be given an e-ink device by which test results may be viewed and explained in real time by a physician. In such a situation, an administration code may be entered thereby permitting the user to access the full features of the e-ink device. Of course, any user (e.g. patient, employee, etc.) may use the device beyond the preconfigured location proximity as long as the administration code has been entered.

Figure 74:
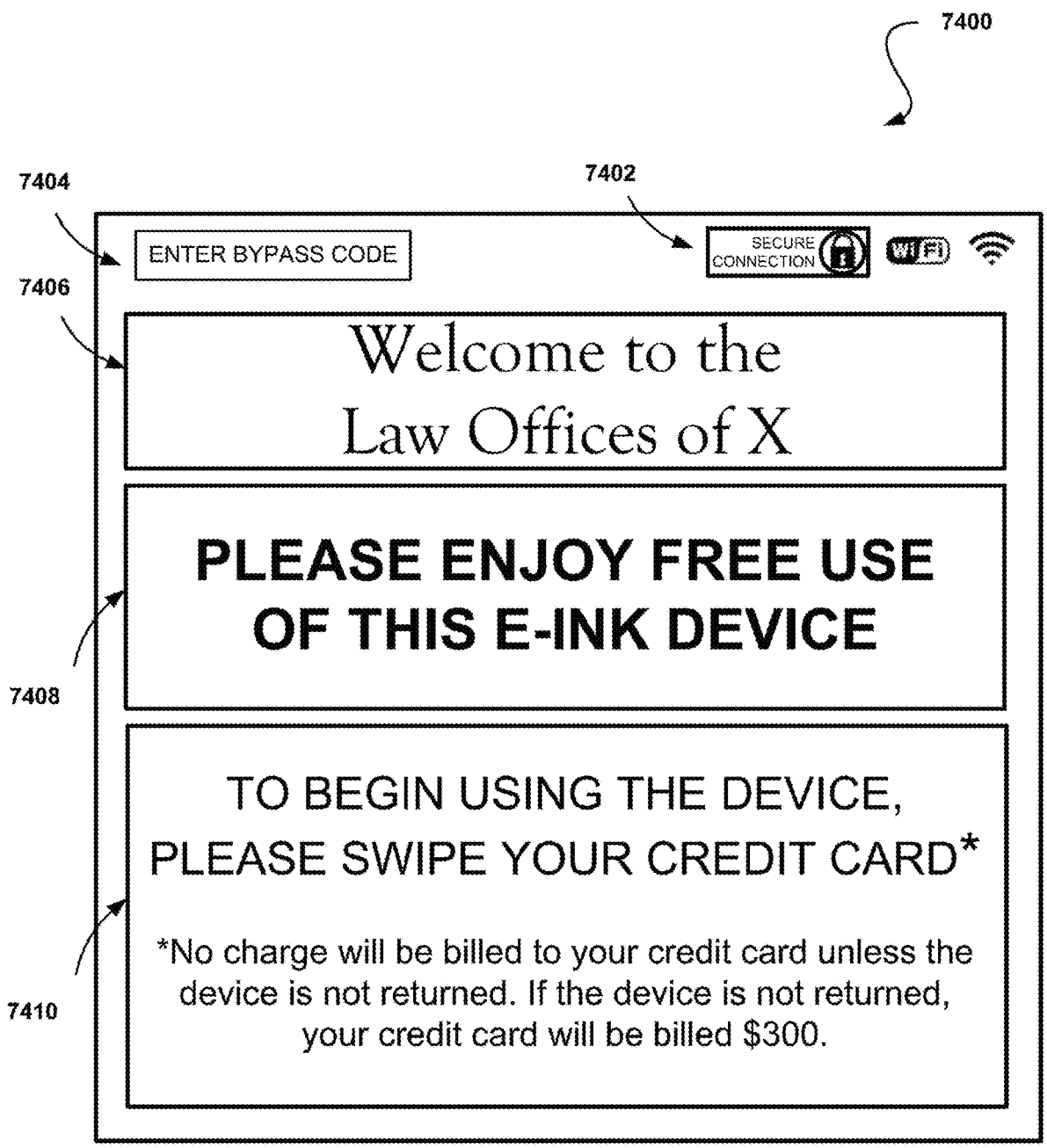
FIG. 74 shows a user interface for commencing use of the e-ink tablet at a law office location specific mode, in accordance with one possible embodiment.

FIG. 74 shows a user interface for commencing use of the e-ink tablet at a law office location specific mode, in accordance with one possible embodiment. As an option, the user interface 7400 may be implemented in the context of the architecture and environment of the previous Figures or any subsequent Figure(s). Of course, however, the user interface 7400 may be carried out in any desired environment. It should also be noted that the aforementioned definitions may apply during the present description.

As shown, the user interface may include wireless connection status icons and/or secure connections indicia 7402. In one embodiment, the secure connection may include a predetermined (e.g. by the Administrator, etc.) type of encryption. A status icon may be displayed on the device's display to indicate that a secure connection has been achieved. The encrypted connection may be used in any setting associated with the e-ink device. For example, a restaurant may desire to reassure its clients (e.g. those using the device to pay for their meal, etc.) that the connection between the e-ink device and its servers is secure. In a further embodiment, a wireless status icon may also be displayed indicating the strength of the WiFi signal.

As shown, a bypass code button 7404 may be displayed. The bypass code button may permit the user to enter a bypass code to gain access to the resources associated with the e-ink device. For example, after entering the bypass code, the user may be permitted to use any application on the device (e.g. email, internet, videos, music, etc.) and/or interact with the e-ink device in any manner.

As shown, the display may include information panes. For example, the panes may include the institution or organization's name 7406, instructions 7408, and details regarding how to use the device 7410. Of course, in various embodiments, the information panes may be configured in any manner and may include more or fewer panes than the three panes described. In one embodiment, the organization's name may include "Welcome to the Law Offices of X," or any personalized text entered by the organization. In a separate embodiment, the organization's name pane may display an image in photo format (e.g. jpeg, .png, etc.).

In one embodiment, the instructions may be customized in any manner. For example, in one embodiment, the instructions may state "Please enjoy free use of this e-ink device." In other embodiments, upon powering on the e-ink device, the instructions pane may display a video clip welcoming the user to the office and indicating the user to enjoy free use of the e-ink device. Of course, any information may be included in the instructions pane. For example, in one embodiment, the pane may be used to display advertisements.

Figure 75:
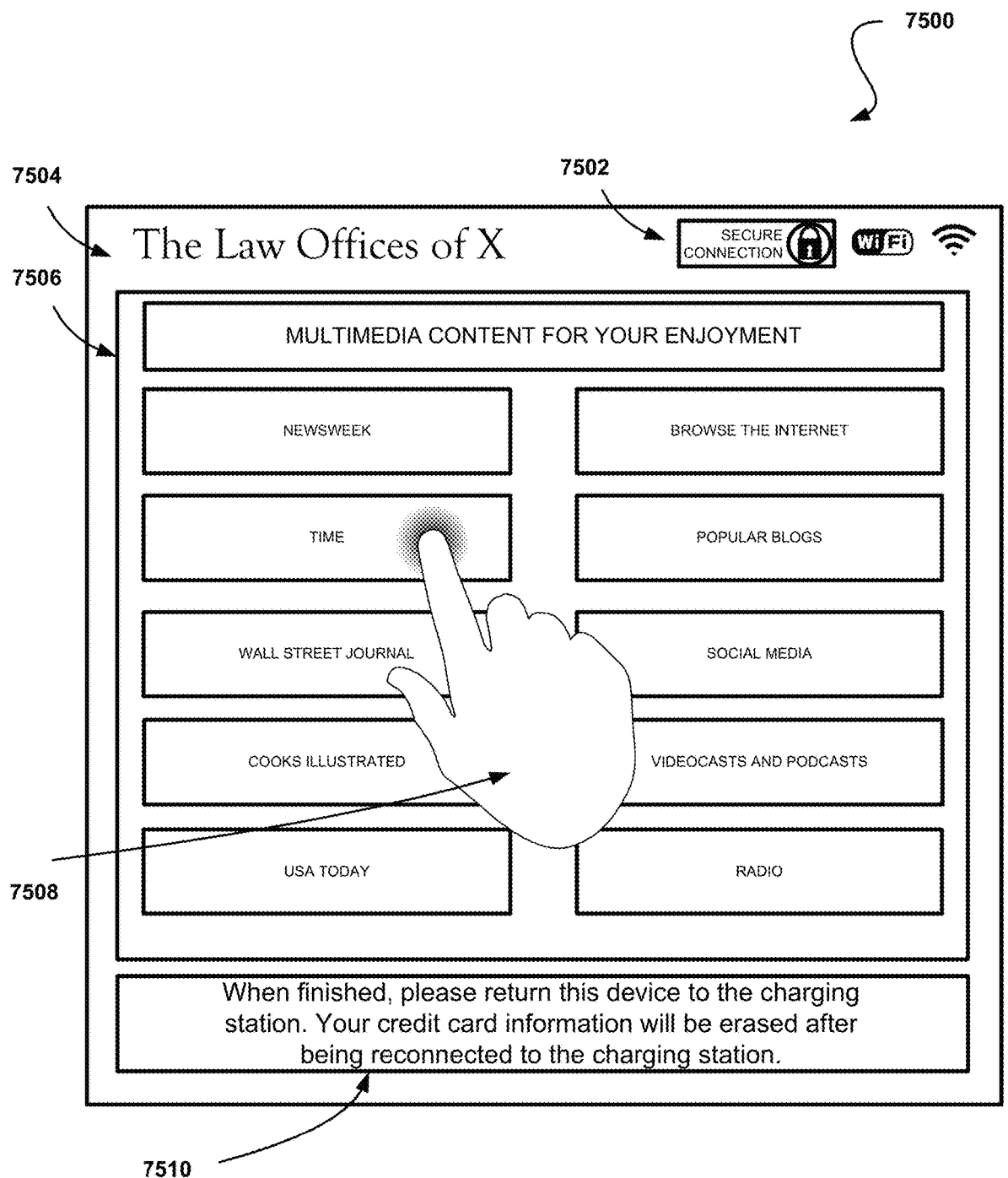
FIG. 75 shows a user interface for using and ending use of the e-ink tablet at a law office location specific mode, in accordance with one possible embodiment.

FIG. 75 shows a user interface for using and ending use of the e-ink tablet at a law office location specific mode, in accordance with one possible embodiment. As an option, the user interface 7500 may be implemented in the context of the architecture and environment of the previous Figures or any subsequent Figure(s). Of course, however, the user interface 7500 may be carried out in any desired environment. It should also be noted that the aforementioned definitions may apply during the present description.

As shown, the user interface may include wireless connection status icons and/or secure connections indicia 7502. In one embodiment, the secure connection may include a predetermined (e.g. by the Administrator, etc.) type of encryption. A status icon may be displayed on the device's display to indicate that a secure connection has been achieved. The encrypted connection may be used in any setting associated with the e-ink device. For example, a restaurant may desire to reassure its clients (e.g. those using the device to pay for their meal, etc.) that the connection between the e-ink device and its servers is secure. In a further embodiment, a wireless status icon may also be displayed indicating the strength of the WiFi signal.

As shown, the Administrator, or any indicia, 7504 may be displayed. Additionally, a content pane 7506 may be displayed. In various embodiments, the content pane may include multimedia content including, for example, "Newsweek," "Time," "Wall Street Journal," "Cooks Illustrated," "USA Today," "Browse the Internet," "Popular Blogs," "Social Media," "Videocasts and Podcasts," "Radio," and/or any other multimedia content. In some embodiments, the multimedia content (e.g. popular blogs, social media, etc.) may be preconfigured by the Administrator. In other embodiments, the multimedia content may be updated automatically by connecting to a cloud-based server to update the material.

As shown, a user may make a selection 7508 of any of the multimedia content. Of course, the user of the e-ink device may user a finger to select the content, a stylus, or any other suitable medium by which content may be selected. Additionally, as shown, instructions for returning the e-ink device 7510 may be displayed. In one embodiment, the instructions for returning the e-ink device may include "When finished, please return this device to the charging station. Your credit card information will be erased after being reconnected to the charging station." Of course, any text may be displayed in the instructions pane. In one embodiment, after powering down the device, a screensaver screen may display instructions for returning the e-ink device.

In other embodiments, any one or more techniques/features described in U.S. application Ser. No. 12/340,599, filed Dec. 19, 2008 may or may not be included, which is incorporated herein by reference in its entirety for all purposes. Of course, any technique, embodiment, feature, etc. disclosed in U.S. Provisional Application Ser. No. 12/340, 599, filed Dec. 19, 2008, may be incorporated with any one or more (or none) of the embodiments disclosed herein.

Figure 76:
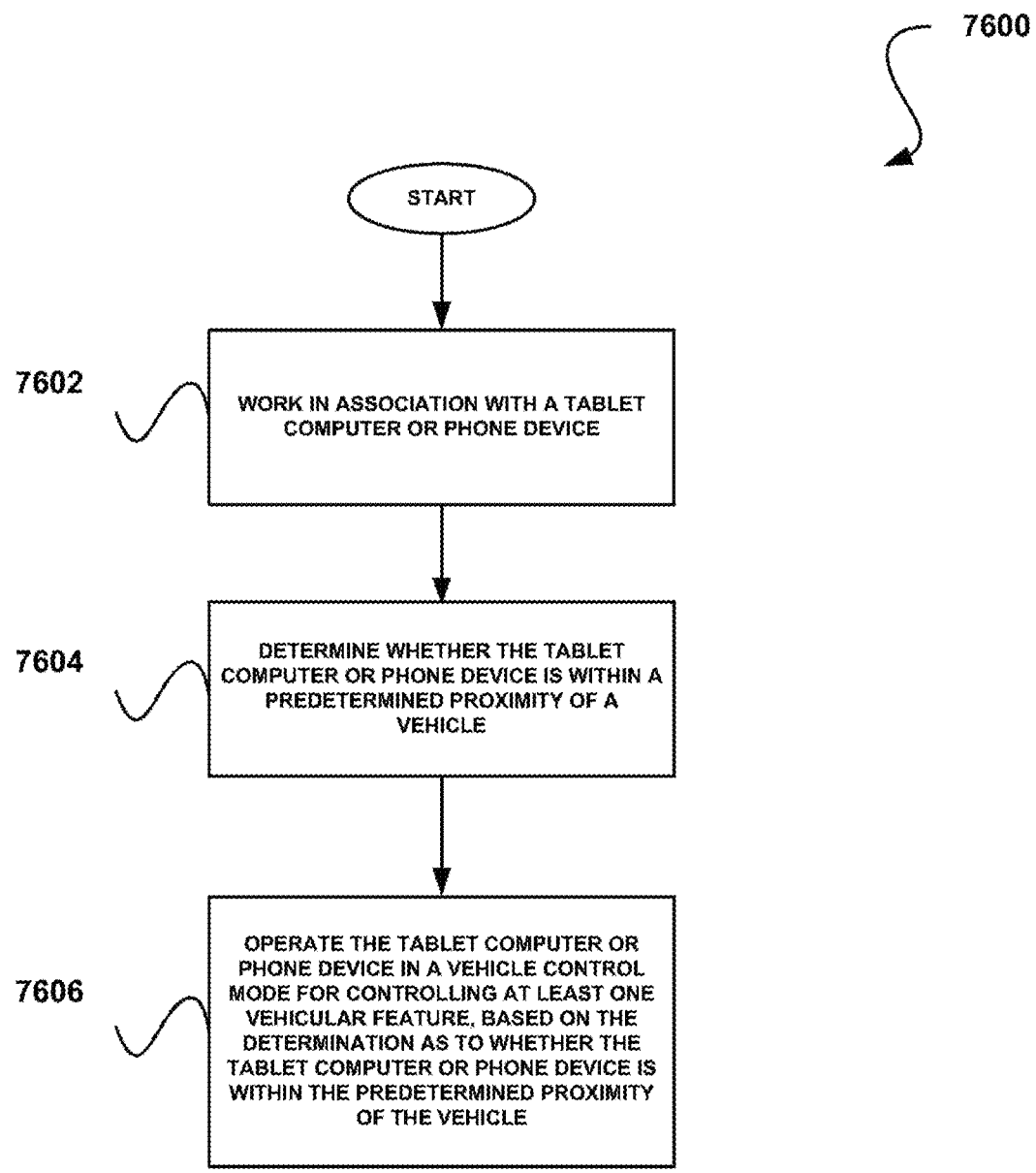
FIG. 76 shows a method for operating a tablet computer or phone device in a vehicle control mode for controlling at least one vehicular feature, in accordance with one possible embodiment.

FIG. 76 shows a method 7600 for operating a tablet computer or phone device in a vehicle control mode for controlling at least one vehicular feature, in accordance with one possible embodiment. As an option, the method 7600 may be implemented in the context of the architecture and environment of any subsequent Figure(s). Of course, however, the method 7600 may be carried out in any desired environment.

As shown, a computer readable medium works in association with a tablet computer or phone device. See operation 7602. In the context of the present description, a tablet computer refers to any portable computer shaped and/or sized like a tablet. For example, in one embodiment, the tablet computer may include a personal digital assistant (PDA), a laptop personal computer with a rotatable touchscreen, a tablet (e.g. Apple i-pad, Microsoft Slate, etc.), and/or any other portable computer shaped and/or sized like a tablet. In another embodiment, the tablet computer may include a cellular phone, or any other mobile device. In one embodiment, the tablet computer may include a touch screen. In a further embodiment, the tablet computer or phone device may include a tablet computer.

In the context of the present description, a phone device refers to any apparatus that is portable and provides telephonic functions. For example, in various embodiments, a phone device may include a cellular phone, smart phones, an IPHONE, a BLACKBERRY, a PDA, a hand held computer, a tablet computer, or any apparatus that is portable and may provide telephonic functions. In addition, in some embodiments, a phone device may include any device capable of receiving broadband access through a UTMS, CDMA, GSM EDGE, WIMAX, LTE, or LTE Advanced system, or any other mobile telecommunication broadband system.

In one embodiment, the phone device may include a device with cellular phone capabilities. In another embodiment, the phone device may include a short-range wireless communication protocol headset. In the context of the present description, short-range wireless communication protocol headset may refer to any wireless protocol that functions at a short-range. For example, in one embodiment, the short-range wireless communication protocol may include Wireless USB, Bluetooth, Wi-Fi, or any other wireless protocol which may function at a short-range. In a further embodiment, the tablet computer or phone device may include a phone device.

As shown, a computer readable medium determines whether the tablet computer or phone device is within a predetermined proximity of a vehicle. See operation 7604. In one embodiment, the tablet computer or phone device may detect the presence of a particular device (e.g. the vehicular system, etc.) by receiving a transmitted signal (e.g. RFID, NFC, WiFi, ZigBee, Bluetooth, etc.). In another embodiment, the vehicular system may detect the presence of the tablet computer or phone device.

In some embodiments, the proximity may be set to a specific threshold. For example, the signal strength may be set at a predetermined quality (e.g. HIGH, etc.) before connection is established. In other embodiments, the transmitted signal may only be accessible within a set threshold range (e.g. 3 feet, etc.) around the vehicle.

In one embodiment, the determination of whether the tablet computer or phone device is within a predetermined proximity of a vehicle may be automatic (e.g. an automatic connection established between the car system and the tablet computer or phone device, etc.). In other embodiments, the determination may occur manually (e.g. tablet computer or phone device must be placed in a mount, a tablet computer or phone device must receive a wired connection, an "accept connection" screen must be accepted, etc.).

In some embodiments, the determination may include an authentication step. For example, in one embodiment, the tablet computer or phone device may exchange security tokens with the vehicle system as part of determining whether the tablet computer or phone device is within a predetermined proximity of a vehicle. Of course, any cryptography and/or security features may be implemented in determining whether the tablet computer or phone device is within a predetermined proximity of a vehicle.

In various embodiment, the determination as to whether the tablet computer or phone device is within the predetermined proximity of the vehicle may be accomplished by determining whether the tablet computer or phone device is in communication with the vehicle via a short range wireless communication protocol, by determining whether the tablet computer or phone device has been manually put in a vehicular control mode, by determining whether the tablet computer or phone device has been physically coupled to the vehicle, and/or by any other method whereby the tablet computer or phone device is determined to be within a predetermined proximity of the vehicle.

As shown, the tablet computer or phone device is operated in a vehicle control mode for controlling at least one vehicular feature, based on the determination as to whether the tablet computer or phone device is within the predetermined proximity of the vehicle. See operation 7606. In the context of the present description, a vehicle control mode may include a collection of properties in association with at least one vehicle feature. For example, in various embodiments, the properties may include, but are not limited to, user preferences, input options, output options, power conservation policies, processing capacity, access permissions, and/or any other type of setting that may be attributable to a tablet computer or a phone device.

In one embodiment, the vehicle control mode may include static settings. In other embodiments, the vehicle control mode may include dynamic features (e.g. settings based on devices in a predetermined proximity, etc.). In a further embodiment, the vehicle control mode may include more than one sub-mode (e.g. season mode, time of day mode, etc.). For example, switching between modes may be done automatically (e.g. environmental, spatial, temporal, and/or situational triggers, etc.) or manually (e.g. triggered by user input, etc.). In this way, the properties can be tailored to specific use environments and situations, maximizing the functionality and interaction of the tablet computer or phone device and the vehicle.

In the context of the present description, a vehicular feature may include any feature associated with a vehicle. For example, in various embodiments, the vehicular feature may include an audio feature, a video feature, a navigation feature, an augmented reality feature, a social networking feature, a vehicle control feature (e.g. heated seats, air conditioning, etc.), and/or any other feature which may be associated with a vehicle.

In one embodiment, the vehicle control mode may be activated automatically. For example, in one embodiment, when the tablet computer or phone device is within a predetermined proximity of the vehicle, an application on the device may be activated to control at least some aspect of the vehicular system (e.g. music selection, volume, directions, lighting, heated seats, emergency services etc.).

In other embodiments, the vehicle control mode may be activated manually. For example, in one embodiment, the tablet computer or phone device may be placed on a mount within the vehicle, and thereby, activate an application on the device to control at least some aspect of the vehicular system (e.g. music selection, volume, directions, lighting, heated seats, emergency services etc.).

Of course, the tablet computer or phone device may be connected in any manner (e.g. wired or wirelessly, etc.) to the vehicle assembly. Additionally, any number of devices may be connected to the vehicular system and control at least one vehicular feature.

In another embodiment, operating the tablet computer or phone device in a vehicle control mode for controlling at least one vehicular feature may be based upon user input (e.g. hardware switch, GUI input, etc.). In another embodiment, the determination may be based on peripherals geographically near the device. For example, in one embodiment, a car display arrangement (e.g. vehicle system, etc.) may include a wireless microphone, a wireless database (e.g. to store contacts, directions, pushed notifications, etc.), and/or any other type of peripheral which may be used within a vehicle. Upon being brought near any of these peripherals, the tablet computer or phone device may recognize the peripherals, and based off of the recognition, automatically operate the table computer or phone device in a vehicle control mode.

More illustrative information will now be set forth regarding various optional architectures and features with which the foregoing techniques discussed in the context of any of the present or previous figure(s) may or may not be implemented, per the desires of the user. For instance, various optional examples and/or options associated with working in association with a tablet computer or phone device 7602, determining whether the tablet computer or phone device is within a predetermined proximity of a vehicle 7604, operating the tablet computer or phone device in a vehicle control mode for controlling at least one vehicular feature, based on the determination as to whether the tablet computer or phone device is within the predetermined proximity of the vehicle 7606, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 77:
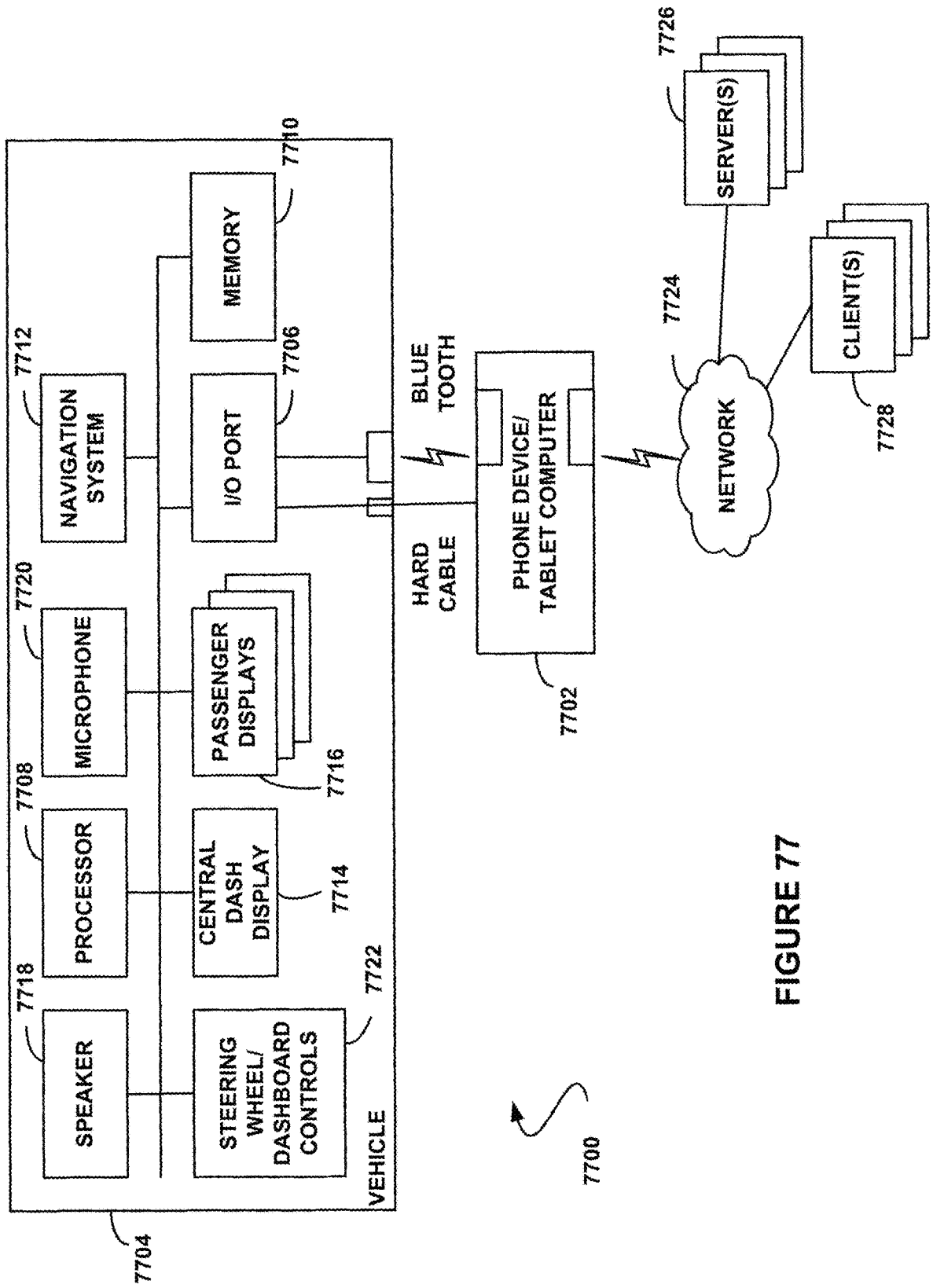
FIG. 77 illustrates a communication system, in accordance with one possible embodiment.

FIG. 77 illustrates a communication system 7700, in accordance with one possible embodiment. As an option, the system 7700 may be implemented in the context of the architecture and environment of the previous Figures or any subsequent Figure(s). Of course, however, the system 7700 may be carried out in any desired environment. It should also be noted that the aforementioned definitions may apply during the present description.

As shown, a phone device or tablet computer 7702 is capable of interfacing with a vehicle 7704 including various components of the vehicle 7704. The phone device or tablet computer 7702 may include any mobile device capable of interfacing with a vehicle 7704 including a lap-top computer, hand-held computer, mobile phone, personal digital assistant (PDA), a music player (e.g. a digital music player, etc.), a GPS device, etc.

In various embodiments, the phone device or tablet computer 7702 may communicate with a vehicular assembly system (e.g. a communication and entertainment system, etc.) corresponding to the vehicle 7704 via a wireless connection (e.g. Bluetooth, etc.), or via a cable connection (e.g. a USB cable, a serial cable, etc.). As an option, the phone device or tablet computer 7702 may interface with the communication and entertainment system vehicle utilizing an I/O port 77106 of the vehicle 7704. In various embodiments, the I/O port 7706 may include a serial port, a USB port, FireWire/i.LINK ports, etc. In one embodiment, the I/O port 7706 may include a wireless communication port.

Using this interface, the phone device or tablet computer 7702 may interface with various components and functionality of the vehicle, such as an onboard computer system including a processor 7708, memory 7710 (e.g. DRAM, flash memory, etc.), an onboard navigation system 7712, displays (e.g. a central display 7714, and one or more passenger displays 7716, etc.), audio communication devices (e.g. speakers 7718, a microphone 7720, etc.), and various other components and functionality of the vehicle included in the vehicular assembly system. The interface may also allow a user of the vehicle 7704 to access and/or control the phone device or tablet computer 7702 utilizing controls associated with the vehicle 7704, such as steering wheel, and dashboard radio controls 7722. Additionally, the user may access and/or control the phone device or tablet computer utilizing the microphone 7720 through voice commands.

Using these components and controls, a user may access and utilize one or more wireless networks 7724 associated with the phone device or tablet computer 7702. Coupled to the networks 7724 may be servers 7726 which are capable of communicating over the networks 7724. Also coupled to the networks 7724 and the servers 7726 is a plurality of clients 7728.

Such servers 7726 and/or clients 7728 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 7724, at least one gateway is optionally coupled therebetween.

It should be noted that the computer system of the vehicle 7704 may include various software and applications for facilitating communication between the vehicle 7704 and the phone device or tablet computer 7702. For example, in various embodiments, the vehicle computer system may include an operating system (e.g. Windows Mobile, Linux, etc.), embedded speech recognition software, telephone call steering systems, automated telephone directory services, character recognition software, and imaging software.

Figure 78:
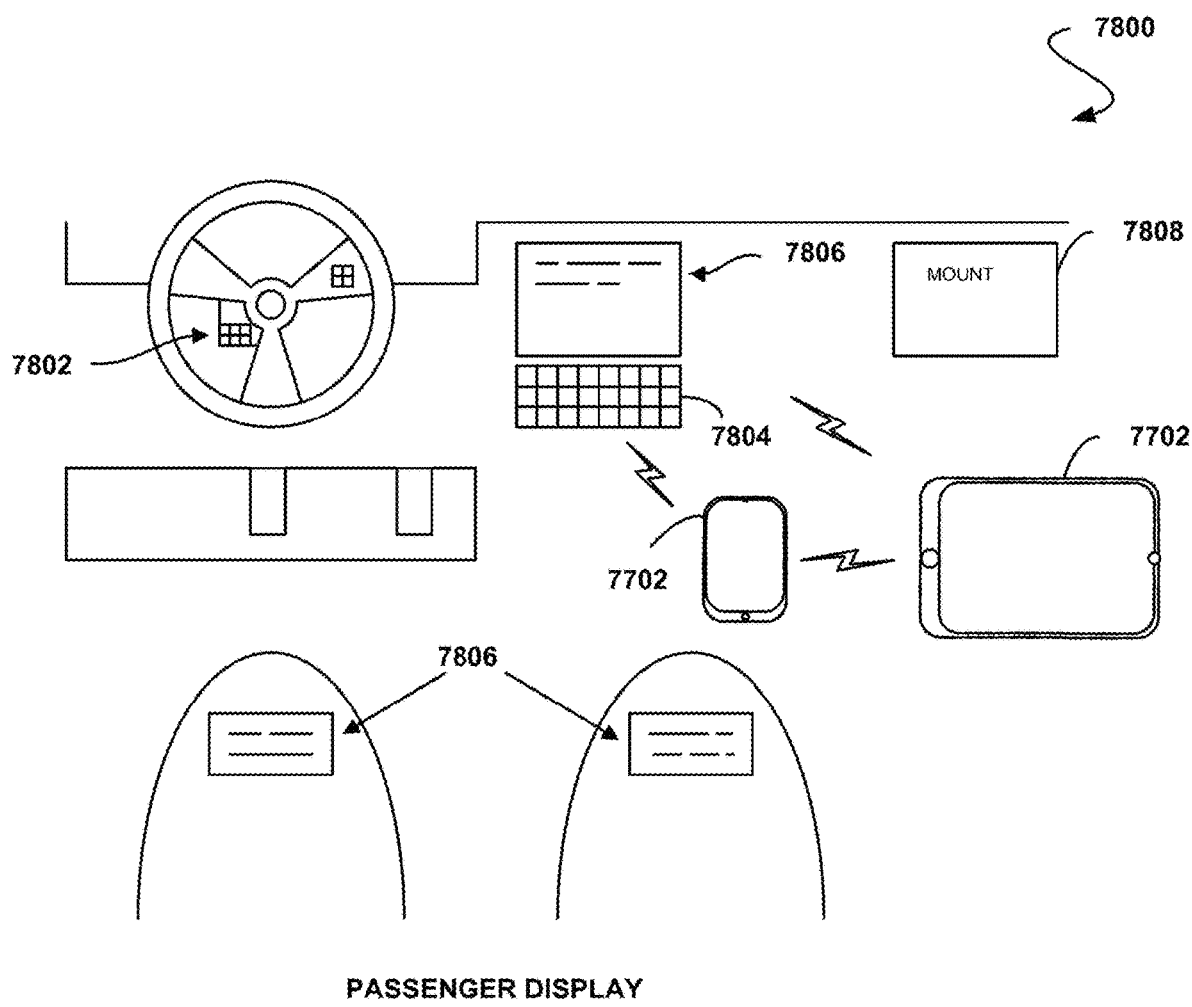
FIG. 78 shows a configuration for an automobile capable of interfacing with the phone device or tablet computer of FIG. 77, in accordance with one possible embodiment.

FIG. 78 shows a configuration 7800 for an automobile capable of interfacing with the phone device or tablet computer of FIG. 77, in accordance with one possible embodiment. As an option, the configuration 7800 may be implemented in the context of the architecture and environment of the previous Figures or any subsequent Figure(s). Of course, however, the configuration 7800 may be carried out in any desired environment. It should also be noted that the aforementioned definitions may apply during the present description.

As shown, the phone device or tablet computer 7702 may be coupled to the automobile utilizing a wired connection (e.g. a USB connection, etc.), or a wireless connection (e.g. Bluetooth, etc.). In one embodiment, the phone device or tablet computer 7702 may be placed on a mount 7808. The mount may provide a wired or wireless connection to the automobile system.

Using this connection, a user (e.g. a driver or passenger, etc.) may operate the phone device or tablet computer 7702, via the automobile, using voice commands, steering wheel controls 7802, radio controls 7804, and/or dashboard controls. Furthermore, the phone device or tablet computer may communicate with vehicle displays (e.g. main displays, passenger displays 7806, etc.) such that content associated with the phone device or tablet computer (e.g. stored content, streaming content, etc.) may be displayed. For example, the phone device or tablet computer may communicate stored video to at least one of the passenger displays 7806. Additionally, the phone device or tablet computer may communicate streaming or stored audio such that the audio may be transmitted utilizing an audio system of the automobile.

By interfacing the phone device or tablet computer 7702 with the automobile, voice-activated, hands-free calling may also be implanted. For example, a "Push to Talk" button on the steering wheel may allow the user to access contacts stored in a contact list of the phone device or tablet computer 7702 by voice command. Furthermore, the user may be able to switch use from the phone device or tablet computer 7702 to the vehicle control system transparently. For example, a user may push a "Telephone" button on the steering wheel to automatically transfer a current telephone call to the automobile communication system of the automobile without having to hang up and call again.

As an option, the text messages received by the phone device or tablet computer 7702 may be converted to audio utilizing a vehicle on-board processor and associated voice-to-text software. The communication system of automobile may then output the converted text in an audio stream via speakers. In one embodiment, the communication system associated with the automobile may include a main display 7806 for displaying activities associated with the phone device or tablet computer 7702, along with other functionality (e.g. navigational functionality, etc.).

For example, the communication system may display any feature that is capable of being displayed using the phone device or tablet computer 7702. In various embodiments, such features may include caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 7806 may all display the same material (e.g. video, music, etc.). In another embodiment, the passenger displays may be independently operated (e.g. each displaying a different video stream, etc.) and/or operated independently by the phone device or tablet computer 7702. In a further embodiment, the passenger displays 7806 may include permanent displays. For example, the passenger displays may be installed into the automobile architecture (e.g. installed into the dashboard, the backs of seats, etc.). In another embodiment, the passenger displays 7806 may include transportable displays. For example, the passenger displays may include a tablet computer or phone device and each may be placed in an installed mount on the automobile (e.g. on the dashboard, in the backs of seats, in a roof mount, etc.).

In various embodiments, the phone device or tablet computer 7702 may be set up to operate in a master-slave relationship with the passenger displays on the automobile. In one embodiment, the phone device or tablet computer may automatically configure the passenger displays based on predetermined settings (e.g. the screen most in the front of the automobile displays navigation details, screens in the back of the automobile display videos, etc.). Of course, the screens may be configured in any manner based on input from the phone device or tablet computer.

In a further embodiment, if multiple phone devices or tablet computers are present in an automobile, the phone devices or tablet computers may apply preconfigured settings wherein only one phone device or tablet computer may control the automobile system features, and the other phone devices or tablet computers may remain as slave devices to the one master phone device or tablet computer. For example, in one embodiment, a parent passenger may wish to control automobile features (e.g. navigation, music, etc.) as well as control what is displayed on each of the child passenger's display (e.g. on the passenger displays, on another phone device or tablet computer, etc.). The parent passenger's phone device or tablet computer may be used to control at least some vehicular feature, as well as control other devices and/or displays within a preconfigured proximity range.

Figure 79:
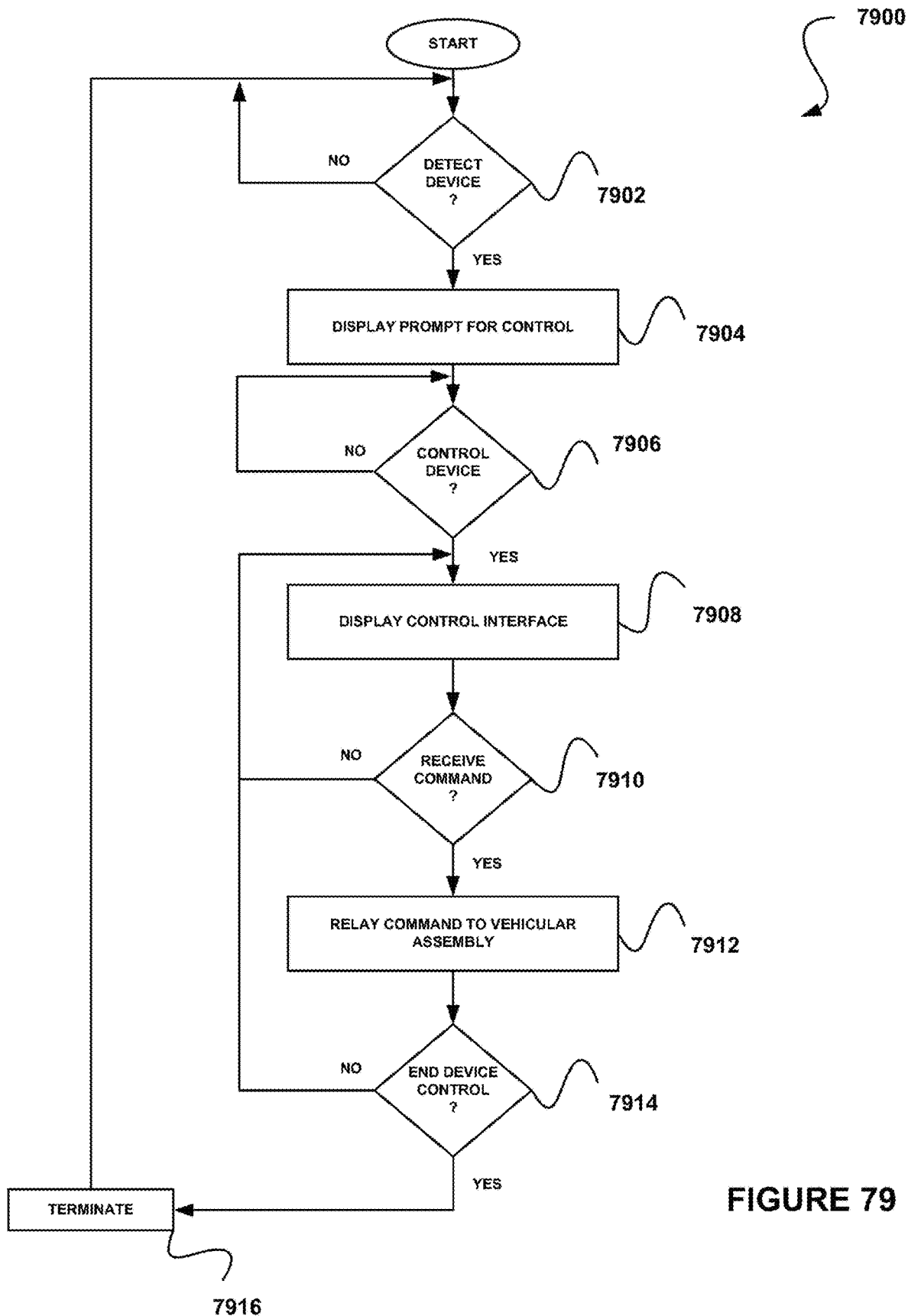
FIG. 79 shows a method for controlling at least one vehicular feature, in accordance with one possible embodiment.

FIG. 79 shows a method 7900 for controlling at least one vehicular feature, in accordance with one possible embodiment. As an option, the method 7900 may be implemented in the context of the architecture and environment of the previous Figures or any subsequent Figure(s). Of course, however, the method 7900 may be carried out in any desired environment. It should also be noted that the aforementioned definitions may apply during the present description.

As shown, it is determined whether a device is detected. See decision 7902. In one embodiment, the tablet computer or phone device may detect the presence of a particular device (e.g. the vehicular system, etc.) by receiving a transmitted signal (e.g. RFID, NFC, WiFi, ZigBee, Bluetooth, etc.). In another embodiment, the vehicular system may detect the presence of the tablet computer or phone device (e.g. Bluetooth, wired connection, polling discovery mechanisms, etc.).

In some embodiments, a proximity threshold may be used in detecting a device. For example, a signal strength may be set at a predetermined quality (e.g. HIGH, etc.) before connection is established. In other embodiments, the transmitted signal may only be accessible within a set threshold range (e.g. 3 feet, etc.) around the vehicle.

In one embodiment, the detection of a tablet computer or phone device may be automatic (e.g. an automatic connection established between the car system and the tablet computer or phone device, etc.). In other embodiments, the determination may occur manually (e.g. tablet computer or phone device must be placed in a mount, a tablet computer or phone device must receive a wired connection, an "accept connection" screen must be accepted, etc.).

If a device is detected, a prompt for control is displayed. See operation 7904. In one embodiment, the prompt may be displayed only upon initial detection of a device (e.g. first time connection, etc.). In another embodiment, a prompt may be displayed each time a device is connected. For example, a prompt may be displayed and include a mandatory authentication step (e.g. exchange of security tokens, username and password, etc.). In other embodiments, the display prompt may be configured to be automatically accepted by the user of the phone device or tablet computer (e.g. automatic login step, automatic authentication step, etc.).

In various embodiments, the control prompt may be dependent on the type of device detected (e.g. phone device, tablet computer, etc.), as well as the number of devices that are detected (e.g. master-slave relationship may be imposed immediately upon detection of devices, etc.). In some embodiments, the display prompt may originate from a local source (e.g. vehicular assembly, etc.). In other embodiments the display prompt may originate from a non-local source (e.g. cloud-based system which manages that vehicular assembly, etc.).

In a further embodiment, the control prompt may be configured based on at least one policy. For example, in one embodiment, the available vehicular features may be dependent on the number of individuals in the automobile (e.g. only a driver present would have limited entertainment connectivity, etc.). Additionally, a policy may be assigned to every device (e.g. a child policy, parent policy, guest policy, etc.) that is detected. The policies may be dynamically configured (e.g. altered in real time, etc.) and the changes may be automatically implemented into any and all applicable device(s). Of course, in other embodiments, the policy(ies) may be implemented and/or altered in any manner based on the user's preferences and preconfigured settings, as well as on the devices that are detected.

In a further embodiment, the control prompt may be displayed on the phone device or tablet computer. In a separate embodiment, the control prompt may be displayed on the passenger display (e.g. head-unit display of the vehicle, etc.). Of course, however, the control prompt may be displayed on any of the devices and/or displays and permit the user to input settings and feedback to control the interaction between the vehicular assembly and the phone device or tablet computer.

As shown, it is determined whether to control a device. See decision 7906. In some embodiments, the determination to control a device may be dependent on receiving user input from the control prompt (e.g. manual process). In other embodiments, the determination to control a device may occur automatically (e.g. without any user interaction, etc.) based on predetermined settings. In some embodiments, the determination to control a device may include specifying what resources may be controlled. For example, in one embodiment, while pairing a tablet computer to a vehicular system, the control prompt may prompt (e.g. on the tablet computer, on the vehicular headset display, etc.) the user to define which resources (e.g. GPS resources, music, videos, cameras, etc.) on the tablet computer are to be paired with the vehicular system. The user may decide to only pair the music on the tablet computer with the vehicular system. In another embodiment, the user may decide to pair all features and functionality of the tablet computer with the vehicular system.

Of course, in other embodiments, the user may select the tablet computer to behave in any predetermined manner with respect to the vehicular system. Additionally, the user may select specific features (e.g. air conditioning, radio, seat warmers, etc.) on vehicular system to be controlled by an external device (e.g. phone device, tablet computer, etc.).

If it is determined to control a device, a control interface is displayed. See operation 7908. In one embodiment, the control interface may be displayed automatically upon activation of the vehicle control mode associated with the tablet computer or phone device. In other embodiments, the control interface may be displayed independent of the vehicle control mode.

In one embodiment, the control interface displayed on the tablet computer or phone device may include several features. For example, in various embodiments, the control interface may include an entertainment menu option where video, music, news, podcasts, and/or any other entertainment media may be selected. In some embodiments, the media may be found locally on the device, or it may be accessible by cloud (e.g. on the Internet, etc.). In one embodiment, the tablet computer or phone device may receive a data stream through a wireless network (e.g. LTE, CDMA, etc.). In other embodiments, the vehicular system may be connected to the cloud (e.g. the Internet, etc.) and receive a data stream through a wireless network (e.g. LTE, etc.). In either situation, the data stream may be shared with the vehicular system and with the phone device or tablet computer, regardless of the source.

In another embodiment, the control interface may include an automation menu option. For example, in one embodiment, a user may set up an automation control associated with the vehicular assembly. In such an embodiment, the automation control may permit the user to turn on the car remotely, activate the engine remotely, and/or even allow the user to configure settings associated with an autonomous car (e.g. robotic car, driverless car, etc.). For example, using the autonomous car feature, a user may direct the car to park itself (e.g. self-park, etc.), activate the car to drive itself to the user's location, activate the car to drive itself to another specified location, and/or control at least some aspect of the car remotely.

In another embodiment, the automation menu option may integrate the tablet computer, phone device, and/or vehicular assembly system with any other location and/or devices which may be remotely controlled. For example, the automation menu option may include connecting to a remote location (e.g. home, office, etc.), to a remote device (e.g. security system, tablet computer, home computer, television, etc.) and/or to any other item which may be remotely controlled. For example, in one embodiment, a user of the tablet computer may control the temperature of the air at home by adjusting a digital thermostat on the tablet computer. In another embodiment, the vehicular assembly system may be configured to control the temperature of the air at home by adjusting a digital thermostat. Of course, the vehicular assembly system may be configured to control any automation aspect of any device or location based on preconfigured settings.

In one embodiment, the control interface may include an interaction menu option. For example, in various embodiments, a user may select an augmented reality application where a car's camera may transmit a real-time video feed to the tablet computer, and additional information (e.g. social networking streams, GPS data, etc.) may be superimposed on the display. In one embodiment, the augmented reality application may include information (e.g. reviews, recommendations, etc.) from social networking sites (e.g. Facebook, Yelp, etc.). In other embodiments, the augmented reality application may include information (e.g. historical information, ticket availability, contact information, best parking places, etc.) from any online source.

In some embodiments, the interaction menu option may include a ticketing application (e.g. buy tickets to an event nearby, etc.), a concierge application (e.g. schedule a reservation at a restaurant, book a hotel room, etc.), a localvore application (e.g. best places to find local food, known local customs, best places to eat, local goods shops, etc.), and/or any other application which may allow the user to interact in some manner with the tablet computer or phone device and the vehicular assembly.

In a further embodiment, the control interface may include a car control menu option. For example, in various embodiments, the car control menu option may allow the user to control the temperature of the car, apply a temperature policy (e.g. cold in front, hot in back, time of day dependent, outside temperature dependent, etc.), control the tint of the windows (e.g. darken tint on back windows, etc.), control the temperature of heated seats, control the sunroof(s), check engine fluid levels (e.g. oil, brake fluid, etc.), monitor energy consumption (e.g. electric v. gas consumption, etc.), and/or control any other aspect associated with the vehicular system.

Additionally, in one embodiment, the control interface that is displayed may be dependent on the user accessing the control interface. For example, in one embodiment, a passenger control interface may have full access to the features and resources, whereas, in another embodiment, a driver control interface may have limited access to all of the features and resources. In one embodiment, the user may designate the status (e.g. driver, passenger, etc.). In another embodiment, the vehicular system may determine the status of the user (e.g. weight sensors to determine whether a passenger is present, camera sensors, etc.).

As shown, it is determined whether a command is received. See decision 7910. In one embodiment, the user may make a touch selection on the display including the control interface. For example, the user may navigate menus, highlight a selection, and otherwise interact with the tablet compute or phone device or vehicular assembly to provide some command. In other embodiments, the command may be received by gestures, or by auditory commands.

In one embodiment, the gesture commands may be associated with input from a user. For example, a first built-in camera may record the gestures when they are executed in a set volume of space (e.g. within 3 feet of the camera, etc.). In another embodiment, a second built-in camera may be utilized to allow the tablet computer, phone device, and/or vehicular assembly system to perform stereoscopic gesture recognition (e.g. able to determine the distance at which a control gesture is being performed, etc.). In this way, the set of distinct control gestures may be augmented with additional intuitive control gestures. As a specific example, a user may change the vehicular assembly volume level by raising and lowering their hand. In another embodiment, a user may draw a circle or an arrow in the air which may allow for functions such as zooming with navigation, bringing up a preset location, bringing up an application, and/or any other preconfigured function. Of course, any gesture may be used to invoke any function. In one embodiment, a gesture command may be preconfigured to invoke a function. In another embodiment, a gesture command may be configured at run-time. For example, after completing a gesture, a list of possible commands may be displayed to the user which may be selected.

In one embodiment, a gesture may be dynamic, comprising a motion (e.g. moving a head, etc.). In another embodiment, a gesture may be a static pose (e.g. holding a hand in front of the body, etc.). In various embodiments, gestures may be used for input in a general computing context. For instance, various motions of the hands or other body parts may correspond to common system wide tasks such as navigate up or down in a hierarchical list, open a file, close a file, and save a file. Of course, any gesture may be preconfigured to correspond with any predetermined function and/or action.

In another embodiment, a command may be received by auditory commands. For example, in various embodiment, a user may state "lower air conditioning two degrees," "read incoming email," "call mary," "set oven at location home to 350 degrees," and/or any command which may control at last one aspect associated with the tablet computer, phone device, and/or vehicular assembly system.

If a command is received, the command is relayed to vehicular assembly. See operation 7912. In one embodiment, the command may be relayed by a wired connection (e.g. Ethernet, usb, device mount, etc.). In another embodiment, the command may be relayed wirelessly (e.g. Bluetooth, etc.). In some embodiments, the command may be relayed through an external server. For example, in one embodiment, a command may be sent from a device to a cloud-based management system and then to the vehicular assembly. In some embodiments, the vehicular assembly may be constantly connected to a cloud-based system and receive commands. In one embodiment, the vehicular assembly may receive a command as a push notification.

As shown, it is determined whether to end device control. See decision 7914. If it is determined to end device control, the device control is terminated. See operation 7916. In one embodiment, the determination to end device control may occur automatically. For example, in one embodiment, if the tablet computer or phone device is taken beyond a predetermined proximity, the device control may automatically end. In another embodiment, the determination to end device control may occur manually. For example, in one embodiment, a prompt may be given to the user requesting if it is desired to end device control (e.g. due to time lapse of inactivity, etc.). In another embodiment, the user may select a function to end device control (e.g. option in vehicle control mode, option on control interface, etc.). In a further embodiment, a master device may select a function to end device control of a slave device (e.g. disconnect active connection, etc.). Additionally, in one embodiment, the head-unit display of the vehicular assembly may provide a function to end device control. Of course, the device control may be ended in any manner and by any function.

Figure 80:
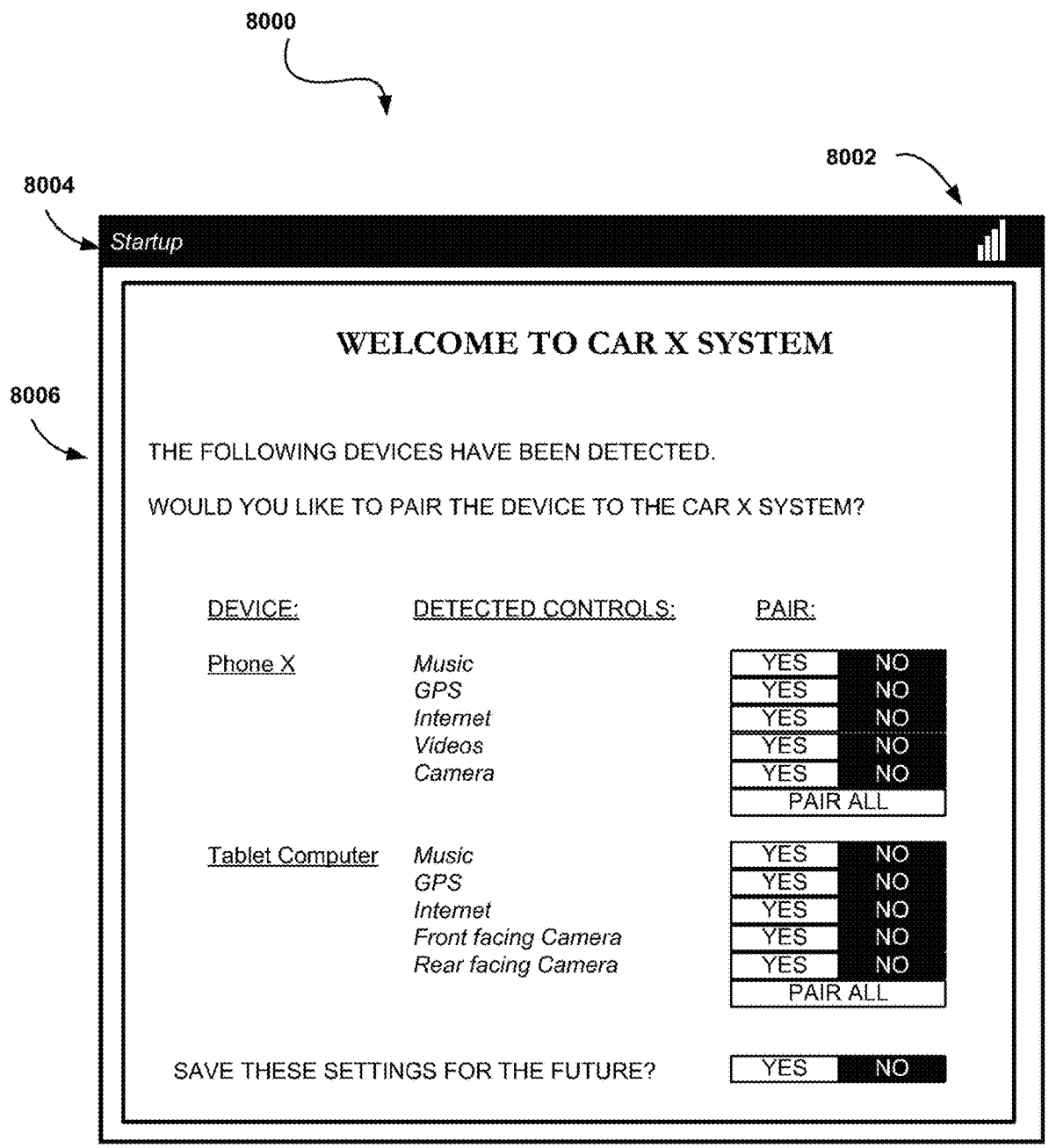
FIG. 80 shows a user interface for detecting devices on a vehicular system, in accordance with one possible embodiment.

FIG. 80 shows a user interface 8000 for detecting devices on a vehicular system, in accordance with one possible embodiment. As an option, the user interface 8000 may be implemented in the context of the architecture and environment of the previous Figures or any subsequent Figure(s). Of course, however, the user interface 8000 may be carried out in any desired environment. It should also be noted that the aforementioned definitions may apply during the present description.

As shown, a connection status icon 8002, a status notification 8004, and an information pane 8006 are included. In one embodiment, the connection status icon may include an indication of strength of a wireless network signal (e.g. CDMA, LTE, etc.). In another embodiment, the connection status icon may include an indication of strength of a GPS signal (e.g. GPRS, etc.). In a further embodiment, the connection status icon may include an indication of strength of a connection between the vehicular assembly system and at least one device (e.g. tablet computer, phone device, etc.).

In one embodiment, the status notification may indicate the state of connecting a device. For example, the status notification may show "Startup," "Detecting Device," "Authenticating Device," "Adding New Device," "Controlling Device," "Receiving Command from Device," and/or any other status associated with the vehicular assembly system and a tablet computer or phone device.

In another embodiment, the information pane may display information to the user. In one embodiment, the information pane may be displayed on the tablet computer or phone device. In another embodiment, the information pane may be displayed on the vehicular assembly system (e.g. passenger display, etc.). In one embodiment, the information pane may include any information and/or functions used to assist the interaction between the computer tablet or phone device and the vehicular assembly system. For example, the information pane may display "The following devices have been detected. Would you like to pair the device to the Car X System?" Additionally, the information pane may include a list of detected "device(s)," "detected controls," and the option to "pair" the detected controls with the vehicular assembly system. In one embodiment, the pairing screen may be displayed only on a first time detection and/or use (e.g. the first time the device is used with the vehicular assembly system, etc.). In a further embodiment, the use may select to "save these settings for the future." Of course, any screen and/or options may be displayed to the user.

Figure 81:
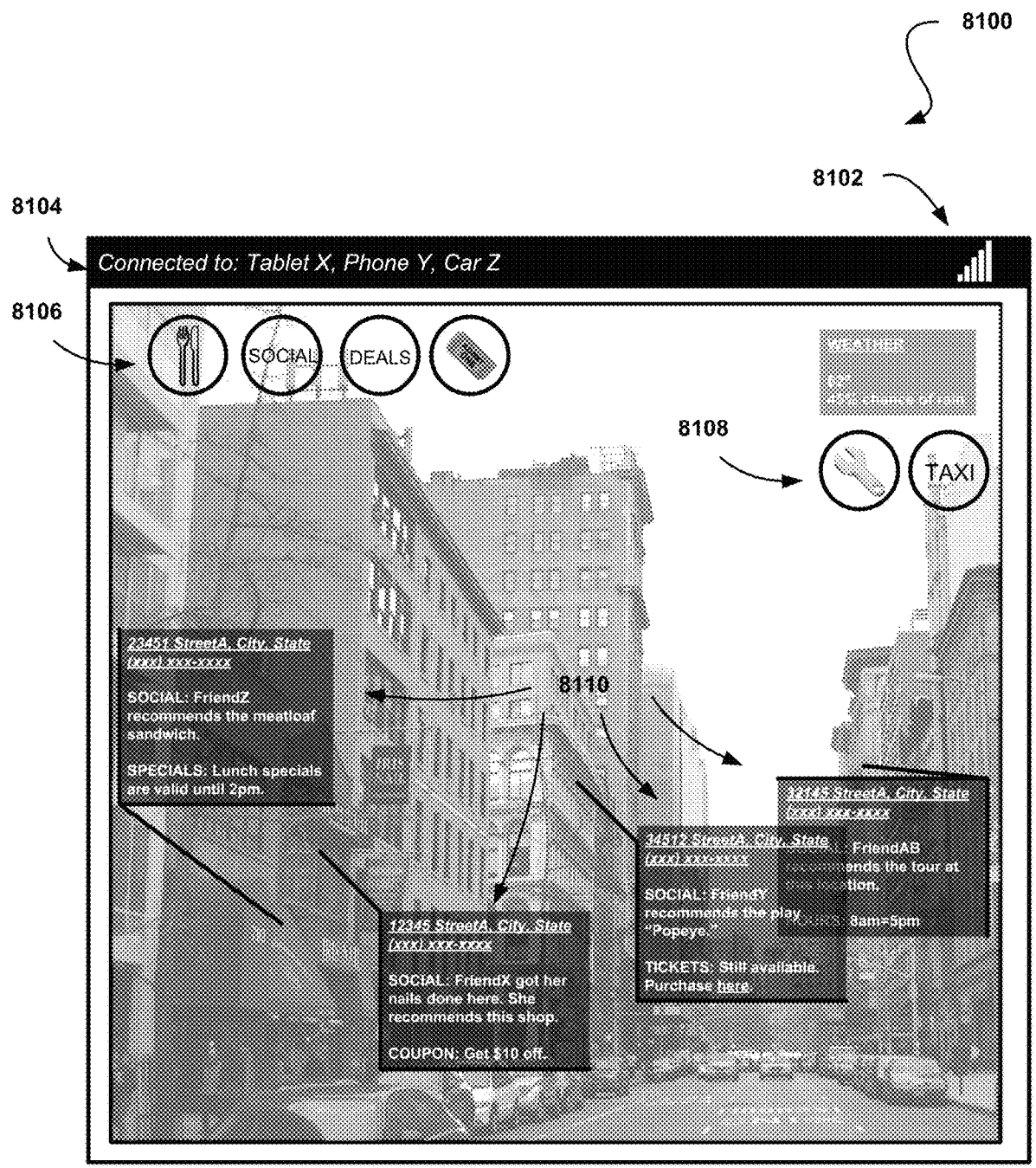
FIG. 81 shows a user interface on a device for controlling at least one vehicular feature, in accordance with one possible embodiment.

FIG. 81 shows a user interface 8100 on a device for controlling at least one vehicular feature, in accordance with one possible embodiment. As an option, the user interface 8100 may be implemented in the context of the architecture and environment of the previous Figures or any subsequent Figure(s). Of course, however, the user interface 8100 may be carried out in any desired environment. It should also be noted that the aforementioned definitions may apply during the present description.

As shown, a connection status icon 8102 and a status notification 8104 are included. In one embodiment, the connection status icon may include an indication of strength of a wireless network signal (e.g. CDMA, LTE, etc.). In another embodiment, the connection status icon may include an indication of strength of a GPS signal (e.g. GPRS, etc.). In a further embodiment, the connection status icon may include an indication of strength of a connection between the vehicular assembly system and at least one device (e.g. tablet computer, phone device, etc.).

In one embodiment, the status notification may indicate the state of connection between the vehicular system and at least one device. For example, the status notification may show "Startup," "Detecting [device]," "Authenticating [device]," "Adding New [device]," "Controlling [device]," "Receiving Command from [device]," "Connected to [device]," and/or any other status associated with the vehicular assembly system and a tablet computer or phone device.

As shown, the user interface 8100 may include a screenshot of an augmented reality application. The augmented reality application may include filters 8106, settings and/or bookmarked shortcuts 8108, and/or input overlays 8110.

In one embodiment, the filters may limit the notifications displayed on the display. For example, the filters may limit the notifications by food and/or restaurants, social notifications (e.g. "FriendZ recommends the hamburger at this café," etc.), coupons and/or deals, events and/or tickets, historic tours, top ten lists (e.g. top ten things to see in CITY X, etc.), most popular (e.g. more than 1000 people have "liked" this location, etc.), Michelin rated (e.g. food, hotels, etc.), hole in the wall spots (e.g. food, activities, etc.), and/or any other filter which may alter the display of the augmented reality application. In one embodiment, the filter may be user defined (e.g. set by the user, etc.). In another embodiment, the filter may be preconfigured by the application and selected by the user (e.g. user selects "filters" to be displayed on main display, etc.).

In some embodiments, the settings may be a default button (e.g. application comes pre-installed to display the settings icon. In other embodiments, the user may select to have a settings button displayed on the main display. In some embodiments, the user may preconfigure the settings button to display customized functions (e.g. clear away all filters, redo filter search based on profile suggestions from Friend X, navigate me to home using a real-time traffic feed, etc.). In further embodiments, the bookmarked shortcuts may include a destination, a reoccurring event, a utility (e.g. Call Taxicab, etc.), a theme (e.g. explore top locations nearby, etc.), a suggestion of things to see (e.g. based off of events in the calendar of the user, etc.), a weather widget, and/or any other application and/or future which may provide functionality to the user and to which a shortcut may be linked. In some embodiments, the shortcuts may include a widget to be displayed on the display. In further embodiments, the widget may be customized (e.g. size, color, etc.) by the user. Additionally, in other embodiments, the bookmarked shortcut may be presented as an icon, text, and/or any other indicia desired by the user.

In one embodiment, the input overlays may receive updates in real-time. In another embodiment, the input overlays may be displayed in its entirety (e.g. all updates from all applicable feeds, etc.). In other embodiments, the input overlays may display the name of the location, contact information (e.g. address, phone number, etc.) of the location, social recommendations, relevant information (e.g. Lunchtime specials hours, ticket availability, hours of operation, etc.), applicable coupons and/or deals, and/or any additional filter which may add functionality to the augmented reality application.

In one embodiment, the input overlays may be displayed on the augmented reality application located on the tablet computer or phone device. In other embodiments, the augmented reality application may be displayed on one of the vehicle passenger displays. For example, in one embodiment, each vehicle passenger display may operate independently and each may receive different feedback (e.g. selection of a different input overlay, etc.). In a further embodiment, a master device may display the augmented reality application on other slave devices and provide at least some feature of interaction. For example, in one embodiment, the master device may select an input overlay and request a survey from the slave devices.

Additionally, in one embodiment, the input overlays may be updated according to the user preferences. For example, the user may desire the augmented reality application to update the input overlays in real time. In other embodiments, the tablet computer or phone device may download daily updates from friends near the user's location. In another embodiment, a user of a tablet computer of phone device may indicate ahead of time a route to a location, and the augmented reality application may download social content, coupons, specials, ticket pricing, phone numbers that may be relevant to the selected route. Of course, the downloaded material may be updated as appropriate. Additionally, where the input overlays are updated in real time, the tablet computer or phone device may download information through any connected device (e.g. to maximize download speed, the master device may use the slave devices to each download a portion of the content concurrently, etc.). The master device then may piece the content together to produce a fluid real-time update to all input overlays.

Figure 82:
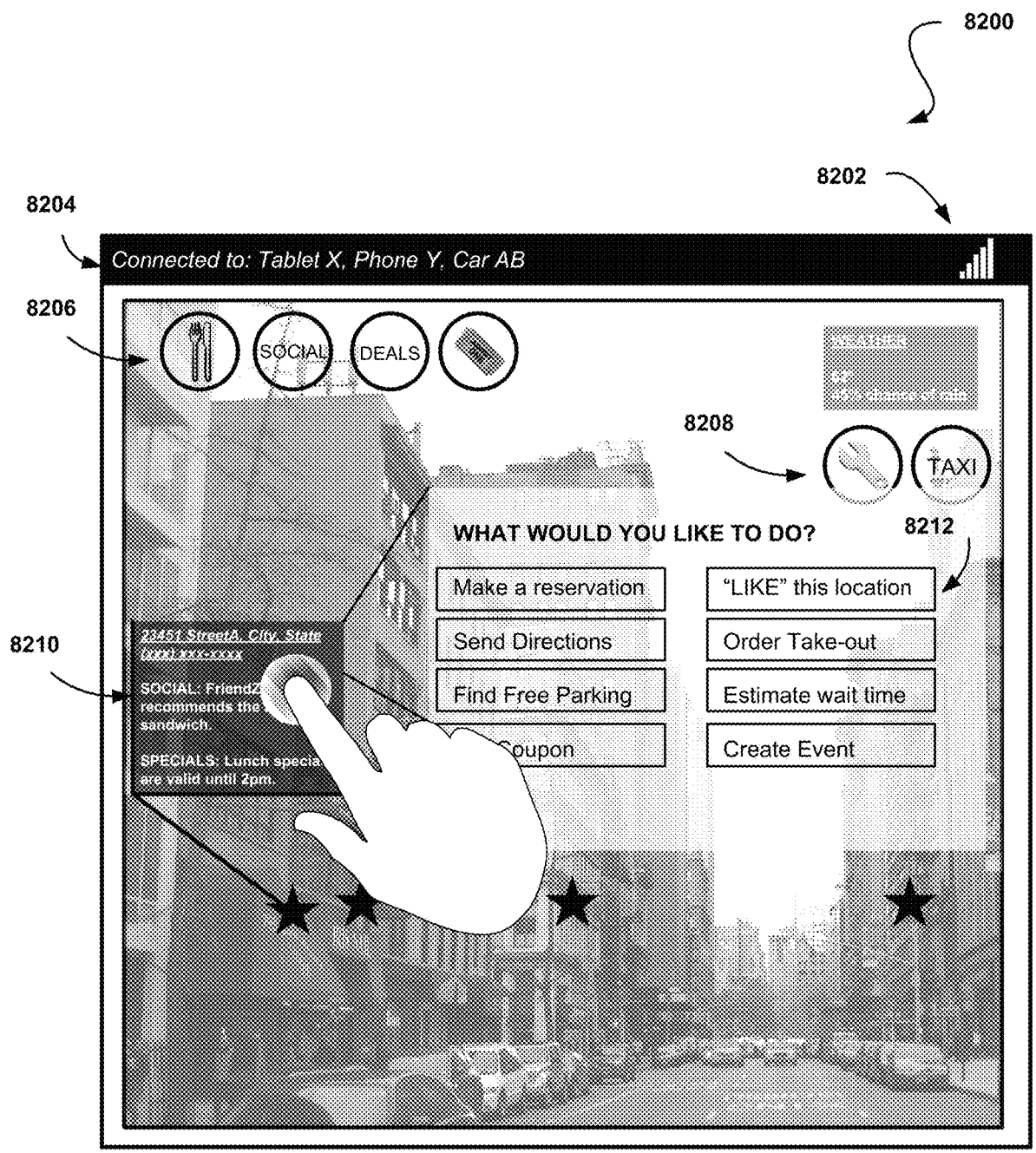
FIG. 82 shows a user interface on a device for controlling at least one vehicular feature, in accordance with one possible embodiment.

FIG. 82 shows a user interface 8200 on a device for controlling at least one vehicular feature, in accordance with one possible embodiment. As an option, the user interface 8200 may be implemented in the context of the architecture and environment of the previous Figures or any subsequent Figure(s). Of course, however, the user interface 8200 may be carried out in any desired environment. It should also be noted that the aforementioned definitions may apply during the present description.

As shown, a connection status icon 8202 and a status notification 8204 are included. In one embodiment, the connection status icon may include an indication of strength of a wireless network signal (e.g. CDMA, LTE, etc.). In another embodiment, the connection status icon may include an indication of strength of a GPS signal (e.g. GPRS, etc.). In a further embodiment, the connection status icon may include an indication of strength of a connection between the vehicular assembly system and at least one device (e.g. tablet computer, phone device, etc.).

In one embodiment, the status notification may indicate the state of connection between the vehicular system and at least one device. For example, the status notification may show "Startup," "Detecting [device]," "Authenticating [device]," "Adding New [device]," "Controlling [device]," "Receiving Command from [device]," "Connected to [device]," and/or any other status associated with the vehicular assembly system and a tablet computer or phone device.

As shown, the user interface 8200 may include a screenshot of an augmented reality application. The augmented reality application may include filters 8206, settings and/or bookmarked shortcuts 8208, input overlay 8210, and input overlay options 8212.

In one embodiment, the filters may limit the notifications displayed on the display. For example, the filters may limit the notifications by food and/or restaurants, social notifications (e.g. "FriendZ recommends the hamburger at this café," etc.), coupons and/or deals, events and/or tickets, historic tours, top ten lists (e.g. top ten things to see in CITY X, etc.), most popular (e.g. more than 1000 people have "liked" this location, etc.), Michelin rated (e.g. food, hotels, etc.), hole in the wall spots (e.g. food, activities, etc.), and/or any other filter which may alter the display of the augmented reality application. In one embodiment, the filter may be user defined (e.g. set by the user, etc.). In another embodiment, the filter may be preconfigured by the application and selected by the user (e.g. user selects "filters" to be displayed on main display, etc.).

In some embodiments, the settings may be a default button (e.g. application comes pre-installed to display the settings icon. In other embodiments, the user may select to have a settings button displayed on the main display. In some embodiments, the user may preconfigure the settings button to display customized functions (e.g. clear away all filters, redo filter search based on profile suggestions from Friend X, navigate me to home using a real-time traffic feed, etc.). In further embodiments, the bookmarked shortcuts may include a destination, a reoccurring event, a utility (e.g. Call Taxicab, etc.), a theme (e.g. explore top locations nearby, etc.), a suggestion of things to see (e.g. based off of events in the calendar of the user, etc.), a weather widget, and/or any other application and/or future which may provide functionality to the user and to which a shortcut may be linked. In some embodiments, the shortcuts may include a widget to be displayed on the display. In further embodiments, the widget may be customized (e.g. size, color, etc.) by the user. Additionally, in other embodiments, the bookmarked shortcut may be presented as an icon, text, and/or any other indicia desired by the user.

In one embodiment, the input overlays may receive updates in real-time. In another embodiment, the input overlays may be displayed in its entirety (e.g. all updates from all applicable feeds, etc.). In other embodiments, the input overlays may display the name of the location, contact information (e.g. address, phone number, etc.) of the location, social recommendations, relevant information (e.g. Lunchtime specials hours, ticket availability, hours of operation, etc.), applicable coupons and/or deals, and/or any additional filter which may add functionality to the augmented reality application.

In one embodiment, the input overlays may be displayed on the augmented reality application located on the tablet computer or phone device. In other embodiments, the augmented reality application may be displayed on one of the vehicle passenger displays. For example, in one embodiment, each vehicle passenger display may operate independently and each may receive different feedback (e.g. selection of a different input overlay, etc.). In a further embodiment, a master device may display the augmented reality application on other slave devices and provide at least some feature of interaction. For example, in one embodiment, the master device may select an input overlay and request a survey from the slave devices.

Additionally, in one embodiment, the input overlays may be updated according to the user preferences. For example, the user may desire the augmented reality application to update the input overlays in real time. In other embodiments, the tablet computer or phone device may download daily updates from friends near the user's location. In another embodiment, a user of a tablet computer of phone device may indicate ahead of time a route to a location, and the augmented reality application may download social content, coupons, specials, ticket pricing, phone numbers that may be relevant to the selected route. Of course, the downloaded material may be updated as appropriate. Additionally, where the input overlays are updated in real time, the tablet computer or phone device may download information through any connected device (e.g. to maximize download speed, the master device may use the slave devices to each download a portion of the content concurrently, etc.). The master device then may piece the content together to produce a fluid real-time update to all input overlays.

In a further embodiment, the input overlays may be represented by an icon, text, and/or any indicia selected by the user. For example, in one embodiment, any real time update (e.g. information relating to a location on the augmented reality map, etc.) may be represented by a star on the augmented reality application. Upon selecting a star (e.g. touching the star, using auditory commands "select star number 1," etc.), details relating to the input overlay may be displayed.

In one embodiment, the input overlay options may be displayed in response to some input from the user. For example, in various embodiments, the user may select the input overlay by holding down on the input overlay for a predetermined time (e.g. two seconds, etc.). In other embodiments, the user may gesture (e.g. open hand and stretch fingers out, etc.), speak an auditory command (e.g. "display options," etc.), and/or give some input to display options relating to the input overlay.

Additionally, in some embodiments, the input overlay options may include further features relating to the input overlay. For example, in various embodiments, the options may include "make a reservation," "send directions," "find free parking," "get coupon," "'like' this location," "order take-out," "estimate wait time," "create event," and/or any other feature which may relate to the selected location.

In one embodiment, the options may be associated with a location type. For example, a location type may be a restaurant, event center, business center, a salon, a clothing shop, and/or any other location which may be categorized into a type. For example, a restaurant type location may include options relating to "make a reservation," "order take-out," "display menu," "estimate wait time," whereas an event center type may include options relating to "ticket availability," "buy ticket," "browse current performances," "find nearby parking." Of course, any applicable option may be displayed on the options list, and the user may add customized options to the list as well.

Figure 83:
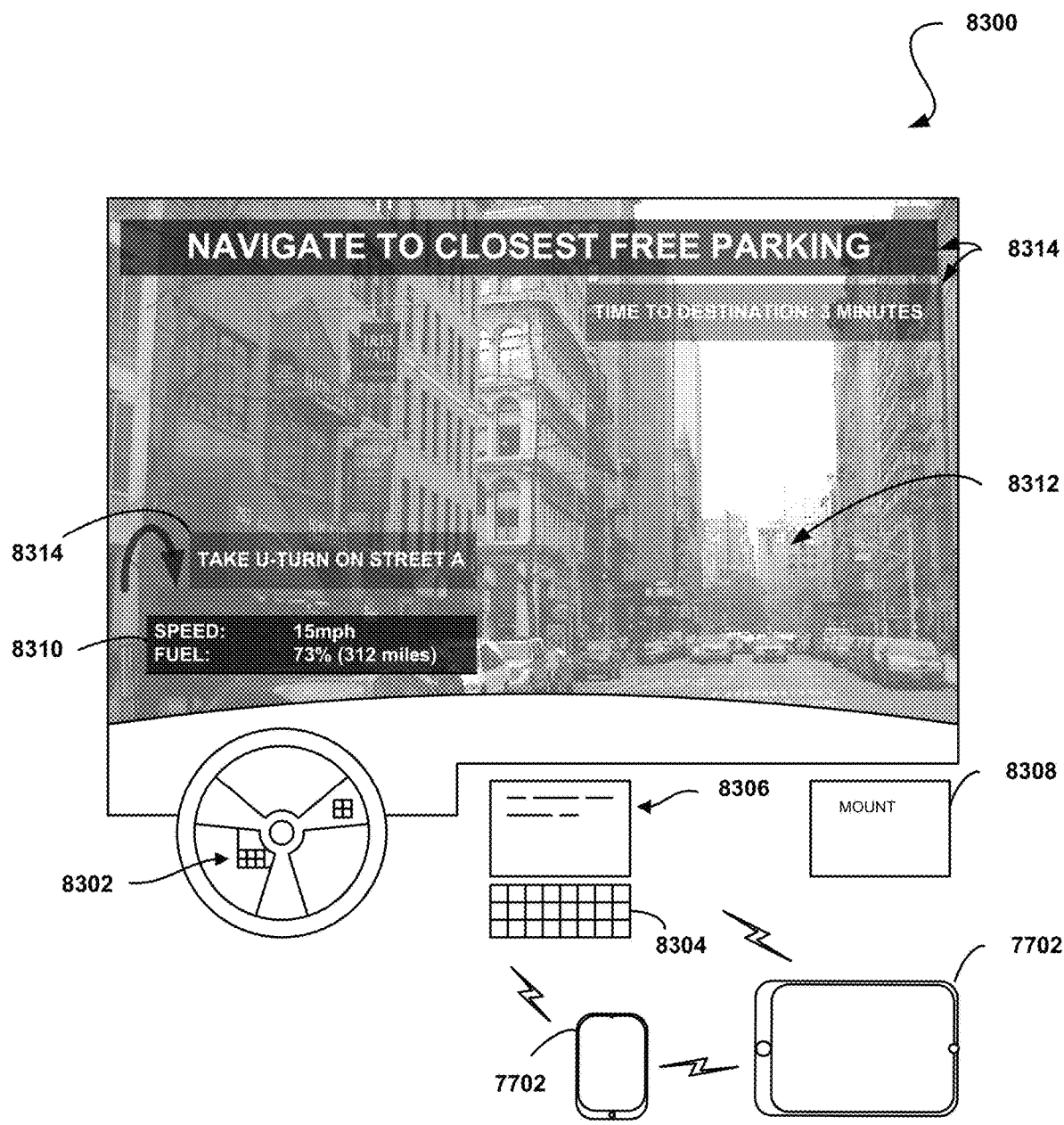
FIG. 83 shows a user interface on a vehicle for receiving at least one vehicular feature, in accordance with one possible embodiment.

FIG. 83 shows a user interface 8300 on a vehicle for receiving at least one vehicular feature, in accordance with one possible embodiment. As an option, the user interface 8300 may be implemented in the context of the architecture and environment of the previous Figures or any subsequent Figure(s). Of course, however, the user interface 8300 may be carried out in any desired environment. It should also be noted that the aforementioned definitions may apply during the present description.

As shown, the user interface on a vehicle may include projecting display information onto the windshield. For example, in one embodiment, navigation information 8314 may be displayed onto the windshield. The navigation information may include turn-by-turn directions, the destination, time to final destination, and/or any other information which may relate to the navigation information. In other embodiments, the display information may include notifications of dangers (e.g. car detected moving towards the car, etc.), an image of something not yet seen (e.g. a deer out of the light range, a car in fog, etc.), a notification of a new message, an incoming call, and/or any other information which may provide greater functionality and security to the driver.

In one embodiment, the tablet computer or phone device may be used to project information onto the windshield display. For example, after determining on the tablet computer or phone device a good location to eat, the passenger may select the location and cause the directions to be displayed on the windshield. Of course, in some embodiments, limited information may be presented on the windshield (e.g. no video, etc.) to maximize driver awareness to the surroundings. In one embodiment, the passenger may select the content to be displayed and the vehicular assembly system may automatically reformat the information to make it presentable (e.g. not distracting, etc.) to the driver.

As shown, a driver may be able to continue to focus on the road 8312 even when navigation information is displayed on the windshield display. Additionally, car information (e.g. speed, fuel consumption, etc.) 8310 may also be displayed.

In one embodiment, the user may customize the information that is displayed on the windshield screen. In some embodiments, the car information may be customized to show desired features. For example, the user may select to view the speed of the car, the fuel consumption of the car, the odometer, the activation of cruise control or any other function (e.g. lights, wipers, etc.), the revolutions per minute (RPM), and/or any other feature associated with the car. Displaying the car information on the windshield has the extra benefit of allowing the user to more fully focus on the road (e.g. it is not necessary to look down to view the information, etc.).

As shown, the phone device or tablet computer 7702 may be coupled to the automobile utilizing a wired connection (e.g. a USB connection, etc.), or a wireless connection (e.g. Bluetooth, etc.). In one embodiment, the phone device or tablet computer 7702 may be placed on a mount 8308. The mount may provide a wired or wireless connection to the automobile system.

Using this connection, a user (e.g. a driver or passenger, etc.) may operate the phone device or tablet computer 7702, via the automobile, using voice commands, steering wheel controls 8302, radio controls 8304, and/or dashboard controls. Furthermore, the phone device or tablet computer may communicate with vehicle displays (e.g. main displays, passenger displays 8306, etc.) such that content associated with the phone device or tablet computer (e.g. stored content, streaming content, etc.) may be displayed. For example, the phone device or tablet computer may communicate stored video to at least one of the passenger displays 8306. Additionally, the phone device or tablet computer may communicate streaming or stored audio such that the audio may be transmitted utilizing an audio system of the automobile.

By interfacing the phone device or tablet computer 7702 with the automobile, voice-activated, hands-free calling may also be implanted. For example, a "Push to Talk" button on the steering wheel may allow the user to access contacts stored in a contact list of the phone device or tablet computer 7702 by voice command. Furthermore, the user may be able to switch use from the phone device or tablet computer 7702 to the vehicle control system transparently. For example, a user may push a "Telephone" button on the steering wheel to automatically transfer a current telephone call to the automobile communication system of the automobile without having to hang up and call again.

As an option, the text messages received by the phone device or tablet computer 7702 may be converted to audio utilizing a vehicle on-board processor and associated voice-to-text software. The communication system of automobile may then output the converted text in an audio stream via speakers. In one embodiment, the communication system associated with the automobile may include a main display 8306 for displaying activities associated with the phone device or tablet computer 7702, along with other functionality (e.g. navigational functionality, etc.).

For example, the communication system may display any feature that is capable of being displayed using the phone device or tablet computer 7702. In various embodiments, such features may include caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 8306 may all display the same material (e.g. video, music, etc.). In another embodiment, the passenger displays may be independently operated (e.g. each displaying a different video stream, etc.) and/or operated independently by the phone device or tablet computer 7702. In a further embodiment, the passenger displays 8306 may include permanent displays. For example, the passenger displays may be installed into the automobile architecture (e.g. installed into the dashboard, the backs of seats, etc.). In another embodiment, the passenger displays 8306 may include transportable displays. For example, the passenger displays may include a tablet computer or phone device and each may be placed in an installed mount on the automobile (e.g. on the dashboard, in the backs of seats, in a roof mount, etc.).

In various embodiments, the phone device or tablet computer 7702 may be set up to operate in a master-slave relationship with the passenger displays on the automobile. In one embodiment, the phone device or tablet computer may automatically configure the passenger displays based on predetermined settings (e.g. the screen most in the front of the automobile displays navigation details, screens in the back of the automobile display videos, etc.). Of course, the screens may be configured in any manner based on input from the phone device or tablet computer.

In a further embodiment, if multiple phone devices or tablet computers are present in an automobile, the phone devices or tablet computers may apply preconfigured settings wherein only one phone device or tablet computer may control the automobile system features, and the other phone devices or tablet computers may remain as slave devices to the one master phone device or tablet computer. For example, in one embodiment, a parent passenger may wish to control automobile features (e.g. navigation, music, etc.) as well as control what is displayed on each of the child passenger's display (e.g. on the passenger displays, on another phone device or tablet computer, etc.). The parent passenger's phone device or tablet computer may be used to control at least some vehicular feature, as well as control other devices and/or displays within a preconfigured proximity range.

Figure 84:
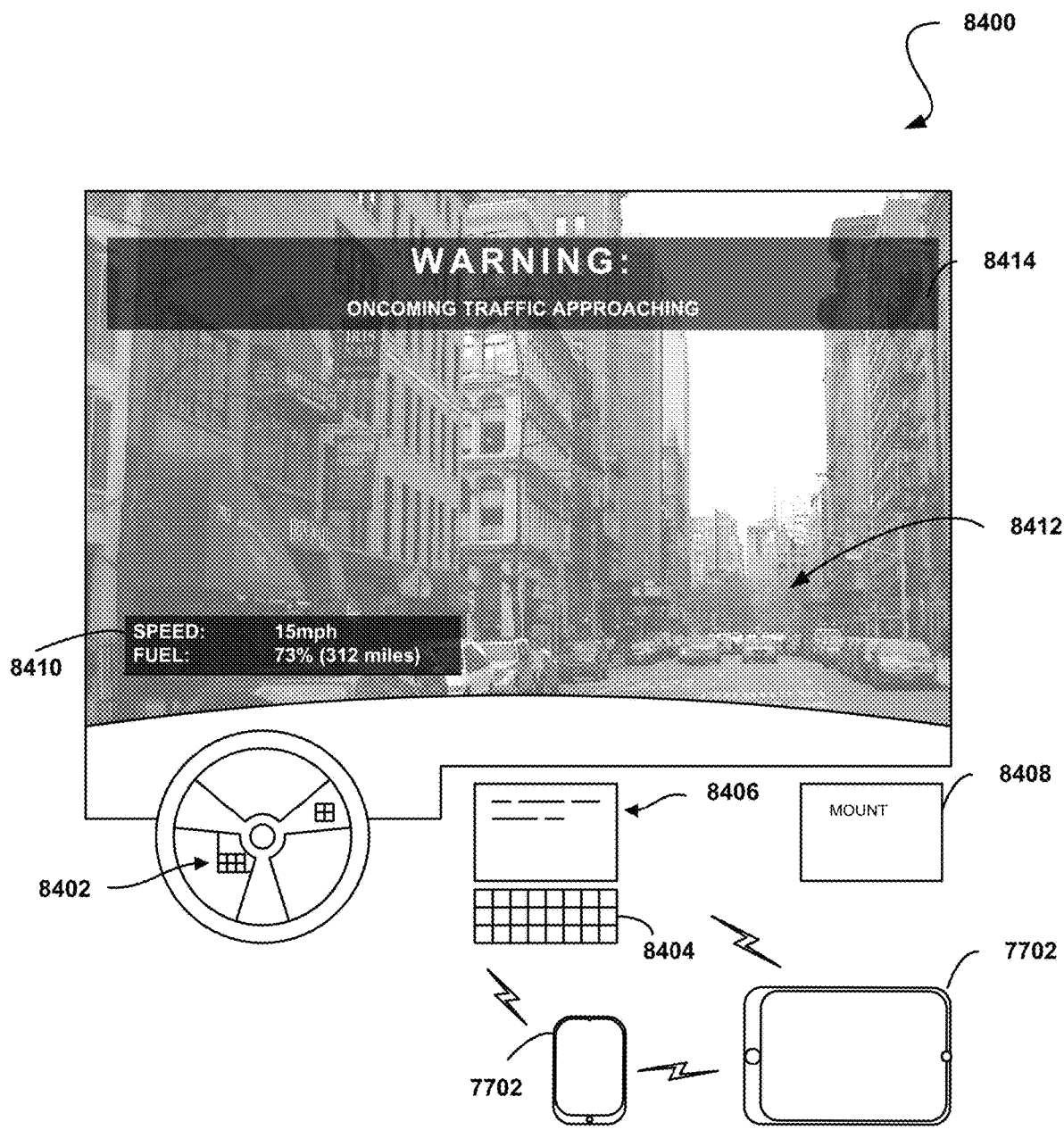
FIG. 84 shows a user interface on a vehicle for receiving at least one vehicular feature, in accordance with one possible embodiment.

FIG. 84 shows a user interface 8400 on a vehicle for receiving at least one vehicular feature, in accordance with one possible embodiment. As an option, the user interface 8400 may be implemented in the context of the architecture and environment of the previous Figures or any subsequent Figure(s). Of course, however, the user interface 8400 may be carried out in any desired environment. It should also be noted that the aforementioned definitions may apply during the present description.

As shown, warning notifications 8414, car information (e.g. speed, fuel consumption, etc.) 8310 may also be displayed on the windshield display. Additionally, the notifications and information may be placed so that the driver may still focus on the road 8412.

In one embodiment, the warning notifications may be set by the vehicular assembly system. For example, the car may come equipped with an automatic cruise control system (ACC). In some embodiments, the ACC may automatically control the car (e.g. stop the car, move the car to the side, etc.) to protect the occupants regardless of the actions of the driver. In other embodiments, the ACC may provide for an override function whereby the driver may control the vehicle regardless of the input by the ACC system.

In some embodiments, the warning notifications may be displayed on the windshield display. For example, the warning notifications may include "Warning: Oncoming Traffic Approaching," "Warning: Object Ahead," "Warning: Car Approaching," "Warning: Slick Road Ahead," "Warning: Loss of Traction," and/or any other warning notification associated with the car in some manner. In one embodiment, the warning notification may be displayed at the top of the windshield display. In another embodiment, the warning notification may be an icon that is displayed to notify the driver. Of course, the placement, size, and manner by which the notifications are displayed may be customized and preconfigured by the user.

In one embodiment, the tablet computer or phone device may be used to project information onto the windshield display. For example, after determining on the tablet computer or phone device a good location to eat, the passenger may select the location and cause the directions to be displayed on the windshield. Of course, in some embodiments, limited information may be presented on the windshield (e.g. no video, etc.) to maximize driver awareness to the surroundings. In one embodiment, the passenger may select the content to be displayed and the vehicular assembly system may automatically reformat the information to make it presentable (e.g. not distracting, etc.) to the driver.

In one embodiment, the user may customize the information that is displayed on the windshield screen. In some embodiments, the car information may be customized to show desired features. For example, the user may select to view the speed of the car, the fuel consumption of the car, the odometer, the activation of cruise control or any other function (e.g. lights, wipers, etc.), the revolutions per minute (RPM), and/or any other feature associated with the car. Displaying the car information on the windshield has the extra benefit of allowing the user to more fully focus on the road (e.g. it is not necessary to look down to view the information, etc.).

As shown, the phone device or tablet computer 7702 may be coupled to the automobile utilizing a wired connection (e.g. a USB connection, etc.), or a wireless connection (e.g. Bluetooth, etc.). In one embodiment, the phone device or tablet computer 7702 may be placed on a mount 8408. The mount may provide a wired or wireless connection to the automobile system.

Using this connection, a user (e.g. a driver or passenger, etc.) may operate the phone device or tablet computer 7702, via the automobile, using voice commands, steering wheel controls 8402, radio controls 8404, and/or dashboard controls. Furthermore, the phone device or tablet computer may communicate with vehicle displays (e.g. main displays, passenger displays 8406, etc.) such that content associated with the phone device or tablet computer (e.g. stored content, streaming content, etc.) may be displayed. For example, the phone device or tablet computer may communicate stored video to at least one of the passenger displays 8406. Additionally, the phone device or tablet computer may communicate streaming or stored audio such that the audio may be transmitted utilizing an audio system of the automobile.

By interfacing the phone device or tablet computer 7702 with the automobile, voice-activated, hands-free calling may also be implanted. For example, a "Push to Talk" button on the steering wheel may allow the user to access contacts stored in a contact list of the phone device or tablet computer 7702 by voice command. Furthermore, the user may be able to switch use from the phone device or tablet computer 7702 to the vehicle control system transparently. For example, a user may push a "Telephone" button on the steering wheel to automatically transfer a current telephone call to the automobile communication system of the automobile without having to hang up and call again.

As an option, the text messages received by the phone device or tablet computer 7702 may be converted to audio utilizing a vehicle on-board processor and associated voice-to-text software. The communication system of automobile may then output the converted text in an audio stream via speakers. In one embodiment, the communication system associated with the automobile may include a main display 8406 for displaying activities associated with the phone device or tablet computer 7702, along with other functionality (e.g. navigational functionality, etc.).

For example, the communication system may display any feature that is capable of being displayed using the phone device or tablet computer 7702. In various embodiments, such features may include caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 8406 may all display the same material (e.g. video, music, etc.). In another embodiment, the passenger displays may be independently operated (e.g. each displaying a different video stream, etc.) and/or operated independently by the phone device or tablet computer 7702. In a further embodiment, the passenger displays 8406 may include permanent displays. For example, the passenger displays may be installed into the automobile architecture (e.g. installed into the dashboard, the backs of seats, etc.). In another embodiment, the passenger displays 8406 may include transportable displays. For example, the passenger displays may include a tablet computer or phone device and each may be placed in an installed mount on the automobile (e.g. on the dashboard, in the backs of seats, in a roof mount, etc.).

In various embodiments, the phone device or tablet computer 7702 may be set up to operate in a master-slave relationship with the passenger displays on the automobile. In one embodiment, the phone device or tablet computer may automatically configure the passenger displays based on predetermined settings (e.g. the screen most in the front of the automobile displays navigation details, screens in the back of the automobile display videos, etc.). Of course, the screens may be configured in any manner based on input from the phone device or tablet computer.

In a further embodiment, if multiple phone devices or tablet computers are present in an automobile, the phone devices or tablet computers may apply preconfigured settings wherein only one phone device or tablet computer may control the automobile system features, and the other phone devices or tablet computers may remain as slave devices to the one master phone device or tablet computer. For example, in one embodiment, a parent passenger may wish to control automobile features (e.g. navigation, music, etc.) as well as control what is displayed on each of the child passenger's display (e.g. on the passenger displays, on another phone device or tablet computer, etc.). The parent passenger's phone device or tablet computer may be used to control at least some vehicular feature, as well as control other devices and/or displays within a preconfigured proximity range.

Figure 85:
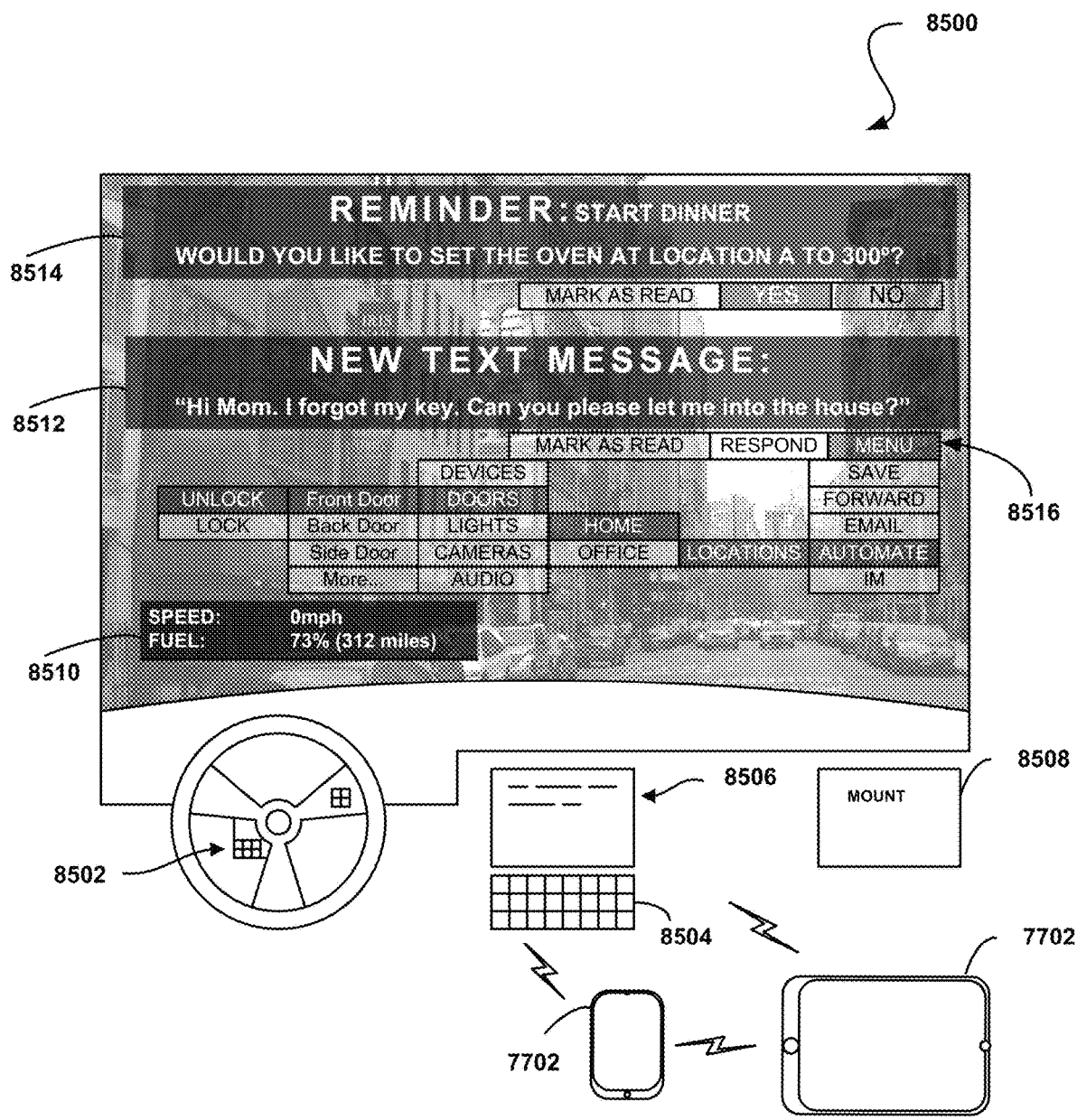
FIG. 85 shows a user interface on a vehicle for receiving at least one vehicular feature, in accordance with one possible embodiment.

FIG. 85 shows a user interface 8500 on a vehicle for receiving at least one vehicular feature, in accordance with one possible embodiment. As an option, the user interface 8500 may be implemented in the context of the architecture and environment of the previous Figures or any subsequent Figure(s). Of course, however, the user interface 8500 may be carried out in any desired environment. It should also be noted that the aforementioned definitions may apply during the present description.

As shown, the phone device or tablet computer 7702 may be coupled to the automobile utilizing a wired connection (e.g. a USB connection, etc.), or a wireless connection (e.g. Bluetooth, etc.). In one embodiment, the phone device or tablet computer 7702 may be placed on a mount 8508. The mount may provide a wired or wireless connection to the automobile system.

Using this connection, a user (e.g. a driver or passenger, etc.) may operate the phone device or tablet computer 7702, via the automobile, using voice commands, steering wheel controls 8502, radio controls 8504, and/or dashboard controls. Furthermore, the phone device or tablet computer may communicate with vehicle displays (e.g. main displays, passenger displays 8506, etc.) such that content associated with the phone device or tablet computer (e.g. stored content, streaming content, etc.) may be displayed. For example, the phone device or tablet computer may communicate stored video to at least one of the passenger displays 8506. Additionally, the phone device or tablet computer may communicate streaming or stored audio such that the audio may be transmitted utilizing an audio system of the automobile.

By interfacing the phone device or tablet computer 7702 with the automobile, voice-activated, hands-free calling may also be implanted. For example, a "Push to Talk" button on the steering wheel may allow the user to access contacts stored in a contact list of the phone device or tablet computer 7702 by voice command. Furthermore, the user may be able to switch use from the phone device or tablet computer 7702 to the vehicle control system transparently. For example, a user may push a "Telephone" button on the steering wheel to automatically transfer a current telephone call to the automobile communication system of the automobile without having to hang up and call again.

As an option, the text messages received by the phone device or tablet computer 7702 may be converted to audio utilizing a vehicle on-board processor and associated voice-to-text software. The communication system of automobile may then output the converted text in an audio stream via speakers. In one embodiment, the communication system associated with the automobile may include a main display 8506 for displaying activities associated with the phone device or tablet computer 7702, along with other functionality (e.g. navigational functionality, etc.).

For example, the communication system may display any feature that is capable of being displayed using the phone device or tablet computer 7702. In various embodiments, such features may include caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 8506 may all display the same material (e.g. video, music, etc.). In another embodiment, the passenger displays may be independently operated (e.g. each displaying a different video stream, etc.) and/or operated independently by the phone device or tablet computer 7702. In a further embodiment, the passenger displays 8506 may include permanent displays. For example, the passenger displays may be installed into the automobile architecture (e.g. installed into the dashboard, the backs of seats, etc.). In another embodiment, the passenger displays 8506 may include transportable displays. For example, the passenger displays may include a tablet computer or phone device and each may be placed in an installed mount on the automobile (e.g. on the dashboard, in the backs of seats, in a roof mount, etc.).

In various embodiments, the phone device or tablet computer 7702 may be set up to operate in a master-slave relationship with the passenger displays on the automobile. In one embodiment, the phone device or tablet computer may automatically configure the passenger displays based on predetermined settings (e.g. the screen most in the front of the automobile displays navigation details, screens in the back of the automobile display videos, etc.). Of course, the screens may be configured in any manner based on input from the phone device or tablet computer.

In a further embodiment, if multiple phone devices or tablet computers are present in an automobile, the phone devices or tablet computers may apply preconfigured settings wherein only one phone device or tablet computer may control the automobile system features, and the other phone devices or tablet computers may remain as slave devices to the one master phone device or tablet computer. For example, in one embodiment, a parent passenger may wish to control automobile features (e.g. navigation, music, etc.) as well as control what is displayed on each of the child passenger's display (e.g. on the passenger displays, on another phone device or tablet computer, etc.). The parent passenger's phone device or tablet computer may be used to control at least some vehicular feature, as well as control other devices and/or displays within a preconfigured proximity range.

As shown, car information 8510 may be displayed on the windshield display. In one embodiment, the user may customize the information that is displayed on the windshield screen. In some embodiments, the car information may be customized to show desired features. For example, the user may select to view the speed of the car, the fuel consumption of the car, the odometer, the activation of cruise control or any other function (e.g. lights, wipers, etc.), the revolutions per minute (RPM), and/or any other feature associated with the car. Displaying the car information on the windshield has the extra benefit of allowing the user to more fully focus on the road (e.g. it is not necessary to look down to view the information, etc.).

Additionally, in one embodiment, when the car is not moving (e.g. 0 mph, etc.), notifications and other messages may be displayed on the windshield display. For example, new text messages 8512, reminders 8514, new email messages, appointment details, social networking overlays (e.g. recommendations by friends, etc.), coupons details, event center details (e.g. ticket availability, performances playing, etc.) may be displayed while the car is not moving.

In one embodiment, the driver or the passenger may navigate through the displayed notifications and/or messages through auditory commands (e.g. "mark as read text message one," etc.), gestures (e.g. movements correspond to actions, movements correspond to a displayed cursor, etc.), or through an input display (e.g. touchscreen head-unit display on the car which activates once the car stops and displays, as with an augmented reality application, what is viewed from the windshield as well as notifications and messages which are displayed thereon, etc.).

In another embodiment, a reminder may be linked to a saved event and an associated reminder located on a tablet computer or phone device. The tablet computer or phone device may send such reminder information to the vehicular assembly system to be displayed on the windshield display. In one embodiment, the reminder may include "Reminder: Start Dinner. Would you like to set the oven at location A to 300°?" A user may select "mark as read," "yes," or "no." In various embodiments, the user may make a selection through auditory commands, gestures, an input display (e.g. touchscreen, etc.), and/or through any other method by which a selection may be made.

In one embodiment, a user may navigate through a menu 8516 associated with a new text message. For example, in response to the text message "Hi Mom. I forgot my key. Can you please let me into the house?," the user may navigate through the menu to the "automate" function, select the "locations," select "home," select "doors," select "front door," and then select "unlock." In a separate embodiment, the user may state "open front door at location home," and the vehicular assembly system may send the recording to the tablet computer or phone device to unlock the front door at location home. In another embodiment, the car system may include features to be able to unlock the front door without relying on an external device (e.g. tablet computer, phone device, etc.). Of course, any notification may be displayed to the user when the car is still. Additionally, the displayed notifications and/or message may be arranged based on preconfigured settings by the user. In one embodiment, the displayed notifications and/or message may be displayed and/or arranged based on a policy (e.g. based on connected device, identify of driver, etc.).

Additionally, in one embodiment, once the car begins to move (e.g. beyond 0 mph, etc.), all notifications and/or messages may completely disappear from the windshield screen so that the driver may focus and concentrate on driving.

Figure 86:
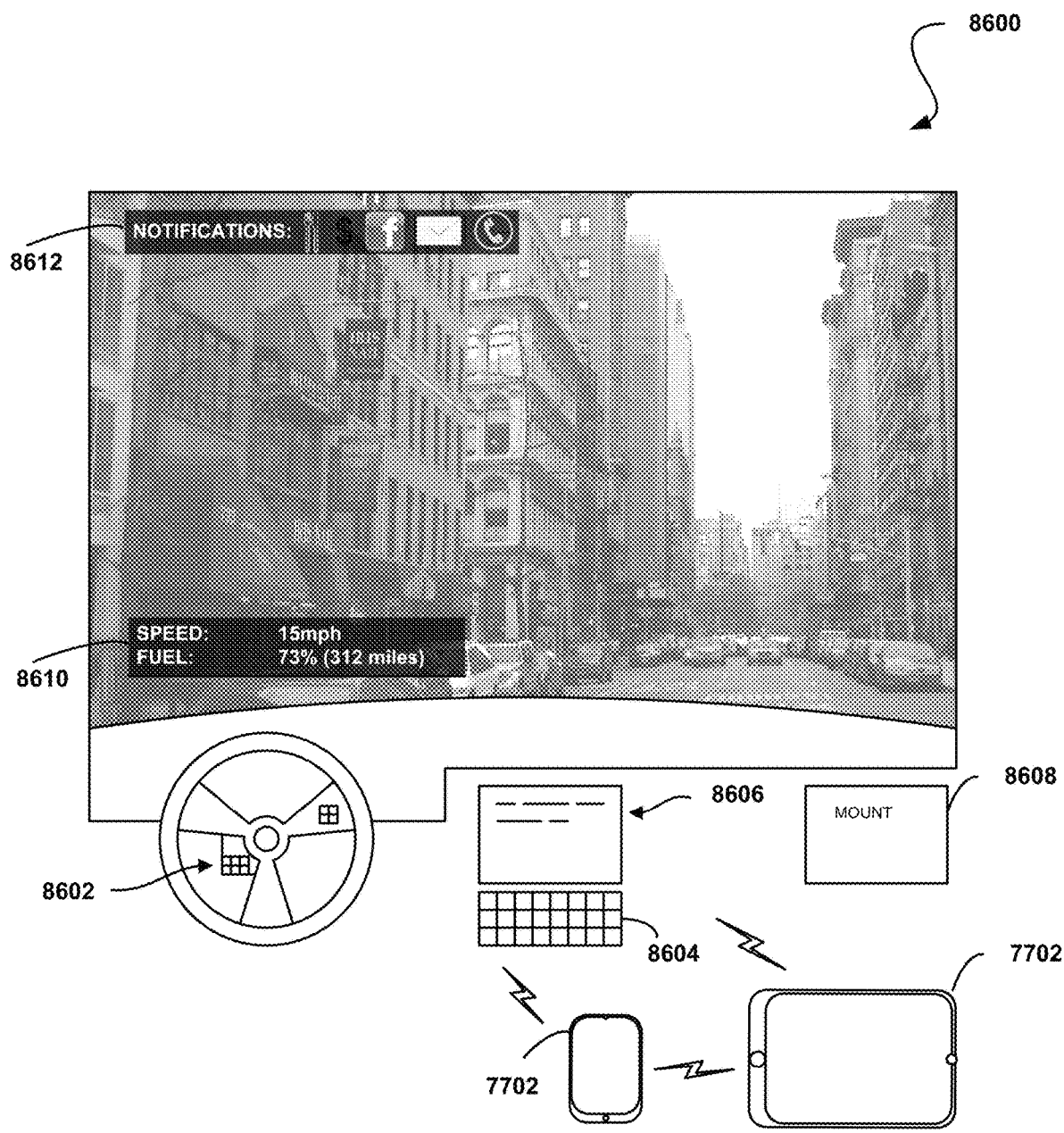
FIG. 86 shows a user interface on a vehicle for receiving at least one vehicular feature, in accordance with one possible embodiment.

FIG. 86 shows a user interface 8600 on a vehicle for receiving at least one vehicular feature, in accordance with one possible embodiment. As an option, the user interface 8600 may be implemented in the context of the architecture and environment of the previous Figures or any subsequent Figure(s). Of course, however, the user interface 8600 may be carried out in any desired environment. It should also be noted that the aforementioned definitions may apply during the present description.

As shown, the phone device or tablet computer 7702 may be coupled to the automobile utilizing a wired connection (e.g. a USB connection, etc.), or a wireless connection (e.g. Bluetooth, etc.). In one embodiment, the phone device or tablet computer 7702 may be placed on a mount 8608. The mount may provide a wired or wireless connection to the automobile system.

Using this connection, a user (e.g. a driver or passenger, etc.) may operate the phone device or tablet computer 7702, via the automobile, using voice commands, steering wheel controls 8602, radio controls 8604, and/or dashboard controls. Furthermore, the phone device or tablet computer may communicate with vehicle displays (e.g. main displays, passenger displays 8606, etc.) such that content associated with the phone device or tablet computer (e.g. stored content, streaming content, etc.) may be displayed. For example, the phone device or tablet computer may communicate stored video to at least one of the passenger displays 8606. Additionally, the phone device or tablet computer may communicate streaming or stored audio such that the audio may be transmitted utilizing an audio system of the automobile.

By interfacing the phone device or tablet computer 7702 with the automobile, voice-activated, hands-free calling may also be implanted. For example, a "Push to Talk" button on the steering wheel may allow the user to access contacts stored in a contact list of the phone device or tablet computer 7702 by voice command. Furthermore, the user may be able to switch use from the phone device or tablet computer 7702 to the vehicle control system transparently. For example, a user may push a "Telephone" button on the steering wheel to automatically transfer a current telephone call to the automobile communication system of the automobile without having to hang up and call again.

As an option, the text messages received by the phone device or tablet computer 7702 may be converted to audio utilizing a vehicle on-board processor and associated voice-to-text software. The communication system of automobile may then output the converted text in an audio stream via speakers. In one embodiment, the communication system associated with the automobile may include a main display 8606 for displaying activities associated with the phone device or tablet computer 7702, along with other functionality (e.g. navigational functionality, etc.).

For example, the communication system may display any feature that is capable of being displayed using the phone device or tablet computer 7702. In various embodiments, such features may include caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 8606 may all display the same material (e.g. video, music, etc.). In another embodiment, the passenger displays may be independently operated (e.g. each displaying a different video stream, etc.) and/or operated independently by the phone device or tablet computer 7702. In a further embodiment, the passenger displays 8606 may include permanent displays. For example, the passenger displays may be installed into the automobile architecture (e.g. installed into the dashboard, the backs of seats, etc.). In another embodiment, the passenger displays 8606 may include transportable displays. For example, the passenger displays may include a tablet computer or phone device and each may be placed in an installed mount on the automobile (e.g. on the dashboard, in the backs of seats, in a roof mount, etc.).

In various embodiments, the phone device or tablet computer 7702 may be set up to operate in a master-slave relationship with the passenger displays on the automobile. In one embodiment, the phone device or tablet computer may automatically configure the passenger displays based on predetermined settings (e.g. the screen most in the front of the automobile displays navigation details, screens in the back of the automobile display videos, etc.). Of course, the screens may be configured in any manner based on input from the phone device or tablet computer.

In a further embodiment, if multiple phone devices or tablet computers are present in an automobile, the phone devices or tablet computers may apply preconfigured settings wherein only one phone device or tablet computer may control the automobile system features, and the other phone devices or tablet computers may remain as slave devices to the one master phone device or tablet computer. For example, in one embodiment, a parent passenger may wish to control automobile features (e.g. navigation, music, etc.) as well as control what is displayed on each of the child passenger's display (e.g. on the passenger displays, on another phone device or tablet computer, etc.). The parent passenger's phone device or tablet computer may be used to control at least some vehicular feature, as well as control other devices and/or displays within a preconfigured proximity range.

As shown, car information 8610 may be displayed on the windshield display. In one embodiment, the user may customize the information that is displayed on the windshield screen. In some embodiments, the car information may be customized to show desired features. For example, the user may select to view the speed of the car, the fuel consumption of the car, the odometer, the activation of cruise control or any other function (e.g. lights, wipers, etc.), the revolutions per minute (RPM), and/or any other feature associated with the car. Displaying the car information on the windshield has the extra benefit of allowing the user to more fully focus on the road (e.g. it is not necessary to look down to view the information, etc.).

As shown, a notification bar 8612 may be displayed. In various embodiments, the notification bar may be configured to display updates. For example, in one embodiment, the notification bar may display an icon relating to a recommended restaurant, a nearby coupon, a social media update, new mail, a missed call, and/or any other type of notification. In one embodiment, when the vehicle speed is over a set threshold (e.g. over 25 mph, etc.), rather than display visual notifications, an auditory notification may be given to the driver (e.g. "new mail has arrived," "the restaurant X was recommended by FriendA," etc.). Of course, the manner in which notifications are given (e.g. auditory, visual, etc.) may be predetermined by the user. In some embodiments, notifications may be limited based on legal constraints (e.g. driver notifications may not be permitted in some States, etc.).

In one embodiment, when the car is not moving (e.g. 0 mph, etc.) the notifications may expand in a manner consistent with FIG. 85. Of course, in another embodiment, the notifications may act consistent with preconfigured user settings, policies, and/or real-time input (e.g. maximize all notifications, etc.) from the user.

Figure 87:
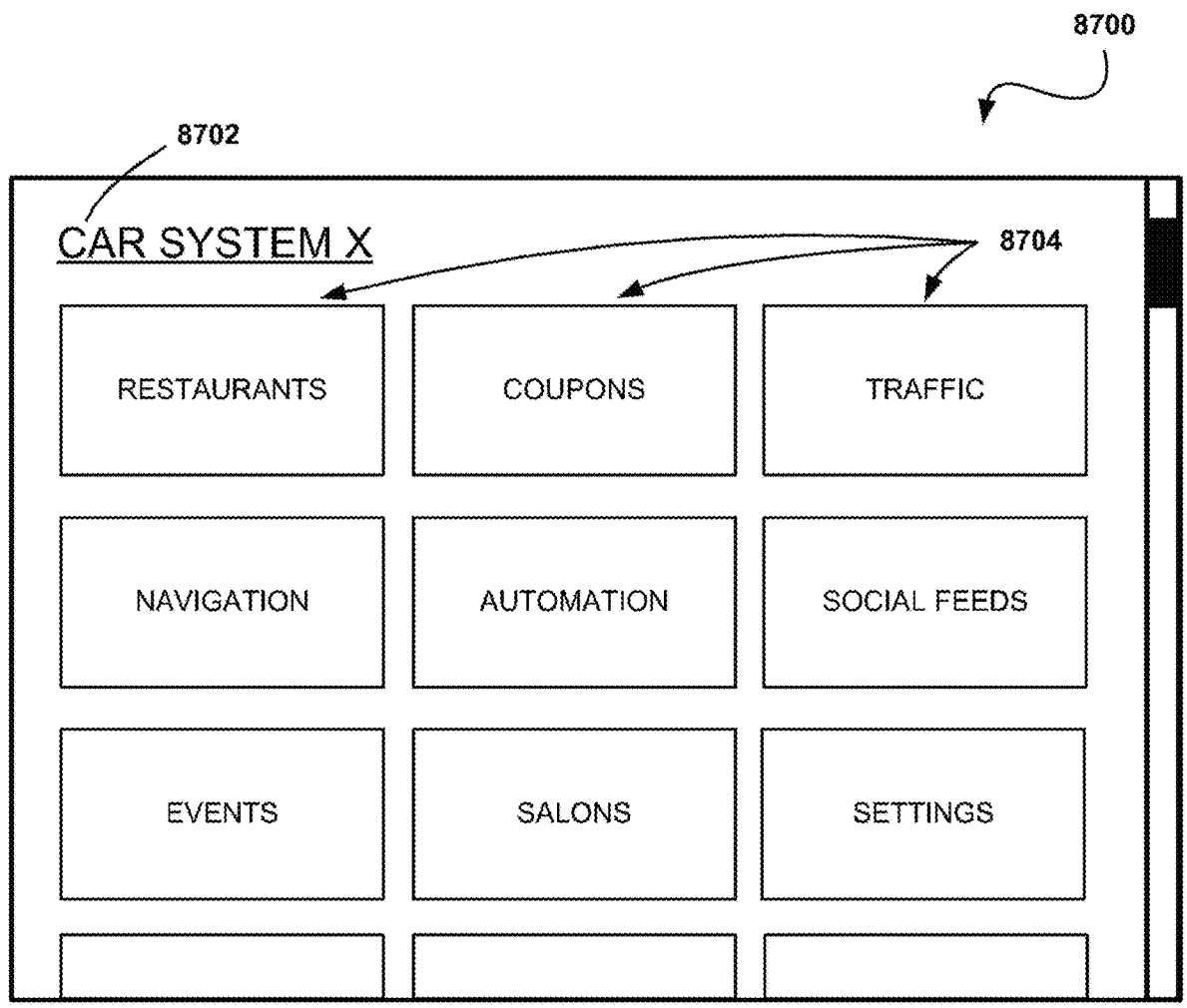
FIG. 87 shows a user control interface, in accordance with one possible embodiment.

FIG. 87 shows a user control interface 8700, in accordance with one possible embodiment. As an option, the user control interface 8700 may be implemented in the context of the architecture and environment of the previous Figures or any subsequent Figure(s). Of course, however, the user control interface 8700 may be carried out in any desired environment. It should also be noted that the aforementioned definitions may apply during the present description.

As shown, a user control interface 8700 may include a header 8702 and selectable options 8704. In one embodiment, the header may include the name of the vehicular assembly system (e.g. "Car System X," etc.). In another embodiment, the header may include a dynamic status of the activity. For example, in some embodiments, the header may act as a ticker of new events (e.g. "receiving GPS signal," "traffic ahead 2 miles, recommend change of route," "Friend X recommended location A," etc.). In other embodiments, the header may be static. Of course, the header may be preconfigured by the user in settings.

In the context of the present description, selectable options include any function and/or feature associated with at least some aspect of the control interface. For example, in various embodiments, the selectable options may include a restaurant function, a coupons function, a traffic function, a navigation function, an automation function, a social feeds function, an events function, a salons function, a settings function, and/or any other function which may relate to at least some aspect of the control interface.

In one embodiment, the control interface may be displayed automatically upon activation of the vehicle control mode associated with the tablet computer or phone device. In other embodiments, the control interface may be displayed independent of the vehicle control mode.

In one embodiment, the control interface displayed on the tablet computer or phone device may include several features. For example, in various embodiments, the control interface may include an entertainment menu option where video, music, news, podcasts, and/or any other entertainment media may be selected. In some embodiments, the media may be found locally on the device, or it may be accessible by cloud (e.g. on the Internet, etc.). In one embodiment, the tablet computer or phone device may receive a data stream through a wireless network (e.g. LTE, CDMA, etc.). In other embodiments, the vehicular system may be connected to the cloud (e.g. the Internet, etc.) and receive a data stream through a wireless network (e.g. LTE, etc.). In either situation, the data stream may be shared with the vehicular system and with the phone device or tablet computer, regardless of the source.

In another embodiment, the control interface may include an automation menu option. For example, in one embodiment, a user may set up an automation control associated with the vehicular assembly. In such an embodiment, the automation control may permit the user to turn on the car remotely, activate the engine remotely, and/or even allow the user to configure settings associated with an autonomous car (e.g. robotic car, driverless car, etc.). For example, using the autonomous car feature, a user may direct the car to park itself (e.g. self-park, etc.), activate the car to drive itself to the user's location, activate the car to drive itself to another specified location, and/or control at least some aspect of the car remotely.

In another embodiment, the automation menu option may integrate the tablet computer, phone device, and/or vehicular assembly system with any other location and/or devices which may be remotely controlled. For example, the automation menu option may include connecting to a remote location (e.g. home, office, etc.), to a remote device (e.g. security system, tablet computer, home computer, television, etc.) and/or to any other item which may be remotely controlled. For example, in one embodiment, a user of the tablet computer may control the temperature of the air at home by adjusting a digital thermostat on the tablet computer. In another embodiment, the vehicular assembly system may be configured to control the temperature of the air at home by adjusting a digital thermostat. Of course, the vehicular assembly system may be configured to control any automation aspect of any device or location based on preconfigured settings.

In one embodiment, the control interface may include an interaction menu option. For example, in various embodiments, a user may select an augmented reality application where a car's camera may transmit a real-time video feed to the tablet computer, and additional information (e.g. social networking streams, GPS data, etc.) may be superimposed on the display. In one embodiment, the augmented reality application may include information (e.g. reviews, recommendations, etc.) from social networking sites (e.g. Facebook, Yelp, etc.). In other embodiments, the augmented reality application may include information (e.g. historical information, ticket availability, contact information, best parking places, etc.) from any online source.

In some embodiments, the interaction menu option may include a ticketing application (e.g. buy tickets to an event nearby, etc.), a concierge application (e.g. schedule a reservation at a restaurant, book a hotel room, etc.), a localvore application (e.g. best places to find local food, known local customs, best places to eat, local goods shops, etc.), and/or any other application which may allow the user to interact in some manner with the tablet computer or phone device and the vehicular assembly.

In a further embodiment, the control interface may include a car control menu option. For example, in various embodiments, the car control menu option may allow the user to control the temperature of the car, apply a temperature policy (e.g. cold in front, hot in back, time of day dependent, outside temperature dependent, etc.), control the tint of the windows (e.g. darken tint on back windows, etc.), control the temperature of heated seats, control the sunroof(s), check engine fluid levels (e.g. oil, brake fluid, etc.), monitor energy consumption (e.g. electric v. gas consumption, etc.), and/or control any other aspect associated with the vehicular system.

Additionally, in one embodiment, the control interface that is displayed may be dependent on the user accessing the control interface. For example, in one embodiment, a passenger control interface may have full access to the features and resources, whereas, in another embodiment, a driver control interface may have limited access to all of the features and resources. In one embodiment, the user may designate the status (e.g. driver, passenger, etc.). In another embodiment, the vehicular system may determine the status of the user (e.g. weight sensors to determine whether a passenger is present, camera sensors, etc.).

Thus, in various embodiments, the technology disclosed herein may be utilized in a variety ways either singularly or in combination in any desired manner. For example, a first user may own a first tablet device and a first mobile phone device that are configured to support multiple roles/configurations when in communication. The first tablet device may be equipped with a backface-positioned e-ink display utilizing one or more of the techniques disclosed herein during reference to one or more of FIGS. 1-24. Further, utilizing one or more of the techniques disclosed herein during reference to one or more of FIGS. 25-42B, the first tablet device may be adapted to serve as a tablet device when in a tablet mode, but also as a desktop device when in a desktop mode with an office manager interface in connection with a conventional display/keyboard and the first mobile phone device serving as a gesture input mouse in connection with the desktop-mode first tablet device.

Utilizing one or more of the techniques disclosed herein during reference to one or more of FIGS. 43-49, the first mobile phone device may be used to continue editing an email or document generated utilizing the desktop-mode first tablet device, when the system detects that the desktop-mode first tablet device exits desktop-mode or the first mobile phone device is moved out of short-term communication of the desktop-mode first tablet device. Even still, utilizing one or more of the techniques disclosed herein during reference to one or more of FIGS. 52-63, the first mobile phone device may be configured to provide both camera and microphone input for use in connection with a video conference managed by the first tablet device.

Still yet, utilizing one or more of the techniques disclosed herein during reference to one or more of FIGS. 50-51B, a second user may own a second tablet device and a second mobile phone projector-equipped device that are configured to operate together in a master-slave fashion. Finally, the first tablet device and/or the first mobile phone device may be equipped to communicate with a television for any purpose (e.g. social networking in connection with viewed television content, etc.). Further, utilizing one or more of the techniques disclosed herein during reference to one or more of FIGS. 64-68, a first user may use a tablet computer or phone device to control at least some aspect associated with a television device, as well as to socially interact with other users and their devices.

In such possible environment (among many possible), the first user may generate a conference report template using the desktop-mode first tablet device, with the help of the first mobile device operating as an associated gesture mouse. During such preparation, the first user may see that he/she is late for a related conference presentation using the office manager interface. In such case, the first user may switch the first tablet device from the desktop-mode to the tablet mode and store the same, while holstering their first mobile device which deactivates its role as a gesture mouse.

While riding a train to the related conference presentation, the first user may access their first mobile device and see a prompt to continue work on the report template utilizing the first mobile device, and do so. Further, the first user may choose to read newspaper literature utilizing the backface-positioned e-ink display. Upon arriving at the related conference presentation, the first user may activate the first tablet device in tablet mode and may access their first tablet device and see a prompt to continue work on the report template using the first tablet device, and do so.

Further, the first user may set the first mobile device on a conference table with the camera thereof directed at a speaker of the conference presentation. The user may also initiate a video conference with the second tablet device of the second user such that a video feed of the conference presenter is fed from the first mobile device to (or under the control of) the first tablet device, for transmission to the second tablet device (as well as any live editing of the report template by the first user utilizing the first tablet device). Further, the second tablet device may be configured to receive (and project via the second mobile phone projector-equipped device) both the live video feed and live editing of the report template (and any verbal input from the first user) to a group of colleagues on site with the second user.

Finally, after work that day, the first user may utilize the first tablet device and/or the first mobile phone device to communicate with a television for sharing messages and/or television content amongst those in his/her social network.

In various optional embodiments, the features, capabilities, and/or technology, etc. of the tablets, mobile devices, computing devices, networks, hardware, and/or software, etc. disclosed in the following patents/applications may or may not be incorporated into any of the embodiments disclosed herein: U.S. Pat. Nos. 7,479,949; 7,748,634; US20060017692; US20100188268; US20110145692; U.S. Pat. No. 7,954,101; US20100210329; US20070091825; US20060013219; U.S. Pat. No. 7,916,166; US20090213205; US20070296805; US20100205148; US20100188473; U.S. Pat. Nos. 7,441,196; 7,894,641; 7,966,578; 7,479,949; U.S. application Ser. No. 12/572,204; and U.S. application Ser. No. 12/650,539. Each of the foregoing patents/applications are hereby incorporated by reference in their entirety for all purposes.

Figures 1, 88:
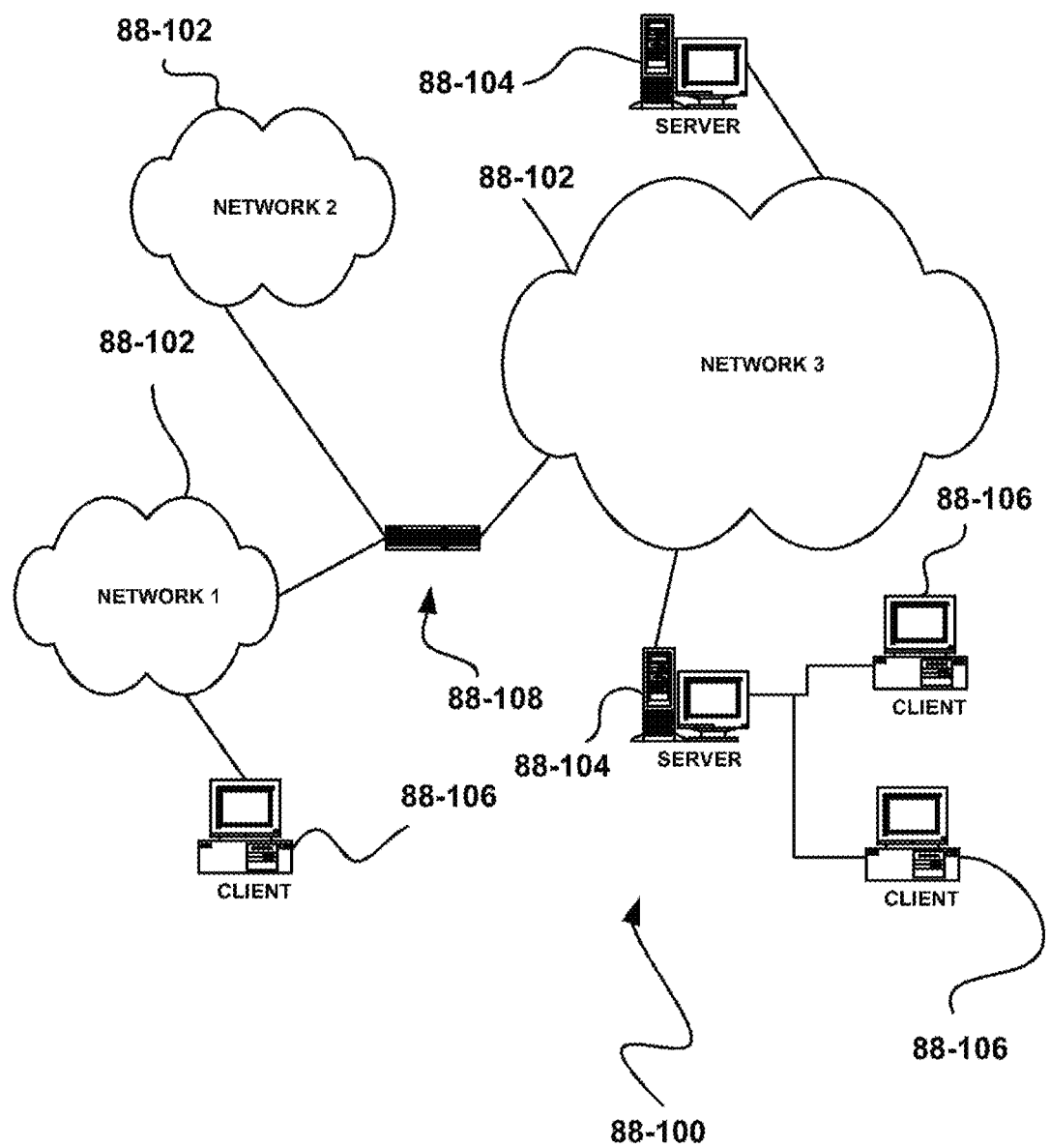
Figures 2, 88:
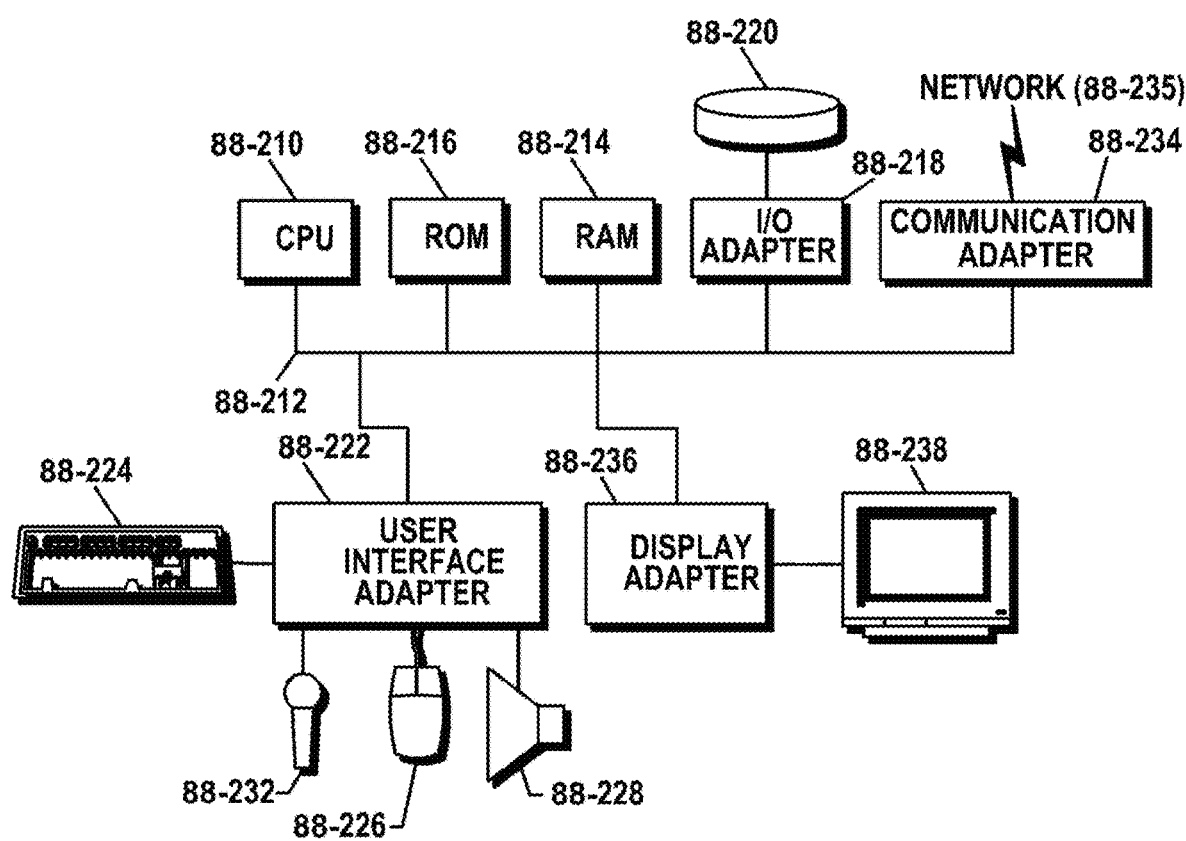
Figures 3, 88:
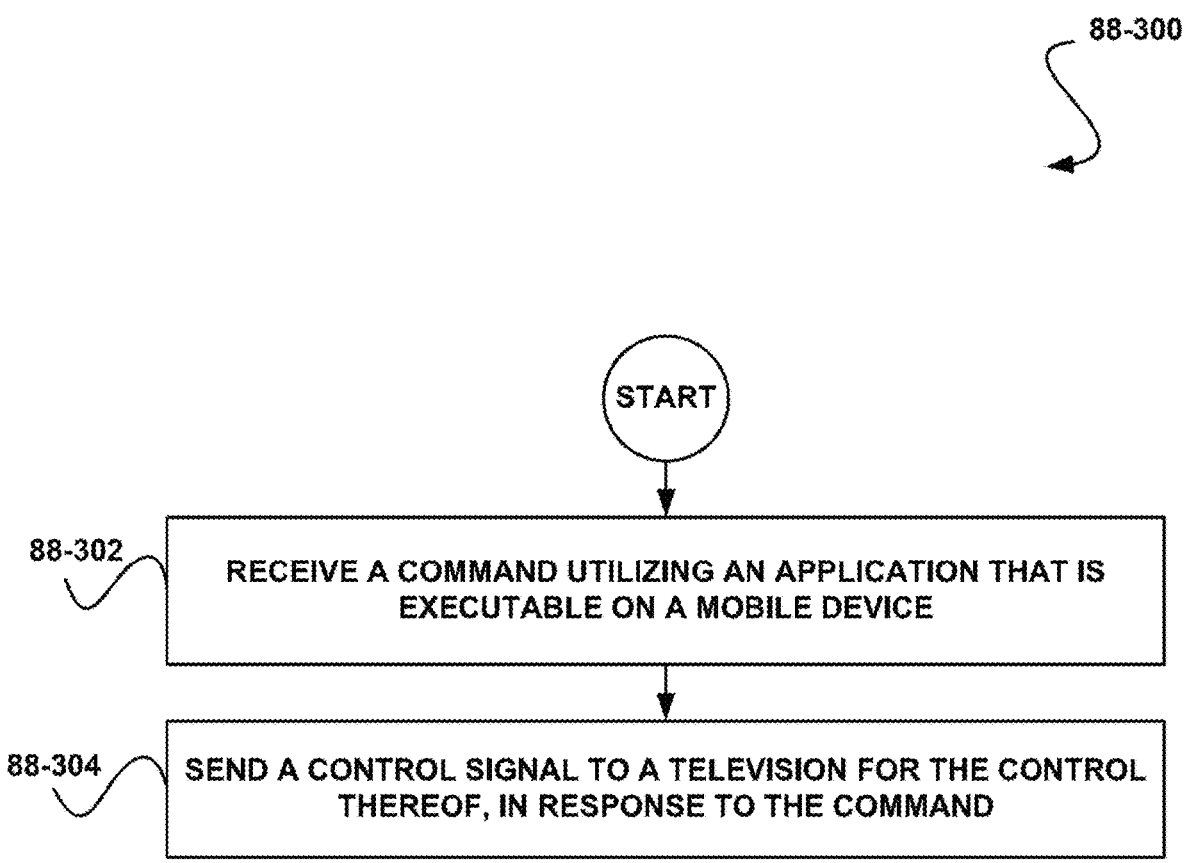
Figures 4, 88:
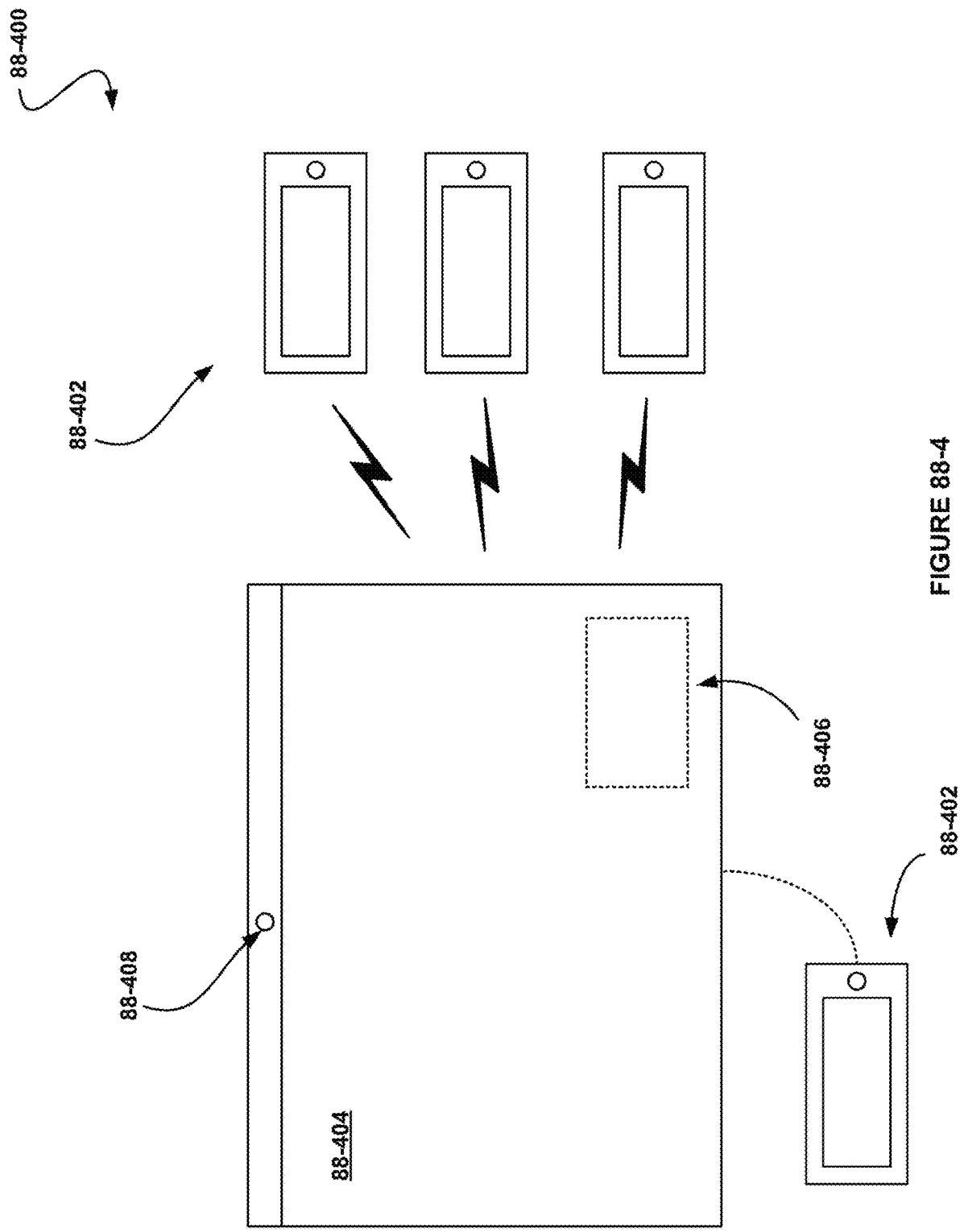
Figures 5, 88:
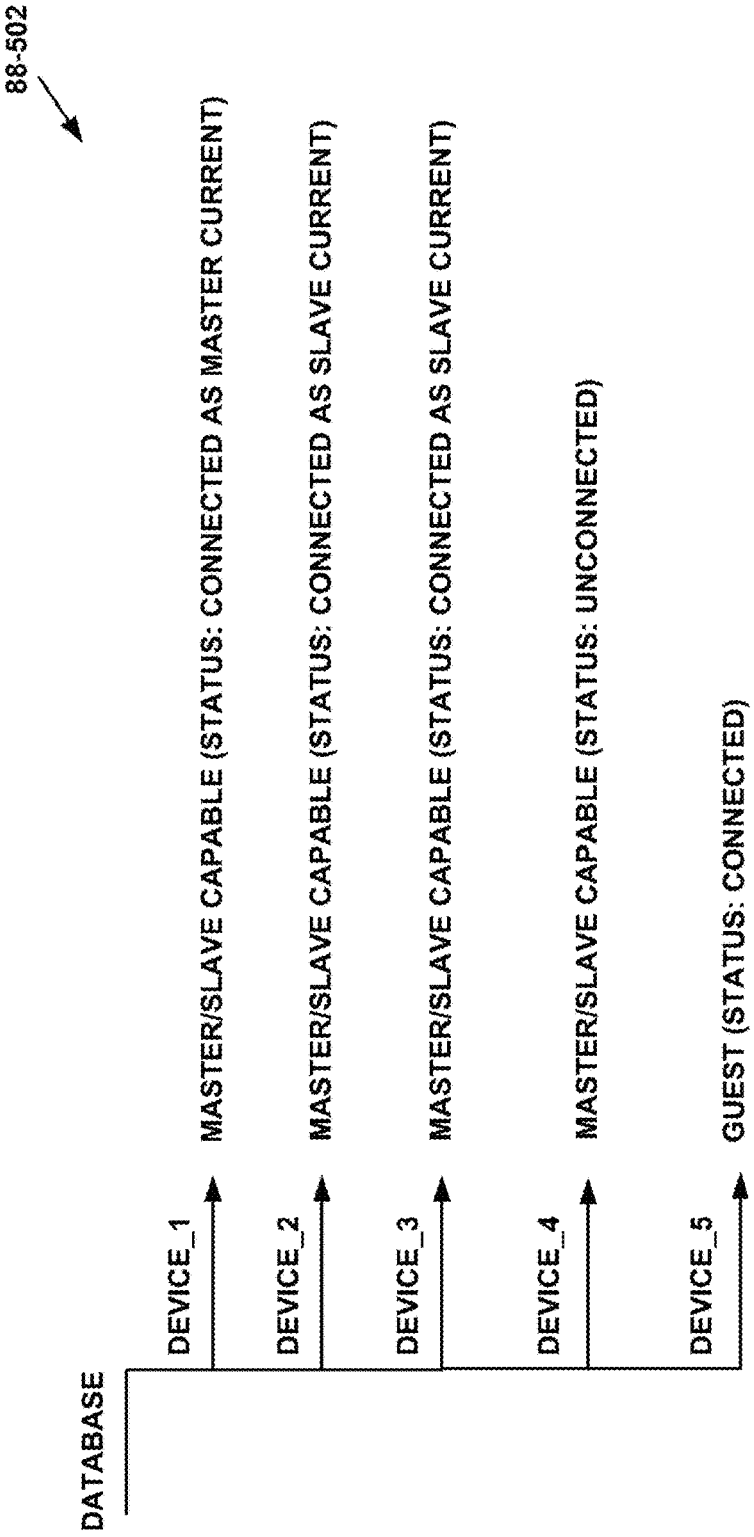
Figures 6, 88:
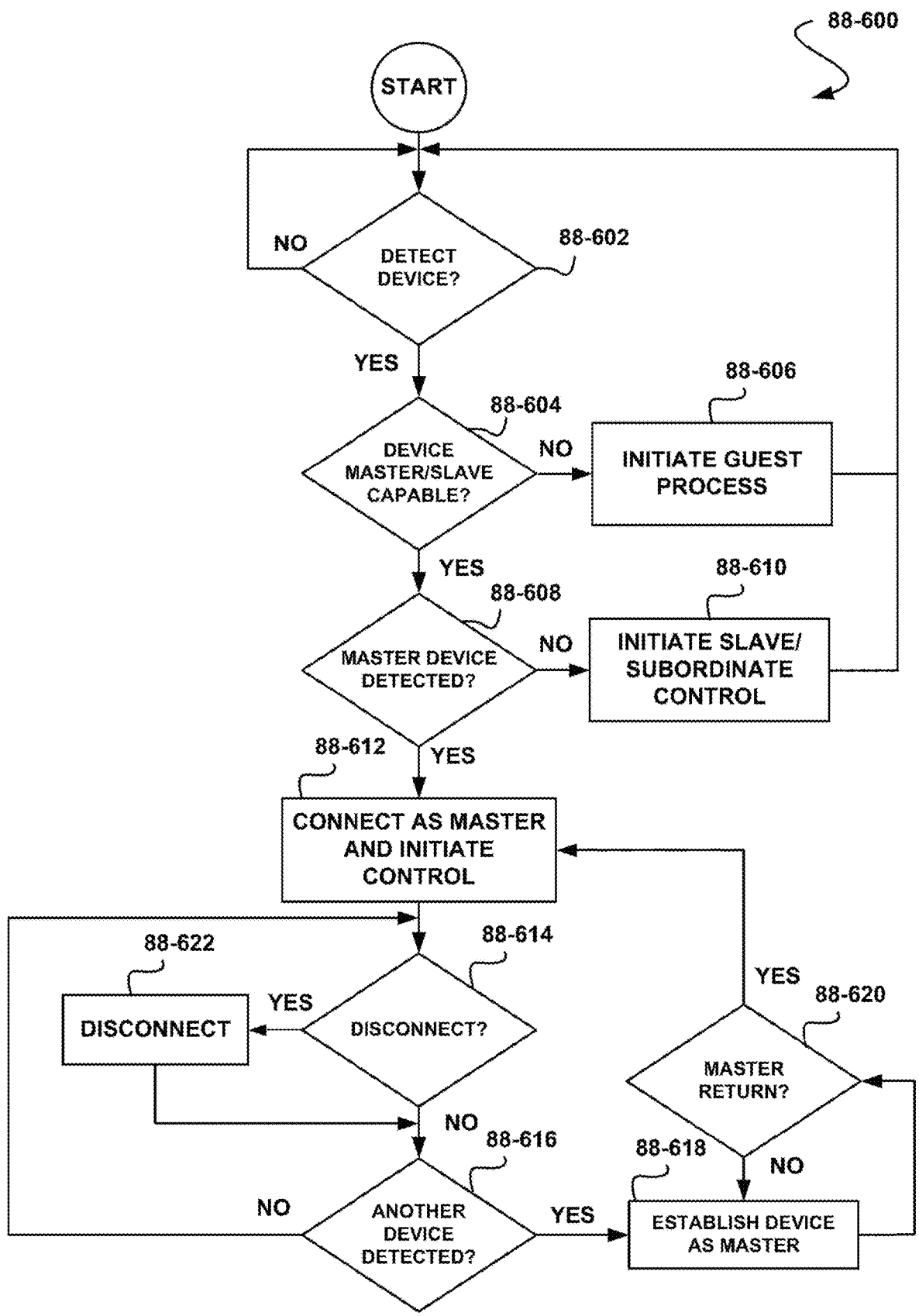
Figures 7, 88:
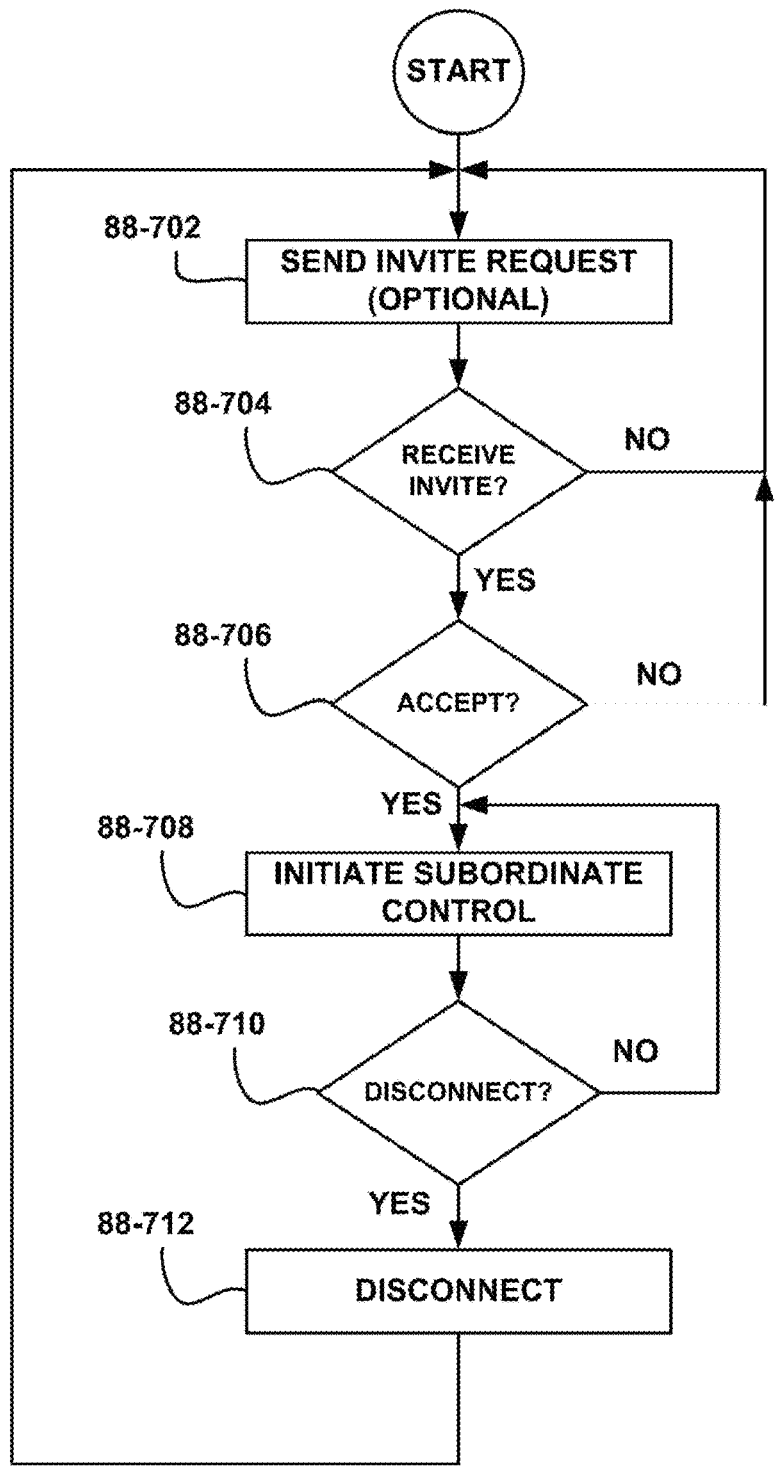
Figures 8, 88:
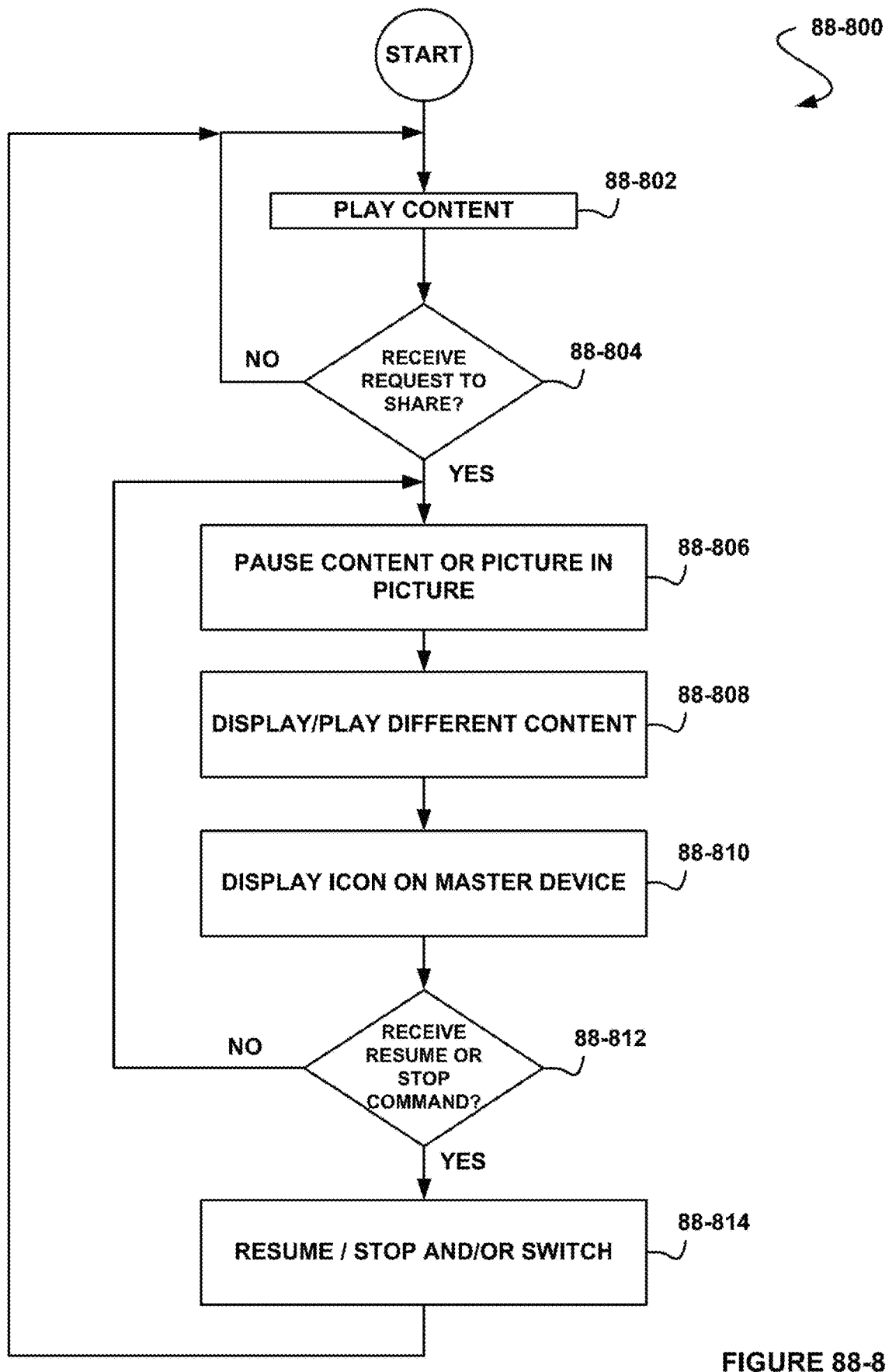
Figures 9, 88:
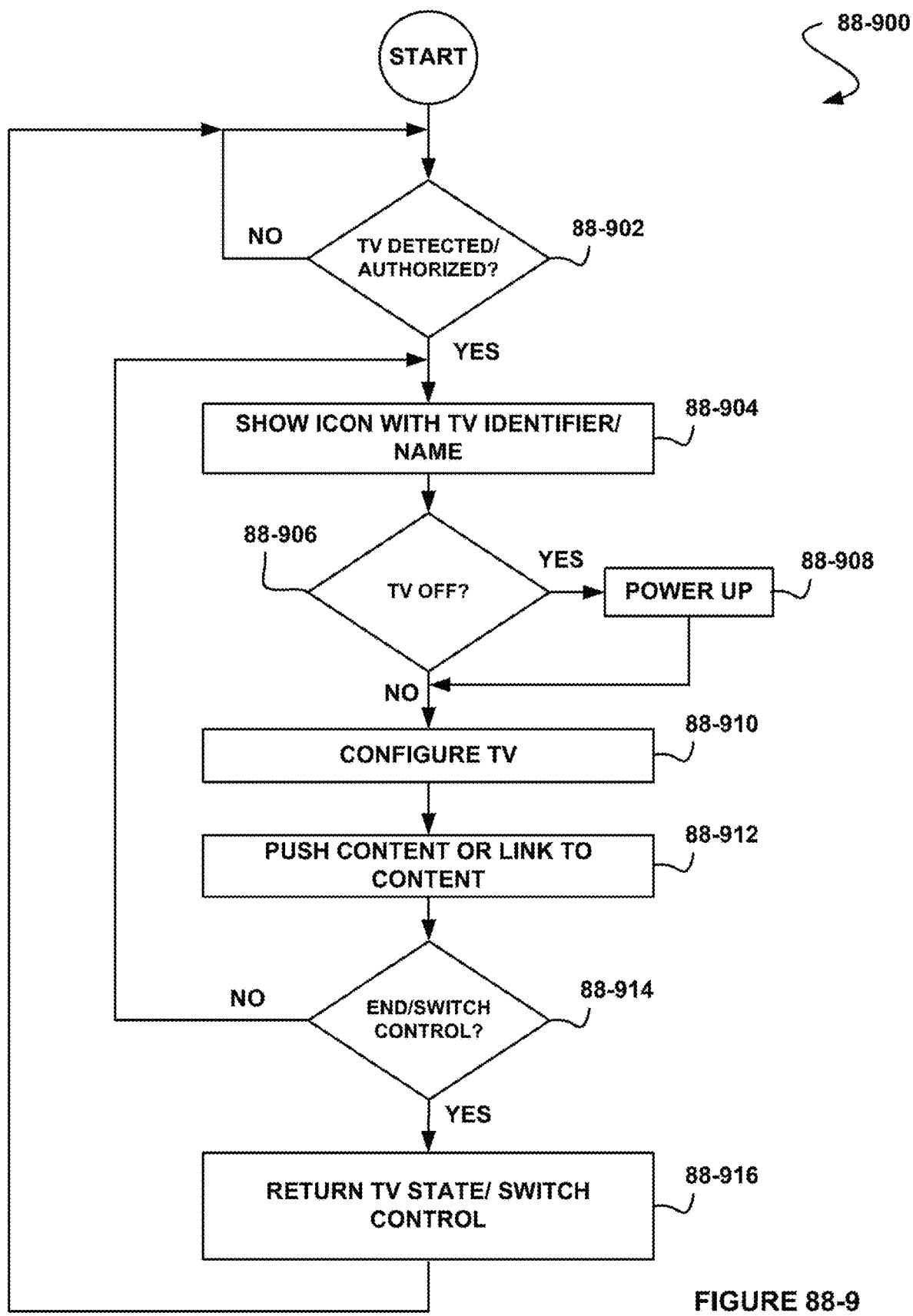
Figures 10, 88:
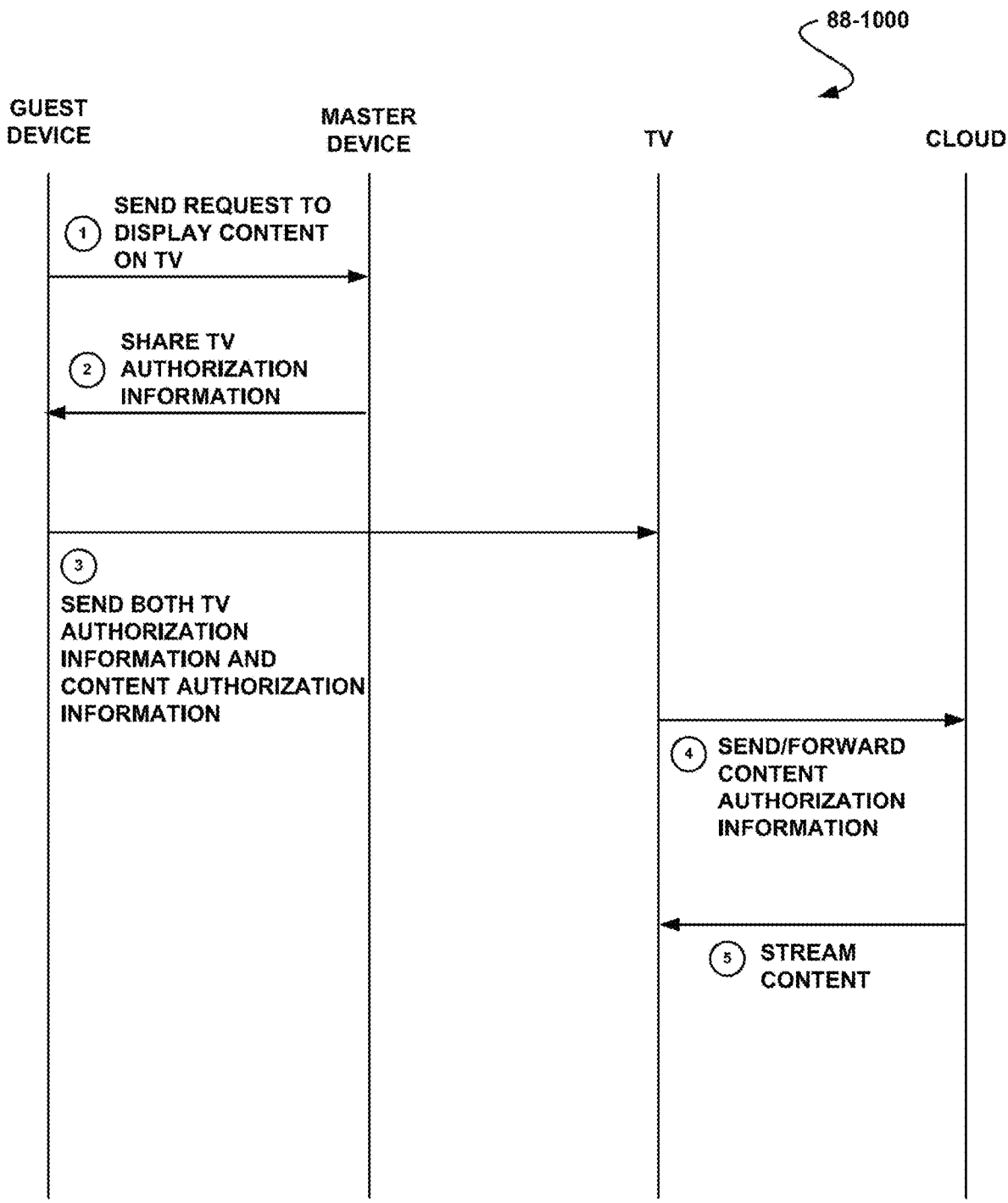
Figures 11, 88:
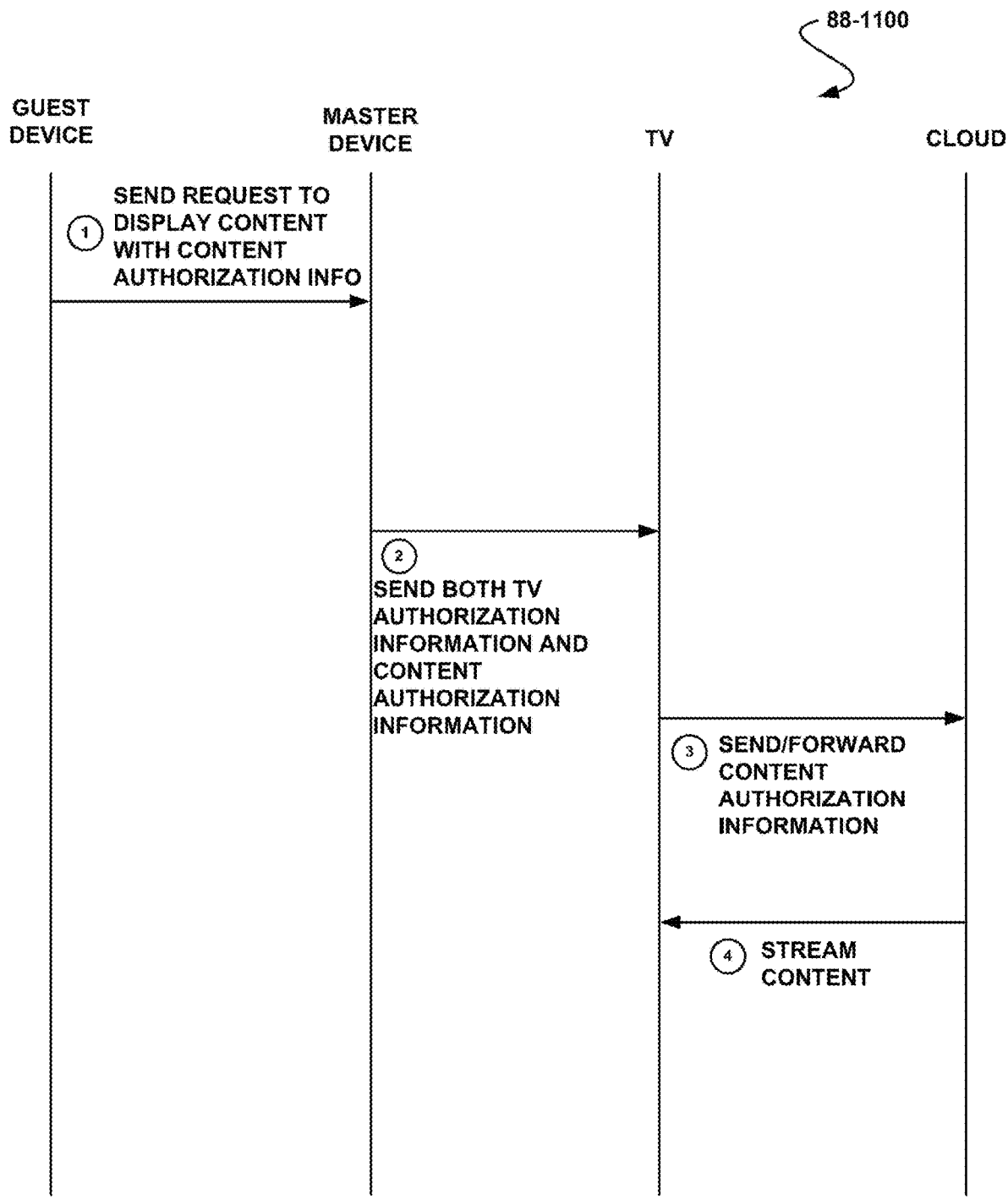

FIG. 88-1 illustrates a network architecture 88-100, in accordance with one embodiment. As shown, a plurality of networks 88-102 is provided. In the context of the present network architecture 88-100, the networks 88-102 may each take any form including, but not limited to a local area network (LAN), a wireless network, a wide area network (WAN) such as the Internet, peer-to-peer network, etc.

Coupled to the networks 88-102 are servers 88-104 which are capable of communicating over the networks 88-102. Also coupled to the networks 88-102 and the servers 88-104 is a plurality of clients 88-106. Such servers 88-104 and/or clients 88-106 may each include a desktop computer, lap-top computer, hand-held computer, mobile phone, personal digital assistant (PDA), television(s), remote control(s), peripheral (e.g. printer, etc.), any component of a computer, and/or any other type of logic. In order to facilitate communication among the networks 88-102, at least one gateway 88-108 is optionally coupled therebetween.

FIG. 88-2 shows a representative hardware environment that may be associated with the servers 88-104 and/or clients 88-106 of FIG. 88-1, in accordance with one embodiment. Such figure illustrates a typical hardware configuration of a workstation in accordance with one embodiment having a central processing unit 88-210, such as a microprocessor, and a number of other units interconnected via a system bus 88-212.

The workstation shown in FIG. 88-2 includes a Random Access Memory (RAM) 88-214, Read Only Memory (ROM) 88-216, an I/O adapter 88-218 for connecting peripheral devices such as disk storage units 88-220 to the bus 88-212, a user interface adapter 88-222 for connecting a keyboard 88-224, a mouse 88-226, a speaker 88-228, a microphone 88-232, and/or other user interface devices such as a touch screen (not shown) to the bus 212, communication adapter 88-234 for connecting the workstation to a communication network 88-235 (e.g., a data processing network) and a display adapter 88-236 for connecting the bus 88-212 to a display device 88-238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

FIG. 88-3 shows a method 88-300 for sending a control signal to a television utilizing a mobile device, in accordance with one embodiment. As an option, the method 88-300 may be implemented in the context of the architecture and environment of the previous Figures and/or any subsequent Figure(s). Of course, however, the method 300 may be carried out in any desired environment.

In operation, a command is received utilizing an application that is executable on a mobile device. See operation 88-302. The mobile device may include any type of mobile device. For example, in various embodiments, the mobile device may include a handheld computer, a tablet device (e.g. a tablet computer, etc.), an e-reader device, a mobile phone, a PDA, a mobile media player, and/or any other type of mobile device.

Furthermore, in response to the command, a control signal is sent to a television for control thereof. See operation 88-304. The control signal may include any signal capable of causing the control of at least one aspect of the television.

For example, in various embodiments, the control signal may include a volume control signal, a channel control signal, a power control signal, a menu display signal, a settings display signal, an electronic programming guide display signal, a select signal, a picture in picture display signal, an input selection signal, a configuration signal, a signal associated with content display, and/or any other type of control signal.

The application that is executable on the mobile device may include any type of application capable of facilitating the sending of a control signal to the television. In one embodiment, the application may be executed on the mobile device by selecting an icon or image associated with the application that is displayed on the mobile device.

Further, in one embodiment, the control signal may include a command that is received in response to user selection of an icon on a graphical user interface that allows presentation, utilizing the television, of content accessible utilizing the graphical user interface. In another embodiment, the command may be received utilizing a graphical user interface that is capable of displaying an electronic programming guide, a social network feature, and/or a picture-in-picture feature in connection with content capable of being displayed utilizing the television.

In another embodiment, the application may be executed automatically based on a proximity of the mobile device to a television. For example, in one embodiment, the mobile device may have previously been paired to the television utilizing a Bluetooth communication protocol. In one embodiment, when the mobile device is subsequently a distance away from the television where an automatic pairing may occur, the application may automatically execute on the mobile device upon automatic pairing of the mobile device.

Further, in one embodiment, the mobile device may communicate the control signal utilizing a Bluetooth protocol. For example, in one embodiment, the mobile device may be paired with the television such that least one or more control signals may be communicated utilizing a Bluetooth protocol. In this case, in one embodiment, both the mobile device and the television may include Bluetooth capability.

In another embodiment, the mobile device may communicate with the television utilizing an infra-red (IR) signal. In this case, the mobile device may include IR signal generation capability and the television may include one or more IR signal detectors. In another embodiment, mobile device may communicate the control signal utilizing Wi-Fi. For example, in one embodiment, the mobile device and the television may communicate directly utilizing Wi-Fi signals.

In another embodiment, the mobile device and the television may communicate over a network utilizing Wi-Fi. In another embodiment, the mobile device may include Wi-Fi capability and the television may include a network interface for a hardwire connection to a network such that the television and the mobile device may communicate. Accordingly, in one embodiment, the mobile device and the television may communicate over one or more networks. In another embodiment, the mobile device and the television may communicate utilizing a hardwired connection (e.g. a USB connection, etc.).

Further, in one embodiment, the control signal may be capable of being communicated from a plurality of different mobile devices with the application installed thereon. In various embodiments, the communication may be facilitated over a network, utilizing a Bluetooth protocol, Wi-Fi communication, IR communication, a wired communication (e.g. USB, HDMI, etc.), and/or various other techniques.

In one embodiment, the different mobile devices may be capable of including a single device operating as a master device that is registered to cooperate with the television. Additionally, in one embodiment, the different mobile devices may be capable of including at least one slave device that is registered to cooperate with the television. Still yet, in one embodiment, the different mobile devices may be capable of including at least one guest device that receives authority to cooperate with the television utilizing at least one registered device.

Furthermore, in one embodiment, each of the different mobile devices may be capable of displaying first content that is different from second content displayed utilizing the television. In one embodiment, the first content may be displayed utilizing the television, in response to the control signal. Additionally, in one embodiment, the first content may be displayed utilizing a picture-in-picture interface associated with the television, in response to the control signal.

For example, in one embodiment, each of the mobile devices may be capable of displaying content selective by an associated user. In one embodiment, depending on various control settings, users of the devices may have the ability to display content being displayed on an associated device on the television. In one embodiment, the users may have the ability to display a first content associated with a first device on a main picture portion of the television and a second content associated with a second device on a secondary picture portion of the television (e.g. utilizing picture-in-picture technology associated with the television, etc.). Additionally, in one embodiment, the users may have the ability to switch the content displayed on the television to content associated with any of the plurality of devices.

Further, in one embodiment, the different mobile devices may be capable of displaying different electronic programming guides, utilizing the application installed thereon, for use in sending the control signal. For example, in one embodiment, users of the mobile devices may display an electronic programming guide on each device, such that each user may be capable of viewing/selecting programs and/or program information on the respective mobile devices. In one embodiment, the electronic programming guide for one or more devices may be displayed utilizing the television. For example, in one embodiment, content and/or a display associated with a mobile device may be shared with the television, such that content (or a screen) being displayed on the mobile device is displayed on the television screen.

In one embodiment, the control signal may have content associated therewith that is sent from the mobile device to the television for presentation. For example, in one embodiment, the control signal may include a signal to display content associated with the mobile device on the television. In various embodiments, the content may include a movie, streaming video, images, mobile device screen content, and/or various other content. In one embodiment, the content may include audio content.

In another embodiment, the control signal may have content information associated therewith that is sent from the mobile device to the television for use, by the television, in retrieving content over a network. For example, in one embodiment, the mobile device may send content information associated with a movie to the television such that the television may utilize the content information to access the movie over the network, such that the movie may be displayed on the television. Of course, the content information may be associated with any type of content. For example, in various embodiments, the content information may include information associated with a website, music, digital video, an online cable network, streaming or streamable content, a movie library, a music library, and/or any other content type.

Additionally, in one embodiment, a session of content presentation utilizing the television may be capable of being continued utilizing the mobile device and/or the television. For example, in one embodiment, a user may begin to view content (e.g. a movie, etc.) on a mobile device. In one embodiment, upon selection of an icon associated with the application, the content session may be displayed on the television.

In one embodiment, state information associated with the mobile device session may be sent to (or shared with) the television. In various embodiments, the state information may include a viewing state, a viewing time, an amount viewed, an amount remaining, and/or various other state information capable of being utilized to determine the state of the viewing session on the mobile device. In one embodiment, the user may be offered the option to continue the session in a current state on the television. In another embodiment, the user may be offered the option to restart the session on the television.

In another embodiment, a content session associated with content being displayed on the television may be resumed on the mobile device. In one embodiment, the session may be resumed upon selection of an icon associated with the application. In one embodiment, state information associated with the television content session may be sent to (or shared with) the mobile device.

In various embodiments, the state information may include a viewing state, a viewing time, an amount viewed, an amount remaining, and/or various other state information capable of being utilized to determine the state of the viewing session on the television. In one embodiment, the user may be offered the option to continue the session in a current state on the mobile device. In another embodiment, the user may be offered the option to restart the session on the mobile device. In another embodiment, the user may be offered the option to save information associated with the session.

More illustrative information will now be set forth regarding various optional architectures and features with which the foregoing techniques discussed in the context of any of the present or previous figure(s) may or may not be implemented, per the desires of the user. For instance, various optional examples and/or options associated with the command of operation 88-302, the controlling of operation 88-304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 88-4 shows a system 88-400 for sending a control signal to a television utilizing a mobile device, in accordance with another embodiment. As an option, the system 400 may be implemented in the context of the architecture and environment of the previous Figures and/or any subsequent Figure(s). Of course, however, the system 88-400 may be implemented in any desired environment. It should also be noted that the aforementioned definitions may apply during the present description.

As shown, one or more mobile devices 88-402 may be capable of communicating with one or more televisions 88-404. In various embodiments, the mobile devices 88-402 may include a handheld computer, a tablet device (e.g. a tablet computer, etc.), an e-reader device, a mobile phone, a PDA, a mobile media player, and/or any other type of mobile device. The television 88-404 may include any type of television. In one embodiment, the television 88-404 may include an Internet-enabled television.

Additionally, in one embodiment, the television 88-404 may include a network interface card. In another embodiment, the television 88-404 may include Wi-Fi capability. In another embodiment, the television 88-404 may include Bluetooth capability.

In operation, the mobile devices 88-402 may be capable of communicating with the television 88-404 utilizing a Bluetooth connection, a Wi-Fi connection, an IR signal, and/or any other communication protocol. Additionally, in one embodiment, the mobile devices 88-402 may be capable of communicating with the television 88-404 over one or more networks. In various embodiments, the networks may include a wireless network, a wired network, the Internet, a local network, a cellular network, and/or various other network types. Further, in one embodiment, the mobile devices 88-402 may be capable of communicating with the television 88-404 utilizing a direct connection.

In another embodiment, the mobile devices 88-402 may be capable of communicating with the television 88-404 utilizing an indirect connection. For example, in one embodiment, an internal or external receiver module may be in communication with the television 88-404. In one embodiment, the internal or external receiver may be capable of receiving signals from the mobile devices 88-402 and relaying the signal to the television 88-404. In one embodiment, the signal may be transformed into a different format than the original signal format. In various embodiments, the internal or external receiver module may be Bluetooth capable, Wi-Fi capable, IR signal capable, and/or may include any other communication protocol capability.

Furthermore, in one embodiment, one or more of the mobile devices 88-402 may be capable of being connected via one or more cables to the television 88-404. The cable may include any type of cable, including a USB cable, an SDI cable, an HDMI cable, an Ethernet cable, a firewire cable, and/or various other types of cables.

In operation, one or more of the mobile devices 88-402 may send one or more commands to the television 88-404. In one embodiment, an application capable of executing on the mobile devices 88-402 may operate to cause the mobile device 88-402 to send the command to the television. For example, in one embodiment, an icon or image associated with the application may be displayed on a mobile phone. In one embodiment, the user may have the ability to select the icon in order to execute the application.

In one embodiment, once the application is executed on the mobile device 88-402 a user interface may be displayed that may be utilized to control and/or send commands to the television 88-404. In various embodiments, the commands may include volume commands, channel up/down commands, channel number entry commands, a power command, channel selection commands, television setting commands, menu commands, programming guide commands, and/or various other commands.

Furthermore, in one embodiment, the mobile device 88-402 may be capable of displaying an electronic programming guide to a user. In one embodiment, the electronic programming guide displayed on the mobile device 88-402 may be utilized by the user to select programs to display on the television 88-404. For example, in one embodiment, the user may select a television program utilizing the electronic programming guide and the mobile device 88-402 may send a command associated with the selection to the television such that the television may play the selected program.

In one embodiment, the application associated with the mobile device 88-402 may be operable to display multiple graphical user interface screens, which the user may user to control and/or command the television 88-404. For example, in various embodiments, the graphical user interface screens may include a screen for sending standard commands to the television 88-404 (e.g. volume, channels, etc.), selecting content to be displayed utilizing the television 88-404, searching for content, communicating with other mobile devices, other interface screens, and/or any combination thereof.

In one embodiment, a user may utilize the mobile device 88-402 to access and/or select content to be displayed utilizing the television 88-404. For example, in one embodiment, the user may access a site that offers digital media items (e.g. movies, programs, games, music, etc.) for sale or rent. The user may select one or more of the digital media items for sale or rent utilizing the mobile device 88-402.

In one embodiment, upon selection of the digital media item, the digital media item may be downloaded to the mobile device 88-402. In another embodiment, upon selection of the digital media item, the digital media item may be transferred to a network cloud associated with the user of the mobile device 88-402. In another embodiment, upon selection of the digital media item, the digital media item may begin streaming to the mobile device 88-402.

Further, in one embodiment, the user may have the ability to select the digital media item utilizing the mobile device 88-402 and view/play the digital media item on the television 88-404. For example, in one embodiment, the mobile device 88-402 may transit information associated with the selection to the television 88-404, such that the television 88-404 may access the selected item for playing (e.g. for full download, streaming, etc.).

In various embodiments, the information may include a name or code associated with the selected media item, a location of the selected media item, authorization information associated with the user and/or the selected media item, content type information associated with the selected media item, instructions, a current state associated with the selected media item, purchase information associated with the selected media item, rental information associated with the selected media item, and/or any other information. In one embodiment, the television 88-404 may utilize the information to retrieve or access the selected media item.

In another embodiment, the mobile device 88-402 may transfer the selected media item to the television 88-404. For example, in one embodiment, the mobile device 88-402 may transfer the content associated with the media item over a cable or wireless connection (e.g. Bluetooth, Wi-Fi, etc.). Furthermore, in one embodiment, the television 88-404 may receive the selected media information from the mobile device 88-402 (or over a network, etc.) and may access the selected media item in a cloud network portion associated with the user. For example, in one embodiment, the user may select a digital media item utilizing the mobile device 88-402, the selected media item may be stored in a cloud network portion allocated to the user, and the television 88-404 may access the stored item in the cloud upon receiving a command/instruction/signal from the mobile device 88-402.

In another embodiment, the user may access a digital media system utilizing the mobile device 88-402. In one embodiment, the digital media system may include one or more servers and/or databases. Further, in one embodiment, the digital media system may include a plurality of digital media items such as movies, television programs/series, music, games, and/or other digital media.

In one embodiment, the digital media system may include a subscription based system. For example, in one embodiment, a user may be capable of paying a fee to access the digital media stored by the digital media system (e.g. a monthly fee, a yearly fee, a per use fee, etc.). Additionally, in one embodiment, a user may be capable of purchasing digital media stored by the digital media system.

In one embodiment, the user may utilize an interface on the mobile device 88-402 to select the digital media item on the mobile device 88-402. In another embodiment, user may utilize the interface on the mobile device 88-402 to select the digital media item on the television 88-404. For example, in one embodiment, an interface associated with the selection of digital media items may be displayed on the television 88-404 and the mobile device 88-402 may be utilized to control the selection of the digital media items by sending control signals to the television 88-404.

Furthermore, in one embodiment, the display of the mobile device 88-402 may be replicated on the television. In other words, in one embodiment, an interface being displayed on the mobile device 88-400 (e.g. an application interface, an operating system interface, etc.) may be replicated and may be displayed on the television 88-404. In one embodiment, the replication may be displayed on the entire display of the television 88-404. In another embodiment, the replication may be displayed on a portion of the television 88-404. For example, in one embodiment, the replication may be displayed on a picture-in-picture portion 88-406 of the television display.

In one embodiment, actions performed on a mobile device 88-402 may be shown on the television 88-404. For example, in one embodiment, the mobile device 88-402 may include a touch screen. In one embodiment, the actions of a user on the touch screen of the mobile device 88-402 may be shown on the television 88-404.

For example, in various embodiments, the actions may include item selection, pointer movement, finger placement, typing, browsing, and/or any other user action capable of being performed on the user device 88-402. In other words, in one embodiment, the television 88-404 may display the same material as a display of the user device 88-402. In one embodiment, the replication of the display associated with the user device 88-402 may be initiated by selecting an icon displayed on the user device 88-402.

For example, in one embodiment, a TV icon may be displayed on the user device 88-402. In one embodiment, upon selection of the icon, the display of the user device 88-402 may be replicated on the display of the television 88-404. In another embodiment, the user may have the option to replicate the display of the user device 88-402 on the entire screen of the television 88-404 or a portion of the screen of the television 404 (e.g. a picture-in-picture portion, etc.).

In one embodiment, each user of the mobile device 88-402 may implement a customized viewing session on the television 88-404. For example, in one embodiment, a personalized session associated with the user of the mobile device 88-402 may be displayed utilizing the television 88-404. In various embodiments, the personalized session may include personalized content, viewing preferences, configuration preferences, display preferences, programmed preferences, and/or any other personalized item.

Furthermore, in one embodiment, digital media suggestions may be presented based on user preferences. Additionally, in one embodiment, advertisements may be presented based on user preferences. By utilizing the mobile device 88-402 associated with a user to control and/or provide content to the television 88-404, information associated with the user to may be utilized to recommend digital media and/or provide advertisements to the user on a television 88-404. Furthermore, in one embodiment, social network information associated with a user may be utilized to provide recommendations to the user.

More information about providing recommendations may be found in U.S. provisional patent application titled "SYSTEM, METHOD, AND COMPUTER PROGRAM PRODUCT FOR ALTERING AT LEAST ONE ASPECT OF AN INTEGRATED E-COMMERCE ON-LINE APPLICATION," filed Jan. 27, 2012, which is incorporated herein by reference in its entirety.

In one embodiment, information associated with multiple users of the devices 88-402 may be utilized to generate recommendations. For example, in one embodiment, information about a viewing group may be gleaned from information stored on the mobile devices 88-402 such that digital media recommendations may be presented to the group of users on the television 88-404.

Further, in one embodiment, the mobile devices 88-402 may operate such that a first one of the mobile devices 88-402 is a master controller and any other device that is present is a slave or a guest device, while the first mobile device is serving as a master device. For example, in one embodiment, a mobile device associated with a user that owns the television may be configured to operate as a master controller by default. In one embodiment, the mobile device associated with the user who owns the television may be configured to operate as a master controller when the mobile device is in communication with the television (e.g. when the device is paired with the television, when a signal of the device is detected by the television, etc.).

In one embodiment, a mobile device may be established as a master controller, slave controller (or subordinate controller), and/or guest controller upon an initial information exchange between the mobile device and the television. For example, in one embodiment, a pairing process may be initiated (e.g. upon initial execution of a TV controller application, etc.) between the mobile device and the television when the television and mobile device are within a predefined range (e.g. a range capable of communicating via Bluetooth technology, etc.). In one embodiment, upon successful pairing of the mobile device with the television, the mobile device may be selected to be a master controller, slave controller (or subordinate controller), and/or guest controller.

In various embodiments, the establishment of the device as a master controller, slave controller (or subordinate controller), and/or guest controller, may require authentication information. For example, in one embodiment, in order to establish a mobile device as a master controller a user may be required to provide a code, username, password, device ID, and/or various other authentication information. Additionally, in one embodiment, in order to establish a mobile device as a master controller a user may be required to provide a code or product ID associated with the television.

Similarly, in various embodiments, in order to register a mobile device as a slave controller (or subordinate controller) and/or a guest controller, a code, username, password, device ID, and/or various other authentication information. In one embodiment, a slave controller or subordinate controller may include any mobile device that is subordinate to a master controller and is not a guest controller. In another embodiment, a slave controller or subordinate controller may include any controller authorized to send commands to the television when the master controller is not sending commands or data.

For example, in one embodiment, the master mobile device may be streaming media to the television, or alternatively, may be in control of the television such that the television is displaying content as commanded by the master device. In one embodiment, the user of the master mobile device may select to pause the display of the content utilizing the master mobile device. Alternatively, in one embodiment, the user of the master mobile device may leave a room where the television is located and/or pause/terminate a connection between the master mobile device and the television. In one embodiment, upon acknowledgement and/or proper authentication of the handoff, the slave mobile device may take on primary responsibility of control and/or content display streaming or command. Similarly, in one embodiment, the slave device may handoff the control to another slave device or a guest device.

In various embodiments, the handoff of control between mobile devices may occur upon an explicit handoff (e.g. a user selects to hand-off control utilizing a user interface, etc.), a communication interruption of the controlling device, a pause in a media stream provided by the mobile device, a predefined distance from the television has been passed, a battery threshold power of the controlling device has been passed, a detection of the controlling user/device leaving the room (e.g. based on television camera information, location information associated with the phone, etc.), a signal strength threshold being passed, and/or various other criteria.

In one embodiment, a user of a master device may invite another device to connect to the television as a guest. In one embodiment, the invite may be in the form of a text message.

In another embodiment, the invite may be in the form of an e-mail. In another embodiment, the invite may be in the form of a pop-up.

In one embodiment, the invite may include a link to the application for download. In another embodiment, the invite may only be sent to a mobile device that includes the application. In another embodiment, the invite may include a password to facilitate the communication with the television. In another embodiment, an invite notification may also be sent to the television such that the television knows that there is an outstanding invite. In one embodiment, the invite notification may be sent to the television simultaneously to the invitation sent to the potential guest device.

Upon receiving the invite, in one embodiment, the user of the receiving mobile device may be offered the option to accept the invite and communicate with the television. In one embodiment, the user of the guest device may be required to enter a password to communicate with the television. In another embodiment, accepting the invitation may be adequate authentication such that the guest device may communicate with the television.

In another embodiment, handoff of control may be implemented by passing virtual control credentials between devices. For example, in one embodiment, the master controller device may include control credentials (e.g. a token, a key, etc.) for controlling the television. In one embodiment, a user of the master device may have the ability to "bump" or touch another device to pass the control credentials to that device, such that the touched device may control the television. In another embodiment, the control credentials may be passed between devices when the devices are within a predetermined distance from one another. In various embodiments, the passing of the credentials may be implemented utilizing a near field connection, a Bluetooth connection, and/or various other protocols.

In this way, in one embodiment, multiple users in a room may share content over the television and/or control the television. For example, each mobile device may be configured for a respective user. Furthermore, each user may have access to his/her own media/content, such as subscription based media/content, pictures, on-demand services, digital media streams (e.g. CNN online stream, HBO online stream, etc.), etc.

Accordingly, in one embodiment, the mobile device may be utilized as a content module from which the television may access/play content associated with the user/device. Thus, in one embodiment, the mobile device may be utilized to personalize or share any television viewing experience, where the television is capable of receiving information from the mobile device (e.g. such as an internet enabled television, etc.). Further, in one embodiment, multiple users with mobile devices may share their respective personalized content, etc., by handing off control to the difference mobile devices.

In one embodiment, personalized programming guides associated with users of the user devices 88-402 may be displayed utilizing the television 88-404. For example, in one embodiment, a personalized electronic programming guide may be automatically generated for a user based on information associated with the user. In various embodiments, the information associated with the user may include user likes/dislikes, previously viewed media items, previously purchased media items, previously rented media items, browsing history, social network information, media rating information, preferred genre information, preferred content length (e.g. time, etc.), user personal information (e.g. gender, etc.), user subscription information, user access information, and/or various other information.

In various embodiments, the electronic programming guide may include digital media titles (e.g. movie titles, television program titles, song titles, etc.), links to streaming video, links to online media sources, links to online television networks (e.g. a link to HBO streaming video online, etc.), time of play for displayed content, duration of the content, a rating associated with the content, a genre associated with content, and/or various other information. Furthermore, in one embodiment, the electronic programming guide may provide one or more recommendations to the user, based on user information. In one embodiment, the electronic programming guide may allow a user to select the displayed information (e.g. media titles, etc.) in order to facilitate playing of the selected item.

Additionally, in one embodiment, the electronic program guide may highlight items that are required to be purchased, rented, or that need a subscription to play. In one embodiment, the user may have the ability to filter the displayed items such that only content that does not require additional money to play is presented. In another embodiment, the user may have the ability to filter the displayed items such that only content available for purchase or rent is presented. In various embodiments, the content may be filtered based on genre (e.g. action/adventure, drama, documentary, etc.), duration, cost, availability, rating (e.g. user and/or content rating, etc.), type (e.g. movie, television episode, music, etc.), recommendations, recently viewed, unfinished items, a queue, and/or various other criteria.

In one embodiment, the television 88-404 may include one or more integrated cameras 88-408. In operation, the camera 88-408 may be utilized to provide feedback to the television 88-404 and/or the mobile devices 88-402. For example, in one embodiment, the camera 88-408 may be utilized to detect a number of users in the room.

In another embodiment, the camera 88-408 may be utilized to detect user characteristics associated with users in a room. For example, in various embodiments, the camera may be utilized to detect gender, age, ethnicity, and/or various other user characteristics. Further, in one embodiment, information gathered from the camera may be used to authenticate control of the television. For example, in one embodiment, the television may include functionality for implementing facial recognition techniques. Accordingly, in one embodiment, when a user of a mobile device attempts to control the television, the camera 88-408 may capture one or more images to determine whether an authorized user of the mobile device is present. If an authorized user is present, the mobile device control of the television may be allowed.

In one embodiment, images of a user may be captured by the camera 88-408 during an initial pairing process or registration process between the television 88-404 and the mobile device 88-402. Accordingly, in one embodiment, the initial registering user may be associated with the device and data may be stored such that facial recognition techniques may be utilized in the future for authenticating the device. In this way, authenticated users may restrict control and content display on the television 88-404. For example, utilizing this technique, if a child were to attempt to control the television utilizing an authenticated parent's mobile device, the camera 88-408 may capture images upon a control attempt, a facial recognition technique may be utilized to analyze the captured image(s), and it may be determined that the child is not an authenticated user of the mobile device. In this case, the control of the television may be prohibited.

In another embodiment, the captured images may be utilized to determine if children are in the room such that adult content is not displayed. In one embodiment, information may be shared between the television and the mobile devices such that the mobile devices are only capable of providing content to the television that is appropriate based on the age of the people viewing the television. In another embodiment, the television may be capable of prohibiting or blocking the display of content that is inappropriate for young people in the room. Of course, in one embodiment, the determination of what is appropriate content may be set and/or determined by a user utilizing a configuration setting interface associated with the television and/or the mobile device.

In one embodiment, the determination of ages of people in a room associated with a television may be determined utilizing signals from user devices in the room. For example, in one embodiment, the television may receive signals from a plurality of devices. Based on the signals associated with each device, an associated user may be determined (and thus the age/permissions of the user, etc.). In one embodiment, the information of a user may be stored when an initial pairing or registration between the mobile device and the television occur. In another embodiment, permissions and or user information may be provided by a user administrator (e.g. the user associated with the master controller, the television owner, etc.). Accordingly, in one embodiment, based on the mobile devices that are present, content display may be restricted.

Further, in one embodiment, the camera 88-408 may capture images that may be used to determine whether one or more users have left the room. For example, in one embodiment, based on the captured images, the television may determine that user has left the room and is no longer viewing the content being displayed. In one embodiment, if it is determined that a user has left the room, the content presentation may be automatically paused by the television.

In another embodiment, if it is determined that the user has left the room, the point in the content stream may be noted or logged and the user may be presented with the option to return to this point automatically upon return to the room. In another embodiment, if it is determined that the user has left the room, and it is determined that the user is the owner of the master controller, control of the television may be automatically handed off to a slave or subordinate device. Of course, in various embodiments, a user may have the ability to configure these types of settings. Furthermore, in various embodiments, users that are still in the room viewing the content may be presented with options (e.g. a pop-up, etc.) to continue viewing, pause the content, switch device control, and/or various other options.

In one embodiment, the television 88-404 may include memory. In various embodiments, the memory may include volatile and/or non-volatile memory. In one embodiment, the television 88-404 may include an SSD drive.

In another embodiment, the television 88-404 may have access to one or more databases. For example, in one embodiment, the television 88-404 may have access to one or more online databases. In one embodiment, the memory associated with the television 88-404 and/or the databases may store information associated with users and/or mobile devices. For example, in one embodiment, the memory associated with the television 88-404 and/or the databases may store one or more data structures capable of indicating control privileges associated with one or more mobile devices.

FIG. 88-5 shows a data structure 88-502 for associating a control level with one or more devices, in accordance with another embodiment. As an option, the data structure 88-502 may be implemented in the context of the architecture and environment of the previous Figures and/or any subsequent Figure(s). Of course, however, the data structure 88-502 may be implemented in any desired environment. It should also be noted that the aforementioned definitions may apply during the present description.

As shown, the data structure 88-502 may include information associated with one or more devices. In one embodiment, the data structure 88-502 may include information associated with mobile devices that are registered with a television. In another embodiment, the data structure 88-502 may include information associated with mobile devices that are paired (or pair-able) with the television. In another embodiment, the data structure 88-502 may include information associated with mobile devices that are capable of communicating with the television.

Furthermore, in one embodiment, the data structure 88-502 may include permission information associated with each registered device. In various embodiments, the permission information may include information associated with the ability of the mobile device to be a master device, a slave device, and/or a guest device. Additionally, the information may include a current status. For example, in one embodiment, the data structure 88-502 may indicate if the device is currently connected and/or whether the device is currently connected as a master, a slave, or a guest.

In one embodiment, the data structure 88-502 may include authorization information. For example, in one embodiment, the data structure 88-502 may include authentication information associated with each device that may be compared to authentication information provided by the user when registering and/or pairing the device.

FIG. 88-6 shows a method 88-600 for connecting with a television for sending a control signal to the television utilizing a mobile device, in accordance with another embodiment. As an option, the method 88-600 may be implemented in the context of the architecture and environment of the previous Figures and/or any subsequent Figure(s). Of course, however, the method 88-600 may be carried out in any desired environment. It should also be noted that the aforementioned definitions may apply during the present description.

As shown, it is determined whether a mobile device is detected. See decision 88-602. In one embodiment, a television may detect the mobile device. In another embodiment, a connection module configured to facilitate communication between a mobile device and television may detect the mobile device.

The device may be detected utilizing a variety of techniques. For example, in one embodiment, the device may be detected by receiving a signal from the mobile device. In various embodiments, a Bluetooth signal, a Wi-Fi signal, an IR signal, and/or any other type of signal may be detected. In another embodiment, the device may be detected when an attempt to pair with the television occurs.

In one embodiment, once the device is detected, the device may be paired with the television and/or a control module associated with the television. In various embodiments, pairing may be accomplished utilizing different techniques.

For example, in one embodiment, the mobile device and/or the television may require that a user enter a PIN code. In this case, pairing may be successful if the same PIN code is entered on both the mobile device and the television (or both are associated with the same PIN code). In various embodiments, any 16-byte UTF-8 string may be used as a PIN code.

In another embodiment, one or more of the devices (or the television) may have a fixed PIN (e.g. "0000" or "1234", etc.) that are hard-coded or stored in memory of the device. In another embodiment, a numeric value up to 16 digits in length may be utilized. In still another embodiment, full UTF-8 text may be entered as a PIN code.

In another embodiment, Secure Simple Pairing (SSP) may be implemented, utilizing a form of public key cryptography. In various embodiments, the modes of operation may include a just works mode, a numeric comparison mode, a passkey entry mode, an out of band mode, and/or various other techniques.

In another embodiment, once the device is detected, the device may be authenticated. In various embodiments, the authentication may include requiring the user to enter a user name and/or pass code. In another embodiment, the authentication may include an automatic authentication process (e.g. based on a device ID, information provided by the device, etc.)

Further, in one embodiment, once the device has been detected, it may be determined whether the device is master controller capable and/or slave controller capable. See decision 88-604. Determining whether a device is master controller capable and/or slave controller capable may be accomplished in a variety of ways.

For example, in one embodiment, identification information associated with the device or a user of the device may be sent to television and/or a system associated therewith to determine whether the device has permission to operate as a slave controller and/or a master controller. In another embodiment, upon detection of the device, a user of the device may provide authentication information that may be utilized to determine whether the device and/or user are authorized to operate as a master controller and/or a slave controller.

If it is determined that the device is not master or slave controller capable (e.g. based on authentication, permissions, etc.), the guest process in initiated. See operation 88-606. In one embodiment, the guest process may include determining whether there are any master/slaves controlling mobile devices present. In one embodiment, if there are master/slave devices present, the newly detected device may be registered as a guest and may wait for an opportunity to control the television (e.g. by invite, by the loss of master/slave control, etc.).

In one embodiment, registering the newly detected device as a guest device may require that the newly detected device or user associated therewith provide authentication information (e.g. pass code, username, password, etc.). In another embodiment, registering the newly detected device as a guest device may require the guest device to receive an invitation to register as a guest device. For example, in one embodiment, when the new device is detected, the television may send an invitation to the device to register as a guest. In another embodiment, a master and/or slave device (or user associated therewith) may send the invitation.

If it is determined that a master or slave device is detected, it is determined whether the device is a master device. See operation 88-608. If the device is not determined to be a master device, a slave and/or subordinate control process may be initiated. See operation 88-610.

In one embodiment, the slave and/or subordinate control process may include establishing permissions to allow the device to control the television. Additionally, in one embodiment, the slave and/or subordinate control process may include establishing permissions to allow the device to control the television when a master controller is not present.

Further, in one embodiment, the slave process may include determining whether there are any master controlling mobile devices present. In one embodiment, if there are master devices present, the newly detected device may be registered as a slave and may wait for an opportunity to control the television (e.g. by invite, by the loss of master control, etc.). In one embodiment, registering the newly detected device as a slave device may require that the newly detected device or user associated therewith provide authentication information (e.g. pass code, username, password, etc.).

In another embodiment, registering the newly detected device as a slave device may require the slave device to receive an invitation to register as a slave device. For example, in one embodiment, when the new device is detected, the television may send an invitation to the device to register as a slave. In another embodiment, a master device (or user associated therewith) may send the invitation.

If a master device is detected, the master device may be connected to the television and control of the television may be initiated. See operation 88-612. In one embodiment, the device may be recognized as the master device utilizing a device ID associated with the master device. In another embodiment, the device may be recognized as a master device based on information stored by the device and provided to the television (e.g. cookies, passwords, etc.). In another embodiment the device may be recognized as a master device based on information provided by the user of the device (e.g. a user name, password, etc.).

The control of the master device may include any type of control of the television. For example, in various embodiments, the control may include volume control, channel up/down control, channel number entry control, a power command, channel selection control, television setting control, menu control, programming guide control, and/or various other control.

Furthermore, in one embodiment, the control may include controlling the content output from the television. For example, in one embodiment, controlling the output my include providing content information such that the television may access the content for display (e.g. from a cloud, the network, etc.). In another embodiment, controlling the output my include providing the content directly to the television.

As shown further in FIG. 88-6, it is determined whether to disconnect a connected device. See decision 88-614. In one embodiment, it may be determined to disconnect a device when a request to disconnect a device is received. In another embodiment, it may be determined to disconnect a device when a logout request is received.

In another embodiment, it may be determined to disconnect a device based on signal strength of the device. For example, in one embodiment, the signal of the device as received by the television may be drop or drop below a threshold and it may be determined to disconnect the device. In another embodiment, it may be determined to disconnect the device based on the location of the device. For example, in one embodiment, it may be detected what the device has left a room or location in which the television is located and it may be determined to disconnect the device. In one embodiment, GPS functionality associated with the device may be utilized to determine a location of the device.

In another embodiment, it may be determined to disconnect the device when another device is determined to be a master. For example, in one embodiment, the current master device may send an invitation to another device to take over control of the television. In one embodiment, upon acceptance of the invitation, the master device may be disconnected and the other device may be connected to control the television. Of course, in one embodiment, upon acceptance of the invitation the new device may gain control and the master device may be placed into a standby state or slave state but still remain connected to television.

If it is determined to disconnect the device, the device is disconnected. See operation 88-622. Furthermore, it is determined whether another device is detected. See operation 88-616.

If another device is detected, the device is established as the master device. See operation 88-618. In various embodiments, the device may include a newly detected device, a current slave device, and/or a current guest device.

In one embodiment, it may be determined if the original master device has returned. See operation 88-620. If the master device has returned, the master device may be reconnected and control may be re-initiated.

FIG. 88-7 shows a method 88-700 for connecting with a television for sending a control signal to the television utilizing a mobile device, in accordance with another embodiment. As an option, the method 88-700 may be implemented in the context of the architecture and environment of the previous Figures and/or any subsequent Figure(s). Of course, however, the method 88-700 may be carried out in any desired environment. It should also be noted that the aforementioned definitions may apply during the present description.

As shown, in one embodiment, an invite request may be sent to a device. See operation 88-702. For example, in one embodiment, a device that enters a room including the television may send an invite request to the television. In one embodiment, the invite request may include a request that the television and/or a controlling mobile device send the device an invitation to connect with the television. In another embodiment, an invite request may not be sent and/or be required to be sent to the television.

Further, in one embodiment, it may be determined whether the mobile device receives an invite. See decision 88-704. In one embodiment, a user of a master device may invite another device to connect to the television as a guest. In another embodiment, the television may invite another device to connect to the television as a master, slave, subordinate, and/or guest.

In one embodiment, the invite may be in the form of a text message. In another embodiment, the invite may be in the form of an e-mail. In another embodiment, the invite may be in the form of a pop-up. In one embodiment, the invite may include a link to the application for download.

In another embodiment, the invite may only be sent to a mobile device that includes the application. In another embodiment, the invite may include a password to facilitate the communication with the television. In another embodiment, an invite notification may also be sent to the television such that the television knows that there is an outstanding invite. In one embodiment, the invite notification may be sent to the television simultaneously to the inviting sent to the potential guest device.

Upon receiving the invite, in one embodiment, the user of the receiving mobile device may be offered the option to accept the invite and communicate with the television. Accordingly, it is determined whether the invitation is accepted. See decision 88-706.

In one embodiment, authentication information associated with the mobile device and/or the user may be sent along with the indication of acceptance. In various embodiments, the authentication information may include device information, a user name, a password, and/or various other information. In one embodiment, the invitation acceptance may be received by the television. In another embodiment, the invitation acceptance may be received by a master device. In another embodiment, the invitation acceptance may be received by the master device and a notification may be sent to the television.

Once the acceptance has been received, subordinate control for the device is initiated. See operation 88-708. In one embodiment, subordinate control may include permissions for allowing the new device to control the television once the master device hands off control of the television. In another embodiment, subordinate control may include permissions for allowing the new device to control at least some aspects of the television, while the master device still has control. In another embodiment, subordinate control may include permissions for allowing the new device to provide content to the television and/or links to content.

Further, it is determined whether to disconnect the device. See decision 88-710. In one embodiment, it may be determined to disconnect a device when a request to disconnect a device is received. In another embodiment, it may be determined to disconnect a device when a logout request is received.

In another embodiment, it may be determined to disconnect a device based on signal strength of the device. For example, in one embodiment, the signal of the device as received by the television may be dropped or drop below a threshold and it may be determined to disconnect the device. In another embodiment, it may be determined to disconnect the device based on the location of the device. For example, in one embodiment, it may be detected what the device has left a room or location in which the television is located and it may be determined to disconnect the device. In one embodiment, GPS functionality associated with the device may be utilized to determine a location of the device. In another embodiment, a camera associated with the television may be utilized to determine whether the device (or a user associated therewith) has left the room.

If it is determined to disconnect the device, the device is disconnected. See operation 88-712. In one embodiment, information associated with the device may be stored by the television prior to disconnection. In various embodiments, the information may include device information, user information, session information (e.g. media played, duration, etc.), and/or various other information.

FIG. 88-8 shows a method 88-800 for sending a control signal to the television utilizing a mobile device, in accordance with another embodiment. As an option, the method 88-800 may be implemented in the context of the architecture and environment of the previous Figures and/or any subsequent Figure(s). Of course, however, the method 88-800 may be carried out in any desired environment. It should also be noted that the aforementioned definitions may apply during the present description.

As shown, content is played on a television. See operation 88-802. The content may include any content, including movies, television programs, music, games, social media information, and/or any other content.

Further, it is determined whether a request to share content is received. See decision 88-804. In one embodiment, the request may be sent by a master controlling mobile device and may be received by the television or a module associated therewith. In another embodiment, the request may be sent by a slave or guest device and may be received by the television or a module associated therewith.

The request to share content may include a variety of information. For example, in various embodiments, the request may include user information, device information, content information, permission information, and/or various other information. In various embodiments, the content information may include a title, a genre type, a duration, a rating, an image, content data, a link to the content, and/or various other information.

If a request to share content is received, the content currently being played by the television on a main screen and/or on a picture in picture portion of the screen may be paused. See operation 88-806. In one embodiment, the requestor may have the option to determine whether a main screen is to be paused and/or a picture in picture portion is to be paused. For example, in one embodiment, the requesting user may request to share the content on the main screen and, accordingly, the content on the main screen may be paused. In another embodiment, the requesting user may request to share the content on a picture in picture portion of the screen and the content on the picture in picture portion may be paused (e.g. if a picture in picture portion is being displayed).

Additionally, the new different content is played/displayed in at least a portion of the television. See operation 88-808. For example, in one embodiment, the device may begin to provide the content to the television. In another embodiment, the television may access content based on the information provided by the mobile device.

Furthermore, in one embodiment, an icon associated with the content display may be displayed on the master device. See operation 88-810. In one embodiment, the icon may include an icon for switching a display of the content from a picture in picture portion to the main screen of the television. Further, in one embodiment, the icon may include an icon for switching a display of the content from a main screen portion of the television to a picture in picture portion of the screen.

In another embodiment, the icon may include an icon for switching content. In another embodiment, the icon may include an icon for controlling the content display. In another embodiment, the icon may include an icon for displaying the content on the mobile device.

In one embodiment, the icon may include an icon for resuming, stopping, and/or switching the content currently being displayed. Accordingly, it is determined whether a resume or stop command is received. See decision 88-812. In one embodiment, the television may receive the resume or stop command from the master controlling device.

In various embodiments, the command may be sent in response to a pause command, a command to stop content display, a command to switch controlling devices, a command to switch content display, and/or various other commands. If it is determined that a resume, stop, or switch command is received, the content is resumed, stopped, and/or switched. See operation 88-814.

FIG. 88-9 shows a method 900 for sending a control signal to a television utilizing a mobile device, in accordance with another embodiment. As an option, the method 88-900 may be implemented in the context of the architecture and environment of the previous Figures and/or any subsequent Figure(s). Of course, however, the method 88-900 may be carried out in any desired environment. It should also be noted that the aforementioned definitions may apply during the present description.

As shown, it is determined whether a television is detected and/or authorized. See decision 88-902. For example, in one embodiment, a signal associated with the television may be received by the mobile device when the device is within signal range (or within a predefined range, etc.) of the television.

In one embodiment, the mobile device may query one or more detected devices to determine whether any of the devices is an authorized television. In one embodiment, an authorized television may include a television that is capable of communicating with the mobile device. In another embodiment, an authorized television may include a television that the mobile device has previously identified as an authorized device. In another embodiment, an authorized television may include a television that is capable of being authorized (e.g. after appropriate authorization information is provided, etc.).

If a television is detected and/or authorized, at least one icon including a television identifier and/or name is displayed on the mobile device. See operation 88-904. The television identifier may include any type or identifier capable of being used to identify the television. For example, in various embodiments, the identifier may include a model name, a name of a user associated with the television, a name associated with the television (e.g. a user generated name, a television manufacturer name, a model name, etc.), an image associated with the television, an image of a television, and/or any other type of identifier.

Further, it is determined whether the television is off. See operation 88-906. If it is determined that the television is off, the television is powered up. See operation 88-908. In various embodiments, the television may be automatically powered up and/or manually powered up.

If the television is powered, the television is configured. See operation 88-910. In one embodiment, the television may be configured to receive commands from the mobile device.

Additionally, in one embodiment, the television may be configured to display content associated with the mobile device. In another embodiment, the display of the television may be configured to display the current display associated with the mobile device. For example, in one embodiment, a user may select an icon to display a mobile device view on the television display (e.g. on a main display or a picture in picture portion).

Further, in one embodiment, the display of the television may be configured based on a format or layout associated with the mobile device. For example, in one embodiment, a user of the mobile device may have established and/or generated a layout in which content and/or other information is to be displayed. Additionally, in one embodiment, the television may be configured to operate utilizing one or more settings associated with the mobile device and/or a user of the device. For example, in one embodiment, the television may be configured to operate utilizing one or more display settings, volume settings, color settings, and/or various other programmable settings.

Once the television is configured, content may be pushed to the television and/or a link to content may be provided to the television by the mobile device. See operation 88-912. In one embodiment, a seed associated with the content may be communicated from the device to the television. In one embodiment, the seed may be used by the television to access and/or generate the content.

In another embodiment, the content may be streamed by or through the mobile device. In another embodiment, the content may be provided by the mobile device to the television. In another embodiment, content information may be provided to the television such that the content may be accessed by and/or downloaded by the television.

After the content is pushed and/or a link to content is sent to the television, the television may begin to display the content. Further, it may be determined whether to end and/or switch control from the mobile device to another device. See decision 88-914.

For example, in one embodiment, a master device may have control of the television and a subordinate device (e.g. a slave device, a guest device, etc.) may request to control the television. In another embodiment, a user of the master device may determine to hand off control to another device. In another embodiment, the controlling device may lose a connection to the television. In another embodiment, the controlling device may be transferred out of a room associated with the television.

If it is determined to end and/or switch control, the television may be returned to a normal operation state and/or control of the television may be switched. See operation 88-916. For example, in one embodiment, if control of the mobile device ended, the television may be returned to a normal operation state. In another embodiment, if it is determined to switch control of the mobile controlling mobile device, the control of the mobile device may be switched.

FIG. 88-10 shows an exemplary system flow 88-1000 for sending a control signal to a television utilizing a mobile device, in accordance with another embodiment. As an option, the exemplary system flow 88-1000 may be implemented in the context of the architecture and environment of the previous Figures and/or any subsequent Figure(s). Of course, however, the exemplary system flow 88-1000 may be implemented in any desired environment. It should also be noted that the aforementioned definitions may apply during the present description.

As shown, a guest device may send a master device a request to display content on a television (e.g. see Step 1). In one embodiment, the guest device may send the master device an invite request. In this case, in one embodiment, the master device may send an invite in response to the invite request.

In one embodiment, the guest device may send a request for authorization information as part of or in addition to the request to display content. If the master device (or user associated with the master device) determines that the content may be shared, the master device shares television authorization information with the guest device (see Step 2).

In one embodiment, the authorization information may include information for connecting to the television. In another embodiment, the authorization information my include a password or code for logging into the television and/or for allowing the guest device to control the television.

In one embodiment, the authentication information may be sent from the master device to the guest device over a network (e.g. a wireless network, etc.). In another embodiment, the authentication information may be sent from the master device to the guest device via a direct connection (e.g. a Bluetooth connection, a Wi-Fi connection, a cable, etc.). In various embodiments, the authentication information may be sent from the master device to the guest device via a Bluetooth signal, Wi-Fi signal, a text message (e.g. SMS text message, MMS message, etc.), an email, and/or utilizing various other techniques.

Once the guest device receives authorization information, the guest device may send both television authorization information and content authorization information to the television (e.g. see Step 3). In one embodiment, the information may be sent from the guest device to the television over a network (e.g. a wireless network, etc.). In another embodiment, the information may be sent from the guest device to the television via a direct connection (e.g. a Bluetooth connection, a Wi-Fi connection, etc.). In various embodiments, the information may be sent from the guest device to the television via a Bluetooth signal, Wi-Fi signal, etc.

The content authorization information may include any information capable of indicating that the guest device and/or a user is authorized to view, play, and/or download the content. In various embodiments, the authorization information may include a username, password, device ID, subscription information, billing information, a product code/key, and/or any other type of authorization information.

In one embodiment, the television may receive the content authorization information and may send the content authorization information to a network server and/or network cloud (e.g. see Step 4). For example, in one embodiment, the content to be played may be stored on a network server or cloud computing environment. Accordingly, in order to access the content, in one embodiment, the television may send the content authorization information to the server and or a system associated with the cloud computing environment.

Once the content authorization is received and/or verified by the server and/or system associated with the network cloud, in one embodiment, the content may be streamed to the television (e.g. see Step 6). In another embodiment, the content may be made accessible to the television for download.

FIG. 88-11 shows an exemplary system flow 88-1100 for sending a control signal to a television utilizing a mobile device, in accordance with another embodiment. As an option, the exemplary system flow 88-1100 may be implemented in the context of the architecture and environment of the previous Figures and/or any subsequent Figure(s). Of course, however, the exemplary system flow 88-1100 may be implemented in any desired environment. It should also be noted that the aforementioned definitions may apply during the present description.

As shown, a guest device may send a master device a request to display content on a television and content authorization information (e.g. see Step 1). In one embodiment, if the master device (or user associated with the master device) determines that the content may be shared, the master device may send the television authorization information and the content authorization information to the television (see Step 2).

In one embodiment, the authorization information may include information for connecting to the television. In another embodiment, the authorization information my include a password or code for logging into the television and/or for allowing the guest device to control the television.

In one embodiment, the authentication information may be sent from the guest device to the master device over a network (e.g. a wireless network, etc.). In another embodiment, the authentication information may be sent from the guest device to the master device via a direct connection (e.g. a Bluetooth connection, a Wi-Fi connection, etc.). In various embodiments, the authentication information may be sent from the guest device to the master device via a Bluetooth signal, Wi-Fi signal, a text message (e.g. SMS text message, MMS message, etc.), an email, and/or utilizing various other techniques.

In one embodiment, the information may be sent from the master device to the television over a network (e.g. a wireless network, etc.). In another embodiment, the information may be sent from the master device to the television via a direct connection (e.g. a Bluetooth connection, a Wi-Fi connection, etc.). In various embodiments, the information may be sent from the master device to the television via a Bluetooth signal, Wi-Fi signal, etc.

The content authorization information may include any information capable of indicating that the guest device and/or a user is authorized to view, play, and/or download the content. In various embodiments, the authorization information may include a username, password, device ID, subscription information, billing information, a product code/key, and/or any other type of authorization information.

In one embodiment, the television may receive the content authorization information and may send the content authorization information to a network server and/or network cloud (e.g. see Step 3). For example, in one embodiment, the content to be played may be stored on a network server or cloud computing environment. Accordingly, in order to access the content, in one embodiment, the television may send the content authorization information to the server and or a system associated with the cloud computing environment.

Once the content authorization is received and/or verified by the server and/or system associated with the network cloud, in one embodiment, the content may be streamed to the television (e.g. see Step 4). In another embodiment, the content may be made accessible to the television for download.

FIG. 88-12 shows a system 88-1200 for sending a control signal to a television utilizing a mobile device, in accordance with another embodiment. As an option, the system 88-1200 may be implemented in the context of the architecture and environment of the previous Figures and/or any subsequent Figure(s). Of course, however, the system 88-1200 may be implemented in any desired environment. It should also be noted that the aforementioned definitions may apply during the present description.

As shown, a television 88-1202 may be in communication with one or mobile devices, including a master device 88-1204, a slave or subordinate device 88-1206, and a guest device 88-1208. In various embodiments, the mobile devices 88-1204, 88-1206, and 88-1208 may be in communication with the television 88-1202 via a wireless connection (e.g. Bluetooth, Wi-Fi, etc.) and/or wired connection. In one embodiment, the mobile devices 88-1204, 88-1206, and 88-1208 may be in communication with the television 88-1202 via a communication module that is communicatively coupled to the television 88-1202. In various embodiments, the television 88-1202 may be communicatively coupled to the communication module via a wireless and/or wired connection.

In operation, users of the mobile devices may execute an application associated with the mobile devices for controlling the television. In one embodiment, the application may be stored in memory associated with the mobile device. In one embodiment, execution of application may cause the launch of one or more interfaces. In various embodiments, the interfaces may include an interface for controlling the television, an interface associated with an electronic programming guide, an interface for accessing a social media website, an interface for displaying content, one or more buttons for causing the display of content on the television, and/or various other interfaces.

For example, in one embodiment, a user interface may be displayed that allows the user to control aspects of the television, including volume, channels, power, settings, and/or various other aspects of the television. Additionally, in one embodiment, an electronic programming guide (EPG) may be displayed to the user. In one embodiment, the electronic programming guide may include a personalized electronic programming guide associated with the user of the mobile device. For example, in one embodiment, a user may select a layout for a personalized electronic programming guide.

In another embodiment, the user may select genres to be displayed on the electronic programming guide. In another embodiment, the user may select the type of content to be displayed on the electronic programming guide (e.g. television shows, movies, music, etc.). In another embodiment, the electronic programming guide may be automatically personalized based on user information.

For example, in one embodiment, information associated with the user may be utilized to make recommendations for the user. For example, in one embodiment, a set of items associated with an online content delivery and/or purchase site may be identified. In various embodiments, the items may include television shows, movies, music, and/or any other digital content. In one embodiment, the items may include items of known interest to a user. In various embodiments, the user's interest may be determined based on explicit indications of interest (e.g. the user rated the item highly, etc.) or implicit indications of interest (e.g. the user added the item to a queue or viewed the item, etc.).

In various embodiments, the items of known interest may be selected from one or more of items in the user's viewing history, items in the user's queue, items rated by the user, and/or various other items associated with the user. In other embodiments, the items of known interest may additionally or alternatively be selected based on the viewing activities of the user. For example, in one embodiment, the recommendations process may be utilized to select items that were viewed by the user for an extended period of time, viewed more than once, or viewed during the current session. Further, in one embodiment, the user may be prompted to select items of interest from a list of popular items.

Further, in one embodiment, items of interest may be identified by accessing sources of interest information. For example, in one embodiment, social network related items may be identified. In one embodiment, the social network items may be identified utilizing information associated with a social network database.

In one embodiment, the social network database may include basic information and profile information associated with members of the social network. In various embodiments, the information may include names, birthdays, genders, home locations, last login locations, checked-in location logs, current checked-in location, posted content, comments, friend information, network information, liked content, disliked content, shared content, viewed content, applications used, applications downloaded, content purchased via the social networking site, browsing activity, and/or any other information provided by a member and/or gleaned from member activity associated with the social networking site. Furthermore, the social network database may include login information for each member (e.g. username, password, security questions, etc.).

In various embodiments, the social network information capable of being utilized to recommend content to the user may include gender information, friend information, birthday information, posted information, comment information, rating information, location information, check-in information, preference information, browsing history information, associated application information, location information, race information, like/dislike information, logon history, poll information, and/or any other information capable of being stored in and/or logged by one or more databases and/or systems associated with a social networking site.

In another embodiment, a playlist or suggested playlist may be automatically generated and may be presented to a user (e.g. utilizing the electronic programming guide, etc.). In various embodiments, the playlist may include television shows, movies, music, games, and/or any other digital content.

For example, in one embodiment, one or more databases may store results of human or automated analysis of individual songs, movies, and/or television programs. In one embodiment, the collected data in the database may represent measurements of discrete characteristics associated with the songs, movies, and/or television programs. In one embodiment, a matching algorithm may be used to locate one or more songs, movies, and/or television programs that are similar (e.g. are closely related to a source item or group of items based on their characteristics and weighted comparisons of these characteristics, etc.).

In addition, in one embodiment, specific combinations of characteristics (or even a single notable characteristic) may be identified that represent significantly discernible attributes of a song, movie, and/or television program. In one embodiment, a playlist may be generated for one or more users that involve characteristics and/or focus traits. In one embodiment, an input seed may be received from the user associated with one or more items in a database. Further, characteristics that correspond to the input seed may be identified. Additionally, one or more focus traits may be identified based on the characteristics. Furthermore, in one embodiment, a weighting factor may be assigned to at least some of the characteristics based on the identification of the one or more focus traits. Moreover, in one embodiment, the weighted value of the characteristics that correspond to the input seed may be compared with characteristics of items in the database and items for the playlist may be selected based on the comparison.

In one embodiment, the step of assigning may further include assigning an additional weighting factor based on preferences of the user. In another embodiment, the step of comparing may include comparing the difference between characteristics that correspond to the input seed and characteristics of items in the database. Further, in one embodiment, the content may be provided to the user in accordance with the playlist.

More information for generating a playlist may be found in U.S. patent application Ser. No. 11/295,339, titled "PLAYLIST GENERATING METHODS," which is hereby incorporated by reference in its entirety for all purposes. Although such application is predominately described in the context of generating song playlists, similar techniques may be utilized in the context of other media.

In one embodiment, the interface displaying the electronic programming guide may present the user with an option to display the electronic programming guide on the television. For example, in one embodiment, the user may select a button or an icon (e.g. the "TV" button, etc.) such that the electronic programming guide may be displayed on the television. Similarly, in one embodiment, an interface associated with the mobile device that is used for displaying content on the mobile device may present the user with the option to display the content on the television. In various embodiments, the content may be displayed on a main screen of the television and/or in a picture in picture (PIP) portion of the television.

In one embodiment, the user of the mobile device may begin viewing content on the mobile device (e.g. selected from the EPG interface, etc.) and may select an icon (or button, etc.) such that the content is displayed on the television. In one embodiment, the content may continue playing from a current play point associated with the content. In another embodiment, the content may begin playing from the beginning. In another embodiment, the user may be offered the option to continue playing the content from a current point or to begin playing the content from the beginning. In another embodiment, the user may have the ability to select the play point for the content.

In one embodiment, the user may have the ability to display first content on the television and display second (different) content on the mobile device. In one embodiment, the user may have the ability to switch between playing the first and second content on the television and the mobile device. In another embodiment, the user may have the ability to play a first content on a main screen of the television, second content on a picture in picture portion of the television, and third content on the mobile device. In another embodiment, the user of a first mobile device may have the ability to share content with other mobile devices.

Further, in one embodiment, a social media site may be displayed to the user on the mobile device. In one embodiment, the user may have the option to display the social media site information (e.g. a social media webpage, etc.) on the television. In one embodiment, the user may display the social media site information on the television and use the mobile device to control actions associated with the social media website. For example, in various embodiments, the user may utilize the mobile device to update a status, post content, post comments, communicate with other members, and/or perform any other associated with the social network site.

In one embodiment, the user may have to ability to play content associated with the social media site on the television. For example, in various embodiments, the user may play content posted on the social media site, content linked to the social media site, content associated with advertisements presented utilizing the social media site, content associated with recommendations, and/or various other content. Further, in one embodiment, the advertisements associated with the social media site may be presented to the user on the television. Furthermore, in one embodiment, the user may be able to implement and control a shopping session associated with the social media site utilizing the television and/or the mobile device.

More information about providing advertisements to a user and/or implementing a shopping session may be found in U.S. provisional patent application titled "SYSTEM, METHOD, AND COMPUTER PROGRAM PRODUCT FOR ALTERING AT LEAST ONE ASPECT OF AN INTEGRATED E-COMMERCE ON-LINE APPLICATION," filed Jan. 27, 2012, which has been incorporated by reference in its entirety.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. Nos. 8,078,397, 7,669,123, 7,725,492, 7,788,260, 7,797,256, 7,809,805, 7,827,208, 7,827,265, 7,890,501, 7,933,810, 7,945,653, 7,970,657, 8,010,458, 8,027,943, 8,037,093, 8,081,817, 8,099,433, US20080033739A1, US20080046976A1, US20090144392A1, US20090198487A1, US20100049852A1, US20100132049A1, US20100164957A1, US20100169327A1, US20100198581A1, US20100229223A1, US20100257023A1, and/or US20110044354A1. Each of the foregoing patents/applications are hereby incorporated by reference in their entirety for all purposes.

FIG. 89-1 shows a method 89-100 for altering at least one aspect of an experience of a viewer in association with a television, in accordance with one embodiment. As an option, the method 89-100 may be implemented in the context of the architecture and environment of FIGS. 88-1 and/or 88-2. Of course, however, the method 89-100 may be carried out in any desired environment, or not carried out at all (in whole or part), in varying embodiments.

As shown, at least one aspect of at least one viewer of a television is identified utilizing information received from a camera directed toward an audience of the television. See operation 89-102. Additionally, at least one aspect of an experience of the at least one viewer in association with the television is altered based on the identifying. See operation 89-104.

The television may include any type of television. In one embodiment, the television may include an internet enabled television. Further, the camera may include any type of camera.

In one embodiment, the camera may be integrated with the television. For example, in one embodiment, the camera may be positioned and/or integrated within an outer frame portion of the television. In another embodiment, the camera may be positioned on an exterior of the television frame.

Further, in one embodiment, the camera may be separate from the television. For example, in one embodiment, an external camera may be positioned and/or mounted on the television. In another embodiment, a device separate from the television may include the camera. In various embodiments, the device may include a mobile phone, a computer (e.g. a tablet computer, etc.), a gaming consol, a set-top box, a DVR, and/or various other devices.

Additionally, in one embodiment, a plurality of cameras may be utilized. For example, in one embodiment, the television may include a plurality of integrated cameras. In another embodiment, a plurality of external cameras may be utilized (e.g. cameras that are included in one or more external devices, individual external cameras, etc.).

Further, in one embodiment, the camera may be adjustable. For example, in one embodiment, the focus of the camera may be adjusted. In another embodiment, the pointing direction of the camera may be adjusted. In one embodiment, the camera may be manually adjustable.

In another embodiment, the camera may be automatically adjustable. For example, in one embodiment, the camera may automatically adjust focus based on the audience. In another embodiment, the camera may automatically adjust a pointing direction based on the audience.

In addition to including one or more cameras, in one embodiment, the television may include one or more microphones that are capable of receiving audible input. For example, in various embodiments, the microphone(s) may be capable of receiving commands, user dialogue, and/or various other audible inputs.

In one embodiment, the method 300 may be implemented utilizing computer code stored on one or more devices. For example, in one embodiment, the code may be stored and/or installed on the television (e.g. on a memory associated therewith, etc.). In another embodiment, the code may be installed on a set-top box in communication with the television. In another embodiment, the code may be stored on a mobile device (e.g. a mobile phone, a tablet computer, etc.). In one embodiment, if the code is stored/installed on a mobile device, the television (and/or any other related device that is or is not disclosed herein) may be configured to communicate with the mobile device (e.g. via a wired and/or wireless connection, etc.) such that the mobile device and the television may implement the functionality described in the context of FIG. 89-1.

The information received from the camera may include any information capable of being utilized to identify an aspect of one or more viewers of the television. For example, in one embodiment, the information may include at least one image of the at least one viewer. Further, in one embodiment, the information may include a plurality of images of an area in a direction in which the camera is pointing. For example, in one embodiment, the camera may capture one or more images (e.g. a series of images, a video, etc.) of people in a room that are viewers of the television and/or potential viewers of the television.

The at least one aspect of the viewer may include any type of aspect associated with the viewer. Additionally, any number of techniques may be utilized to determine the aspect associated with the viewer. For example, various image processing techniques, facial (and/or body part) recognition techniques, and/or facial expression (and/or body part expression/movement) recognition techniques may be utilized to determine the aspect associated with the viewer.

Further, in one embodiment, the identified aspect may include a facial expression of the at least one viewer. For example, in various embodiments, the facial expression may include an expression of pleasure (e.g. a smile, etc.), an expression of displeasure (e.g. a frown, squint, etc.), a neutral expression, and/or various other expressions.

In one embodiment, one or more images of the viewer(s) may be captured by the camera and may be analyzed to determine the facial expression utilizing a facial recognition technique. The facial recognition technique may include any technique capable of estimating or determining a facial expression of one or more people. In various embodiments, the facial expression recognition technique may include one or more techniques for recognizing an expression of pleasure (e.g. a smile, etc.), an expression of displeasure (e.g. a frown, squint, etc.), a neutral expression, and/or various other expressions.

In another embodiment, the identified aspect may include a reaction of the at least one viewer. In various embodiments, a facial expression recognition technique and/or a body language recognition technique may be utilized to determine the reaction associated with the at least one user.

For example, in one embodiment, one or more images of the viewer(s) may be analyzed utilizing at least one body language recognition technique. The body language recognition technique may include any technique for recognizing body language expression (e.g. crossed arms, shrugged shoulders, etc.).

In another embodiment, one or more images of the viewer(s) may be analyzed utilizing at least one motion recognition technique. The motion recognition technique may include various image processing techniques for recognizing various movements (e.g. head nodding, head shaking, hand waving, gasps, sighs, etc.).

In another embodiment, the identified aspect may include an identity of the at least one viewer. For example, in one embodiment, one or more captured images may be analyzed utilizing a facial recognition technique to determine the identity of the at least one viewer.

The facial recognition technique may include any software application capable of being utilized to automatically identify and/or verify a person from a digital image or a video frame. In one embodiment, the facial recognition technique may include comparing selected facial features determined from the image to information stored in a facial recognition database.

In another embodiment, the identified aspect may include a presence of the at least one viewer. For example, in one embodiment, one or more images may be captured and analyzed utilizing one or more image processing techniques to determine whether one or more viewers are present. In one embodiment, a number of viewers present may be determined.

In another embodiment, the identified aspect may include the ethnicity of one of more viewers in the room. For example, in one embodiment, one or more images may be captured and then may be analyzed utilizing one or more image processing techniques and/or facial recognition techniques, etc. to determine an ethnicity of one or more viewers. In one embodiment, determining the ethnicity of the one or more viewers may include determining a best estimate of an ethnicity associated with the one or more viewers.

Additionally, in one embodiment, the identified aspect may include an age of the at least one viewer. For example, in one embodiment, one or more images may be captured and then may be analyzed utilizing one or more image processing techniques and/or facial recognition techniques, etc. to determine an age of one or more viewers. In one embodiment, determining the age of the one or more viewers may include determining a best estimate of an age associated with the one or more viewers.

In another embodiment, the identified aspect may include a gender of the at least one viewer. For example, in one embodiment, one or more images may be captured and then may be analyzed utilizing one or more image processing techniques and/or facial recognition techniques, etc. to determine a gender of one or more viewers. In one embodiment, determining the gender of the one or more viewers may include determining a best estimate of a gender associated with the one or more viewers.

Further, in one embodiment, identifying the at least one aspect of the viewer of the television may include comparing the information received from the camera with different information associated with different registered viewers. For example, in one embodiment, one or more images may be analyzed and compared with information associated with images corresponding different registered viewers. In another embodiment, one or more images may be analyzed and information associated with the images may be compared with information associated with different registered viewers.

Utilizing the information associated with the at least on aspect (with or without any other information that is or is not disclosed herein), the experience of the at least one viewer may be altered in various ways. In one embodiment, altering at least one aspect of the experience of the at least one viewer may include altering a power state of the television. In various embodiments, altering the power state may include powering on the television from a powered off state, powering off the television from a powered on state, and/or placing the television in a standby state from a powered on and/or a powered off state.

In one embodiment, the television may be powered on when it is determined that there is a user in the room corresponding to the television, based on the camera information. In another embodiment, the television may be powered off or placed in a standby mode if it is determined that there is not a user in the room, based on the camera information.

Further, in one embodiment, altering at least one aspect of an experience of the at least one viewer may include enforcing a parental control rule in association with the television. For example, utilizing images captured by the camera, it may be determined that a person (e.g. a child, etc.) of (or near) an age associated with a parental control rule is present. Accordingly, in one embodiment, a parental control rule may be enforced based on the information determined from one or more images. Similarly, in one embodiment, a parental control rule may not be enforced based on the information determined from one or more images captured by the camera.

Additionally, in one embodiment, altering at least one aspect of an experience of the at least one viewer may include selecting an advertisement for presentation utilizing the television, based on the identifying. For example, in various embodiments, one or more advertisements may be selected based on gender, age, ethnicity, and/or various other aspects associated with viewers. Further, in one embodiment, the advertisement may be selected based on personal information associated with one or more identified viewers.

In another embodiment, altering at least one aspect of an experience of the at least one viewer may include displaying an electronic program guide (EPG) that reflects preferences of the at least one viewer. For example, in one embodiment, at least one viewer may be identified based on analyzing one of more images. In one embodiment, once the viewer is identified, an EPG associated with the user may be identified and displayed.

In one embodiment, if more than one viewer is present, a master viewer may be determined and the EPG associated with the master viewer may be displayed. In another embodiment, if more than one viewer is present, an EPG associated each identified viewer may be displayed on at least a portion of the television simultaneously. In another embodiment, if more than one viewer is present, an EPG may be selected from a plurality of EPGs associated with the viewers. Further, in one embodiment, an EPG may be identified and presented based on one or more characteristics of one or more viewers (e.g. age, gender, ethnicity, etc.).

In another embodiment, altering at least one aspect of an experience of the at least one viewer may include accepting at least one gesture that is registered by the at least one viewer for controlling the television. For example, in various embodiments, the registered gestures may include a thumbs-up gesture, a hand motion gesture, a head movement gesture, an arm movement gesture, and/or any other type of gesture. In one embodiment, a viewer may have the ability to associate one or more gestures with one or more commands for controlling the television. In another embodiment, the gestures for controlling the television may include default gestures (e.g. factory determined gestures, etc.).

In another embodiment, altering at least one aspect of an experience of the at least one viewer may include accepting at least one voice command that is registered by the at least one viewer for controlling the television. For example, in various embodiments, the registered voice commands may include a power on command, power off command, a channel change command, a volume change command, a menu command, a settings command, and/or any other type of voice command. In one embodiment, a viewer may have the ability to associate one or more voice commands with one or more commands for controlling the television. In another embodiment, the voice commands for controlling the television may include default voice commands (e.g. factory determined voice commands, etc.).

In another embodiment, altering at least one aspect of an experience of the at least one viewer may include logging in the at least one viewer in association with at least one application program adapted for being utilized in association with the television. In various embodiments, the at least one application program may include an online application (e.g. a gaming application, an e-commerce application, etc.), an online social networking application, a media presentation application (e.g. a media player, etc.), and/or any other type of application.

In one embodiment, the at least one application program may be adapted for being utilized in association with the both the television and a mobile device of the at least one viewer, simultaneously. For example, in one embodiment, a viewer may be able to access content associated with the application program via the television and the mobile device. In another embodiment, the viewer may be able to control the application program via the television and/or the mobile device.

In another embodiment, altering at least one aspect of an experience of the at least one viewer may includes displaying a graphical user interface that indicates which of a plurality of viewers are identified. For example, in one embodiment, images captured by the camera may be analyzed to determine the identity of viewers. In one embodiment, viewers may be identified utilizing the images and the viewers may be indicated utilizing a graphical user interface.

In one embodiment, images associated with the viewers may be displayed (e.g. profile pictures, etc.). In another embodiment, information associated with identified viewers may be displayed. In another embodiment, the captured images may be utilized to generate profile pictures to be displayed utilizing the interface, which may be utilized to indicate the user.

Furthermore, in one embodiment, information in association with the identified viewer may be updated for future use. For example, in one embodiment, a viewer may be identified utilizing captured images. Additionally, in one embodiment, during the course of the viewing experience, actions associated with the viewer may be logged and/or analyzed to be used for future use. In various embodiments, the actions may include program/movie viewing history, setting preferences and/or actions, configuration preferences and/or actions, and/or various other actions.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of operation 89-102, the altering of operation 89-104, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 89-2 shows a method 89-200 for registering a viewer of a television, in accordance with another embodiment. As an option, the method 89-200 may be implemented in the context of the architecture and environment of the previous Figures or any subsequent Figure(s). Of course, however, the method 89-200 may be carried out in any desired environment, or not carried out at all (in whole or part), in varying embodiments. It should also be noted that the aforementioned definitions may apply during the present description.

As shown, it is determined whether registration of a viewer is initiated. See decision 89-202. In one embodiment, registration of a viewer may be automatically initiated upon detection of an unregistered viewer. For example, in one embodiment, one or more images of one or more viewers may be captured utilizing a camera associated with the television.

In one embodiment, facial recognition techniques may be utilized to determine the identities of one or more previously registered viewers. In the case that an unregistered viewer is detected, in one embodiment, the viewer may be prompted to register. In another embodiment, the viewer may initiate registration (e.g. by selecting a registration option on a graphical user interface, etc.).

The facial recognition technique may include any software application capable of being utilized to automatically identify and/or verify a person from a digital image or a video frame. In one embodiment, the facial recognition technique may include comparing selected facial features determined from the image to information stored in a facial recognition database.

In one embodiment, the facial recognition technique may identify faces of viewers by extracting landmarks, or features, from an image of the viewer's face. For example, an algorithm may analyze the relative position, size, and/or shape of the eyes, nose, cheekbones, and jaw. In one embodiment, these features may be used to search for other images with matching features.

In another embodiment, the facial recognition technique may normalize a gallery of face images and then compress the face data, only saving the data in the image that is useful for face detection. In this case, in one embodiment, a probe image may then be compared with the face data.

In one embodiment, the facial recognition technique may include a geometric technique, which looks at distinguishing features. In another embodiment, the facial recognition technique may include a photometric approach, which is a statistical approach that distills an image into values and compares the values with templates to eliminate variances. For example, in various embodiments, the facial recognition technique may include Principal Component Analysis using eigenfaces, Linear Discriminate Analysis, Elastic Bunch Graph Matching using the Fisherface algorithm, the Hidden Markov model, and the neuronal motivated dynamic link matching, etc.

In another embodiment, a three-dimensional face recognition technique may be implemented. In this case, in one embodiment, on or more 3D sensors may be utilized to capture information about the shape of a face. This information may then be used to identify distinctive features on the surface of a face, such as the contour of the eye sockets, nose, and chin, etc.

In one embodiment, the 3D sensors may function by projecting structured light onto the face. Further, in one embodiment, a dozen or more of the 3D image sensors may be placed on the same CMOS chip. In one embodiment, each sensor may capture a different part of the spectrum. Additionally, in one embodiment, a 3D matching technique may be utilized to detect facial expressions. In one embodiment, tools from metric geometry may be applied to treat expressions as isometries.

If it is determined to initiate registration, the viewer is prompted for entry of viewer information. See operation 89-204. In various embodiments, the viewer may be prompted for name information, age information, gender information, ethnicity information, viewing preference information, login information (e.g. username, password, etc.), EPG information, subscription information, and/or any other information associated with the viewer.

Furthermore, in one embodiment, the viewer may be prompted for an image entry. See operation 89-206. In one embodiment, the image entry may include a profile picture associated with the viewer. For example, in one embodiment, the user may have the option to utilize the television camera to capture one or more images of the viewer to utilize as the profile picture. In another embodiment, the viewer may have the option to upload one or more images (e.g. from a mobile device, etc.). For instance, in one embodiment, the user may be prompted to e-mail or instant message or otherwise push a picture from a mobile device (that may be equipped with a camera, etc.) to an address/phone number/identifier associated with the television.

Further, it may be determined whether an image is received. See decision 89-208. If an image is received, the viewer information and the image may be stored. See operation 89-210.

In one embodiment, the viewer information and the image may be stored by the television. In another embodiment, the viewer information and the image may be stored in a network cloud. In another embodiment, the viewer information and the image may be stored by a mobile device associated with the viewer (e.g. a mobile phone, a PDA, a tablet computer, a notebook computer, etc.).

In one possible embodiment, both the image and at least a portion of a user profile may be stored in a separate device (e.g. laptop, tablet, phone, etc.) in a proprietary or standard format. To this end, the profile need not necessarily (but may) be generated from scratch. Instead, it may be simply re-used and/or supplemented by the hardware and/or software associated with control of the television.

Once the information associated with that user is stored, it is determined whether additional un-registered viewers are present. See decision 89-212. If additional un-registered viewers are present, one or more of the un-registered users are prompted for entry of user information, etc. in a manner similar to that described above. As an option, multiple viewers may be registered in parallel. For instance, each of a plurality of registration steps (e.g. image capture, textual input, etc.) may each be iterated for each viewer (or completed simultaneously) before moving to a subsequent step, etc. Once the viewer is registered, various information associated with the user may be logged as part of a data structure.

As an option, an unregistered viewer may have the ability to "opt-out" of any viewer-identification-based enhancements or any of the features disclosed herein. This may be accomplished, for example, by providing a user interface prompt asking whether the newly identified unregistered viewer wishes to continue registration and/or opt-out. If the opt-out option is selected, the newly identified unregistered viewer may be subsequently identified only for the purposes not providing further registration prompts and/or avoiding performance/providing any viewer-identification-based enhancements and/or any of the features disclosed herein. In an opt-out situation, such opt-out view may still be capable of subsequent registration, but would more proactively do so via a menu option or the like.

In yet another embodiment, a viewer (e.g. master viewer, or any other viewer, etc.) may have the ability to initiate a "global opt-out" option whereby no identification (of any viewers) is carried out, so that any and all viewers may view "in private" without being identified. This may be accomplished, for example, by providing a user interface prompt asking whether the viewer wishes to initiate a global opt-out. If the global opt-out option is selected, the system may avoid performance/providing any viewer-identification-based enhancements and/or any of the features disclosed herein. Further, more stringent techniques may be initiated in connection with a global opt-out including, but not limited to a disabling of the camera (e.g. electronic disabling with an accompanying user interface perceptible notice, a visually perceptible mechanical movement or covering of the camera, etc.).

In any of the foregoing opt-out embodiments, the opt-out period may be carried out during any desired manually or automatically determined limited or unlimited period of time. For instance, it may persist until disabled (e.g. via a similar or same option that initiated the same, etc.) or only through a current session which may be terminated in response to various conditions (e.g. a power-off or -save event, when one or more current viewers are no longer identified, etc.).

FIG. 89-3 shows a data structure 89-300 for a registered viewer of a television, in accordance with another embodiment. As an option, the data structure 89-300 may be implemented in the context of the architecture and environment of the previous Figures or any subsequent Figure(s). Of course, however, the data structure 89-300 may be implemented in any desired environment, or not carried out at all (in whole or part), in varying embodiments. It should also be noted that the aforementioned definitions may apply during the present description.

As shown, data structures associated with one or more registered users may be stored. In various embodiments, the data structures may be stored in memory associated with the television, a network cloud, and/or memory of a mobile device associated with the viewer (e.g. a mobile phone, a PDA, a tablet computer, a notebook computer, etc.).

Any information associated with the viewers may be stored. For example, in various embodiments, viewer associated application information may be stored, parental control rules associated with the viewer, EPG preferences, advertisement preferences, gesture/voice command information, mobile device information, family/friend information, and/or any other type of information. In still another embodiment, a unique picture (e.g. profile picture, etc.) may also be associated with each of the viewers.

In one embodiment, the viewer may be associated with one or more applications (e.g. e-commerce applications, social network applications, gaming applications, etc.). In this case, in one embodiment, viewer login information associated with the application may be stored in associated with the data structure. In one embodiment, the viewer may enter the application login information. In another embodiment, the login information may be transferred from another device (e.g. a mobile device, etc.).

In various embodiments, different viewers may have different applications associated therewith as well as different application-related preferences. For example, a particular viewer may prefer a first application be displayed, presented, etc. more prominently, with a higher priority, etc. with respect to a second application, or based on latest content, activity, etc. associated with a particular application.

Furthermore, in one embodiment, a viewer gesture may be associated with a television command and the association may be stored in association with the data structure. In another embodiment, a voice command may be associated with a television command and the association may be stored in association with the data structure.

Additionally, in one embodiment, various viewer preferences may be stored. For example, in one embodiment, viewer advertisement preferences may be stored. In this case, in one embodiment, viewer advertisement preferences may be determined based on user input, user actions, inferences, and/or in various other ways.

More information about providing advertisements to a viewer (and other information that may be stored in association with a viewer, as well as other complementary features that may or may not be incorporated with any of the embodiments disclosed herein) may be found in U.S. provisional patent application titled "SYSTEM, METHOD, AND COMPUTER PROGRAM PRODUCT FOR ALTERING AT LEAST ONE ASPECT OF AN INTEGRATED E-COMMERCE ON-LINE APPLICATION," filed Jan. 27, 2012, under application Ser. No. 61/591,819, which has been incorporated by reference in its entirety.

Further, in one embodiment, EPG preferences may be stored in association with the database. For example, in one embodiment, a viewer may configure an EPG and the EPG may be stored. In another embodiment, an EPG may be automatically generated based on user preferences.

The mobile device information may include any information associated with a user device. For example, in various embodiments, the mobile device information may include a model type, a serial number, a device ID, a mobile phone number, and/or any other information associated with a mobile device.

The family and/or friend information may include any information associated with family members and/or friends associated with the viewer. In one embodiment, the family/friend information may be received from a social networking database. In another embodiment, the family/friend information may be received as input from the viewer. In one embodiment, the family/friend information may be used to determine sharing settings and/or parental control settings/rules.

In various embodiments, the parental control rules may include rules established by the viewer and/or rules applicable to the viewer (e.g. and established by another viewer, etc.). In various embodiments, the parental control rules may include rules associated with program viewing, age restrictions, child restrictions, and/or any other configurable rule.

In one embodiment, the data structure may be accessed upon registering and/or identifying a viewer. In various embodiments, the registration and/or the identification of the viewer may occur manually and/or automatically.

FIG. 89-4 shows a method 89-400 for identifying a viewer of a television, in accordance with another embodiment. As an option, the method 89-400 may be implemented in the context of the architecture and environment of the previous Figures or any subsequent Figure(s). Of course, however, the method 600 may be carried out in any desired environment, or not carried out at all (in whole or part), in varying embodiments. It should also be noted that the aforementioned definitions may apply during the present description.

As shown, it is determined whether automatic identification of a viewer is enabled. See decision 89-402. In one embodiment, the automatic identification of a viewer may be a default setting. In another embodiment, the automatic identification of a viewer may include a manual setting.

If the automatic identification of a viewer is not enabled, it is determined whether a manual identification is prompted. See decision 89-404. Such manually-prompted identification may be prompted in any manner. For example, it may be prompted by proactively selecting an identification user interface option that prompts the identification of viewers in a manner that persists until disabled (e.g. via a similar or same option, etc.) or through a current session which may be terminated in response to various conditions (e.g. a power-off or -save event, when one or more current viewers are no longer identified, etc.). In one embodiment, the identification of the viewer may be implemented utilizing one or more facial recognition techniques.

If it is determined that viewer identification is to occur, the audience may be scanned for identification. See operation 89-406. For example, in one embodiment, one or more images of the audience may be captured by one or more cameras associated with the television.

In one embodiment, one or more image recognition techniques and/or facial recognition techniques may be utilized to determine viewers present in the audience. In one embodiment, facial profiles of viewers in the audience may be compared to known facial profiles to determine the identity of one more viewers. In one embodiment, if one of the viewers is not identified, the viewer may be prompted for viewer information. In one embodiment, if it is determined that the viewer is not a previously registered user, the user may be presented the option to register.

In another embodiment, the audience may be scanned and an audience profile may be determined and/or identified. For example, in one embodiment, scanning the audience for identification may include generally identifying the viewers (e.g. a number of viewers, a gender of the viewers, an ethnicity of the viewers, etc.).

Further, it is determined whether there is a change in viewership. See decision 89-408. In one embodiment, a change in viewership may include one or more viewers entering the room or leaving the room. For example, in one embodiment, at least one first image may be analyzed and it may be determined that a first one or more viewers are present. Further, at least one second image may be analyzed and it may be determined that a second one or more different viewers are present. In this case, it may be determined that the viewership has changed.

If it is determined that the viewership has changed, in one embodiment, a current viewership table may be updated. See operation 89-410. In one embodiment, the current viewership table may include names and/or IDs associated with each current viewer.

In another embodiment, the current viewership table may include names and/or IDs associated with each registered current viewer. In one embodiment, the current viewership table may be updated dynamically and automatically. In one embodiment, the current viewership table may be utilized to associate current viewers with information and/or rules associated with the users.

As an option, the current viewership table may be used in connection with information associated with the identified viewers (e.g. see, for instance, the information disclosed in FIG. 89-3 and elsewhere herein, etc.).

In an additional optional embodiment, viewer identification may be required/prompted, etc. based on certain rules. For example, a rule may dictate that certain content require at least one known adult or a predetermined viewer to be present. In different embodiments, such certain content may include R-rated content, content paid for or owned by a certain viewer, application content with a log-in associated with a certain viewer, etc. In any case, any request for such certain content may prompt identification by way of any of the techniques disclosed herein, to verify the presence of the at least one known adult/predetermined viewer, and conditionally provide access based on the identification/verification, etc. To this end, identification may be prompted in response to a request, etc. for any of the features, capabilities, etc. disclosed herein, etc.

FIG. 89-5 shows a method 89-500 for utilizing a current viewership table associated with a television, in accordance with another embodiment. As an option, the method 89-500 may be implemented in the context of the architecture and environment of the previous Figures or any subsequent Figure(s). Of course, however, the method 89-500 may be carried out in any desired environment, or not carried out at all (in whole or part), in varying embodiments. It should also be noted that the aforementioned definitions may apply during the present description.

As shown, it is determined whether there is a change in a current viewership table. See decision 89-502. In one embodiment, a change in the current viewership table may occur when one or more current viewers enter a room associated with the television (e.g. as seen by a camera associated with the television or other device, etc.). In another embodiment, a change in the current viewership table may occur upon registration of one or more viewers. In another embodiment, a change in the current viewership table may occur upon powering up the television.

In another embodiment, a change in the current viewership table may occur when one or more current viewers exit a room associated with the television (e.g. as seen by a camera associated with the television, etc.). In another embodiment, a change in the current viewership table may occur upon deregistration of one or more viewers. In another embodiment, a change in the current viewership table may occur upon powering down the television.

If it is determined that the current viewership table has changed, information associated with identified viewer is queried. See operations 89-504 and 89-506. The information may include any information associated with the identified viewer, including names, IDs, associated rules, preferences, EPG information, advertisement information, and/or any other type of information. In one embodiment, such information may include any of the information described in connection with FIG. 5, or elsewhere herein.

Furthermore, the rules and/or information may be applied to control at least one aspect of the viewing experience. See operation 89-508. For example, in one embodiment, the viewership table may be updated when a first viewer is identified in an image captured by a camera associated with the television. In one embodiment, the viewership table may be updated to include the name and/or ID associated with the identified viewer. Furthermore, in one embodiment, the name and/or ID of the user may be utilized to access EPG information associated with the identified first viewer such that the viewer specific EPG may be displayed on the television for the first viewer.

In another embodiment, the name and/or ID of the user may be utilized to access advertisement information associated with the identified first viewer such that targeted advertisements may be displayed on the television for the first viewer. In another embodiment, the name and/or ID of the user may be utilized to access previous product purchase information associated with the identified first viewer such that targeted advertisements may be displayed on the television for the first viewer.

In another embodiment, the name and/or ID of the user may be utilized to access television configuration preferences associated with the identified first viewer such that the television may be automatically configured for the first viewer. In another embodiment, the name and/or ID of the user may be utilized to access software application information (e.g. e-commerce site information, social network site information, on-line application, etc.) associated with the identified first viewer such that targeted software application related information may be displayed on the television for the first viewer.

In various embodiments, the aforementioned at least one aspect that is controlled (based on viewer identification) may include various status information in connection with any application. Just by way of example, such status may include a "check-in" status or any other status associated with an application (e.g. social networking application, etc.). In such embodiment, a plurality of viewers (with application log-in information associated therewith) may be (manually or automatically) logged into the application based on identification thereof.

To this end, a status update may be provided in connection with the application that indicates the identity and/or number of the logged in users who are together, any comments made thereby, any location information registered in association with the television where the. Such status update may be automatically or manually triggered and may further be directed to a subset of others (e.g. application members/users, etc.) based on one or more pre-configured, real-time and/or status-update-specific privacy settings.

More information regarding check-in functionality and privacy settings associated with the social network site that may or may not be incorporated herein may be found in U.S. Provisional Patent Application No. 61/590,767, filed Jan. 25, 2012, titled "SYSTEM, METHOD AND COMPUTER PROGRAM PRODUCT FOR LOCATION-SPECIFIC PRIVACY SETTINGS," which is incorporated herein by reference in its entity. Of course, any of the features, capabilities, and/or techniques, etc. disclosed in the aforementioned application may or may not be incorporated in the context of any of the embodiments disclosed herein.

In another embodiment, the name and/or ID of the user may be utilized to access rule information associated with the identified first viewer such that rules associated with the first viewer may be applied. In another embodiment, the name and/or ID of the user may be utilized to access personal information associated with the identified viewer such that advertisements, programs, recommendations, movies, subscription information, previously viewed items, purchased items, and/or various other type of information that may be displayed on the television for the first viewer.

Further, in one embodiment, it may be determined whether rules and other information are to be updated. See decision 89-510. For example, in one embodiment, information associated with one or more current viewers may be logged during the course of a viewing session. In various embodiments, such information may include movies viewed, movies purchased, programs viewed, programs purchased, a stopping or pausing point (e.g. in a film, video, etc.), use duration, channels accessed, software applications accessed, likes indicated and/or inferred, dislikes indicated and/or inferred, and/or any other information.

Furthermore, in one embodiment, one or more of the viewers may establish rules. In one embodiment, the rules may include rules for other viewers. For example, in one embodiment, the viewer may have authority to prohibit other viewers from viewing selected programs, applications, and/or channels. As an example, a parent viewer may view a program, determine that the program is not suitable for a child viewer, and may set permissions such that the child viewer may not have the ability to view and/or access the program. In one embodiment, subsequent identification of the child viewer may automatically invoke the established permissions associated with the child viewer.

In another embodiment, the rule may include rules for the viewer setting the rules. For example, in one embodiment, the viewer may set rules associated with programs to be offered (e.g. only sports, action adventure, drama, free programs, pay-per-view, etc.). In another embodiment, the viewer may set rules associated with all other viewers (e.g. free programs, non-adult programs, etc.). In another embodiment, the viewer may set rules associated with a spending allowance. For example, in one embodiment, the user may set a max spending amount for a year, month, week, and/or day. In various embodiments, the max spending amount may be for individual viewers and/or over all viewers.

If it is determined that the rules/information are to be updated, the rules/information are updated. See operation 89-512. In one embodiment, current viewers may have the ability to update viewer preferences/information manually. In another embodiment, the viewer preferences may be updated automatically.

In still other embodiments, the foregoing at least one aspect that is controlled may include any of the features disclosed in U.S. provisional patent application No. 61/567,118, titled "SYSTEM, METHOD, AND COMPUTER PROGRAM PRODUCT FOR DISPLAYING INDICATORS REPRESENTATIVE OF ONE OR MORE USER DEVICES ON A DISPLAY," filed Dec. 5, 2011, which is incorporated herein by reference in its entirety. For that matter, any of the features of any of the embodiments disclosed in the foregoing application may or may not be incorporated into any of the embodiments disclosed herein.

FIG. 89-6A shows a viewer interface 89-600, in accordance with another embodiment. As an option, the viewer interface 89-600 may be implemented in the context of the architecture and environment of the previous Figures or any subsequent Figure(s). Of course, however, the viewer interface 89-600 may be implemented in any desired environment, or not carried out at all (in whole or part), in varying embodiments. It should also be noted that the aforementioned definitions may apply during the present description.

As shown, the viewer interface 89-600 may be operable to display a list of current viewers, including a name, and/or unique ID of the current viewers in a portion of a television display screen. In one embodiment, names and/or IDs associated with all registered viewers may be displayed and all current viewers may be highlighted. In one embodiment, when a registered viewer enters the room and is detected utilizing the camera, the registered viewer name and/or ID may be displayed and/or highlighted.

In various embodiments, the list may only be temporarily displayed (i.e. for a predetermined amount of time, e.g. 2, 4, 6, seconds, etc.) at start-up and/or when the list of current viewers has changed. Such notification may also be displayed at a bottom of the display or when (or only when) content is being displayed (e.g. a paused frame, a commercial, during display of an EPG, etc.).

Furthermore, content selected to be displayed may be displayed in at least a portion of the television display. In various embodiments, the content may include television programs, movies, advertisements, software program interfaces, social networking information, e-commerce information, EPG information, setting information, menu information, and/or various other information. Additionally, in one embodiment, a viewer specific EPG may be displayed. In various embodiments, the EPG may include a user defined EPG and/or an automatically generated EPG.

More information about generating an EPG may be found in U.S. provisional patent application No. 61/599,920, titled "SYSTEM, METHOD, AND COMPUTER PROGRAM PRODUCT FOR SENDING A CONTROL SIGNAL TO A TELEVISION UTILIZING ONE OR MORE MOBILE DEVICES," filed Feb. 16, 2012, which is incorporated herein by reference in its entirety. Of course, any of the features, capabilities, and/or techniques, etc. disclosed in the aforementioned application may or may not be incorporated in the context of any of the embodiments disclosed herein.

Still yet, in one embodiment, the interface 89-600 may be capable of displaying channel preferences for one or more current viewers. In one embodiment, the channel preferences may include channel preferences defined by the associated viewer. In another embodiment, the channel preferences may be automatically selected for a viewer based on viewing activity. Further, in one embodiment, the channel preferences may be capable of being updated by one or more viewers of the television.

In one embodiment, one or more of the viewers may be capable of determining the information presented utilizing the interface 89-600 (e.g. the content, the interface current viewer display, the interface viewer channel preference display, control buttons, etc.). In one embodiment, the user may have the ability to command the television and/or the interface 89-600 utilizing one or more mobile devices.

More information about controlling a television and/or interface utilizing a mobile device may be found in U.S. provisional patent application U.S. provisional patent application No. 61/599,920, titled "SYSTEM, METHOD, AND COMPUTER PROGRAM PRODUCT FOR SENDING A CONTROL SIGNAL TO A TELEVISION UTILIZING ONE OR MORE MOBILE DEVICES," filed Feb. 16, 2012, which has been incorporated by reference in its entirety.

Additionally, in one embodiment, the television and/or the interface 89-600 may be controlled utilizing one or more voice commands. In various embodiments, the voice commands may include commands to power on the television, display the interface 89-600, displaying channel preferences associated with specified viewers or all viewers, displaying specific EPGs, displaying controls, displaying help, displaying one or more menus, displaying settings, changing settings, changing channels, playing programs/movies, performing searches, accessing software applications, selecting items on the screen, generating messages, accessing a network (e.g. the Internet, etc.), initiating a phone call, changing volume, pausing media, fast-forwarding media, re-winding media, and/or any other type of control.

In one embodiment, the viewer may have the ability to associate voice commands with television or interface commands. For example, in one embodiment, the user may select a learning option, speak a command, and perform a television command utilizing the television or a remote control associated therewith to associate the spoken command with the performed command. In another embodiment, the viewer may speak a command and then select a command from a list of commands to associate the spoken command with a performed command. In another embodiment, audible commands may be pre-associated with performable commands.

In still another embodiment, viewers may utilize hand, arm, head, and or any other body movement command to control the interface 89-600 and/or the television. In various embodiments, the motion commands may include commands to power on the television, display the interface 89-600, displaying channel preferences associated with specified viewers or all viewers, displaying specific EPGs, displaying controls, displaying help, displaying one or more menus, displaying settings, changing settings, changing channels, playing programs/movies, performing searches, accessing software applications, selecting items on the screen, generating messages, accessing a network (e.g. the Internet, etc.), initiating a phone call, changing volume, pausing media, fast-forwarding media, re-winding media, and/or any other type of control.

In one embodiment, the viewer may have the ability to associate motion commands with television or interface commands. For example, in one embodiment, the user may select a learning option, motion a command, and perform a television command utilizing the television or a remote control associated therewith to associate the motion command with the performed command. In another embodiment, the viewer may motion a command and then select a command from a list of commands to associate the motion command with a performed command. In another embodiment, motion commands may be pre-associated with performable commands. In one embodiment, the motion command may be detected by one or more cameras associated with the television.

In still another embodiment, a device (e.g. mobile phone, remote control, and/or any other device disclosed herein, etc.) may be used to issue device commands. In various embodiments, the device commands may include commands to power on the television, display the interface 89-600, displaying channel preferences associated with specified viewers or all viewers, displaying specific EPGs, displaying controls, displaying help, displaying one or more menus, displaying settings, changing settings, changing channels, playing programs/movies, performing searches, accessing software applications, selecting items on the screen, generating messages, accessing a network (e.g. the Internet, etc.), initiating a phone call, changing volume, pausing media, fast-forwarding media, re-winding media, and/or any other type of control.

In one embodiment, the viewer may have the ability to associate device commands with television or interface commands. For example, in one embodiment, the user may select a learning option, define a device command, and perform a television command to associate the device command with the performed command. In another embodiment, the viewer may define a command and then select a command from a list of commands to associate the device command with a performed command. In another embodiment, device commands may be pre-associated with performable commands.

Such device commands may, in various embodiments, utilize any desired input/output or other mechanism associated with the device. Just by way of example, such device command may utilize a touch screen, an accelerometer, orientation detector, etc. of the device. In one embodiment, for instance, the viewer may be able to issue various commands (e.g. channel change, pause/play, etc.) by simply shaking, jerking, or otherwise moving the device in a certain manner, direction, etc. As an option, any of the aforementioned input/output or other mechanism associated with the device may be used in combination with any other (e.g. for possibly reducing the chance of an inadvertent device command issuance, etc.). For example, in one possible embodiment, the user may touch the touch screen (anywhere, in a certain quadrant, or on an icon, etc.) and/or position the device in a certain orientation (e.g. such that the device resides in a vertical plane, etc.), in combination with (e.g. simultaneously, after, before, etc.) the shaking, jerking, or otherwise moving of the device in the certain manner, direction, etc.

Further, in one embodiment, the viewer may have the option to utilize one or more (or all) of the motion, voice, and/or device commands to control the television and/or the interface 89-600. In this case, the motion, voice, and/or device commands may include learned commands and/or pre-programmed commands. Such commands may be used separately or in combination (e.g. again, for possibly reducing the chance of an inadvertent device command issuance, etc.). Just by way of example, the user may touch the touch screen (anywhere, in a certain quadrant, or on an icon, etc.) and/or position the device in a certain orientation (e.g. such that the device resides in a vertical plane, etc.), in combination with a voice command or motion command, in order to issue a predetermined television or interface command. In another embodiment, the user may issue a voice and motion command in any desired manner.

In still another embodiment, the mere presence of the device in one's hand in connection (simultaneously or just before/after, etc.) any voice and/or motion command may constitute as a necessary component of a command. For instance, in connection with a motion command involving a users' arm/hand, etc., simultaneous detection of movement of the device (e.g. via an accelerometer, etc.) and the movement of the users' arm/hand (e.g. via a camera, etc.) may be used (in combination) to confirm receipt of an associated television or interface command. Of course, this may be accomplished by the mobile device utilizing a communication channel in connection with the logic that receives camera input and controls the television or interface.

FIG. 89-6B shows a viewer interface 89-610, in accordance with another embodiment. As an option, the viewer interface 89-610 may be implemented in the context of the architecture and environment of the previous Figures or any subsequent Figure(s). Of course, however, the viewer interface 89-610 may be implemented in any desired environment, or not carried out at all (in whole or part), in varying embodiments. It should also be noted that the aforementioned definitions may apply during the present description.

As shown, in one embodiment, the interface 89-610 may be capable of displaying a custom EPG for a registered viewer. In various embodiments, the EPG may present programming options for movies, television, music games, software application, and/or various other media options.

In various embodiments, the EPG may include a user defined EPG and/or an automatically generated EPG. More information about generating an EPG may be found in U.S. provisional patent application No. 61/599,920, titled "SYSTEM, METHOD, AND COMPUTER PROGRAM PRODUCT FOR SENDING A CONTROL SIGNAL TO A TELEVISION UTILIZING ONE OR MORE MOBILE DEVICES," filed Feb. 16, 2012, which has been incorporated herein by reference in its entirety. Of course, any of the features, capabilities, and/or techniques, etc. disclosed in the aforementioned application may or may not be incorporated in the context of any of the embodiments disclosed herein.

In one embodiment, the viewer may have the ability to select items displayed on the interface 89-610 utilizing voice commands. In another embodiment, the viewer may have the ability to select items displayed on the interface 89-610 utilizing motion commands. The viewer may have the ability to select items displayed on the interface 89-610 utilizing a remote control. In another embodiment, the viewer may have the ability to select items displayed on the interface 89-610 utilizing a mobile device via a mobile device command (e.g. like those described herein, etc.).

While not shown, one or more profile pictures may or may not be displayed via the interface 89-610 in connection with the viewers identified. Such profile pictures may be displayed once, generally in a corner of the interface 89-610, and/or in any other desired location, for that matter. In other embodiments, multiple instances of each profile picture may be displayed in association with each of a plurality of different instances of various content, information, rules, and/or any other viewer-specific items, etc. This may or may not, in one optional embodiment, facilitate viewers in recognizing/identifying, etc. their specific information, etc.

FIG. 89-6C shows a viewer interface 89-620, in accordance with another embodiment. As an option, the viewer interface 89-620 may be implemented in the context of the architecture and environment of the previous Figures or any subsequent Figure(s). Of course, however, the viewer interface 89-620 may be implemented in any desired environment, or not carried out at all (in whole or part), in varying embodiments. It should also be noted that the aforementioned definitions may apply during the present description.

As shown, the interface 89-620 may be utilized to register a new viewer. In one embodiment, a camera associated with a television may be utilized to capture a profile picture for the new viewer. In one embodiment, the profile picture may be captured automatically. In another embodiment, the profile picture may be captured in response to a viewer request. In one embodiment, the viewer may have the ability to capture a new profile picture.

Further, in one embodiment, the registering viewer may have the ability to enter personal information, such as a name, age, gender, address, and/or various other information (i.e. see any other information disclosed herein, e.g. in connection the description of FIG. 5 and/or elsewhere herein, etc.). In one embodiment, the viewer may have the option to specify whether the viewer is a television owner, a "master" viewer, etc. In one embodiment, such viewer may be given television control priority over other registered viewers (e.g. when one of the owners is present in the room, etc.).

FIG. 89-6D shows a viewer interface 89-630, in accordance with another embodiment. As an option, the viewer interface 89-630 may be implemented in the context of the architecture and environment of the previous Figures or any subsequent Figure(s). Of course, however, the viewer interface 89-630 may be implemented in any desired environment, or not carried out at all (in whole or part), in varying embodiments. It should also be noted that the aforementioned definitions may apply during the present description.

As shown, in one embodiment, the interface 89-630 may be utilized to set a viewer television control hierarchy. For example, in some cases, more than one viewer may be present in a room, may be identified by the television, and may be registered users. In one embodiment, a viewer hierarchy may be utilized to determine which of the viewers in the room are to have control over the television.

As an example, two parents may have priority to control the television over two children. Accordingly, when one of the parents and one of the children are in the room, the parent will have the ability to control the television. In various embodiments, the control may include control of the television via a remote, a mobile device, voice commands, and/or motion commands.

In one embodiment, control of the television may be passed to another viewer. In various embodiments, the control may be passed utilizing a voice command (e.g. "pass control to Viewer 4," etc.), a motion command (e.g. pointing to another viewer, etc.), a motion and a voice command (e.g. pointing to another viewer and saying "pass control to viewer," etc.), a device command from a mobile device, a command from a remote control, etc.

In various embodiments, the control of the interfaces 600-630 may be facilitated utilizing voice commands, motion commands, remote control commands, mobile device commands, touch screen commands, and/or any combination thereof. Further, any one or more (or all) components, features, etc. of each of the interfaces 600-630 may be integrated in any desired manner.

FIG. 89-7 shows exemplary viewer motion and voice commands 89-700, in accordance with another embodiment. As an option, the viewer commands 89-700 may be implemented in the context of the architecture and environment of the previous Figures or any subsequent Figure(s). Of course, however, the viewer commands 89-700 may be implemented in any desired environment, or not carried out at all (in whole or part), in varying embodiments. It should also be noted that the aforementioned definitions may apply during the present description.

As shown, in one embodiment, one or more viewer motion commands may overlap with one or more viewer voice commands. In various embodiments, motion commands, voice commands, or both, may be utilized (simultaneously or just before/after, etc.) to control a television and/or interfaces capable of being displayed on the television. It should be noted that, in various embodiments, many different combinations and/or types of voice commands and/or motion commands may be utilized (simultaneously or just before/after, etc.) to control various functionality associated with the television or interfaces associated therewith.

As an example, in one embodiment, a hand wave may be associated with changing a channel. Further, in one embodiment, a voice command may indicate a channel in which the television is to change. For example, a viewer may wave his left hand and say "ESPN" (simultaneously or just before/after, etc.) in order to change the current channel to ESPN. Of course, in another embodiment, the viewer may associate any motion and/or voice command with a channel change to a specific channel.

For example, a viewer may associate a left hand wave with a channel down command and a right hand wave with a channel up command. Similarly, in one embodiment, the viewer may associate the spoken prompt of "channel" to an indication that the channel is to be changed and a left hand wave and right hand wave with channel down and channel up commands respectively, or vise versa. Additionally, in one embodiment, the viewer may associate the spoken prompt of "volume" to an indication that volume is to be changed and a left hand wave and right hand wave with volume down and volume up commands respectively, or vise versa.

As another example, a thumbs-up command may be associated with an indication that the viewer likes content being displayed on the television screen. Similarly, in one embodiment, a spoken phrase of "thumbs up" or "like" may indicate that the viewer likes content being displayed on the television screen. In one embodiment, a combination of the voice command "thumbs up" or "like" and a motion command of a thumbs-up may be expected as part of the command identification.

As another example, a right hand, left hand, or both hands indicating a stop (e.g. hand up and palm out, etc.) may be associated with a command to pause and/or stop content play. Additionally, in one embodiment, a spoken command of "pause" or "stop" may be associated with a pause or stop content command. In one embodiment, a combination of the voice command "stop" or "pause" and a motion command of a hand up and palm out may be expected as part of the command identification. As another example, a user may swipe a hand upwardly in front of their face to turn on facial recognition of the television, and swipe a hand upwardly (or downwardly) in front of their face to turn off facial recognition.

In one embodiment, the television may be capable of detecting whether a viewer is attentive to the television, such that if the viewer is not, inadvertent commands may be ignored. For example, in one embodiment, utilizing the camera, the system may ignore a viewer if the viewer is standing, or not looking at the television (e.g. for a predetermined amount of time, etc.), since it may be assumed that there is a high likelihood that the viewer is not watching the television.

In still additional embodiments, device commands (e.g. those described in connection with the description of FIG. 89-6A and/or elsewhere herein, etc.) may be utilized in any combination with any of the other commands disclosed herein. Even still, the mere presence of a device in one's hand in connection (simultaneously or just before/after, etc.) a voice and/or motion command may be used to avoid inadvertent commands, as described herein.

FIG. 89-8 shows a system 89-800 for controlling a television, in accordance with another embodiment. As an option, the system 89-800 may be implemented in the context of the architecture and environment of the previous Figures and/or any subsequent Figure(s). Of course, however, the system 89-800 may be implemented in any desired environment, or not carried out at all (in whole or part), in varying embodiments. It should also be noted that the aforementioned definitions may apply during the present description.

As shown, a television 89-802 may be in communication with one or mobile devices, including a master device 89-804, a slave or subordinate device 89-806, and a guest device 89-808. In various embodiments, the mobile devices 89-804, 89-806, and 89-808 may be in communication with the television 89-802 via a wireless connection (e.g. Bluetooth, WI-Fi, etc.) and/or wired connection. In one embodiment, the mobile devices 89-804, 89-806, and 89-808 may be in communication with the television 89-802 via a communication module that is communicatively coupled to the television 89-802. In various embodiments, the television 89-802 may be communicatively coupled to the communication module via a wireless and/or wired connection.

In operation, users of the mobile devices may execute an application associated with the mobile devices for controlling the television. In one embodiment, the application may be stored in memory associated with the mobile device. In one embodiment, execution of application may cause the launch of one or more interfaces. In various embodiments, the interfaces may include an interface for controlling the television, an interface associated with an electronic programming guide, an interface for accessing a social media website, an interface for displaying content, one or more buttons for causing the display of content on the television, and/or various other interfaces.

For example, in one embodiment, a user interface may be displayed that allows the user to control aspects of the television, including volume, channels, power, settings, and/or various other aspects of the television. Additionally, in one embodiment, an electronic programming guide may be displayed to the user. In one embodiment, the electronic programming guide may include a personalized electronic programming guide associated with the user of the mobile device. For example, in one embodiment, a user may select a layout for a personalized electronic programming guide.

In another embodiment, the user may select genres to be displayed on the electronic programming guide. In another embodiment, the user may select the type of content to be displayed on the electronic programming guide (e.g. television shows, movies, music, etc.). In another embodiment, the electronic programming guide may be automatically personalized based on user information.

For example, in one embodiment, information associated with the user may be utilized to make recommendations for the user. For example, in one embodiment, a set of items associated with an online content delivery and/or purchase site may be identified. In various embodiments, the items may include television shows, movies, music, and/or any other digital content. In one embodiment, the items may include items of known interest to a user. In various embodiments, the user's interest may be determined based on explicit indications of interest (e.g. the user rated the item highly, etc.) or implicit indications of interest (e.g. the user added the item to a queue or viewed the item, etc.).

In various embodiments, the items of known interest may be selected from one or more of items in the user's viewing history, items in the user's queue, items rated by the user, and/or various other items associated with the user. In other embodiments, the items of known interest may additionally or alternatively be selected based on the viewing activities of the user. For example, in one embodiment, the recommendations process may be utilized to select items that were viewed by the user for an extended period of time, viewed more than once, or viewed during the current session. Further, in one embodiment, the user may be prompted to select items of interest from a list of popular items.

Further, in one embodiment, items of interest may be identified by accessing sources of interest information. For example, in one embodiment, social network related items may be identified. In one embodiment, the social network items may be identified utilizing information associated with a social network database.

In one embodiment, the social network database may include basic information and profile information associated with members of the social network. In various embodiments, the information may include names, birthdays, genders, home locations, last login locations, checked-in location logs, current checked-in location, posted content, comments, friend information, network information, liked content, disliked content, shared content, viewed content, applications used, applications downloaded, content purchased via the social networking site, browsing activity, and/or any other information provided by a member and/or gleaned from member activity associated with the social networking site. Furthermore, the social network database may include login information for each member (e.g. username, password, security questions, etc.).

In various embodiments, the social network information capable of being utilized to recommend content to the user may include gender information, friend information, birthday information, posted information, comment information, rating information, location information, check-in information, preference information, browsing history information, associated application information, location information, race information, like/dislike information, logon history, poll information, and/or any other information capable of being stored in and/or logged by one or more databases and/or systems associated with a social networking site.

In another embodiment, a playlist or suggested playlist may be automatically generated and may be presented to a user (e.g. utilizing the electronic programming guide, etc.). In various embodiments, the playlist may include television shows, movies, music, games, and/or any other digital content.

For example, in one embodiment, one or more databases may store results of human or automated analysis of individual songs, movies, and/or television programs. In one embodiment, the collected data in the database may represent measurements of discrete characteristics associated with the songs, movies, and/or television programs. In one embodiment, a matching algorithm may be used to locate one or more songs, movies, and/or television programs that are similar (e.g. are closely related to a source item or group of items based on their characteristics and weighted comparisons of these characteristics, etc.).

In addition, in one embodiment, specific combinations of characteristics (or even a single notable characteristic) may be identified that represent significantly discernible attributes of a song, movie, and/or television program. In one embodiment, a playlist may be generated for one or more users that involve characteristics and/or focus traits. In one embodiment, an input seed may be received from the user associated with one or more items in a database. Further, characteristics that correspond to the input seed may be identified.

Additionally, one or more focus traits may be identified based on the characteristics. Furthermore, in one embodiment, a weighting factor may be assigned to at least some of the characteristics based on the identification of the one or more focus traits. Moreover, in one embodiment, the weighted value of the characteristics that correspond to the input seed may be compared with characteristics of items in the database and items for the playlist may be selected based on the comparison.

In one embodiment, the step of assigning may further include assigning an additional weighting factor based on preferences of the user. In another embodiment, the step of comparing may include comparing the difference between characteristics that correspond to the input seed and characteristics of items in the database. Further, in one embodiment, the content may be provided to the user in accordance with the playlist.

More information for generating a playlist may be found in U.S. patent application Ser. No. 11/295,339, titled "PLAYLIST GENERATING METHODS," which is hereby incorporated by reference in its entirety for all purposes. Although such application is predominately described in the context of generating song playlists, similar techniques may be utilized in the context of other media.

In one embodiment, the interface displaying the electronic programming guide may present the user with an option to display the electronic programming guide on the television. For example, in one embodiment, the user may select a button or an icon (e.g. the "TV" button, etc.) such that the electronic programming guide may be displayed on the television. Similarly, in one embodiment, an interface associated with the mobile device that is used for displaying content on the mobile device may present the user with the option to display the content on the television. In various embodiments, the content may be displayed on a main screen of the television and/or in a picture in picture (PIP) portion of the television.

In one embodiment, the user of the mobile device may begin viewing content on the mobile device (e.g. selected from the EPG interface, etc.) and may select an icon (or button, etc.) such that the content is displayed on the television. In one embodiment, the content may continue playing from a current play point associated with the content. In another embodiment, the content may begin playing from the beginning. In another embodiment, the user may be offered the option to continue playing the content from a current point or to begin playing the content from the beginning. In another embodiment, the user may have the ability to select the play point for the content.

In one embodiment, the user may have the ability to display first content on the television and display second (different) content on the mobile device. In one embodiment, the user may have the ability to switch between playing the first and second content on the television and the mobile device. In another embodiment, the user may have the ability to play a first content on a main screen of the television, second content on a picture in picture portion of the television, and third content on the mobile device. In another embodiment, the user of a first mobile device may have the ability to share content with other mobile devices.

Further, in one embodiment, a social media site may be displayed to the user on the mobile device. In one embodiment, the user may have the option to display the social media site information (e.g. a social media webpage, etc.) on the television. In one embodiment, the user may display the social media site information on the television and use the mobile device to control actions associated with the social media website. For example, in various embodiments, the user may utilize the mobile device to update a status, post content, post comments, communicate with other members, and/or perform any other associated with the social network site.

In one embodiment, the user may have to ability to play content associated with the social media site on the television. For example, in various embodiments, the user may play content posted on the social media site, content linked to the social media site, content associated with advertisements presented utilizing the social media site, content associated with recommendations, and/or various other content. Further, in one embodiment, the advertisements associated with the social media site may be presented to the user on the television. Furthermore, in one embodiment, the user may be able to implement and control a shopping session associated with the social media site utilizing the television and/or the mobile device.

In one embodiment, the television 89-802 may include one or more microphones 89-812 for receiving audible utterances and/or one or more sensors 89-810 (e.g. cameras, etc.) for capturing visual information (e.g. images, motion, etc.).

In operation, the one or more sensors 89-810 may be utilized to capture one or more images. In one embodiment, the images may be analyzed to determine if any registered viewers are present. In one embodiment, at least one processor associated with the television 89-802 may perform the analysis.

In another embodiment, a processor associated with a set top box may perform the analysis. In another embodiment, a processor associated with a gaming consol may perform the analysis. In another embodiment, a processor associated with a mobile device may perform the analysis. In another embodiment, a processor associated with a networked system may perform the analysis.

Once the present viewers are identified, in one embodiment, information associated with the user may be queried. In one embodiment, the information may be stored in memory associated with the television. In another embodiment, the information may be stored in memory associated with a networked database, which is accessible by the television. In another embodiment, the information may be stored in memory associated with a set-top box. In another embodiment, the information may be stored on one or more of the mobile devices 89-804, 89-806, and/or 89-808. In another embodiment, the information may be stored in a network cloud.

Utilizing the information, in one embodiment, one more of the viewers of the television 89-802 may be presented with a customized EPG. In one embodiment, if there are multiple registered viewers present, an EPG associated with an owner of the television may be presented (e.g. if the owner is present, etc.). In another embodiment, if there are multiple registered viewers present, the viewers may have the option to select the EPG to display.

In another embodiment, utilizing the information associated with the viewer, customized voice/hand gestures may be accessed. In this way, in one embodiment, a viewer may be associated with a plurality of customized voice and/or motion gestures for controlling the television. In another embodiment, viewer information may be utilized to access (e.g. login, etc.) online software applications (e.g. social networking applications, etc.). In another embodiment, the viewer information may be utilized to access viewer specific content and/or suggested content for a user.

Furthermore, in various embodiments, the sensors 89-810 and/or the microphones 89-812 may be utilized to determine the presence of viewers. In one embodiment, multiple microphones may be present to capture one or more audible commands. Further, in one embodiment, the audible signals received by each of the microphones may be filtered to eliminate background noise and the remaining signal may be averaged to better determine the audible command. In one embodiment, this process may include a Fourier transform of the received signals.

In one embodiment, if a viewer is not detected, the television may be automatically powered down. Further, in one embodiment, if a viewer is not detected for a predetermined amount of time, the television may be automatically powered down. In various embodiments, the predetermined amount of time may be determined by a viewer and/or factory settings.

In another embodiment, if a viewer is not detected for a predetermined amount of time, a screen saving application may be executed and a screen saver may be displayed on the television automatically. In another embodiment, if a viewer is detected in front of the television for a predetermined amount of time, the television may be automatically powered on. In various embodiments, the predetermined amount of time may be determined by a viewer and/or factory settings.

Additionally, in one embodiment, the television may utilize the cameras to implement facial recognition-driven automatic log in to television software applications (e.g. a social networking television application, etc.). In various embodiments, the television software applications may include one or applications capable of running on the television and/or a mobile device associated with the user.

Further, in one embodiment, the television may utilize agnostic viewer profiles. In this case, in one embodiment, the television will not necessarily need to know a name or other specific information associated with a viewer, however, the television may associate viewer habits with a facial profile. For example, in one embodiment, the television (or an application associated therewith) may display a viewer's home screen, favorite/most-viewed channel (for the present time), and/or various other preference based items at power up, if it is determined the viewer is to be in control of the television (e.g. based on a viewer hierarchy, explicit command, default settings, lack of other viewers, etc.).

In one embodiment, the television (or an application associated therewith) may have the ability to combine preferences amongst multiple identified viewers. For example, in one embodiment, more than one viewer may be automatically (or manually) identified by the television (e.g. based on captured images, etc.) and advertisements that target commonalities of all viewers may be presented to the viewers. In another embodiment, more than one viewer may be automatically (or manually) identified by the television (e.g. based on captured images, etc.) and EPG features that accommodate some or all preferences of the viewers may be combined.

Further, in one embodiment, if more than one viewer is detected, the television may automatically determine which viewer is to have control over the television. For example, in one embodiment, the viewer holding the remote control (e.g. as detected by a camera and/or other sensor associated with the television, etc.) may be determined to have preference or priority to control the television. In another embodiment, the viewer associated with a mobile device paired with or in control of the television may be determined to have preference or priority to control the television.

In one embodiment, a graphic user interface (GUI) may be displayed by the television that is capable of identifying viewers in the room. In various embodiments, the GUI may be utilized to add preferences associated with the viewers, implement parental controls, select content, launch applications, and/or perform various other actions. In one embodiment, viewer preferences and/or other information may be updated on-the-fly. For example, in one embodiment, viewer profiles may be added. In another embodiment, viewer preferences may be automatically updated based on viewer actions.

Additionally, in one embodiment, the television (or an application associated therewith) may have the ability to save a state of content for a specific viewer, on a face-by-face basis. For example, in various embodiments, a viewer may be identified and, during the course of content viewing a command may be received that alters a state of the content being played (e.g. a DVD pause command, a DVR pause command, a channel selection command, a viewing history command, etc.). Accordingly, in one embodiment, the state may be saved such that when the viewer accesses that content in the future, the viewer may have the ability to resume at the proper state (e.g. at power up or coming back in sight, etc.). In one embodiment, this functionality may be either agnostic (e.g. profiles based on face with no name correlation, etc.) or based on registration.

In one embodiment, functionality may be implemented on more than one television, set top box, and/or module. In this case, in one embodiment, a viewer may have the ability to move from room to room such that various televisions in the different rooms may detect the presence of the viewer and continue playing current content at a current state of the content. For example, a first television may detect that the viewer is leaving (or has left) a room, pause current content, store the current state in a location accessible by another television such that when the viewer is detected by a second television in another room, the second television may access the current viewer state and may automatically resume the content from the current state. In one embodiment, the state may be resumed if the viewer is recognized by the second television (or the first television) within a predetermined amount of time from the pause of the content.

In another embodiment, automatic face recognition may be utilized to present custom Internet media bookmarks shown for internet media content. For example, a viewer may be identified utilizing captured images and favorite links for the identified viewer may be presented.

In one embodiment, the television 89-802 may utilize voice recognition in addition to, or instead of, facial recognition for identifying viewers. For example, in one embodiment, the television 89-802 may utilize the microphone(s) 89-812 to detect audible utterances that may be utilized as input for one or more voice recognition techniques. In one embodiment, a voice recognition technique may be utilized to identify a viewer and the viewing session may be modified based on the identification. For example, in one embodiment, at least one aspect of at least one viewer of a television may be identified utilizing information received from one or more microphones capable of detecting sounds from an audience of the television. Further, in one embodiment, at least one aspect of an experience of the at least one viewer in association with the television may be modified based on the identifying.

In one embodiment, a facial recognition technique may be utilized to identify a viewer and a voice recognition technique may be utilized to verify the identity of the viewer. In another embodiment, a voice recognition technique may be utilized to identify a viewer and a facial recognition technique may be utilized to verify the identity of the viewer. In another embodiment, either a voice recognition technique or a facial recognition technique may be utilized to identify the viewer.

The voice recognition technique may include any technique capable of being utilized to identify a user from one or more words spoken by the user. In one embodiment, the voice recognition technique may include converting sounds, words, and/or phrases spoken by viewers into electrical signals, and transforming these electrical signals into coding patterns to which meaning has been assigned (e.g. in a database, etc.).

Additionally, in various embodiments, a template matching voice recognition technique and/or a feature analysis voice recognition technique may be implemented. In one embodiment, a template matching technique may be implemented by first detecting an utterance from a user utilizing a microphone. Further, in one embodiment, the electrical signal from the microphone may be digitized by an analog-to-digital (A/D) converter and the result may be stored in memory. Additionally, in one embodiment, an attempt may be made to match the input with a digitized voice sample, or template, which has a known meaning (e.g. a voice sample associated with the user, etc.).

In one embodiment, the television may be trained with a new user's voice input before the user's voice can be recognized by the television. For example, in one embodiment, the television may display a printed word or phrase for the user to speak one or more times. Once the user speaks that word or phrase one or more times, the television may compute a statistical average of the one or more samples of the same word. In one embodiment, the television may store the averaged sample as a template in a program data structure.

In the context of a feature analysis technique, in one embodiment, instead of trying to find an exact or near-exact match between the actual voice input and a previously stored voice template, this technique may first process the voice input using Fourier transforms or linear predictive coding (LPC) and then attempt to find characteristic similarities between the expected inputs and the actual digitized voice input. In various embodiments, the types of speech differences that may be addressed include accents, varying speed of delivery, pitch, volume, and inflection.

Further, in one embodiment, advertisements may be presented to viewers based on a number of viewers, the demographics of the viewers, and the location of the television/viewers, etc. For example, in one embodiment, a five-person deal for a pizza place down the street may be presented to the viewers if there are five or more people in the room, and it is lunch or dinner time. In another embodiment, if the five people appear to be over twenty-one years old, and it is after 5 p.m., a five-person deal for a bar down the street may be presented.

In another embodiment, the television may be utilized to present alerts to one or more identified viewers. For example, in one embodiment, the television may be in communication with another system associated with a viewer (e.g. a desktop, a mobile device, an appliance, etc.). As an example, in the case the television is in communication with a computing device associated with a viewer, if the viewer receives an email, text, a web phone call, or calendar alert, and the television recognizes the viewer in the room, the television may present the viewer with an alert.

Similarly, in one embodiment, the television may be in communication with one or more household appliances such that the viewer receives an alert associated with one or more appliances (e.g. laundry is complete, oven timer has expired, etc.). In another embodiment, the television may be in communication with a vehicle. In this case, in one embodiment, the television may present alerts associated with the vehicle (e.g. a low gas reminder, a low charge reminder, a plug-in reminder, an oil change reminder, a check engine reminder, etc.).

It should be noted that, in one embodiment, at least a portion of the functionality described herein may be implemented utilizing televisions, set-top boxes, gaming device, computers, and/or any combination thereof. Furthermore, in one embodiment, at least some of the functionality may be implemented in the context of other systems (e.g. appliances, vehicles, etc.).

FIG. 89-9 shows a system 89-900 capable of facial recognition, in accordance with another embodiment. As an option, the system 1100 may be implemented in the context of the architecture and environment of the previous Figures and/or any subsequent Figure(s). Of course, however, the system 89-900 may be implemented in any desired environment, or not carried out at all (in whole or part), in varying embodiments. It should also be noted that the aforementioned definitions may apply during the present description.

As shown, a plurality of appliances 89-902 may be equipped with one or more cameras 89-904. Further, in one embodiment, the appliances 89-902 may include one or more processors. In another embodiment, the appliances 89-902 may include hardware and/or software functionality capable of implementing facial recognition.

For example, in one embodiment, the cameras 89-904 associated with the appliances 89-902 may be utilized to capture images such that facial recognition techniques may be implemented to determine which users are present. Once a user is identified, in one embodiment, the appliances may be configured to implement functionality associated with the identified user. In various embodiments, such functionality may include configuring settings, configuring preferences, and any other functionality associated with the application.

As an example, the appliance may include a fan, heater, and/or air conditioning unit. In one embodiment, once the user is identified utilizing a facial recognition technique, the unit may automatically implement cooling or heating functionality based on stored settings or preferences associated with the identified user. In another embodiment, cameras associated with the appliances may be utilized to detect users and initiate functionality in an agnostic manner, as previously mentioned.

Furthermore, in one embodiment, the appliances may be in communication with a television 89-906 such that alerts may be sent to the television 89-906 by the appliances 89-902, if the appliances do not detect the presence of the user, the user is required (or desired), and the television 89-906 detects the presence of the user. As an example, a camera associated with an oven in operation may be utilized to determine that the user is not in the kitchen. However, a television in the user's living room may determine that the user is present. In one embodiment, if the oven determines that the user is required (e.g. based on a timer, a temperature, etc.), the oven may send an alert to the television, notifying the user.

In one embodiment, the appliances 89-902 may communicate with the television 89-906 over a network. In another embodiment, the appliances 89-902 may communicate with the television 89-906 via a wired connection. In another embodiment, the appliances 89-902 may communicate with the television 89-906 via a wireless connection. In another embodiment, the appliances 89-906 may communicate with the television 89-906 over a direct connection. In various embodiments, the appliances 89-902 may include refrigerators, ovens, stoves, fans, toasters, dishwashers, clothes washers, dryers, heaters, air conditioners, security systems, and/or any other appliance.

In one embodiment, the appliance may include a vehicle appliance, such as a vehicle assembly. For example, in one embodiment, a car (or truck) may include one or more integrated cameras and/or microphones. In this case, in various embodiments, the vehicle (e.g. a computer system associated therewith, etc.) may utilize facial recognition techniques to implement uses preferences associated with the vehicle settings (e.g. seat settings, steering wheel settings, mirror settings, environmental settings, etc.) and/or entertainment system settings of the vehicle entertainment system (e.g. the radio, media player, television, etc.). In another embodiment, the television functionality described herein may be implemented utilizing a vehicle integrated television.

More information regarding on-line and/or vehicular applications and features/capabilities thereof that may or may not be incorporated herein may be found in U.S. Pat. No. 8,073,590, filed Dec. 19, 2008, titled "SYSTEM, METHOD, AND COMPUTER PROGRAM PRODUCT FOR UTILIZING A COMMUNICATION CHANNEL OF A MOBILE DEVICE BY A VEHICULAR ASSEMBLY," which is incorporated herein by reference in its entity. Of course, any of the features, capabilities, and/or techniques, etc. disclosed in the aforementioned application may or may not be incorporated in the context of any of the embodiments disclosed herein.

FIG. 89-10 shows a viewer interface 89-1000 for presenting alerts, in accordance with another embodiment. As an option, the viewer interface 89-1000 may be implemented in the context of the architecture and environment of the previous Figures or any subsequent Figure(s). Of course, however, the viewer interface 89-1000 may be implemented in any desired environment, or not carried out at all (in whole or part), in varying embodiments. It should also be noted that the aforementioned definitions may apply during the present description.

As shown, the interface 89-1000 may be utilized to present viewers with alerts. In one embodiment, the television may be in communication with one or more appliances, such that messages and/or alerts may be sent from the appliances (or vehicles, etc.) and displayed by the television utilizing the interface 89-1000.

In another embodiment, the television may be in communication with a computing device associated with a viewer. In this case, in one embodiment, if the viewer receives an email, text, or web phone, or calendar alert, and the television recognizes the viewer in the room, the viewer may be presented with the message and/or an alert utilizing the interface 89-1000.

Similarly, in one embodiment, the viewer may receive alerts associated with one or more appliances indicating the laundry is complete, an oven timer has expired, a dryer has completed, etc. In another embodiment, the television may be in communication with a vehicle. In this case, in one embodiment, the television may present alerts associated with the vehicle (e.g. low gas reminder, low charge reminder, plug-in reminder, oil change reminder, check engine reminder, etc.).

In various embodiments, any of the capabilities disclosed herein in connection with viewer recognition may be applied utilizing other technologies other than facial recognition and/or the other techniques disclosed herein. Just by way of example, viewer and/or user identification may also be accomplished by identifying the presence, activity, processing, input/output, etc. of a device (e.g. tablet, phone, remote control, watch, etc.) associated with a particular viewer and/or user, and thereby accomplish the same or similar capabilities, applications, etc.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. Nos. 8,078,397, 7,669,123, 7,725,492, 7,788,260, 7,797,256, 7,809,805, 7,827,208, 7,827,265, 7,890,501, 7,933,810, 7,945,653, 7,970,657, 8,010,458, 8,027,943, 8,037,093, 8,081,817, 8,099,433, US20080033739A1, US20080046976A1, US20090144392A1, US20090198487A1, US20100049852A1, US20100132049A1, US20100164957A1, US20100169327A1, US20100198581A1, US20100229223A1, US20100257023A1, and/or US20110044354A1. Each of the foregoing patents/applications are hereby incorporated by reference in their entirety for all purposes.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a first device including a first Bluetooth interface, a first Wi-Fi interface, a first input device, a first display, at least one first processor, and a first memory storing first instructions and an application;
    a second device including a second Bluetooth interface, a second Wi-Fi interface, a second input device, a second display, at least one second processor, and a second memory storing second instructions and the application;
    said at least one first processor of the first device configured to execute the first instructions for, based on user input, causing the first device to:
        access the application on the first device,
        perform an action utilizing the application,
        update a state of the application,
        cause communication of the updated state of the application with the second device, and
        at least one of: shut down the first device or the application, or place the first device in stand by;
    said at least one second processor of the second device configured to execute the second instructions for, based on additional user input, causing the second device to:
        after the at least one of: the first device or the application is shut down, or the first device is placed in stand by, and utilizing the updated state of the application received from the first device, display, on the second display, an interface including:
            a button for accessing the application utilizing the second device by displaying the application on the second display of the second device, and
            indicia that indicates that the first device has updated at least one aspect of the application, by visually identifying the first device by displaying a visual identification of the first device on the second display of the second device, the updated state of the application received from the first device being utilized by the indicia being included with the interface on the second display based on the updated state of the application received from the first device, and
        in response to a detection of a selection of the button after the at least one of: the first device or the application is shut down, or the first device is placed in stand by, access the application utilizing the second device such that the application is accessed so as to reflect the updated state of the application.

2. The system of claim 1, wherein the indicia indicates that the first device has updated the at least one aspect of the application, by identifying the application.

3. The system of claim 1, wherein:
    said at least one first processor of the first device is configured to execute the first instructions for, based on first user input, causing the first device to: permit copying of an object to a clipboard, and communicate the object to the second device; and
    said at least one second processor of the second device is configured to execute the second instructions for, based on second user input, causing the second device to: utilizing the object received from the first device, paste the object for use on the second device.

4. The system of claim 1, wherein the interface includes a multitasking interface.

5. The system of claim 1, wherein at least one of:
the first input device and the first display are components of a first touchscreen;
the first input device includes at least one of a track pad, or a keyboard;
the second input device and the second display are components of a second touchscreen;
the indicia includes a marking;
the indicia designates if a file has been updated since the last time the application was accessed;
the at least one aspect includes data of the application;
the at least one aspect includes a state of the application;
the action includes a display function;
the action includes a processing function;
the action produces an output;
the at least one first processor includes a single processor;
the at least one first processor includes multiple processors;
the at least one second processor includes a single processor;
the at least one second processor includes multiple processors;
the application stored on the first memory, and the application stored on the second memory are identical;
the application stored on the first memory, and the application stored on the second memory have differences;
the application stored on the first memory, and the application stored on the second memory have differences to accommodate differences between the first device and the second device;
the application stored on the first memory, and the application stored on the second memory are components of different instances of the same application installed on both the first device and the second device;
the application stored on the first memory, and the application stored on the second memory are identical components of different instances of the same application installed on both the first device and the second device;
the first instructions stored on the first memory, and the second instructions stored on the second memory are identical;
the first instructions stored on the first memory, and the second instructions stored on the second memory have differences;
the first instructions stored on the first memory, and the second instructions stored on the second memory have differences to accommodate differences between the first device and the second device;
the first and second instructions are components of different instances of the same operating system installed on both the first device and the second device;
the first and second instructions are components of an operating system installed on both the first device and the second device;
the button for accessing the application utilizing the second device by displaying the application on the second display of the second device, is provided for displaying the application in response to a detection of a selection of the button;
the button for accessing the application utilizing the second device by displaying the application on the second display of the second device, is provided for displaying the application for providing access thereto, in response to a detection of a selection of the button;
the visual identification includes a name of the first device;
the visual identification is user-selected;
the visual identification is predetermined;
the indicia is included with the interface on the second display based on the updated state of the application received from the first device, by the indicia being conditionally displayed based on the updated state of the application received from the first device;
the indicia is included with the interface on the second display based on the updated state of the application received from the first device, by the indicia being conditionally displayed based on whether the updated state of the application has been received from the first device;
the indicia is included with the interface on the second display based on the updated state of the application received from the first device, by the indicia being conditionally displayed based on whether the updated state of the application has been received from the first device or not;
the indicia is included with the interface on the second display based on the updated state of the application received from the first device, by the indicia including the visual identification that is included with the updated state of the application received from the first device;
the interface is displayed after the at least one of: the first device or the application is shut down, or the first device is placed in stand by, in a first scenario, and the interface is displayed before the at least one of: the first device or the application is shut down, or the first device is placed in stand by, in a second scenario;
the interface being displayed after the at least one of: the first device or the application is shut down, or the first device is placed in stand by, is a temporal requirement;
the interface being displayed after the at least one of: the first device or the application is shut down, or the first device is placed in stand by, is a temporal capability;
each instance of after the at least one of: the first device or the application is shut down, or the first device is placed in stand by, is a temporal requirement;
each instance of after the at least one of: the first device or the application is shut down, or the first device is placed in stand by, is a temporal capability;
the user input includes separate inputs for causing the first device to: access the application on the first device, perform the action utilizing the application, update the state of the application, and the at least one of shut down or stand by;
the user input includes a first single input for causing the first device to access the application on the first device, and a second single input for causing the first device perform the action utilizing the application that, in turn, automatically causes the update of the state of the application;
the additional user input includes separate inputs for causing the second device to: display the interface, and access the application;
the additional user input includes a single input for causing the second device to: display the interface, and access the application;
the button includes a virtual button;
the button includes a physical button;
the button does not include a physical button;
the button includes a software button;
the button includes a touch-sensitive button that is displayed on a touch screen;

the button includes a touch-sensitive button that is not displayed on a touch screen;
the button includes a touch-sensitive button that is displayed on the second display and is selectable via the second input device;
the button is displayed on the second display and is selectable via the second input device;
the button is displayed on the second display and is selectable via the second input device which includes a touch touch-sensitive surface overlaid on the second display;
the button is part of a control panel;
the user input and the additional user input are the same;
the user input and the additional user input are different;
the user input and the additional user input are received from a same user;
the user input and the additional user input are received from different users;
the application is accessed by being opened;
the causing the communication of the updated state of the application with the second device, is performed by executing a command that results in the communication of the updated state of the application with the second device;
the causing the communication of the updated state of the application with the second device, is performed by executing a command that results in the communication of the updated state of the application with the second device via at least one server;
the causing the communication of the updated state of the application with the second device, is performed by communicating the updated state of the application with at least one server that, in turn, communicates the updated state of the application with the second device;
the causing the communication of the updated state of the application with the second device, is performed by causing the communication of the updated state of the application directly with the second device;
the causing the communication of the updated state of the application with the second device, is performed by causing the communication of the updated state of the application indirectly with the second device;
the updated state of the application is directly received from the first device;
the updated state of the application is indirectly received from the first device;
the updated state of the application is received from the first device via at least one intermediate device;
the updated state of the application is received from the first device via at least one server;
the at least one of: the first device or the application is shut down, or the first device is placed in stand by, includes shutting down the first device;
the at least one of: the first device or the application is shut down, or the first device is placed in stand by, includes shutting down the application;
the at least one of: the first device or the application is shut down, or the first device is placed in stand by, placing the first device in stand by;
the at least one of: the first device or the application is shut down, or the first device is placed in stand by, causes the first display to be disabled;
the at least one of: the first device or the application is shut down, or the first device is placed in stand by, causes the second display to be activated;
the at least one of: the first device or the application is shut down, or the first device is placed in stand by, is prompted by a detection of a user input;
the at least one of: the first device or the application is shut down, or the first device is placed in stand by, is performed in response to a detection of a user input via a control operational tool;
the at least one of: the first device or the application is shut down, or the first device is placed in stand by, includes shutting down the first device and shutting down the application;
the updated state of the application includes information to be displayed via the application;
the updated state of the application includes user-altered data to be displayed via the application;
the application is accessed by being executed; or
the application is already running when accessed; and
wherein the first device is configured for determining a location associated with the first device; determining a presence of at least one other person at the location; and automatically displaying a graphical user interface associated with the determined location and the determined presence of the at least one other person, wherein the first device is further configured for determining that the location is proximate to a previously identified item of interest; and displaying another graphical user interface associated with the determined location and the previously identified item of interest.

6. A non-transitory computer readable storage medium storing one or more programs, the one or more programs comprising instructions which, when executed by a first device and a second device, cause:
the first device to:
access the application on the first device,
perform an action utilizing an application,
update a state of the application,
cause communication of the updated state of the application with the second device, and
at least one of: shut down the first device or the application, or place the first device in stand by; and
the second device to:
after the at least one of: the first device or the application is shut down, or the first device is placed in stand by:
utilizing the updated state of the application received from the first device, display, via the second device, an interface including:
a button for accessing the application utilizing the second device by displaying the application via the second device, and
indicia that indicates that the first device has updated at least one aspect of the application, by visually identifying the first device by displaying a visual identification of the first device via the second device, the updated state of the application received from the first device being utilized, by the indicia being included on the interface based on the updated state of the application received from the first device, and
in response to a detection of a selection of the button after the at least one of: the first device or the application is shut down, or the first device is placed in stand by, access the application utilizing the second device such that the application is accessed so as to reflect the updated state of the application.

7. The non-transitory computer readable storage medium of claim 6, wherein the at least one aspect of the application includes a file that is accessed utilizing the application.

8. The non-transitory computer readable storage medium of claim 6, wherein the at least one aspect of the application includes a file that is edited utilizing the application.

9. The non-transitory computer readable storage medium of claim 6, wherein the updated state of the application is conditionally communicated with the second device, based on particular user input.

10. The non-transitory computer readable storage medium of claim 6, wherein the updated state of the application is communicated utilizing at least one of: a Bluetooth interface, or a Wi-Fi interface of the first device.

11. The non-transitory computer readable storage medium of claim 6, wherein the first device includes one of a personal computing device, a tablet device, a phone device, or a watch device, and the second device includes a different one of the personal computing device, the tablet device, the phone device, or the watch device.

12. The non-transitory computer readable storage medium of claim 6, wherein the indicia indicates that the first device has updated the at least one aspect of the application, by identifying the application.

13. The non-transitory computer readable storage medium of claim 6, wherein:
the first device is configured to execute the instructions for, based on first user input, causing the first device to: permit copying of an object to a clipboard, and communicate the object to the second device; and
the second device is configured to execute the instructions for, based on second user input, causing the second device to: utilizing the object received from the first device, paste the object for use on the second device.

14. The non-transitory computer readable storage medium of claim 6, wherein the button is also displayed on the first device for accessing the application utilizing the first device.

15. The non-transitory computer readable storage medium of claim 6, wherein the instructions, when executed by the first device and the second device:
cause the first device to operate such that a file is displayed and edited with edits using the first device, and
cause the second device to operate such that the file is displayed with the edits using the second device.

16. The non-transitory computer readable storage medium of claim 6, wherein the instructions, when executed by the first device and the second device:
cause the first device to operate such that a file is displayed and edited with first edits using the first device, and
cause the second device to operate such that the file is displayed with the first edits using the second device and the file is further displayed and edited with second edits using the second device, after the at least one of: the first device or the application is shut down, or the first device is placed in stand by, and utilizing the updated state of the application received from the first device.

17. The non-transitory computer readable storage medium of claim 6, wherein the visual identification includes a device name.

18. The non-transitory computer readable storage medium of claim 6, wherein the visual identification includes a user-selected name.

19. The non-transitory computer readable storage medium of claim 6, wherein the indicia is included with the interface on the second display based on the updated state of the application received from the first device, by the indicia being conditionally displayed based on whether the updated state of the application is received from the first device.

20. A method, comprising:
at a first device:
accessing an application on the first device,
performing an action utilizing an application,
updating a state of the application,
causing communication of the updated state of the application, and
at least one of: shutting down the first device or the application, or placing the first device in stand by;
at a second device:
after the at least one of: the first device or the application is shut down, or the first device is placed in stand by:
utilizing the updated state of the application received from the first device, displaying, via the second device, an interface including:
a button for accessing the application utilizing the second device by displaying the application via the second device, and
indicia that indicates that the first device has updated at least one aspect of the application, by visually identifying the first device by displaying a visual identification of the first device via the second device, the updated state of the application received from the first device being utilized, by the indicia being included with the interface based on the updated state of the application received from the first device, and
in response to a detection of a selection of the button after the at least one of:
the first device or the application is shut down, or the first device is placed in stand by, accessing the application utilizing the second device such that the application is accessed so as to reflect the updated state of the application.

21. The method of claim 20, wherein the updated state of the application is communicated utilizing at least one of: a Bluetooth interface, or a Wi-Fi interface of the first device.

22. The method of claim 20, wherein the first device includes one of a personal computing device, a tablet device, a phone device, or a watch device, and the second device includes a different one of the personal computing device, the tablet device, the phone device, or the watch device.

23. The method of claim 20, wherein the indicia indicates that the first device has updated the at least one aspect of the application, by identifying the application.

24. The method of claim 20, and further comprising:
at the first device: based on first user input, causing the first device to: permitting copying of an object to a clipboard, and communicating the object with the second device; and
at the second device: based on second user input, causing the second device to: utilizing the object received from the first device, pasting the object for use on the second device.

25. The method of claim 20, wherein the button is also displayed on the first device for accessing the application utilizing the first device.

26. The method of claim 20, and further comprising:
at the first device: causing the first device to operate such that a file is displayed and edited with edits using the first device, and at the second device: causing the second device to operate such that the file is displayed with the edits using the second device.

27. The method of claim 20, and further comprising:
at the first device: causing the first device to operate such that a file is displayed and edited with first edits using the first device, and
at the second device: causing the second device to operate such that the file is displayed with the first edits using the second device and the file is further displayed and edited with second edits using the second device, after the at least one of: the first device or the application is shut down, or the first device is placed in stand by, and utilizing the updated state of the application received from the first device.

28. A non-transitory computer readable storage medium storing one or more programs, the one or more programs comprising instructions means which, when executed by a first device means and a second device means, cause:
the first device means to:
access the application on the first device means,
perform an action utilizing an application,
update a state of the application,
cause communication of the updated state of the application with the second device means, and
at least one of: shut down the first device means or the application, or place the first device means in stand by; and the second device means to:
after the at least one of: the first device means or the application is shut down, or the first device means is placed in stand by:
utilizing the updated state of the application received from the first device means, display, via the second device means, an interface including:
a button for accessing the application utilizing the second device means by displaying the application via the second device, and
indicia that indicates that the first device means has updated at least one aspect of the application, by visually identifying the first device means by displaying a visual identification of the first device via the second device, the updated state of the application received from the first device being utilized, by the indicia being included with the interface based on the updated state of the application received from the first device, and
in response to a detection of a selection of the button after the at least one of: the first device or the application is shut down, or the first device is placed in stand by, access the application utilizing the second device means such that the application is accessed so as to reflect the updated state of the application.

* * * * *